United States Patent [19]

Dissly et al.

[11] 4,276,597

[45] Jun. 30, 1981

[54] METHOD AND APPARATUS FOR INFORMATION STORAGE AND RETRIEVAL

[75] Inventors: Donald D. Dissly; Ronald J. Blanchard, both of Louisville, Ky.

[73] Assignee: Volt Delta Resources, Inc., New York, N.Y.

[21] Appl. No.: 434,207

[22] Filed: Jan. 17, 1974

[51] Int. Cl.³ .......................... G06F 3/00; G06F 7/10

[52] U.S. Cl. .......................... 364/300; 364/200

[58] Field of Search .......................... 340/172.5; 444/1

[56] References Cited

U.S. PATENT DOCUMENTS

| | | | |
|---|---|---|---|
| 3,354,467 | 11/1967 | Beekley | 340/172.5 |
| 3,408,631 | 10/1968 | Evans et al. | 340/172.5 |

OTHER PUBLICATIONS

Summit, Roger K., Proceedings of 22nd Natl. Conference of the Assoc. for Computing Machinery, 1967, pp. 51-56. (L-7140-137).

Davis, D. R. et al., Communications of the ACM, vol. 8, issue 4, Apr. 1965, pp. 243-246. (L-7140-701).

Heiner, Joseph A., Jr., et al., Proceedings of the 21st Natl. Conf. of the Assoc. for Computing Machinery, 1966, pp. 339-345. (L-7140-894).

Salton, G., Proceedings of the 19th Natl. Conference of the Assoc. for Computing Machinery, 1964. pp. L2.3-1-L2.3-20 (L-7140-1235).

Fossum, Earl G. et al., UNIVAC Techn. Status Report No. 5, Contract AF-49 (638) 1194, Mar. 30, 1965, pp. 1-28 (L-7140-2348).

*Primary Examiner*—Gareth D. Shaw
*Attorney, Agent, or Firm*—Larry S. Nixon

[57] ABSTRACT

Method and apparatus for identifying particular desired information bearing records having desired predetermined identifiable characteristics from a set of such records in a base data file. A special retrieval file including arrays of binary coded elements is produced and maintained from the information content of the base data file. Each array of the retrieval file corresponds to a particular predetermined identifiable characteristic of language structure potentially present in or associated with the set of records concerned and each element in such an array corresponds to and is representative of the address or location of a particular one of the records in the base data file. The elements are binary coded to represent the presence or absence of the predetermined identifiable characteristics of language structure associated with that particular array in the corresponding record. Furthermore, the set of predetermined identifiable characteristics is itself chosen, in one exemplary embodiment, to represent the alphabetic value and relative sequential location of information characters in associated groups of characters such as words contained in the records. In this manner, the retrieval file itself represents an irreversible information compression of the language structure and/or information contained in the set of information bearing records.

To locate any particular desired record, the retrieval file is first searched by identifying and selecting those arrays representing desired predetermined identifiable characteristics of language structure and comparing the binary values of respectively corresponding elements in the selected arrays thus identifying which records in the base data file have all the desired predetermined identifiable characteristics of language structure. Once the desired records in the base data file have been identified in this manner, they are then selected and displayed, copied, etc., as desired to provide the requisite access or retrieval of information that had previously been stored in the base data file. Particular choices and variations in the selection of the set of predetermined identifiable characteristics of language structure to be represented by the arrays in the retrieval file will change the search and retrieval characteristics, capabilities, flexibility, etc., of the system as may be desired for particular types of record sets and particular types of base data file formats, etc.

80 Claims, 92 Drawing Figures

Fig. 5
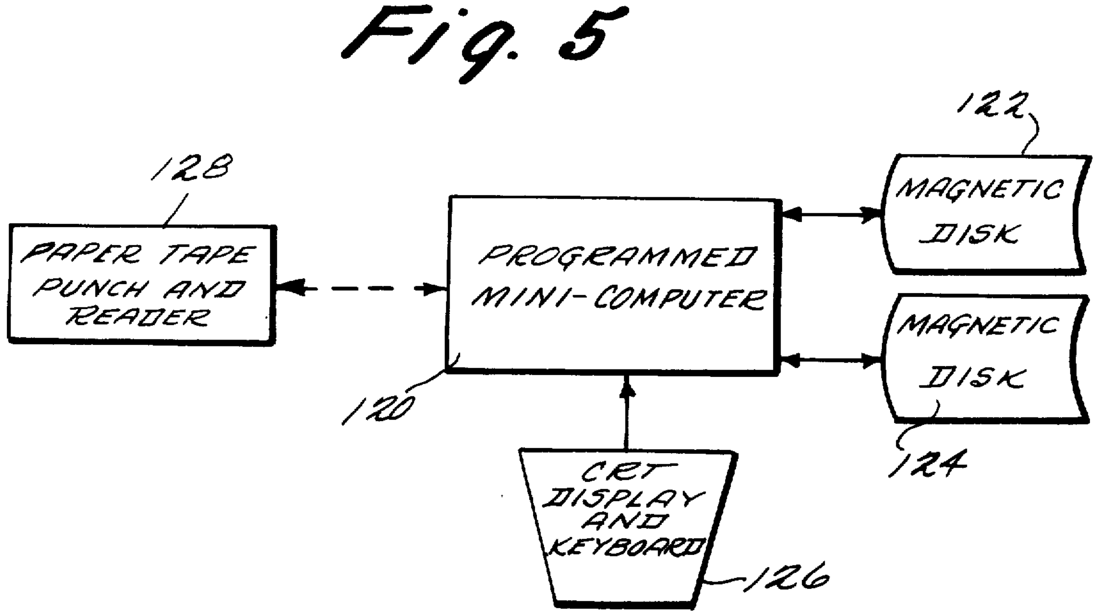
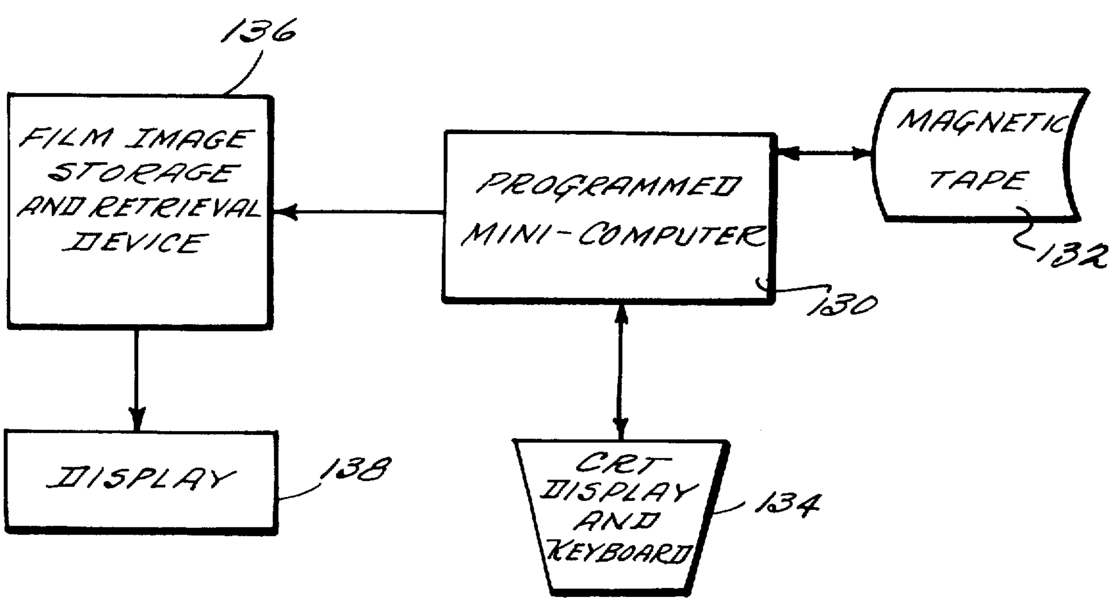
Fig. 6

FLOW CHART FOR PROGRAM #1
(SEE SOURCE PROGRAM STATEMENTS 0200-0273)

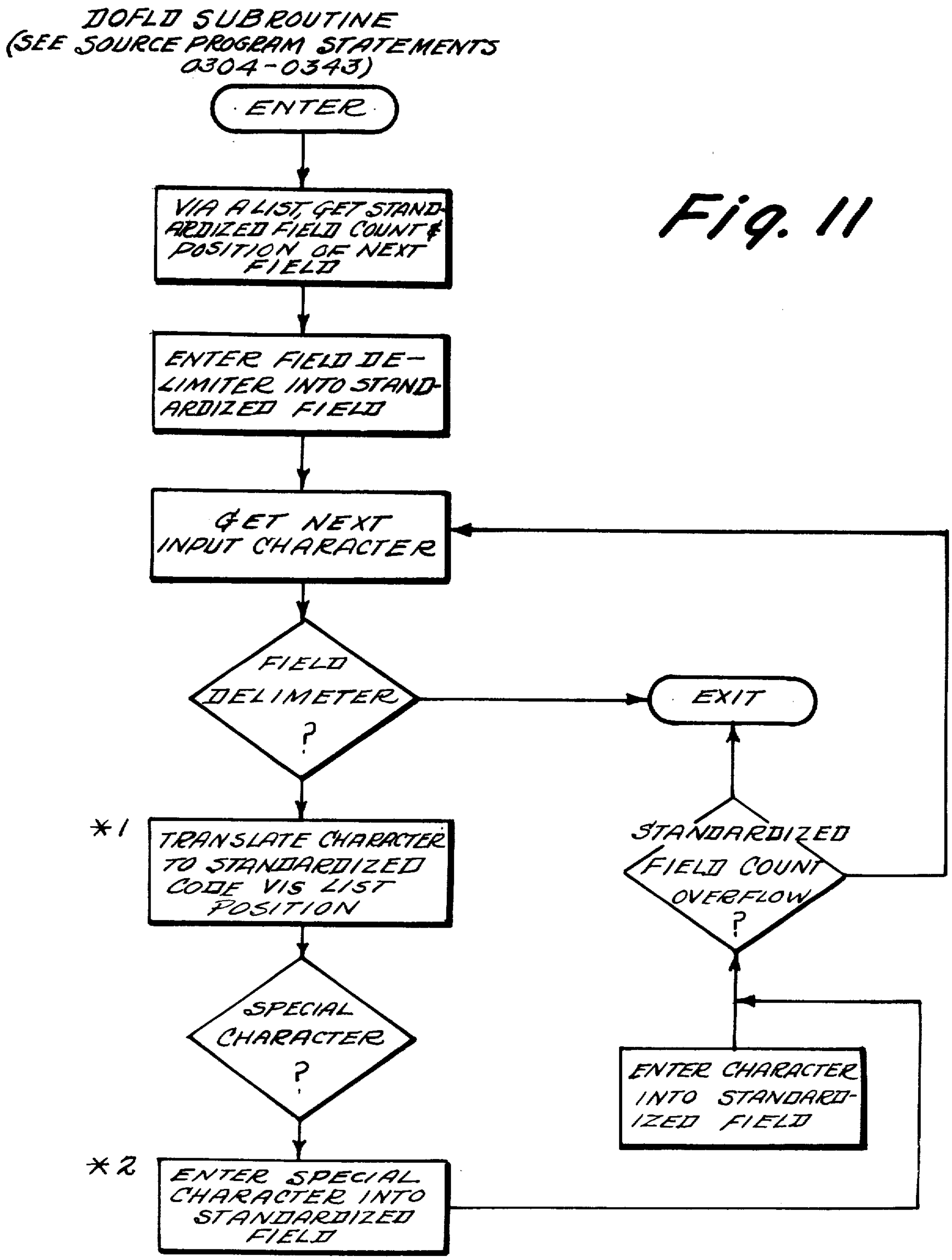

Fig. 11

#1 SINCE THE INPUT CHARACTERS ARE ONLY BITS CODES TRANSLATION IS ACCOMPLISHED BY PUTTING THE STANDARDIZED CODES IN A 64/10 ELEMENT LIST IN POSITION DIRECTLY PROPORTIONAL TO ITS EQUIVALENT INPUT CODE.

#2 SPECIAL CHARACTER ARE MERELY DOUBLE CODED CHARACTERS. SINCE THE NORMAL STANDARDIZED CODE IS A 6 BIT CODE BUT IS LOCATED IN THE LIST IN A 12 BIT WORD ONE OF THE UNUSED BITS IS SET (BIT O TO INDICATE THAT THE CHARACTER SHOULD BE DOUBLE CODED.

PUTCR SUBROUTINE
(SEE SOURCE PROGRAM STATEMENTS 0344-0376)

*1 STANDARDIZED IS 6 BIT CODE.

*2 STANDARDIZED RECORD FORMAT IS SUCH THAT 2 STANDARDIZED CHARACTERS FIT INTO 1 COMPUTER WORD. BIT Ø OF OTLOC KEEPS TRACK OF WHICH HALF OF THE LOCATION IS CURRENTLY BEING SERVICED.

WRITE SUBROUTINE
(SEE SOURCE PROGRAM STATEMENTS 0442-0455)

* 1. OPERATION: WRITE STANDARDIZED RECORD
* 2. PHYSICAL MALFUNCTION FOR THIS TO OCCUR.
* 3. OPERATION: PUT TAPE MARK ON STANDARDIZED TAPE
* 4. REWIND STANDARDIZED TAPE.
* 5. MANUAL INTERVENTION TO CONTINUE PROGRAM.

BUF SUBROUTINE
(SEE SOURCE STATEMENTS 0456-0503)
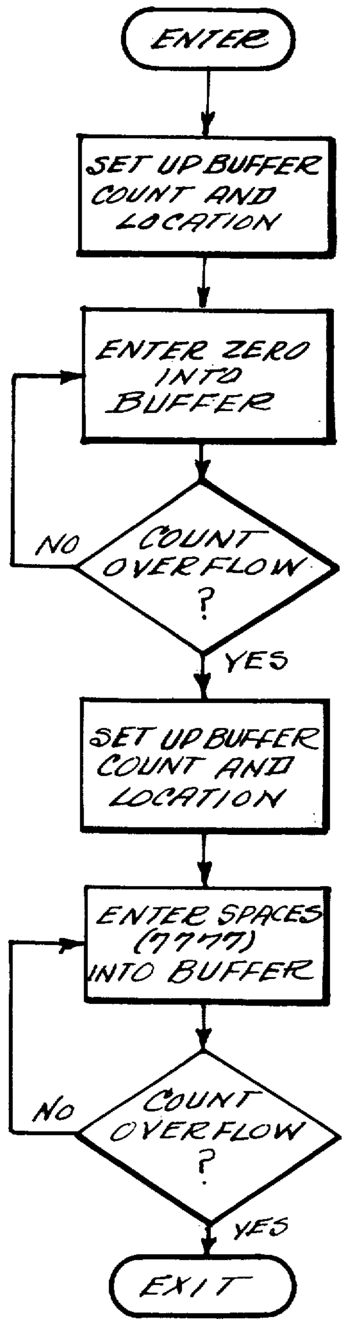
Fig. 15
Fig. 16
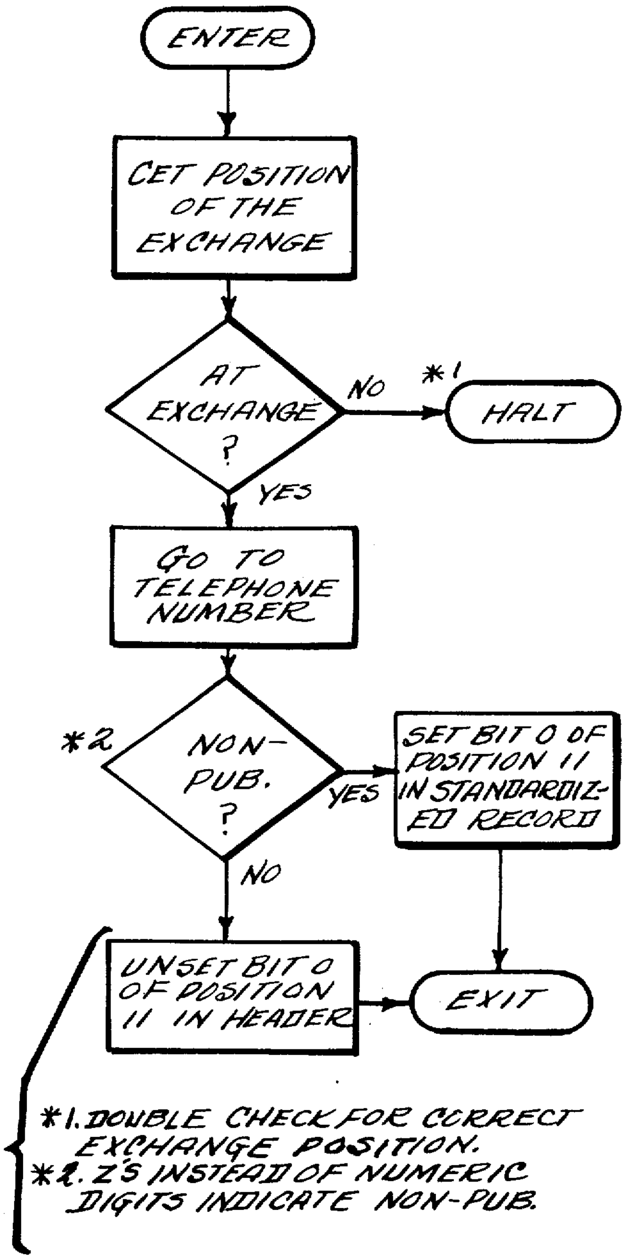
*1. DOUBLE CHECK FOR CORRECT EXCHANGE POSITION.
*2. Z'S INSTEAD OF NUMERIC DIGITS INDICATE NON-PUB.

*1 ALSO FOR LOADER #3 RESET DECISION POINT IN COMP SUBROUTINE TO ITS ORIGINAL INSTRUCTIONS BEFORE STARTING CAPTIONS.

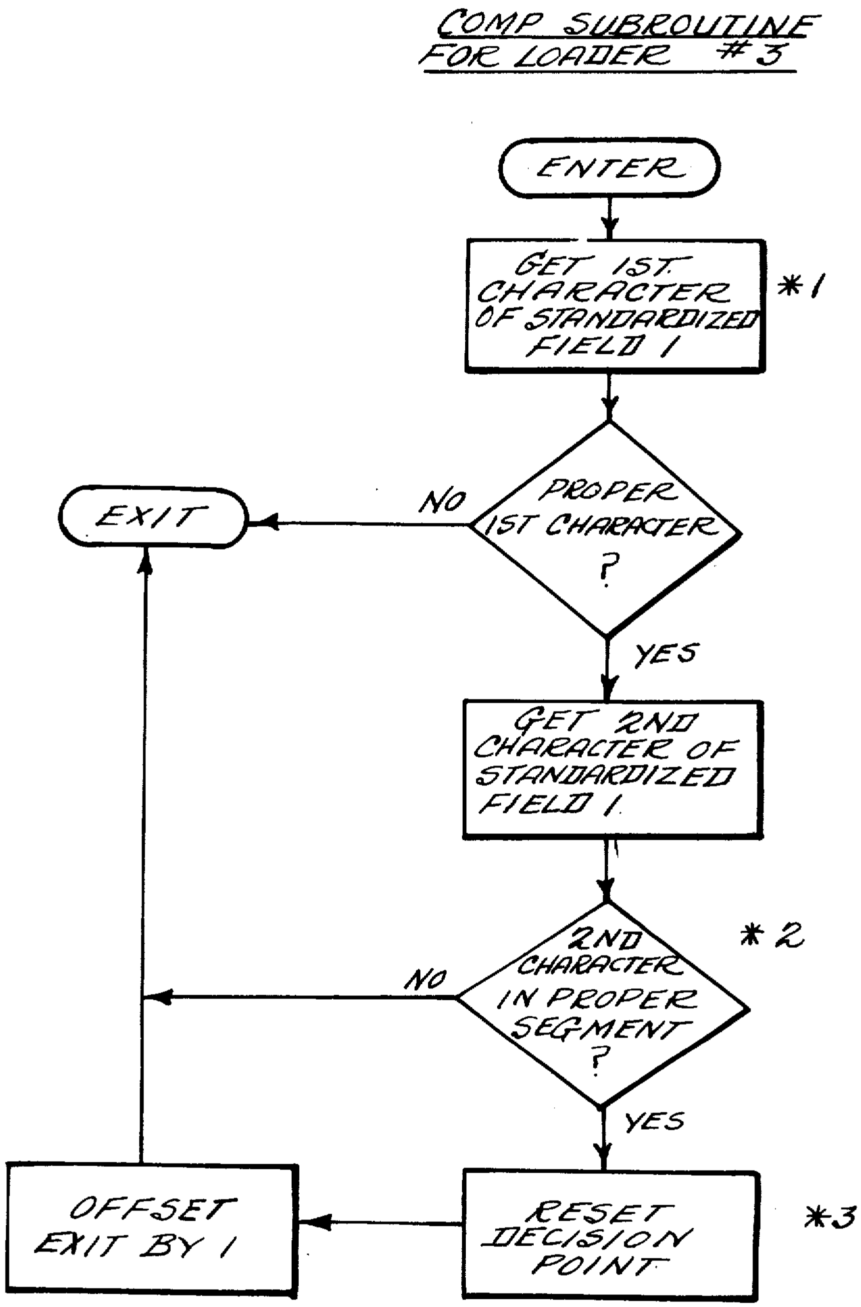

*1 FULL NAME FIELD

*2 ESSENTIALLY THIS DECISION POINT REJECTS RECORDS WHICH HAVE THE CORRECT 1ST LETTER UNTIL IT COMES UPON THE ALPHA SPLIT CHARACTER FOR 2ND LETTER. (EG. WHEN PROCESSING M1-M2 IT REJECTS ALL M'S UNTIL IT HITS M1, THEN PROCESSES THE REMAINDER OF THE M'S.)

*3 ONCE THE SPLIT CHARACTER HAS BEEN REACHED, THE PROGRAM CAN FUNCTION NORMALLY WITH THE COMP SUBROUTINE USED IN LOADER #1.

Fig. 21

DISK FILES LAYOUT FOR DISK DRIVE 0

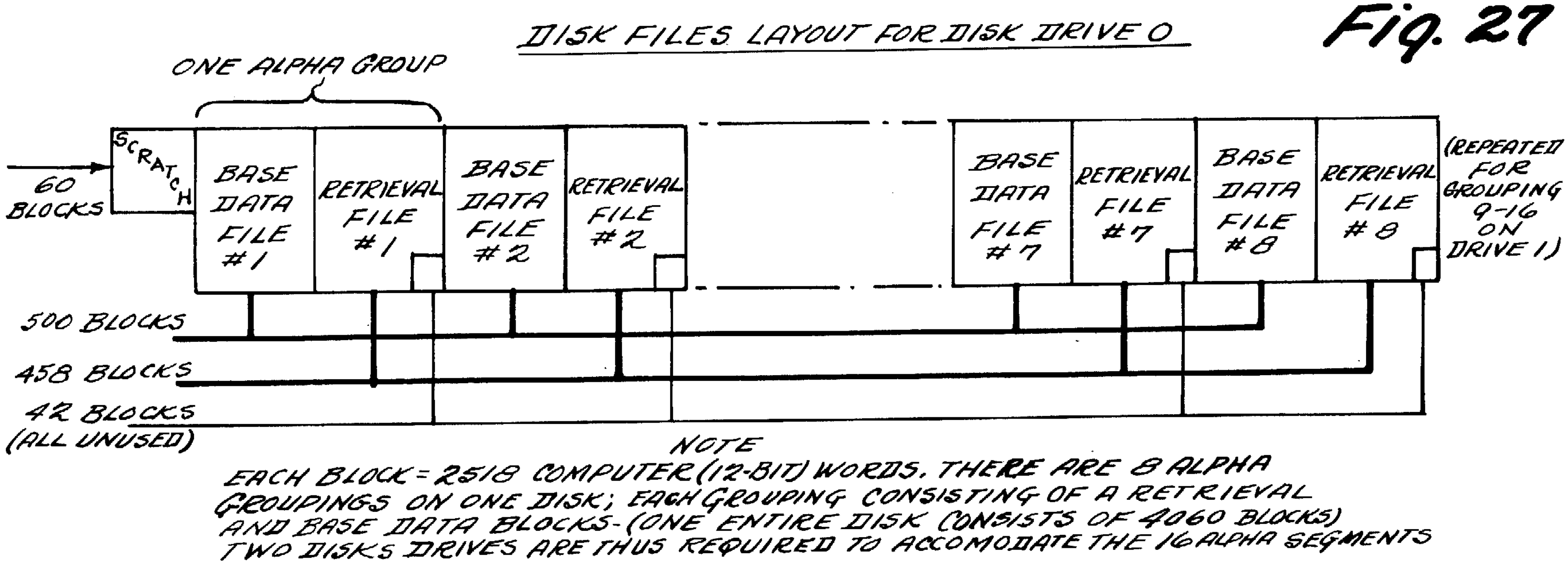

Fig. 27

NOTE

EACH BLOCK = 2518 COMPUTER (12-BIT) WORDS. THERE ARE 8 ALPHA GROUPINGS ON ONE DISK; EACH GROUPING CONSISTING OF A RETRIEVAL AND BASE DATA BLOCKS-(ONE ENTIRE DISK CONSISTS OF 4060 BLOCKS) TWO DISKS DRIVES ARE THUS REQUIRED TO ACCOMODATE THE 16 ALPHA SEGMENTS

| | DRIVE 0 SECTOR 0 | DRIVE 0 SECTOR 1 | DRIVE 1 SECTOR 0 | DRIVE 1 SECTOR 1 |
|---|---|---|---|---|
| BLOCK 60 | E-L | Z-I-P | D-Y-X | S |
| BLOCK 1060 | Mi-N | C | G | T-A |
| BLOCK 2060 | Br-W | U-J-K | H | O-SO |
| BLOCK 3060 | B-Q-Cr | V-R | F | M |

Fig. 28

*1 LIST CONTAINS THE STARTING WITH BIT 0 INDICATING IN WHICH HALF OF THE WORD THE FIELD STARTS.

*2 NOTE THE SPACES ARE DELETED BETWEEN WORDS EXCEPT FOR THOSE IN FIELD 1 AND THOSE BETWEEN FIELDS. ALL CHARACTERS EXCEPT THE FIRST CHARACTER OF A WORD ARE FORCED INTO LOWER CASE. "DTMP" IS THE DATA POINTER, BIT 0 INDICATING WHICH IS THE CURRENT HALF WORD BEING PROCESSED.

*1 INPUT POINTER "DTMP" HAS PASSED DATA BOUNDS WHEN EQUAL TO 7441.

STORIT SUBROUTINE
(SEE SOURCE PROGRAM STATEMENTS 1000-1155)

*1. CURSOR POSITION IS SET AT BEGINNING OF TELEPHONE #.
*2. GETTING CHARACTER FROM XGETCR.

OUTPUT SUBROUTINE
(SEE SOURCE PROGRAM STATEMENTS 1550-1567)

PUTWD SUBROUTINE
(SEE SOURCE PROGRAM STATEMENTS 1600-1607)

PUTCR SUBROUTINE
(SEE SOURCE PROGRAM STATEMENTS 1610-1646)

*1. "HALF" IS THE SWITCHING MNEMONIC.

*2. ONLY THE 1ST CHARACTER OF A WORD IS CAPITALIZED. "UPTRIG" IS USED TO DETERMINE WHETHER CHARACTER IS AT THE BEGINNING OF THE WORD.

GETCR SUBROUTINE
(SEE SOURCE PROGRAM STATEMENTS 2600-2627)

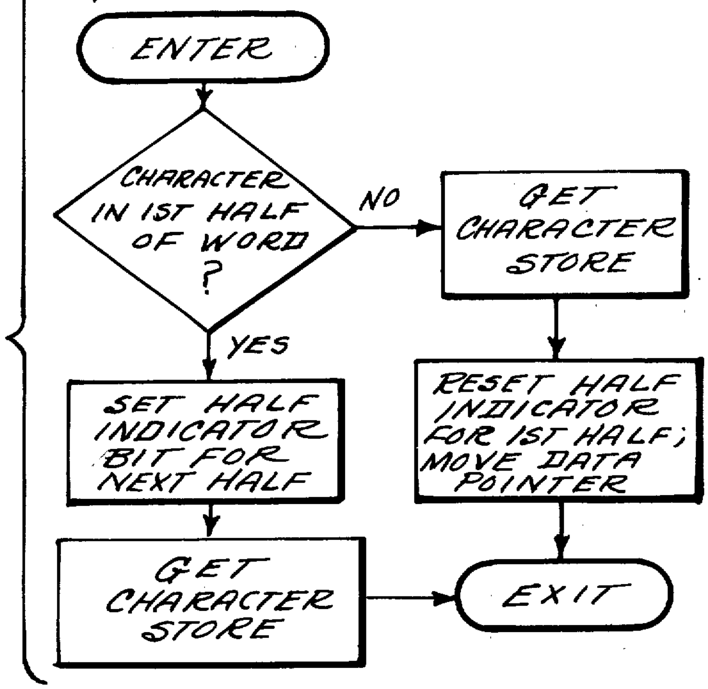

*1 BIT 0 "DTMP" IS THE DETERMINANT FOR SWITCHING HALVES, AND THE OTHER BITS ARE THE DATA POINTER.

Fig. 41

SETDSK SUBROUTINE
(SEE SOURCE PROGRAM STATEMENTS 1700-1715)

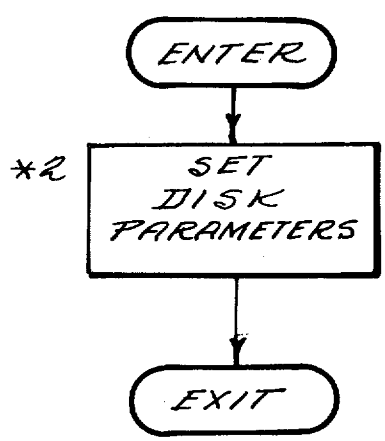

*2. DISK PARAMETERS CONTROLLER-0 DRIVE SPECIFIED MANUALLY BEFORE START OF PROGRAM

Fig. 42

CURSOR SUBROUTINE
(SEE SOURCE PROGRAM STATEMENTS 2200-2232)

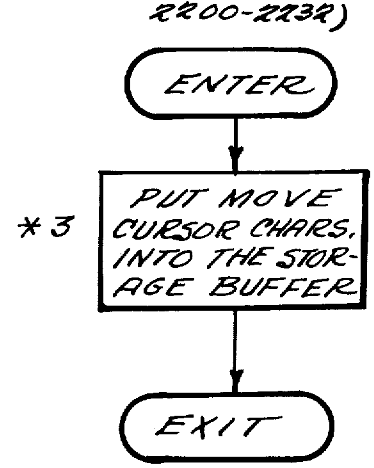

*3. IN THE ASCII RECORD. THE SEQUENCE OF CHARACTERS 0-43-0 44 FOLLOWED BY TWO NUMERALS IS A COMMAND TO MOVE THE CURSOR TO A FIXED HORIZONTAL POSITION WHEN DECODED BY THE RETRIEVAL PROGRAM

Fig. 43

PROGRAM #2

MXCHR SUBROUTINE
(SEE SOURCE PROGRAM STATEMENTS 0465-0546)

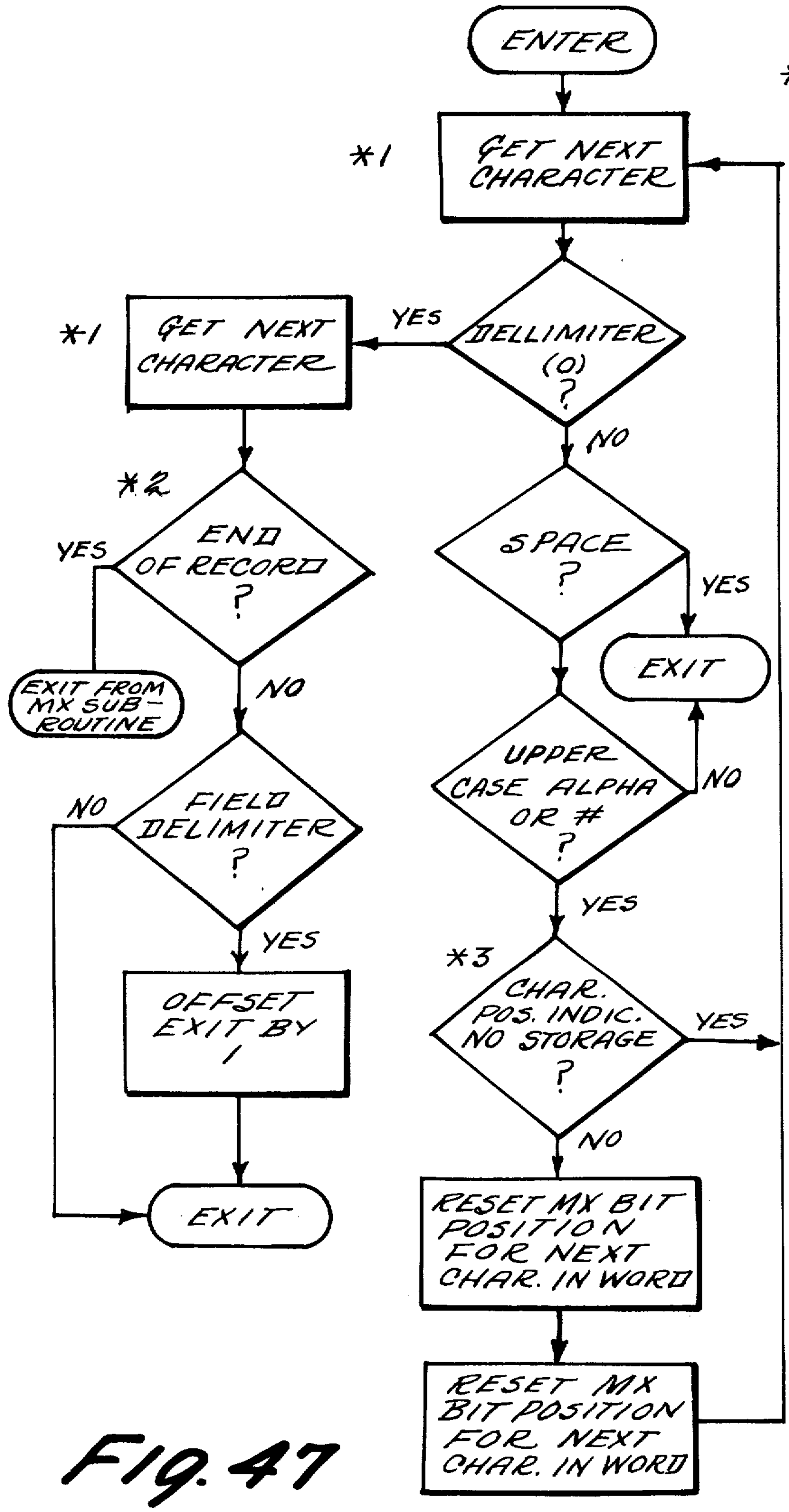

FIG. 47

*1 XGTCHR: "GLOC" IS DATA POINTER AND MUST BE PUT IN ACCUMULATOR UPON ENTRANCE TO XGTCHR SUBROUTINE. ALSO XGTCHR SUBROUTINE EXISTS WITH THE VALUE OF THE NEXT DATA POSITION IN THE ACCUMULATOR, WHICH IN TURN IS RESTORED TO "GLOC" CHARACTER ITSELF IS STORED IN MQ (MULTIPLIER QUOTIENT REGISTER

*2 END OF RECORD IS DETERMINED BY RECEIVING TWO CONSECUTIVE ZERO'S.

*3 FIELD 1 ALLOWS BIT STORAGE ONLY FOR 2ND THRU 7TH CHARACTERS OF A WORD; FIELD 2 FOR 1ST THRU 6TH; FIELD 3 FOR 1ST THRU 4TH.

*4 "MADD" IS THE VALUE OF THE START OF THE CURRENT FIELD. "PADD" IS THE VALUE OF THE START OF THE CURRENT CHAR. POSITION WITHIN THE FIELD. "MTMP" IS A POINTER TO THE VALUE OF THE CHARACTER AND THEN TO THE PROPER BIT.

BUF SUBROUTINE
(SEE SOURCE PROGRAM STATEMENTS 0224-0234)

READ SUBROUTINE
(SEE SOURCE PROGRAM STATEMENTS 0235-0245)

WEOF SUBROUTINE
(SEE SOURCE PROGRAM STATEMENTS 0246-0255)

WRTDSK SUBROUTINE
(SEE SOURCE PROGRAM STATEMENTS 1130-1160)

XDO SUBROUTINE
(SEE SOURCE PROGRAM STATEMENTS 0735-0770

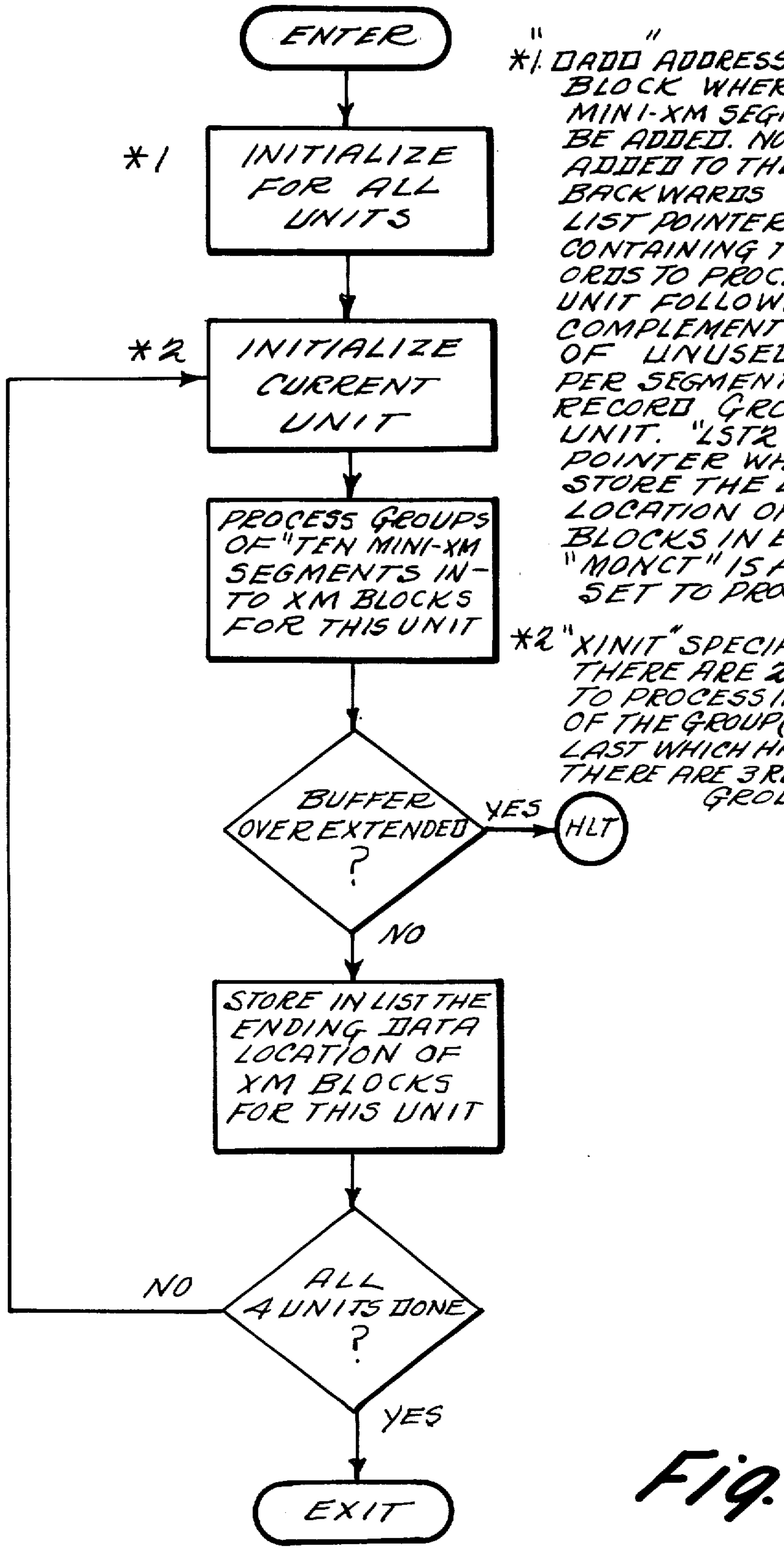

*1. "DADD" ADDRESS IN THE XM BLOCK WHERE THE "TEN MINI-XM SEGMENTS" WILL BE ADDED. NOTE THEY ARE ADDED TO THE XM BLOCK BACKWARDS "LST" IS THE LIST POINTER OF THE LIST CONTAINING THE # OF RECORDS TO PROCESS IN THE UNIT FOLLOWED BY THE COMPLEMENT OF THE # OF UNUSED MINI-XM'S PER SEGMENT IN THE LAST RECORD GROUP OF THE UNIT. "LST2" IS THE LIST POINTER WHICH WILL STORE THE ENDING DATA LOCATION OF THE XM BLOCKS IN EACH UNIT. "MONCT" IS A COUNTER SET TO PROCESS 4 UNITS

*2 "XINIT" SPECIFIES THAT THERE ARE 204 SEGMENTS TO PROCESS IN EACH RECORD OF THE GROUP (EXCEPT THE LAST WHICH HAS 50) & THAT THERE ARE 3 RECORDS PER GROUP

Fig. 58

PROC SUBROUTINE (CONTINUED)

DSK SUBROUTINE

ADDS 10 XM WORDS OF ONE OF THE "10 MINI-XM SEGMENTS" (TRANSFER TO CORE VIA MAGTAPE STORAGE) TO THE PROPER XM BLOCK ON THE LARGE DISK (DIVA-DD14)

FORMAT: JMS I XDSK
(BLOCK #
CONTROL RESUMES HERE (SEE SOURCE STATEMENTS 1400-1545)

PROGRAM #6
(CONTINUED ON FIG. 64, 66-68)

* SEE TABLE OF KEYBOARD UTILIZATION PROCEEDING PROGRAM LISTING

PROGRAM #6
(CONTINUED ON FIG. 64, 65, 67 & 68)

* STORE XM BLOCK PARAMETERS IF SEARCHING ALL ALPHA GROUPS (NO FINDING NAME)

PROGRAM #6
(CONTINUED ON FIG. 64-66 & 68

PROGRAM #6
(CONTINUED ON FIG. 64-67)

DOHIT SUBROUTINE
(SEE PROGRAM LISTING STATEMENTS (0660-0735)

*1 WITH CORE LOCATION OF HIT IN XMLOC AND CORRESPONDING BIT IN MQ REGISTER

*2 P÷5=B (QUOTIENT) + X (REMAINDER) + DISK HEAD (REMAINDER)

12X + BIT = RECORD (IN DISK BLOCK)

GET 2 SUBROUTINE
(SEE PROGRAM LISTING-STATEMENTS (1027-1046)

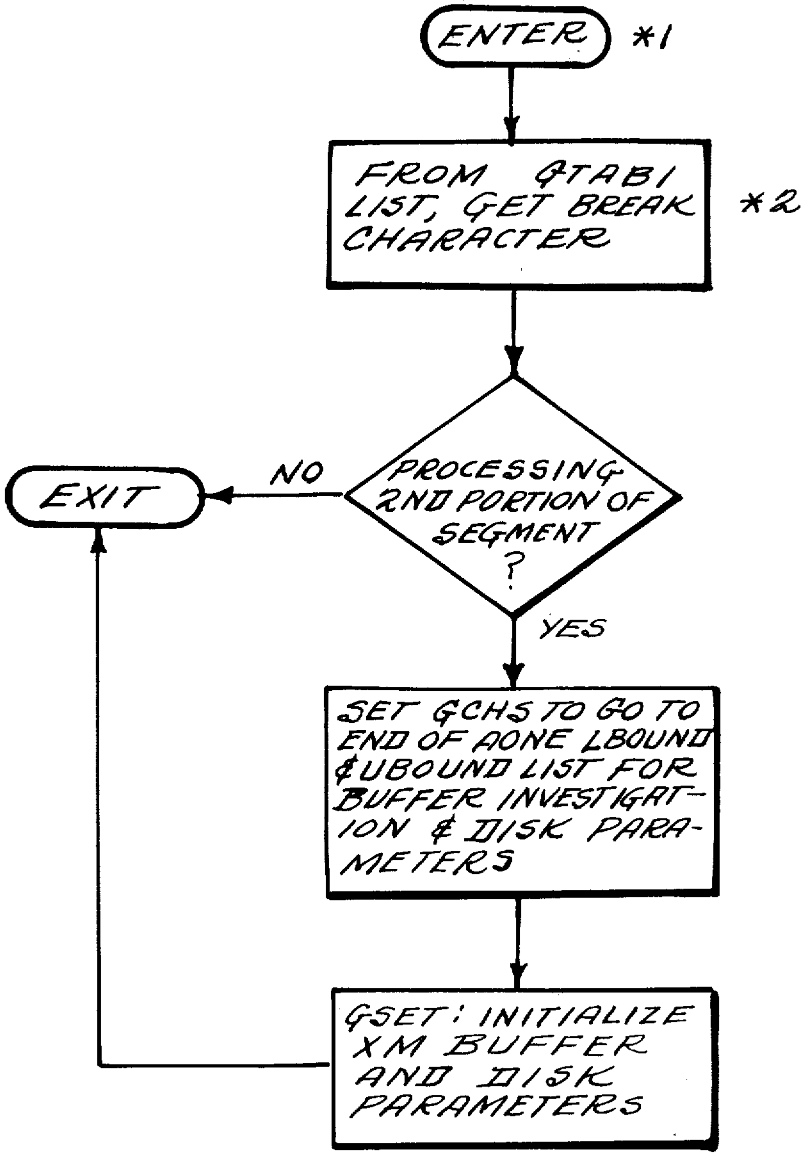

*1 ENTER WITH CURRENT CHARACTER. (2ND CHARACTER OF FINDING NAME WHEN 1ST CHARACTER INDICATED POSSIBLE SPLIT.

*2 GCT INDICATES WHAT THE 1ST CHARACTER OF THE FINDING WAS, AND GTAB1 LIST TELLS WHICH 2ND CHARACTER BREAKS THE ALPHA SEGMENTS

*3 IF PROCESSING THE 1ST PORTION OF ALPHA SEGMENTS, PARAMETERS & BUFFER WERE ALREADY SET THROUGH GET1.

Fig. 71

DOIT SUBROUTINE
(SEE PROGRAM LISTING STATEMENTS 1275-1313)

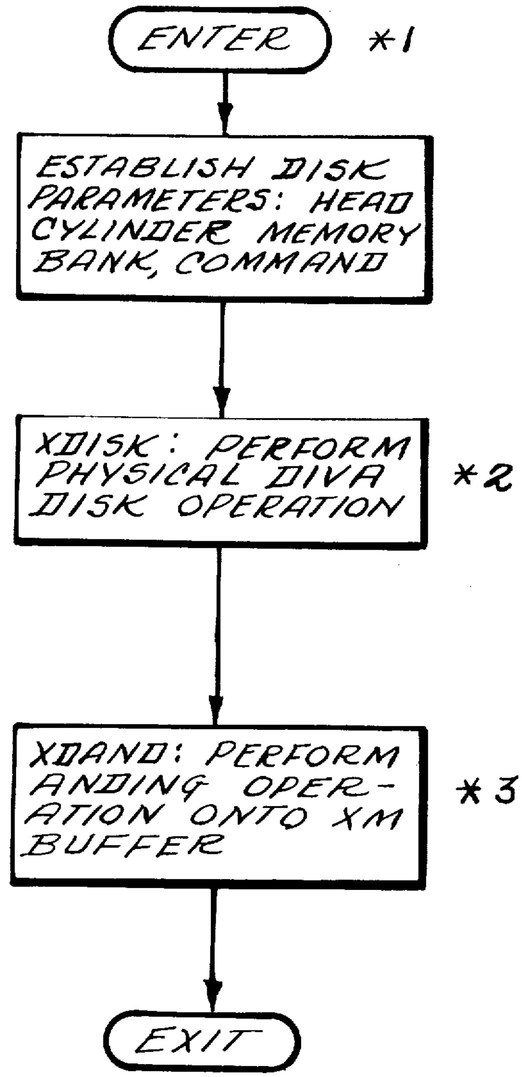

*1 FORMAT: ENTER WITH DISK CYLINDER NUMBER IN ACCUMULATOR.

| | |
|---|---|
| CALL LOCATION MINUS 2 | (DISK HEAD NUMBER) |
| CALL LOCATION | JMS I XDOIT<br>CONTROL RESUMES HERE |

*2 OPERATION: READ DISK BLOCK AT SPECIFIED CYLINDER AND HEAD INTO SPECIFIED MEMORY BANK (2)

*3 THE BLOCK READ INTO MEMORY BANK(2) IS ANDED WITH THE XM BUFFER LOCATED IN MEMORY BANK 1 AND THE RESULTANT IS LEFT IN THE XM BUFFER IN MEMORY BANK 1

Fig. 74

GETCHR SUBROUTINE
(SEE PROGRAM LISTING STATEMENTS 2037-2056)
Fig. 77
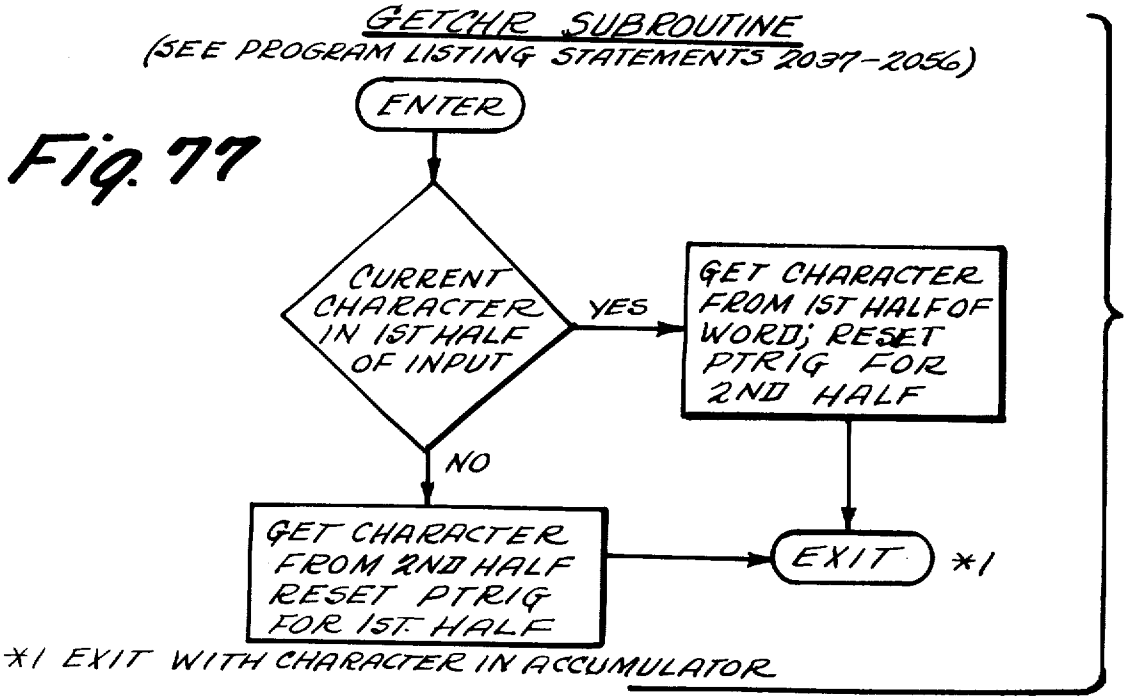
PTRANS SUBROUTINE
(SEE PROGRAM LISTING STATEMENTS 2057-2077)
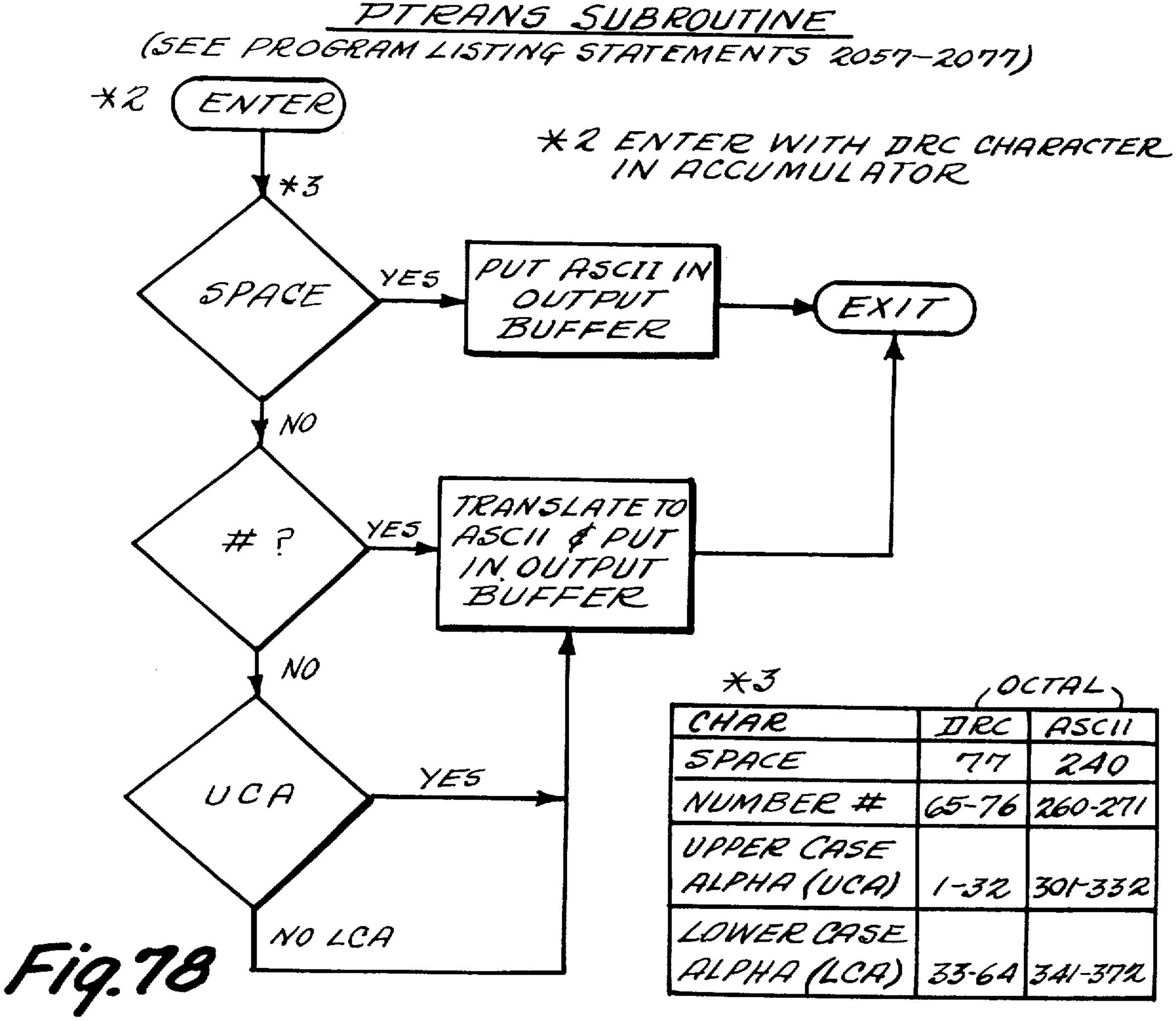
*2 ENTER WITH DRC CHARACTER IN ACCUMULATOR
*3
| CHAR | DRC (OCTAL) | ASCII (OCTAL) |
|---|---|---|
| SPACE | 77 | 240 |
| NUMBER # | 65-76 | 260-271 |
| UPPER CASE ALPHA (UCA) | 1-32 | 301-332 |
| LOWER CASE ALPHA (LCA) | 33-64 | 341-372 |
Fig. 78

SETBUF SUBROUTINE
(SEE PROGRAM LISTING STATEMENTS 2200-2233)

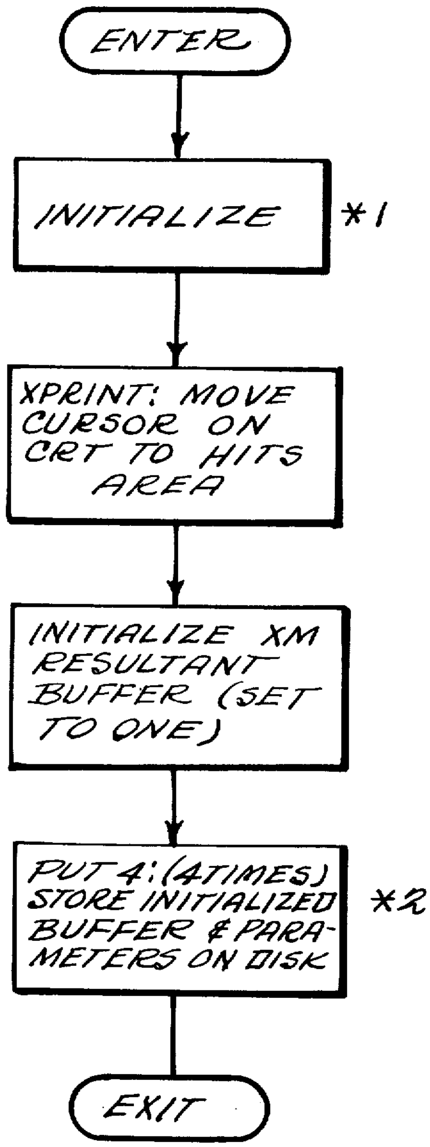

*1 THE DISK PARAMETERS WHICH WILL BE STORED ON THE DISK ALONG WITH XM RESULTANTS (WHEN SEARCHING ENTIRE FILE) ARE INITIALIZED: XMBIT, XMLOC, XMSTRT.

*2 ACTUALLY 16 OF THESE INITIALIZED BUFFERS & PARAMETERS ARE STORED ON DISK (ONE FOR EACH ALPHA GROUPING OR COMBINATIONS THEREOF). THESE ARE STORED ON THE SAME SECTOR & TRACK AS THE XM'S THEY REFER TO, BUT ARE PUT ON CYLINDER 0, HEADS 1-4.

Fig. 79

PUT4 SUBROUTINE
(SEE PROGRAM LISTING STATEMENTS 2234-2252)

Fig. 80

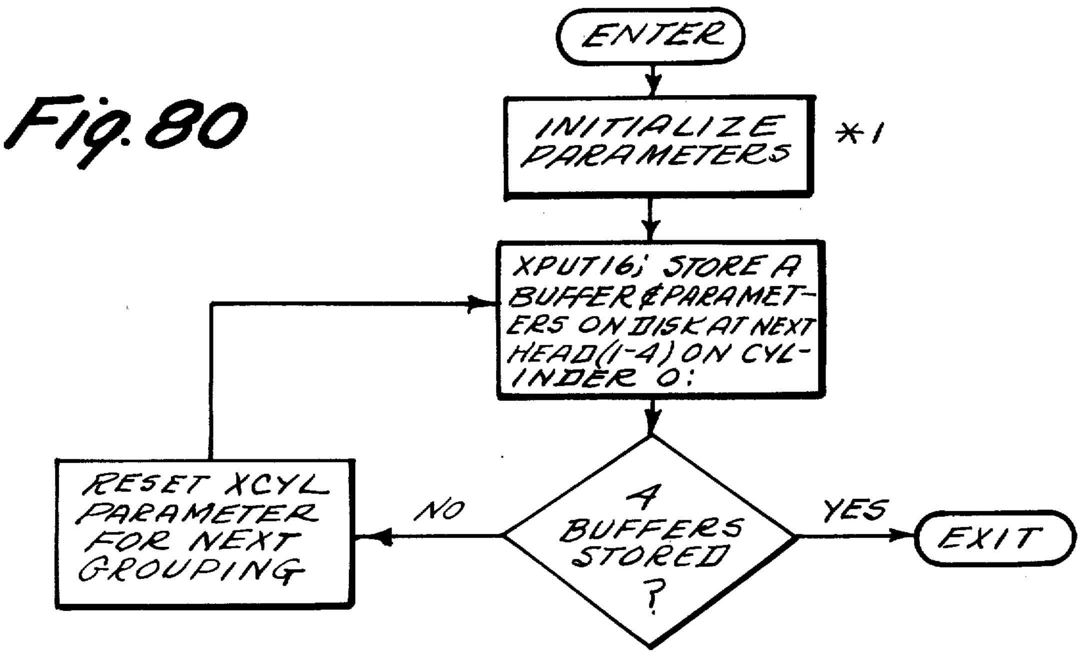

*1 "XCYL" IS ONE OF THE PARAMETERS THAT MUST BE STORED ALONG WITH ITS INITIALIZED RESULTANT & MUST BE SET TO INDICATE WHICH CYLINDER WILL START ITS XM GROUP. "IN4" SPECIFIES THE HEAD (1-4) FOR THIS CYLINDER 0 STORAGE

PUT16 SUBROUTINE
(SEE PROGRAM LISTING STATEMENTS 2314-2340)

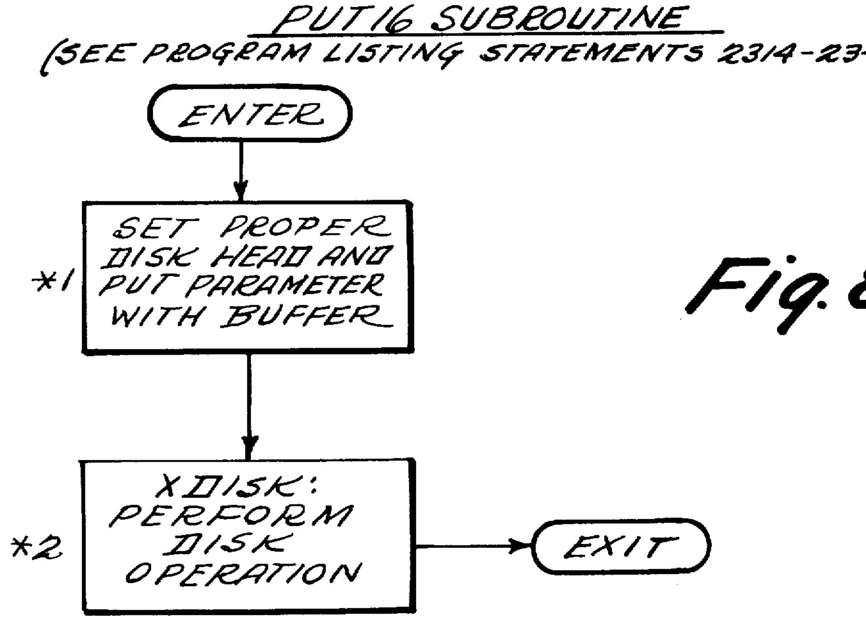

Fig. 81

*1 CALLING FORMAT JMS I XPUT16
(HEAD #)
CONTROL RESUMES HERE
NOTE THAT HEAD # IS OBTAINED IN CALLING SEQUENCE
*2 OPERATION: WRITE BUFFER (MB1) ON HEAD SPECIFIED IN "PHED" ON CYLINDER.

*1 NOTE THAT D04 PROCESSES 4 RESULTANTS, ALL LOCATED ON THE SAME DRIVE & SECTOR PREVIOUSLY SPECIFIED.

XGET16 SUBROUTINE
(SEE PROGRAM LISTING STATEMENTS 2341-2365)

*1 CALLING FORMAT: JMS I XGET16
(HEAD #)
CONTROL RESUMES HERE

*2 OPERATION: READ BUFFER (MB1) ON HEAD SPECIFIED IN GHED ON CYLINDER Ø.

PDP 8 PROGRAMS FOR SEMI-AUTOMATED SYSTEM

METHOD AND APPARATUS FOR INFORMATION STORAGE AND RETRIEVAL

This invention generally relates to the art of information storage and retrieval with special emphasis on the retrieval aspects of an overall information storage and retrieval system.

The problem and art of retrieving or selecting particular desired records from a set of stored records is an old one and must date back to early times when information bearing records began to be accumulated and stored in sets.

Perhaps one of the oldest and better known techniques is to organize the record set itself in some predetermined manner related to the expected retrieval process so that the record set can itself be manipulated to locate desired records. One simple example of such a system would be the segregation of documents in a typical household filing system so that records relating to current bills are in one file folder, those relating to this year's tax records are in another file folder, etc. In such a system, one may access or retrieve particular documents or records by first sorting through all of the possible catagories of segregated documents and selecting those which would probably be most closely related to the particular document desired and then physically manipulating each record in those particular segments of the overall collection of records until the particular desired document is discovered.

In this technique, retrieval accuracy is something less than 100% (unless every record of the entire set is always searched) and retrieval precision is obviously a matter of chance.

Another variation in prior known storage and retrieval systems involving hierarchical organizations of the information bearing records would be the alphabetical organization of topics such as are found in the usual encyclopedia. Here, one must first identify a "key word" relating to the topic of interest and then access the key word organized data file with his knowledge of the alphabet to locate that particular section of the file relating to that particular key word. Depending upon the complexity and extent of information that is to be retrieved in this manner, one or more such manipulations of the information bearing records may suffice.

However, as the complexity of the information stored on each individual record increases and as the number of records increase and as the complexity of the desired accessibility of such records increases, retrieval methods requiring direct manipulations of the information bearing records become cumbersome, time-consuming and counterproductive. For instance, one may often want to retrieve particular records from the data file having some common characteristics that were never before considered to be particularly relevant or important and which were not specifically taken into account when the records were first organized and stored. Thus, there is a need for a more generalized method of retrieval that does not involve the the necessity of manipulating the entire base data file each time one wants to search that data file for particular records having desired predetermined characteristics that might never have before been considered important.

To help meet such needs in the past, many different approaches have been attempted and some have worked with various degrees of success for particular applications. For instance, we are all familiar with the device commonly known as an index whereby the subject matter or information contained in a set of records is carefully classified according to a predetermined set of topics. The topics included in the index may of course be quite detailed and, in fact, there is a whole science of taxonomy which can be called upon to help in organizing the hierarchical structure of such an indexing arrangement. However, in practical effect, the index is just a more sophisticated form of the earlier discussed more primitive system whereby the records themselves are physically segregated into sections related to particular topics. Of course, with an index system, the set of records is itself separate and apart from the index and is organized in some predetermined manner such as by sequential numbers, etc. To use such a system of information storage and retrieval, one must take his special and perhaps unique desire for information and attempt to fit it within the predetermined taxonomic organization of the preexisting index and attempt to locate those index topics most closely related thereto. A cross-reference may then be had to the particular page numbers or sequence numbers, etc., of the source documents themselves for access. Of course, since the source documents themselves are not actually included within the index, it is possible to have reference at more than one place in the index to the same source document or documents. However, unless some anticipated and thus already indexed retrieval inquiry is involved, such index systems have obvious limitations.

Besides the simple indexes which are in daily use by the general public, there are, of course, much more sophisticated versions of such indexes used in computerized search and retrieval systems. However, all such known indexing systems are an inherent compromise between the optimum and the practical since the taxonomic organization of the index is necessarily fixed with respect to a whole population of information bearing records and thus not uniquely tailored to any one of them nor is the taxonomic organization of such an index uniquely related to the unknown future requirements of those who will use the index. At best, it is a compromise hopefully representing a usable practical interface between the user and the actual base data file of information bearing records.

Another known attempt to interface a large set of information bearing records with the ultimate user involves the so-called abstracting and/or key word systems wherein abstracts of each information bearing record and/or selected key words from the text of such information bearing records are organized in a smaller abstract or key word file which can be more quickly searched than the entire voluminous file of information bearing records. Often, the actual file of information bearing records are not in machine readable form but are located in an archive someplace. Often, the abstract file or file of key words, etc., together with appropriate pointers to the actual location of corresponding information bearing records in the archive is in machine readable form. Thus, the abstract or key word file may be machine accessed so that the user has to merely supply special key words, etc., whereupon a computer search of the smaller abstract or key word file is initiated in the hope of locating particular corresponding records in the archive having those key words therein.

As can be appreciated, this technique actually involves physical manipulation of the abstract or key word file and thus if this file reaches significant proportions, the search itself may take a significant time and become cumbersome, etc., subject to the same infirmities as the most primitive system wherein all of the information bearing records are themselves manipulated in order to search for and retrieve particular desired ones of those records. Furthermore, these systems are subject to additional infirmities in that the user of the system may not always associate the same key words with a particular information bearing record as did the particular person who wrote the abstract or abstracted the key words from the original text of the document in question. As will be appreciated, the abstract or key words associated with a particular document would no doubt be selected to represent what was then thought to be the significant aspects of that particular document. However, as is often the case, some subsequent user may be searching for that same particular document for a quite different reason which would appear completely secondary and perhaps even unimportant in the context of earlier thought as to what was significant about that particular document.

Many manual, semi-automatic and even automatic systems have been devised to aid in the art of information storage and retrieval in the past. For instance, U.S. Pat. No. 3,354,467 issued in 1967 to Beekley shows a machine for automatically comparing superimposed binary coded tapes wherein each tape represents some particular predetermined characteristic potentially associated with particular documents or information bearing records in an archive file. A selected set of such tapes representing a desired set of such predetermined characteristics is selected and they are simultaneously fed through a photoelectric scanning station such that only those documents having all of the desired predetermined characteristics are identified as to location within the archive file. A somewhat similar semi-automatic or even manual indexing system was involved in the system earlier offered by McBee Systems wherein an abstract card or the like was coded with notches around the periphery of the card and then selected by "pinning" those cards having holes instead of notches at some particular location around the periphery of the card.

However, it will be noted that none of these prior systems have utilized the basic language structure of the information contained on the set of information bearing records to construct a retrieval file which is uniquely custom fitted to each and every one of the documents or records in the base data file and which can therefore be utilized by a user in a manner which is uniquely and custom fitted to his peculiar information retrieval requirements without regard to whether or not those information retrieval requirements necessarily fit within the taxonomic organization of some preexisting index system. It is an object of this invention to provide such a unique and custom fitted retrieval file capability.

That is, the retrieval file of this invention is structured so as to optimally interface between a base data file and a user of that file. It takes into account the individualized language structure for the information content of each record in the base data file. The basic coding or generation of the retrieval file for this invention does not require the classification of the information content as being of this particular type or as of that particular type, although such traditional taxonomic classification may be conveniently incorporated within the retrieval file of this invention if desired.

Rather, in the exemplary embodiments to be described in more detail below, the basic retrieval file is coded so as to take into account the language structure of the information content of the records. For instance, the alphabetic value of informational characters in each record and the relative sequential location of such character values in associated groups of characters such as words in those records are utilized in one preferred exemplary embodiment. Thus, although the resulting retrieval file is irreversible (except in the most simple cases) it is still uniquely representative of the language structure used in the entire informational content of the corresponding information bearing record. If one wants to think of the system of this invention in terms of "key words", then every word in every record would constitute a "key word" in that the language structure of all such words would be coded in the retrieval file. Thus, the user is not restricted to some other persons prior choice of "key words".

Of course, if desired, one may combine the retrieval file and/or other teachings of this invention with earlier types of systems to provide a modified and greatly improved version of such earlier systems. For instance, a very large abstract or key word file itself may be utilized for generating a retrieval file according to this invention rather than using the full text of the information bearing records. In such a case, the retrieval file will reflect, of course, only the full information content of the abstract file and/or key word file from which it was coded. However, it will now be considerably more simple to search the retrieval file of this invention than to perform a sequential search of a more lengthy abstract or key word file, etc., thus making the marriage of the two systems a profitable one for certain applications.

In general, the retrieval file of this invention comprises a plurality of arrays of binary coded elements. Each such array is organized to include a binary coded element respectively corresponding to the address or location of each record in the base data file. In addition, each array in the retrieval file is assigned to correspond to a predetermined identifiable characteristic of language structure potentially present in or associated with such records. In one of the exemplary embodiments, those predetermined identifiable characteristics are themselves specially chosen to represent the alphabetic value and relative sequential location of informational characters in the text of the information bearing records in the base data file for associated groups of characters such as words, etc.

Each binary coded element in any given array is assigned a predetermined binary value to represent the presence or absence of the predetermined identifiable characteristic represented by the given array in the particular record represented by each element. In this manner, the arrays of binary coded elements comprising the retrieval file represent an irreversible data compression of whatever information from the records that has been used to generate the retrieval file. In the preferred embodiments, the full text of each record is utilized for such coding purposes so that the retrieval file itself represents an irreversible data compression of the entire full text of each record in the base data file. On the other hand, if only an abstract or key word set from the information bearing records is utilized for coding a retrieval file according to this invention, then the retrieval file will likewise represent an irreversible data compression of this more limited amount of information from such records.

Once the retrieval file has itself been generated directly from the information bearing records or from extracts thereof, etc., the retrieval file may be utilized by identifying those predetermined identifiable characteristics (i.e. the particular arrays of the retrieval file) associated with desired search or retrieval inquiry data (i.e. any particular word or groups of words, etc., thought to be in the text of the sought after record or its extract, etc.). Those particular arrays are then selected and the binary values of respectively corresponding elements in the selected arrays are compared to identify which records (actually the location or addresses of such records) in the base data file have all the desired predetermined identifiable characteristics.

To help in understanding the basic functioning of the invention, it is helpful to reexamine some of the basic characteristics of language structures. Using the English language as an example, it is readily apparent that almost all written information involves considerable redundant usage of a very limited number of alphabetic character values. Of course, besides character values per se, there are other important features of our written language such as the relative sequence of character values, upper and lower case differentiation of the alphabetic character values, punctuation, bold face type, italicized type, the size of printed type, etc. There are also word length differences (i.e. groups of characters associated together in different numbers).

On the typical page of a printed book there may be something on the order of 3,000 characters so that if each of the 26 alphabetic characters of our alphabet are equally used on such a page, there would be about 115 redundancies with respect to each alphabetic character if one were to look only at the alphabetic value of characters. Thus, it is clear that the real information conveying content in any document or record utilizing such a written language is critically dependent upon other language structures such as word length, character sequences, type case, hyphenation, etc.

Thus, this invention is directed to an information and storage and retrieval system wherein the retrieval file is custom fitted or keyed to the language structure of the information contained in each record of the data base fle. At the same time, the retrieval file of this invention inherently masks language structure redundancies and does not necessarily reference all the information contained in such a document. In short, the exemplary embodiment of the retrieval file is organized so as to conveniently represent at least some of the alphabetic values of informational characters and their relative sequential location in associated groups of characters such as words contained in the records of the base data file. There are many possible ways to take the alphabetic values and sequential location of such values into account. However, in the exemplary embodiment of this invention, the redundance of character value occurrences within words of various lengths has been utilized to greatly compress the storage of such character values and sequential location data in the retrieval file.

That is, for each letter of the alphabet, there is a specific position of occurrence for each possible character value for each possible word length. Thus, the letter "A" can be a single letter of a single letter word; it can be the first letter of a two-character word or the second letter of a two-character word; it can be the first letter of a three-character word, etc. Thus, a binary coded matrix of character value versus character position within words having particular numbers of characters can be formed and this process can be repeated for any word length. However, it has been found that it is not necessary to include such coding in the retrieval file for all word lengths.

In fact, depending upon the particular application involved, it may often be advantageous to simply make the matrix representative of character value versus character position within a word regardless of the word length. In effect, this would amount to the superposition of and hence further compression of data from the first discussed organization of the matrix. From a practical standpoint, even if the first mentioned more detailed matrix organization is used, it is usually only desirable to include data in the matrix with respect to character values up to 6 or 7 letter words. In other words, it is only necessary in the usual cases to keep track of character values and/or character value sequences for the first few characters of each word to produce an acceptable and usable information retrieval capability based on the language structure of information in the base data file of records.

As an example of the information compression involved in such a system, it should be recognized that an entire set of such predetermined language structure characteristics up to the maximum word length of seven characters would involve only 728 binary bits (28 bits per character for relative position information times 26 possible character values) so that for information retrieval purposes, the entire information content of an information bearing record would, in this simple example, be compressed to 728 binary bits of information. Of course, redundancies in character values and sequential locations would be irreversibly lost in the coding process but, as will be seen in the more detailed description given below, this loss of redundancy will not seriously affect most usages of the retrieval file and whatever loss of precision that is caused by such an organization of the retrieval file can be compensated for by other techniques.

Another possible example of coding representations of the alphabetic value of informational characters and their relative sequential locations within words would be to note the occurrence of alphabetic values as even or odd sequential positions within even or odd length words. For instance, the occurrence of the letter "A" at an even position within an odd word length; as an even position within an even word length; as an odd position within an odd word length; and/or as an odd position within an even word length, etc.

As will become more apparent, there are trade offs to be made in deciding how to structure the retrieval file of this invention. For instance, if more detailed and complete language structure information is maintained with respect to character value and/or sequential location within words, then more precision can be obtained in accessing the base data file. On the other hand, more arrays are needed in the retrieval file to maintain such detailed information.

As an example of some of the types of possible limitations of the exemplary embodiment of this invention with respect to the precision of retrieval, consider the following example. Assume that one of the documents in the base data file includes the word "BROWN" and the word "BLACK". Since these words are both five-character words in length, the initial B character value for each word represents a redundancy in information and this would be represented by a single binary bit in the retrieval file showing only that there was at least one word in this document having five characters total length and a first character of value "B". The remaining characters of each word would of course also be binary coded to represent their value and position sequence within these two five-character words. Thus, when the retrieval file is used for retrieval purposes, it would be absolutely 100 percent accurate in that these particular documents would always be indicated as including the word "BROWN" or the word "BLACK" respectively. However, the precision of retrieval is not necessarily 100 percent since there are at least the following three search words which would also result in the selection of that document: "BLOWN", "BRACK", and "BRAWN". That this is so can be seen since all are five letter words and include an initial letter character value of B. Furthermore, the word "BLOWN" is a five-character word having a second character value of L (this characteristic would have been coded because the word "BLACK" was coded from the original document); a third character value of "O" (this value would have also been coded because the word "BROWN" was found in the original document); a fourth character value of "W" (also resulting from the word "BROWN") and a fifth character value of "N" (also resulting from the word "BROWN".

Thus, so far as the user of the system is concerned, one would obtain responses from inquiries related to any of the five words BROWN, BLACK, BLOWN, BRACK or BRAWN although only the words BROWN and BLACK are actually found in the original documents. Accordingly, although the retrieval would be absolutely accurate (that is the required document would always be accessed whenever the words "BROWN" or "BLACK" were used for inquiry) it would not be 100 percent precise in that either or both documents might also be erroneously withdrawn in response to three other spurious inquiry words.

The degree of precision is, of course, a function of the particular algorithm used to chose the language structure characteristics such as alphabetic value and relative sequential location representations in the retrieval file. For instance, the further data compression achieved by taking into account only the odd-even word lengths and odd-even character positions and values therein would further compound such a "mis-hit" problem. On the other hand, other techniques such as the inclusion of upper and lower case as uniquely identifiable character values would increase the precision and restrict the number of improper possible combinations.

In short, although the retrieval technique of this invention is 100 percent accurate, its precision may possibly be less than that unless care is taken in choosing the language structure characteristics used in the retrieval file because some specific character sequence data contained in the original text is lost (in one exemplary embodiment) in the conversion to the retrieval file. This is, of course, necessary in order to reduce the amount of information in the retrieval file from that actually on the original documents. If all of the character value and sequence information were to be retained in the retrieval file, then the file would be reversible and would, in actuality, contain all of the information in the original document. However, since the retrieval file is itself used only to look up and find the location of the actual document in question, it is not desirable to include the entire detailed informational content of the original documents in the retrieval file as should be apparent. Thus, in many cases, it will be necessary to tolerate some small controllable amount of precision less than 100 percent. In fact, in some cases, a lack of precision is desirable. For instance, when the user is not too sure exactly what is to be retrieved (a telephone directory assistance operator without full name or other information), a lack of precision retrieval may actually assist in quickly accessing the actual desired record.

In the exemplary embodiment to be described, each word of data or block of text in a record of the base data file is handled in a uniform manner. All hypens are considered as spaces, all apostrophes are considered as spaces, all other punctuation is ignored. Any capitalized word will be considered containing all capitalized letters and all words starting with lower case letters will be considered lower case throughout. Words containing both numerals and letters will have their word length determined by the total number of numerals and alphabetic characters. However, the position of each digit and alphabetic character will be assigned at their nominal positions within such an overall word.

The information storage and retrieval technique of this invention may be conveniently practiced manually, semiautomatically, automatically with special purpose equipment, automatically with specially programmed and conditioned general purpose equipment, etc., as will be described in more detail below.

A more complete understanding and appreciation of this invention may be obtained by reading the following detailed description in conjunction with the accompanying drawings, of which:

FIG. 5 is a schematic diagram of an exemplary embodiment of apparatus for practicing an embodiment of this invention;

FIG. 6 is a schematic diagram of another apparatus for practicing an exemplary embodiment of this invention;

FIGS. 10–17 are block diagrams of subroutines entered from Program No. 1 shown in FIGS. 8–9;

FIGS. 19–24 are block diagrams of subroutines entered from Program No. 2 shown in FIGS. 8 and 18;

FIGS. 27-28 show the magnetic disk files organization for the exemplary embodiment of FIGS. 7 et. seq.;

Figure 7:
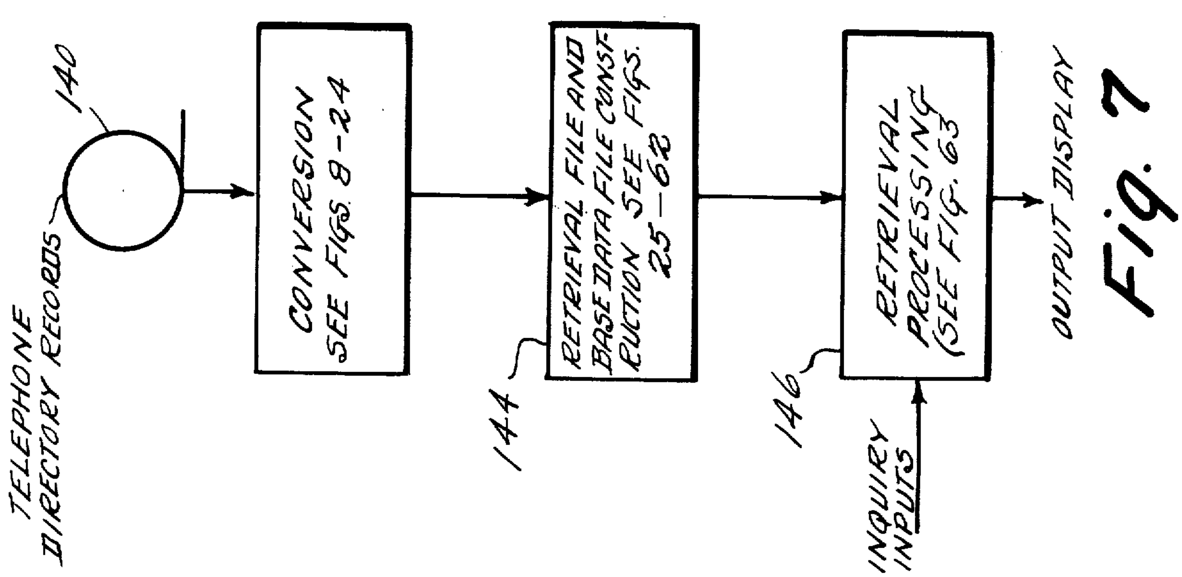
FIG. 7 is a block diagram of the conversion, file construction and retrieval processing for data in an exemplary embodiment of this invention.
Figure 25:
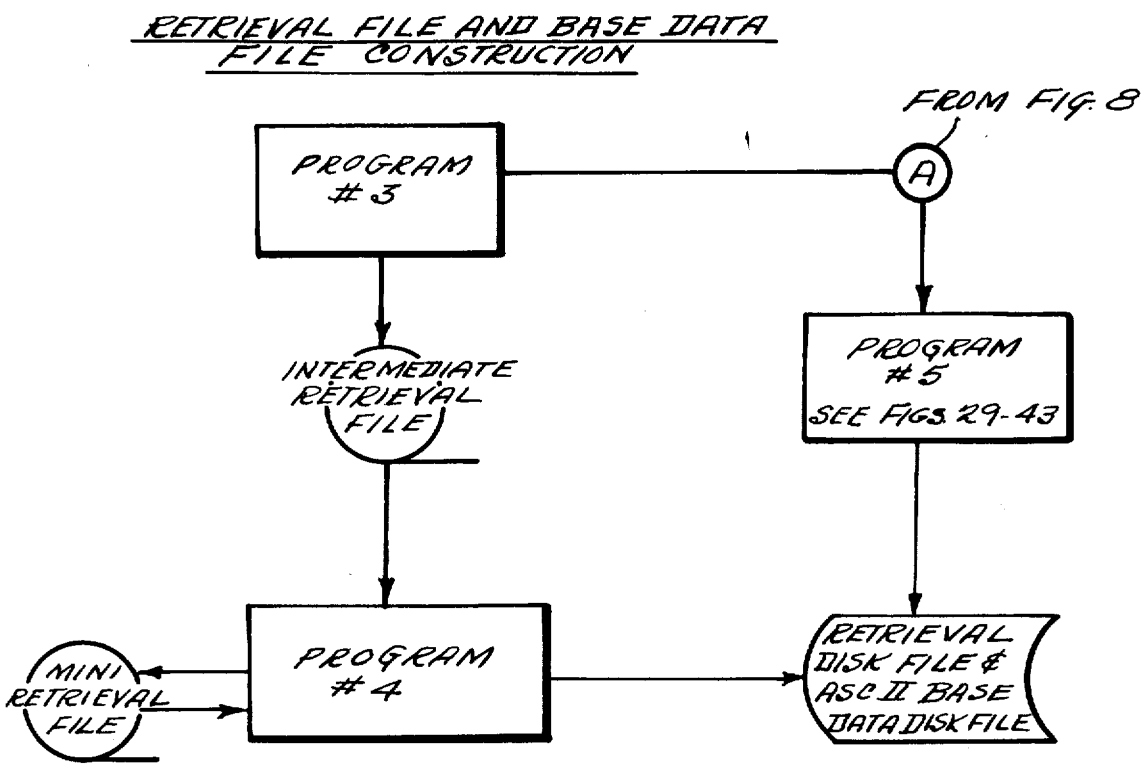
FIG. 25 is a more detailed block diagram of the file construction block shown in FIG. 7.
Figure 44:
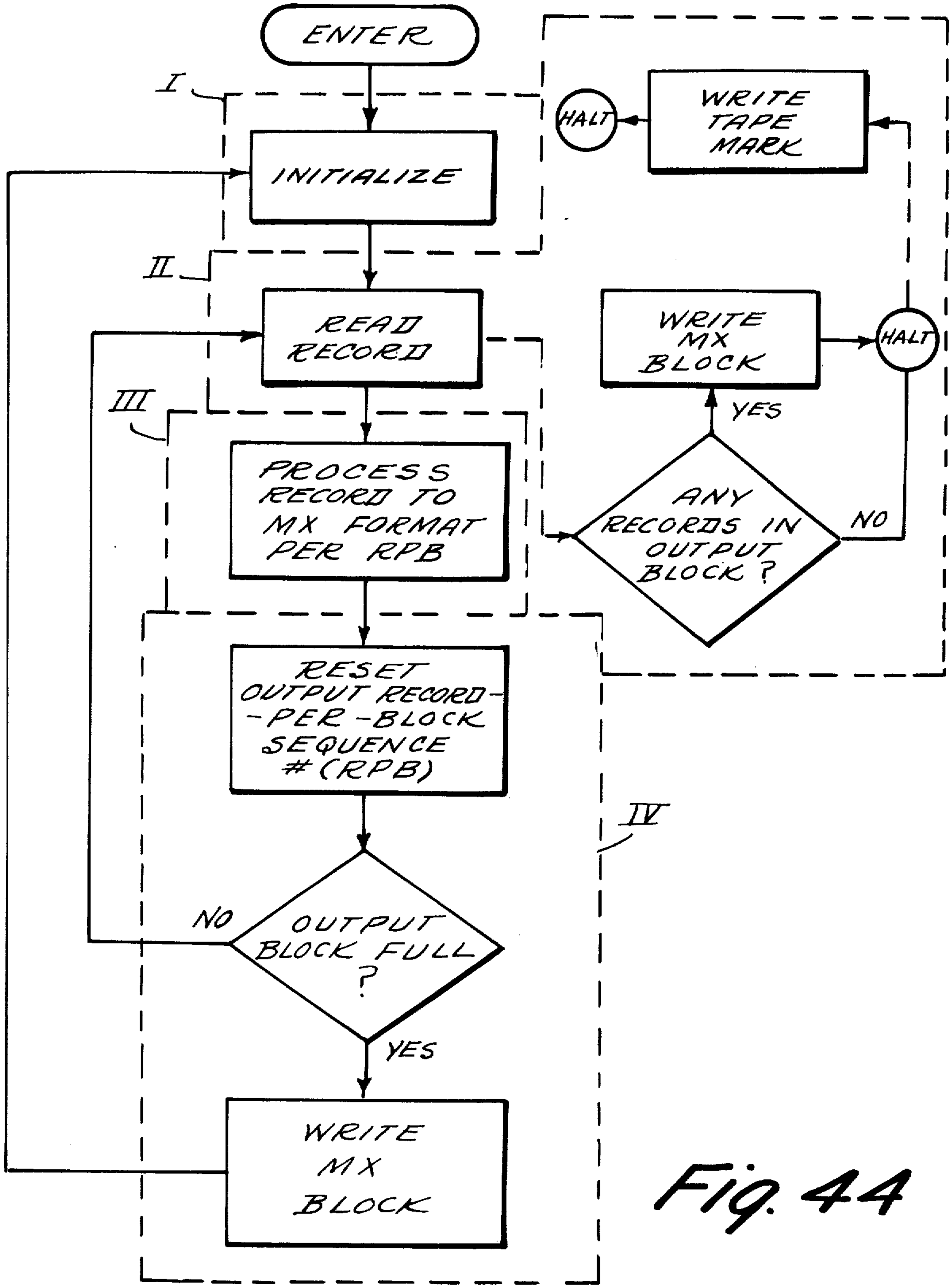
Figure 45:
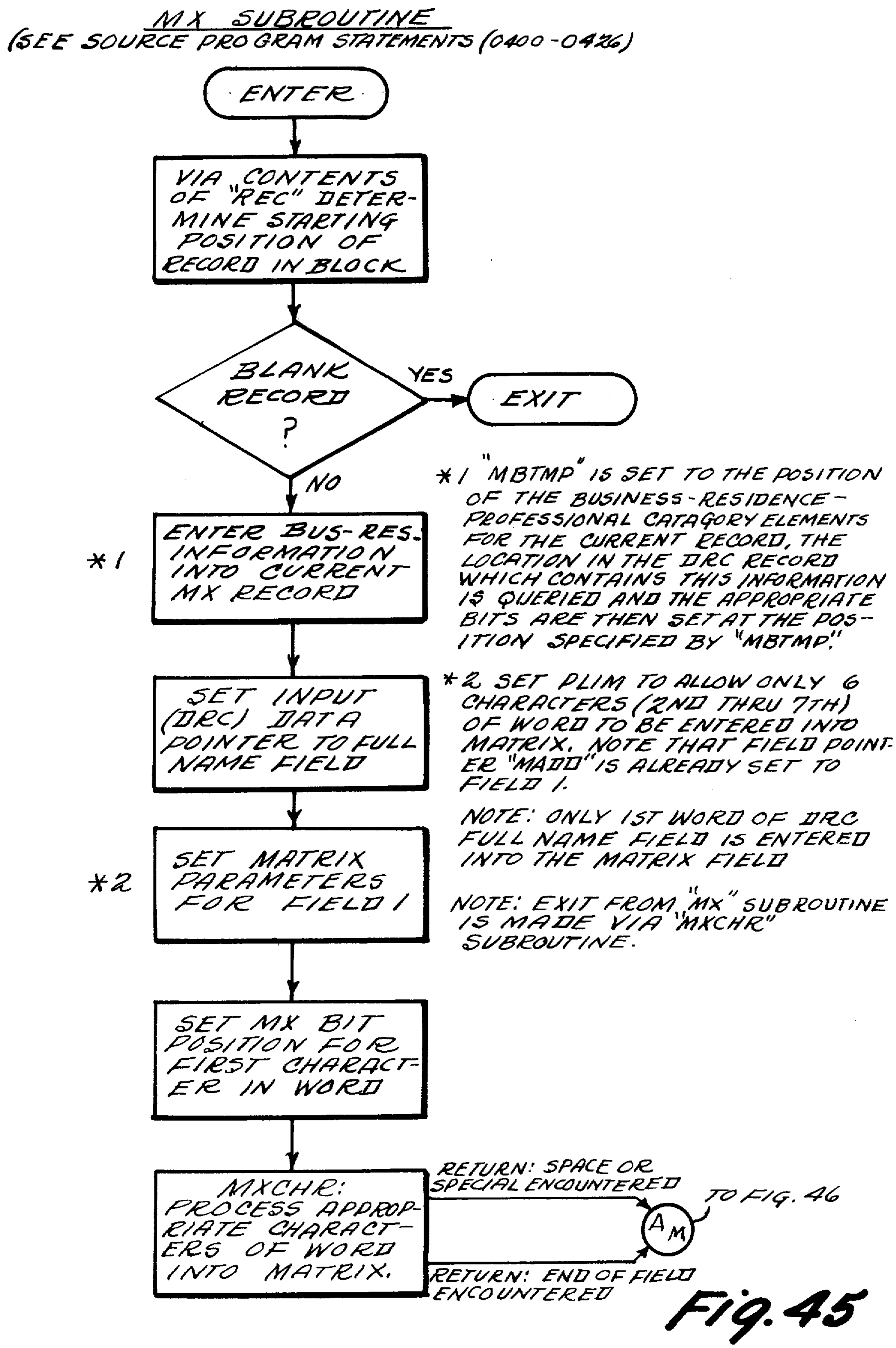
Figure 46:
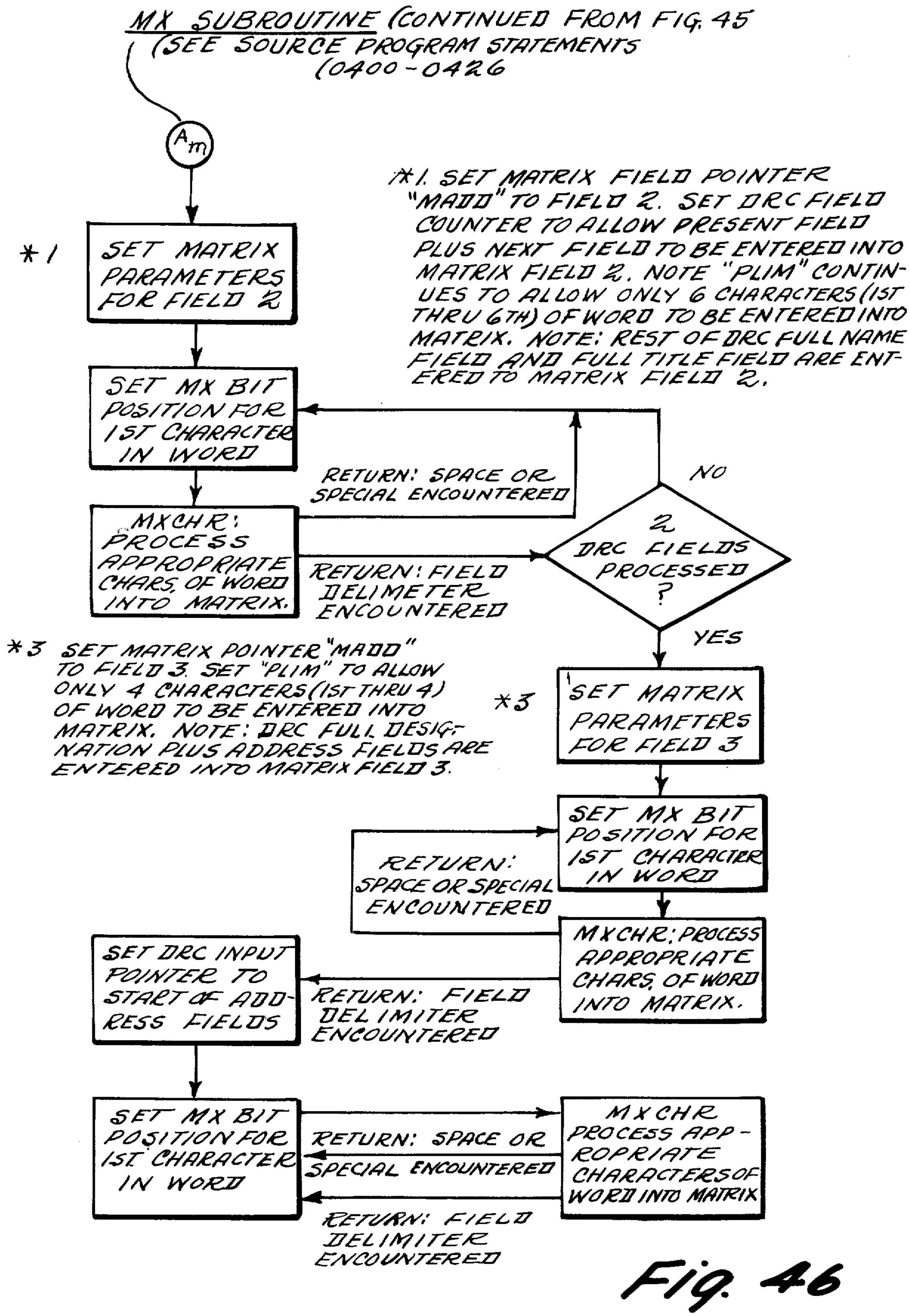
Figure 48:
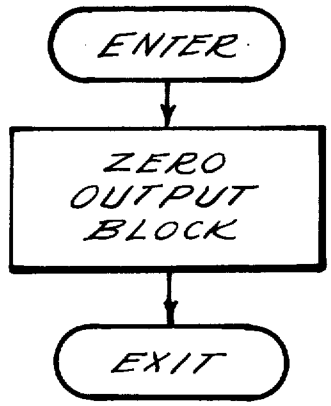
Figure 49:
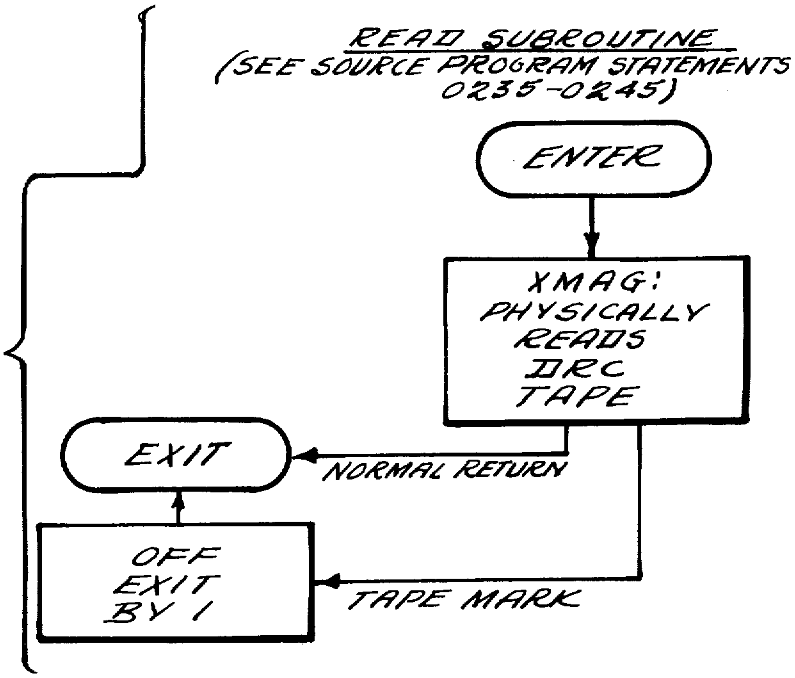
Figure 50:
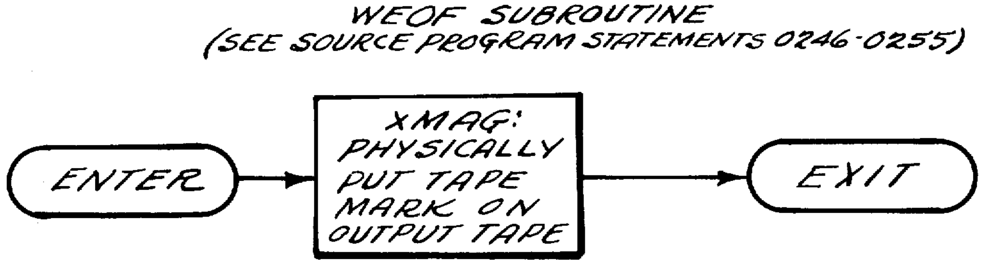
Figure 51:
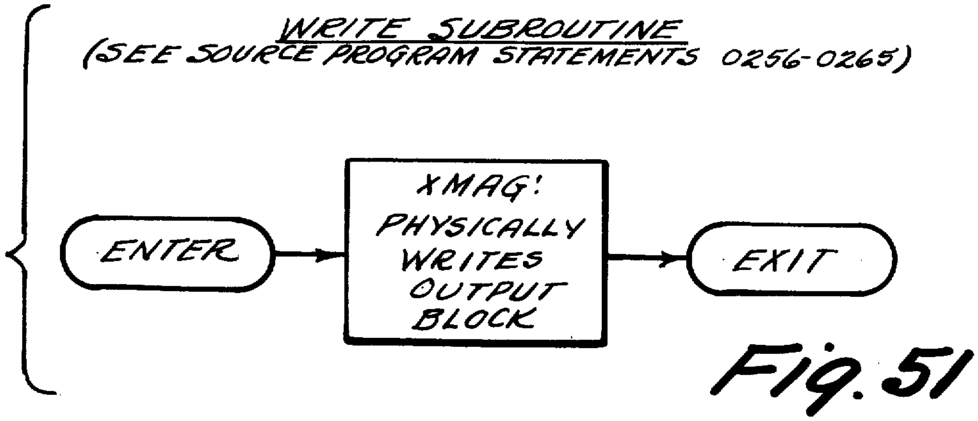
Figure 52:
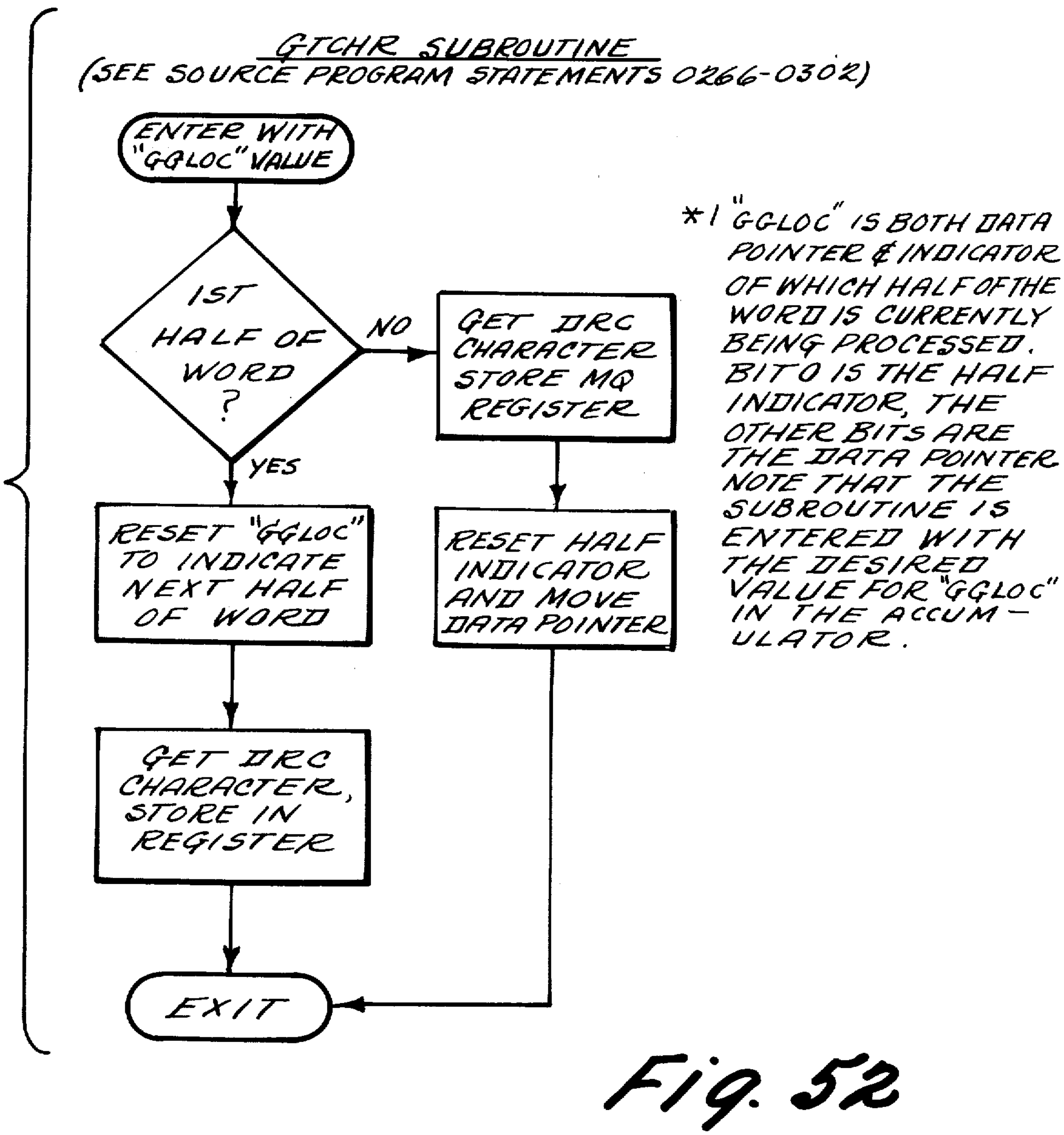
Figure 53:
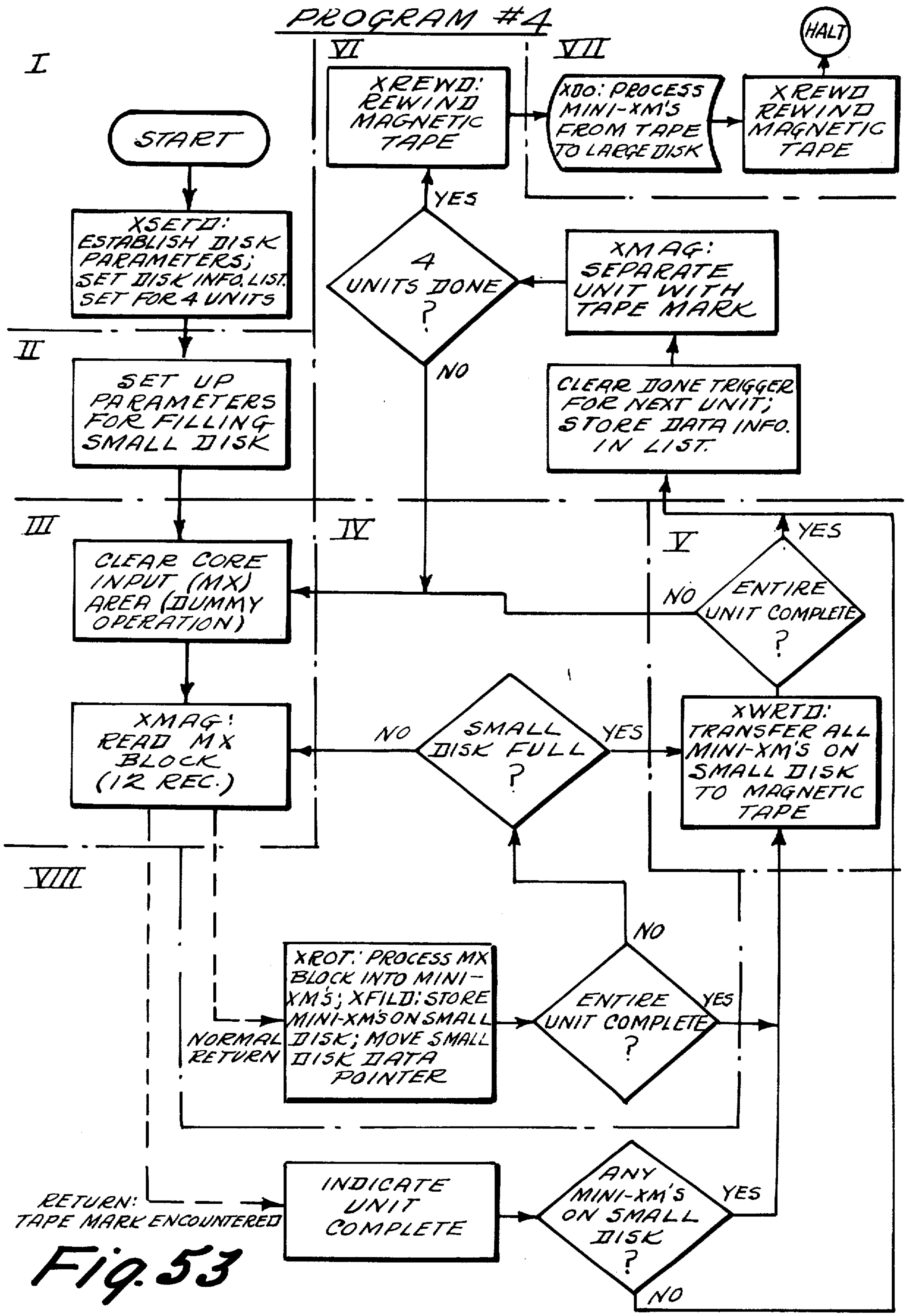
Figure 54:
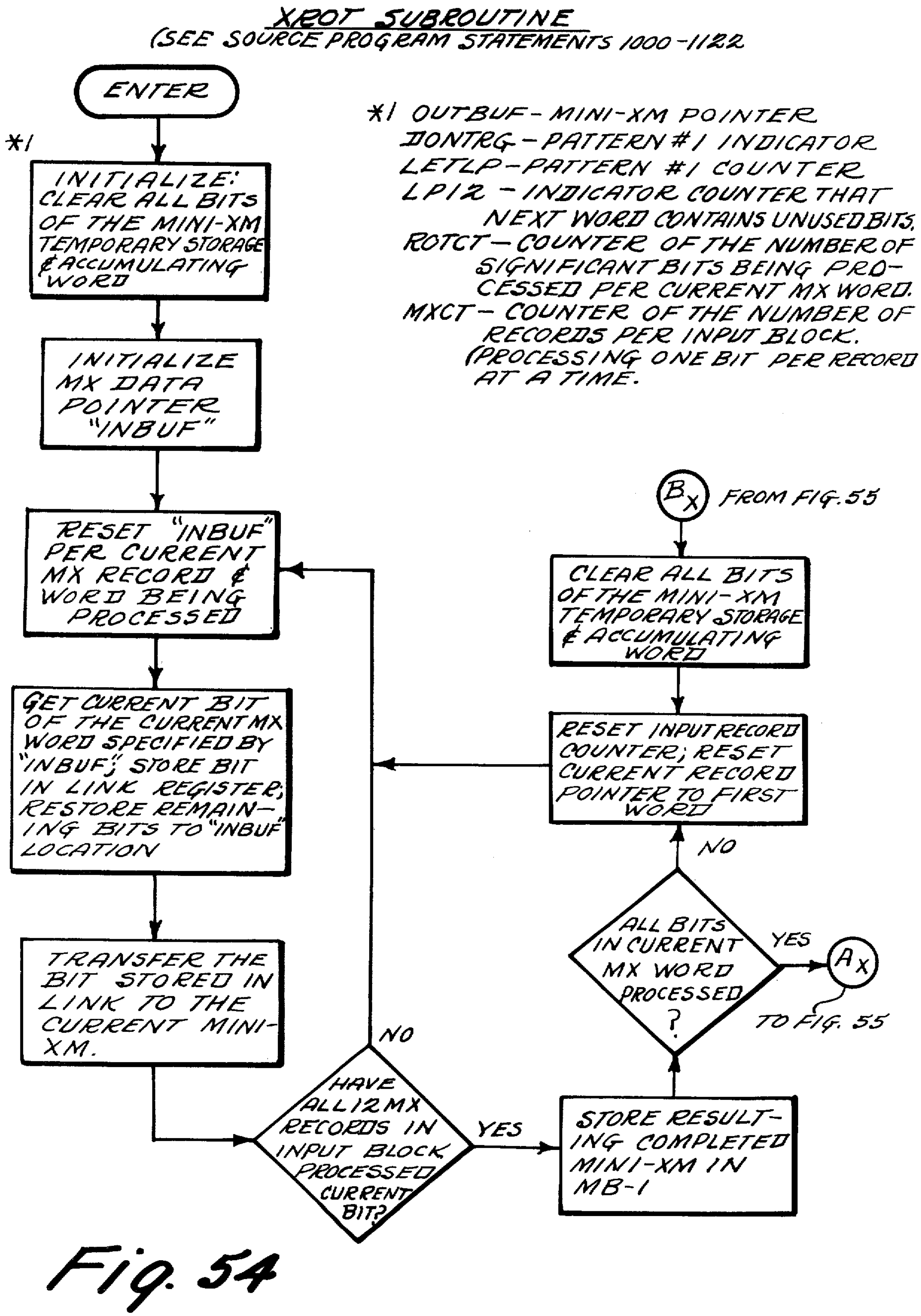
Figure 55:
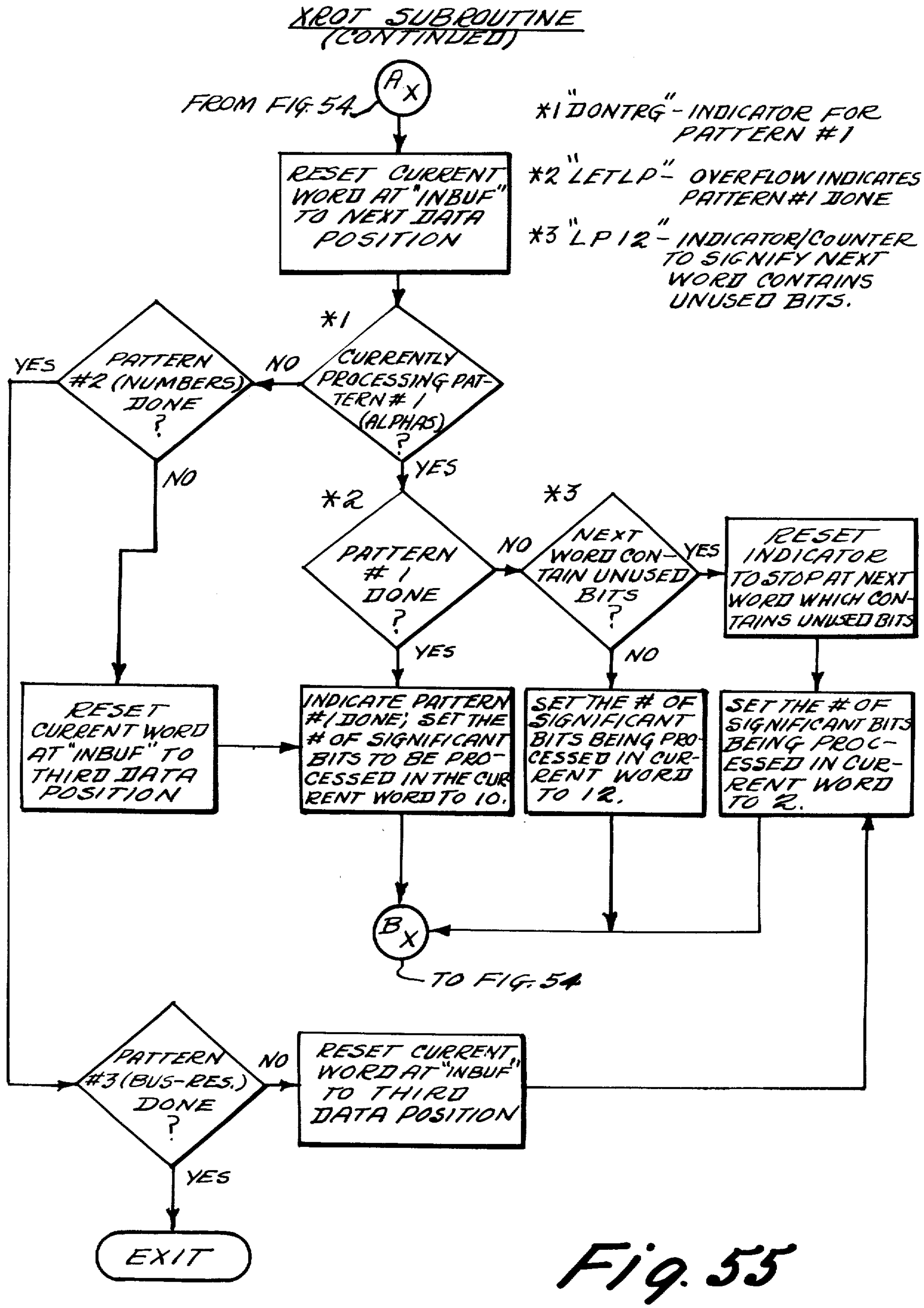
Figure 56:
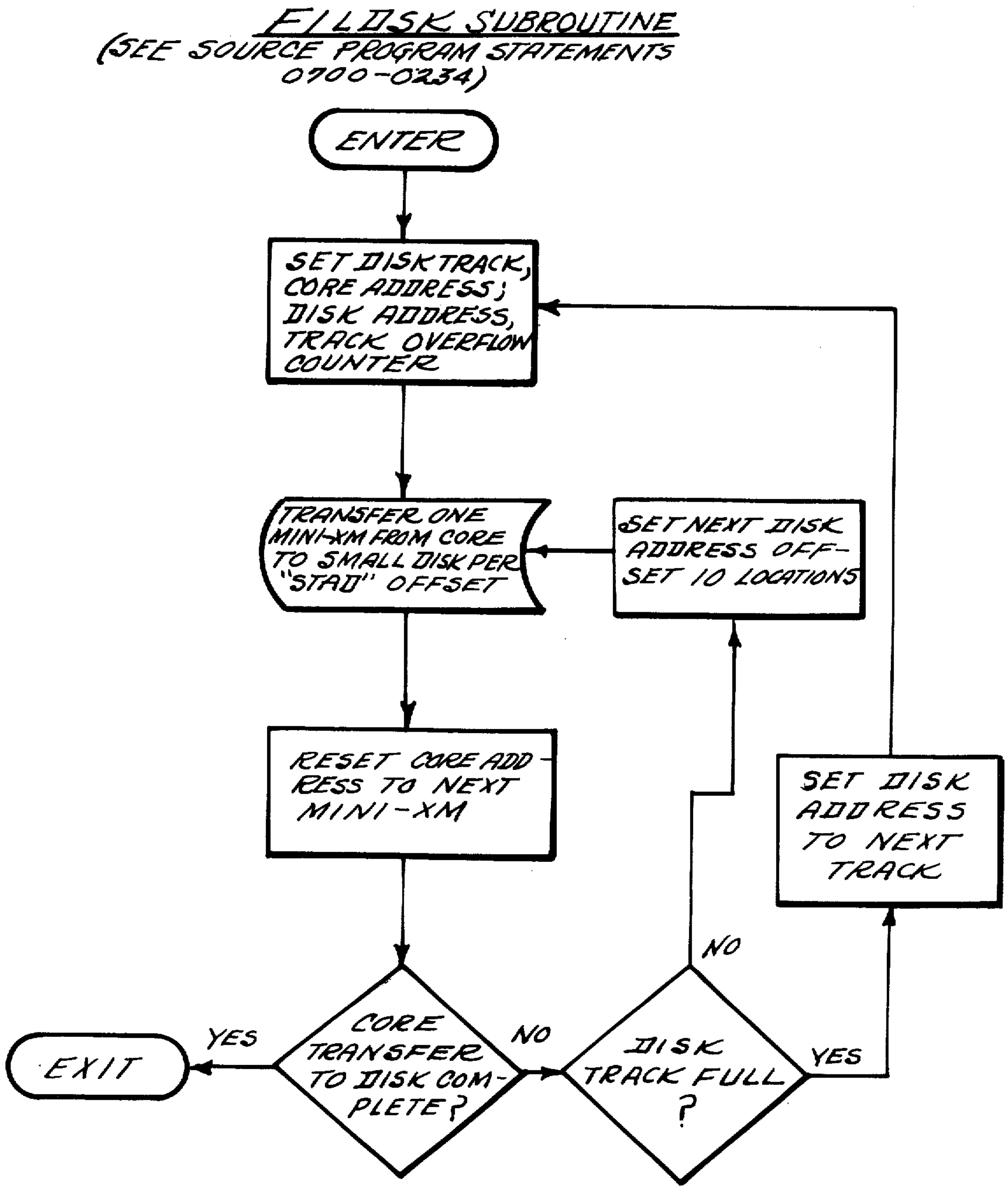
Figure 57:
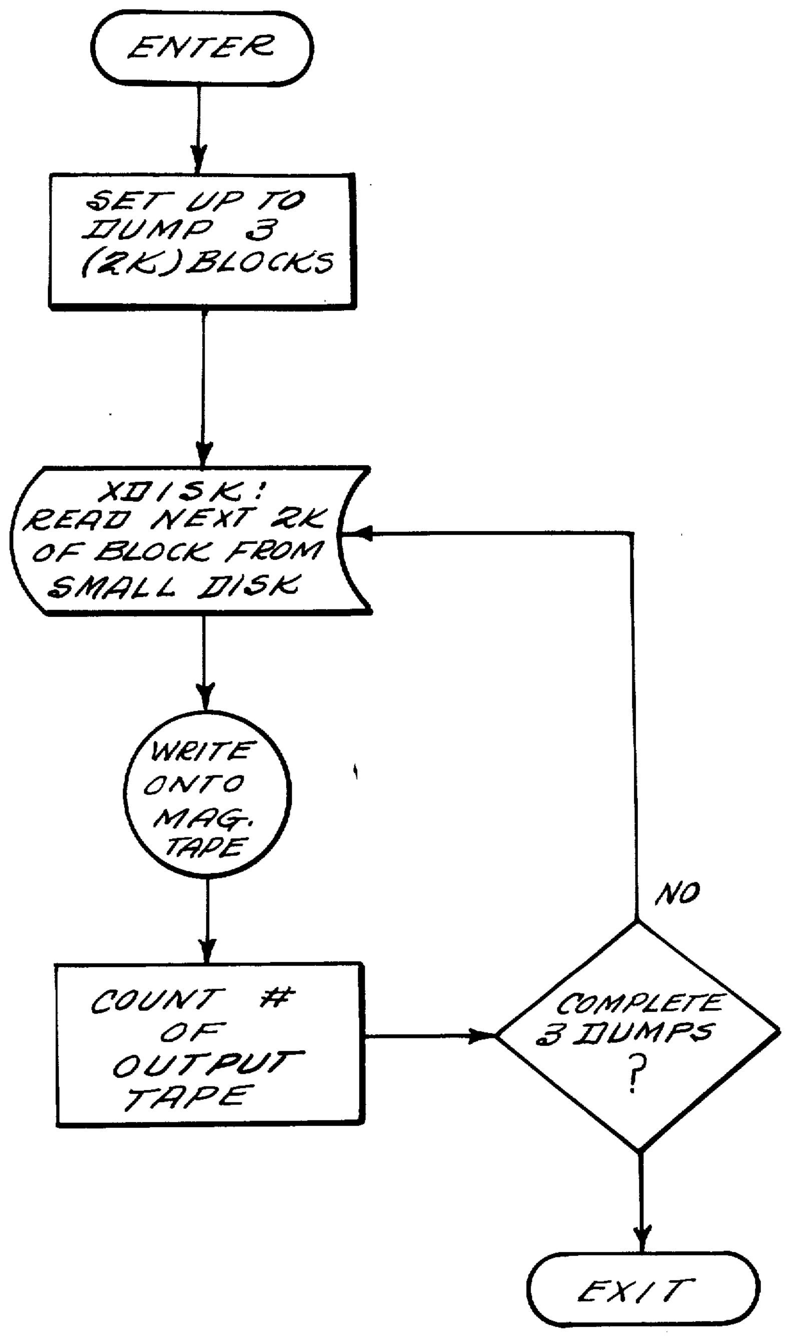
Figure 59:
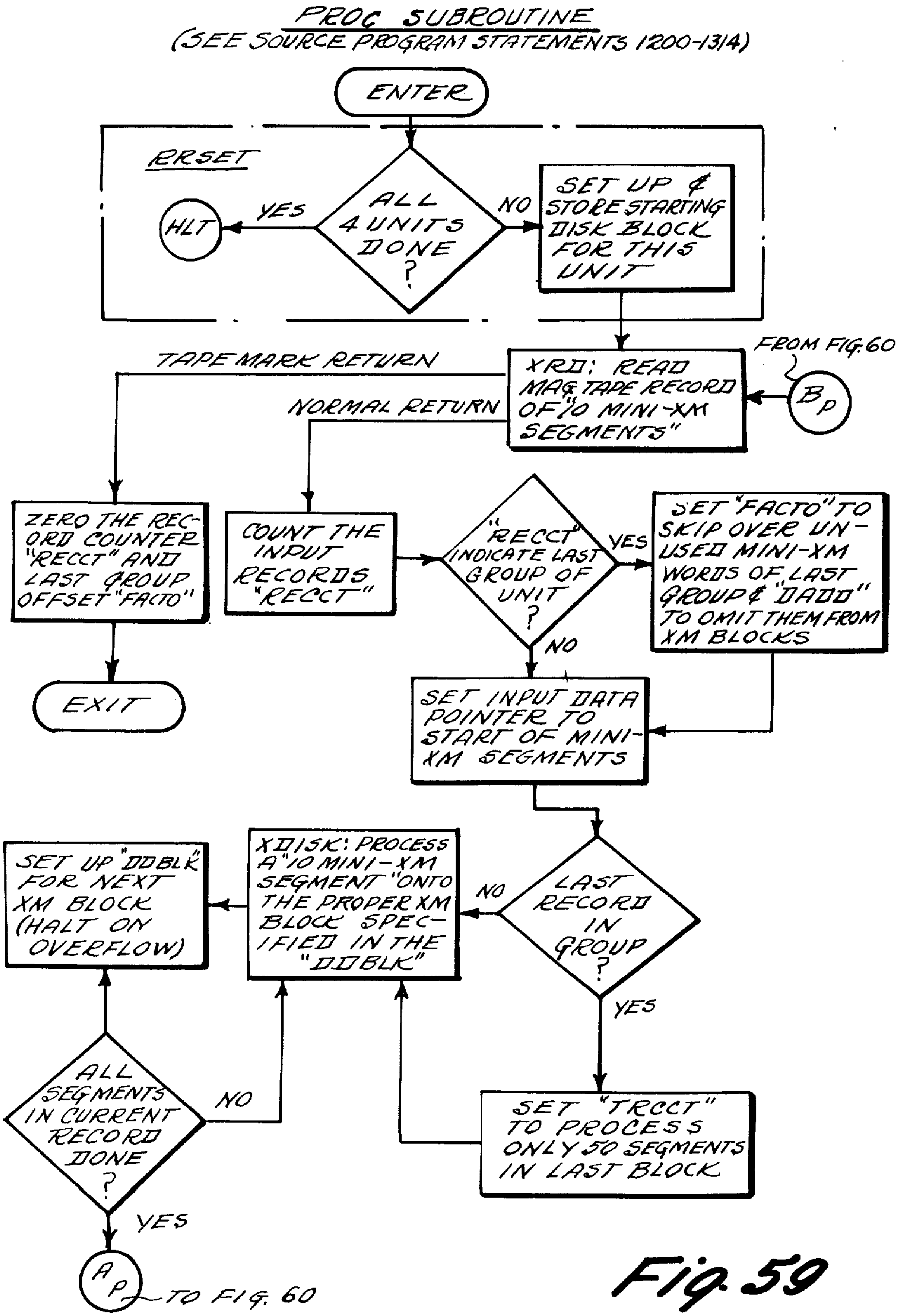
Figure 60:
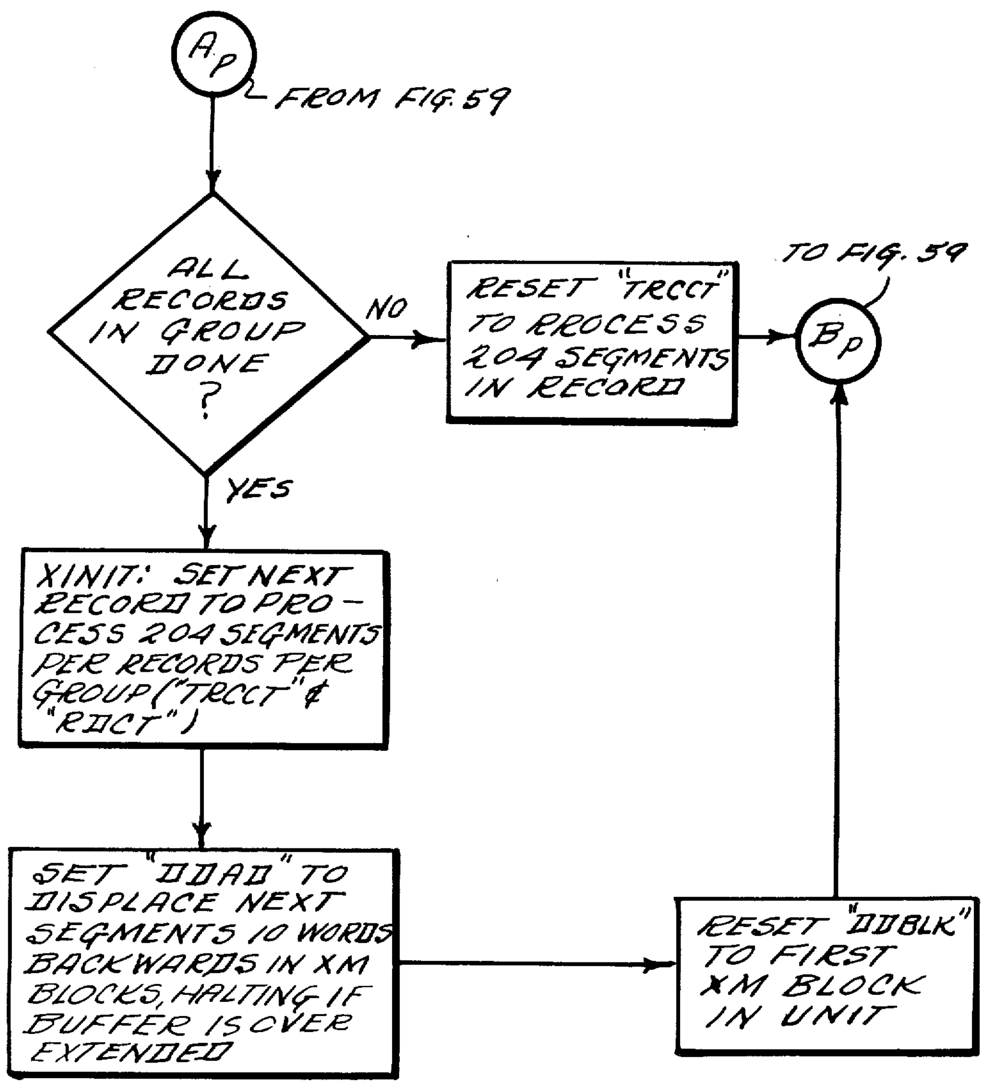
Figure 61:
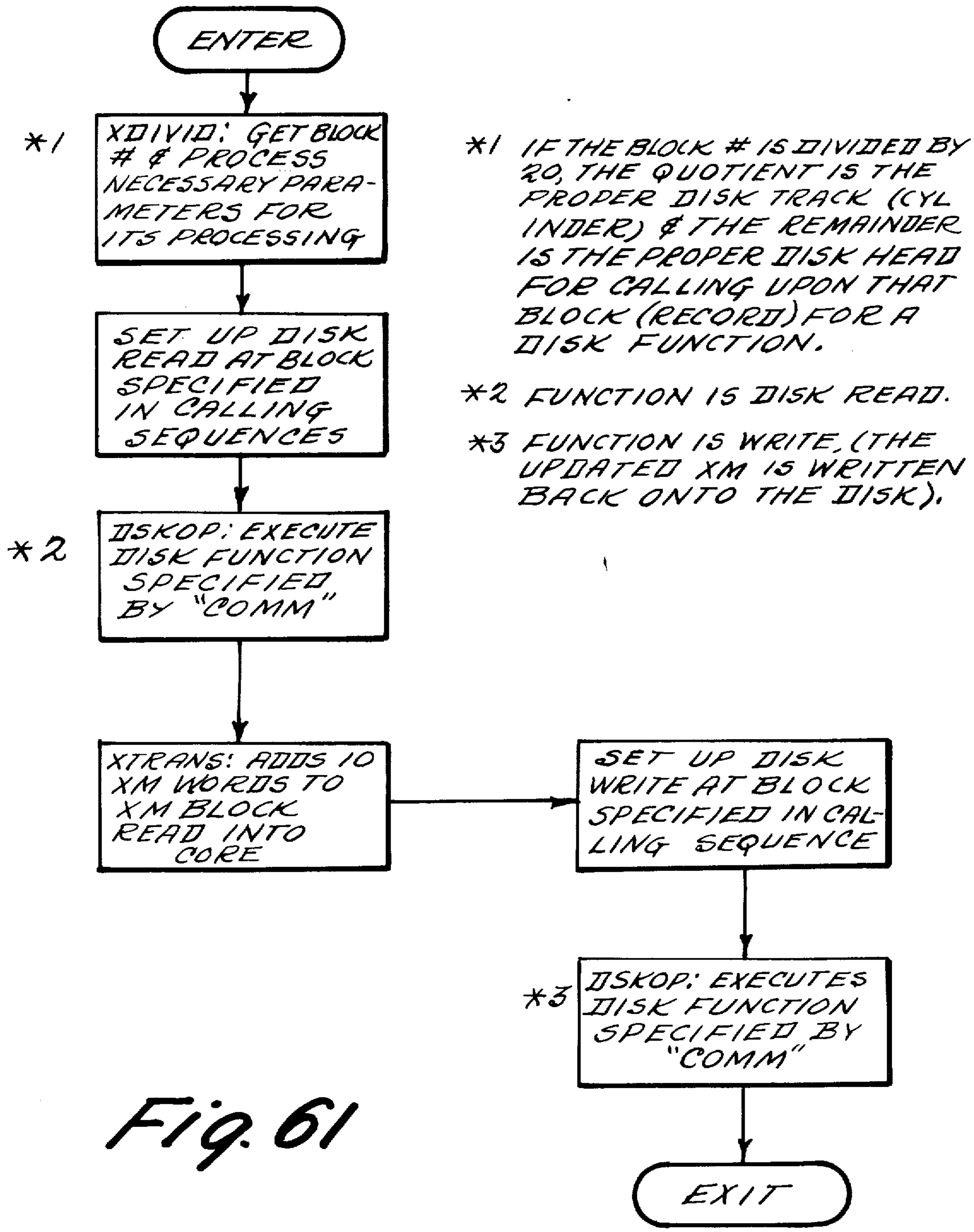
Figure 62:
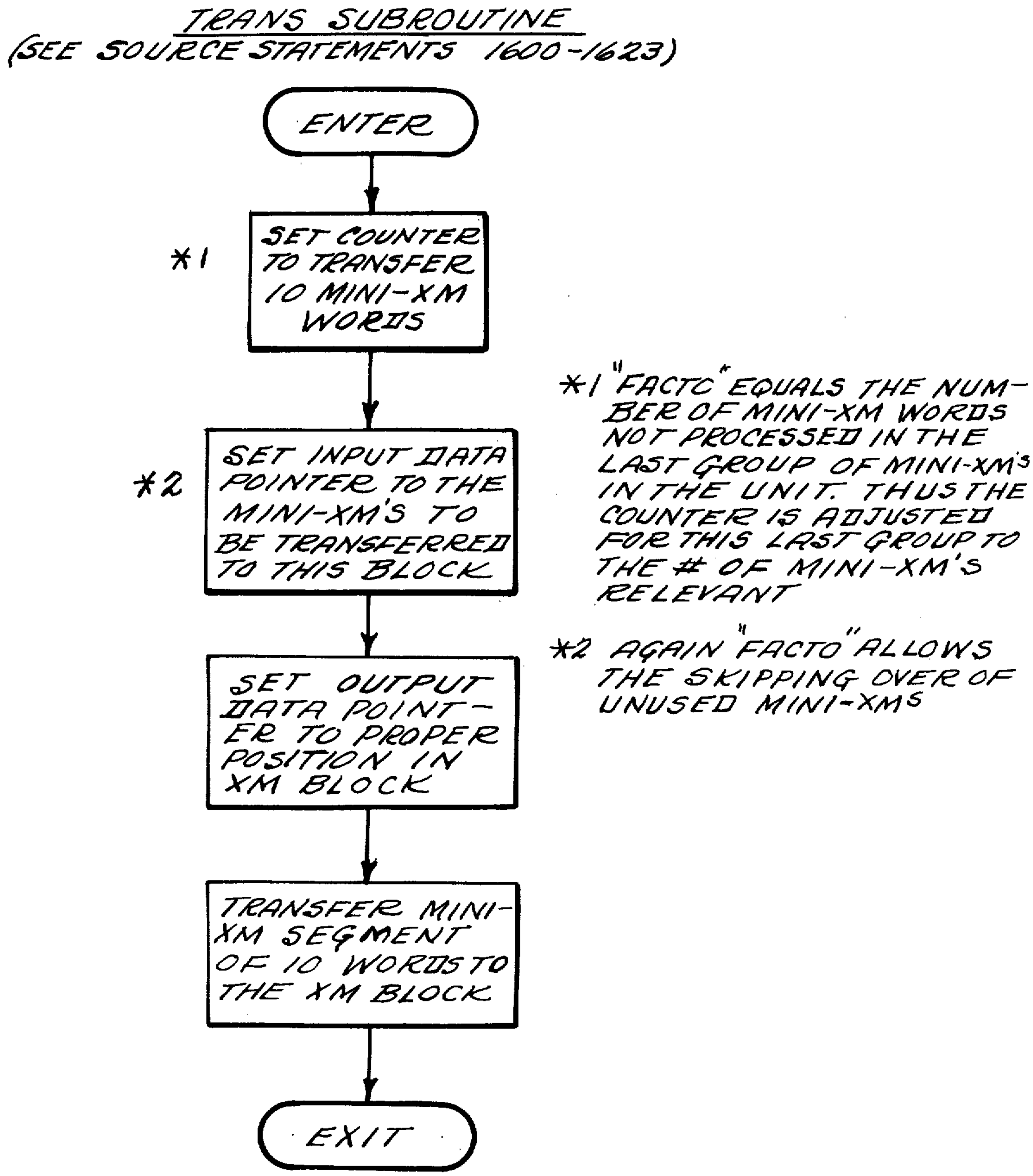
Figure 63:
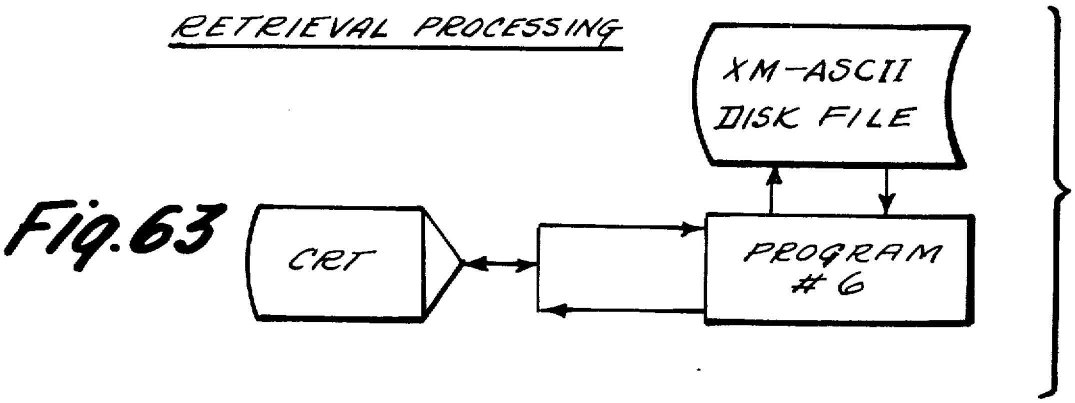
Figure 64:
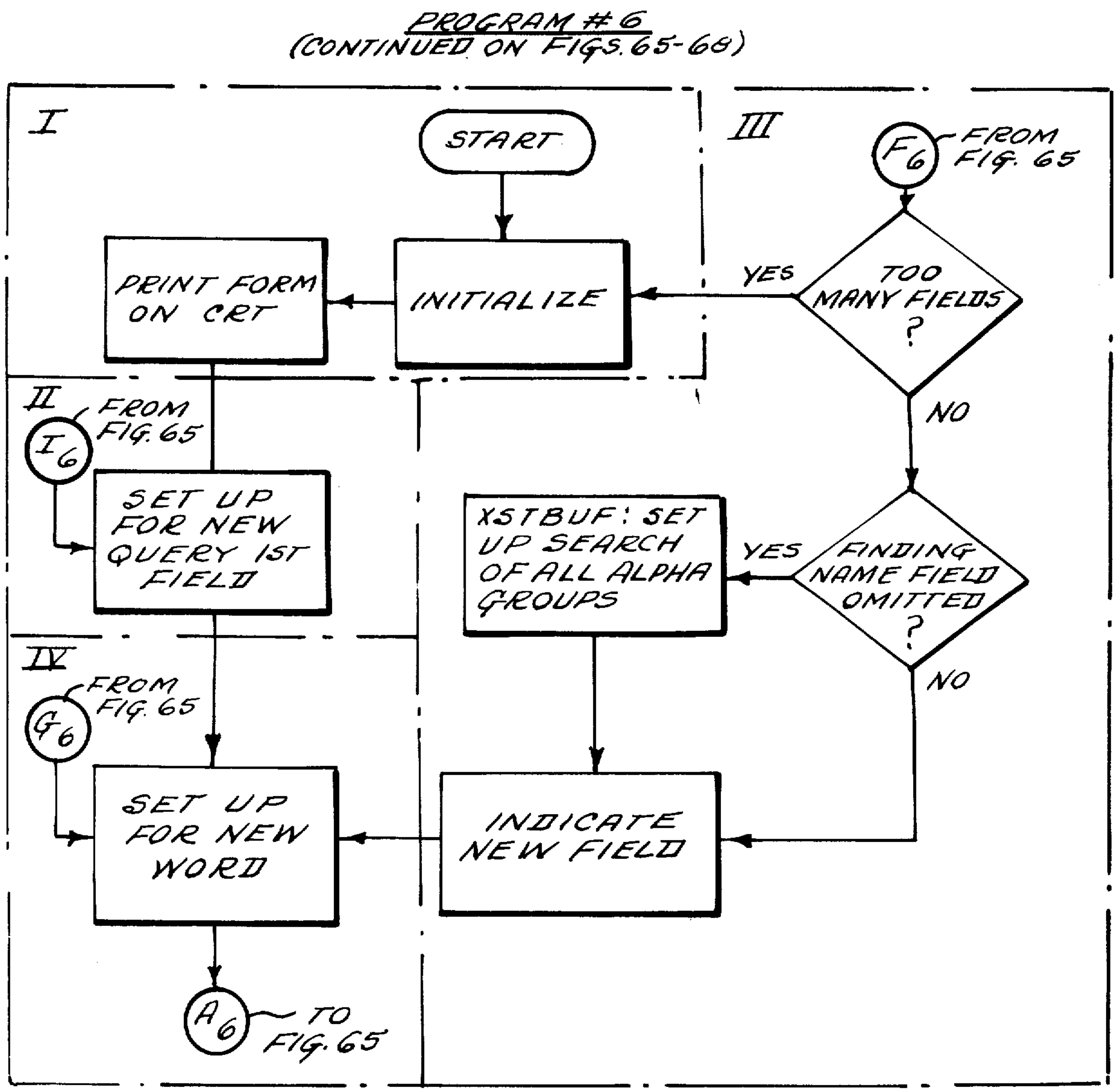
Figure 65:
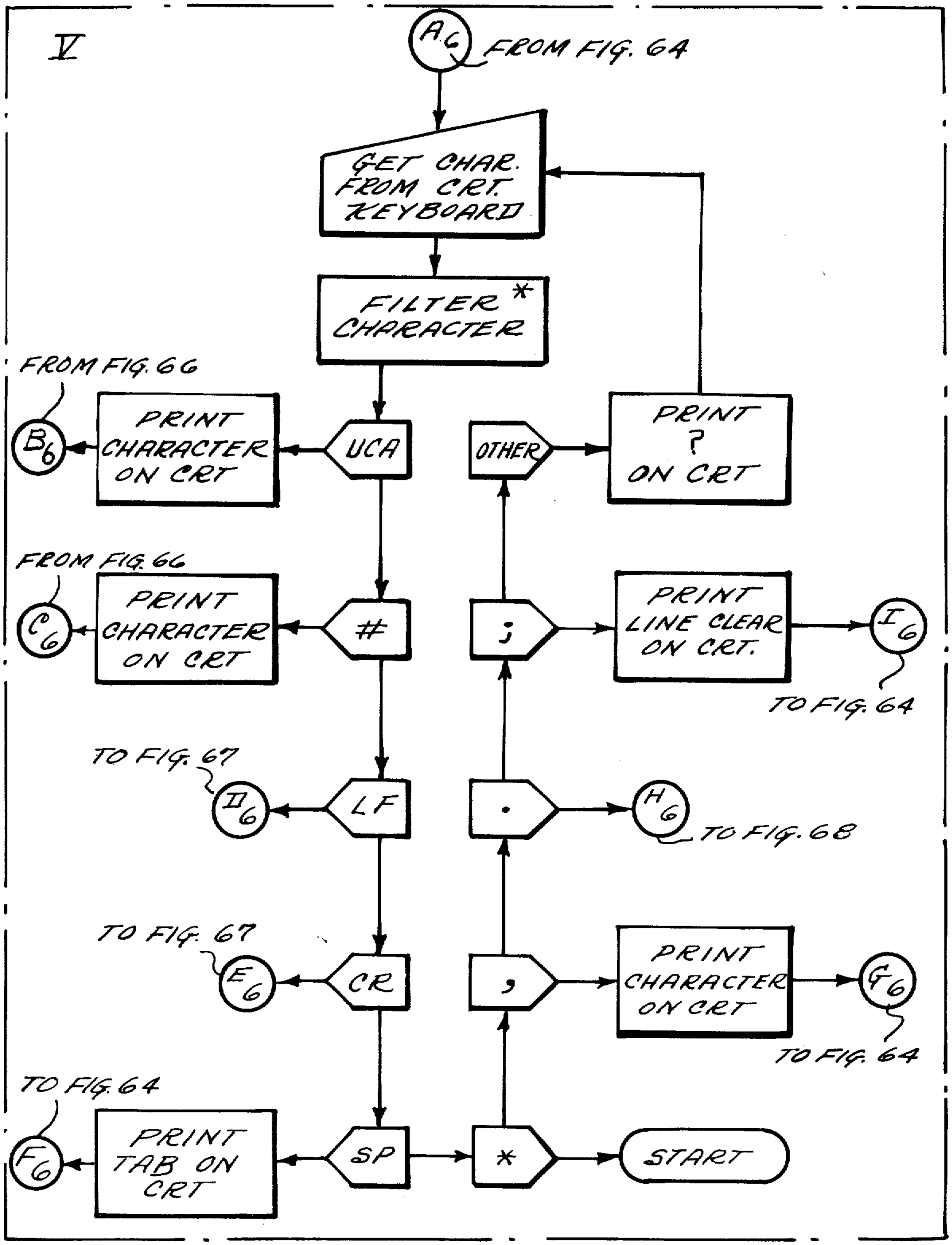
Figure 66:
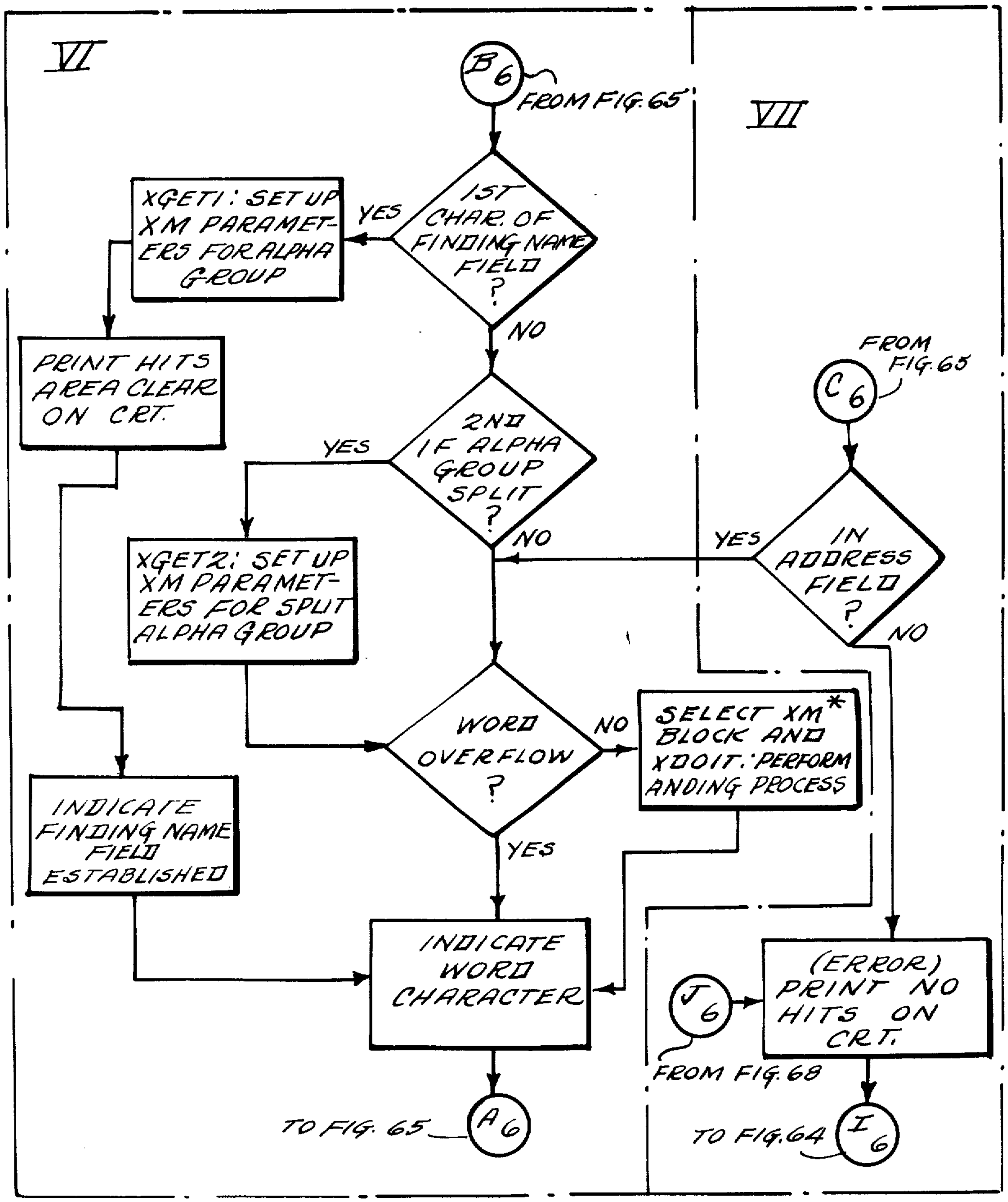
Figure 67:
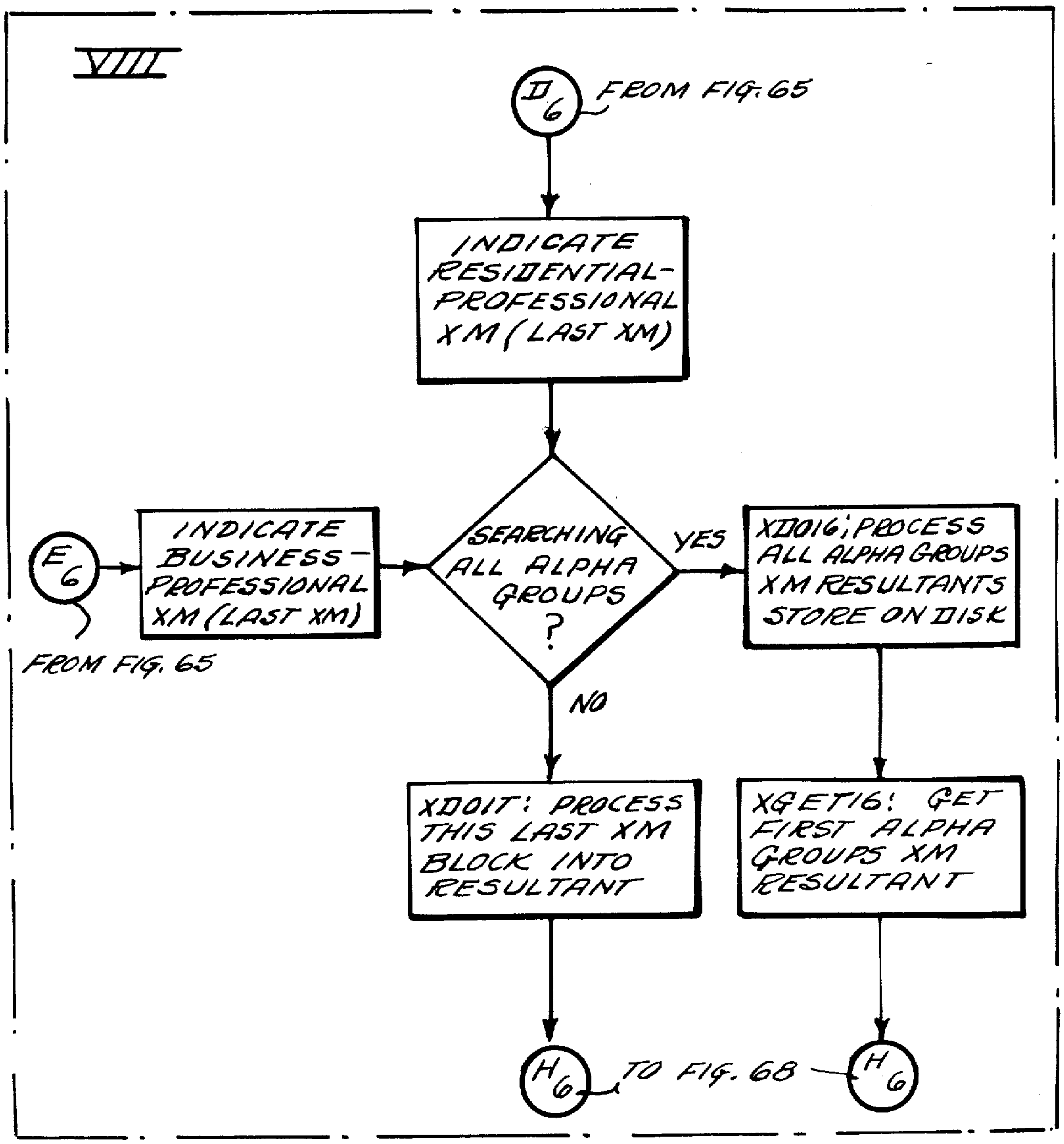
Figure 68:
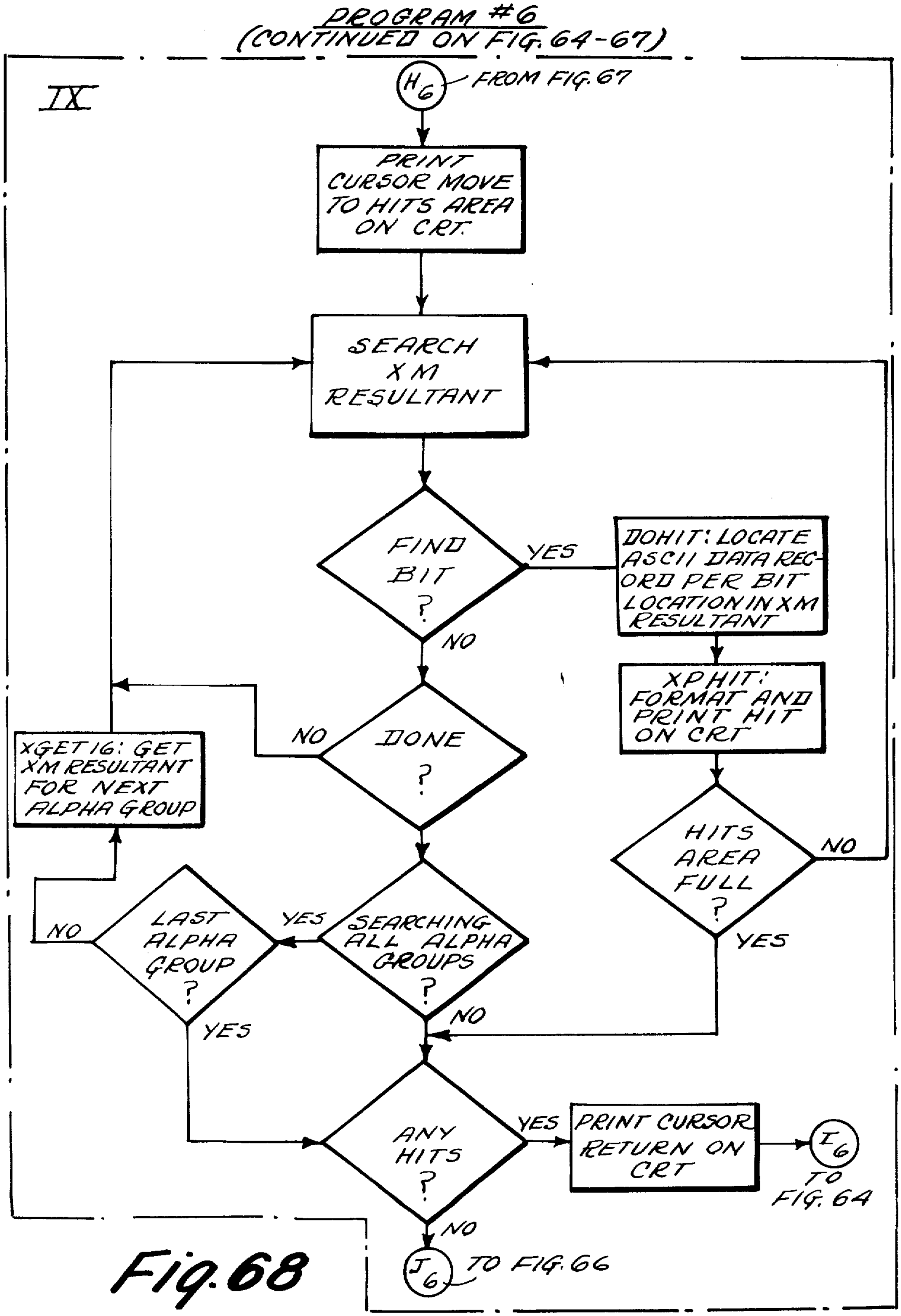
Figure 69:
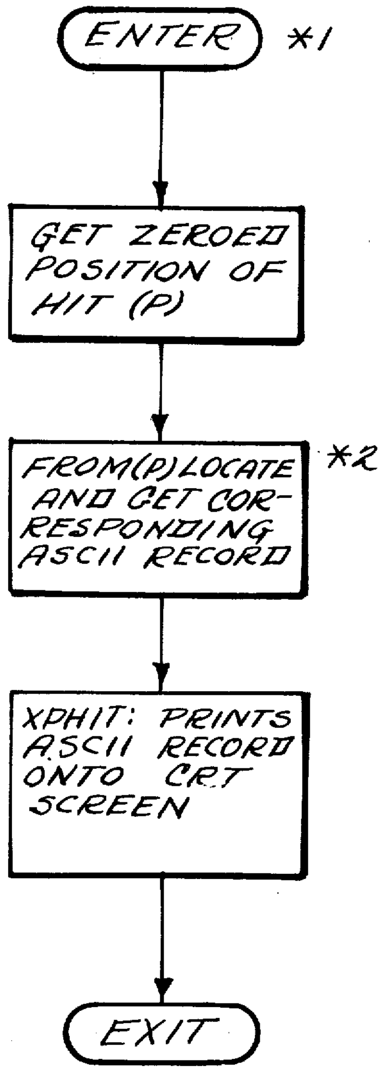
Figure 70:
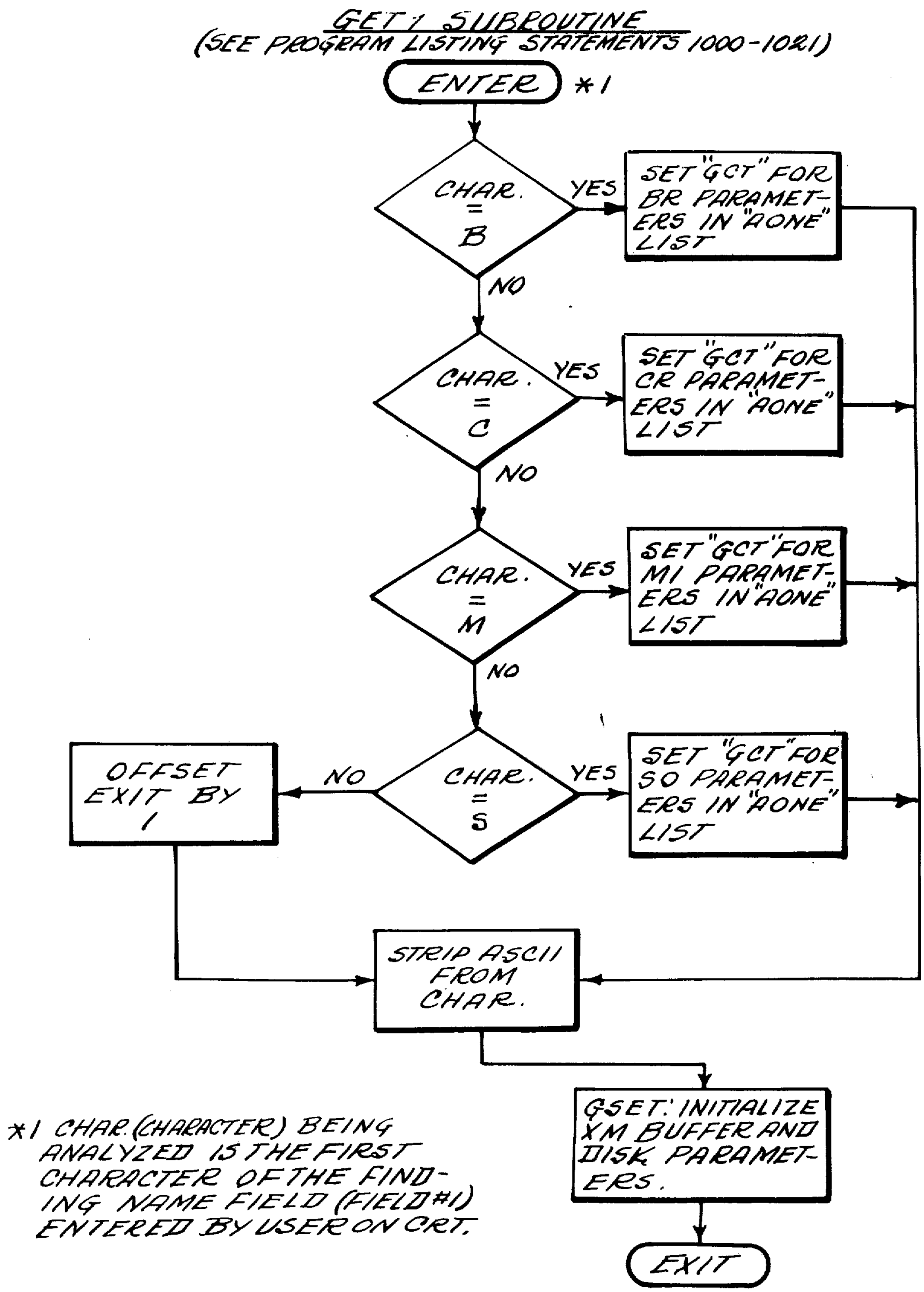
Figure 72:
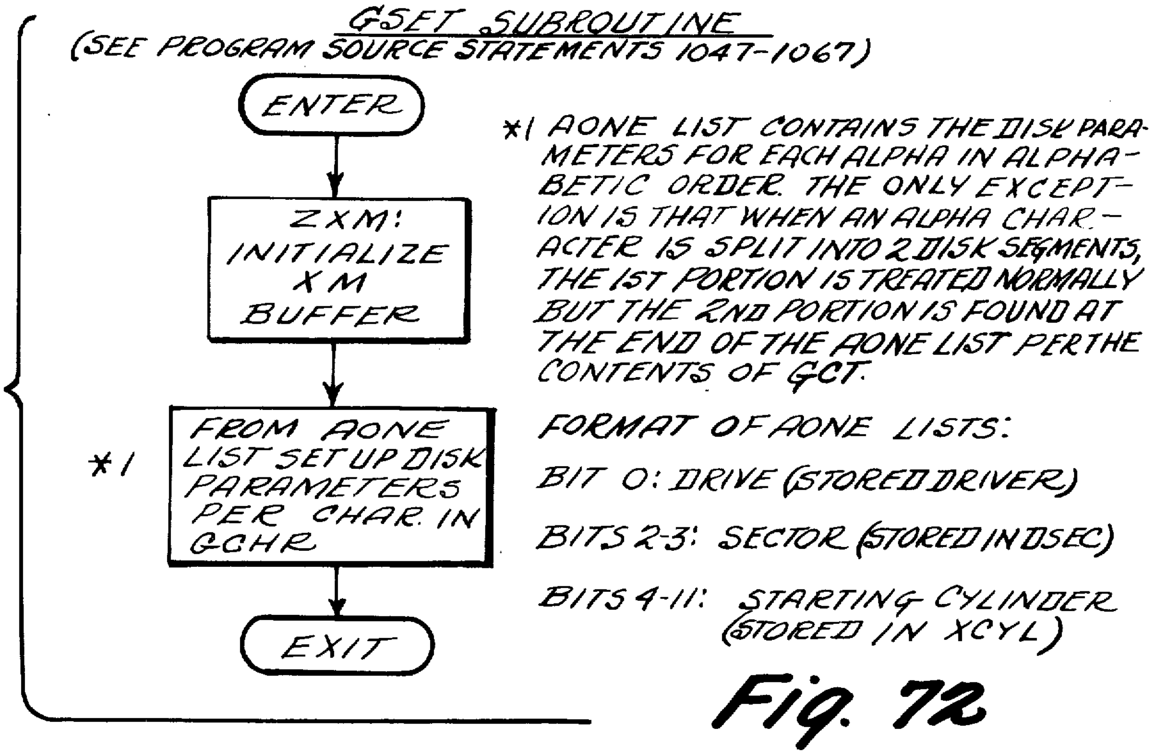
Figure 73:
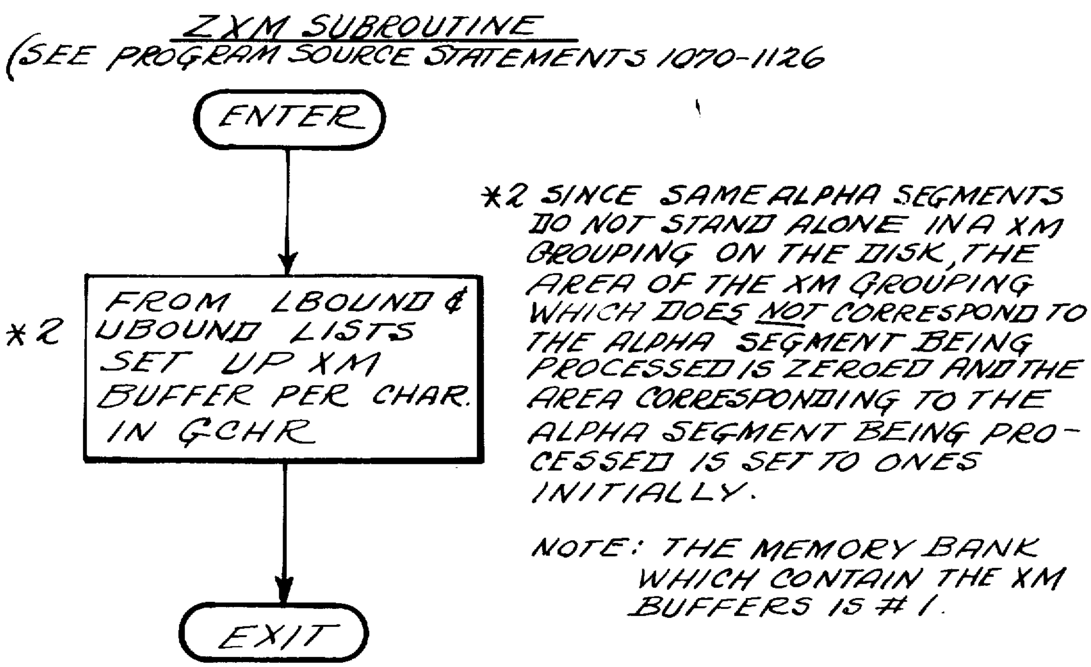
Figure 75:
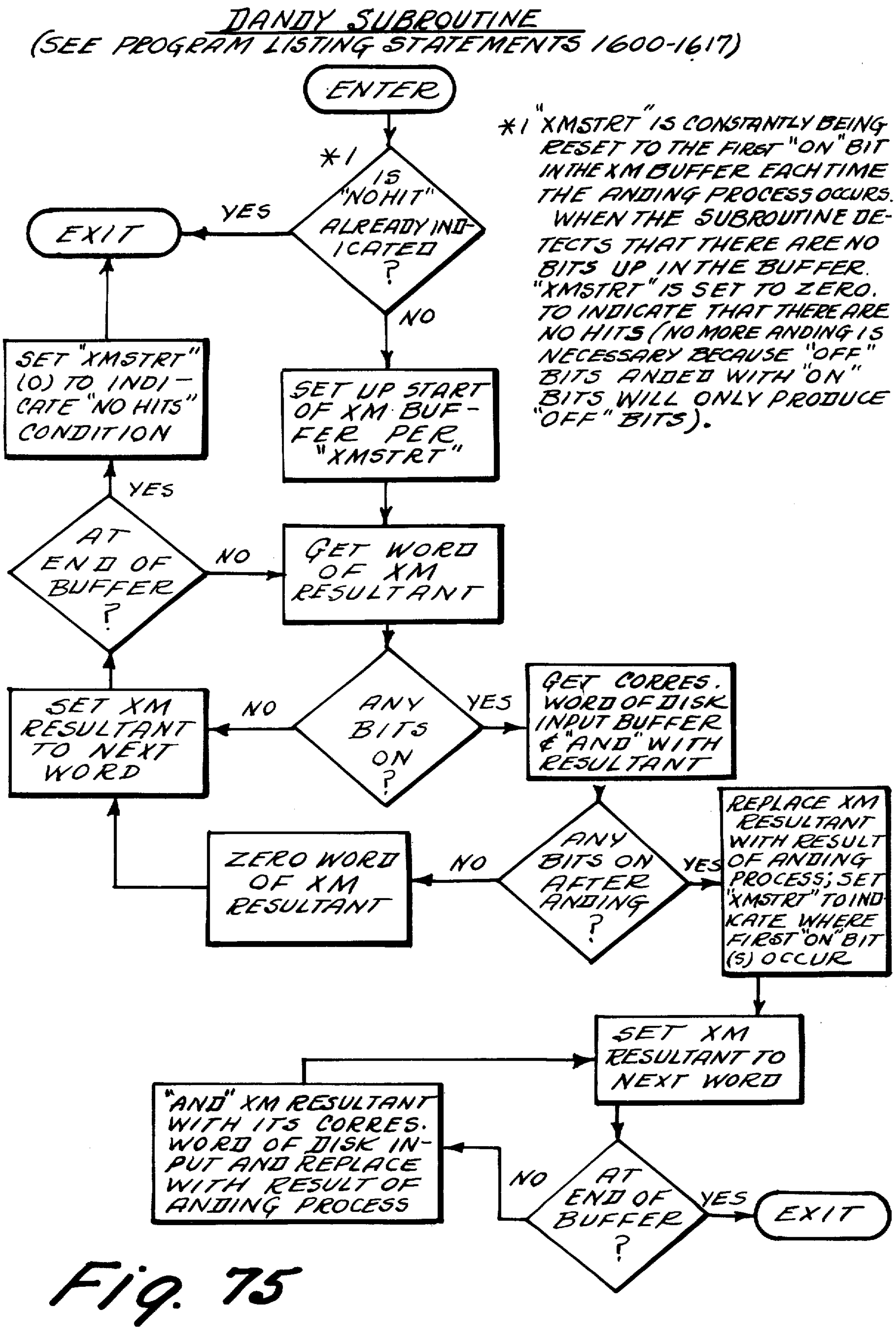
Figure 76:
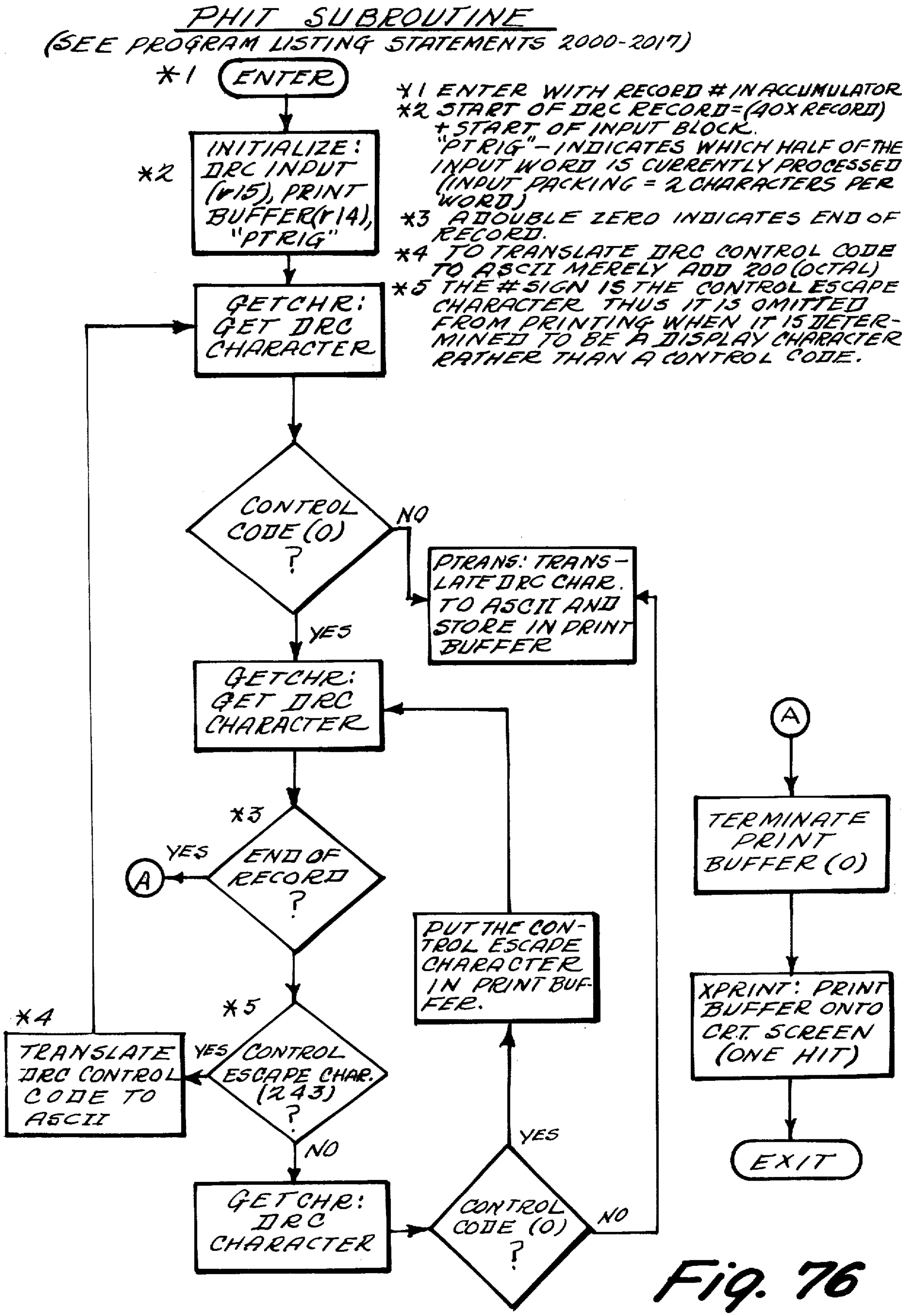
Figure 82:
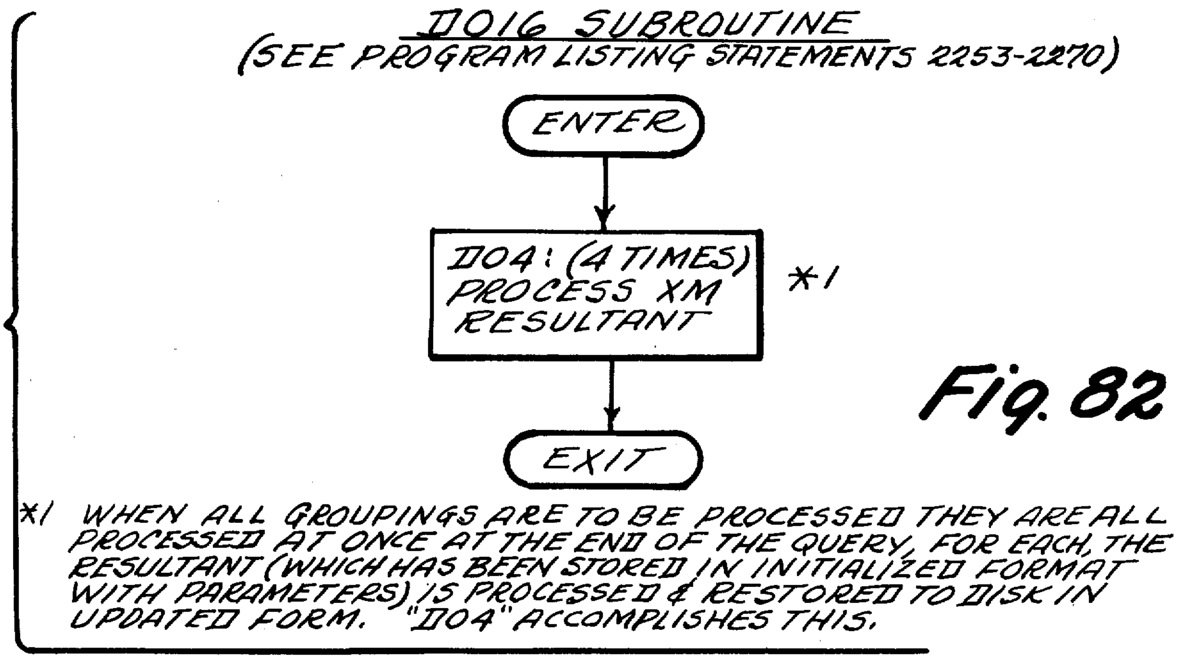
Figure 83:
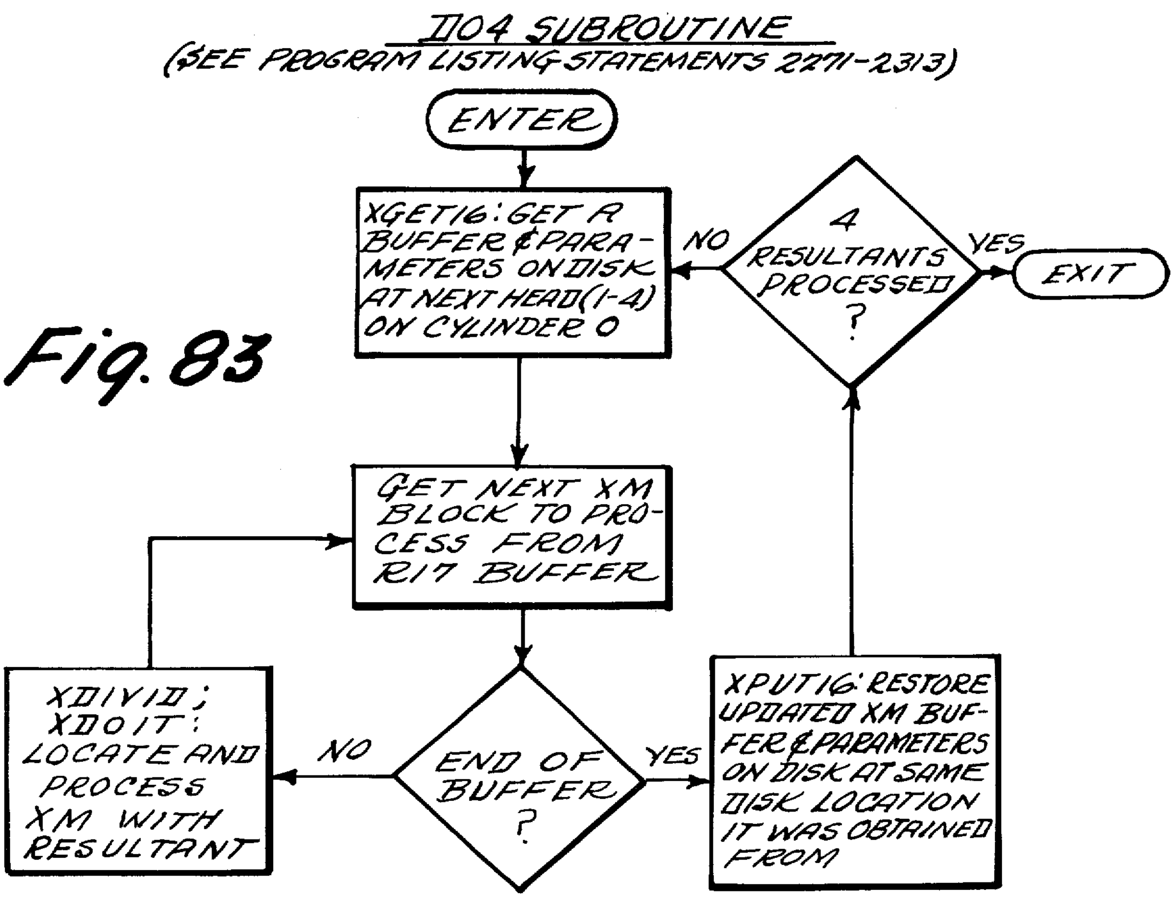
Figure 84:
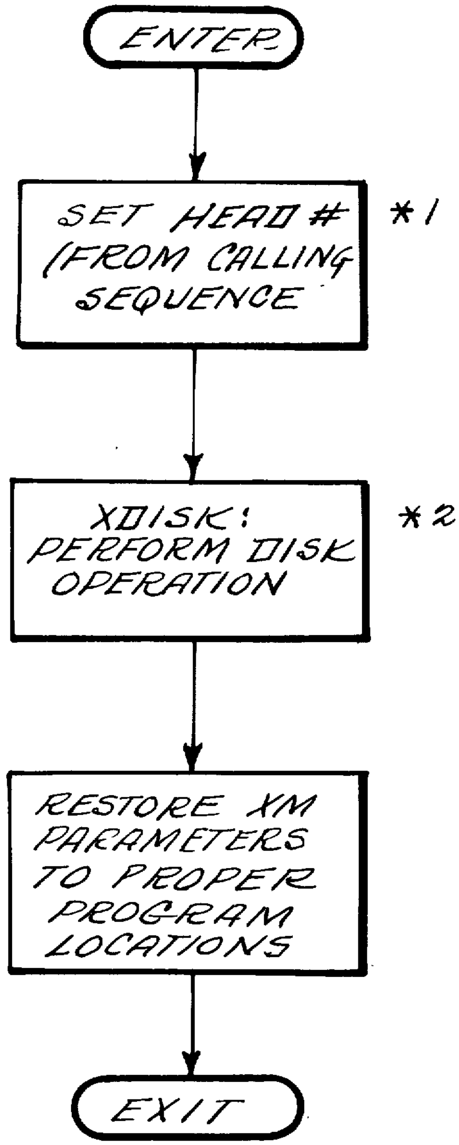
Figure 85:
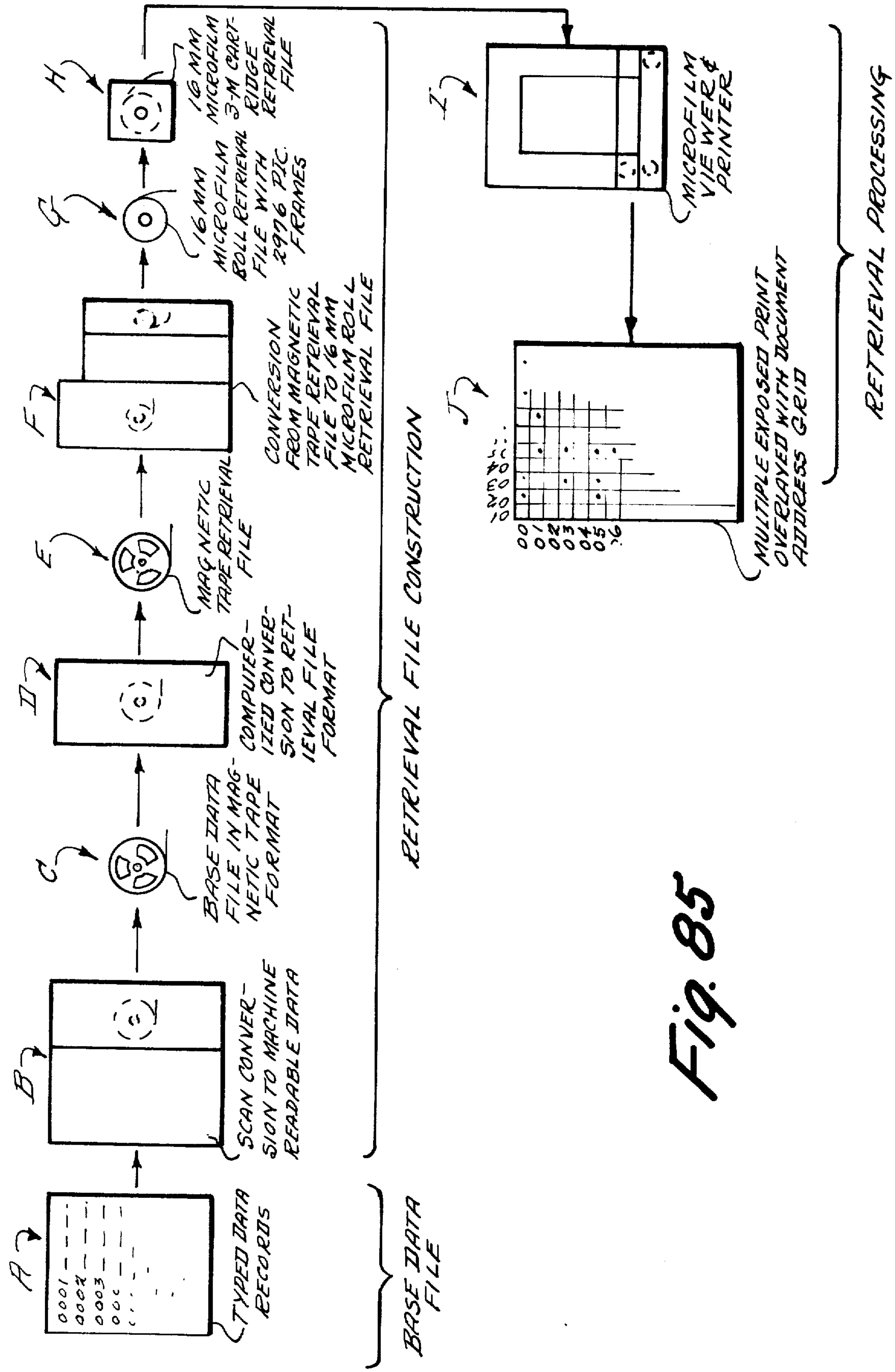
Figure 86:
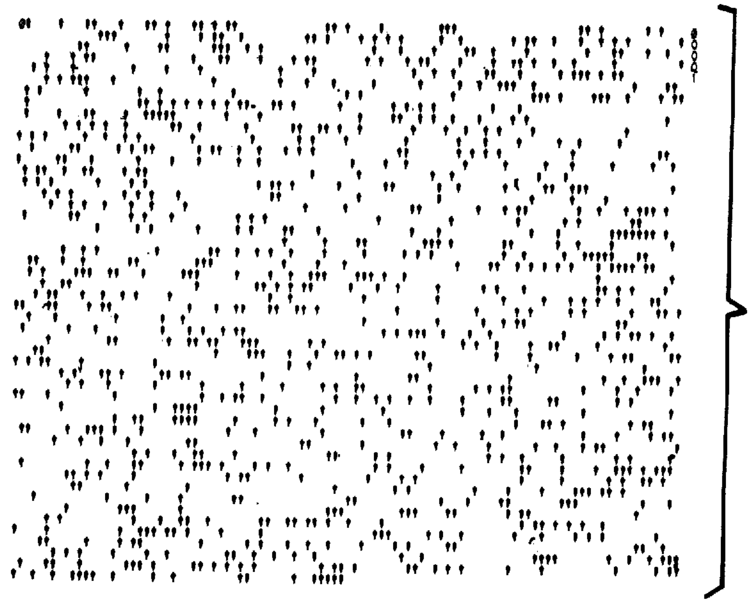
Figure 87:
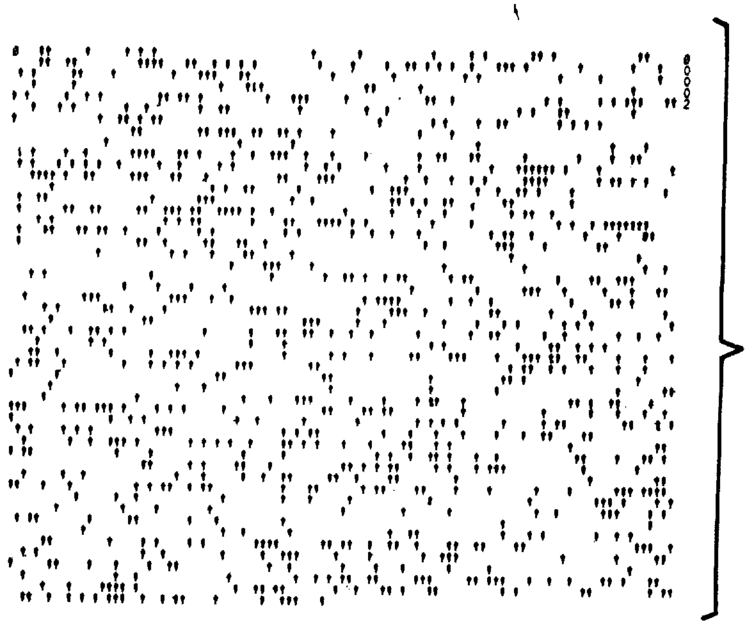
Figure 88:
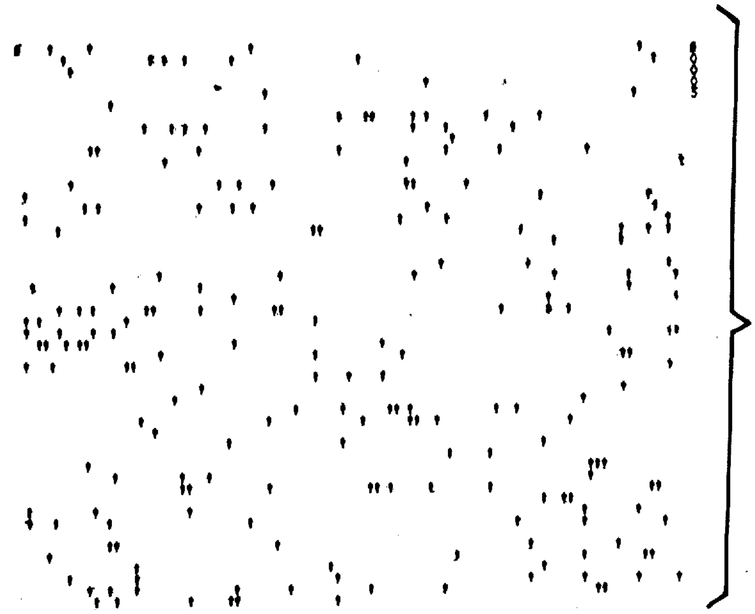
Figure 89:
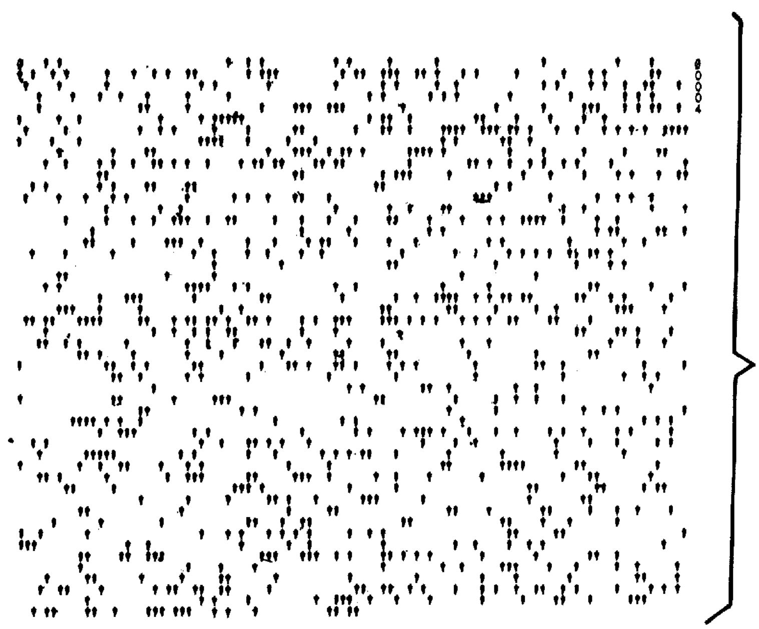
Figure 90:
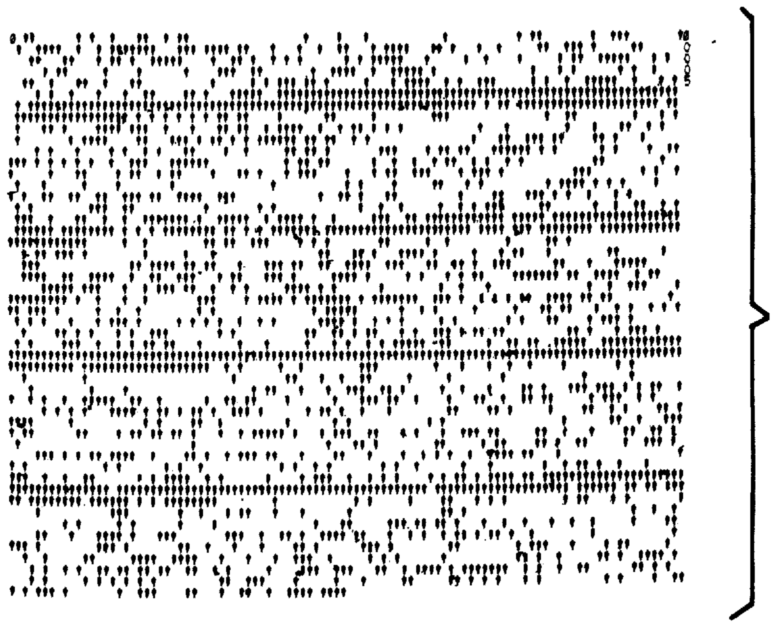
Figure 91:
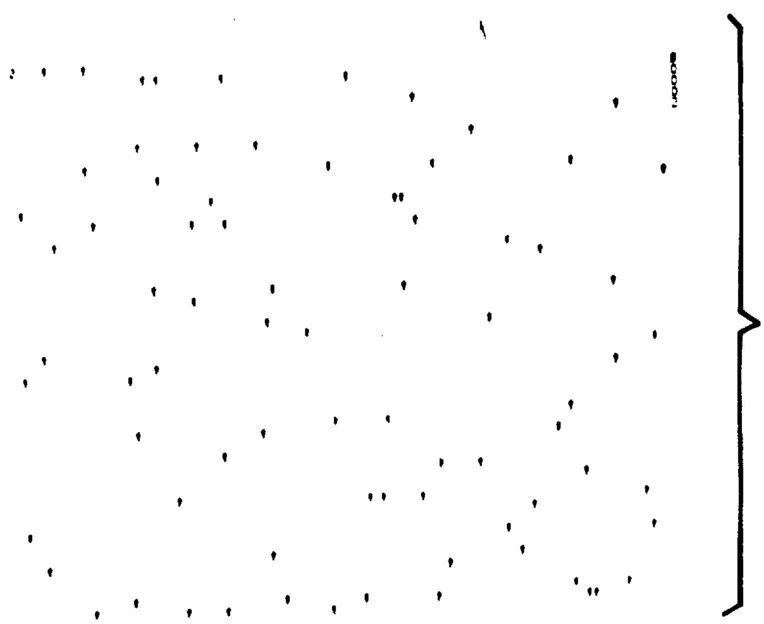
Figure 92:
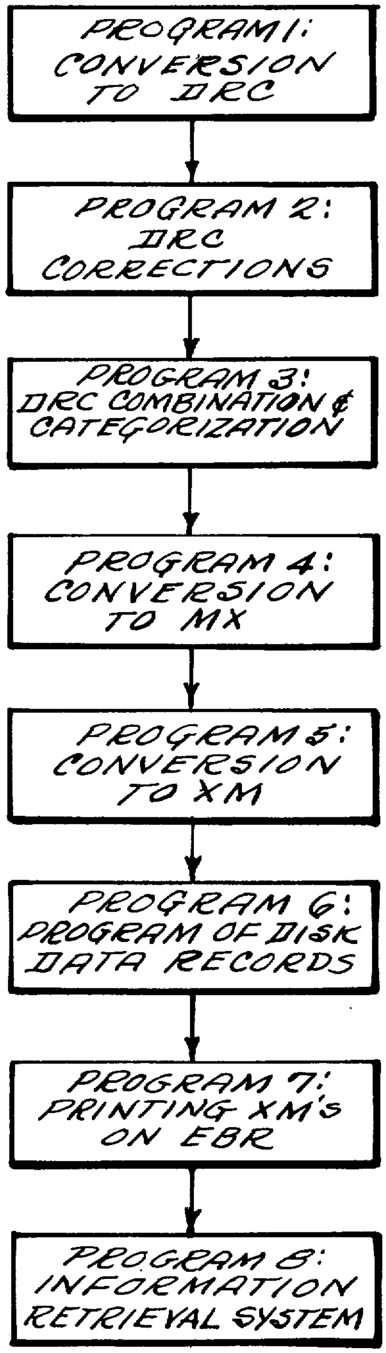

FIGS. 29-32 together constitute a block diagram of Program No. 5 shown in FIG. 25;

FIGS. 33-43 are block diagrams of subroutines entered from Program No. 5 shown in FIGS. 25 and 29-32;

FIG. 44 is a more detailed block diagram of Program No. 3 shown in FIG. 25;

FIGS. 45-52 are block diagrams of subroutines entered from Program No. 3 shown in FIG. 44;

FIG. 53 is a more detailed block diagram of Program No. 4 shown in FIG. 25;

FIGS. 54-62 are block diagrams of subroutines entered from Program No. 4 shown in FIG. 53;

FIG. 63 is a more detailed block diagram of the retrieval processing block shown in FIG. 7;

FIGS. 64-68 together constitute a block diagram of Program No. 6 shown in FIG. 63;

FIGS. 69-84 are block diagrams of subroutines entered from Program No. 6 shown in FIGS. 64-68;

FIG. 85 is a schematic/block diagram of a semiautomated exemplary embodiment of this invention;

FIGS. 86-90 are enlarged photographs of PIC arrays for $A_{1,1}$; $A_{1,2}$; $A_{2,2}$; $A_{1,3}$ and $A_{2,3}$ respectively for the exemplary embodiment of FIG. 85;

FIG. 91 is an enlarged photograph of a composite array formed by a Boolean AND operation on the arrays of FIGS. 87 and 88; and FIG. 92 is a block diagram generally showing the interrelationship of computer programs for use in the semiautomated FIG. 85 embodiment to automatically construct the retrieval file arrays.

The following detailed discussion will be generally organized in three sections. The first section deals with generalized concepts and features of an exemplary embodiment of the invention with special emphasis on the binary coded retrieval file, its organization and content, etc. The second section will deal with a detailed description of a specific exemplary embodiment of the invention that has actually been tested on existing general purpose digital computing equipment for accessing telephone directory records in a machine readable base data file. Finally, the third section of this detailed description will relate to an exemplary embodiment of special purpose apparatus for practicing another exemplary embodiment of the invention.

GENERALIZED DISCUSSION OF AN EXEMPLARY EMBODIMENT

Figure 1:
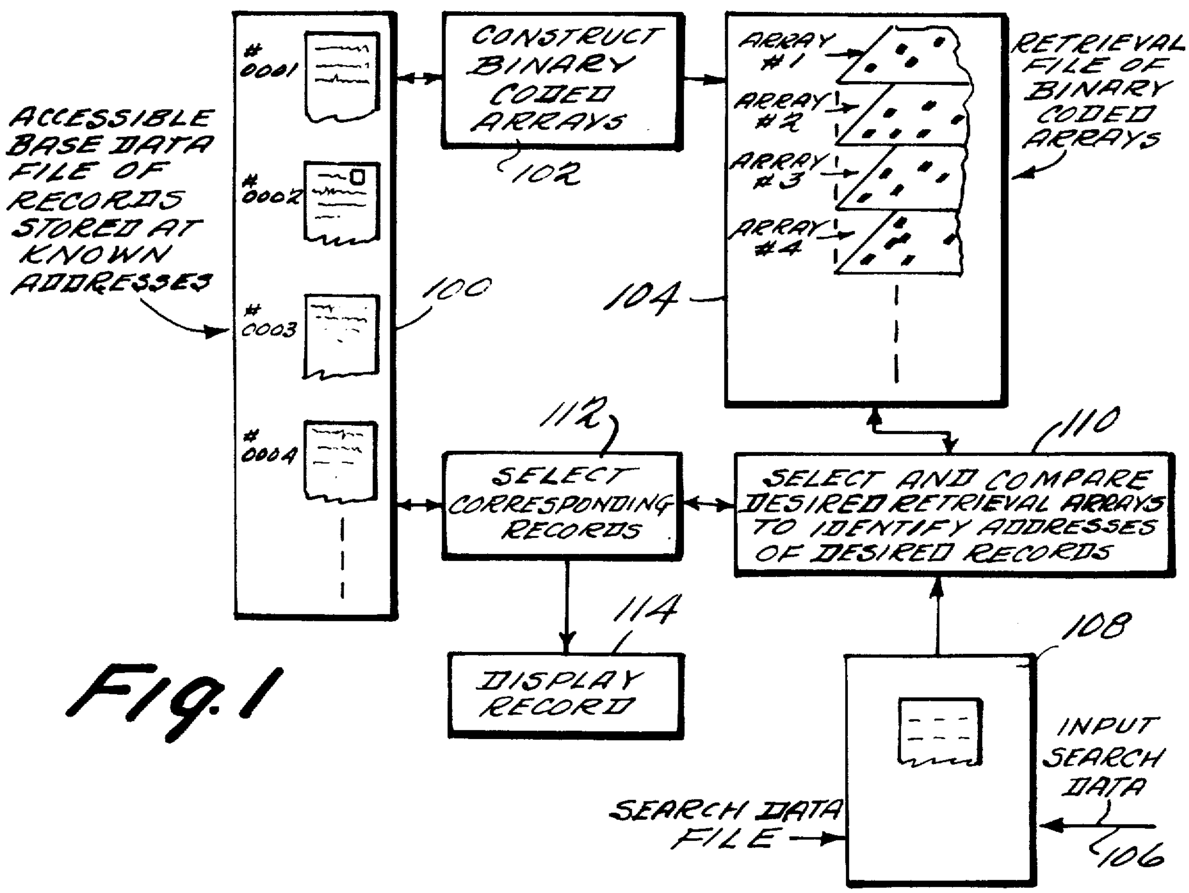
FIG. 1 is a schematic depiction of an exemplary embodiment of an information storage and retrieval system incorporating this invention.
Figure 10:
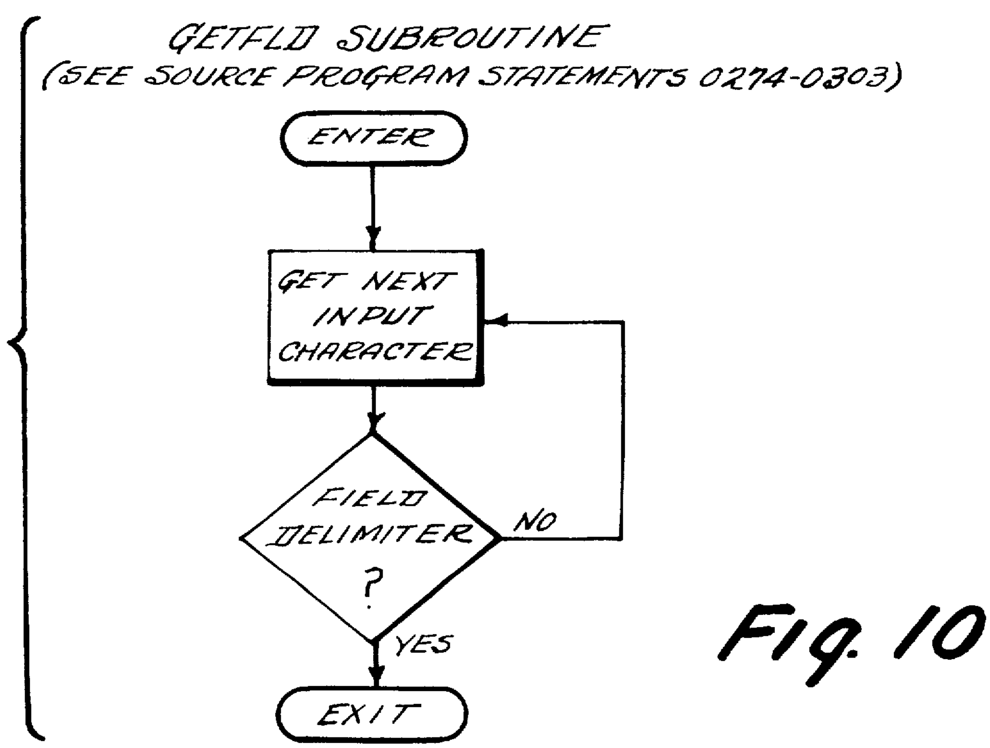

Referring to FIG. 1, a base data file 100 of accessible records stored at known addresses is shown. Here, the addresses are indicated as 4 unique digits associated with each record and the first 4 documents are shown in FIG. 1 together with a corresponding indication of their respectively corresponding 4 digit address numbers. This base data file may comprise an already existing archive of records; it may comprise a machine readable and machine accessible file of records such as might be stored on magnetic tape, magnetic disc, magnetic core, etc; it may comprise a collection of photographic images such as on microfilm or microfiche stored in conventional equipment such that any given document may be rapidly and automatically retrieved for display upon supplying the appropriate address information, etc. In short, the base data file 100 may comprise any accessible file of records wherein each record may be referenced by some unique address, location, or other equivalent pointer.

This base data file 100 is then utilized directly as indicated at 102 to construct binary coded arrays comprising a retrieval file 104 of such binary coded arrays. Of course, as previously mentioned, modifications of the exemplary embodiment may also be made wherein only extracts such as abstracts or selected key words, etc., from each record are utilized at 102 to construct the retrieval file 104. Exemplary processes and apparatus for constructing the binary coded arrays as indicated at 102 will be further detailed below. Of course the arrays could also be manually constructed as will be apparent. The result of such a construction or generation process will be a plurality of arrays of binary coded elements some of which are schematically illustrated in FIG. 1 within block 104. An enlarged and more detailed version of this portion of FIG. 1 is shown in FIG. 2.

It should be recognized that each array in the retrieval file corresponds to some predetermined identifiable characteristic of language structure (hereafter referenced merely as a "PIC"). Furthermore, there is an element or area of each array which corresponds to each and every one of the correspondingly associated record addressed in the base data file.

Figure 2:
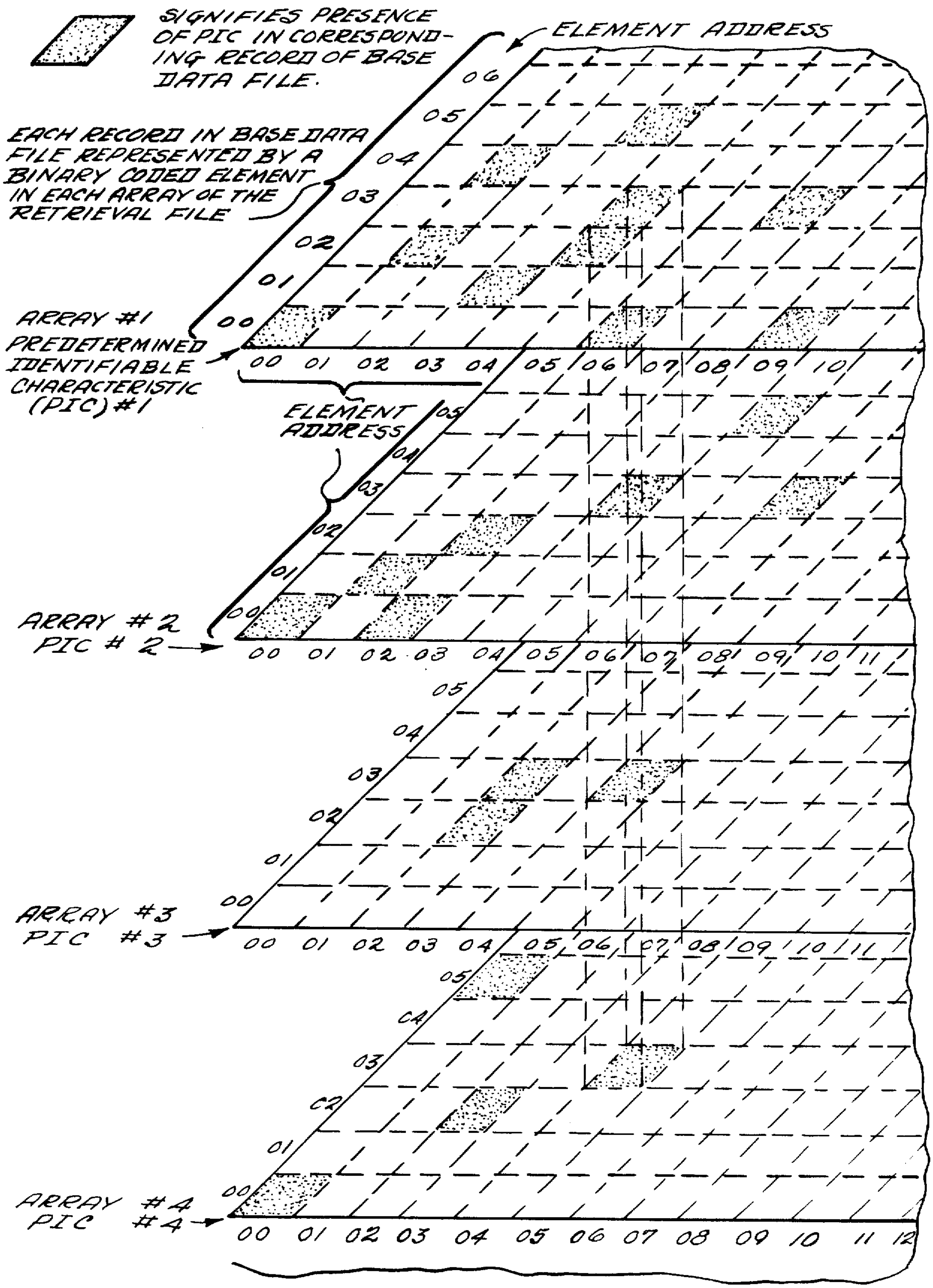
FIG. 2 is a more detaled schematic depiction of the binary coded retrieval file for the exemplary embodiment disclosed in FIG. 1.

For instance, as may be seen more clearly in FIG. 2 where element address numerals have been added for clarification, there is an element in each of the arrays which corresponds to the address of record numbers 0000; 0001; 0002; 0003; etc. The cross-hatched elements are the ones that have been shown, for purposes of illustration, as having received a binary valued code representing the presence of a corresponding PIC (corresponding to the particular array) in the respectively corresponding record. For instance, the record stored at location or address 0201 is indicated by the cross-hatching as including PIC #1 while the record located at address 0202 is indicated as having an opposite binary value or code indicating the absence of PIC #1 from that particular record.

Of course, the particular set of PIC's are chosen as a function of the language structure of the information contained in the base data file. In the exemplary embodiment, for retrieving from a base data file comprising English language written records such as newspaper clippings, photo captions from newspaper clippings, etc., the set of PIC's are chosen to represent the alphabetic value of informational characters in the records and to represent the relative sequential location of such character values in associated groups of characters such as words contained within the records. In particular, the PIC's are chosen to correspond to the alphabetic value of the first, second, et. seq. character positions in words having one, two et. seq. total characters therein.

This exemplary technique for choosing the set of PIC's may be illustrated easily by the following matrix representation wherein each PIC represents an entry in the matrix in the form of $\phi_{m,n}$ where $\phi$ equal the alphabetic value; m equals the character position number within a word and n equals the word length. In this exemplary embodiment, $\phi$ takes on the values a through z; 0 through 9; and A through Z:

Predetermined Identifiable Characteristic = $\phi_{m,n}$ $\phi$ = Alphabetic Value
m = Character Position No.

-continued

| | | | | | | | | | | | | n = Word Length | | | | | | | |
|---|---|---|---|---|---|---|---|---|---|---|---|---|---|---|---|---|---|---|---|
| $\phi_{1,1}$ | $\phi_{1,2}$ | $\phi_{1,3}$ | $\phi_{1,4}$ | $\phi_{1,5}$ | $\phi_{1,6}$ | $\phi_{1,7}$ | $\phi_{1,8}$ | $\phi_{1,9}$ | $\phi_{1,10}$ | $\phi_{1,11}$ | $\phi_{1,12}$ | $\phi_{1,13}$ | $\phi_{1,14}$ | $\phi_{1,15}$ | $\phi_{1,16}$ | $\phi_{1,17}$ | $\phi_{1,18}$ | $\phi_{1,19}$ | $\phi_{1,20}$ ... |
| | $\phi_{2,2}$ | $\phi_{2,3}$ | $\phi_{2,4}$ | $\phi_{2,5}$ | $\phi_{2,6}$ | $\phi_{2,7}$ | $\phi_{2,8+}$ | — | — | — | — | — | — | — | — | — | — | — | — |
| | | $\phi_{3,3}$ | $\phi_{3,4}$ | $\phi_{3,5}$ | $\phi_{3,6}$ | $\phi_{3,7}$ | $\phi_{3,8+}$ | — | — | — | — | — | — | — | — | — | — | — | — |
| | | | $\phi_{4,4}$ | $\phi_{4,5}$ | $\phi_{4,6}$ | $\phi_{4,7}$ | $\phi_{4,8+}$ | — | — | — | — | — | — | — | — | — | — | — | — |
| | | | | $\phi_{5,5}$ | $\phi_{5,6}$ | $\phi_{5,7}$ | $\phi_{5,8+}$ | — | — | — | — | — | — | — | — | — | — | — | — |
| | | | | | $\phi_{6,6}$ | $\phi_{6,7}$ | $\phi_{6,8+}$ | — | — | — | — | — | — | — | — | — | — | — | — |
| | | | | | | $\phi_{7,7}$ | $\phi_{7,8+}$ | — | — | — | — | — | — | — | — | — | — | — | — |
| | | | | | | | $\phi_{8,8+}$ | — | — | — | — | — | — | — | — | — | — | — | — |
| | | | | | | | | — | — | — | — | — | — | — | — | — | — | — | — |
| | | | | | | | | | — | — | — | — | — | — | — | — | — | — | — |
| | | | | | | | | | | — | — | — | — | — | — | — | — | — | — |
| | | | | | | | | | | | — | — | — | — | — | — | — | — | — |
| | | | | | | | | | | | | — | — | — | — | — | — | — | — |
| | | | | | | | | | | | | | — | — | — | — | — | — | — |
| | | | | | | | | | | | | | | — | — | — | — | — | — |
| | | | | | | | | | | | | | | | — | — | — | — | — |
| | | | | | | | | | | | | | | | | — | — | — | — |
| | | | | | | | | | | | | | | | | | — | — | — |
| | | | | | | | | | | | | | | | | | | — | — |
| | | | | | | | | | | | | | | | | | | | — |

$\phi$ = a→z; $\phi$→9; A→Z

It will be appreciated that such a matrix has an infinite possible number of entries. However, as indicated in the above representation of the matrix, it has been found sufficient to truncate the matrix and use only a very few of the potential PICs represented by such a matrix. For instance, in the above representation only those 48 entries actually shown are utilized for this exemplary embodiment. Furthermore, it should be noted that the last 7 entries of the last full column of entries in the above matrix has been truncated so as to, in effect, include an overlay of any potential entries to the right of that element in that particular row. For instance, the entry $\phi_{2,8+}$ indicates that this particular PIC represents the second character of any word having 8 or more characters therein.

Accordingly, in the exemplary embodiment utilizing only 48 different matrix entries, and where $\phi$ takes on any one of the 62 possible character values noted above, it follows that there are 2,976 PICs in all. (i.e., $48 \times 62 = 2,976$).

Thus, in the exemplary embodiment depicted by FIGS. 1 and 2, there would actually be 2,976 arrays wherein array No. 1 might correspond to PIC $a_{1,1}$; array No. 2 might correspond to PIC $a_{1,2}$; array No. 3 might correspond to PIC $a_{1,3}$; array No. 4 might correspond to PIC $a_{1,4}$; etc., on through the remaining 2,972 PICs. As should now be appreciated, in this exemplary embodiment, since there are 2,976 PICs in total, the retrieval file will comprise 2,976 possible binary bits for each record in the base data file.

Accordingly, if the base data file comprises 100,000 records, the retrieval file will, in turn, comprise 297.6 million bits of binary coded information. Of course, as should now be appreciated, one can selectively reduce the number of PICs in the retrieval file for a given application unless an unacceptable or undesirable loss in retrieval precision would accompany such a reduction or reorganization of PICs for the particular data base in question.

As should also be appreciated, the retrieval file might comprise machine readable data such as magnetically encoded on typical conventional magnetic disc drives, magnetic tapes, magnetic core storage arrays, etc. Furthermore the retrieval file may be both machine readable and humanly readable if it is stored in the form of arrays of photographic images, for example wherein each element is coded as the presence or absence of a transparent or non-transparent area in a film, etc.

In any event, once the retrieval file has been constructed, it may be utilized for accessing desired ones of the records in the base data file 100. For example, the input search data depicted at 106 might form still another (but much smaller) file, a search data file 108. Typically, the input search data would comprise a portion of a word, a whole word or a group of words which the user expects to be found within the record he desires to access.

Accordingly, the search data file may itself be processed in much the same manner as was the base data file in the original construction of the retrieval file. That is, the search data file is analyzed with respect to the same set of PICs represented by the set of arrays in the retrieval file 104. Once the particular ones of these PICs present in the search data file have been identified, then the corresponding arrays from the retrieval file representing these particular PICs are selected and individual elements or binary values thereof in all of the selected arrays are compared with one another to identify the addresses of records in the base data file having all the desired PICs.

For example, as shown in FIG. 2, the record stored at location or address 0304 is the only record having all of PICs 1 through 4. On the other hand, the record stored at location or address 0000 does not have PIC 3 but does have PICs 1, 2 and 4. As should now be apparent, the desired set of PICs identified by processing the input search data 106, 108 corresponds to a set of arrays in the retrieval file and by machine or otherwise comparing the binary values of corresponding elements in each array of the set, it may be easily determined that only records having certain now-identified addresses comply with the request or inquiry at 106. Of course, the inquiry information at 106 may well effectively request the absence of some particular PIC as well as the presence of some particular PIC, etc., asshould be appreciated.

Acordingly, as indicated in FIG. 1 at 110, the desired retrieval arrays are selected and compared to identify addresses of desired records whereupon the accessible base data file 100 in accessed as indicated at 112 in FIG. 1 to select the corresponding records and to display them as indicated at 114. Of course, the display may be in a form of a projection of a photographic image, a cathode ray tube or other electronic display of machine readable records, hard copy generated either from machine readable or photographic image records, etc.

Once the input search data 106 is presented, it is thus only necessary to identify the particular PICs corresponding thereto, to select the arrays corresponding to these PICs to compare the corresponding elements of the selected set of arrays thus identifying the location of desired records in the base data file and to then select and display the corresponding records.

If desired, all of these steps may be manually performed. Alternatively, some or all may be machine implemented. For instance, the previously referenced U.S. Pat. No. 3,354,467 to Beekley teaches apparatus that can be utilized to automatically perform the comparison step of these search and retrieval processes.

In the preferred embodiment and preferred mode of the invention, the identification of desired PICs, selection and comparison of corresponding arrays and identification of the addresses of desired records is all automatically accomplished by a programmed general purpose data processor in conjunction with conventional input-output devices and digital information storage devices. Furthermore, in the preferred embodiment of the invention, the accessible base data file or records 100 is itself a conventional storage device which may be automatically accessed by the programmed general purpose data processor such that the selection of a particular record at the identified address and its display are also automatically performed.

Figure 3:
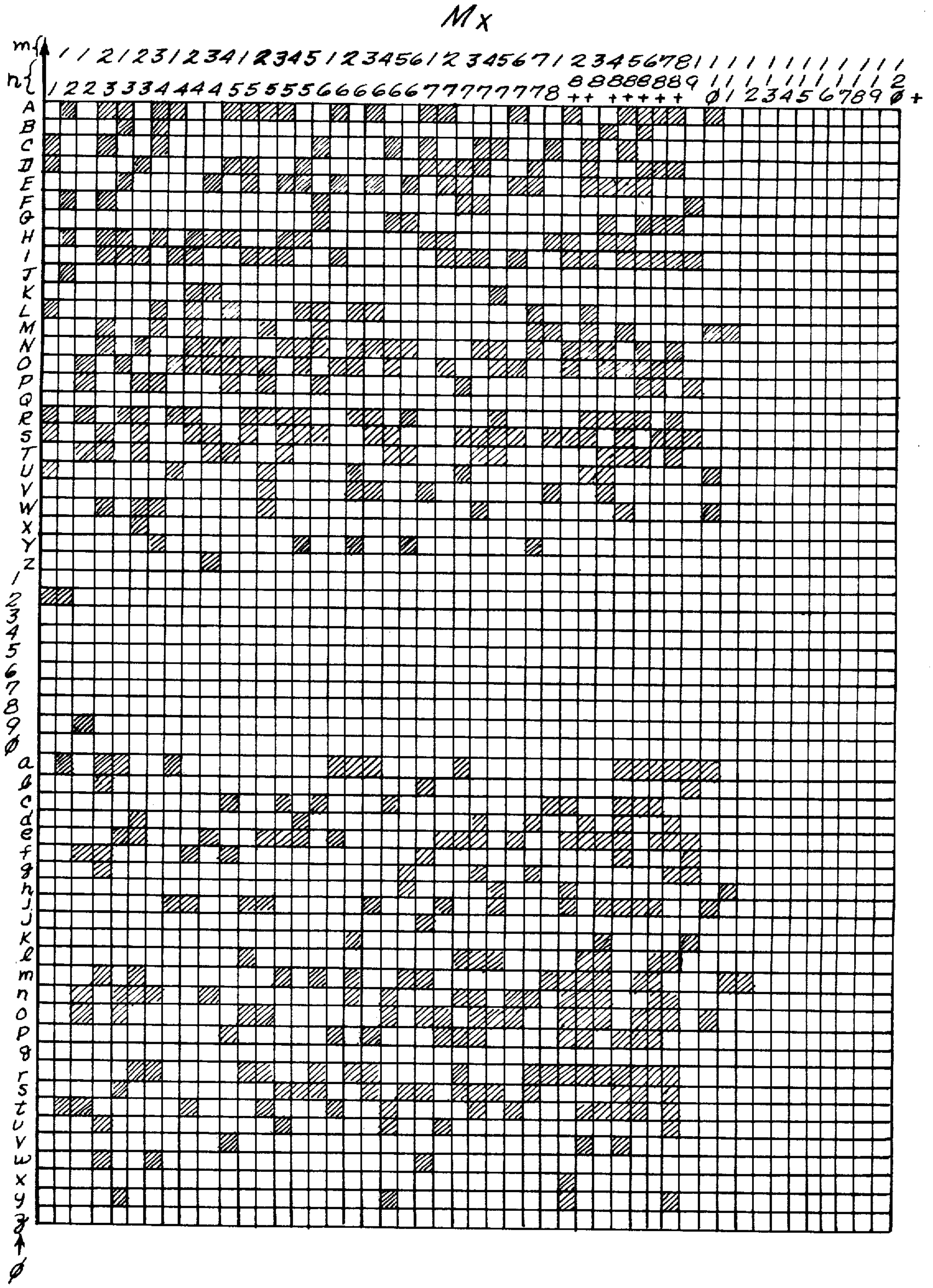
FIG. 3 is a binary coded matrix showing explicitly the binary coding required for an exemplary embodiment of this invention with respect to a particular text reproduced in the detailed description given below.
Figure 4:
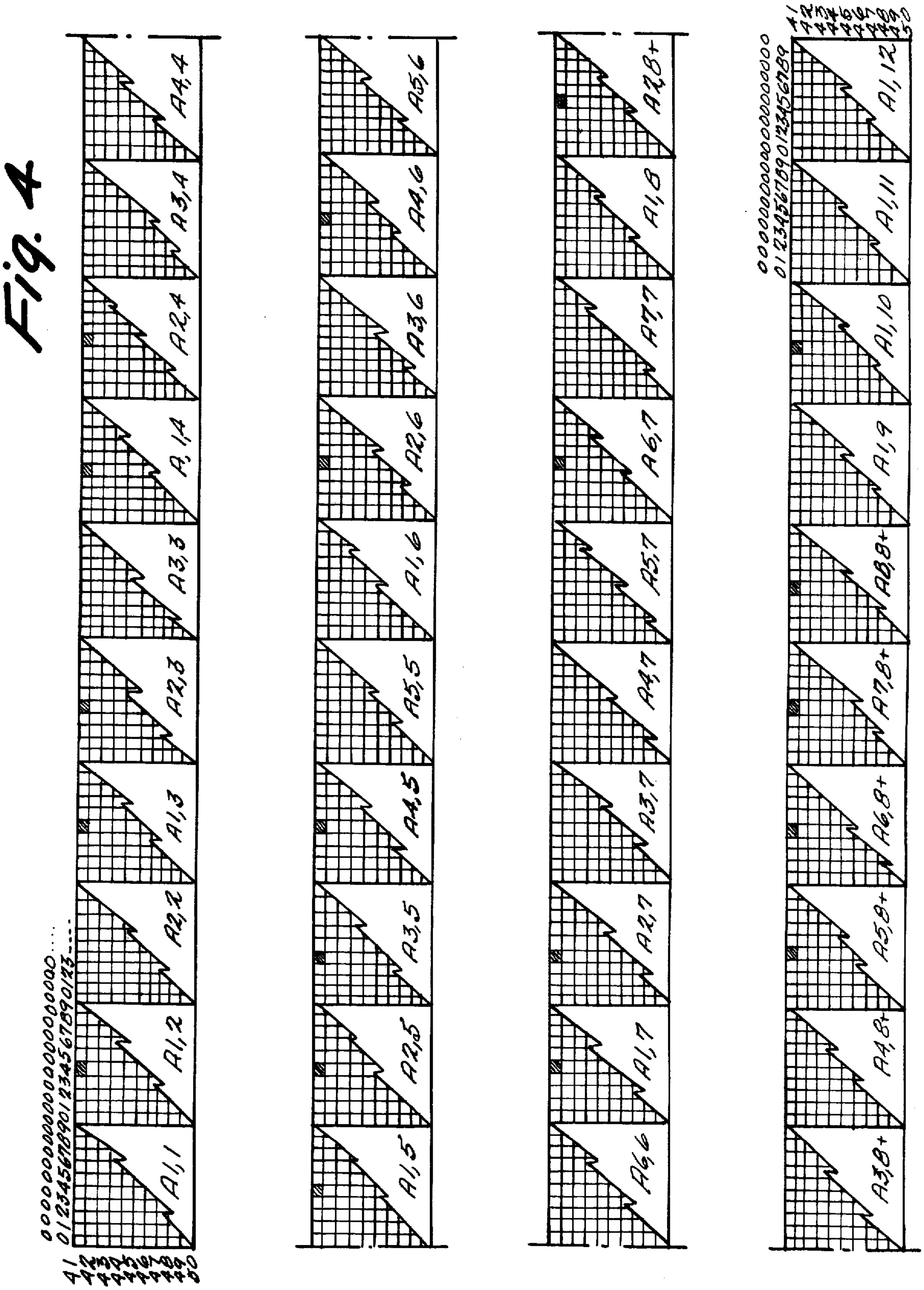
FIG. 4 is a composite schematic showing of a few of the arrays in an exemplary system of binary coded arrays corresponding to the binary coding shown in matrix form at FIG. 3.

As a specific example of the above-described process for constructing the binary coded arrays in the retrieval file, FIGS. 3 and 4 have been prepared as a specific example showing the coding of the following text which is set forth here as an example of the text of any one of the records in the base data file 100 in FIG. 1. This text may, of course, be of any given length but will, in the exemplary embodiment, always be encoded in binary form in the retrieval file depicting the presence or absence of each of the individual 2,976 PICs. For instance, as shown in FIG. 3, only a relatively few of the 2,976 potential PICs are present in this exemplary text:

1 million ransom note Police press search for 2 men and missing wife of millionaire AP Minneapolis Minneapolis FBI Virginia Piper Harry C Jr Orono Hennepin County Jaffray Hopwood brokerage investment firms kidnapers Lake Minnetonka Mrs George Partridge III Addision L Tad David Lewis Associates Senate votes to ban war use of rain making AP Washington burning of forests U S weapons Indochina amendment Sen Gaylor Nelson D Wis Defense Secretary meluin R Laird North Vietnam cloud seeding Loas Cambodia Ho Chi Minh Trail weather modification activities House chemical sprays Firestorm operations reported Pentagon Southeast Asian jungles New York Times firestorm operations Sherwood Forest Hot Tip John Tower R Tex military helicopters Ft Sam Houston Tex Ft Lewis Wash Carson Colo Luke Air Force Base Ariz Mountain Home Idaho Work starts on gym Columbia University New York AP gymnasium campus Morningside Park Chicken exemption opposed WASHINGTON AP Cost Living Council price controls Due to space considerations, and in an effort to show all 2,976 PICs, these entries have been shown in FIG. 3 in two-dimensional form wherein the $\phi$ or alphabetic value of the character is represented by the ordinate and the character position in words having 1, 2, et. seq. total characters is represented by the abscissa.

It should be noted that this particular text example as coded in FIGS. 3 and 4 represents an extract from some full text record. Nevertheless, even this extract contains considerable redundancies which are irreversibly coded in the set of PICs shown in FIG. 3. For instance, the exemplary text includes the words TAD, TIP and TEX. Since these are all three character words with the initial character of T, it follows that there is only a single binary representation for these initial letters of these three words in the PIC matrix as shown in FIG. 3. Furthermore, since the word "SAM" is also included in this text, it is clear that the second letter A of SAM and the second letter A of TAD are likewise represented by but a single binary coded PIC in the matrix shown in FIG. 3. Similar comments can be made for many of the entries as will become apparent by a study of the above quoted text with respect to the explicit binary coding of the PIC matrix shown in FIG. 3.

Actually, the 2,976 PICs in the exemplary embodiment are not associated together as indicated for exemplary purposes in FIG. 3. Rather, as indicated previously in FIGS. 1 and 2, the PICs correspond to individual arrays of elements which elements, in turn, correspond to the address or location of particular records in the base data file. Accordingly, FIG. 4 is simply a redrawing of FIG. 3 showing a portion of several of the 2,976 arrays in the exemplary embodiment of FIGS. 1 and 2 that would result from the encoding of the above noted document or text.

For instance, assume that this particular record is stored in location 4104. Accordingly, as indicated in FIG. 4, the array corresponding to PIC $A_{1,1}$ would contain a binary code indicating the absence of this particular PIC in the record located at address 4104. However, array corresponding to PIC $A_{1,2}$ would contain the other value of binary coding (indicated by cross-hatching in FIG. 4) indicating the presence of this particular PIC in the document located at address 4104 (for instance, this coding would result because the word "AP" appears in the text). The other entries for the arrays shown in FIG. 4 may be similarly confirmed by reference to the text and to FIG. 3. Of course, there would be 2,936 additional arrays in the actual retrieval file of FIGS. 1 and 2.

It should also be noted at this point that the arrays of the retrieval file might not be disposed in planar organizations such as schematically indicated in FIGS. 1 and 2. In some embodiments, such a planar organization of arrays might enhance the comparison process for corresponding elements in selected arrays, etc. However, it should be particularly noted that it is not necessary to associate the arrays with planar organizations as indicated for explanatory purposes in FIG. 1 and 2.

In fact, in the preferred embodiment where the retrieval file comprises arrays stored as machine readable magnetically encoded data on conventional magnetic discs, etc., each array would in fact simply comprise a string of binary bits associated with one another in a conventional manner that might or might not involve any particular predetermined physical locations on the magnetic discs, etc.

As should now be appreciated, each word in the text of a record can be easily analyzed within conventional general purpose data computing equipment to detect its language structure such as the alphabetic value of each character and its position within the word and the number of characters in the word, etc., and thus defining the binary value of each of 2,976 PICs with respect to that given document. Accordingly, all of the binary coding shown in FIG. 3 may be quickly and easily machine generated from the above quoted text corresponding thereto.

Thus, the construction step 102 shown in FIG. 1 need not be manual but can comprise entirely machine processing once the appropriate information from the base data file is itself in machine readable format. Similarly, all of the records in the base data file 100 can be processed in this manner to construct all of the arrays in the retrieval file 104 as should now be apparent.

In a similar manner, any input words or portions thereof may be automatically analyzed to determine its language structure such as the character values and their positional locations within the word of a particular size, etc., thus automatically identifying the particular PICs corresponding to the input search data. The arrays corresponding thereto may then be automatically selected by the programmed computer and the corresponding elements therein compared to identify the addresses of desired records.

Of course, all of these steps could also be carried out in an entirely manual operation and/or various degrees of automatic processing might be substituted for such manual operations. For instance, the arrays might be maintained as plates of film images which are manually or semiautomatically extracted and compared with automatic photoelectric reading of the superimposed binary coded elements, etc.

For some applications, it may be preferable to decrease the number of PICs but to generate and maintain a plurality of retrieval files for such PICs. That is, a first retrieval file for the given set of PICs would correspond to a particular predetermined portion of the information on the base data file or stored records, while the second retrieval file would be coded to reflect the information content of another predetermined portion of such records, etc. For instance, if the base data file comprises telephone directory records, one might want to organize several retrieval files wherein one of the retrieval files relates to the name associated with each telephone directory record and wherein another retrieval file relates to the street address associated with each telephone record, etc. However, as may also be appreciated, these separate retrieval files for a common data base may simply comprise separate groups of PICs within the same retrieval file. In short, the characteristic of language location or meaning within each record may be used in combination with alphabetic values, position within words, etc., as a part of the language structure represented by the PICs in the retrieval file.

That is, this may also be thought of as a single retrieval file wherein a first set of PICs includes the characteristic that it is associated with the name portion of each corresponding record in the base data file whereas another segment of PICs in the retrieval file includes the characteristic that it is associated with the street address portion of such records, etc. In any event, when a retrieval file or files are so organized, the input search data may also be organized accordingly and noted as relating to the name portion of such records or to the street portion of such records, etc., with the corresponding selection of arrays from the retrieval file being made from that particular portion of a retrieval file or a particular retrieval file, as appropriate, thus increasing the precision with which retrieval is accomplished.

If the entire text of each record in the base data file has been utilized in constructing the binary coded arrays in the retrieval file, then every word in the text of each record in a "key word". However, these key words can be used as input queries in any given order, etc., without affecting the output results. Furthermore, the selection of key words is not a function of some intermediate interpreter who has beforehand selected only a few of the words from the text of the record for use as such "key words".

The retrieval file may be made more flexible by modifying the selection of PICs so as to, in affect, overlay smaller character groups on larger character groups in the coding process. In effect, this has already been done in the exemplary embodiment with respect to word lengths of eight or more characters as previously noted. However, it is also possible to carry the process even further, thus decreasing the total number of PICs required for the retrieval file and saving storage space, etc.

Of course, this will increase the coding ambiguities inherent in the retrieval file and thus decrease the precision of retrieval capability to some extent. However, it will at the same time increase the flexibility of the retrieval system since one is then capable of retrieving with input or inquiry words without knowing exactly how many characters are in the finding word.

That is, for instance, if the retrieval file is related to a base data file of telephone directory records, one may not know the exact spelling or the number of characters in a person's name on the particular record desired. However, it is usually possible to provide at least the first few letters of the name for the record being requested, and, if the retrieval file has been coded so as to in effect overlay small character groups on larger character groups, then one may successfully retrieve the desired information even though the total number of characters in the name in question is unknown. Of course, since the coding ambiguities in such a retrieval file are necessarily increased to provide the increased flexibility, the precision with which retrieval may be effected is correspondingly decreased. Accordingly, in addition to the desired name, a retrieval using such a retrieval file may often produce retrieval results calling forth records other than the particular one actually desired. Nevertheless, the accuracy of the recall is still 100 percent in that the desired record will surely be among those that are requested and provided by the retrieval system.

The preferred embodiment involves a retrieval file wherein the PICs are chosen to represent the alphabetic value and relative sequential location of characters in groups of characters such as words contained on record in the base data file. However, it should now be apparent that the selection of PICs can be related to the language structure of the base data file records in other manners as well. For example, if the base data file contains records having many chemical or mathematical formulae, etc., some of the PICs may represent mathematical symbols, operations, quantities, etc. Even particular complete words might be designated as a PIC in a particular retrieval file for a particular application related to some particular base data file of records, for which such a PIC selection would be advantageous. For instance, if the base data file comprises clippings from a newspaper, one of the PICs in the retrieval file might well represent the presence or absence of an accompanying picture associated with the text on a given record, etc. Another PIC might relate to whether or not the record in question is an obituary or whether or not the particular record in question was written by a particular columnist, etc. In short, depending upon the type of base data file involved and the responsiveness desired by the user, one may adapt the set of PICs in a particular retrieval file to the particular language structure of the base data file records in many different ways to achieve particular desired end results as should now be apparent.

One exemplary embodiment of apparatus for practicing this invention is shown in FIG. 5 as comprising a programmed computer 120 together with associated peripheral equipment such as magnetic disc drive and storage units 122, 124; a cathode ray tube display and keyboard input/output unit 126 and possibly a paper tape punch and reader input/output unit 128 and/or other peripherals (not shown) such as magnetic tape drives. The paper tape or magnetic tape peripherals may be utilized, for instance, in inputting control program(s) to the magnetic core of computer 120 and thus conditioning it or adapting it for operation according to this invention. In this particular embodiment, the accessed base data file of records and the retrieval file of binary coded arrays are both stored on the magnetic disc units 122, 124 and/or further magnetic disc storage units as required. The CRT display and keyboard unit 126 is then used for inputting the search data or inquiry information and for displaying the retrieved record as a result of such inquiries.

Another exemplary embodiment of equipment for practicing this invention is shown in FIG. 6. Again, a programmed computer 130 is associated with the magnetic disc device 132 and a CRT display and keyboard input-output device 134. In addition, programmed computer 130 interfaces with a film image storage and retrieval device 136, which is adapted to store optical images of a set of information bearing records at predetermined addresses and is adapted for automatically delivering such information (for example at a display unit 138) corresponding to the information content of any given record when provided with the address of that given record by a computer 130. Such devices are available, for instance, to handle microfiche images from companies such as Image Systems at Culver City, California or Remington Rand. In this exemplary system, the base data file of records in accessible form would be stored at 136 while the retrieval file of binary coded arrays would be stored on the magnetic disc unit(s) 132. Inquiry information would then be input from the CRT display and keyboard unit 134. The programmed computer 130 would then analyze the inquiry information, identify the PICs represented thereby; select and compare the corresponding retrieval arrays from the retrieval file to identify the addresses of the desired records and provide that address information to the storage and retrieval device 136 whereupon the requested records from the identified addresses would be displayed at 138. Of course, the display 138 might include copying means, etc., as appropriate and/or as desired.

TELEPHONE DIRECTORY ASSISTANCE RETRIEVAL SYSTEM

A. In General

This section describes in detail a specific exemplary implementation of the invention that has actually been experimentally used in retrieving existing machine readable telephone directory records to provide an efficient telephone directory assistance service.

The apparatus for this embodiment corresponds to that shown in FIG. 5 with the addition of three magnetic tape drives interfaced with computer 120 for initial processing of the telephone directory records since the information happened to be readily available in machine readable form on magnetic tapes.

In this exemplary embodiment, computer 120 is a Model PDP 8/E computer available from Digital Equipment Corporation, Maynard, Massachusetts. Magnetic disks 122, 124 comprises a Model DF-32 D disk file (32 K words) and control therefor also available from Digital Equipment Corporation and DD 14/2 disk drives (2314 type) and control therefor available from Diva, Inc., Eatontown, New Jersey. The CRT display and keyboard 126 comprises an S4300 Model CRT display unit available from Ontel Corporation, Planview, New York. Paper tape punch and reader 128 is a PC 8-E Model paper tape reader/punch and control therefore available from Digital Equipment Corporation. In addition, a model 1045 NRZI magnetic tape transport (9 track, 800 bpi) and a Model 1045 PE magnetic tape transport (9 track, 1600 bpi) both available from Wangco, Santa Monica, California are also provided together with a Model 5091-P8 magnetic tape controller available from Datum, Inc., Anaheim, California. Of course, all controls have interface to the PDP 8/E mini-computer.

The structure and functioning of this computer equipment, per se, should already be apparent to those in the art. If not, reference may be had to "Small Computer Handbook", published by Digital Equipment Corporation, Maynard, Massachusetts and to "S4200 (4300) User Manual" published by Ontel Corporation, Plainview, New Jersey.

The computer 120 is a "mini" computer and is specially adapted to cooperate with the above-noted peripherals according to this invention by programmming it as explained below. The programming is in the standard assembly level programming language recommended by the manufacturer and explained in detail in published literature such as "Introduction To Programming", published by Digital Equipment Corporation, Maynard, Massachusetts; "Software Manuel, Magnetic Tape Controller", publication No. 1250.0 by Datum, Inc., Anaheim, California; and "Programming Manuel for Diva Disc Systems Used With PDP 8/E" published by Diva, Inc., Eatontown, New Jersey.

The programming or "software" used in this exemplary embodiment is broadly indicated in schematic form at FIG. 7. Since the telephone directory records are, in this instance, already in machine readable form on magnetic tapes 140, this data is first converted to a standard format at 142 before the accessible base data file 100 and retrieval file 104 are constructed at 144 (including the step shown at 102 in FIG. 1) and stored on magnetic disc (122, 124 in FIG. 5).

As will be appreciated, the conversion 142 and construction 144 shown in FIG. 7 are accomplished once in the start-up of the whole information storage and retrieval system and thereafter only as necessary to take into account changes in the base data file. Such changes may be accommodated by a complete reconstruction process based on a whole new input file of records 140 or as a special update modification of the accessible base data file and retrieval file already stored on magnetic disc. Since suitable updating programs for file maintenance purposes are well known, per se, in the art, and since same are actually not necessary to practice this invention, no detailed description of such updating programs will be given.

Once the retrieval file and base data files are in existence, then the system is ready for retrieval processing as shown at 146 in FIG. 7. Here, inquiry inputs from the CRT display and keyboard unit 126 are accepted and retrieved telephone directory data are shortly thereafter displayed thereon.

These three basic areas of this exemplary embodiment will now be explained in more detail.

B. Conversion.

B1. In General.

Figure 8:
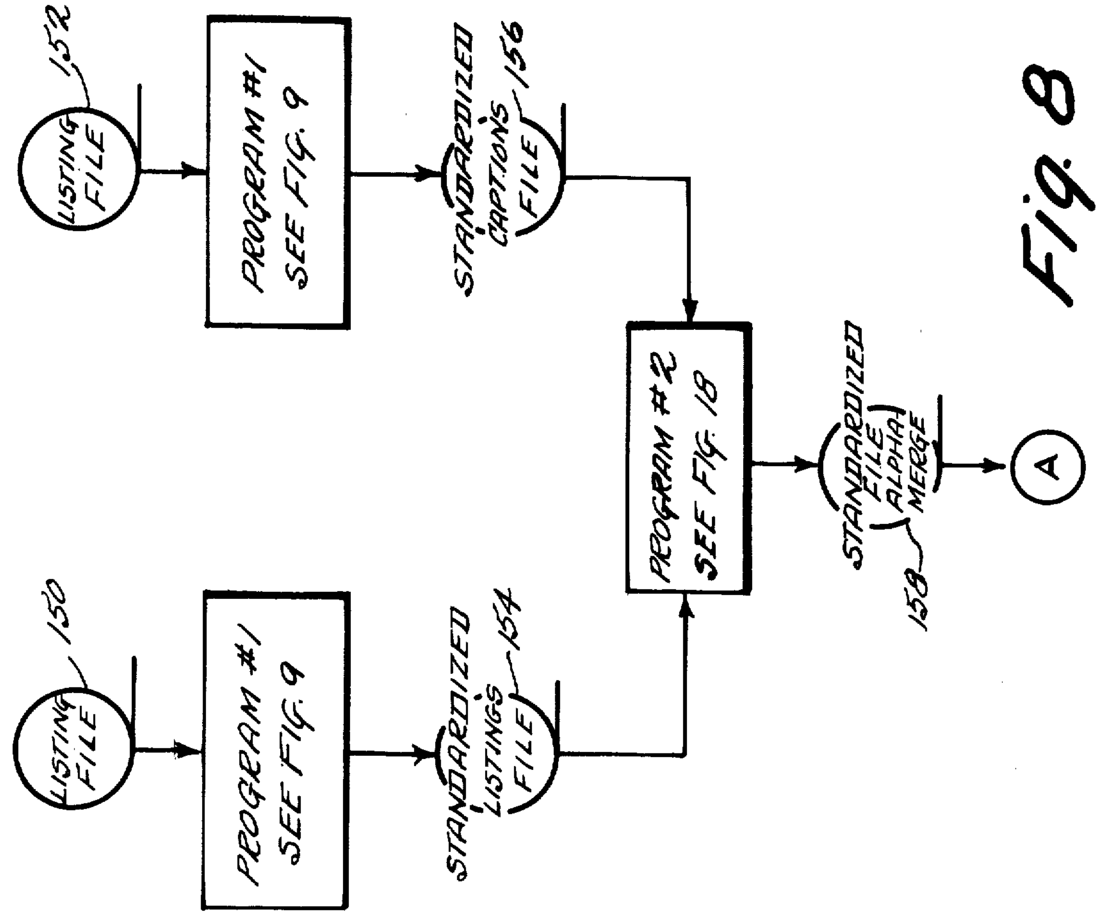
FIG. 8 is a more detailed block diagram of the conversion block shown in FIG. 7.

The conversion 142 is shown more explicitly in FIG. 8. It comprises two programs and merely serves to enter all relevant information into the system in a standardized format from pre-existing available data on magnetic tape.

The pre-existing data base is magnetic tape oriented and comprises two files: listings 150 and captions 152. Both are processed by Program No. 1 to produce standardized files 154, 156 having standard formatting, coding, etc. These standardized tapes are then merged by Program No. 2 into a final file 158 which is formatted for use by the retrieval and base data file construction program segment 144.

To increase the flexibility and speed of the final retrieval process, the standardized file 158 is actually separated into alphabetic segments, each of which is to be considered as a separate base data file 100 and for each of which a retrieval file(s) 104 will be constructed. The alphabetic segments are chosen so as to result in roughly equal sized base data files. In the exemplary embodiment, 16 alpha groupings or segments were chosen:

16 Alpa Groupings

1. E-L
2. Mi-N
3. Br through Bz-W
4. B through Bq-Cr through Cz-Q
5. Z-I-P
6. Ca through Cq
7. U-J-K
8. V-R
9. D-Y-X
10. G
11. H
12. F
13. S through Sn
14. T-A
15. O-So through Sz
16. M-Mh B2. Description of Input Magnetic Tape Files 150,152

1. Physical Characteristics: 9 track, 800 bpi, regular mode.
2. Structure: Variable length blocks, variable length records per block, maximum characters per block-2048. Record terminator ($477_8$). Block terminator ($75_8$).
3. Record Structure:
   - A. Fixed Length Control Field (58 characters length)
     - 0: N/A
     - 1: field code ($47_8$)
     - 2–4: N/A
     - 5–7: NPA (exchange)
     - 8: Borough Code
     - 9–15: Telephone #
     - 37: listing type
     - 38–57: N/A
   - B. Full name field- 0: field code
   - C. Full title- 0: field code
   - D. Full desig.- 0: field code
   - E. Supp Sort Criteria (36 characters length)
     - 0: field code
     - 1–29: N/A
     - 30–36: Tel # or Z for non pub
   - F. Caption control # (N/A)- 0: field del
   - G. Listing name
   - H. Listing title
   - I. Listing desig.
   - J. Listing street
   - K. Listing house #
   - L. Listing house # suffix
   - M. Listing locality
   - O. Remainder of fields: N/A
4. Character Representation
   - $23_8$-$34_8$: characters 0–9
   - $40_8$-$71_8$: characters A–Z
   - Note: that these characters may also include parity bit B3. description of Standardized Magnetic Tape Files 154, 156, 158

1. Physical Characteristics: 9 track, 1600 bpi, special core dump mode.
2. Structure: Fixed length block (512 words), one record per block.
3. Record Structure:
   - A. Header (16 words)
     1. Locations 2,3,4-double precision sequence count, mpf (N/A).
     2. Location 11- non pub info (YES=4000; NO=0)
     3. Location 12-listing type (Bus=20; Prof=10; Res=0)
     4. Other locations- N/A
   - B. NPA (area code)- 3 words
   - C. Telephone #-5
   - D. Borough- 2½
   - E. Full Name- 73½
   - F. Full Title- 7½
   - G. Full Designation- 19½
   - H. Listing Name- 67½
   - I. Listing Title- 7½
   - J. Listing Designation- 19½
   - K. Street- 7½
   - L. House #- 5
   - M. House # Suffix- 3½
   - N. Locality- 16½
   - O. Blank- 248
4. Standardized Coding Structure

| Character | Octal | Character | Octal |
|---|---|---|---|
| A | 33 | 0 | 65 |
| B | 34 | 1 | 66 |
| C | 35 | 2 | 67 |
| D | 36 | 3 | 70 |
| E | 37 | 4 | 71 |
| F | 40 | 5 | 72 |
| G | 41 | 6 | 73 |
| H | 42 | 7 | 74 |
| I | 43 | 8 | 75 |
| J | 44 | 9 | 76 |
| K | 45 | Space | 77 |
| L | 46 | @ | 0–77* |
| M | 47 | ( | 0–50* |
| N | 50 | ) | 0–51* |
| O | 51 | " | 0–75* |
| P | 52 | : | 0–72* |

-continued

| Character | Octal | Character | Octal |
|---|---|---|---|
| Q | 53 | $ | 0–44* |
| R | 54 | % | 0–45* |
| S | 55 | ; | 0–73* |
| T | 56 | & | 0–46* |
| U | 57 | ' | 0–47* |
| V | 60 | - | 0–55* |
| W | 61 | * | 0–52* |
| X | 62 | . | 0–56* |
| Y | 63 | / | 0–57* |
| Z | 64 | # | 0–43* |
| | | , | 0–54* |
| | | field delimiter | 0–41* |

* These characters are double coded.
Note:
Blanks are double zeroes.

B5. Functional description of Conversion Programs

1. Program #1
   - A. Obtain relevant elements from the input tape data base
     1. NPA (area code)
     2. Borough
     3. Telephone number; non-pub info.
     4. Full name
     5. Full title
     6. Full designation
     7. Listing name
     8. Listing title
     9. Listing designation
     10. Street
     11. House number
     12. House number suffix
     13. Locality
     14. Listing sequence
     15. Non-pub info.
     16. Listing type
   - B. Format to Standardized Specifications
     1. Magnetic tape output; fixed length (512) blocks; one record per block; 9 track; 1600 bpi; special core dump mode.
     2. Standardized codes
2. Program #2
   - A. Merge the standardized captions and listings files.
   - B. Add blank records for editing maneuverability.
   - C. Split into 16 separate and distinct alpha groups.

B6. Detailed Description of Program No. 1

Figure 9:
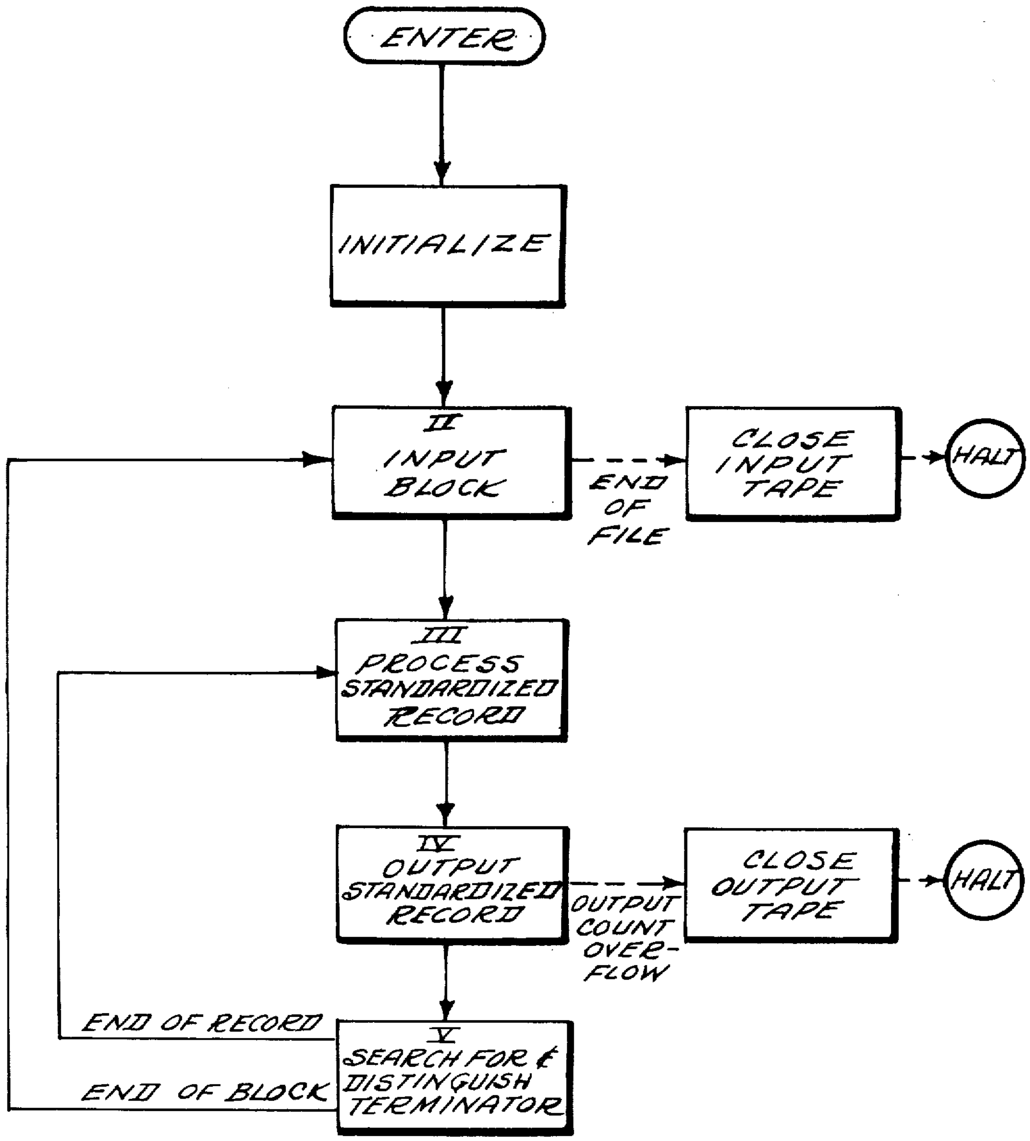
FIG. 9 is a more detailed block diagram of Program No. 1 shown in FIG. 8.
Figure 12:
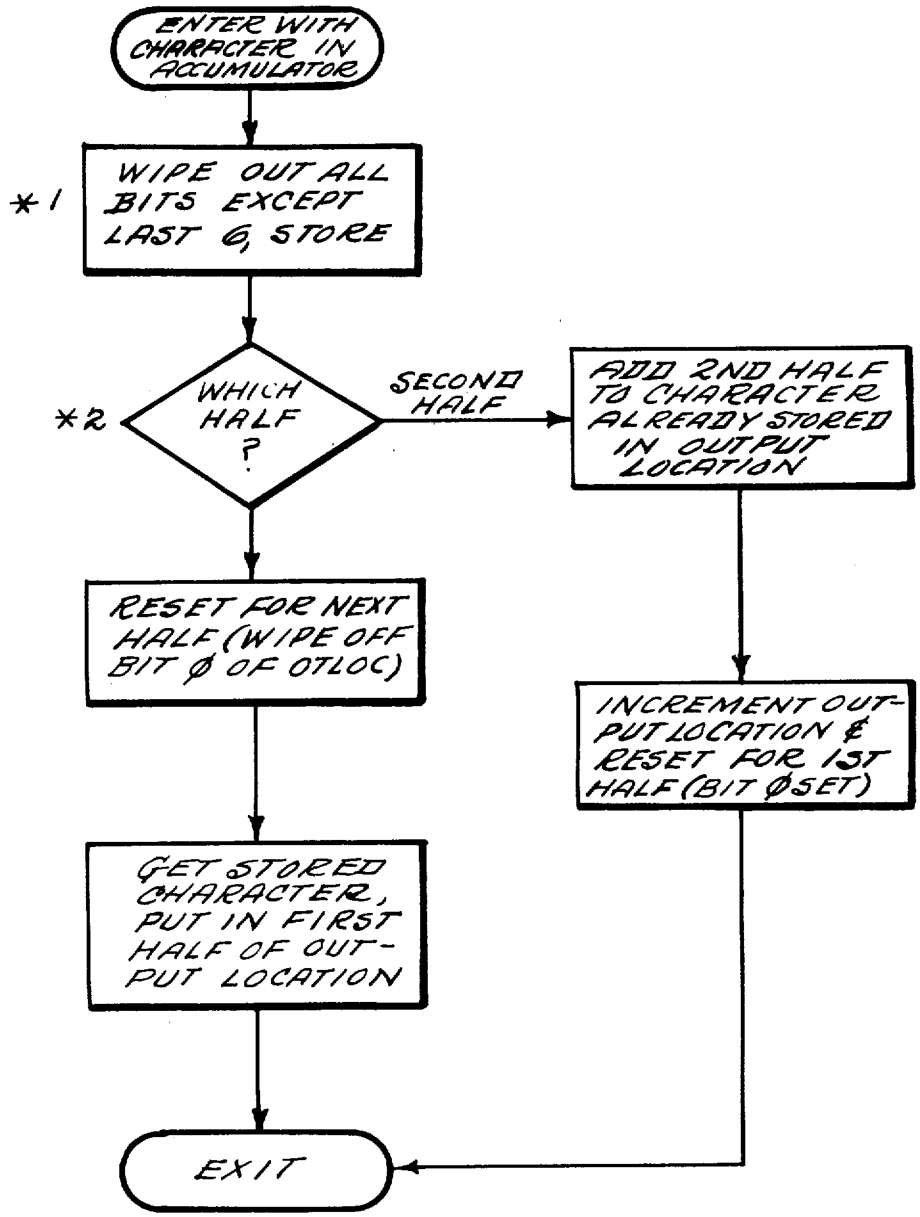
Figure 17:
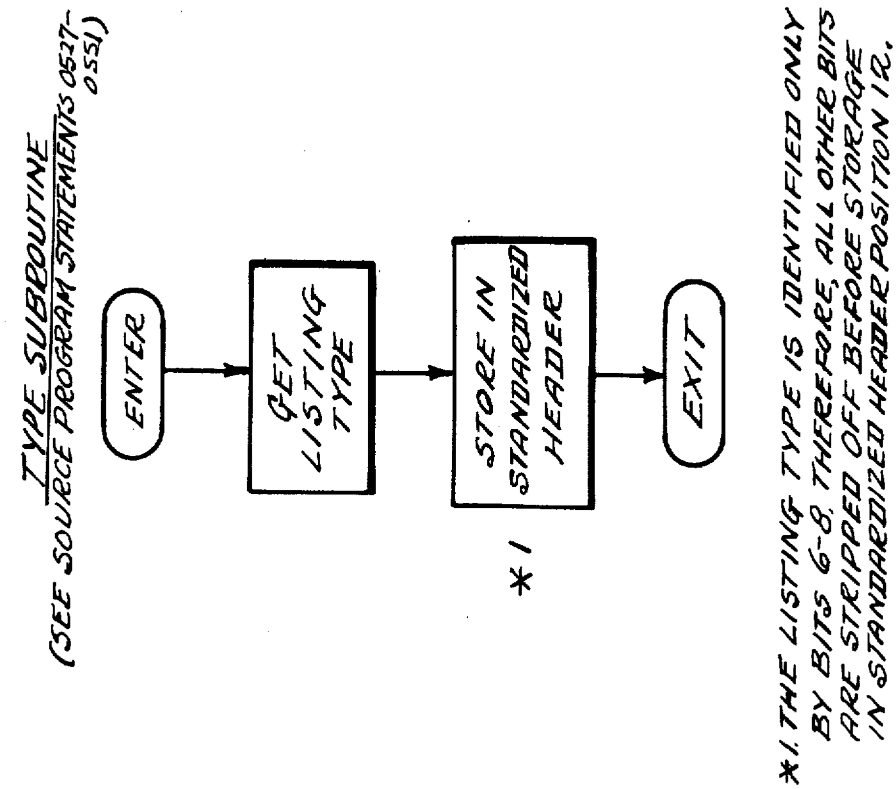
Figure 13:
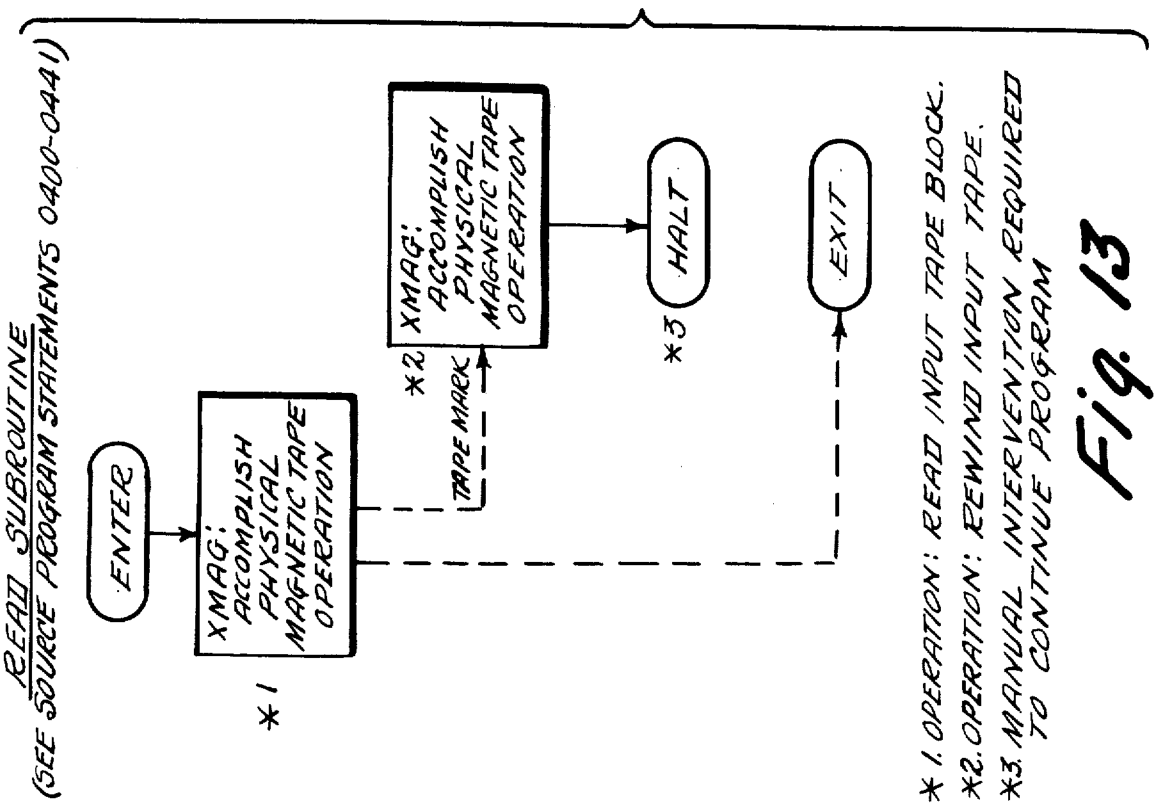
Figure 14:
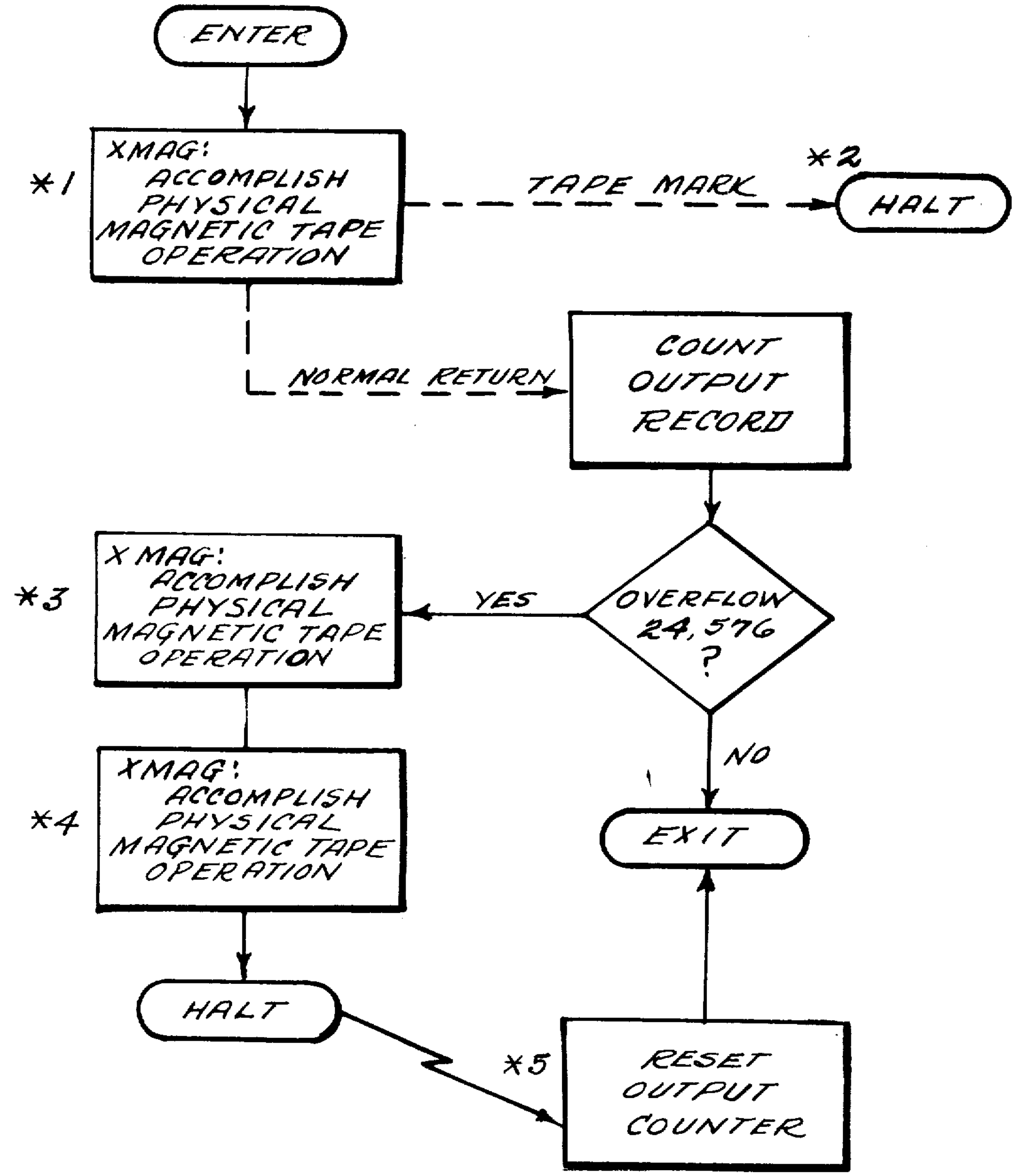

Program No. 1 is shown in block form at FIG. 9 with subroutines utilized therein detailed in FIGS. 10–17. An explicit listing of the assembly level source program language for Program No. 1 and all related subroutines follows. With respect to FIG. 9, it will be noted that program sections I–V correspond to specific listing statement numbers:

| Section | Instruction Statements |
|---|---|
| I | 0200–0213 |
| II | 0214–0216 |
| III | 0217–0260 |
| IV | 0261 |
| V | 0262–0273 |

These five program sections are functionally described below as an introduction to the explicit source program listing:

I. Initialize

A. OH, LH are a double precision counter. This counter is used to allow a maximum 24,576 records to be output on a magnetic tape in the initial standardized file.

B. SEQH, SEQL are a double precision record sequence counter. It is stored in each record in position 2 and 3.

C. REOF is a single precision counter. It is used to allow a normal return from XREAD upon encountering the first two tape marks (after file and header labels). XREAD concludes tape processing upon encountering the third.

D. Four XREAD commands are dummy commands. They essentially pass the tape over the header and file labels and their associated tape marks.

II. XREAD: Input tape block. Inputs of the input tape file. If REOF signals that the third tape mark has been reached, the input tape is rewound and the proram halts at location 416, otherwise normal return. XREAD merely sets up the parameters for the magnetic tape operation, sends control to XMAG which accomplishes the physical magnetic tape operation, and received control from XMAG at completion and acceptance of the operation. XMAG also delineates tape mark vs normal record.

III. Standardized processing

A. XBUF: pads standarized record before data entry.
   1. Pads data portion with spaces
   2. Pads remainder with zeroes B. Sequence # and mpf put into standardized header (locations 2, 3, 4).

C. The desired elements are retrieved from the input record by using the GETFLD and DOFLD subroutines. GETFLD merely positions the input data pointer at the beginning of the next field encountered. DOFLD, assuming the data pointer is at the beginning of the data field, goes to a list to get the number of characters desired transferred and the location of the DRC field to which the NYT field will be transferred. Exit from the subroutine is made upon encountering the next field delimiter in the input data. Also, at the time of transfer, the codes are changed to the standardized code (via PUTCHR) which is a 6 bit code (except for double codes).

IV. XWRITE: Output standardized record. Uses OH and OL as output counters. Upon overflow, the output tape is given a tape mark and rewound and the program halts at location 435. Note that XMAG is the subroutine which actually accomplishes physical magnetic tape operations.

V. Search and Distinquish Terminator. The remainder of the input record is scanned until reaching either and end of block code ($75_8$) or an end of record code ($477_8$). End of record causes the program to go to Section III of the mainline, while end of block causes the program to go to Section II.

Program No. 1

```
      DSV=7002
      MQ =7421
      MQ =7501
      SVP=7521
      CDF =6201
      CDF =6211
      CDF2=6221
      DMCR=6517
      DCBRH=6501
      DCBRL=6500
      DSSRH=6503
      DSSRL=6502
```

```
ESA0=6511
ESR1=6515
/CR=6516
DMAR=6514
CSR=6512
AIRL=6504
AIRH=6505
DSRL=6506
DSRH=6507
F=6004
CF=6005
IF=6244
B=6234
IO=6003

XTAB
        *20
020  0600  XMAG,    MAG
021  0442  XWRITE,  WRITE
022  0400  XREAD,   READ
023  0456  XBUF,    BUF
024  0000  SEQL,    0
025  0000  SEQH,    0
026  3003  FL,      3003
027  3002  FH,      3002
030  3004  MPF,     3004
031  0000  CNT,     0
032  0000  OTLOC,   0
033  0000  TMP,     0
034  0000  REOF,    0
035  0000  O1,      0
036  0000  O2,      0

037  1177  C1177,   1177
040  7703  CM75,    -75
041  7376  CM402,   -402
042  7304  CM474,   -474
043  0041  C41,     41
044  1000  C1000,   1000
045  3777  C3777,   3777
046  7700  C7700,   7700
047  7772  CM6,     -6
050  0077  C77,     77
051  4001  C4001,   4001
052  7776  CM2,     -2

           PAGE

000  7300  START,   CLA CLL
001  1047           TAD CM6
002  3035           DCA O1
003  3036           DCA O2
004  3025           DCA SEQH
005  3024           DCA SEQL
006  7346  NXTST,   CLA CLL CMA RTL /SET AC = -3
007  3034           DCA REOF
010  4422           JMS I XREAD
011  4422           JMS I XREAD
012  4422           JMS I XREAD
013  4422           JMS I XREAD      /BYPASS LABELS

014  4422  DOBLK,   JMS I XREAD
015  7240           CLA CMA
016  3010           DCA 10  /SET INPUT BUF
017  4423  DOREC,   JMS I XBUF       /INIT OUTPUT BUF
020  2024           ISZ SEQL
021  5223           JMP .+2
```

```
0222  2025          ISZ SEQH
0223  1024          TAD SEQL
0224  3426          DCA I FL
0225  1025          TAD SEQH
0226  3427          DCA I F
0227  7201          CLA IAC
0230  3430          DCA I MPF
0231  1037          TAD C1177
0232  3011          DCA 11
0233  427           JMS G TFLD       /G  TO F ELD 1
0234  47            JMS I XTYPE
0235  2010          ISZ 10
0236  2010          ISZ 10
0237  2010          ISZ 10  /BYPASS 1ST 3 HRS
0240  4304          JMS DO LD        /PR  ESS EXCHAN    (N A)
0241  4304          JMS DO  D        /      "        BO O G
0242  4304          JMS DO LD        /      "        TE  #
0243  4274          JMS G TF D       /G  TO F ELD 2
0244  4304          JMS DO LD        /PR  ESS F LL N ME
0245  4304          JMS DO LD        /      "        "        TITLE
0246  4304          JMS DO LD        /      "        "          SI   TIO
0247  4775          JMS I XN         /PR  ESS N    PUB
0250  4274          JMS G TF D
0251  4274          JMS G TF D
0252  4304          JMS DO LD        /PRO ESS LISTIN   N   E
0253  4304          JMS DO LD        /      "        "        TITLE
0254  4304          JMS DO LD        /      "        "        D  I    TIO
0255  4304          JMS DO LD        /      "        "        STREET
0256  4304          JMS DO LD        /      "        "         O SE
0257  4304          JMS DO  D        /      "        "         OUSE     UFX
0260  4304          JMS DO  D        /      "        "         O ALITY
0261  4421          JMS I XWR TE     /OUTPUT DR   ECO D

0262  6211  N CR,   CDF
0263  1410          TAD I 10
0264  6201          CDF
0265  1040          TAD CM475
0266  7 50          SN        /EN  O  BLO K?
0267  5214          JMP DO LK        /YES
027   1041          TAD CM4
027   7 50          SN  CLA /EN  O  RECO D
027   5217          JMP DO E         /YES
027   5 62          JMP N CR

027   0000  G TFLD, 0
027   6211          CDF
027   1410          TAD I 10
0277  6201          CDF
0300  1042          TAD CM474
0301  7650          SN  CLA /FIELD  E ?
0302  5674          JMP I G TF D     /YES
0303  5275          JMP G TF D+1
0304  0000  DO LD,  0
0305  1411          TAD I 11
0306  3031          DCA CNT
0307  1411          TAD I 11
0310  3032          DCA O LO
0311  4344          JMS PUTCHR       /DR  F E D DEL       +41
0312  1043          TAD C41
0313  4344          JMS PUTCHR
0314  6211  N CR1,  CDF
0315  1410          TAD I 10
0316  6201          CDF
0317  3033          DCA TMP
0320  1033          TAD TMP
0321  1042          TAD CM474
0322  7650          SN  CLA /F ELD DEL?
0323  57 4          JMP I DO LD      /YES
0324  1033          TAD TMP
```

```
0325  0050            AND C77
0326  1044            TAD C1000
0327  3033            DCA TMP
0330  1433            TAD I TMP      /DRC CHAR
0331  7510            SPA     /SPEC CHAR?
0332  5337            JMP D2  /YES
0333  4344  D3,       JMS PUTCHR
0334  2031            ISZ CNT /FIELD DONE?
0335  5314            JMP NXCR1      /NO
0336  5704            JMP I DONED
0337  0045  D2,       AND C3777
0340  3033            DCA TMP
0341  4344            JMS PUTCHR     /SPEC CHR =  +CHAR
0342  1033            TAD TMP
0343  5333            JMP D3

0344  0000  PUTCHR,   0
0345  0050            AND C77
0346  7421            MQL
0347  1032            TAD OTLOC
0350  7500            SMA
0351  5364            JMP P2
0352  0045            AND C3777
0353  3032            DCA OTLOC
0354  7501            MQA
0355  7002            BSW
0356  7421            MQL
0357  1432            TAD I OTLOC
0360  0050            AND C77
0361  7501            MQA
0362  3432            DCA I OTLOC
0363  5744            JMP I PUTCHR

0364  7300  P2,       CLA CLL
0365  1432            TAD I OTLOC
0366  0046            AND C77 0
0367  7501            MQA
0370  3432            DCA I OTLOC
0371  1032            TAD OTLOC
0372  1051            TAD C4001
0373  3032            DCA OTLOC
0374  5744            JMP I PUTCHR

0375  0504  XNP,      NP
0376  0527  XTYPE,    TYPE

            PAGE

0400  0000  READ,     0
0401  4420            JMS I XMAG
0402  5020            5020     /CON
0403  0000            0        /ADR
0404  0000            0        /WC
0405  0001            1        /EXT REG
0406  2034            ISZ READF       /EOF
0407  5600            JMP I READ      /OK
0410  4420            JMS I XMAG
0411  5010            5010
0412  0000            0
0413  0000            0
0414  0000            0
0415  7000            NOP
0416  7402            HLT
0417  5620            JMP I XNYT
0420  0206  XNYT,     NYTST
0421  4420  TEND,     JMS I XMAG
0422  0050            50
0423  0000            0
0424  0000            0
```

```
425   0000              0
426   7 00              NOP
427   4420              JMS I XMAG
430   0010              10
431   0000              0
432   0000              0
433   0000              0
434   7000              NOP
435   7442              HLT
436   1047              TAD C46
437   3035              DCA O
440   3036              DCA O
441   5642              JMP I WRITE

442   0000    WRITE,    0
443   4420              JMS I XMAG
444   0040              40       /CO
445   3000              3000     /ADR
446   7 00              -1000    /WC
447   0100              100      /EXT REG
450   7 02              HLT      /EO
451   2036              ISZ O
452   5642              JMP I WRITE
453   2035              ISZ O
454   5642              JMP I WRITE
455   5221              JMP TEN

456   0000    BUF,      0
457   7 00              CLA CLL
460   13 3              TAD C2777
       12               DCA 12
      1300              TAD CM1000
463   3031              DCA CNT
464   3412    NXB1,     DCA I 12
465   2031              ISZ CNT
466   5264              JMP NXB1
467   1302              TAD C3017
470   3012              DCA 12
471   1301              TAD CM420
472   3031              DCA CNT
473   7040    NXB2,     CLA CMA
474   3412              DCA I 12
475   2031              ISZ CNT
476   527               JMP NXB2
477   5656              JMP I BUF
0500  7 00    CM1000,   -1000
0501  7360    CM420,    -420
0502  3017    C3017,    3017
0503  2777    C2777,    2777


0504  0000    N ,       0
0505  1010              TAD 10
0506  1341              TAD NC47
0507  3351              DCA PO
0510  6211              CDF1
0511  1751              TAD I PO
0512  1042              TAD CM474
0513  7640              SZA CLA        /AT EXCH N  ?
0514  7402              HLT            /NO
0515  1010              TAD 10
0516  1342              TAD N 34
0517  3351              DCA PO
0520  1751              TAD I PO
0521  1346              TAD NCM471
0522  7650              SN  CLA        /Z
0523  1347              TAD N 4000     /YES
0524  6201              CDF
0525  3750              DCA I N 3011
```

```
1526  5704          JMP I N
1527  0000  TY E,    0
1530  1010          TAD 10
1531  1343          TAD N 44
1532  3351          DCA PO          /LO ATIO  O  LISTIN   Y E
1533  6211          CDF
1534  1751          TAD I PO        /LISTIN  TYPE
1535  6201          CDF
1536  0344          AN  N 30
1537  3745          DCA I L3012     /STO E  N  RC   AD R
1540  5727          JMP I TY E

1541  0047  N 47,   47
1542  0034  N 34,   34
1543  0044  N 44,   44
1544  0030  N 30,   30
1545  3012  L3012,  3012
1546  7307  N M471, -471
1547  4000  N 4000, 4000
1550  3011  N 3011, 3011
1551  0000  PO ,    0

            PAG
            /FO  AT:          JMS I X MAG
            /       CO MAN
            /       ADDRESS
            /       WO    CO N
            /       EXTEN IO  R G STER
            /       RETURN. EO
            /       RETURN: N    AL
0600  0000  MAG,    0
0601  1337          TAD MCM12
0602  3351          DCA REVCN       /SET 10 R  RIES
0603  1600          TAD I MAG
0604  2200          ISZ MAG
0605  3352          DCA CO  /G T CO MAN
0606  7240          CLA CMA
0607  1600          TAD I MAG
0610  2200          ISZ MAG
0611  3353          DCA CADDR       /G T CUR EN  ADDRE S
0612  1600          TAD I MAG
0613  2200          ISZ MAG
0614  3354          DCA WRDCN       /G T WO    CO N
0615  1600          TAD I MAG
0616  2200          ISZ MAG
0617  3355          DCA CO EX       /G T EXT REG STER
0620  3350          DCA MADCO
0621  1352  RETRY,  TAD CO
0622  1350          TAD MADCO
0623  4322          JMS SETCO       /SET CO  R  LER F   F N TIO
0624  1354          TAD WRDCN
0625  3032          DCA 32
0626  1353          TAD CADDR
0627  3033          DCA 33  /SET WO   CO N  & CURRE   AD RESS
0630  1355          TAD CO EX
0631  6717          6717
0632  7300          CLA CLL /SE  EXT R G
0633  4332          JMS MAG         /PER   M MAG APE F N IO
0634  6706          6706
0635  7 21          MQL     /STO   STATUS IN MQ
0636  7501          MQA
0637  0340          AN  MC67 4
0640  7450          SN
0641  527           JMP MO  /N  E R  S
0642  0341          AN  MC7677
0643  7450          SN
0644  5273          JMP MEO         /E
0645  0342          AN  MC3543
0646  7640          SZA CLA
```

```
0647  7402           HLT       /BAD RE  O   O F IN
0650  2351  PAR,     ISZ REVCN.         /PARITY
0651  5253           JMP .+2 /RETRY
0652  7402           HLT       /RETRY FAILURE
0653  1352           TAD CO
0654  0345           AND MC70
0655  1346           TAD MCM40
0656  7650           SNA CLA /FAILURE   MT?
0657  1343           TAD MC100          /YES
0660  3350           DCA MADCO
0661  1352           TAD CO
0662  0344           AND MC7000
0663  1345           TAD MC70
0664  4322           JMS SETCO          /SET CONTROLLER     ACKSPACE
0665  7240           CLA CMA
0666  3032           DCA 32  /WC = RECS BACKSPACED
0667  4332           JMS MAG            /PERFORM BACKSPACE
0670  5221           JMP RETRY          /AND TRY AGAIN
0671  2200  MO ,     ISZ MAG
0672  5600           JMP I MAG          /NORMAL EXIT
0673  1352  MEOF,    TAD CO
0674  0345           AND MC70
0675  1346           TAD MCM40
0676  7650           SNA CLA /EOF ON WRITE?
0677  5250           JMP PAR /YES - PARITY PROBLEM
0700  7000           NOP       /REWIND UNIT
0701  5600           JMP I MAG          /EXIT EOF
0702  0000  REWIND,  0
0703  1352           TAD CO
0704  0344           AND MC7000
0705  1347           TAD MC10
0706  4322           JMS SETCO          /SET CONTROLLER F   R WIN
0707  6722           6722      /EXECUTE REWIND
0710  1352           TAD CO
0711  0344           AND MC7000
0712  7106           CLL RTL
0713  7006           RTL       /LOAD CONT W/ NEXT MAG O
0714  1357           TAD NEXM
0715  3356           DCA NEXCO
0716  1756           TAD I NEXCO
0717  6716           6716
0720  7300           CLA CLL
0721  5702           JMP I REWIND
0722  0000  SETCO ,  0
0723  6711           6711
0724  5323           JMP .-1
0725  6716           6716
0726  6721           6721
0727  5326           JMP .-1
0730  7300           CLA CLL
0731  5722           JMP I SETCO
0732  0000  MAG  ,   0
0733  6722           6722
0734  6701           6701
0735  5334           JMP .-1
0736  5732           JMP I MAG
0737  7766  MCM12,   -12
0740  2764  MC6774,  2764
0741  7667  MC7677,  7667
0742  3543  MC3543,  3543
0743  0100  MC100,   100
0744  7000  MC7000,  7000
0745  0070  MC70,    70
0746  7740  MCM40,   -40
0747  0010  MC10,    10
0750  0000  MADCO ,  0
0751  0000  REVCN ,  0
0752  0000  CO ,     0
0753  0000  CADDR,   0
```

```
0754   0000   WRDCN ,   0
0755   0000   CO EX,    0
0756   0000   NEXCO ,   0
0757   0760   NEXM,     NEXTM
0760   1020   NEXTM,    1020     /0
0761   0040             40       /1
0762   0040             40       /2
0763   0040             40       /3
                        *1000
1000   4077   4077
1001   0077   77
1002   0077   77
1003   4050   4050
1004   4051   4051
1005   4075   4075
1006   4072   4072
1007   4044   4044
1010   4045   4045
1011   4073   4073
1012   4046   4046
1013   4047   4047
1014   4055   4055
1015   4052   4052
1016   4056   4056
1017   0077   77
1020   0077   77
1021   0077   77
1022   4057   4057
1023   0065   65
1024   0066   66
1025   0067   67
1026   0070   70
1027   0071   71
1030   0072   72
1031   0073   73
1032   0074   74
1033   0075   75
1034   0076   76
1035   4054   4054
1036   4043   4043
1037   0077   77
1040   0033   33
1041   0034   34
1042   0035   35
1043   0036   36
1044   0037   37
1045   0040   40
1046   0041   41
1047   0042   42
1050   0043   43
1051   0044   44
1052   0045   45
1053   0046   46
1054   0047   47
1055   0050   50
1056   0051   51
1057   0052   52
1060   0053   53
1061   0054   54
1062   0055   55
1063   0056   56
1064   0057   57
1065   0060   60
1066   0061   61
1067   0062   62
1070   0063   63
1071   0064   64
1072   0077   77
1073   0077   77
```

```
1074   0077   77
1075   0077   77
1076   0077   77
1077   0077   77

                    *200

1200   7775   -3
1201   7020   7020

1202   7777   -1
1203   7030   7030

1204   7771   -7
1205   7023   7023

1206   7557   -221
1207   3032   3032

1210   7763   -15
1211   7144   7144

1212   7733   -45
1213   3153   3153

1214   7573   -205
1215   7177   7177

1216   7763   -15
1217   3362   3362

1220   7733   -45
1221   7312   7312

1222   7737   -41
1223   3335   3335

1224   7770   -10
1225   7357   7357

1226   7773   -5
1227   7364   7364

1230   7737   -41
1231   3367   3367


CUF      0456
CADDR    0753
CM1000   0500
CM2      0052
CM402    0041
CM420    0501
CM474    0042
CM6      0047
CM75     0040
CNT      0031
CO       0752
CO-EX    0755
C1000    0044
C1177    0037
C2777    0503
C3017    0502
C3777    0045
C4001    0051
C41      0043
C77      0050
C7700    0046
```

```
DOBLK   0214
DO-LD   0304
O  .C   0217
R       0337
        0333
.I      0027
.L      0026
.TFLD   0274
.3012   0545
ADCO.   0750
AG      0600
AG .P   0732
C412    0737
C440    0746
C10     0747
C100    0743
C3543   0742
C5774   0740
C7.     0745
C7000   0744
C7577   0741
EO.     0673
.O.     0671
PF      0030
.M471   0546
.C39    0544
.34     0542
C4000   0547
C44     0543
.47     0541
.XCO.   0756
.XM     0757
EXTM    0760
.3011   0550
        0504
XB1     0464
.B2     0473
.CR     0262
.CRT    0314
.TST    0206
        0035
        0036
.LOC    0032
PAR     0650
POS     0551
PUTCHR  0344
P2      0364
READ    0400
.O.     0034
.TRY    0621
REVCNT  0751
.WIND   0702
SEQH    0025
SEQL    0024
SETCO.  0722
TART    0200
END     0421
TMP     0033
TYPE    0527
WRDCN.  0754
WRITE   0442
XBUF    0023
.MAG    0020
.NP     0375
.NY.    0420
.READ   0022
.TYPE   0376
.WRITE  0021
```

Operating Instructions for the above listed Program No. 1 are as follows:

1. Set up and load magnetic tapes. Load program into memory bank 0. input file-tape unit 1 scratch-tape unit 0
2. SR=200: load, clear, continue Halts: 416- Input tape done.
   A. To continue- put on next input tape and hit continue.
   B. To terminate- set SR=421: load, clear, continue.
   435- Output tape at limit: Put on next tape and hit continue.
   647- Magtape error: If bit 6 in MQ indicates end of tape set SR=671 load, clear, continue.
   652- Retry failure.

B7. Detailed Description of Program No. 2

Figure 18:
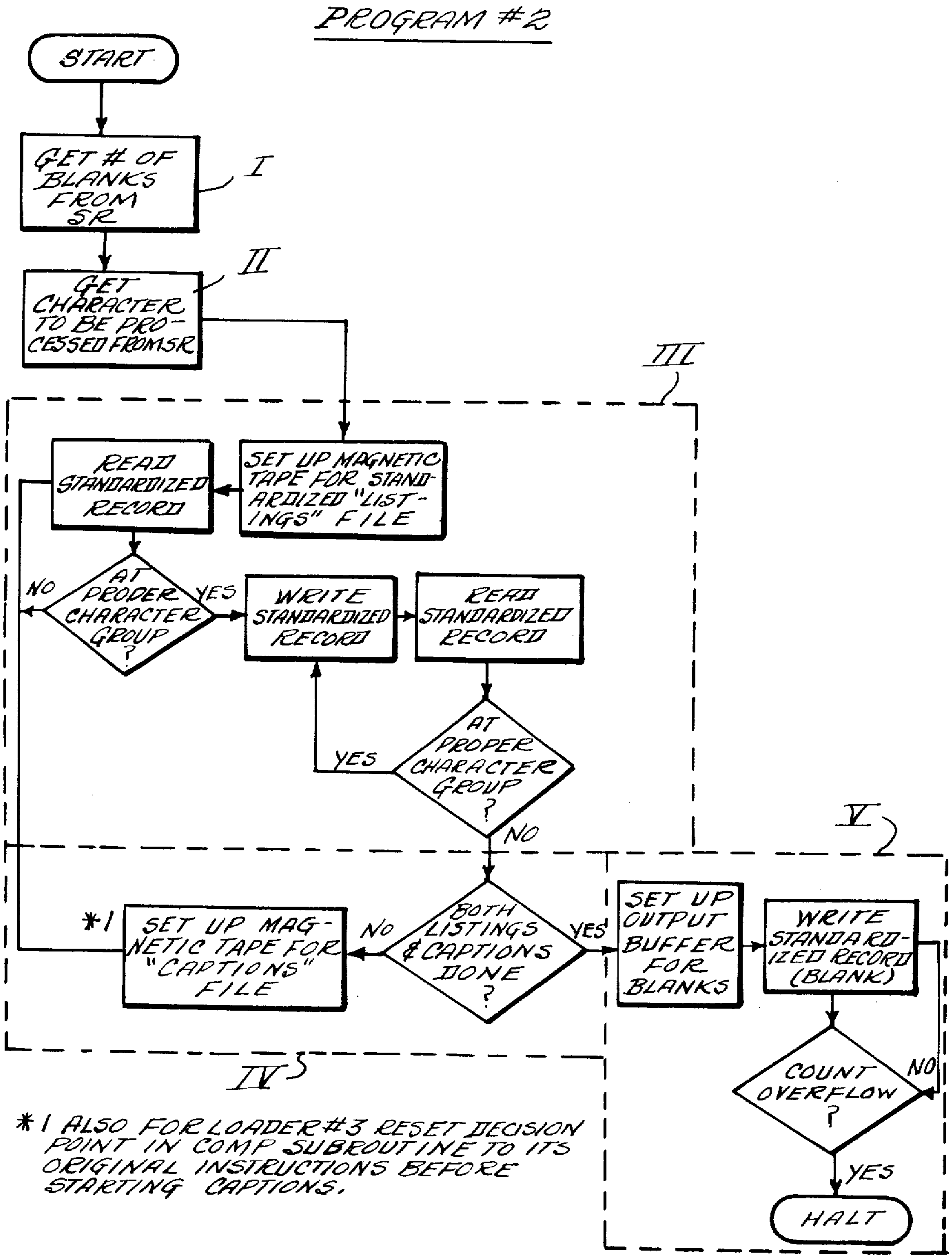
FIG. 18 is a more detailed block diagram of Program No. 2 shown in FIG. 8.
Figure 20:
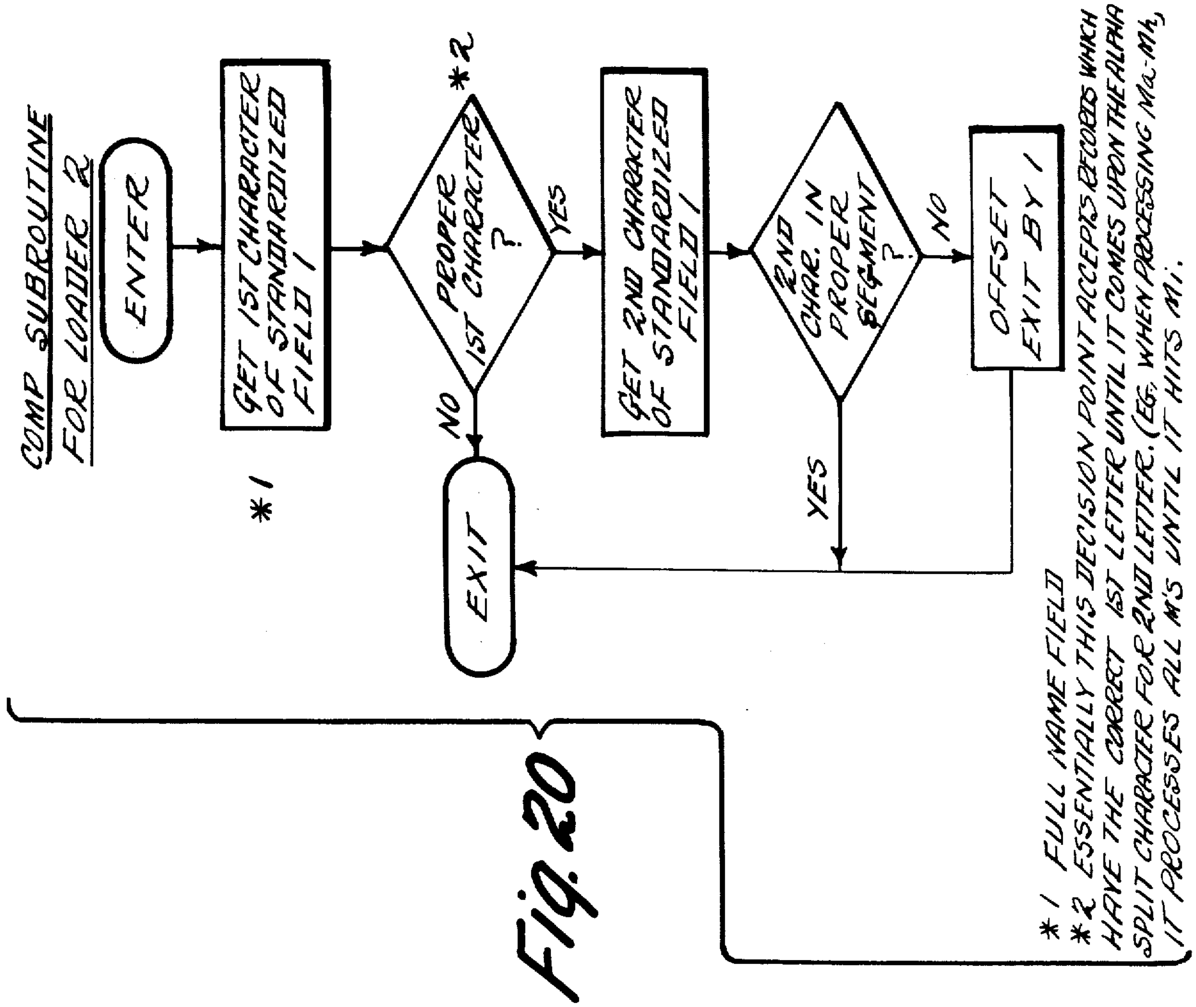
Figure 19:
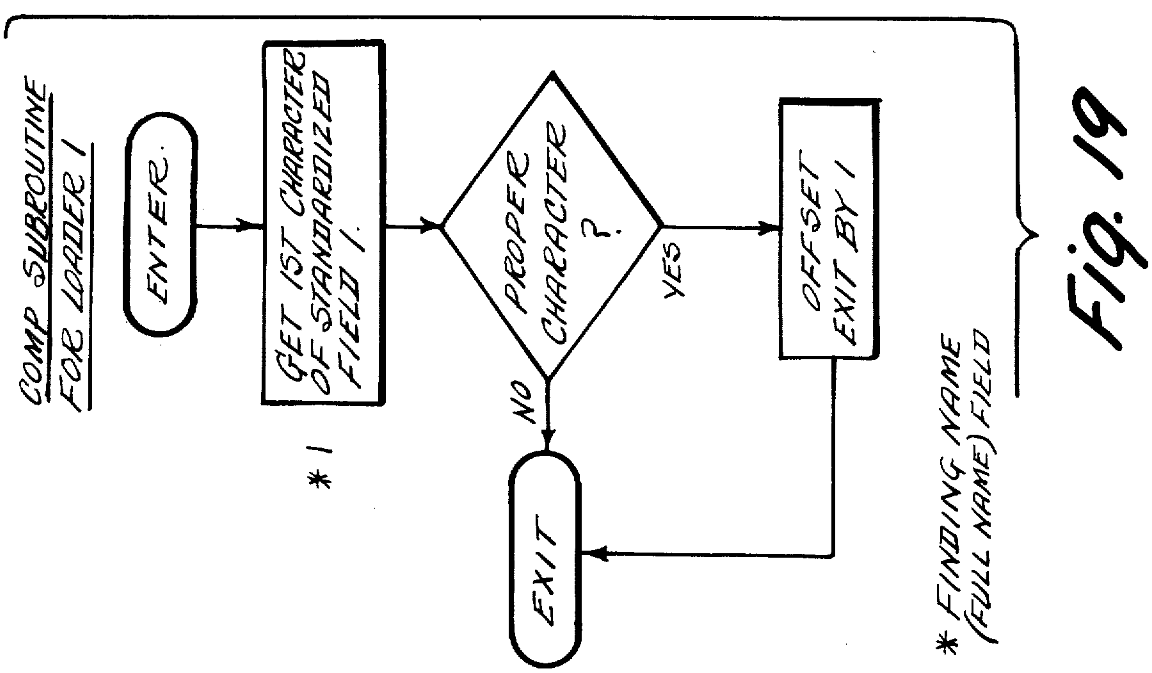
Figure 22:
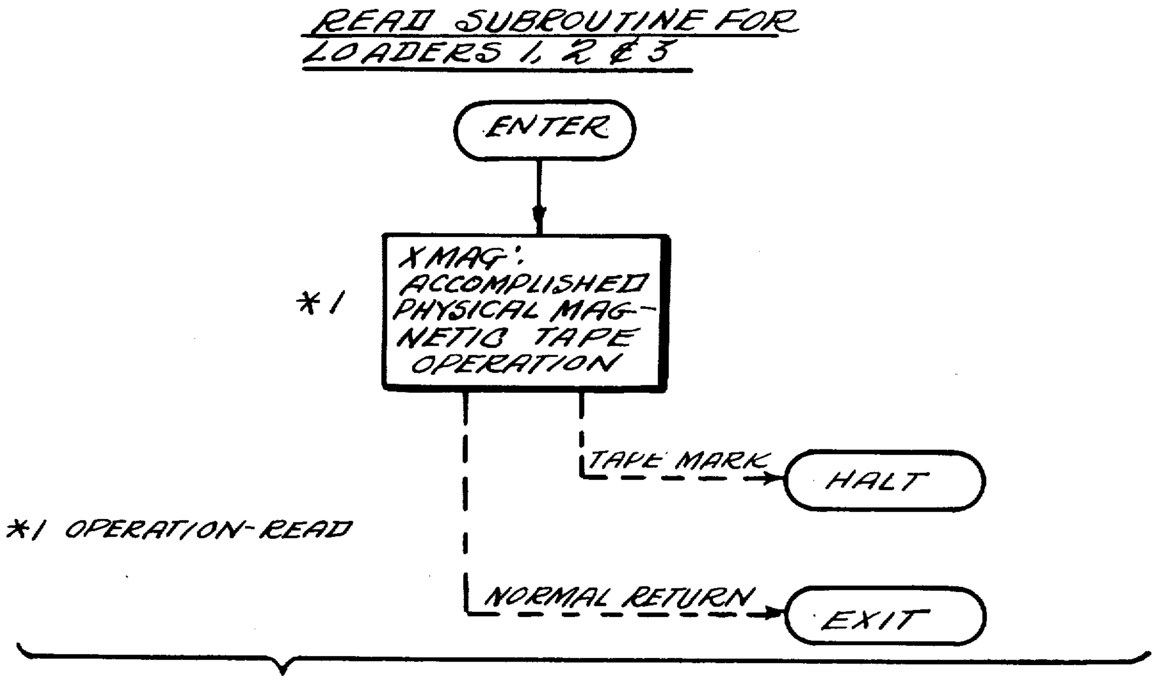
Figure 23:
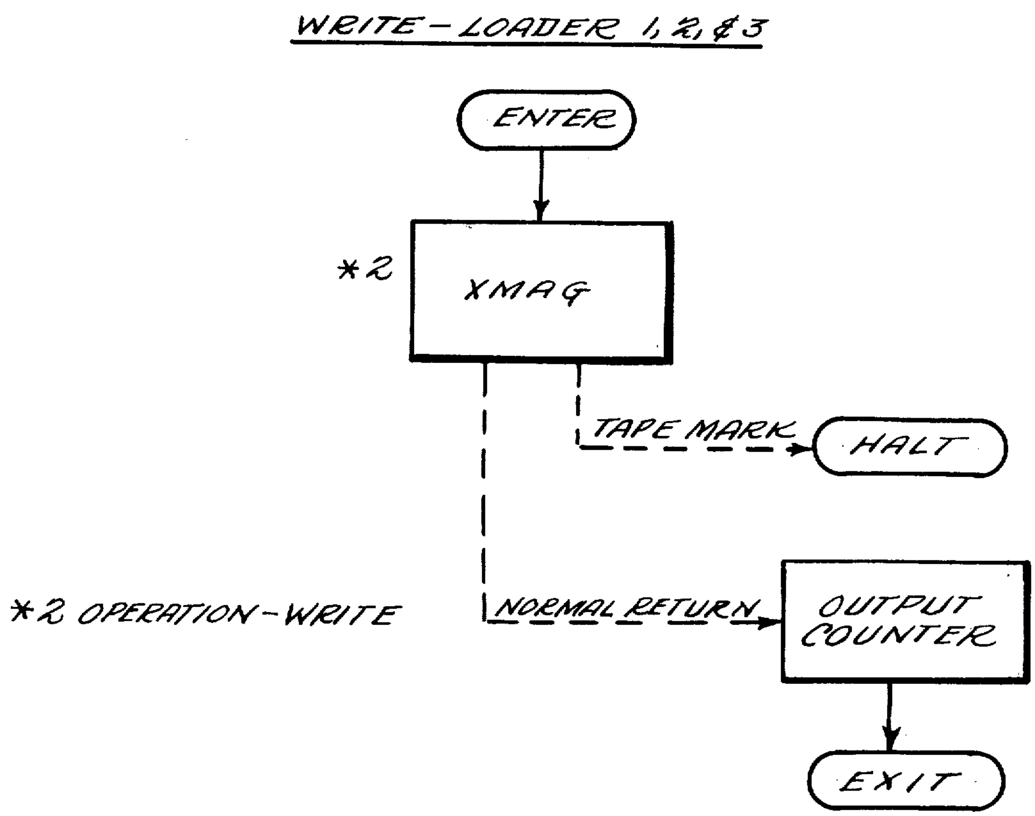
Figure 24:
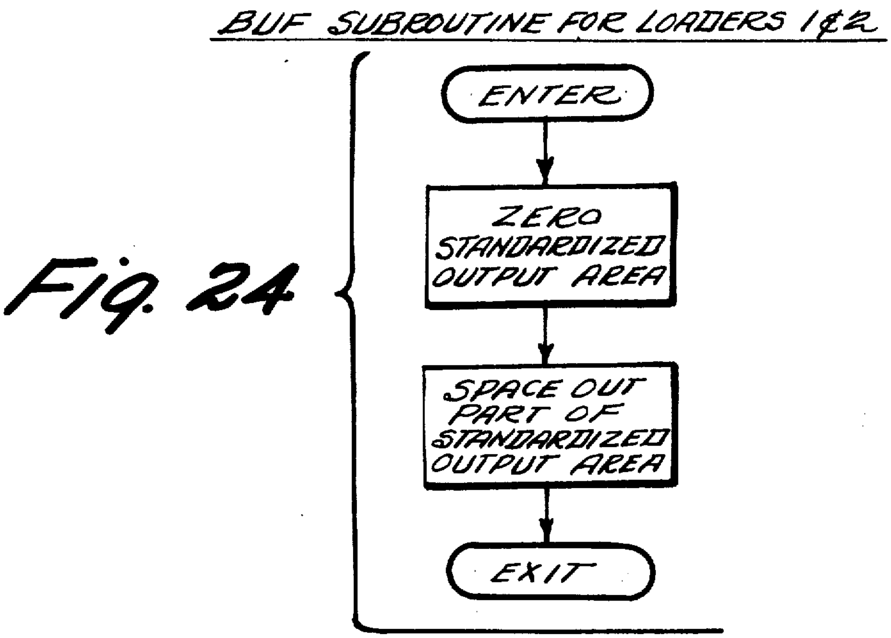

Program No. 2 is shown in block form at FIG. 18 with subroutines utilized therein detailed in FIGS. 19–24. An explicit listing of the assembly level source program language for Program No. 2 and all related subroutines follows.

This program is written in three different versions (herein called "loaders") to distinguish processing of those alphabetic groupings or segments comprising whole character groups from split character groups.

Loader 1 processes whole character groups. Loader 2 processes the first half of split character groups while loader 3 processes the second half of split character groups.

For example, the letter "A" file can be processed in its entirety, therefore loader 1 would be used. The letter "M", which has more listings than can fit in a single XM block, must be split. Thus Ma-Mh is the 1st half segment and utilizes loader 2, and Mi-Mz is the 2nd half segment and utilizes loader 3. In the split programs (2 & 3) the split defining character (2nd character of the full name field which starts the 2nd half segment-i for Mi-Mz) must be manually entered into the program into location 317 before processing is initiated.

Note that the major difference between the programs is how the "COMP" subroutine handles the search.

Referring to FIG. 18, it should be noted that program sections I-V correspond to specific listing statements as follows:

| Loader | Section | Instruction Statements |
|---|---|---|
| 1 | I | 0340–0344 |
| 1 | II | 0200–0204 |
| 1 | III | 0205–0217 |
| 1 | IV | 0240–0246 |
| 1 | V | 0300–0310 |
| 2 | I | 0340–0344 |
| 2 | II | 0200–0204 |
| 2 | III | 0205–0217 |
| 2 | IV | 0240–0246 |
| 2 | V | 0300–0310 |
| 3 | I | 0340–0344 |
| 3 | II | 0200–0204 |
| 3 | III | 0205–0217 |
| 3 | IV | 0240–0251 |
| 3 | V | 0300–0310 |

These five program sections are functionally similar if not identical and are functionally described below as an introduction to the explicit source program listing for loaders 1, 2 and 3 of Program No. 2.

I. Get the appropriate # of blanks from the SR (switch register). Note that this number is set up to be a multiple of 12 for simpler processing during the retrieval file storage. The actual number of blanks is determined manually with regard for the frequency of activity of the particular alpha segment.

II. Get the character to define the alpha group from the SR. Note that the split defining character is entered via toggle switch before processing.

III. Set the proper tape unit in the read command (listing or captions). Search through the file until the desired alpha segment is found, then transfer all subsequent records to the output file until a new alpha segment is encountered.

IV. If the listings file is currently being processed, change the tape unit to the captions file and repeat part III. If the captions file is currently being processed go to part V.

V. After both listings and captions files have been processed, blank records are added to each alpha segment per entry in Part I. Upon completion of this operation, the program is terminated.

Program No. 2, Loader 1

```
            BSW=7002
            MQL=7421
            MQA=7501
            SWP=7521
            CDF0=6201
            CDF1=6211
            CDF2=6221
            DMCR=6517
            DCBRH=6501
            DCBRL=6500
            DSSRH=6503
            DSSRL=6502
            DESR0=6511
            DESR1=6515
            DWCR=6516
            DDMAR=6514
            DCSR=6512
            DAIRL=6504
            DAIRH=6505
            DUSRL=6506
            DUSRH=6507
            GTF=6004
            RTF=6005
            RMF=6244
            RIB=6234
            SR0=6003


            FIXTAB
                        *20

0020  0600  XMAG,     MAG
0021  0442  XWRITE,   WRITE
0022  0400  XREAD,    READ
0023  0456  XBUF,     BUF
0024  0000  SEQL,     0
0025  0000  SEQH,     0
0026  3003  FL,       3003
0027  3002  FI,       3002
0030  3004  MPF,      3004
0031  0000  CNT,      0
0032  0000  OTLO,     0
0033  0000  TMP,      0
0034  0000  REQ,      0
0035  0000  O1,       0
0036  0000  O2,       0
```

```
0037  1177  C1177,  1177
0040  7703  CM75,   -75
0041  7376  CM402,  -402
0042  7304  CM474,  -474
0043  0041  C41,    41
0044  3777  C3777,  3777
0045  7700  C7700,  7700
0046  7772  CM6,    -6
0047  4001  C4001,  4001
0050  7776  CM2,    -2

            PAGE

                    *200
0200  7300  STO,    CLA CLL
0201  7404          OSR              /GET CHAR FROM SW
0202  0220          AND C77
0203  3221          DCA CHAR
0204  7000          NOP
0205  1237          TAD C1000
0206  1223  ST3,    TAD C20
0207  3624          DCA I L402       /SET READ COMMAND FOR UNIT
0210  4422          JMS I XREAD      /SEARCH FOR DESIRED CHAR IN REG. IS
0211  4226          JMS COMP
0212  5210          JMP .-2
0213  4421          JMS I XWRITE     /TRANSFER RELATIVE RECORD Y
0214  4422          JMS I XREAD
0215  4226          JMS COMP
0216  5240          JMP ST1
0217  5213          JMP .-4

0220  0077  C77,    77
0221  0000  CHAR,   0
0222  7000  C7000,  7000
0223  0020  C20,    20
0224  0402  L402,   402
0225  3033  C3033,  3033

0226  0000  COMP,   0
0227  1625          TAD I C3033
0230  7000          NOP
0231  0220          AND C77
0232  7041          CIA
0233  1221          TAD CHAR
0234  7650          SNA CLA          /PROPER CHARACTER?
0235  2226          ISZ COMP         /YES
0236  5626          JMP I COMP       /NO

0237  1000  C1000,  1000

0240  1624  ST1,    TAD I L402
0241  0222          AND C7000
0242  1222          TAD C7000
0243  7440          SZA CLA          /UNIT 1 (REG LISTINGS)?
0244  5300          JMP ST2          /NO, CAPTIONS - DO BLANKS
0245  7332          7332             /YES, DO UNIT 2 NEXT (CAPTIONS)
0246  5206          JMP ST3

                    *277
0277  0000  CNTB,   0

0300  4423  ST2,    JMS I XBUF       /SET UP BLANK RECORD
0301  7300          CLA CLL
0302  1277          TAD CNTB
0303  7041          CIA
0304  3277          DCA CNTB         /SET UP BLANKS COUNTER
0305  4421          JMS I XWRITE     /OUTPUT BLANKS
0306  2277          ISZ CNTB
0307  5305          JMP .-2
```

```
0310  7402           HLT                  /PROGRAM COMPLETE

                     *340
0340  7300  START,   CLA CLL
0341  7404           OSR                  /GET # BLANKS FROM SW
0342  3277           DCA CNTB
0343  7402           HLT
0344  5200           JMP ST0
                     *400
0400  0000  READ,    0
0401  4420           JMS I XMAG
0402  1020           1020      /COM
0403  3000           3000      /ADR
0404  7000           -1000     /WC
0405  0100           100       /EXT REG
0406  7402           HLT       /EOR
0407  5600           JMP I READ        /O
0410  4420           JMS I XMAG
0411  1010           1010
0412  0000           0
0413  0000           0
0414  0000           0
0415  7000           NOP
0416  7402           HLT
0417  7000           NOP
0420  0416  XNIT,    416
0421  4420  TEND,    JMS I XMAG
0422  0050           50
0423  0000           0
0424  0000           0
0425  0000           0
0426  7000           NOP
0427  4420           JMS I XMAG
0430  0010           10
0431  0000           0
0432  0000           0
0433  0000           0
0434  7000           NOP
0435  7402           HLT
0436  7300           CLA CLL
0437  3035           DCA O
0440  3036           DCA O
0441  7402           HLT

0442  0000  WRITE,   0
0443  4420           JMS I XMAG
0444  0040           40        /COM
0445  3000           3000      /ADR
0446  7000           -1000     /WC
0447  0100           100       /EXT REG
0450  7402           HLT       /EOR
0451  2036           ISZ O
0452  5642           JMP I WRITE
0453  2035           ISZ O
0454  5642           JMP I WRITE
0455  7402           HLT
0456  0000  BUF,     0
0457  7300           CLA CLL
0460  1303           TAD C2777
0461  3012           DCA 12
0462  1300           TAD CM1000
0463  3031           DCA CNT
0464  3412  NXB1,    DCA I 12
0465  2031           ISZ CNT
0466  5264           JMP NXB1
0467  5656           JMP I BUF
0470  3012           DCA 12
0471  1301           TAD CM420
0472  3031           DCA CNT
```

```
0473  7240  N B2,   CLA CMA
0474  3412          DCA I 12
0475  2031          ISZ CNT
0476  5273          JMP N B2
0477  5656          JMP I BUF

0500  7000  CM1000,  -1000
0501  7360  CM420,   -420
0502  3017  C3017,   3017
0503  2777  C2777,   2777
            PAGE
            /FORMAT:        JMS  XMAG
            /          COMMAND
            /          ADDRESS
            /          WORD COUNT
            /          EXTENSION REGISTER
            /          RETURN: EOF
            /          RETURN: NORMAL

0600  0000  MAG,    0
0601  1337          TAD MCM12
0602  3351          DCA REVCNT       /SET 10 RETRIES
0603  1600          TAD I MAG
0604  2200          ISZ MAG
0605  3352          DCA COM /GET COMMAND
0606  7240          CLA CMA
0607  1600          TAD I MAG
0610  2200          ISZ MAG
0611  3353          DCA CADDR        /GET CURRENT ADDRESS
0612  1600          TAD I MAG
0613  2200          ISZ MAG
0614  3354          DCA WRDCNT       /GET WORD COUNT
0615  1600          TAD I MAG
0616  2200          ISZ MAG
0617  3355          DCA COMEX        /GET EXT REGISTER
0620  3350          DCA MADCOM
0621  1352  RETRY,  TAD COM
0622  1350          TAD MADCOM
0623  4322          JMS SETCOM       /SET CONTROLLER FUNCTION
0624  1354          TAD WRDCNT
0625  3032          DCA 32
0626  1353          TAD CADDR
0627  3033          DCA 33  /SET WORD COUNT & CURRENT ADDRESS
0630  1355          TAD COMEX
0631  6717          6717
0632  7300          CLA CLL /SET EXT REG
0633  4332          JMS MAGOP        /PERFORM MAGTAPE FUNCTION
0634  6706          6706
0635  7421          MQL      /STORE STATUS IN MQ
0636  7501          MQA
0637  0340          AND MC6771
0640  7450          SNA
0641  5271          JMP MOK /NO ERRORS
0642  0341          AND MC7577
0643  7450          SNA
0644  5276          JMP MEOF         /EOF
0645  0342          AND MC3543
0646  7640          SZA CLA
0647  7402          HLT       /BAD REC  IN
0650  2351  PAR,    ISZ REVCNT       /PARITY
0651  5253          JMP .+2 /RETRY
0652  7402          HLT       /RETRY FAILURE
0653  1352          TAD COM
0654  0345          AND MC7
0655  1346          TAD MCM40
0656  7650          SNA CLA /FAILURE ON MT?
0657  1343          TAD MC100        /YES
0660  3350          DCA MADCOM
0661  1352          TAD COM
```

```
662  0344          AND MC7000
663  1345          TAD MC70
664  4322          JMS SETCO      /SET CONTROLLER TO BACKSPACE
665  7240          CLA CMA
666  3032          DCA 32  /WC = RECS BACKSPACED
667  4332          JMS MAG..      /PERFORM BACKSPACE
67   5221          JMP RETRY      /AN   TR  AG IN
671  2200  MO ,    ISZ MAG
67   5600          JMP I MAG      /NORMAL EXIT
673  1352  MEO ,   TAD CO
674  0345          AND MC70
675  1346          TAD MCM40
676  7650          SNA CLA /EOF ON WRITE?
677  5250          JMP PAR /YES - PARITY PROBLEM
7 0  7 00          NOP       /REWIND UNIT
7 1  5600          JMP I MAG      /EXIT EO
702  0000  REWIN , 0
7 3  1352          TAD CO
704  0344          AND MC7 00
705  1347          TAD MC10
7 6  4322          JMS SETCO      /SE  CO  R  LER F   R W N
7 7  67 2          6722    /EXECUTE REWIN
710  1352          TAD CO
711  0344          AND MC7000
712  7106          CLL RTL
713  7006          RTL     /LO D CO T W/ NEXT MAG
714  1357          TAD NEXM
715  3356          DCA NEXCO
716  1756          TAD I NEXCO
717  6716          6716
7 0  7300          CLA CLL
7    5702          JMP I REWIN
7    0000  SETCO , 0
7 3  6711          6711
7 4  5323          JMP .-1
7 5  6716          6716
7 6  67 1          6721
7 7  5326          JMP .-1
730  7300          CLA CLL
7 1  57 2          JMP I SETCO
732  0000  MAG   , 0
733  6722          6722
734  6701          6701
735  5334          JMP .-1
736  5732          JMP I MAG
0737 7766  MCM12,  -12
0740 2764  MC6774, 27
0741 7667  MC7677, 7 67
0742 3543  MC3543, 3543
0743 0100  MC100,  100
0744 7000  MC7000, 7000
0745 0070  MC70,   70
0746 7740  MCM40,  -40
0747 0010  MC10,   10
0750 0000  MADCO , 0
0751 0000  REVCN , 0
0752 0000  CO  ,   0
0753 0000  CADDR,  0
0754 0000  WRDCN , 0
0755 0000  COMEX,  0
0756 0000  NEXCO , 0
0757 0760  NEXM,   NEXTM
0760 1020  NEXTM,  1020     /0
0761 0040          40       /1
0762 0040          40       /2
0763 0040          40       /3

 UF      0456
```

| | |
|---|---|
| CAD.. | 07.3 |
| CH. R | 0221 |
| CM1033 | 0500 |
| CM2 | 0050 |
| CM402 | 0041 |
| CM420 | 0501 |
| CM474 | 0042 |
| CM6 | 0046 |
| CM7. | 0040 |
| CNT | 0031 |
| CNTB | 0277 |
| CO. | 0752 |
| CO.EX | 0755 |
| CO.P | 0226 |
| C1000 | 0237 |
| C117. | 0037 |
| C20 | 0223 |
| C27.. | 0503 |
| C3017 | 0502 |
| C3033 | 0225 |
| C3777 | 0044 |
| C4001 | 0047 |
| C41 | 0043 |
| C7.00 | 0222 |
| C77 | 0220 |
| C77.0 | 0045 |
| .H | 0027 |
| .L | 0026 |
| .402 | 0224 |
| .ADCO | 0750 |
| .AG | 0600 |
| .AG.. | 0732 |
| .CM12 | 0737 |
| .CM40 | 0746 |
| .C10 | 0747 |
| .C100 | 0743 |
| .C3543 | 0742 |
| .C6774 | 0740 |
| .C70 | 0745 |
| .C7000 | 0744 |
| .C7.7. | 0741 |
| .EO. | 0673 |
| .O | 0671 |
| .PF | 0030 |
| E.CO | 0756 |
| .X.. | 0757 |
| EXT.. | 0760 |
| .XB1 | 0464 |
| .B2 | 047. |
| .. | 0435 |
| .. | 0036 |
| .LO. | 0032 |
| .A. | 0650 |
| .EAD | 0400 |
| .EO. | 0034 |
| .ETRY | 0621 |
| .EVCNT | .751 |
| .EWIND | 07.2 |
| .EOH | 0025 |
| .EOL | 0024 |
| .ETCO | 07.2 |
| .TART | 0340 |
| .T0 | 0203 |
| .T1 | 0240 |
| .T2 | 0300 |
| T3 | 0206 |
| .END | 0421 |
| .MP | 0033 |
| .RDCNT | 0754 |

```
WRITE  0442
 BUF   0023
 MAG   0020
 RYI   0420
 READ  0022
XWRITE 0021
```

Program No. 2, Loader 2

```
        BSW=7002
        MOL=7421
        MOA=7501
        SWP=7521
        CDF =6201
        CDF1=6211
        CDF =6221
        DMCR=6517
        DCBRH=6501
        DCBRL=6500
        DSSRH=6503
        DSSR =6502
        DESR0=6511
        DESR1=6515
        DWCR=6516
        DDMAR=6514
        DCSR=6512
        DAIRL=6504
        DAIR =6505
        DUSRL=6506
        DUSRH=6507
        G1F=6004
        R1F=6005
        R F=6244
        RIB=6234
        SR0=6003


        FIXTAB
                *20


0020  0600  XMAG,    MAG
0021  0442  XWRITE,  WRITE
0022  0400  XREAD,   READ
0023  0456  XBUF,    BUF
0024  0000  SEOL,    0
0025  0000  SEQH,    0
0026  3003  FL,      3003
0027  3002  FH,      3002
0030  3004  MFF,     3004
0031  0000  CNT,     0
0032  0000  O LOC,   0
0033  0000  TMP,     0
0034  0000  RCD ,    0
0035  0000  O ,      0
0036  0000  OL,      0

0037  1177  C1177,   1177
0040  7763  CM75,    -75
0041  7376  CM402,   -402
0042  7304  CM474,   -474
0043  0041  C41,     41
0044  3777  C3777,   3777
0045  7700  C7700,   7700
0046  7772  CM6,     -6
0047  4001  C4001,   4001
0050  7776  CM2,     -2
```

```
          PAG

                              *200
0200  7300  ST0,    CLA CLL
0201  7404          OSR              /GET CHAR ...  W
0202  0220          AND C77
0203  3221          DCA CHAR
0204  7000          NOP
0205  1237          TAD C1000
0206  1223  ST3,    TAD C20
0207  3624          DCA I L402       /SET READ COMMAND FOR UNIT 1
0210  4422          JMS I XREAD      /SEARCH FOR DESIRED CHAR IN RECORD IS
0211  4226          JMS COMP
0212  5210          JMP .-2
0213  4421          JMS I XWRITE     /TRANSFER RELATIVE    CO  S  N Y
0214  4422          JMS I XREAD
0215  4226          JMS COMP
0216  5240          JMP ST1
0217  5213          JMP .-4

0220  0077  C77,    77
0221  0000  CHAR,   0
0222  7000  C7000,  7000
0223  0020  C20,    20
0224  0402  L402,   402
0225  3033  C3033,  3033
0226  0000  COMP,   0
0227  1625          TAD I C3033
0230  7000          NOP
0231  0220          AND C77
0232  7041          CIA
0233  1221          TAD CHAR
0234  5320          JMP ST10
0235  2226          ISZ COMP         /YES
0236  5626          JMP I COMP       /NO

0237  1000  C1000,  1000

0240  1624  ST1,    TAD I L402
0241  0222          AND C7000
0242  1222          TAD C7000
0243  7640          SZA CLA          /UNIT 1 (REG LISTING)?
0244  5300          JMP ST2          /NO, CAPTIONS - D  BLANKS
0245  7332          7332             /YES, D  N T        T  CAPTION )
0246  5206          JMP ST3

                    *277
0277  0000  CNTB,   0

0300  4423  ST2,    JMS I XBUF       /SET UP BLANK RECORD
0301  7300          CLA CLL
0302  1277          TAD CNTB
0303  7041          CIA
0304  3277          DCA CNTB         /SET UP BLANKS COUNTER
0305  4421          JMS I XWRITE     /OUTPUT BLANKS
0306  2277          ISZ CNTB
0307  5305          JMP .-2
0310  7402          HLT              /PROGRAM COMPLETE

                    *316

0316  3034  C3034,  3034
0317  0000  CHBX,   0

0320  7640  ST10,   SZA CLA          /MATCH?
0321  5626          JMP I COMP       /NO
0322  1716          TAD I C3034
0323  7002          BSW              /CHECK 2ND CHAR
0324  0220          AND C77
```

```
325  7041            CIA
326  1317            TAD CHAR:
327  7640            SZA CLA          /2ND ATCH?
330  ..26            ISZ COMP         /N . ACCEPT RECO D F    RAN F R
331  5526            JMP I CO P       /YES,R JECT R CO D F   TRA I F R

                     *340

340  7300   START,   CLA CLL
341  7604            OSR              /G T   BLAN S   O   W
342  3277            DCA CNTB
343  7402            HLT
344  5200            JMP STO
                     *400
400  0000   READ,    0
401  4420            JMS I XMAG
402  1020            1020    /CO
403  3000            3000    /ADR
404  7000            -1000   /WC
405  0100            100     /EXT R
406  7402            HLT     /EOF
407  5600            JMP I READ      /O
410  4420            JMS I XMAG
411  1010            1010
412  0000            0
413  0000            0
414  0000            0
415  7000            NOP
416  7402            HLT
417  7000            NOP
420  0416   XNXT,    416
421  4420   TEND,    JMS I XMAG
422  0050            50
423  0000            0
424  0000            0
425  0000            0
426  7000            NOP
427  4420            JMS I XMAG
430  0010            10
431  0000            0
432  0000            0
433  0000            0
434  7000            NOP
435  7402            HLT
436  7300            CLA CLL
437  3035            DCA O
440  3036            DCA O
441  7402            HLT

442  0000   WRITE,   0
443  4420            JMS I XMAG
444  0040            40      /CO
445  3000            3000    /ADR
446  7000            -1000   /WC
447  0100            100     /EXT R
450  7402            HLT     /EO
451  2036            ISZ O
452  5642            JMP I WR TE
453  2035            ISZ O
454  5642            JMP I WR TE
455  7402            HLT

456  0000   BUF,     0
457  7300            CLA CLL
460  1303            TAD C277
461  3012            DCA 12
462  1300            TAD CM1000
463  3031            DCA CNT
464  3412   NIB1,    DCA I 12
```

```
0465  2031            ISZ CNT
0466  5264            JMP N.B1
0467  5656            JMP I BUF
047   3012            DCA 12
0471  1301            TAD CM420
047   3031            DCA CNT
0473  7 40  N B2,     CLA CMA
0474  3412            DCA I 12
0475  2031            ISZ CN
0476  5273            JMP N.B2
0477  5656            JMP I BUF
0500  7 00  CM1000,   -1000
0501  7360  CM420,    -420
0502  3017  C3017,    3017
0503  2777  C2777,    2777
            PAGE
            /FORMAT:         JMS I XMAG
            /                COMMAND
            /                ADDRESS
            /                WORD COUNT
            /                EXTENSION REGISTER
            /                RETURN: EOF
            /                RETURN: NORMAL

0600  0000  MAG,      0
0601  1337            TAD MCM12
0602  3351            DCA REVCNT       /SET 10  ETRIES
0603  1600            TAD I MAG
0604  2200            ISZ MAG
0605  3352            DCA CO   /GET COMMAN
0606  7 40            CLA CMA
0607  1600            TAD I MAG
0610  2200            ISZ MAG
0611  3353            DCA CADDR        /GET CUR EN   D RESS
0612  1600            TAD I MAG
0613  2200            ISZ MAG
0614  3354            DCA WRDCNT       /GET WO   CO N
0615  1600            TAD I MAG
0616  2200            ISZ MAG
0617  3355            DCA CO EX        /GET EXT  EG STE
0620  335             DCA MADCO
0621  1352  RETRY,    TAD CO
0622  135             TAD MADCO
0623  4322            JMS SETCO        /SET CO  R  LER F   F N TIO
0624  1354            TAD WRDCNT
0625  3032            DCA 32
0626  1353            TAD CADDR
0627  3033            DCA 33   /SET WO   CO NT &  UR EN   DD E S
0630  1355            TAD CO EX
0631  6717            6717
0632  7300            CLA CLL /SET EXT R G
0633  4332            JMS MAG          /PER   M  AG APE  N IO
0634  6706            6706
0635  7421            MQL     /STO   STATUS IN MQ
0636  7 01            MQA
0637  0340            AND MC67
0640  7 50            SNA
0641  527             JMP MO  /NO ER O S
0642  0341            AND MC7677
                      SN
      5273            JMP MEO          /E
0645  0342            AND MC3543
0646  7 40            SZA CLA
0647  7 02            HLT     /BAD REC      IN
0650  2351  PAR,      ISZ REVCNT       /PAR TY
0651  5253            JMP .+2 /RETRY
0652  7 02            HLT     /RETRY F ILURE
0653  1352            TAD CO
0654  0345            AND MC70
```

```
655   1346              TAD MCM40
656   7650              SN  CLA /F ILUR  O  MT?
657   1343              TAD MC100       /YES
      3350               CA MADCO
661   1352               AD CO
662   0344              AND MC7000
663   1345              TAD MC70
664   4322              JMS SETCO       /SET CO  RO LE       ACKSPACE
665   7240              CLA CMA
666   3032              DCA 32   /WC = RECS BACKSPACED
667   4332              JMS MAG         /PER O M BACKSPACE
670   5221              JMP RETRY       /AN   RY  G IN
671   2200      MO  ,   ISZ MAG
672   5600              JMP I MAG       /N  MAL EXIT
673   1352      MEOF,   TAD CO
674   0345              AND MC70
675   1346              TAD MCM40
676   7650              SN  CLA /EO  ON WRITE?
677   5250              JMP PAR /Y S - PARITY PRO LEM
7 0   7 00              NOP     /REWIND UN T
7 1   5600              JMP I MAG       /EXIT EO
7 2   0000      REWIN ,  0
703   1352              TAD CO
7 4   0344              AN  MC7000
7 5   1347              TAD MC10
7 6   4322              JMS SETCO       /SET CO TR  LER F     WIN
707   6722              6722    /EXECUTE RE IN
710   1352              TAD CO
7 1   0344              AN  MC7000
7 2   7106              CLL RTL
713   7 06              RTL     /LO D CO T W/ N  T  AG
714   1357              TAD N XM
7 5   3356              DCA NEXCO
716   1756              TAD I N XCO
7 7   6716              6716
7 0   7300              CLA CLL
7 1   57 2              JMP I R WIN
722   0000      SETCO ,  0
723   6711              6711
724   5323              JMP .-1
7 5   6716              6716
7 6   67 1              67 1
7 7   5326              JMP .-1
7 0   7300              CLA CLL
731   5722              JMP I SETCO
732   0000      MAG  ,  0
7 3   67 2              67 2
7 4   6701              6701
7 5   5334              JMP .-1
7 6   57 2              JMP I MAG
7 7   7766      MCM12,  -12
7 0   2764      MC5774, 27 4
741   7667      MC7677, 7667
742   3543      MC3543, 3543
743   0100      MC100,  100
7 4   7 00      MC7000, 7000
7 5   0070      MC70,   7
7 6   7740      MCM40,  -40
7 7   0010      MC10,   10
750   0000      MADCO ,  0
751   0000      REVCN ,  0
7 2   0000      CO ,    0
7 3   0000      CADDR,  0
7 4   0000      WRDCN ,  0
7 5   0000      CO EX,  0
7 6   0000      N XCO ,  0
7 7   0760      N XM,   N XTM
760   1020      N XTM,  1020    /0
761   0040              40      /1
```

| | | | |
|---|---|---|---|
| 7 2 | 0040 | 40 | /2 |
| 7 3 | 0040 | 40 | /3 |
| UF | 0456 | | |
| ADDR | 0753 | | |
| H | 0221 | | |
| H X | 0317 | | |
| 41000 | 0500 | | |
| 42 | 0050 | | |
| 4402 | 0041 | | |
| 442 | 0501 | | |
| 447 | 0042 | | |
| 46 | 0046 | | |
| 4473 | 0049 | | |
| NI | 0031 | | |
| CNIB | 0277 | | |
| 0 | 0752 | | |
| 0 EX | 0755 | | |
| 0 F | 0226 | | |
| 1000 | 0237 | | |
| 1177 | 0037 | | |
| 20 | 0223 | | |
| 277 | 0553 | | |
| 3 17 | 0502 | | |
| 3030 | 0225 | | |
| 3030 | 0316 | | |
| 3777 | 0044 | | |
| 4 01 | 0047 | | |
| 41 | 0043 | | |
| 7000 | 0222 | | |
| 07 | 0220 | | |
| 07 0 | 0045 | | |
| 1 | 0027 | | |
| L | 0025 | | |
| 452 | 0224 | | |
| ADC0 | 0750 | | |
| 33 | 0600 | | |
| 33 | 07 2 | | |
| C412 | 07 7 | | |
| C44 | 0746 | | |
| C14 | 07 7 | | |
| C1 | 0743 | | |
| C5545 | 0742 | | |
| C57 | 0740 | | |
| C70 | 0745 | | |
| C7 | 0744 | | |
| C7577 | 0741 | | |
| MO | 0573 | | |
| U | 0671 | | |
| PF | 0330 | | |
| EXCO | 07 6 | | |
| | 0757 | | |
| | 0750 | | |
| XB1 | 0464 | | |
| XB2 | 0473 | | |
| | 0035 | | |
| | 0036 | | |
| LOC | 0532 | | |
| AX | 3650 | | |
| EAD | 0490 | | |
| EOF | 0034 | | |
| ETRY | 0621 | | |
| EVCN | 0751 | | |
| EVI 0 | 0732 | | |
| EOM | 0025 | | |
| EOL | 0024 | | |
| ETCO | 0732 | | |
| TART | 0340 | | |
| T0 | 0230 | | |
| T1 | 0244 | | |

```
[illegible]T10   [illegible]32[illegible]
[illegible]T2    0300
[illegible]T3    [illegible]
[illegible]E[illegible]D  [illegible]421
[illegible]   [illegible]133
[illegible]DCNT  [illegible]754
[illegible]I[illegible]E  0442
[illegible]   [illegible]23
[illegible]   [illegible]
[illegible]NY[illegible]   [illegible]42[illegible]
[illegible]READ  [illegible]22
[illegible]ITE   [illegible]21
```

Program No. 2, Loader 3

```
        BSW=7002
        MQL=7421
        MQA=7501
        SWP=7521
        CDF0=6201
        CDF1=6211
        CDF2=6221
        DMCR=6517
        DCBRH=6501
        DCBRL=6500
        DSSRH=6503
        DSSRL=6502
        DESR0=6511
        DESR1=6515
        DWCR=6516
        DDMAR=6514
        DCSR=6512
        DAIRL=6504
        DAIRH=6505
        DUSRL=6506
        DUSRH=6507
        GTF=6004
        RTF=6005
        RMF=6244
        RIB=6234
        SRQ=6003

        FIXTAB
                *20

0020  0600  XMAG,   MAG
0021  0442  XWRITE, WRITE
0022  0400  XREAD,  READ
0023  0456  XBUF,   BUF
0024  0000  SEQL,   0
0025  0000  SEQH,   0
0026  3003  FL,     3003
0027  3002  FH,     3002
0030  3004  MPF,    3004
0031  0000  CNT,    0
0032  0000  OTLOC,  0
0033  0000  TMP,    0
0034  0000  REOF,   0
0035  0000  OH,     0
0036  0000  OL,     0 .
0037  1177  C1177,  1177
0040  7703  CM75,   -75
0041  7376  CM402,  -402
0042  7304  CM474,  -474
0043  0041  C41,    41
0044  3777  C3777,  3777
0045  7700  C7700,  7700
```

```
0046  7772  CM6,     -6
0047  4001  C4001,   4001
0050  7776  CM2,     -2


            PAGE

                     *200
0200  7300  ST0,     CLA CLL
0201  7404           OSR              /GET CHAR FROM SW
0202  0220           AND C77
0203  3221           DCA CHAR
0204  7000           NOP
0205  1237           TAD C1000
0206  1223  ST3,     TAD C20
0207  3624           DCA I L402       /SET READ COMMAND FOR UNIT 1
0210  4422           JMS I XREAD      /SEARCH FOR DESIRED CHAR IN REG. LI
0211  4226           JMS COMP
0212  5210           JMP .-2
0213  4421           JMS I XWRITE     /TRANSFER RELATIVE RECORDS ONLY
0214  4422           JMS I XREAD
0215  4226           JMS COMP
0216  5240           JMP ST1
0217  5213           JMP .-4

0220  0077  C77,     77
0221  0000  CHAR,    0
0222  7000  C7000,   7000
0223  0020  C20,     20
0224  0402  L402,    402
0225  3033  C3033,   3033

0226  0000  COMP,    0
0227  1625           TAD I C3033
0230  7000           NOP
0231  0220           AND C77
0232  7041           CIA
0233  1221           TAD CHAR
0234  5320           JMP ST10
0235  2226           ISZ COMP         /YES
0236  5626           JMP I COMP       /NO

0237  1000  C1000,   1000

0240  1624  ST1,     TAD I L402
0241  0222           AND C7000
0242  1222           TAD C7000
0243  7640           SZA CLA          /UNIT 1 (REG LISTINGS)?
0244  5300           JMP ST2          /NO, CAPTIONS - DO BLANKS
0245  1251           TAD C5320        /SET UP 2ND CHAR COMPARE
0246  3234           DCA 234
0247  7332           7332
0250  5206           JMP 206
0251  5320  C5320,   5320

                     *277
0277  0000  CNTB,    0

0300  4423  ST2,     JMS I XBUF       /SET UP BLANK RECORD
0301  7300           CLA CLL
0302  1277           TAD CNTB
0303  7041           CIA
0304  3277           DCA CNTB         /SET UP BLANKS COUNTER
0305  4421           JMS I XWRITE     /OUTPUT BLANKS
0306  2277           ISZ CNTB
0307  5305           JMP .-2
0310  7402           HLT              /PROGRAM COMPLETE

                     *316
```

```
0316  3034  C3034,  3034
0317  0000  CHARX,  0

0320  7640  ST10,   SZA CLA         /MATCH?
0321  5626          JMP I COMP      /NO
0322  1716          TAD I C3034     /2ND CHAR CHECK
0323  7002          BSW
0324  0220          AND C77
0325  7041          CIA
0326  1317          TAD CHARX
0327  7640          SZA CLA         /2ND MATCH?
0330  5626          JMP I COMP      /NO, REJECT RECORD
0331  1335          TAD 335
0332  3234          DCA 234
0333  2226          ISZ COMP        /RESET NORMATL EXIT TO COMPARE SUB
0334  5626          JMP I COMP
0335  7650          7650

                    *340

0340  7300  START,  CLA CLL
0341  7404          OSR             /GET # BLANKS FROM SW
0342  3277          DCA CNTB
0343  7402          HLT
0344  5200          JMP ST0
                    *400
0400  0000  READ,   0
0401  4420          JMS I XMAG
0402  1020          1020    /COM
0403  3000          3000    /ADR
0404  7000          -1000   /WC
0405  0100          100     /EXT REG
0406  7402          HLT     /EOF
0407  5600          JMP I READ      /OK
0410  4420          JMS I XMAG
0411  1010          1010
0412  0000          0
0413  0000          0
0414  0000          0
0415  7000          NOP
0416  7402          HLT
0417  7000          NOP
0420  0416  XNYT,   416
0421  4420  TEND,   JMS I XMAG
0422  0050          50
0423  0000          0
0424  0000          0
0425  0000          0
0426  7000          NOP
0427  4420          JMS I XMAG
0430  0010          10
0431  0000          0
0432  0000          0
0433  0000          0
0434  7000          NOP
0435  7402          HLT
0436  7300          CLA CLL
0437  3035          DCA OH
0440  3036          DCA OL
0441  7402          HLT

0442  0000  WRITE,  0
0443  4420          JMS I XMAG
0444  0040          40      /COM
0445  3000          3000    /ADR
0446  7000          -1000   /WC
0447  0100          100     /EXT REG
0450  7402          HLT     /EOF
0451  2036          ISZ OL
```

```
0452  5642           JMP I WRITE
0453  2035           ISZ OH
0454  5642           JMP I WRITE
0455  7402           HLT

0456  0000  BUF,     0
0457  7300           CLA CLL
0460  1303           TAD C2777
0461  3012           DCA 12
0462  1330           TAD CM1000
0463  3031           DCA CNT
0464  3412  NXB1,    DCA I 12
0465  2031           ISZ CNT
0466  5264           JMP NXB1
0467  5656           JMP I BUF
0470  3012           DCA 12
0471  1301           TAD CM420
0472  3031           DCA CNT
0473  7240  NXB2,    CLA CMA
0474  3412           DCA I 12
0475  2031           ISZ CNT
0476  5273           JMP NXB2
0477  5656           JMP I BUF

0500  7000  CM1000,  -1000
0501  7360  CM420,   -420
0502  3017  C3017,   3017
0503  2777  C2777,   2777
            PAGE
            /FORMAT:         JMS I XMAG
            /        COMMAND
            /        ADDRESS
            /        WORD COUNT
            /        EXTENSION REGISTER
            /        RETURN: EOF
            /        RETURN: NORMAL
0600  0000  MAG,     0
0601  1337           TAD MCM12
0602  3351           DCA REVCNT       /SET 10 RETRIES
0603  1600           TAD I MAG
0604  2200           ISZ MAG
0605  3352           DCA COM /GET COMMAND
0606  7240           CLA CMA
0607  1600           TAD I MAG
0610  2200           ISZ MAG
0611  3353           DCA CADDR        /GET CURRENT ADDRESS
0612  1600           TAD I MAG
0613  2200           ISZ MAG
0614  3354           DCA WRDCNT       /GET WORD COUNT
0615  1600           TAD I MAG
0616  2200           ISZ MAG
0617  3355           DCA COMEX        /GET EXT REGISTER
0620  3350           DCA MADCOM
0621  1352  RETRY,   TAD COM
0622  1350           TAD MADCOM
0623  4322           JMS SETCOM       /SET CONTROLLER FOR FUNCTION
0624  1354           TAD WRDCNT
0625  3032           DCA 32
0626  1353           TAD CADDR
0627  3033           DCA 33  /SET WORD COUNT & CURRENT ADDRESS
0630  1355           TAD COMEX
0631  6717           6717
0632  7300           CLA CLL /SET EXT REG
0633  4332           JMS MAGOP        /PERFORM MAGTAPE FUNTION
0634  6706           6706
0635  7421           MQL     /STORE STATUS IN MQ
0636  7501           MQA
0637  0340           AND MC6774
0640  7450           SNA
```

```
0641  5271           JMP MOK /NO ERRORS
0642  0341           AND MC7677
0643  7450           SNA
0644  5273           JMP MEOF        /EOF
0645  0342           AND MC3543
0646  7640           SZA CLA
0647  7402           HLT      /BAD REC OR OFFLINE
0650  2351  PAR,     ISZ REVCNT      /PARITY
0651  5253           JMP .+2 /RETRY
0652  7402           HLT      /RETRY FAILURE
0653  1352           TAD COM
0654  0345           AND MC70
0655  1346           TAD MCM40
0656  7650           SNA CLA /FAILURE ON MT?
0657  1343           TAD MC100       /YES
0660  3350           DCA MADCOM
0661  1352           TAD COM
0662  0344           AND MC7000
0663  1345           TAD MC70
0664  4322           JMS SETCOM      /SET CONTROLLER FOR BACKSPACE
0665  7240           CLA CMA
0666  3032           DCA 32  /WC = RECS BACKSPACED
0667  4332           JMS MAGOP       /PERFORM BACKSPACE
0670  5221           JMP RETRY       /AND TRY AGAIN
0671  2200  MOK,     ISZ MAG
0672  5600           JMP I MAG       /NORMAL EXIT
0673  1352  MEOF,    TAD COM
0674  0345           AND MC70
0675  1346           TAD MCM40
0676  7650           SNA CLA /EOF ON WRITE?
0677  5250           JMP PAR /YES - PARITY PROBLEM
0700  7000           NOP      /REWIND UNIT
0701  5600           JMP I MAG       /EXIT EOF
0702  0000  REWIND,  0
0703  1352           TAD COM
0704  0344           AND MC7000
0705  1347           TAD MC10
0706  4322           JMS SETCOM      /SET CONTROLLER FOR REWIND
0707  6722           6722     /EXECUTE REWIND
0710  1352           TAD COM
0711  0344           AND MC7000
0712  7106           CLL RTL
0713  7006           RTL      /LOAD CONT W/ NEXT MAG OP
0714  1357           TAD NEXM
0715  3356           DCA NEXCOM
0716  1756           TAD I NEXCOM
0717  6716           6716
0720  7300           CLA CLL
0721  5702           JMP I REWIND
0722  0000  SETCOM,  0
0723  6711           6711
0724  5323           JMP .-1
0725  6716           6716
0726  6721           6721
0727  5326           JMP .-1
0730  7300           CLA CLL
0731  5722           JMP I SETCOM
0732  0000  MAGOP,   0
0733  6722           6722
0734  6701           6701
0735  5334           JMP .-1
0736  5732           JMP I MAGOP
0737  7766  MCM12,   -12
0740  2764  MC6774,  2764
0741  7667  MC7677,  7667
0742  3543  MC3543.  3543
0743  0100  MC100,   100
0744  7000  MC7000,  7000
0745  0070  MC70,    70
```

```
0746  7740  MCM40,  -40
0747  0010  MC10,   10
0750  0000  MADCOM, 0
0751  0000  REVCNT, 0
0752  0000  COM,    0
0753  0000  CADDR,  0
0754  0000  WRDCNT, 0
0755  0000  COMEX,  0
0756  0000  NEXCOM, 0
0757  0760  NEXM,   NEXTM
0760  1020  NEXTM,  1020     /0
0761  0040          40       /1
0762  0040          40       /2
0763  0040          40       /3


BUF     0456
CADDR   0753
CHAR    0221
CHARX   0317
CM1000  0500
CM2     0050
CM402   0041
CM420   0501
CM474   0042
CM6     0046
CM75    0040
CNT     0031
CNTB    0277
COM     0752
COMEX   0755
COMP    0226
C1000   0237
C1177   0037
C20     0223
C2777   0503
C3017   0502
C3033   0225
C3034   0316
C3777   0044
C4001   0047
C41     0043
C5320   0251
C7000   0222
C77     0220
C7700   0045
FH      0027
FL      0026
L402    0224
MADCOM  0750
MAG     0600
MAGOP   0732
MCM12   0737
MCM40   0746
MC10    0747
MC100   0743
MC3543  0742
MC6774  0740
MC70    0745
MC7000  0744
MC7677  0741
MEOF    0673
MOK     0671
MPF     0030
NEXCOM  0756
NEXM    0757
NEXTM   0760
NXB1    0464
NXB2    0473
```

```
OH      0035
OL      0036
OTLOC   0032
PAR     0650
READ    0400
REOF    0034
RETRY   0621
REVCNT  0751
REWIND  0702
SEQH    0025
SEQL    0024
SETCOM  0722
START   0340
ST0     0200
ST1     0240
ST10    0320
ST2     0300
ST3     0206
TEND    0421
TMP     0033
WRDCNT  0754
WRITE   0442
XBUF    0023
XMAG    0020
XNYT    0420
XREAD   0022
XWRITE  0021
●F
```

Operating Instructions for the above listed Program No. 2 are as follows:

1. Set up and load magnetic tapes. Load program into memory bank O. Add toggles for leaders 2 & 3 loc. 317=2nd char. which defines split.

Listings-tape unit 1
Captions-tape unit 2
Scratch-tape unit 0

2. Set Switch Register (SR)=340: load and clear

3. Set SR=# of blank records desired: continue. When program halts (almost instantly) set SR=DRC letter being processed (bits 6–11): continue. The program will halt at location 310 after it has completed the appropriate merge function of the desired alpha grouping:

a. To terminate unit- Set SR=421: load and continue. Program halts at location 435 (program complete).

b. To terminate output tape only- Set SR=421: load and continue. Program halts at location 435. Go to instruction #2 to continue processing.

c. To continue on same output tape- Go to instruction #2 to continue processing.

Halts:

310- see above 406- end of file on input tape. Manually rewind and dismount tape; mount and load next tape on tape drive; SR=401; load, continue.

450, 647, 652- Magtape failures

C. Retrieval File and Base Data File Construction

C1. In General

This portion of the exemplary embodiment is generally depicted in FIG. 25. It comprises Program numbers 3, 4 and 5. Program 5 serves to create an ASCII coded base data magnetic disk file from the standardized converted output 158 of the conversion portion of the system. Program 3 takes this same input data and constructs an intermediate retrieval file on magnetic tape while program 4 uses the intermediate file to temporarily construct a miniature version of a retrieval file before finally constructing the magnetic disk retrieval file. An ASCII base data file and a corresponding retrieval file are constructed and stored on magnetic disk for each of the 16 alphabetic groupings or setments previously discussed.

For this exemplary embodiment, the following set of PICs is used:

Field 1. In Finding Name Field (first full word of standardized name field) and; $\phi$2,2+; $\phi$3,3+; $\phi$4,4+; $\phi$5,5+; $\phi$6,6+; $\phi$7,7+ where $\phi$=A→Z (regardless of case) [Note: The first character value is ignored because the files are already separated based on the first character of this field.]

Field 2. In name field but not finding name (all other words of name field plus full title field) and; $\phi$1,1+; $\phi$2,2+; $\phi$3,3+; $\phi$4,4+; $\phi$5,5+; $\phi$6,6+ where $\phi$=A→Z (regardless of case)

Field 3. In designation field or street, house number house number suffix, locality fields and $\phi$1,1+; $\phi$2,2+; $\phi$3,3+; $\phi$4,4+ where $\phi$=A→Z (regardless of case) and $\phi$=0→9

Field 4. In business-professional listings or in residential-professional listings.

Thus there are nominally 457 PICs in all associated with the alphabetic values and sequential locations of characters in each base data file record in this exemplary embodiment.

Program No. 3 first analyzes the above three noted fields and sets up a two-dimensional intermediate retrieval file comprising a bit matrix representing character value versus character position for each field of a given record. The binary bit values in this intermediate file are then transferred by Program 4 into a properly organized retrieval file (one array per PIC, one array element per base data file record, etc., before being transferred to magnetic disk for actual use. The format of the intermediated retrieval file matrix is shown in FIG. 26.

Figure 26:
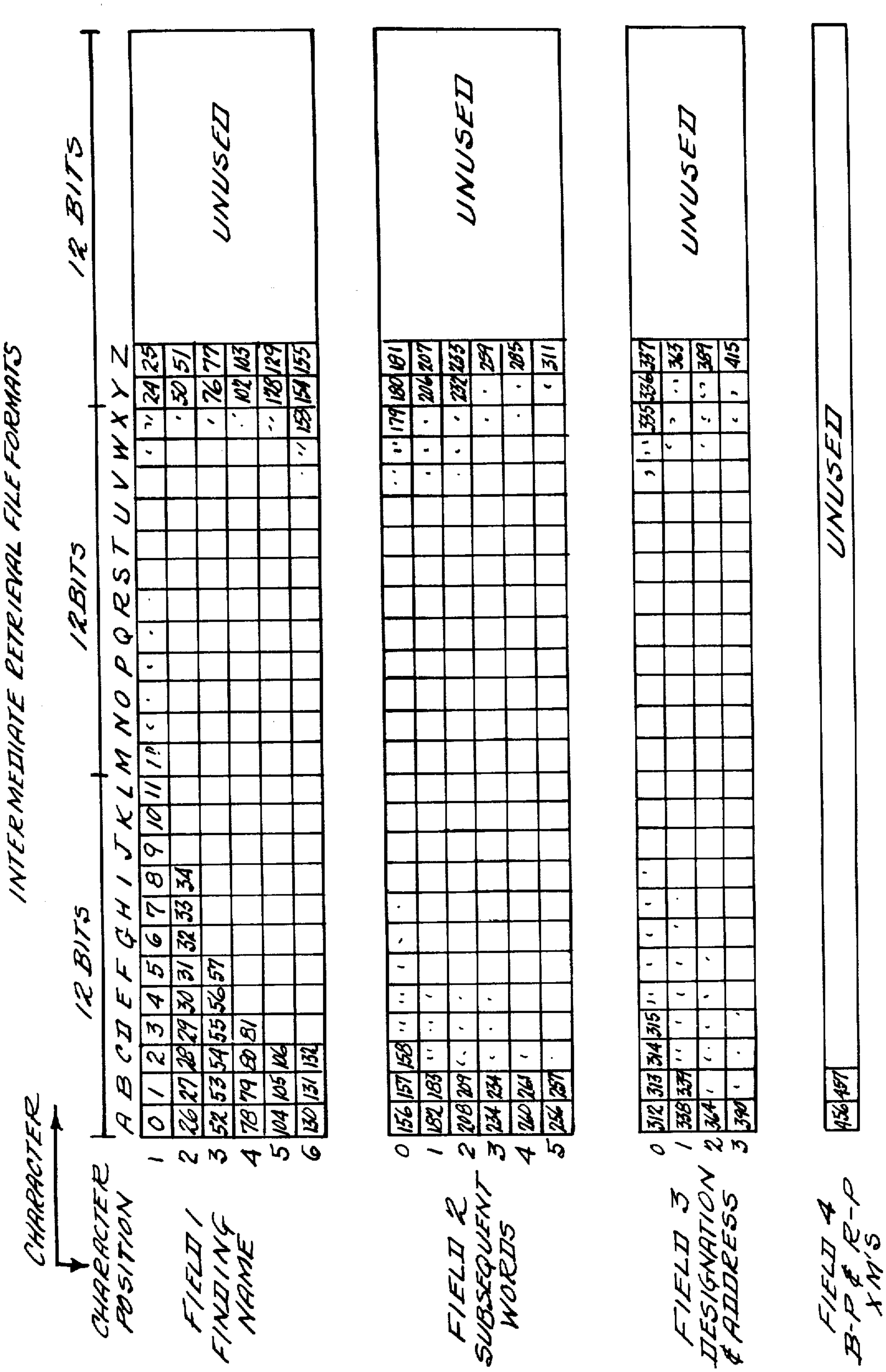
FIG. 26 is a schematic representation of the intermediate retrieval file format used in the retrieval file construction.
Figure 29:
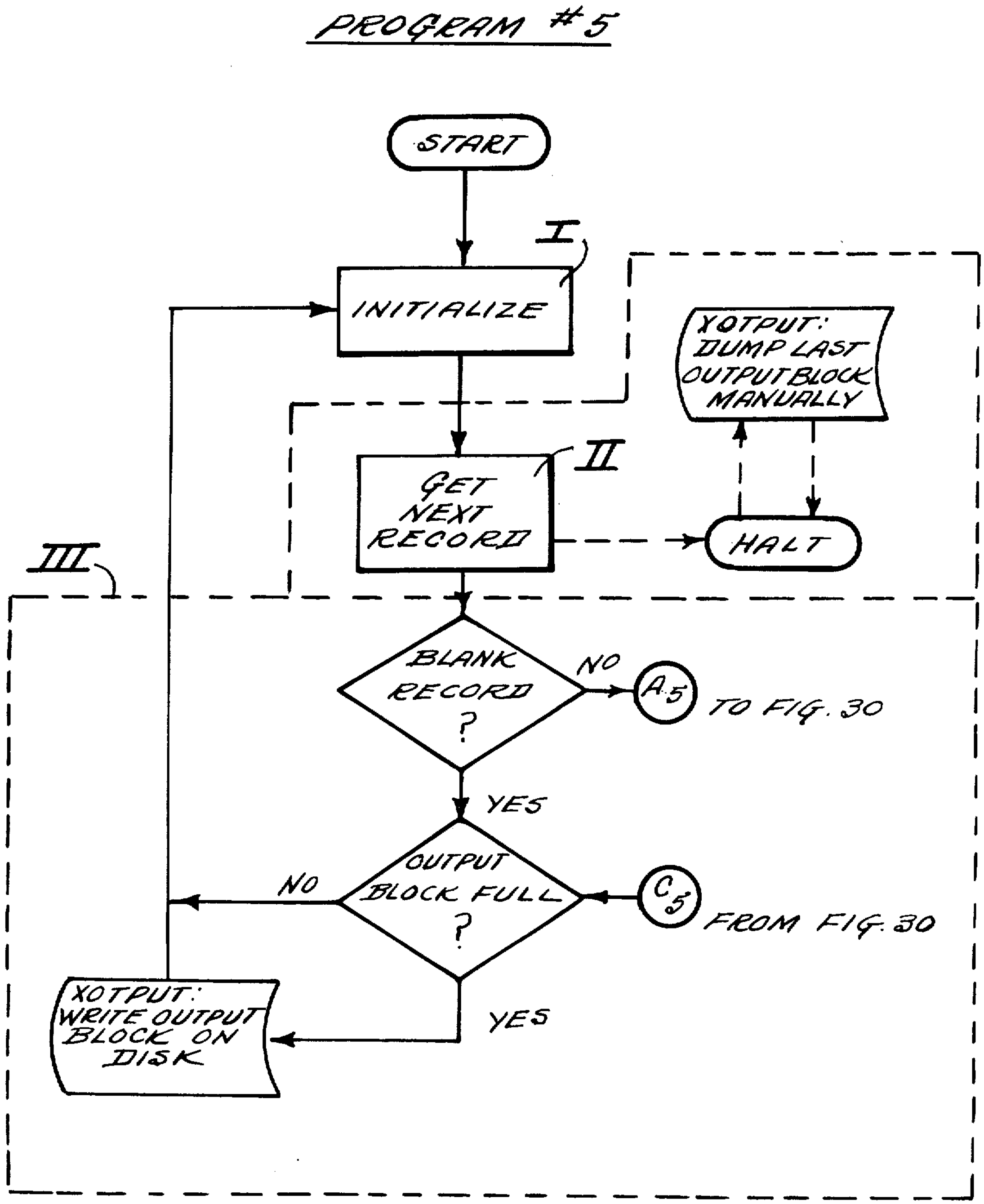
Figure 30:
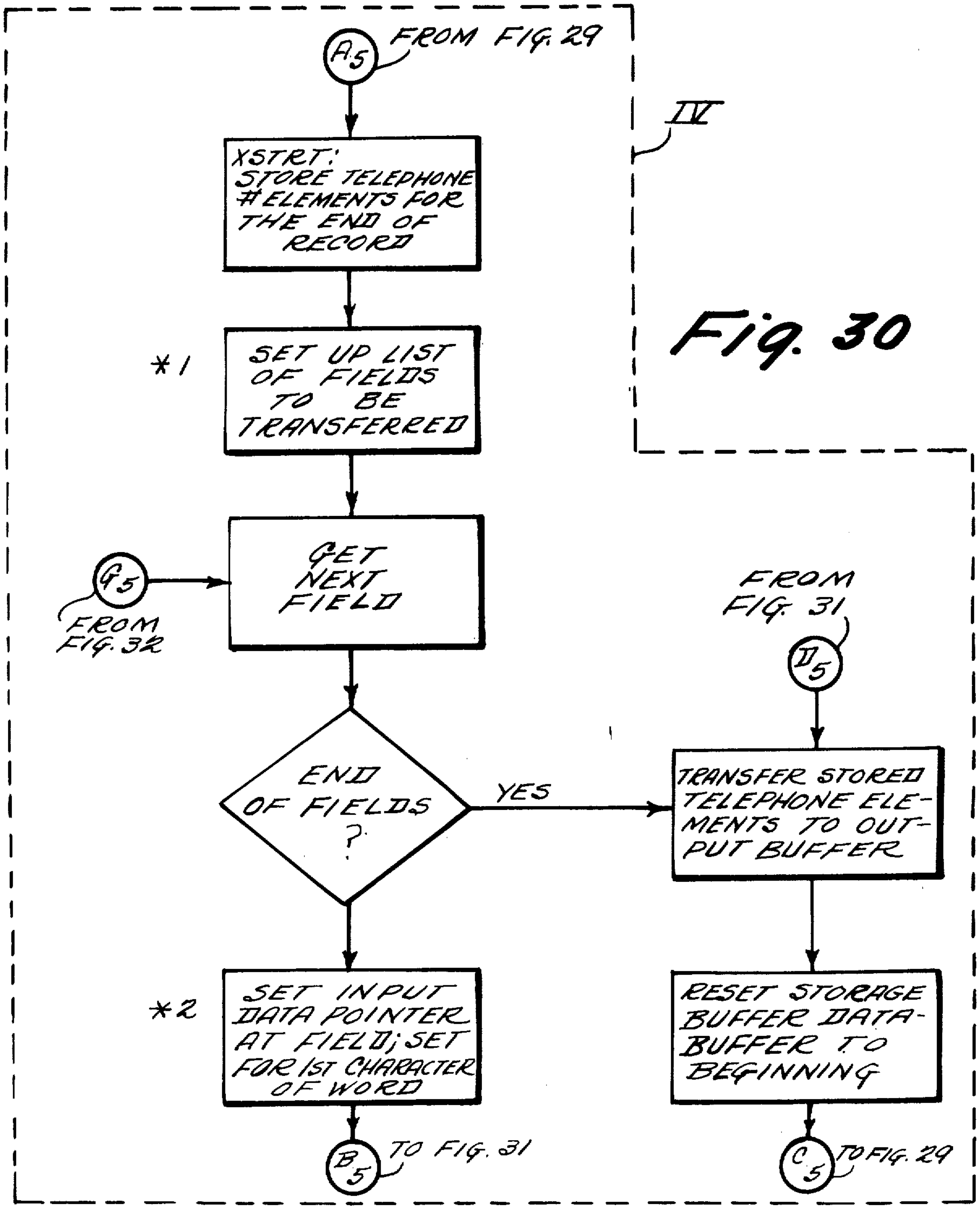
Figure 31:
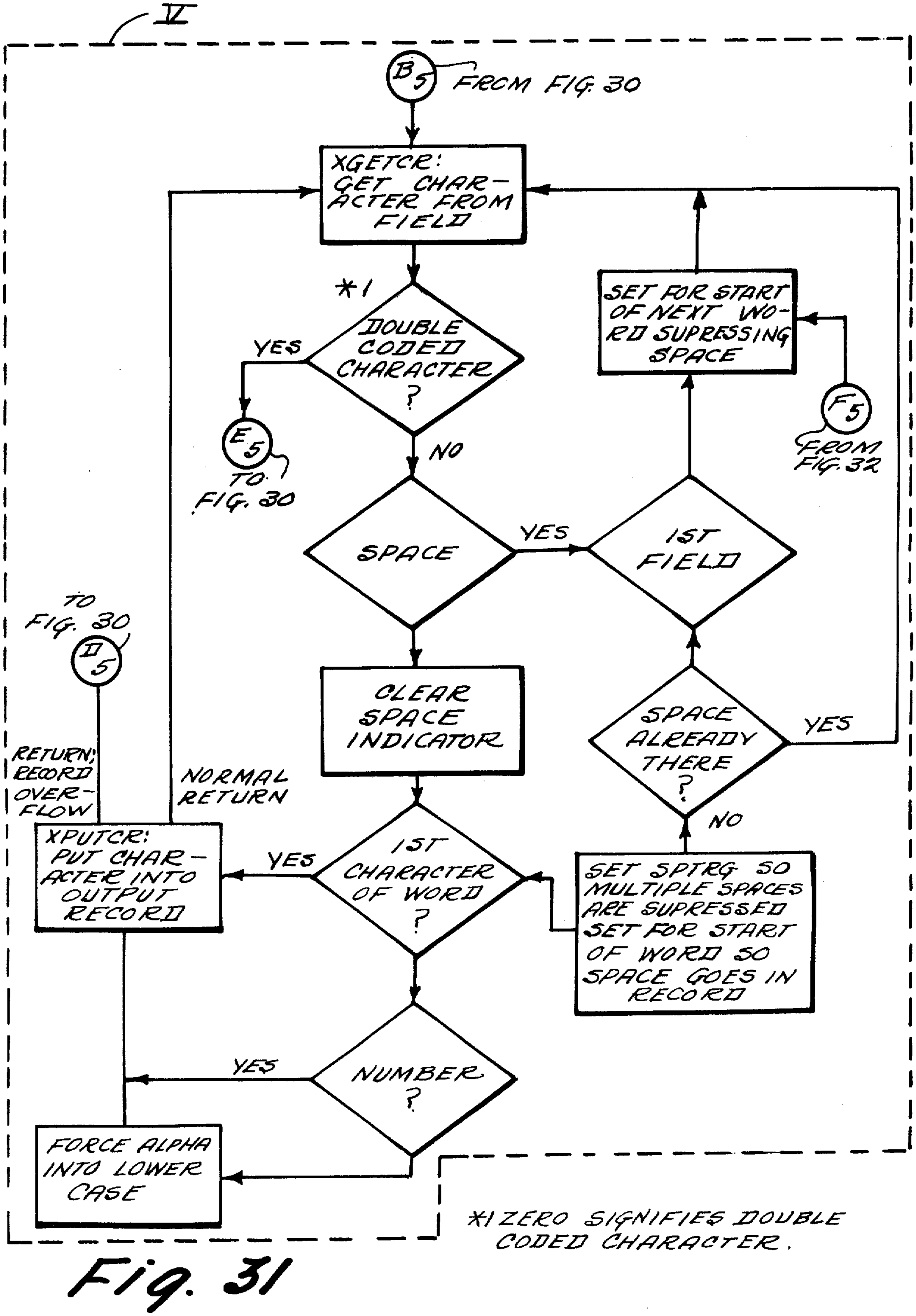
Figure 32:
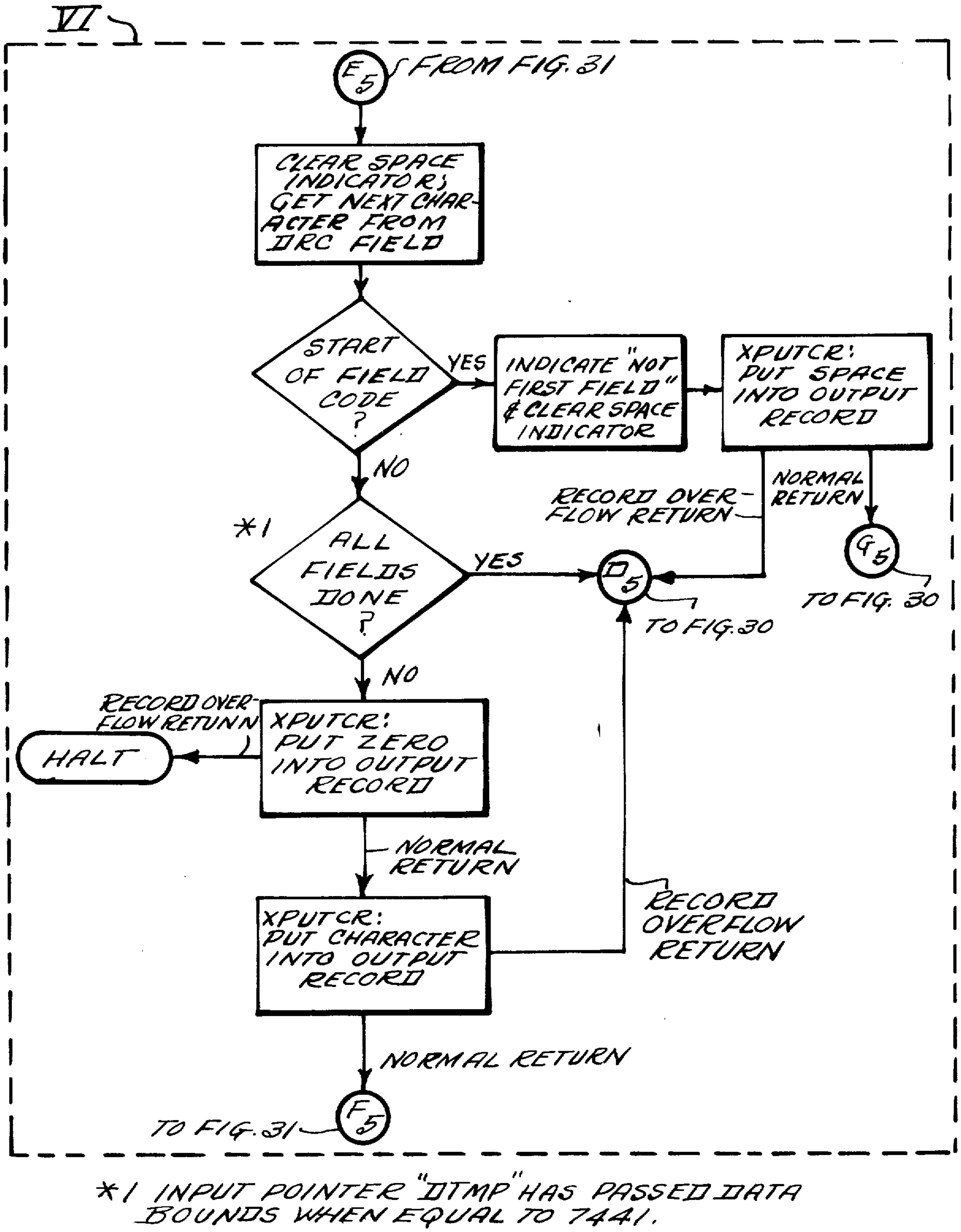
Figure 33:
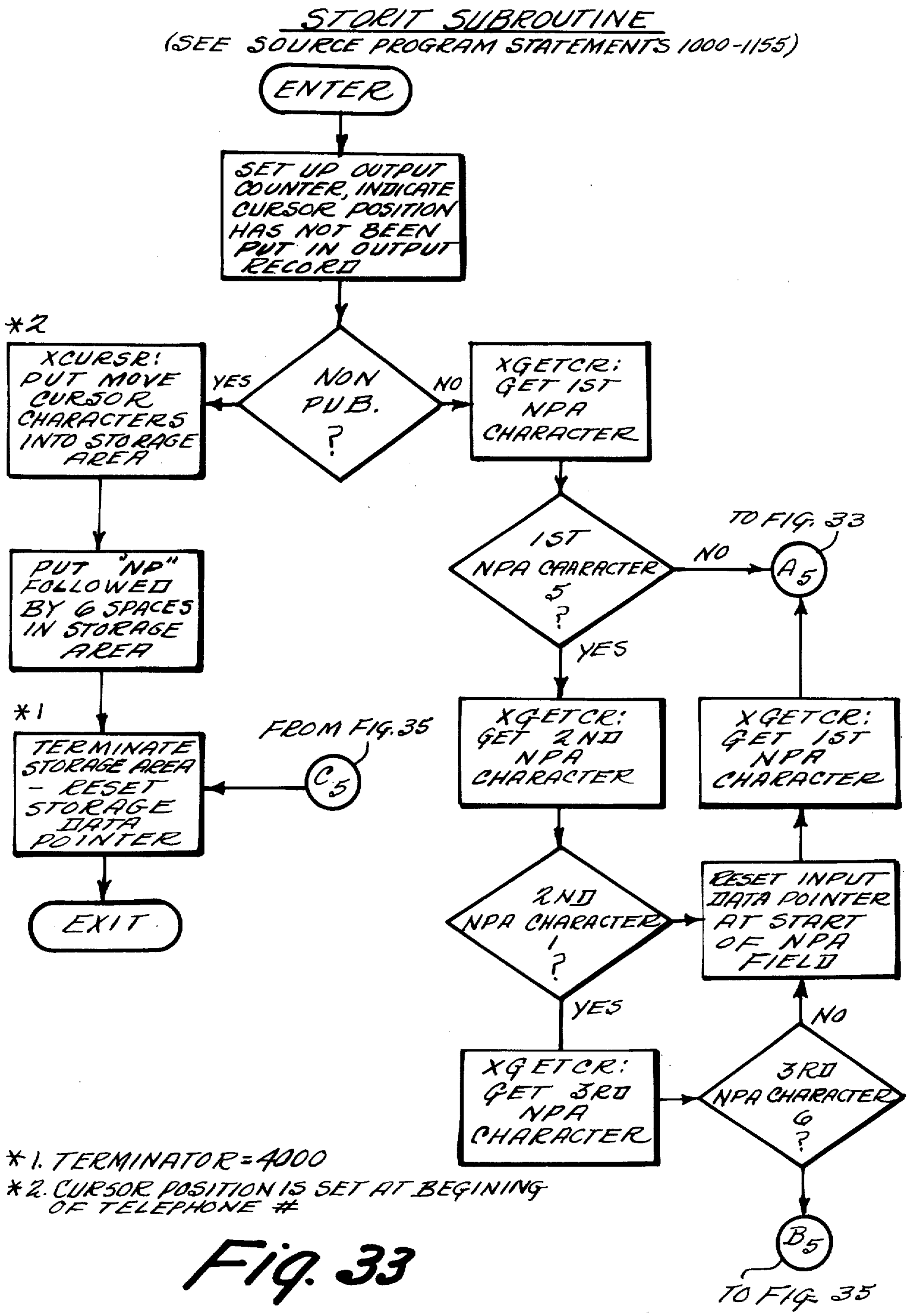
Figure 34:
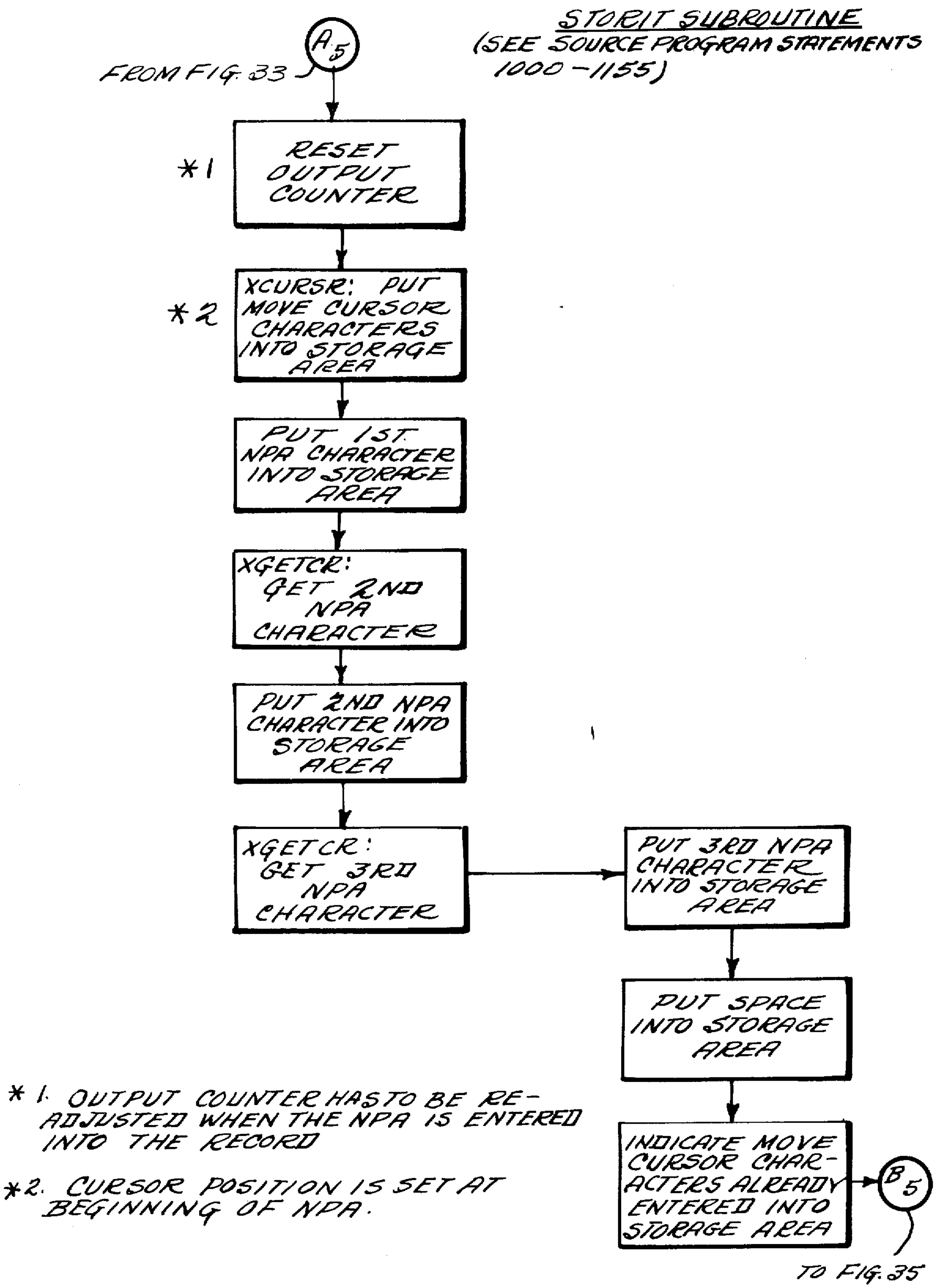
Figure 35:
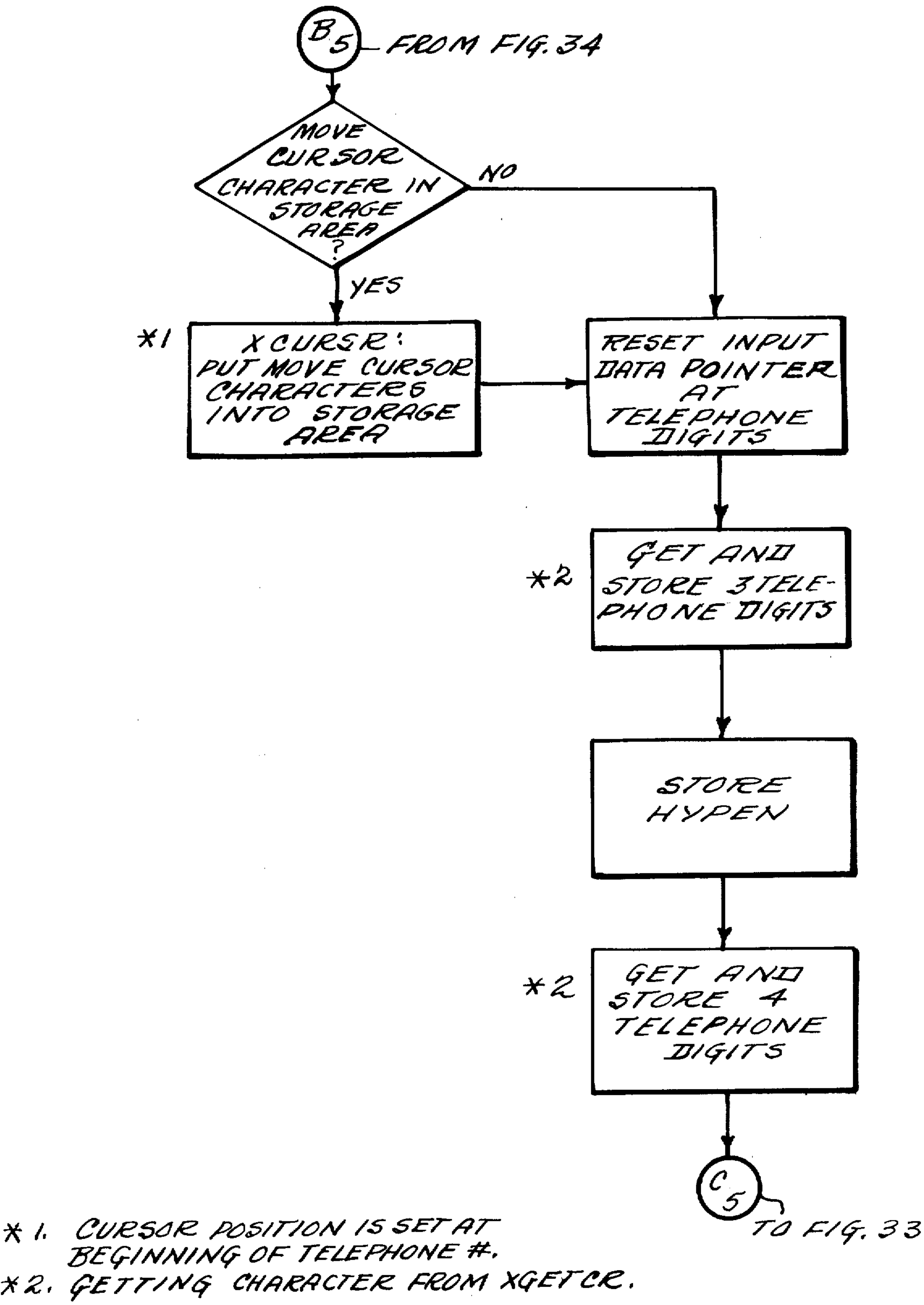
Figure 36:
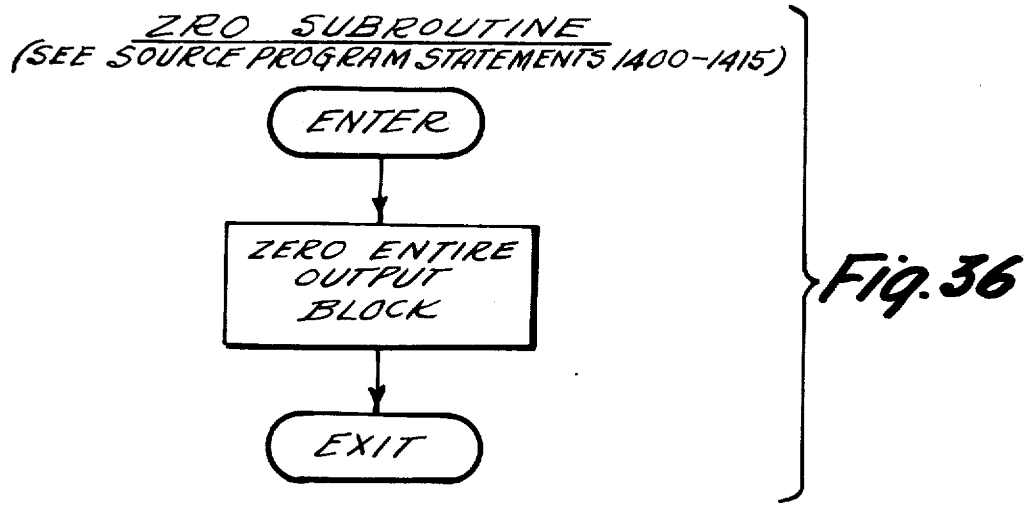
Figure 37:
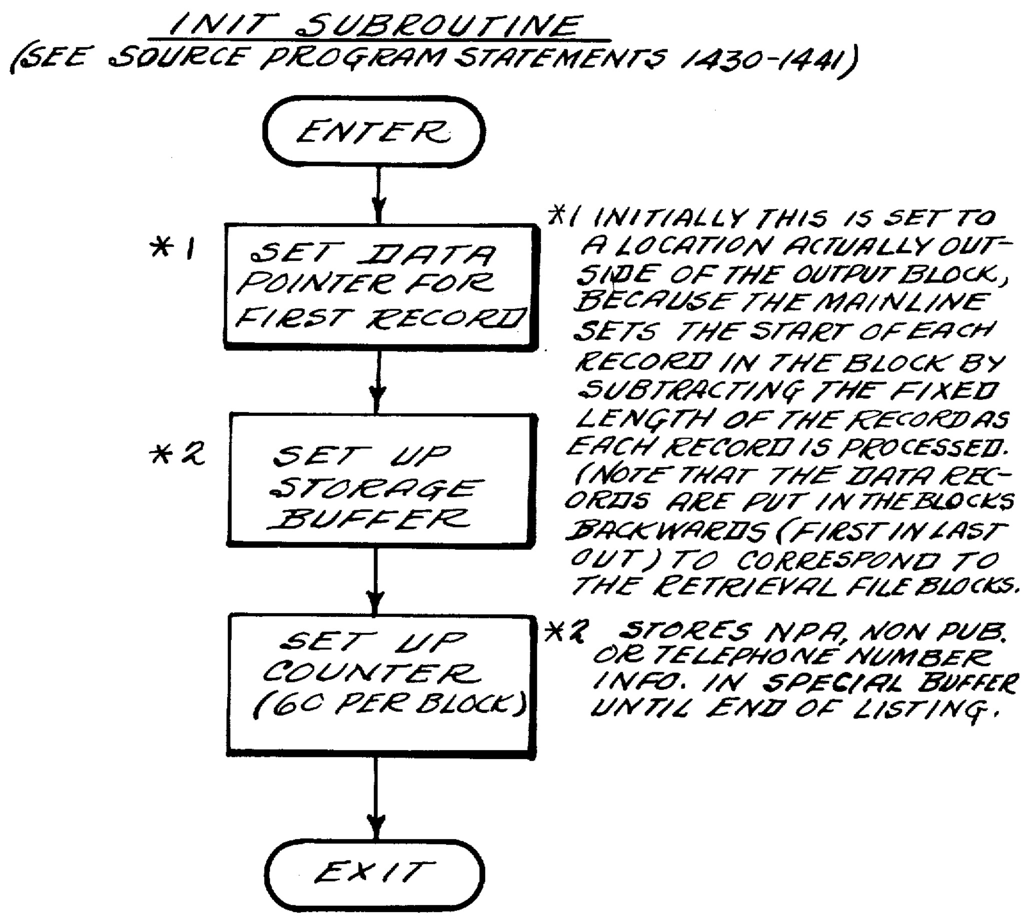
Figure 38:
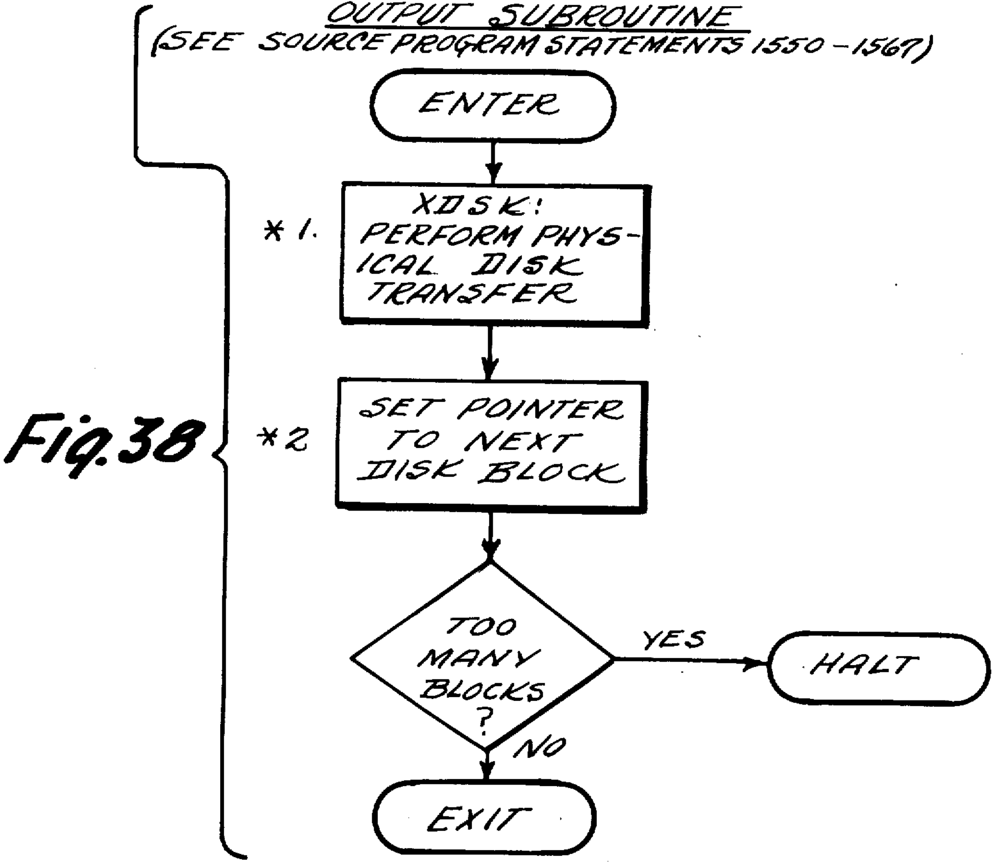
Figure 39:
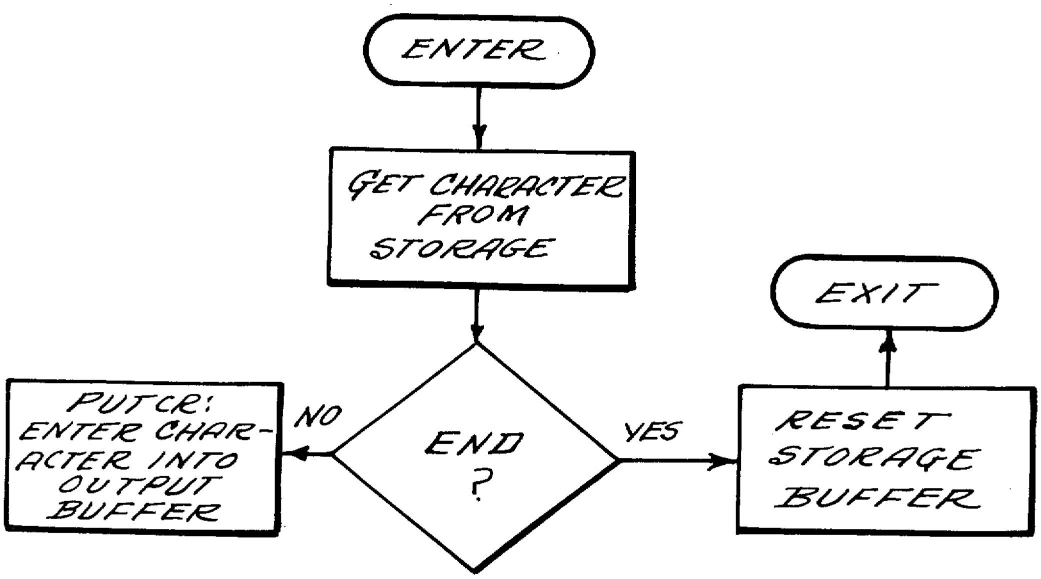
Figure 40:
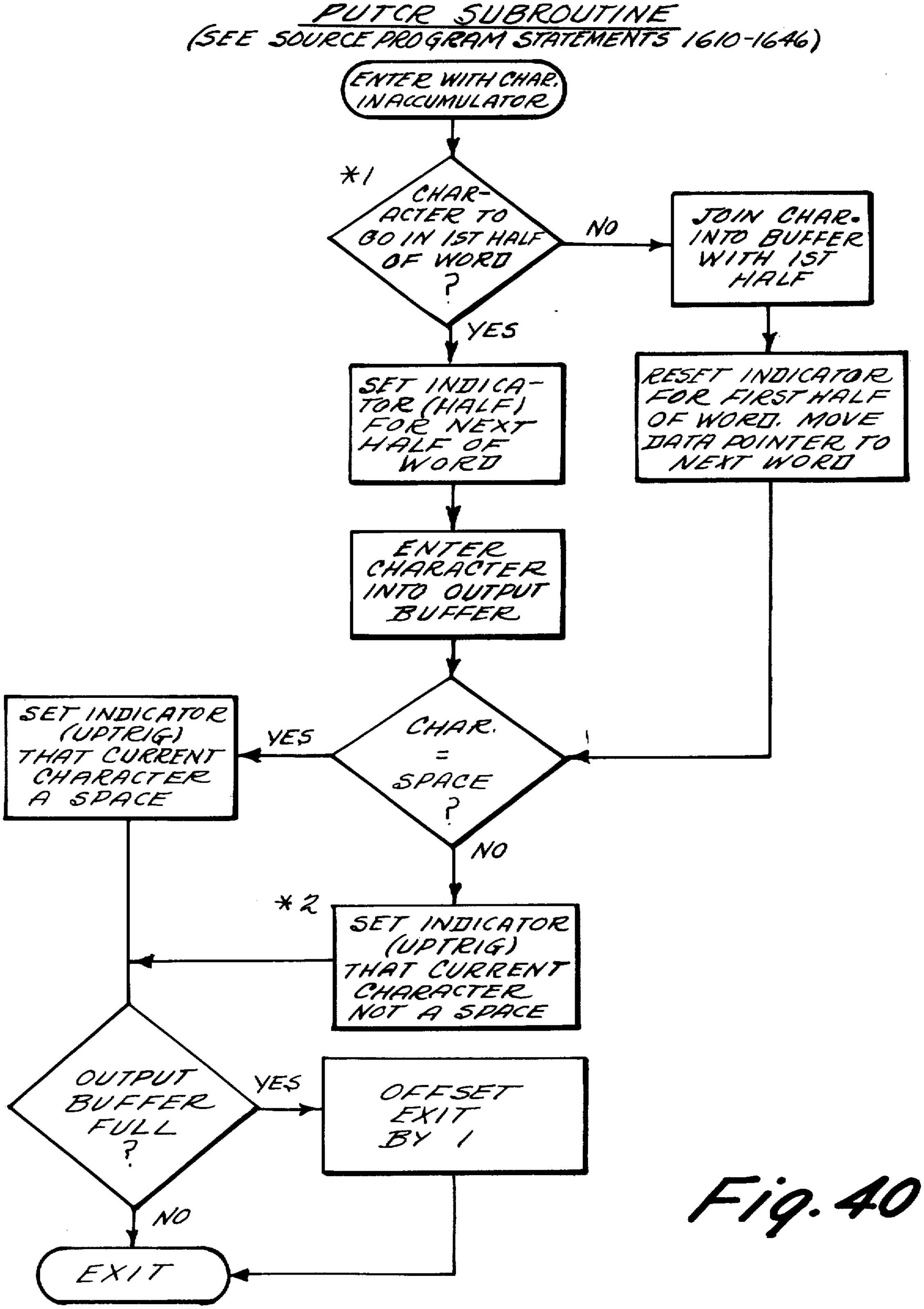

Here in FIG. 26, the bit matrix is shown as comprising several successive 12 bit words in magnetic core storage. Each of the 457 significant bits is indicated by a decimal numbered grid opening and is equivalent directly to the octal number (after the usual decimal-octal conversion) of a respectively corresponding array in the retrieval file.

The organization of the 16 data base files and associated retrieval files is depicted in FIGS. 27 and 28 for the two disk drives involved in this exemplary embodiment.

As should now be apparent, each alpha segment has 500 disk blocks reserved for storage of the ASCII-coded base data file records. Each block contains 60 fixed length records. Each record being 40 words in length (80 six bit characters). Note that the blocks and listings within the block are written in reverse order so that first in will be last out. Also, move cursor commands are embedded in the data before the telephone number for better handling in the retrieval program (program #6). A standardized six bit coding is used except for control codes. A control code is a double coded character- 0 followed by a six bit code which if 200 is added to it will produce a CRT control character.

Standardized fields transferred to the magnetic disk base data file are:

Listing Name
Listing Title
Listing Designation
House #
House # Suffix

Street
Locality
Telephone #, NPA, Non Pub Information

A brief functional description of program numbers 5, 3 and 4 follows as an introduction to a more detailed description of each:

1. Program #5

A. Obtains the necessary fields for CRT display at time of retrieval.
1. Listing name.
2. Listing title.
3. Listing designation.
4. Street
5. House Number
6. House Number suffix
7. Locality
8. NPA
9. Telephone number; non-pub info B. Format to retrieval specifications.
1. Fixed length records, blocked, stripped ASCII coding (6 bit) packed
2. Diva disk output; fixed length records and blocks; 60 records per block; 40 computer words per record; maximum of 80 characters per record. The data blocks occupy 500 disk blocks max. For each alpha group. Thus allowing 30,000 listings per alpha segment.

2. Program #3

A. Obtains the necessary fields for XM searching capability.
1. Full name.
2. Full title.
3. Full designation.
4. Street.
5. House number.
6. House number suffix.
7. Locality.
8. Listing Type.

B. Format to intermediate retrieval file specifications
1. The data is entered into a bit matrix, the matrix being a character versus character position relocation.
2. The data is separated into 4 fields.
a. Finding name- first word of full name field
b. subsequent words- other words of full name field plus full title field.
c. address- full designation, street, house number, house number suffix and locality fields.
d. Listing Type
(i) business-professional
(ii) residential-professional
3. Output to magtage intermediate retrieval file blocks, 12 records per block, 64 computer words per record, 9 track, 1600 bpi, special core dump mode.

3. Program #4

This program takes 12 intermediate retrieval file records and makes one retrieval file word for each character/character position element. These are written onto the small disk (DEC DF32D) until 120 frames (10 computer words) are stored for each element. The disk is then dumped onto magnetic tape (intermediate process). After all intermediate retrieval files are processed in this way, these mini retrieval files (120 bits each) are then input from tape and written at the proper block on the Diva disk. Note that the intermediate file bits are processed in reverse order so that last in will be first out at retrieval time. The retrieval files occupy 456 disk blocks per alpha group; each retrieval file thus allows thirty thousand bit positions.

C2. Detailed Description of Program No. 5

Program No. 5 is shown in block form at FIGS. 29–32 with subroutines utilized therein detailed in FIGS. 33–43. An explicit listing of the assembly level source program language for Program No. 5 and all related subroutines follows. It will be noted that the main program is shown as comprising sections I, II and III in FIG. 29, IV in FIG. 30, V in FIG. 31 and VI in FIG. 32. These program sections correspond to specific listing statements:

| Section | Instruction Statement | |
|---|---|---|
| I | 0400–0412 | |
| II | 0413–0420; | 0554–0560 |
| III | 0421–0434 | |
| IV | 0435–0446; | 0526–0536; |
| | 0561–0564 | |
| V | 0447–0465; | 0515–0524; |
| | 0565–0573 | |
| VI | 0466–0514 | |

These six program sections are functionally described below as an introduction to the explicit program listing:

I. Initialize.

A. Set up the starting disk output block (which is manually entered before program initiation). Note that the blocks are processed in reversed order (as are each record within a block) so that last in will be first out.
B. XSTDSK: set controller and drive #6.
C. XZRO: zero entire output block.
D. XINIT: Set up starting output record pointer (see above); set up the buffer which will store the phone #, NPA, non-pub info, and cursor commands until the end of the record is ready for processing; set up output record per block counter (60 records per block).
E. Indicate that the 1st character will be put in the 1st half of the output buffer word. Reset the character counter for the line. Set the space indicator (for deciding whether the current character is the 1st character of a word).

II. Input.

A. Read record from magnetic tape.
B. Halt on eof, dump last output block manually and halt.

III. Processing.

A. Set output data pointer at begining of next record.
B. If blank record- ignore any data processing.
C. Check for full output block and output block to disk if full. Then go to process next record (rezeroing buffer if output transfer has occurred).

IV. Processing.

A. XSTORIT: set up output character"linct". Store telephone number characters- npa and either NP (for non pub) or telephone number digits.
B. Set up the list of data fields to be processed. Inclusive in this list are the following fields: listing name, listing title, listing designation, house #, house # suffix, street and locality. Process these fields into the output record then transfer the stored telephone information to the output record.

V. Processing.

Process a field. All spaces between words are removed within a field (with the exception of full 1) and each field is separated by a space except the telephone field which is positioned by move cursor characters.

IV. Processing.

Process double coded characters. Upon encountering a "start of field code", put a space into output record and go to V to process the next field. Also, make sure that the input area is not being overrun. For regular double coded characters, transfer then directly to the output record.

Some of the subroutines not shown in the drawings are briefly explained below:

DSK Subroutine

A general purpose subroutine which drives the disk hardward to write a block ($2518_{10}$ words) of data onto the disk at a specified block. (The Disk contains possible 4060 blocks per sector and has 2 sectors for this program.

format:
JSM I XDSK
(block #)
control resumes here

DIVIDE Subroutine

A general purpose single precision divide subroutine, used by "dsk" to determine the proper head and track from the block # (block $\#20_{10}$)

format:
JMS I XDIVID
(divident)
(divisor)
remainder returned here
control resumes here with quotient in accumulator.

MAG Subroutine

General purpose subroutine to drive the magnetic tape transport.

format:
JMS I XMAG *1
(command)
(current address)
(word count)
(extension register) *2
control resumes here if tape mark encountered
control resumes here normally.

| | | | |
|---|---|---|---|
| *1: | command bits | *2: | extension bits |
| | 0 - formatter select | | 0-4 - N/A |
| | 1,2 - unit select | | 5 - special core dump mode |
| | 3-5 - N/A | | 6-9 - N/A |
| | 6-8 - tape command | | 10-11 - memory bank |
| | 9-11 - N/A | | |

OCDEC Subroutine

A general purpose octal to decimal conversion subroutine (double precision).

| | | |
|---|---|---|
| format: | JMS I XOCDEC | |
| | (high order octal #) | |
| | (low order octal #) | |
| | ten millions digit | |
| | million's digit | equivalent digits returned here |
| | hundred thousand's digit | |
| | ten thousand's digit | |
| | thousand's digit | |
| | hundred's digit | |
| | ten's digit | |
| | unit's digit | |
| | control resumes here | |

Program No. 5

```
            CDF2=6221
            CDF1=6211
            CDF0=6201
            BSW=7002
            MQL=7421
            MQA=7501
            MCR=6517
            CBRH=6501
            CBRL=6500
            SSRH=6503
            SSRL=6502
            ESR0=6511
            WCR=6516
            MAR=6514
            CSR=6512
            AIRH=6505
            AIRL=6504
            FIXTAB

                        *20     /RETRY FAILURE RECOVERY
0020  1063              TAD STOUT
0021  1102              TAD CM50
0022  3063              DCA STOUT
0023  5424              JMP I NWW
0024  0431  NWW,        N

                        *40     /ADDRESS TABLE
0040  7021  C3020,      7021
0041  7655  CM123,      -123
0042  4020  C4020,      4020
0043  0077  C77,        77
0044  0002  L2,         2
0045  0003  L3,         3
```

```
0046  1550  XOTPUT, OUTPUT   /TO DISK
0047  0200  XMAG,   MAG
0050  1400  XZRO,   ZRO
0051  1430  XINIT,  INIT
0052  5000  XDIVID, DIVIDE
0053  2600  XGETCR, GETCR
0054  1600  XPUTWD, PUTWD    /PUT STORED WD IN OUTBUF
0055  0302  XRWWD,  REWIND
0056  1610  XPUTCR, PUTCR

0057  0112  XSTORE, WORD
0060  0000  STORE,  0
0061  0137  END,    WORD+25
0062  0000  OUTBUF, 0
0063  0000  STOUT,  0        /ST  OC F   1  ATA
0064  0000  LINE,   0        /1 IF LINE 2     ATA
0065  0000  HALF,   0        /PART  F  OUTBUF #
0066  0000  DTMP,   0
0067  0000  RECCT,  0
0070  0000  CHAR,   0
0071  0000  DBLK,   0
0072  0000  SEC,    0
0073  0000  DRIVE,  0
0074  0000  LINCT,  0

0075  3020  L3020,  3020
0076  4000  C4000,  4000
0077  7706  CM72,   -72
0100  7701  CM77,   -77
0101  7772  CM6,    -6
0102  7730  CM50,   -50
0103  7746  CM32,   -32
0104  7713  CM65,   -65
0105  0000  FLDTRG, 0
0106  0000  SPTRG,  0
0107  0000  UPTRG,  0
0110  1700  XSTDSK, SETDSK
0111  1000  XSTRT,  STO  T

0112  0000  WORD,   0        /ST OF WORD IN STORAG     0  HAR  I IT
                    *1400
1400  0000  ZRO,    0        /ZER  OUTBUF  0-47 5  B2
1401  7300          CLA CLL
1402  1214          TAD CM4726       /-2518
1403  3215          DCA CTR
1404  3062          DCA OUTBUF
1405  6221          CDF2
1406  3462  AGI,    DCA I OUTBUF
1407  2062          ISZ OUTBUF
1410  2215          ISZ CTR
1411  5206          JMP AGI
1412  6201          CDF
1413  5600          JMP I ZRO        /YES
1414  3052  CM4726, -4726
1415  0000  CTR,    0
                    *1430
1430  0000  INIT,
1431  1240          TAD C4726        /-2518
1432  3063          DCA STOUT        /END  F OUTBUF 1
1433  1057          TAD XSTORE
1434  3060          DCA STORE        /ST  F WORD STO
1435  1241          TAD CM74         /-60
1436  3067          DCA RECCT        /60 REC PER BLOCK
1437  5630          JMP I INIT
1440  4726  C4726,  4726
1441  7704  CM74,   -74
                    *1550
1550  0000  OUTPUT, 0
```

```
1551  7300           CLA CLL /OUTPUT TO DISK FROM MB2
1552  1071           TAD DBLK
1553  3355           DCA DDBLK
1554  4757           JMS I XDSK
1555  0000  DDBLK,   0        /DISK BLOCK NO 40-1039
1556  7040           CLA CMA
1557  1071           TAD DBLK
1560  3071           DCA DBLK         /SET BACK ONE BLOCK
1561  1071           TAD DBLK
1562  1366           TAD CM5763       /-3059 - FIRST LIMIT
1563  7710           SPA CLA /OVERFLOW?
1564  7402           HLT      /YES
1565  5759           JMP I OUTPUT     /NO
1566  2015  CM5763,  -5763   /SET EVERY TIME TO BLOCK LIMIT
1567  2000  XDSK,    DSK
                     *1600
1600  0000  PUTWD,   0        /PUT WORD IN OUTBUF
1601  7300           CLA CLL
1602  1460  AG2,     TAD I STORE      /GET CHAR
1603  7450           SNA      /DONE?
1604  5244           JMP QQ           /YES
1605  4210           JMS PUTCH        /NO, PUT CHAR INTO BUF
1606  2060           ISZ STORE
1607  5202           JMP AG2


1610  0000  PUTCH,   0
1611  3243           DCA CHR /SAVE 6 BIT CHAR
1612  6221           CDF2
1613  1065           TAD HALF
1614  7640           SZA CLA /CHAR IN 1ST HALF OF WD?
1615  5234           JMP SECHLF       /NO
1616  2065           ISZ HALF         /YES, SET TRG
1617  1243           TAD CHR
1620  7002           BSW
1621  3462           DCA I OUTBUF     /PUT IN BUF.
1622  1243           TAD CHR
1623  1100           TAD CM77
1624  7650           SNA CLA          /SPACE?
1625  7001           IAC              /YES
1626  3107           DCA UPTRG        /NO
1627  6201  TG,      CDF 0
1630  2074           ISZ LINCT        /BUF FULL?
1631  5610           JMP I PUTCH      /NO
1632  2210           ISZ PUTCH        /YES
1633  5610           JMP I PUTCH
1634  1243  SECHLF,  TAD CHR
1635  1462           TAD I OUTBUF
1636  3462           DCA I OUTBUF     /PUT CHAR INTO SECOND HALF
1637  3065           DCA HALF         /CLEAR TRG
1640  2062           ISZ OUTBUF
1641  5222           JMP TG-5
1642  7402           HLT
1643  0000  CHR,     0
1644  1057  QQ,      TAD XSTORE
1645  3060           DCA STORE
1646  5600           JMP I PUTWD
                     *2000
2000  0000  DSK,     0
2001  7300           CLA CLL
2002  1600           TAD I DSK
2003  2200           ISZ DSK
2004  3206           DCA DIVR
2005  4452           JMS I XDIVID
2006  0000  DIVR,    0        /BLOCK NO
2007  0024           24       /DIVISOR - 20
2010  0000  HD,      0        /REMAINDER
2011  3333           DCA CYL /CYL IN AC
2012  7326           CLA STL RTL      /2
```

```
2013  6517           MCR
2014  7300           CLA CLL /LOAD MODE
2015  1330           TAD C1000
2016  6501           CBRH    /SELECT CYLINDER
2017  7300           CLA CLL
2020  1333           TAD CYL
2021  7106           CLL RTL
2022  7006           RTL
2023  6500           CBRL    /CYL NO IN BITS 0-7
2024  7300           CLA CLL
2025  1331           TAD C1400
2026  6501           CBRH    /SP FN
2027  7300           CLA CLL
2030  1331           TAD C1400
2031  6500           CBRL    /SEEK AND RESET HEAD
2032  7300           CLA CLL
2033  1210           TAD HD  /SET UP HEADER IMAGE
2034  7002           BSW
2035  7110           CLL RAR /HD IN BITS 0-6
2036  1073           TAD SEC
2037  3336           DCA HEAD         /WORD 0
2040  1333           TAD CYL
2041  3337           DCA HEAD+1       /WORD 1
2042  1336           TAD HEAD
2043  1337           TAD HEAD+1
2044  1340           TAD HEAD+2
2045  7041           CIA
2046  3341           DCA HEAD+3       /WORD 3 - CHECKSUM
2047  7325           CLA STL IAC RAL /3
2050  6517           MCR     /READ MODE
2051  7300           CLA CLL
2052  6503           SSRH    /READ SEL STATUS REG
2053  7006           RTL
2054  7006           RTL
2055  7710           SPA CLA /READY?
2056  5252           JMP .-4 /NO
2057  7326           CLA STL RTL      /YES, 2
2060  6517           MCR     /LOAD MODE
2061  7300           CLA CLL
2062  6501           CBRH    /SELECT HEAD
2063  1210           TAD HD
2064  7106           CLL RTL
2065  7006           RTL
2066  6500           CBRL    /HEAD NO BITS 3-7
2067  7300           CLA CLL
2070  1327           TAD C5400
2071  3334           DCA COMM         /SET TO COMM. WRITE
2072  4274           JMS DSKOP        /WRITE ON DISK
2073  5600           JMP I DSK
2074  0000  DSKOP,   0
2075  7332           7332    /-6000
2076  6516           WCR     /SET WC TO MAX
2077  7300           CLA CLL
2100  1335           TAD HEADER
2101  6514           MAR     /ST OF HDR IMAGE
2102  7300           CLA CLL
2103  1334           TAD COMM
2104  6501           CBRH    /LOAD COMMAND
2105  7300           CLA CLL
2106  1073           TAD SEC
2107  7106           CLL RTL
2110  7006           RTL
2111  6500           CBRL    /SEC NO BITS3-7
2112  7300           CLA CLL
2113  7330           7330    /4000
2114  6505           AIRH    /SET WRITE REG
2115  1332           TAD C200         /DATA IN MB2
2116  6512           CSR     /GO
2117  7325           CLA STL IAC RAL /3
```

```
0120 6517            MCR       /READ MODE
0121 7300            CLA CLL
0122 6511            ESR0      /READ ERROR STATUS
0123 5322            JMP .-1
0124 7510            SPA       /ERRORS ON DONE?
0125 7402            HLT       /YES
0126 5674            JMP I DSKOP      /NO
0127 5400  C5400,    5400
0130 1000  C1000,    1000
0131 1400  C1400,    1400
0132 0200  C200,     200
0133 0000  CYL,      0
0134 0000  COM,      0
0135 2136  HEADER,   HEAD
0136 0000  HEAD,     0         /HEAD AND SECTOR
0137 0000            0         /CYLINDER
0140 3052            -4726     /CONSTANT WC -2518
0141 0000            0         /CHECKSUM
0142 0000            0         /ADDR OF DATA - 0 MB2
                     *400
0400 7300            CLA CLL
0401 1342            TAD C3559          /ST BLOCK
0402 3071            DCA DBLK           /DATA CLOCK ON DISK
0403 4510            JMS I XSTDSK       /SET DISK CONSTANTS
0404 4450            JMS I XZRO         /ZERO OUTPUT AREA
0405 4451            JMS I XINIT        /SET ST OF BUF
0406 3065  NXONE,    DCA HALF
0407 3074            DCA LINCT          /NO CHARS
0410 2107            ISZ UPTRG
0411 1040            TAD C3020
0412 3066            DCA DTMP           /ST OF INPUT
0413 4447            JMS I XMAG
0414 1020            1020
0415 3000            3000
0416 7000            -1000
0417 0100            100
0420 5354            JMP DOEOF          /EOF RETURN
0421 1063            TAD STOUT          /NORMAL RET
0422 1102            TAD CM50
0423 3063            DCA STOUT
0424 1063            TAD STOUT
0425 3062            DCA OUTBUF         /SET BACK 40 POS
0426 1475            TAD I L3020
0427 7640            SZA CLA /ANY DATA IN RECORD?
0430 5235            JMP DATA           /YES
0431 2067  N,        ISZ RECCT          /NO, OUTPUT BUF FULL?
0432 5206            JMP NXONE          /NO
0433 4446            JMS I XOUTPUT      /YES, WRITE ON DISK
0434 5204            JMP NXONE-2
0435 4511  DATA,     JMS I XSTRT        /STORE CURSOR, N A AN PHO
0436 1337            TAD CLIST
0437 3340            DCA RLIST          /FIELD ST LOCS
0440 2105            ISZ FLDTRG         /FIELD 1 TRG
0441 1740  BB,       TAD I RLIST
0442 2340            ISZ RLIST
0443 7450            SNA       /DONE
0444 5326            JMP DONE           /YES
0445 3066            DCA DTMP           /NO
0446 2107            ISZ UPTRG          /SET TO UPPER CASE
0447 4453  GT1,      JMS I XGETCH
0450 1070            TAD CHAR
0451 7450            SNA       /ZERO?
0452 5266            JMP ZCH /YES
0453 1100            TAD CM77           /NO
0454 7650            SNA CLA /SPACE?
0455 5315            JMP SPCH           /YES
0456 3106            DCA SPTRG          /NO, CLEAR TRG
0457 1107  CC,       TAD UPTRG
0460 7650            SNA CLA /1ST CHAR OF WD?
```

```
0461  5365         JMP CHG
0462  1070         TAD CHAR         /YES
0463  4456  XX,    JMS I XPUTCR
0464  5247         JMP GT1 /0K
0465  5326         JMP DONE         /FULL
0466  3106  ZCH,   DCA SPTRG
0467  4453         JMS I XGETCR
0470  1070         TAD CHAR
0471  1341         TAD CM31
0472  7650         SNA CLA /FIELD CODE?
0473  5307         JMP FLD /YES
0474  1066         TAD DTMP
0475  1343         TAD CM7441
0476  7650         SNA CLA          /DONE ALL FIELDS/
0477  5326         JMP DONE         /YES
0500  4456         JMS I XPUTCR     /NO, PUT IN BUF
0501  5303         JMP .+2 /OK
0502  7402         HLT     /FULL
0503  1070         TAD CHAR
0504  4456         JMS I XPUTCR     /PUT CHAR IN BUF
0505  5246         JMP GT1-1        /OK

0506  5326         JMP DONE         /FULL
0507  3105  FLD,   DCA FLDTRG

0510  3106         DCA SPTRG
0511  1043         TAD C77
0512  4456         JMS I XPUTCR
0513  5241         JMP BB  /O
0514  5326         JMP DONE         /FULL
0515  1105  SPCH,  TAD FLDTRG
0516  7650         SNA CLA /FIELD 1?
0517  5246         JMP GT1-1
0520  1106         TAD SPTRG        /YES
0521  7640         SZA CLA /FOLLOW A SPACE?
0522  5247         JMP GT1 /YES
0523  2106         ISZ SPTRG        /NO
0524  2107         ISZ UPTRG
0525  5257         JMP CC
0526  3074  DONE,  DCA LIMIT
0527  1460         TAD I STORE
0530  7710         SPA     /DONE?
0531  5361         JMP DOO /YES
0532  4456         JMS I XPUTCR     /NO
0533  5335         JMP .+2 /OK
0534  7402         HLT     /FULL
0535  2060         ISZ STORE
0536  5327         JMP DONE+1
0537  0544  CLIST, QLIST
0540  0000  RLIST, 0
0541  7737  CM31,  -41
0542  3561  C3559, 3559     /MUST BE SET EACH TIME
0543  0337  CM7441, -7441
0544  7200  QLIST, 7200     /NAME
0545  3303         3303     /TITLE
0546  7313         7313     /DESI
0547  7360         7360
0550  7365         7365     /HOUSE SUFFIX
0551  3336         3336     /ST
0552  3370         3370     /LOCALE
0553  0000         0
0554  7402  DOO0,  HLT
0555  7402         HLT
0556  5206         JMP NXON         /PROGRAM CONTINUATION
0557  4446         JMS I XOUPUT     /CONT HERE TO DUMP LAST BLOCK
0560  7402         HLT              /DONE
0561  7300  DOO,   CLA CLL
0562  1057         TAD XSTORE
0563  3060         DCA STORE
```

```
0564  5231            JMP N
0565  1070   CHA,     TAD CHAR
0566  1104            TAD CM65
0567  7700            SMA CLA          /NUMBER?
0570  5262            JMP XX-1         /YES
0571  1070            TAD CHAR         /NO
0572  1103            TAD C432
0573  5263            JMP XX           /PUT IN LOWER CASE
                      *1000
1000  0000   STOWIT,  0
1001  1100            TAD CM77
1002  3074            DCA LINCT
1003  3347            DCA NIRG
1004  1742            TAD I L3012
1005  7650            SNA CLA /NON PUB?
1006  5230            JMP NPA /NO
1007  4773            JMS I XCURSR     /YES, PUT CURSOR POS IN
1010  0077            77       /7
1011  0067            67       /2
1012  1344            TAD C50 /N
1013  3460            DCA I STORE
1014  2060            ISZ STORE
1015  1345            TAD C52 /P
1016  3460            DCA I STORE
1017  2060            ISZ STORE
1020  1101            TAD CM6
1021  3354            DCA C1
1022  1043   OR,      TAD C77
1023  3460            DCA I STORE
1024  2060            ISZ STORE        /PAD WITH SPACES
1025  2354            ISZ C1   /DONE?
1026  5222            JMP OR   /NO
1027  5335            JMP ENDIT        /YES
1030  4453   NPA,     JMS I XGETCR     /GET 1ST NPA CHAR
1031  1070            TAD CHAR
1032  1077            TAD CM72
1033  7650            SNA CLA /5?
1034  5262            JMP CKON         /YES
1035  1346   PUTT,    TAD CM73         /NO
1036  3074            DCA LINCT        /-59
1037  4773            JMS I XCURSR
1040  0073            73       /6
1041  0075            75       /8
1042  1070            TAD CHAR
1043  3460            DCA I STORE
1044  2060            ISZ STORE
1045  4453            JMS I XGETCR
1046  1070            TAD CHAR
1047  3460            DCA I STORE
1050  2060            ISZ STORE
1051  4453            JMS I XGETCR
1052  1070            TAD CHAR
1053  3460            DCA I STORE
1054  2060            ISZ STORE
1055  1043            TAD C77
1056  3460            DCA I STORE
1057  2060            ISZ STORE
1060  2347            ISZ NIRG
1061  5300            JMP NUM
1062  4453   CKON,    JMS I XGETCR     /GET NEXT CHAR
1063  1070            TAD CHAR
1064  1350            TAD CM66
1065  7640            SZA CLA /1?
1066  5270            JMP REGET        /NO
1067  4453            JMS I XGETCR     /YES
1070  1070            TAD CHAR
1071  1346            TAD CM73
1072  7650            SNA CLA /6?
1073  5300            JMP NUM /YES, NO NPA NEEDED
```

```
1074  1040  REGST,   TAD C3020
1075  3066            DCA DTMP
1076  4453            JMS I XGETCR
1077  5235            JMP PUTT           /PUT N-A IN BUF
1100  1347  NUM,      TAD NIRG
1101  7640            SZA CLA /CURSOR ALREADY SET?
1102  5306            JMP .+4
1103  4743            JMS I XCURSR       /NO
1104  0074            74
1105  0067            67
1106  1351            TAD C3023
1107  3066            DCA DTMP
1110  1352            TAD CM3
1111  3354            DCA C1   /DO 3 NUMBERS
1112  4453  DO3,      JMS I XGETCR
1113  1070            TAD CHAR
1114  3460            DCA I STORE
1115  2060            ISZ STORE
1116  2354            ISZ C1   /DONE?
1117  5312            JMP DO3 /NO
1120  3460            DCA I STORE        /YES
1121  2060            ISZ STORE
1122  1355            TAD C55
1123  3460            DCA I STORE        /HYPHEN
1124  2060            ISZ STORE
1125  1353            TAD CM4
1126  3354            DCA C1   /DO 4 NUMBERS
1127  4453  DO4,      JMS I XGETCR
1130  1070            TAD CHAR
1131  3460            DCA I STORE
1132  2060            ISZ STORE
1133  2354            ISZ C1   /DONE?
1134  5327            JMP DO4 /NO
1135  1376  ENDIT,    TAD C4000
1136  3460            DCA I STORE        /TERM WITH N. N
1137  1057            TAD XSTORE
1140  3060            DCA STORE
1141  5600            JMP I STORIT
1142  3011  L3012,    3011
1143  2200  XCURSR,   CURSOR
1144  0050  C50,      50
1145  0052  C52,      52
1146  7705  CM73,     -73
1147  0000  NIRG,     0
1150  7712  CM66,     -66
1151  7024  C3023,    7024
1152  7775  CM3,      -3
1153  7774  CM4,      -4
1154  0000  C1,       0
1155  0055  C55,      55
                      *2200
2200  0000  CURSOR,   0
2201  1600            TAD I CURSOR
2202  3230            DCA POS1
2203  2200            ISZ CURSOR
2204  1600            TAD I CURSOR
2205  3231            DCA POS2
2206  2200            ISZ CURSOR
2207  1101            TAD CM6
2210  3223            DCA CTTR
2211  1222            TAD XROW
2212  3232            DCA ROW
2213  1632  DO1,      TAD I ROW
2214  3460            DCA I STORE
2215  2232            ISZ ROW
2216  2060            ISZ STORE
2217  2223            ISZ CTTR           /DONE?
2220  5213            JMP DO1 /NO
2221  5600            JMP I CURSOR       /YES
```

```
.222   2224   XROW,    ROW
.223   0000   CTTR,    0
.224   0000   ROWR,    0
.225   0043            43
.226   0000            0
.227   0044            44
 230   0000   PO 1,    0
.231   0000   POS2,    0
 23.          .ROW,    0
                       *.000

              /XDIVID SIN.LE PRECISIO. DIVIDE SUBRO.TIN
              /        BOUN.S O. DIVIDEN :  -7...
              /        BOUN.S O. DIVISO. : .-37..
              /CALL    JMS I XDIVID
              /        (DIVIDEN.)
              /        (DIVISO.)
              /        R.MAIN.ER R.TURN.. HER
              /        CO.TRO. R.SUMES HER. .ITH QUOTIEN. IN

.000   0000   DIVIDE,  0
.001   7100            CLL
.002   3253            DCA HDIV
.003   1600            TAD I DIVIDE
.004   2200            ISZ DIVIDE
.005   3254            DCA LDIV
.006   1600            TAD I DIVIDE
.007   2200            ISZ DIVIDE
.010   7.41            CIA
.011   3255            DCA DIV
.012   1253            TAD HDIV
.013   7.40            SZA CLA
.014   5235            JMP DV2
.015   1254            TAD LDIV
.016   1255            TAD DIV
.017   7.20            SN. CLA /DIV<DIVISO.?
.020   5247            JMP DV4 /YES
.021   7.00            CLA CLL
.022   1256            TAD CM15
.023   3257            DCA DIVCT
.024   5235            JMP DV2
.025   1253   DV3,     TAD H.IV
.026   7.04            RAL
.027   3253            DCA HDIV
.030   1253            TAD H.IV
.031   1255            TAD DIV
.032   7430            SZL
.033   3253            DCA H.IV
.034   7.00            CLA
.035   1254   DV2,     TAD LDIV
.036   7.04            R.L
.037   3254            DCA LDIV
.040   2257            ISZ DIVCT
.041   5225            JMP DV3
.042   1253            TAD HDIV
.043   36.0            DCA I DIVIDE
.044   2200            ISZ DIVIDE
.045   1254            TAD LDIV
.046   56.0            JMP I DIVIDE
.047   1254   DV4,     TAD LDIV          /QUO.IE..=0, RE AI. ER
.05.   3600            DCA I DIVIDE      /=DIVIDEN.
.051   2200            ISZ DIVIDE
.052   5600            JMP I DIVIDE
.053   0000   .IDIV,   0
.054   0000   LDIV,    0
.055   0000   DIV,     0
 .56   7763   CM15,    -15
 . 57         DIVCT,   0
```

```
                *200
        /FORMAT:        JMS I XMAG
        /               COMMAND
        /               ADDRESS
        /               WORD COUNT
        /               EXTENSION REGISTER
        /       RETURN: EOF
        /       RETURN: NORMAL

0200  0000  MAG,   0
0201  1335         TAD MCM12
0202  3347         DCA REVCNT       /SET 10 RETRIES
0203  1600         TAD I MAG
0204  2200         ISZ MAG
0205  3350         DCA COM          /GET COMMAND
0206  7240         CLA CMA
0207  1600         TAD I MAG
0210  2200         ISZ MAG
0211  3351         DCA CADDR        /GET CURRENT ADDRESS
0212  1600         TAD I MAG
0213  2200         ISZ MAG
0214  3352         DCA WRDCNT       /GET WORD COUNT
0215  1600         TAD I MAG
0216  2200         ISZ MAG
0217  3353         DCA COMEX        /GET EXT REGISTER
0220  3346         DCA MADCOM
0221  1350  RETRY, TAD COM
0222  1346         TAD MADCOM
0223  4322         JMS SETCON       /SET CONTROLLER FUNCTION
0224  1352         TAD WRDCNT
0225  3032         DCA 32
0226  1351         TAD CADDR
0227  3033         DCA 33           /SET WORD COUNT & CURRENT ADDRESS
0230  1353         TAD COMEX
0231  6717         6717
0232  7300         CLA CLL          /SET EXT REG
0233  4330         JMS MAGOP        /PERFORM MAGTAPE FUNCTION
0234  6706         6706
0235  7421         MQL              /STORE STATUS IN MQ
0236  7501         MQA
0237  0336         AND MC6774
0240  7450         SNA
0241  5271         JMP MOK          /NO ERRORS
0242  0337         AND MC7677
0243  7450         SNA
0244  5273         JMP MEOF         /EOF
0245  0340         AND MC3543
0246  7640         SZA CLA
0247  7402         HLT              /BAD REC OR FAIL
0250  2347  PAR,   ISZ REVCNT       /PARITY
0251  5253         JMP .+2          /RETRY
0252  7402         HLT              /RETRY FAILURE
0253  1350         TAD COM
0254  0343         AND MC7
0255  1344         TAD MCM40
0256  7650         SNA CLA          /FAILURE ON WT?
0257  13[illegible]  TAD MC100      /YES
0260  3[illegible]   DCA MADCOM
0261  1350         TAD COM
0262  0342         AND MC7000
0263  1343         TAD MC70
0264  4322         JMS SETCON       /SET CONTROLLER FOR BACKSPACE
0265  7240         CLA CMA
0266  3032         DCA 32           /WC = RECS BACKSPACE
0267  4330         JMS MAGOP        /PERFORM BACKSPACE
0270  5221         JMP RETRY        /AND TRY AGAIN
0271  2200  MOK,   ISZ MAG
0272  5600         JMP I MAG        /NORMAL EXIT
0273  1350  MEOF,  TAD COM
```

```
276  0343          AND MC70
277  1344          TAD MCM40
276  7650          SNA CLA           /EOF ON WRITE?
277  5250          JMP PAR           /YES - PARITY PROBLEM
300  7000          NOP
301  5600          JMP I MAG         /EXIT EOF
302  0000  REWIND, 0
303  1350          TAD COM
304  0342          AND MC7000
305  1345          TAD MC10
306  4322          JMS SETCON        /SET CONTROLLER FOR REWIND
307  6722          6722              /EXECUTE REWIND
310  1350          TAD COM
311  0342          AND MC7000
312  7106          CLL RTL
313  7006          RTL               /LOAD CONT W/ NEXT MAG
314  1355          TAD NEXM
315  3354          DCA NEXCON
316  1754          TAD I NEXCON
317  6716          6716
320  7300          CLA CLL
321  5702          JMP I REWIND
322  0000  SETCON, 0
323  6711          6711
324  5323          JMP .-1
325  6716          6716
326  7300          CLA CLL
327  5722          JMP I SETCON
330  0000  MAGOP,  0
331  6722          6722
332  6701          6701
333  5332          JMP .-1
334  5730          JMP I MAGOP
335  7766  MCM12,  -12
336  6774  MC6774, 6774
337  7677  MC7677, 7677
340  3543  MC3543, 3543
341  0100  MC100,  100
342  7000  MC7000, 7000
343  0070  MC70,   70
344  7740  MCM40,  -40
345  0010  MC10,   10
346  0000  MADCOM, 0
347  0000  REVCNT, 0
350  0000  COM,    0
351  0000  CADDR,  0
352  0000  WRDCNT, 0
353  0000  CONEX,  0
354  0000  NEXCON, 0
355  0356  NEXM,   NEXTM
356  1020  NEXTM,  1020      /0
357  0040          40        /1
360  0040          40        /2
361  0040          40        /3
                   *700
700  0000  OCDEC,  0
701  7300          CLA CLL
702  1700          TAD I OCDEC
703  2300          ISZ OCDEC
704  3355          DCA UDHIGH
705  1700          TAD I OCDEC
706  2300          ISZ OCDEC
707  3356          DCA UDLOW
710  1351          TAD UDLOOP
711  3354          DCA UDCNT
712  1352          TAD UDADDR
713  3354          DCA UDPTR
714  3361          DCA UDBOT
715  1764  UDARND, TAD I UDPTR
```

```
.716  2364           ISZ UDPTR
.717  3357           DCA UDHSUB
.720  1764           TAD I UDPTR
.721  2364           ISZ UDPTR
.722  3360           DCA UDLSUB
.723  7100  UDDO,    CLL
.7 4  1360           TAD UDLSUB
.7 5  1356           TAD UDLO
.7 6  3362           DCA UDTEML
.727  7004           RAL
.7 0  1357           TAD UDHSUB
.7 1  1355           TAD UDHIG
.7 2  7 20           SN
.7 3  5341           JMP UDOUT
.7 4  2361           ISZ UDBO
.7 5  3355           DCA UDH GH
.7 6  1362           TAD UDTEML
.7 7  3356           DCA UDLO
.7 0  5323           JMP UDDO
.741  7 00  UDOUT,   CLA
.7 2  1361           TAD UDBO
.7 3  37             DCA I O DEC
.744  2300           ISZ O DEC
.745  3361           DCA UDBO
.7 6  2354           ISZ UDCN
.747  5315           JMP UDARN
.750  5700           JMP I O DEC
.7 1  7 70  UDLO  ,  -10
.7 2  2765  UDADDR,  UDCO 1
.753  0260  UDTWO,   260
.754  0000  UDCNT,   0
.755  0000  UDHIG ,  0
.756  0000  UDLO ,   0
.757  0000  UDHSUB,  0
.760  0000  UDLSUB,  0
.761  0000  UDBOX,   0
.762  0000  UDTEML,  0
.763  0000  UDG T,   0
7  4  00    UDPTR,   0
7  5  316   UDCO 1,  3166      /PO ER  O  TEN
.7 6  4600           4600
.7 7  7 13           7 13
.7    67 0           67 0
.7    7747           7 7
.7    4540           4540
.7    7775           77 5
.7    4360           4360
.7    7777           7777
.7 6  6030           6030
.7    7777           7777
.000  7 34           7 34
.001  7 7            7777
.002  77 6           7766
.003  7777           7777
.004  7777           7777.
                     *1700
.7 0  0000  SETDSK,  0          /SET CO STAN  DISK R   STE S
17 1  1315           TAD C3000
17 2  6517           MCR        /SELECT CO TR  LER 0
.703  732            CLA STL R L     /2
17 4  6517           MCR        /LOAD MO E
1705  7 00           CLA CLL
.7 6  7333           7333     /6000
.707  6501           CBRH     /LO D DRIVE
.710  7300           CLA CLL
.711  1 73           TAD DRIVE
.712  6500           CBRL
.713  7300           CLA CLL
.714  5700           JMP I SETDSK
```

```
1715  3000  C3000,  3000
                    *0600
0600  0000  GETCR,  0
0601  1066          TAD DTMP
0602  7500          SMA                  /DATA IN 1ST HALF?
0603  5213          JMP SECN             /NO
0604  0227          AND C3777            /YES
0605  3066          DCA DTMP
0606  1466          TAD I DTMP
0607  7002          BSW
0610  0043          AND C77
0611  3070          DCA CHAR
0612  5225          JMP EXIT
0613  3066  SECN,   DCA DTMP
0614  1466          TAD I DTMP
0615  0043          AND C77
0616  3070          DCA CHAR
0617  1307          TAD C4000
0620  7421          MQL                  /SET UP N   TR G   R
0621  2066          ISZ DTMP
0622  1066          TAD DTMP
0623  7501          MQA
0624  3066          DCA DTMP
0625  7000  EXIT,   NOP
0626  5600          JMP I GETCR
0627  3777  C3777,  3777

     1406
     1602
 3   0441
 AD  0351
 C   0457
 A   0070
 G   0565
     1643
 O   1062
 LIST 0537
 123 0041
 15  5056
 43  1152
 31  0541
 32  0103
 4   1153
 447 6 1414
 450 0102
 457 3 1560
 0   0101
 465 0104
 6   1150
 47  0077
 473 1146
 47  1441
 47441 0543
 477 0103
 O   0350
 O EX 0353
 O   2134
 TR  1415
 TT3 2223
 U3U 2204
 Y   2133
 1   1154
 1   2130
 14  2131
 230 2132
 3000 1715
 3020 0040
 3023 1151
 3559 0542
```

| | |
|---|---|
| C3777 | 2627 |
| C4000 | 0076 |
| C4020 | 0042 |
| C4756 | 1440 |
| C50 | 1144 |
| C52 | 1145 |
| C5400 | 2127 |
| C55 | 1155 |
| C77 | 0043 |
| DATA | 0435 |
| DBLK | 0071 |
| [illegible] | 1555 |
| DIV | 5055 |
| DIVCT | 5057 |
| DIVIDE | [illegible] |
| [illegible] | 2000 |
| [illegible] | 0554 |
| [illegible] | 0526 |
| [illegible] | 0561 |
| [illegible] | 2213 |
| [illegible] | 1112 |
| [illegible] | 1127 |
| DRIVE | [illegible] |
| [illegible] | [illegible] |
| [illegible] | 2074 |
| [illegible] | 0066 |
| [illegible] | 5035 |
| [illegible] | 5025 |
| [illegible] | 5047 |
| [illegible] | [illegible] |
| [illegible] | [illegible] |
| EXIT | 2625 |
| FLD | 0507 |
| [illegible] | 0105 |
| [illegible] | 2600 |
| [illegible] | 0447 |
| [illegible] | 0065 |
| [illegible] | 2010 |
| [illegible] | 5053 |
| [illegible] | 2136 |
| HEADER | 2135 |
| INIT. | 1430 |
| LDIV | 5054 |
| LINCT | 0074 |
| LINE | 0064 |
| L2 | 0044 |
| L3 | 0045 |
| L3012 | 1142 |
| L3020 | 0075 |
| MADCO | 0346 |
| MAG | 0200 |
| MAG[illegible] | 0330 |
| MCM12 | 0335 |
| MCM40 | 0344 |
| MC10 | 0345 |
| MC100 | 0341 |
| MC3543 | 0340 |
| MC6774 | 0336 |
| MC70 | 0343 |
| MC7000 | 0342 |
| MC7577 | 0337 |
| MEOF | 0273 |
| MOK | 0271 |
| N | 0431 |
| NEXCO | 0354 |
| NEXM | 0355 |
| NEXTM | 0356 |
| NNN | 0024 |
| NPA | 1030 |
| NTRG | 1147 |

| | |
|---|---|
| NUM | 1100 |
| NXOVE | 0406 |
| OCDEC | 27[illegible]0 |
| OUTPUT | 1550 |
| OUTBUF | 0062 |
| PAR | 0250 |
| PO[illegible]1 | 2230 |
| PO[illegible]2 | 2231 |
| PUTCH | 1610 |
| PUTT | 1035 |
| PUTWD | 1600 |
| QLIST | 0544 |
| QQ | 1644 |
| QR | 1022 |
| RECCT | 0067 |
| REGCT | 1074 |
| [illegible]TRY | 0221 |
| REVCNT | 0347 |
| REWIND | 0302 |
| RLIST | 0540 |
| [illegible] | 2232 |
| [illegible] | 2224 |
| SEC | 0072 |
| SECH[illegible]F | 1634 |
| SECN | 2613 |
| SETCO[illegible] | 0322 |
| SETDSK | 17[illegible]0 |
| SPCH | 0515 |
| SPTRG | 0106 |
| STORE | 0060 |
| STORIT | 1000 |
| STOUT | 0063 |
| [illegible] | 1627 |
| [illegible] | 27[illegible]2 |
| [illegible] | 2715 |
| [illegible] | 27[illegible]1 |
| [illegible] | 2754 |
| [illegible] | 2765 |
| [illegible] | 27[illegible]3 |
| [illegible] | 27[illegible]3 |
| [illegible] | 2755 |
| [illegible] | 2757 |
| [illegible] | 2751 |
| [illegible] | 2756 |
| [illegible] | [illegible] |
| [illegible] | [illegible] |
| [illegible] | 2764 |
| [illegible] | 2762 |
| [illegible] | 27[illegible]3 |
| [illegible] | 0107 |
| [illegible] | 0112 |
| [illegible] | 0352 |
| [illegible] | 1143 |
| [illegible]DIVID | [illegible]52 |
| [illegible] | 1567 |
| [illegible] | 0053 |
| [illegible]XIT | 0051 |
| [illegible]MAG | 0047 |
| [illegible]OUTPUT | 0046 |
| [illegible]PUTCH | [illegible]056 |
| [illegible]PUTWD | [illegible]054 |
| [illegible]REWD | 0055 |
| [illegible] | 2222 |
| STDSK | [illegible]110 |
| STO[illegible]E | 0057 |
| STRT | 0111 |
| [illegible] | 0453 |
| [illegible] | 0050 |
| [illegible] | 0466 |
| [illegible] | 14[illegible] |

Operating Instructions for the above listed Program No. 5 are as follows:

1. Load Program #5 into MBO.
2. Put input tape on unit 1.
3. Set the following parameters for unit being processed:

| | |
|---|---|
| 72 = sector (0 or 14) | |
| 73 = drive (0 or 20) | |
| 542 = starting block # | See Sheet |
| 1566 = block limit | |

4. 400 load, clear, and continue. Do not clear after starting program.
5. Halt at 555 indicates input eof has been read. Load and examine locations 3000–3020. They shoudl all be zero. If not, load and continue at location 20. If these locations are zeroed, go to instruction 6.
6. (a) If no more input tapes: load and examine loc 63. If loc 63≠4626, 557 load and continue to dump final data block. Note contents of locs 63 and 1555. Manually rewind tape. If loc 63=4626, note contents of locs 63 and 1555 and rewind tape manually.
   (b) If more input tapes: Be sure next tape is on unit. 556 load and continue.

Specifications

1. Input:

a. NYT/DRC tape, 1600 bpi, special core dump mode.
b. Input buffer: 3000–4000 MBO.

2. Output: Diva disk from 0–4726 MB2. 60–80 character (40 location) data records per block.

HALT LIST

| Halt Location | Reason for Halt | Recovery Procedure |
|---|---|---|
| 247 | Bad tape or offline | Check drives |
| 252 | Retry failure | If loc 350=1020, 20 load and continue. If loc 350=240, 253 load and continue. |
| 502 | Buffer overflow on special character. (zero already in buffer) | Load and examine loc 62. This gives the position following the zero, using the standard 4000 trigger. Locate the Zero in mb2, and replace it with a space. Return to mb0. 526 load and continue. |
| 534 | Buffer overflow on tel. number | Get programming assistance. |
| 554 | Input eof. | See instruction 6. |
| 560 | Program completed | |
| 1564 | Disk limit overflow | Abort, more than 30,000 frames |
| 1642 | Output buffer overflow | Abort |
| 2125 | Disk error | Retry |

| UNIT | STARTING BLOCK (LOCATION 542) | BLOCK LIMIT (LOCATION 1566) | |
|---|---|---|---|
| L,E | 1057 (559) | 7705 (-59) | SEC 0 |
| N, MI-MZ | 3027 (1559) | 5735 (-1059) | SEC 0 |
| W, BR-BZ | 4777 (2559) | 3765 (-2059) | SEC 0 |
| CR, Q, B | 6747 (3559) | 2015 (-3059) | SEC 0 |
| P, I, Z | 1057 | 7705 | SEC 14 |
| C - CQ | 3027 | 5735 | SEC 14 |
| K, J, U | 4777 | 3765 | SEC 14 |
| R, V | 6747 | 2015 | SEC 14 |

-continued

| HALT LIST | | | |
|---|---|---|---|
| X, Y, D | 1057 | 7705 | SEC 0 |
| G | 3027 | 5735 | |
| H | 4777 | 3765 | |
| F | 6747 | 2015 | |
| S-SN | 1057 | 7705 | SEC 14 |
| A, T | 3027 | 5735 | |
| SO-SZ, O | 4777 | 3765 | |
| M | 6747 | 2015 | |

C3. Detailed Description of Program No. 3

Program No. 3 is shown in block form at FIG. 44 with subroutines utilized therein detailed in FIGS. 45–52. An explicit listing of the assembly level source program language for Program No. 3 and all related subroutines follows. It will be noted that the main program is shown as comprising sections I, II, III and IV in FIG. 44. These program sections correspond to specific listing statements.

| Section | Instruction Statement | |
|---|---|---|
| I | 0200–0202 | |
| II | 0203–0204; | 0216–0223 |
| III | 0205–0206 | |
| IV | 0207–0215 | |

These four program sections are briefly functionally described below as an introduction to the explicit program listing:

I. Initialize.

A. "REC" is used as a record pointer for the output block. Twelve is the blocking factor. (REC 0–11)

B. "BUF" zeroes the output block area.

II. Read input record.

A. "READ" goes to XMAG to physically read the input tape and indicate whether a tape mark has been reached by its returning position. If a normal exit occurs the program continues to part III (MX processing).

B. If a tape mark is encountered the input tape is rewound and the program outputs the last MX block if there are any records in it and halts. If the operator desires to manually continue, a tape mark will be placed on the output tape (it is also rewound) and again the program halts (processing is complete).

III. Process MX Record. "XMX" translates the input record into MX (PIC matrix) format and stores it in the proper record of the output block (determined by "REC").

IV. Output

A. Set record pointer "REC" to next record.

B. If output block is full, write output block and go to I, otherwise go to II.

The XMAG subroutine is not shown in the FIGURES but is described below:

XMAG: general subroutine to drive the magnetic tape transport.

Format:

JMS I XMAG
(command) *2
(current address)
(word count)
(extension register) *3
control resumes here if tape mark encountered
control resumes here normally

| *2. command bits: | *3 extension bits |
|---|---|
| 0 → formatter select | 0–4 → N/A |
| 1,2 → unit select | 5 → special core dump |
| 3–5 → N/A | 6–9 → N/A |
| 6–8 → tape command | 10–11 → memory bank |
| 9-n → N/A | |

Program No. 3

```
          BSW=7002
          MQL=7421
          MQA=7501
          SWP=7521
          CDF0=6201
          CDF1=6211
          CDF2=6221
          0 CR=6517
          DCBRH=6501
          DCBRL=6500
          DSSRH=6503
          DSSRL=6502
          DESR0=6511
          DESR1=6515
          DWCR=6516
          DDMAR=6514
          DCSR=6512
          DAIRL=6504
          DAIRH=6505
          DUSRL=6506
          DUSRH=6507
          GTF=6004
          RTF=6005
          R F=6244
          R B=6234
          SRQ=6003

          FIXTAB
                    *20
0020 0000 MTMP,     0
0021 0000 MADD,     0
0022 0000 GLOC,     0
0023 0000 PADD,     0
0024 0000 MCT,      0
0025 0000 MXLOC,    0
0026 0000 PLIM,     0
0027 0344 MF C,     BITS-CADDS
0030 1000 CADD,     CADDS
0031 0266 XGTCHR,   GTCHR

          PAGE

          / Y  MX PRO   M

0200 7300 ST1,      CLA CLL
```

```
201   3206            DCA REC
202   4224            JMS BUF
203   4235   ST2,     JMS READ         /INPUT DRC
204   5216            JMP ST3 /EOF
205   4722            JMS I XMX        /PROCESS TO MX
206   0000   REC,     0        /AT REC X
207   1206            TAD REC
210   2206            ISZ REC
211   1317            TAD CM13
212   7640            SZA CLA /LAST REC IN BLK?
213   5203            JMP ST2 /NO
214   4256            JMS WRITE        /OUTPUT BLK
215   5200            JMP ST1
216   1206   ST3,     TAD REC
217   7640            SZA CLA /ANY RECS IN OUTPUT BLK?
220   4256            JMS WRITE        /YES - OUTPUT BLK
221   7402            HLT              /STOP AFTER INPUT TAPE PROCESSED
222   4246            JMS WEOF         /OUTPUT EOF
223   7402            HLT      /PROGRAM COMPLETED

224   0000   BUF,     0
225   1315            TAD C4777
226   3010            DCA 10
227   1316            TAD CM2000
230   3321            DCA CNT
231   3410            DCA I 10
232   2321            ISZ CNT
233   5231            JMP .-2
234   5624            JMP I BUF

235   0000   READ,    0
236   4723            JMS I XMAG       /INPUT FIELDED DRC REC
237   1020            1020     /COM,ADR,WC,EXT REG
240   3000            3000
241   7000            -1000
242   0100            100
243   5635            JMP I READ       /EOF ( AUTO-REWIND )
244   2235            ISZ READ
245   5635            JMP I READ

246   0000   WEOF,    0
247   4723            JMS I XMAG       /OUTPUT EOF
250   0050            50
251   0000            0
252   0000            0
253   0000            0
254   7300            CLA CLL
255   5646            JMP I WEOF

256   0000   WRITE,   0
257   4723            JMS I XMAG       /OUTPUT MX BLK
260   0040            40       /COM,ADR,WC,EXT REG
261   5000            5000
262   6000            -2000
263   0100            100
264   7402            HLT
265   5656            JMP I WRITE

266   0000   GTCHR,   0
267   3320            DCA GTLOC
270   1320            TAD GTLOC
271   7500            SMA      /1ST HLF?
272   5[illegible]    JMP G[illegible] /NO
273   0312            AND C3777
274   3320            DCA GTLOC
275   1720            TAD I GTLOC
276   7002            BSW
277   0313            AND C77
300   7421            MQL
```

```
0301  1320            TAD G6LOC
0302  5666            JMP I G1CHR
0303  7300  G2,       CLA CLL
0304  1720            TAD I G6LOC
0305  0313            AND C77
0306  7421            MQL
0307  1320            TAD G6LOC
0310  1314            TAD C4001
0311  5666            JMP I G1CHR

0312  3777  C3777,    3777
0313  0077  C77,      77
0314  4001  C4001,    4001
0315  4777  C4777,    4777
0316  6000  CM2000,   -2000
0317  7765  CM13,     -13
0320  0000  G6LOC,    0
0321  0000  CN1,      0
0322  0400  XMX,      MX
0323  0600  XMAG,     MAG

            PAGE

            /PROCESS N/T FIELDS TO MX

0400  0000  MX,       0
0401  1600            TAD I MX
0402  2200            ISZ MX
0403  7002            BSW
0404  3021            DCA MADD        /START OF REC IN BLK
0405  1750            TAD I M3033
0406  7650            SNA CLA
0407  5600            JMP I MX        /BLANK REC
0410  1371            TAD MC5074
0411  1021            TAD MADD
0412  3372            DCA MBTMP
0413  1773            TAD I ML3012
0414  7450            SNA
0415  5222            JMP MBIT1
0416  1374            TAD MCM10
0417  7650            SNA CLA
0420  1375            TAD MC2000      /PROJ: SET BITS     (6000)
0421  1375            TAD MC2000      /BUS: SET BIT 0 (4000)
0422  1375  MBIT1,    TAD MC2000      /RES: SET BIT 1 (2000)
0423  3772            DCA I MBTMP     /CATEGORY BIT - MX
0424  1356            TAD MC4000      /ORDINARILY STRT WITH 2ND CH
0425  1357  M2,       TAD MC3034      /S:      B,C,M,S STRT WITH 3RD CH
0426  3022            DCA G6LOC

0427  1367  MFLD1,    TAD MCM22
0430  3026            DCA PLIM        /ONLY  LLOW   X  HRS:   D
0431  3023            DCA PADD        /SET 1ST CHR POS O  W
0432  4265            JMS MXCHR       /GET CHRS, PROCESS UNTI
0433  5235            JMP MFLD2       /SPACE OR SPECIAL
0434  7000            NOP     /FIELD DEL

0435  1021  MFLD2,    TAD MADD
0436  1360            TAD MC22
0437  3021            DCA MADD        /FIELD STRT
0440  1361            TAD MCM2
0441  3024            DCA MCT /SET 2 FLDS
0442  3023  MFLD21,   DCA PADD        /SET 1ST CHR POS O  WD
0443  4265  MFLD22,   JMS MXCHR       /GET CHRS, PROCESS UNTIL
0444  5242            JMP MFLD21      /SPACE OR SPECIAL
0445  2024            ISZ MCT /FIELD DEL
0446  5242            JMP MFLD21
0447  1370  MFLD3,    TAD MCM14
0450  3026            DCA PLIM        /ONLY  LLOW 4  X  HRS:   D
0451  1021            TAD MADD
```

```
0452  1360            TAD MC22
0453  3021            DCA MADD        /FIELD STR
0454  3023  MFLD31,   DCA PADD        /1ST CHR POS O  WD
0455  4265            JMS MXCHR       /GET CHRS, PR  ESS UNTIL
0456  5254            JMP MFLD31      /SPACE OR SPECIAL
0457  1362            TAD MC3336      /FIELD DEL
0460  3022            DCA GLOC
0461  3023  MFLD32,   DCA PADD        /1ST CH  POS O  WD
0462  4265            JMS MXCHR       /GET CHRS, PR  ESS  N I
0463  5261            JMP MFLD32      /SPACE    SPECIAL
0464  5261            JMP MFLD32      /FIELD DEL

0465  0000  MXCHR,    0
0466  1022            TAD GLOC
0467  4431            JMS I XGTCHR
0470  3022            DCA GLOC
0471  7501            MQA
0472  7450            SNA
0473  5304            JMP MDEL        /0:      DEL
0474  1363            TAD MCM33
0475  7510            SPA
0476  5302            JMP MSPA        /1-32:   SPACE
0477  1364            TAD MCM44
0500  7710            SPA CLA
0501  5316            JMP MCHR        /32-7 : UCA;#
0502  7300  MSPA,     CLA CLL
0503  5665            JMP I MXCHR
0504  1022  MDEL,     TAD GLOC
0505  4431            JMS I XGTCHR
0506  3022            DCA GLOC
0507  7501            MQ
0510  7450            SNA
0511  1630            JMP I MX        /END O  R C
0512  1365            TAD MCM41
0513  7650            SN  CLA
0514  2265            ISZ MXCHR       /FIELD DEL
0515  5665            JMP I MXCHR     /SPECIAL

0516  1023  MCHR,     TAD PADD
0517  1026            TAD PLIM
0520  7650            SN  CLA /TO  MANY CHRS IN WO D?
0521  5266            JMP MXCHR+1     /YES - IG   E
0522  7701            CLA MQA
0523  1353            TAD MCM33
0524  1030            TAD CADD
0525  3020            DCA MTMP
0526  1021            TAD MADD        /MX F  D STR  +
0527  1023            TAD PADD        /PO  F  CTO   +
0530  1420            TAD I MTMP      /CHR STR  =
0531  1347            TAD MC5000
0532  3025            DCA MXLOC       /LOC O  MX BIT
0533  1020            TAD MTMP
0534  1027            TAD MF C
0535  3020            DCA MTMP
0536  1420            TAD I MTMP      /BIT
0537  7421            MQL
0540  1425            TAD I MXLOC
0541  7501            MQA      /O  BIT INTO MX
0542  3425            DCA I MXLOC
0543  1023            TAD PADD
0544  1366            TAD MC3 /SET NEXT CHR PO
0545  3023            DCA PADD
0546  5266            JMP MXCHR+1
0547  5000  MC5000,   5000
0550  3033  M3033,    3033
0551  0077  M77,      77
0552  7744  MCM34,    -34
0553  7777  MCM1,     -1
0554  7766  MMCM12,   -12
```

```
555   7772   MCM6,     -6
0556  4000   MC4000,   4000
0557  3034   MC3034,   3034
0560  0022   MC22,     22
0561  7776   MCM2,     -2
0562  3336   MC3336,   3336
0563  7745   MCM33,    -33
0564  7734   MCM44,    -44
0565  7737   MCM41,    -41
0566  0003   MC3,      3
0567  7756   MCM22,    -22
0570  7764   MCM14,    -14
0571  5074   MC5074,   5074
0572  0000   MBTMP,    0
0573  3012   ML3012,   3012
0574  7770   MCM10,    -10
0575  2000   MC2000,   2000

             PAGE

             /FORMAT:          JMS I XMAG
             /         COMMAND
             /         ADDRESS
             /         WORD COUNT
             /         EXTENSION REGISTER
             /         RETURN: EOF
             /         RETURN: NORMAL

0600  0000   MAG,      0
0601  1337             TAD MCM12
0602  3351             DCA REVCNT         /SET 10 RETRIES
0603  1600             TAD I MAG
0604  2200             ISZ MAG
0605  3352             DCA CO  /GET COMMAND
0606  7040             CLA CMA
0607  1600             TAD I MAG
0610  2200             ISZ MAG
0611  3353             DCA CADDR          /GET CURRENT ADDRESS
0612  1600             TAD I MAG
0613  2200             ISZ MAG
0614  3354             DCA WRDCNT         /GET WORD COUNT
0615  1600             TAD I MAG
0616  2200             ISZ MAG
0617  3355             DCA COMEX          /GET EXT REGISTER
0620  3350             DCA MADCOM
0621  1352   RETRY,    TAD CO
0622  1350             TAD MADCOM
0623  4322             JMS SETCON         /SET CONTROLLER FOR FUNCTION
0624  1354             TAD WRDCNT
0625  3032             DCA 32
0626  1353             TAD CADDR
0627  3033             DCA 33  /SET WORD COUNT & CURRENT ADDRESS
0630  1355             TAD COMEX
0631  6717             6717
0632  7300             CLA CLL /SET EXT REG
0633  4330             JMS MAGIO          /PERFORM MAGTAPE CONTIO
0634  6706             6706
0635  7421             MQL     /STORE STATUS IN MQ
0636  7501             MQA
0637  0340             AND MC6074
0640  7450             SNA
0641  5271             JMP MOK /NO ERRORS
0642  0341             AND MC7677
0643  7450             SNA
0644  5273             JMP MEOF           /EOF
0645  0342             AND MC3543
0646  7640             SZA CLA
0647  7402             HLT     /BAD REC OR RECORDING
0650  2351   PAR,      ISZ REVCNT         /PARITY
```

```
651  5253           JMP .+2 /RETRY
652  7402           HLT     /RETRY FAILUR
653  1352           TAD CO
654  0345           AND MC70
655  1346           TAD MCM40
656  7650           SNA CLA /FAILURE ON MT?
657  1343           TAD MC100       /YES
660  3350           DCA MADCO
661  1352           TAD CO
662  0344           AND MC7000
663  1345           TAD MC70
664  4322           JMS SETCO       /SET CONTROLLER FOR BACKSPACE
665  7240           CLA CMA
666  3032           DCA 32  /WC = RECS BACKSPACED
667  4330           JMS MAGOP       /PERFORM BACKSPACE
670  5221           JMP RETRY       /AND TRY AGAIN
671  2200  MOK,     ISZ MAG
672  5600           JMP I MAG       /NORMAL EXIT
673  1352  MEOF,    TAD CO
674  0345           AND MC70
675  1346           TAD MCM40
676  7650           SNA CLA /EOF ON WRITE EOF?
677  5600           JMP I MAG       /YES - IGNORE REWIND
700  4302           JMS REWIND      /REWIND UNIT
701  5600           JMP I MAG       /EXIT EOF
702  0000  REWIND,  0
703  1352           TAD CO
704  0344           AND MC7000
705  1347           TAD MC10
706  4322           JMS SETCO       /SET CONTROLLER FOR REWIND
707  6722           6722    /EXECUTE REWIND
710  1352           TAD CO
711  0344           AND MC7000
712  7106           CLL RTL
713  7006           RTL     /LOAD CONT #/ NEXT MAG
714  1357           TAD NEXM
715  3356           DCA NEXCO
716  1756           TAD I NEXCO
717  6716           6716
720  7300           CLA CLL
721  5702           JMP I REWIND
722  0000  SETCO,   0
723  6711           6711
724  5323           JMP .-1
725  6716           6716
726  7300           CLA CLL
727  5722           JMP I SETCO
730  0000  MAGOP,   0
731  6721           6721
732  5331           JMP .-1
733  6722           6722
734  6701           6701
735  5334           JMP .-1
736  5730           JMP I MAGOP
737  7766  MCM12,   -12
740  6774  MC6774,  6774
741  7677  MC7677,  7677
742  3543  MC3543,  3543
743  0100  MC100,   100
744  7000  MC7000,  7000
745  0070  MC70,    70
746  7730  MCM40,   -50
747  0010  MC10,    10
750  0000  MADCO,   0
751  0000  REVCNT,  0
752  0000  CO,      0
753  0000  CADDR,   0
754  0000  WRDCNT,  0
755  0000  CONEX,   0
```

```
0756  0000  NEXCO , 0
0757  0750  NEXM,   NEXTM
0760  1020  NEXTM,  1020     /0
0761  0040          40       /1
0762  0040          40       /2
0763  0040          40       /3

            PAGE

            /DRC EQUIVALENTS TABLES

1000  0000  CADDS,  0        /A-->L
1001  0000          0;
1002  0000  0;
1003  0000  0;
1004  0000  0;
1005  0000  0;
1006  0000  0;
1007  0000  0;
1010  0000  0;
1011  0000  0;
1012  0000  0;
1013  0000  0
1014  0001          1        /M-->X
1015  0001          1;
1016  0001  1;
1017  0001  1;
1020  0001  1;
1021  0001  1;
1022  0001  1;
1023  0001  1;
1024  0001  1;
1025  0001  1;
1026  0001  1;
1027  0001  1
1030  0002          2        /Y,Z
1031  0002          2
1032  0014          14       /0-->9
1033  0014          14;
1034  0014  14;
1035  0014  14;
1036  0014  14;
1037  0014  14;
1040  0014  14;
1041  0014  14;
1042  0014  14;
1043  0014  14

1044  4000  BITS,   4000     /A-->L
1045  2000          2000;
1046  1000  1000;
1047  0400  400;
1050  0200  200;
1051  0100  100;
1052  0040  40;
1053  0020  20;
1054  0010  10;
1055  0004  4;
1056  0002  2;
1057  0001  1
1060  4000          4000     /M-->X
1061  2000          2000;
1062  1000  1000;
1063  0400  400;
1064  0200  200;
1065  0100  100;
1066  0040  40;
1067  0020  20;
1070  0010  10;
1071  0004  4;
1072  0002  2;
1073  0001  1
1074  4000          4000     /Y,Z
1075  2000          2000
1076  4000          4000     /0-->9
1077  2000          2000;
1100  1000  1000;
1101  0400  400;
1102  0200  200;
1103  0100  100;
1104  0040  40;
1105  0020  20;
1106  0010  10;
1107  0004  4

            PAGE

BITS    1044
BUF     0224
CADD    0030
CADDR   0703
CADDS   1000
C413    0317
C42000  0316
CNT     0321
CO      0752
COEX    0755
C3777   0312
C4001   0314
C4777   0315
C77     0313
...0    0320
...0    0022
GICHR   0266
G2      0303
MADCO   0750
MADD    0021
MAG     0600
MAGOP   0730
MBIT1   0422
MBTMP   0572
MCHR    0516
MCM1    0553
MCM10   0574
MCM12   0707
MCM14   0570
MCM2    0561
MCM22   0567
MCM33   0563
MCM34   0552
MCM40   0746
MCM41   0565
MCM44   0564
MCM6    0555
MCT     0024
MC10    0747
MC100   0743
MC2000  0575
MC22    0560
MC3     0566
MC3034  0557
MC3336  0562
MC3543  0742
MC4000  0556
MC5000  0547
MC5074  0571
MC6774  0740
```

```
.C70     0745
.C7 00   0744
.C7 7    07 1
.D L     0504
.EOF     0673
FAC      0027
.FL 1    0427
.FLD2    0435
.FL 1    0442
.FLD22   0443
FL 3     0447
.FL 31   0454
.FL 32   0461
L3012    0573
.MCM12   0554
.O       0671
.SPA     0502
.TMP     0020
.X       0400
.XCHR    0465
XLOC     0025
2        0425
.3033    0550
.        0551
.EXCO    07 6
.EX      0757
EX       0760
ADD      0023
-        0650
LI       0026
.AD      0235
.C       0206
.TRY     0621
.EVCNT   07 1
- IND    0732
SETCO    0722
.T1      0200
T2       0203
T3       0216
.EO      0246
.RDC     0754
TE       0256
C        0031
.MAS     0323
.        0322
```

Operating instructions for the above-listed Program No. 3 are as follows:

1. Load Program (MBO).
2. Load Input tape (DRC) - Unit 1. Load Output tape (MX) - Unit 0.
3. SW=200; load, clear continue.
4. Halt at 221 indicates end of input tape:
   A. To continue with same unit, replace input tape, go to instruction #3.
   B. To terminate unit, hit continue (this puts eof on output tape between units), program will then halt at 223. Go to instruction #4-A.

Halts:

221, 223: see above.

264, 647: magtape error.

652: Magtape retry failure. Note: to get around retry failure on magtape read, SW=207: load, continue to blank out MX record for this input. To determine whether retry is on read, check loc 752. If read, loc 752 will contain 1020.

C4. Detailed Description of Program No. 4

As previously noted, Program No. 4 constructs a complete series of mini-xm's called "10 mini-xm segments" and is accomplished only after 120 MX records are processed; at which time there are 10 sequential mini-xm words (120 bits) for each significant bit position of the 120 MX records. For ease of manipulation they are constructed partially utilizing 12 MX records at a time (12 bits in one computer word). Thus a complete group of 10 mini-xm segments consists of 456 mini-xm segments, each XM segment occupying 10 computer words (120 bits). The manner in which the XMs are partially processed is thus:

1. Secure 12 MX records in core (one MX block).
2. Sequentially amass the first bits of each MX and store in a computer word (partial $XM_1$).
3. Sequentially amass the second bits of each MX and store in a computer word (partial $XM_2$).
4. Repeat this process for each element until all bits are processed. The resultant is a series of partial mini-xm's [xm (1,1)→xm (1,456)]
5. Repeat the above 4 steps until 10 MX blocks (120 MX records) have been thus processed. Now there are 10 words for each XM element and the mini-xm's are complete [xm (1,1)→xm (10,456)]. These mini-xm elements are stored on tape.

Program No. 4 is shown in block form at FIG. 53 with subroutines utilized therein detailed in FIGS. 54–62. An explicit listing of the assembly level source program language for Program No. 4 and all related subroutines follows. It will be noted that the main program is shown as comprising sections I, II, III, IV, V, VI, VII and VIII in FIG. 53. These program sections correspond to specific listing statements:

| Section | Instruction Statement |
|---|---|
| I | 0400–0405 |
| II | 0406–0411 |
| III | 0412–0422 |
| IV | 0423–0434 |
| V | 0435–0440 |
| VI | 0441–0462 |
| VII | 0463–0465 |
| VIII | 0466–0516 |

These eight program sections are functionally described below as in introduction to the explicit program listing:

I. Initialize

A. XSETD: set disk controller and drive parameters.

B. Set up the list of data information. Eg: at the end of each input unit the program will store in this list: (1) the number of records dumped onto magtape per unit; and (2) the complement (cia) of the number of unused words from the last dump of 10 words.

C. "MONCT" is used for counting the units (indicating when the fourth is encountered).

II. Initialize small disk parameters

A. "LOOPCT" indicates that 10 input blocks of 12 records each have been processed onto the small disk, thus indicating that the small disk is full and ready to be dumped onto magtape.

B. "STAD" is an indicator for the position of the mini-xm storage on the small disk. With the first input block the first mini-xm is stored at the 10th used position of the small disk and each mini-xm of that input block is displaced 10 positions apart. With the second input block the first mini-xm is stored at the 9th used position of the small disk and again each mini-xm is displaced 10 positions apart and so forth until the disk is full.

III. Input MX Block (PIC matrix)

A. Clear the core input area. This is in effect a dummy operation since the input record overlays this area.

B. Read the MX block into core from magnetic tape. There are 12 records in this block. Each record is 64 words in length. If a tape mark is encountered, go to part VIII.

IV. Fill the small disk (Dec DF32d) with as many mini-xms as will comfortably fit (without stopping processing in the middle of an input block).

A. "XROT"—(see separate description of this subroutine) process input data into mini-xms in core mbl.

B. "XFILD"—stores the mini-xms on the disk. Note that each mini-xm word is displaced ten words apart from the next. This is done so that ten inputs of 12 records store the mini-xms in sequential order. Eg. After one input and processing of 12 MX records, the small disk contains one mini-xm for each significant MX bit position. But after 10 input and processing cycles the small disk contains 10 adjacent mini-xms for each significant MX bit position, and each "10 mini-xm segment" has its bits sequential in reverse order.

C. After "XROT" and "XFILD" are processed, if the entire unit is done or the small disk is full, part V is entered; if the small disk is not full (10 inputs), go to part III.

V. Transfer mini-xm segments from small disk to magnetic tape storage.

A. "XWRTD" is a physical transfer of the stored 10 "mini-xm segments" on the small disk to magnetic tape.

B. If the unit is completely processed go to part VI; otherwise continue to part II.

VI. End of a Unit Processing

A. Reset unit done trigger.

B. Store # of records processed in unit.

C. Store # of unused mini-xms in the last "10 mini-xm segment".

D. Write tape mark to separate units.

E. If 4 units are done, rewind the tape (of stored mini-xm segments) and go to part VII; otherwise go to part II.

VII. Transfer mini-xm segments to the large disk.

A. "XDO"—(see separate description of this subroutine.)

B. After all xms for 4 units are on the disk, rewind the magtape and halt: Program completed.

VIII. Tape mark encountered on MX input file (end of unit).

A. Set "EOFTRG" to indicate unit complete.

B. "LOOPCT" is queried to see if the last "10 mini-xm segment" has some incomplete elements stored on small disk to be dumped, in which case the last dump is made before going to part VI.

"XROT" Subroutine

To better understand how "XROT" processes the mini-xms, refer to FIG. 26. This figure shows how each MX record is formatted in core.

Each record consists of 64 twelve bit computer words (the last word of which is not depicted on the diagram and is unused), in which there are both significant and unused bit positions. For example, the first two words consist of all significant bits, the third word, however, has only 2 significant bits and 10 unused bits. This same pattern is continued through the 48th word. The 49th, 50th, and 51st words start a new pattern: one word of 10 significant bits and 2 unused bits, then two words of all unused bits. This pattern is continued through the 60th wrod. Finally the 61st word is the last word to contain any significant bits—two bits are significant in this word.

"XROT" processes 12 records at one time. It takes a bit from each of the twelve records and puts them together and stores this result as a mini-xm. It does this for each significant MX bit position. Note that only the significant bit positions are processed into min-xms and that the number of mini-xms produced in this operation is therefore equal to the number of significant bits in the MX record.

This subroutine takes the first MX bit of each record, combines them and stores them as a mini-xm. Then it does the same with the next MX bit from each record, until the first word (12 MX bits) of each MX record is transposed into 12 mini-xm words. "MXCT" indicates when 12 records have each processed one bit. "ROTCT" indicates how many significant bits are to be processed in the current MX word. This indicator is normally set to process 12 bits. "LETLP" indicates when the desired number of MX words have been processed to complete the 1st of the three patterns, so that the processing of only the significant bits is unaltered when the pattern changes. "LP12" indicates that the next MX word to be processed will have unused bits. It is originally set to process 2 words of each record into 24 mini-xms, then indicate done. At this time "ROTCT" is set to indicate that the next input word will have only 2 significant bits to process. "LP12" is then reset to do 3 more words (one containing significant and unused bits and the next two containing all significant bits), and so forth until the first pattern is finished, at which time 416 mini-xms will have been amassed completing the alphabetic portion of the matrix.

When the first pattern is complete "DONTRG" is set to indicate that the alpha portion is done. Notice that "ROTCT" is now set to process only 10 significant bits of the first MX word of the second pattern and the next two MX words are skipped over. This process is repeated until the second (or numeric bits) pattern is completely processed. Notice that the MX input position (data pointer) is used to test when the second pattern is done. Finally the last (or business-residence bits) pattern is processed. "ROTCT" is set to process only 2 significant bits of the next MX word. Again the input position is used to trigger the end of this pattern, at which time the subroutine is exited.

Note that each input MX word containing significant bits is processed in the forward direction (left to right) but the mini-xm bits are stored in reverse order (right to left). This is done to accommodate the first in last out function.

"XDO" Subroutine

"XDO" is actually a subprogram whose function is to combine each "ten mini-xm segment" from each magnetic tape record group into XM blocks onto a disk pack. It processes all four units processed onto tape.

First, the format of the "ten mini-xm segments" stored on magnetic tape in record groups will be described. Each of 458 bit positions of 120 MX records have been transformed into "10 mini-xm segments"; i.e., 120 bits (10 words) containing the bits of the first bit positions of each of the first 120 MX records, followed by 10 words containing the bits of the second bit position of each of the first 120 MX records, and so forth until 10 words containing the bits of the 458th bit position of each of the first 120 MX records. These are put onto magnetic tape as three records, the first and second records containing 204 (each of the 458 segments and the third record containing the remaining 50 segments. These three records from a group. The next 120 MX records were also processed into a group of 3 records in the same manner until all records were processed (the last group possibly containing unused bits and/or words). Each of the 4 units was separated by a tape mark.

Thus "XDO" is set up to process (through "PROC" subroutine" the 4 units into XM blocks in the following manner: With the disk pack initially zeroed (offline process), the first "ten mini-xm segment" (10 mini-xm words) are put onto the first disk block (record), the second "ten mini-xm segment" put onto the second block, and so forth until the 458th "ten mini-xm segment" has been put onto the 458th disk block. Note that because the bits are in reverse order, the "ten mini-xm segments" will be put into these blocks in reverse order also, i.e., all of these segments are put into the end of the disk block (words 2509-2518). Thus the first group has been processed. The second group is processed in the same manner except that the segments are now displaced 10 words in the XM blocks (words 2499-2508). This is continued until all the groups in the unit have been processed. The other three units are processed likewise, except that the disk block are offset 1000 positions for each unit.

Some of the subroutines not shown in the FIGURES are summarized below:

MAG: General subroutine to drive the magnetic tape transport.

Format:
JMS I XMAG
(command *1
(current address)
(word count)
(extension register) *2
control resumes here if tape mark encountered
control resumes here normally

*1. command bits
0: formatter select
1,2: unit select
3-5: N/A
6-8: tape command
9-11: N/A

*2.
extension bits
0-4: N/A
5: special core dump mode
6-9: N/A
10,11: memory bank DISKS: General subroutine to execute a disk function on the DF32D (small) disk.

Format:
JMS I XDISK
(command)
(core address)
(word count)
(block # [0-17])
(disk address)
control resumes here

*3. This command is either DMAR to read or DMAW to write.

DIVIDE: General single precision divide subroutine.

Format:
JMS I XDIVID
(dividend)
(divisor)
remainder returned here
control resumes here with quotient in accumulator REWIND: General subroutine for rewinding the magnetic tape unit last processed by XMAG.

CLEAR: General subroutine to clear MX input area.

INIT: Initialize parameters at the initial read of the 3 record group of "10 mini-xm segments".

A. "RDCT" is a counter to indicate that there are 3 magtape records to one block of mini-xm segments.
B. "TRCCT" is a counter to indicate that there are 204 mini-xm segments in the first two records of the block and 50 mini-xm segments in the last record of the block. (Set to 50 at some other part of the program)

DSKOP: Finishes executing a disk function. The function is specified by "COMM". In this subroutine the actual disk transfer takes place.

RD: Establishes the parameters for "XMAG" subroutine; goes there to perform a magnetic tape read function per parameters; returns from "XMAG" indicating tape mark if encountered, and offsets return from "RD" if tape mark not encountered.

SETDSK: Sets the constant parameters for the large disk. The parameters in this program which are constant throughout the program are: controller and drive (all 4 units are processed onto one drive). "LST3" is set up at this time also. It is a list of the starting XM disk block No.'s for each unit.

Note: Each XM is a self-contained disk record, 2518 words in length. * When we speak of a disk block (on the large disk), we are denoting one of these records. Note also that there are 4060 of these blocks per disk, with the first 60 blocks used for scratch purposes, followed by 1000 blocks allotted to each unit. The breakdown of the 1000 blocks per unit is: 500 for data, 458 for XM's, 42 for scratch purposes (actually unused). For a pictorial view see the "ascii-xm file disk layout."

*Only 2500 words of the XM are used—this allows 30,000 bits per unit in the XM's.

Program No. 4.

```
                    CSR=6512
                    MAR=6514
                    WCR=6516
                    CBRL=6500
                    CBRH=6501
                    MCR=6517
                    ESR0=6511
                    AIRH=6505
                    SSRH=6503
                                MQA=7501
                                MQL=7421
                                BSW=7002
                                CDF0=6201
                                CDF1=6211
                                FIXTAB
                                *36
0036   7774   CM4,              -4
0037   7775   CM3,              -3

                                *40
```

```
0040  0000  STAD,    0              /STARTING ADDRESS ON SMALL DISK
0041  0000  RECCT,   0              /# RECORDS PER MONTH
0042  0000  INBUF,   0
0043  0000  LOTRG,   0        /1-LOWER CASE ALPHA
0044  7775  RDCT,    -3       /NO READS PER DUMP
0045  7464  TRCCT,   -314     /NO CHAR PER READ
0046  7720  TIMCT,   -60      /NO CHAR POS PER ALPHA
0047  0000  TYPCT,   0        /NO CHARS DONE (1-62)
0050  7772  MONCT,   -6       /NO MONTHS TO DO
0051  0000  OUTBUF,  0
0052  0000  DDAD,    0        /DISK ST ADDR
0053  0000  LST,     0
0054  0000  LST2,    0
0055  0000  DRIVE,   0
0056  0000  SEC,     0
0057  0012  C12,     12
0060  1400  C1400,   1400
0061  7772  CM6,     -6
0062  7766  CM12,    -12
0063  7761  CM17,    -17
0064  7464  CM314,   -314
0065  7720  CM60,    -60
0066  7776  CM2,     -2

0067  1170  XCLEAR,  CLEAR
0070  0200  XMAG,    MAG
0071  0600  XDISK,   DISKS
0072  1000  XROT,    ROT
0073  0700  XFILD,   FILDSK
0074  1130  XWRTD,   WRTDSK
0075  0302  XREWD,   REWIND
0076  0735  XDO,     DO
0077  1700  XDIVID,  DIVIDE
0100  0535  XINIT,   INIT
0101  0560  XRD,     RD
0102  1400  XDSK,    DSK
0103  0474  XLST,    LSTR
0104  0107  XLST2,   LSTR2
0105  1200  XPROC,   PROC
0106  1630  XSETD,   SETDSK


0107  0000  LSTR2,   0        /STORAGE OF END LOC OF MONTHS
0110  0000           0
0111  0000           0
0112  0000           0
0113  0000           0
0114  0000           0
0115  0000  FACTO,   0
                     *117
0117  0000  LST3,    0
0120  1060           1060     /START BLOCKS ON DISK
0121  3030           3030
0122  5000           5000
0123  6750           6750
0124  0000           0
                     *400             /MAINLINE
0400  7300           CLA CLL
0401  4506           JMS I XSETD      /SET CONSTANT DISK VALUES
0402  1103           TAD XLST
0403  3053           DCA LST          /STORE VARIABLES FOR EACH UNIT
0404  1036           TAD CM4
0405  3050           DCA MONCT                /PROCESS 4 UNITS
0406  1062  SETIT,   TAD CM12
0407  3270           DCA LOOPCT               /DUMP DISK EVERY 10 LOOPS
0410  1310           TAD C11
0411  3040           DCA STAD         /START FILLING DISK AT 10TH WORD
0412  4467  NXT2,    JMS I XCLEAR     /CLEAR CORE INPUT AREA
0413  1271  NXT1,    TAD C2000
```

```
0414  3217           DCA ADDR       /READ INTO 2000, MB0
0415  4470           JMS I XMAG     /READ A RECORD
0416  1020           1020
0417  0000  ADDR,    0              /CORE ADDR
0420  6000           -2000
0421  0100           100            /EXT REG - SCD MODE
0422  5266           JMP ENDO       /EOF RETURN
0423  4472  GOON,    JMS I XROT     /YES, CHANGE TO XM
0424  4473           JMS I XFILD    /WRITE ONTO SMALL DISK
0425  7240           CLA CMA
0426  1040           TAD STAD
0427  3040           DCA STAD       /MOVE DISK LOC BACK 1
0430  1272           TAD EOFTRG
0431  7640           SZA CLA        /DONE WITH UNIT?
0432  5235           JMP DUMP       /YES
0433  2270           ISZ LOOPCT     /NO, DONE 10 TIMES - SMALL DSK FULL?
0434  5212           JMP NXT2       /NO
0435  4474  DUMP,    JMS I XWRTD    /YES, DUMP ONTO MAGTAP
0436  1272           TAD EOFTRG
0437  7650           SNA CLA        /UNIT DONE?
0440  5206           JMP SETIT      /NO
0441  3272  FINI,    DCA EOFTRG     /YES, CLEAR TRG
0442  1041           TAD RECCT
0443  3453           DCA I LST      /SAVE # RECORDS PER UNIT
0444  3041           DCA RECCT
0445  2053           ISZ LST
0446  1270           TAD LOOPCT
0447  3453           DCA I LST
0450  2053           ISZ LST        /SAVE # WORDS NEEDED FROM LAST DUMP
0451  4470           JMS I XMAG
0452  0050           50             /WRITE END OF FILE
0453  0000           0
0454  0000           0
0455  0000           0
0456  7300           CLA CLL
0457  7300           CLA CLL
0460  2050           ISZ MONCT      /4 UNITS DONE?
0461  5206           JMP SETIT      /NO
0462  4475           JMS I XREWD    /YES, REWIND TAPE
0463  4476           JMS I XDO      /PUT ONTO LARGE DISK
0464  4475           JMS I XREWD
0465  7402           HLT            /PROCESSING COMPLETE
0466  2272  ENDO,    ISZ EOFTRG     /SET DONE TRIGGER
0467  5311           JMP CKDSK      /NO
0470  0000  LOOPCT,  0
0471  2000  C2000,   2000
0472  0000  EOFTRG,  0
0473  0003  C3,      3
0474  0000  LSTR,    0              /# MAG RECORDS FOR MONTH 1
0475  0000           0              /# WORDS FILLED IN LAST RECORD
0476  0000           0
0477  0000           0
0500  0000           0
0501  0000           0
0502  0000           0
0503  0000           0
0504  0000           0
0505  0000           0
0506  0000           0
0507  0000           0
0510  0011  C11,     11
0511  1270  CKDSK,   TAD LOOPCT
0512  1057           TAD C12
0513  7640           SZA CLA        /ANY WORDS WRITTEN ON DISK?
0514  5235           JMP DUMP       /YES
0515  3270           DCA LOOPCT     /NO, DO FINAL DUMP
0516  5241           JMP FINI
                     *700
            /WRITES 1 OUTPUT BUFFER WORD BY WORD ONTO SMALL DISK;
```

```
                /204 CHARS PER TRACK
0700   0000   FILDSK, 0
0701   7300           CLA CLL
0702   3314           DCA BLOCK
0703   3312           DCA CORAD
0704   1040   RESET,  TAD STAD
0705   3315           DCA DSKAD        /ST AT LOC 12 OF DISK
0706   1064           TAD CM314
0707   3334           DCA CHARCT       /204 CHARS PER TRACK
0710   4471   WRT,    JMS I XDISK
0711   6605           DMAW             /COMMAND
0712   0000   CORAD,  0                /CORE ADDRESS
0713   7777           7777             /WORD COUNT=1
0714   0000   BLOCK,  0
0715   0000   DSKAD,  0
0716   2312           ISZ CORAD        /INC TO NEXT WORD IN CORE
0717   1312           TAD CORAD
0720   1333           TAD CM712
0721   7650           SNA CLA          /DONE?
0722   5700           JMP I FILDSK     /YES
0723   2334           ISZ CHARCT       /NO, TRACK FULL?
0724   5327           JMP INCAD        /NO, INCREMENT DISK ADDR FOR NEXT WD
0725   2314           ISZ BLOCK        /YES, GO TO NEXT TRACK
0726   5304           JMP RESET
0727   1315   INCAD,  TAD DSKAD
0730   1057           TAD C12          /INC DISK AD 10 LOCATIONS
0731   3315           DCA DSKAD
0732   5310           JMP WRT
0733   7066   CM712,  -712     /CM # WORDS FROM CORE = XM BITS
0734   0000   CHARCT, 0
                      *1000
              /CONVERTS 12 MX FRAMES INTO XM WORDS

1000   0000   ROT,    0
1001   7300           CLA CLL
1002   3051           DCA OUTBUF
1003   3300           DCA DONTRG
1004   1065           TAD CM60
1005   3301           DCA LETLP        /DO 48 ALPHA WORDS
1006   1066           TAD CM2
1007   3302           DCA LP12         /DO 2 L1 BIT WDS
1010   1271           TAD CM14
1011   3273           DCA ROTCT        /DO 12 ROTATIONS PER WORD
1012   3276           DCA STORE
1013   1271           TAD CM14
1014   3272           DCA MXCT         /DO 12 MXS
1015   1277   START,  TAD C1700
1016   3042           DCA INBUF        /MB0
1017   1042   NXMX,   TAD INBUF
1020   1274           TAD FAC          /400
1021   3042           DCA INBUF        /ORIG LOC=2000
1022   1442           TAD I INBUF
1023   7104           CLL RAL          /ROT LET POS INTO LINK
1024   3442           DCA I INBUF      /SAVE REST OF WORD
1025   1276           TAD STORE
1026   7010           RAR              /ROTATE LET POS INTO WORD
1027   3276           DCA STORE        /SAVE PARTIAL WORD
1030   2272           ISZ MXCT         /12 MXS DONE?
1031   5217           JMP NXMX         /NO, DO NEXT MX
1032   1276           TAD STORE        /YES, PUT FULL WORD IN OUTBUF
1033   6211           CDF1
1034   3451           DCA I OUTBUF
1035   2051           ISZ OUTBUF
1036   6201           CDF0
1037   2273           ISZ ROTCT        /12 INPUT ROTATIONS DONE?
1040   5264           JMP XXX
1041   2042           ISZ INBUF        /YES, INC INBUF POS
1042   1300           TAD DONTRG
1043   7640           SZA CLA          /DONE?
```

```
1044  5304           JMP QRT          /YES
1045  2301           ISZ LETLP        /NO, DONE ALPHAS?
1046  5253           JMP P2           /NO
1047  2300           ISZ DONTRG       /YES, SET TRG
1050  1062           TAD CM12
1051  3273  P3,      DCA ROTCT        /DO 10 ROTATIONS
1052  5263           JMP XXX-1
1053  2302  P2,      ISZ LP12         /DONE 2 12 BIT WDS?
1054  5261           JMP P1           /NO
1055  1303           TAD CCM3         /YES, DO 3 MORE WDS
1056  3302           DCA LP12
1057  1066           TAD CM2
1060  5251           JMP P3           /DO 2 ROT ON 1ST WD
1061  1271  P1,      TAD CM14
1062  5251           JMP P3
1063  3276           DCA STORE        /NO, CLEAR STORE
1064  1271  XXX,     TAD CM14
1065  3272           DCA MXCT
1066  1042           TAD INBUF        /NO
1067  0275           AND C77          /ACTUAL NEXT POS OF MX1
1070  5215           JMP START
1071  7764  CM14,    -14
1072  0000  MXCT,    0
1073  0000  ROTCT,   0
1074  0100  FAC,     100
1075  0077  C77,     77
1076  0000  STORE,   0                /PARTIAL OUTPUT WORD
1077  1700  C1700,   1700
1100  0000  DONTRG,  0
1101  0000  LETLP,   0
1102  0000  LP12,    0
1103  7775  CCM3,    -3
1104  1042  QRT,     TAD INBUF
1105  1314           TAD CM3372
1106  7500           SMA              /DONE NUMBERS?
1107  5315           JMP CKONIT       /YES
1110  7200           CLA              /NO
1111  2042           ISZ INBUF        /NO
1112  2042           ISZ INBUF
1113  5250           JMP P3-1
1114  4406  CM3372,  -3372
1115  7640  CKONIT,  SZA CLA          /DONE ONLY NUMBERS?
1116  5600           JMP I ROT        /NO, DONE BOTH
1117  2042           ISZ INBUF        /YES, DO BUS/RES SPLIT
1120  2042           ISZ INBUF
1121  1066           TAD CM2
1122  5251           JMP P3
                     *1130
            /READS DISK INTO CORE TRACK BY TRACK
            /AND WRITES ONTO TAPE
1130  0000  WRTDSK,  0
1131  1037           TAD CM3
1132  3360           DCA READCT       /READ AND WRITE 3 TRACKS
1133  3340           DCA BLKK
1134  4471  REST,    JMS I XDISK
1135  6603           DMAR             /COMMAND
1136  0000           0                /CORE ADDRESS
1137  4000           -4000            /WC
1140  0000  BLKK,    0                /BLOCK #
1141  0000           0                /DISK ADDR OFFSET(0 OR 4000)
1142  4470           JMS I XMAG
1143  0040           40               /WRITE SCD MODE
1144  0000           0                /CORE ADDR
1145  4000           -4000
1146  0101           101              /EXT REG
1147  7402           HLT              /END OF FILE RETURN
1150  2041           ISZ RECCT        /NORMAL RETURN, # REC COUNT
1151  5353           JMP .+2
1152  7402           HLT              /777RECORDS?
```

```
1153  2360           ISZ READCT       /DONE 3 TRACKS?
1154  5356           JMP .+2 /NO
1155  5730           JMP I WRTDSK     /YES
1156  2340           ISZ BLKK
1157  5334           JMP REST
1160  0000  READCT,  0
                     *1170
            /CLEARS CORE INPUT AREA

1170  0000  CLEAR,   0
1171  7332           7332             /2000
1172  3042           DCA INBUF
1173  3442  AG1,     DCA I INBUF
1174  2042           ISZ INBUF        /DONE?
1175  5373           JMP AG1          /NO
1176  5770           JMP I CLEAR      /YES
1177  2000  CM6000,  -6000
                     *535     /CLEAR TRGS, RESET CTRS
0535  0000  INIT,    0
0536  1037           TAD CM3
0537  3044           DCA RDCT         /3 READS PER DUMP
0540  1064           TAD CM314
0541  3045           DCA TRCCT        /204 CHR PER READ
0542  5735           JMP I INIT
                     *560
0560  0000  RD,      0        /READ MAG TAPE
0561  4470           JMS I XMAG
0562  0020           20       /SCD ON DRIVE 0
0563  4000           4000     /CORE ADDRESS
0564  4000           -4000    /WC
0565  0100           100      /EXT REG
0566  5760           JMP I RD         /EOF RETURN
0567  2360           ISZ RD  /NORMAL RETURN
0570  5760           JMP I RD
                     *735
0735  0000  DO,      0        /PUT UNITS ONTO DISK
0736  1365           TAD C4714        /2508
0737  3052           DCA DDAD         /STARTING ADDR ON DISK
0740  1103           TAD XLST
0741  3053           DCA LST
0742  1104           TAD XLST2
0743  3054           DCA LST2
0744  1036           TAD CM4
0745  3050           DCA MONCT
0746  4500  DOWK,    JMS I XINIT      /INITIALIZE CTRS AND TRGS
0747  4505           JMS I XPROC      /PUT ONE UNIT ON DISK
0750  1052           TAD DDAD
0751  7104           CLL RAL
0752  7420           SNL      /4000 OR HIGHER ADDR?
0753  5356           JMP .+3 /NO
0754  7510           SPA      /YES
0755  7402           HLT      /OVERFLOW OF BUFR
0756  7010           RAR      /NO
0757  1057           TAD C12
0760  3454           DCA I LST2       /SAVE END LOC FOR MONTH
0761  2054           ISZ LST2
0762  2050           ISZ MONCT        /DONE 4 UNITS?
0763  5366           JMP .+3          /NO
0764  5735           JMP I DO         /YES
0765  4714  C4714,   4714
0766  1365           TAD C4714
0767  3052           DCA DDAD         /RESET ADDR
0770  5346           JMP DOWK
            /PROCESS ONE MONTH ONTO LARGE DISK
                     *1200
1200  0000  PROC,    0
1201  4300           JMS RRSET
1202  7300           CLA CLL
1203  4501  READIT,  JMS I XRD
```

```
1204  5273          JMP PRCC        /EOF END OF UNIT
1205  2041          ISZ RECCT
1206  1453          TAD I LST
1207  1066          TAD CM2
1210  7041          CIA
1211  1041          TAD RECCT
1212  7640          SZA CLA         /ON LAST DUMPS OF UNIT?
1213  5224          JMP ADJ         /NO
1214  2053          ISZ LST         /YES
1215  1453          TAD I LST
1216  2053          ISZ LST
1217  7041          CIA
1220  3115          DCA FACTO       /ADJUST AS TO NO WORDS NEC
1221  1052          TAD DDAD
1222  1115          TAD FACTO
1223  3052          DCA DDAD        /ADJUST FOR NEEDED WORDS
1224  7330  ADJ,    7330    /4000
1225  3042          DCA INBUF       /ST OF DATA BUFR
1226  2044          ISZ RDCT        /NORMAL RET: 3RD READ?
1227  5232          JMP .+3 /NO
1230  1264          TAD CM62        /YES, DO 50 GRPS FROM LAST TRACK
1231  3045          DCA TRCCT
1232  4502  WRTIT,  JMS I XDSK      /WRITE 10 WORDS
1233  0000  DDBLK,  0
1234  2233  FF,     ISZ DDBLK       /INC BLOCK NO.
1235  5237          JMP .+2
1236  7402          HLT     /ERROR, BLOCK OVERFLOW
1237  2045  GG,     ISZ TRCCT       /DONE W RECORD?
1240  5232          JMP WRTIT       /NO
1241  1044          TAD RDCT        /YES
1242  7650          SNA CLA /DONE W. DUMP?
1243  5247          JMP RST         /YES
1244  1064          TAD CM314       /NO
1245  3045          DCA TRCCT       /RESET CTR
1246  5203          JMP READIT
1247  4500  RST,    JMS I XINIT     /RESET ALL CTRS, ETC.
1250  1052          TAD DDAD
1251  1062          TAD CM12
1252  3052          DCA DDAD        /SET ADDR BACK 10 LOC
1253  1052          TAD DDAD
1254  7104          CLL RAL
1255  7430          SZL     /OVERFLOW?
1256  5261          JMP .+3 /YES
1257  7200          CLA     /NO
1260  5312          JMP RQ
1261  7700          SMA CLA /OVERFLOW?
1262  5257          JMP .-3 /NO
1263  7402          HLT     /YES
1264  7716  CM62,   -62     /DO 50 CHARS ON LAST DUMP
1265  7714  CM64,   -64
1266  2260  C2260,  2260
1267  5440  CM2340, -2340
1270  6774  C6774,  6774
1271  2041  C2041,  2041
1272  2074  C2074,  2074
1273  3041  PRCC,   DCA RECCT
1274  3115          DCA FACTO
1275  5600          JMP I   PROC
1276  7762  CM16,   -16
1277  7777  CCM1,   -1
1300  0000  RRSET,  0
1301  1517          TAD I LST3
1302  2117          ISZ LST3
1303  7450          SNA             /DONE WITH ALL UNITS?
1304  7402          HLT             /YES
1305  3311          DCA SAVE        /NO, SET STARTING DISK BLOCK FOR MO
1306  1311          TAD SAVE
1307  3233          DCA DDBLK
1310  5700          JMP I RRSET
```

```
1311  0000  SAVE,  0
1312  1311  RQ,    TAD SAVE
1313  3233         DCA DDBLK        /RESET BLOCK NUM
1314  5203         JMP READIT
                   *1400
1400  0000  DSK,   0
1401  7300         CLA CLL
1402  1600         TAD I DSK
1403  2200         ISZ DSK
1404  3206         DCA DIVR
1405  4477         JMS I XDIVID
1406  0000  DIVR,  0        /BLOCK NO
1407  0024         24       /DIVISOR - 20
1410  0000  HD,    0        /REMAINDER
1411  3342         DCA CYL /CYL IN AC
1412  7326         CLA STL RTL      /2
1413  6517         MCR
1414  7300         CLA CLL /LOAD MODE
1415  1340         TAD C1000
1416  6501         CBRH     /SELECT CYLINDER
1417  7300         CLA CLL
1420  1342         TAD CYL
1421  7106         CLL RTL
1422  7006         RTL
1423  6500         CBRL     /CYL NO IN BITS 0-7
1424  7300         CLA CLL
1425  1060         TAD C1400
1426  6501         CBRH     /SP FN
1427  7300         CLA CLL
1430  1060         TAD C1400
1431  6500         CBRL     /SEEK AND RESET HEAD
1432  7300         CLA CLL
1433  1210         TAD HD   /SET UP HEADER IMAGE
1434  7002         BSW
1435  7110         CLL RAR          /HD IN BITS 0-6
1436  1056         TAD SEC
1437  3373         DCA HEAD         /WORD 0
1440  1342         TAD CYL
1441  3374         DCA HEAD+1       /WORD 1
1442  1373         TAD HEAD
1443  1374         TAD HEAD+1
1444  1375         TAD HEAD+2
1445  7041         CIA
1446  3376         DCA HEAD+3       /WORD 3 - CHECKSUM
1447  7325         CLA STL IAC RAL /3
1450  6517         MCR      /READ MODE
1451  7300         CLA CLL
1452  6503         SSRH     /READ SEL STATUS REG
1453  7006         RTL
1454  7006         RTL
1455  7710         SPA CLA /READY?
1456  5252         JMP .-4 /NO
1457  7326         CLA STL RTL      /YES, 2
1460  6517         MCR      /LOAD MODE
1461  7300         CLA CLL
1462  6501         CBRH             /SELECT HEAD
1463  1210         TAD HD
1464  7106         CLL RTL
1465  7006         RTL
1466  6500         CBRL     /HEAD NO BITS 3-7
1467  7300         CLA CLL
1470  1336         TAD C3400
1471  3343         DCA COMM         /CONFIRM READ
1472  4303         JMS DSKOP
1473  4744         JMS I XTRANS     /UPDATE DATA BLOCK
1474  1337         TAD C5400
1475  3343         DCA COMM         /SET TO CONF. WRITE
1476  7326         CLA STL RTL      /2
1477  6517         MCR
```

```
1500 7300          CLA CLL /LOAD MODE
1501 4303          JMS DSKOP       /WRITE BACK ONT DISK
1502 5600          JMP I DSK
1503 0000 DSKOP,   0
1504 7332          7332    /-6000
1505 6516          WCR     /SET WC TO MX
1506 7300          CLA CLL
1507 1345          TAD HEADER
1510 6514          MAR     /ST OF HDR IMAGE
1511 7300          CLA CLL
1512 1343          TAD COMM
1513 6501          CBRH    /LOAD COMMAND
1514 7300          CLA CLL
1515 1056          TAD SEC
1516 7106          CLL RTL
1517 7006          RTL
1520 6500          CBRL    /SEC NO BITS 3-7
1521 7300          CLA CLL
1522 7330          7330    /4000
1523 6505          AIRH    /SET WRITE REG IF NEC
1524 1341          TAD C100        /DATA IN B/MB1
1525 6512          CSR     /GO
1526 7325          CLA STL IAC RAL /3
1527 6517          MCR     /READ MODE
1530 7300          CLA CLL
1531 6511          ESR0    /READ ERROR STATUS
1532 5331          JMP .-1
1533 7510          SPA     /ERRORS ON DONE?
1534 7402          HLT     /YES
1535 5703          JMP I DSKOP     /NO
1536 3400 C3400,   3400
1537 5400 C5400,   5400
1540 1000 C1000,   1000
1541 0100 C100,    100
1542 0000 CYL,     0
1543 0000 COMM,    0
1544 1600 XTRANS,  TRANS
1545 1573 HEADER,  HEAD
                   *1573
1573 0000 HEAD,    0       /HEAD AND SECTOR
1574 0000          0       /CYLINDER
1575 3052          -4726   /CONSTANT WC -2518
1576 0000          0       /CHECK SUM
1577 0000          0       /ADDR OF DATA - 0 MB1
                   *1600
1600 0000 TRANS,   0
1601 7300          CLA CLL /UPDATE DISK BLOCK IN CORE
1602 1062          TAD CM12
1603 1115          TAD FACTO
1604 3223          DCA CTR
1605 1042          TAD INBUF
1606 1115          TAD FACTO
1607 3042          DCA INBUF
1610 1052          TAD DDAD
1611 3051          DCA OUTBUF      /ST OF WDS ON DISK BLOCK IN CORE
1612 1442 NX,      TAD I INBUF     /GET WD
1613 2042          ISZ INBUF
1614 6211          CDF1
1615 3451          DCA I OUTBUF
1616 2051          ISZ OUTBUF
1617 6201          CDF0
1620 2223          ISZ CTR /DONE?
1621 5212          JMP NX  /NO
1622 5600          JMP I TRANS     /YES
1623 0000 CTR,     0
                   *1630
1630 0000 SETDSK,  0       /SET CONSTANT DISK REGISTERS
1631 1250          TAD C3000
1632 6517          MCR     /SELECT CONTROLLER 0
```

```
1633  7326          CLA STL RTL     /2
1634  6517          MCR       /LOAD MODE
1635  7300          CLA CLL
1636  7333          7333      /6000
1637  6501          CBRH      /LOAD DRIVE
1640  7300          CLA CLL
1641  1055          TAD DRIVE
1642  6500          CBRL
1643  7300          CLA CLL
1644  1247          TAD XLST3
1645  3117          DCA LST3            /ST OF BLOCK LIST
1646  5630          JMP I SETDSK
1647  0120  XLST3,  120
1650  3000  C3000,  3000
                    *1700
            /DIVIDE:
            /       BOUNDS OF DIVIDEND: 0-7777
            /       BOUNDS OF DIVISOR: 1-3777
            /CALL   JMS I XDIVID
            /       (DIVIDEND)
            /       (DIVISOR)
            /       REMAINDER RETURNED HERE
            /       CONTROL RESUMES HERE WITH QUOTIENT IN AC
1700  0000  DIVIDE, 0
1701  7100          CLL
1702  3355          DCA HDIV
1703  1700          TAD I DIVIDE
1704  2300          ISZ DIVIDE
1705  3356          DCA LDIV
1706  1700          TAD I DIVIDE
1707  2300          ISZ DIVIDE
1710  7041          CIA
1711  3357          DCA DIV
1712  1355          TAD HDIV
1713  7640          SZA CLA
1714  5335          JMP DV2
1715  1356          TAD LDIV
1716  1357          TAD DIV
1717  7620          SNL CLA             /DIV<DIVISOR?
1720  5347          JMP DV4             /YES
1721  7300          CLA CLL
1722  1360          TAD CM15
1723  3361          DCA DIVCT
1724  5335          JMP DV2
1725  1355  DV3,    TAD HDIV
1726  7004          RAL
1727  3355          DCA HDIV
1730  1355          TAD HDIV
1731  1357          TAD DIV
1732  7430          SZL
1733  3355          DCA HDIV
1734  7200          CLA
1735  1356  DV2,    TAD LDIV
1736  7004          RAL
1737  3356          DCA LDIV
1740  2361          ISZ DIVCT
1741  5325          JMP DV3
1742  1355          TAD HDIV
1743  3700          DCA I DIVIDE
1744  2300          ISZ DIVIDE
1745  1356          TAD LDIV
1746  5700          JMP I DIVIDE
1747  1356  DV4,    TAD LDIV            /QUOTIENT=0, REMAINDER
1750  3700          DCA I DIVIDE        /=DIVIDEND
1751  2300          ISZ DIVIDE
1752  5700          JMP I DIVIDE
1753  2300          ISZ DIVIDE
1754  5700          JMP I DIVIDE
1755  0000  HDIV,   0
```

```
1756  0000  LDIV,   0
1757  0000  DIV,    0
1760  7763  CM15,   -15
1761  0000  DIVCT,  0

                    *200
            /FORMAT:         JMS I XMAG
            /                COMMAND
            /                ADDRESS
            /                WORD COUNT
            /                EXTENSION REGISTER
            /       RETURN:  EOF
            /       RETURN:  NORMAL

0200  0000  MAG,    0
0201  1335          TAD MCM12
0202  3347          DCA REVCNT      /SET 10 RETRIES
0203  1600          TAD I MAG
0204  2200          ISZ MAG
0205  3350          DCA COM         /GET COMMAND
0206  7240          CLA CMA
0207  1600          TAD I MAG
0210  2200          ISZ MAG
0211  3351          DCA CADDR       /GET CURRENT ADDRESS
0212  1600          TAD I MAG
0213  2200          ISZ MAG
0214  3352          DCA WRDCNT      /GET WORD COUNT
0215  1600          TAD I MAG
0216  2200          ISZ MAG
0217  3353          DCA COMEX       /GET EXT REGISTER
0220  3346          DCA MADCOM
0221  1350  RETRY,  TAD COM
0222  1346          TAD MADCOM
0223  4322          JMS SETCOM      /SET CONTROLLER FOR FUNCTION
0224  1352          TAD WRDCNT
0225  3032          DCA 32
0226  1351          TAD CADDR
0227  3033          DCA 33          /SET WORD COUNT & CURRENT ADDRESS
0230  1353          TAD COMEX
0231  6717          6717
0232  7300          CLA CLL         /SET EXT REG
0233  4330          JMS MAGOP       /PERFORM MAGTAPE FUNTION
0234  6706          6706
0235  7421          MQL             /STORE STATUS IN MQ
0236  7501          MQA
0237  0336          AND MC6774
0240  7450          SNA
0241  5271          JMP MOK         /NO ERRORS
0242  0337          AND MC7677
0243  7450          SNA
0244  5273          JMP MEOF        /EOF
0245  0340          AND MC3543
0246  7640          SZA CLA
0247  7402          HLT             /BAD REC OR OFFLINE
0250  2347  PAR,    ISZ REVCNT      /PARITY
0251  5253          JMP .+2         /RETRY
0252  7402          HLT             /RETRY FAILURE
0253  1350          TAD COM
0254  0343          AND MC70
0255  1344          TAD MCM40
0256  7650          SNA CLA         /FAILURE ON MT?
0257  1341          TAD MC100       /YES
0260  3346          DCA MADCOM
0261  1350          TAD COM
0262  0342          AND MC7000
0263  1343          TAD MC70
0264  4322          JMS SETCOM      /SET CONTROLLER FOR BACKSPACE
0265  7240          CLA CMA
0266  3032          DCA 32          /WC = RECS BACKSPACED
```

```
0267  4330              JMS MAGOP          /PERFORM BACKSPACE
0270  5221              JMP RETRY          /AND TRY AGAIN
0271  2200   MOK,       ISZ MAG
0272  5600              JMP I MAG          /NORMAL EXIT
0273  1350   MEOF,      TAD COM
0274  0343              AND MC70
0275  1344              TAD MCM40
0276  7650              SNA CLA            /EOF ON WRITE?
0277  5250              JMP PAR            /YES - PARITY PROBLEM
0300  7000              NOP
0301  5600              JMP I MAG          /EXIT EOF
0302  0000   REWIND,    0
0303  1350              TAD COM
0304  0342              AND MC7000
0305  1345              TAD MC10
0306  4322              JMS SETCOM         /SET CONTROLLER FOR REWIND
0307  6722              6722               /EXECUTE REWIND
0310  1350              TAD COM
0311  0342              AND MC7000
0312  7106              CLL RTL
0313  7006              RTL                /LOAD CONT W/ NEXT MAG OP
0314  1355              TAD NEXM
0315  3354              DCA NEXCOM
0316  1754              TAD I NEXCOM
0317  7000              NOP
0320  7300              CLA CLL
0321  5702              JMP I REWIND
0322  0000   SETCOM,    0
0323  6711              6711
0324  5323              JMP .-1
0325  6716              6716
0326  7300              CLA CLL
0327  5722              JMP I SETCOM
0330  0000   MAGOP,     0
0331  6722              6722
0332  6701              6701
0333  5332              JMP .-1
0334  5730              JMP I MAGOP
0335  7766   MCM12,     -12
0336  6774   MC6774,    6774
0337  7677   MC7677,    7677
0340  3543   MC3543,    3543
0341  0100   MC100,     100
0342  7000   MC7000,    7000
0343  0070   MC70,      70
0344  7740   MCM40,     -40
0345  0010   MC10,      10
0346  0000   MADCOM,    0
0347  0000   REVCNT,    0
0350  0000   COM,       0
0351  0000   CADDR,     0
0352  0000   WRDCNT,    0
0353  0000   COMEX,     0
0354  0000   NEXCOM,    0
0355  0356   NEXM,      NEXTM
0356  1020   NEXTM,     1020     /0
0357  0040              40       /1
0360  0040              40       /2
0361  0040              40       /3

                        *600
          /FORMAT:               JMS I XDISK
          /                      COMMAND
          /                      CORE    ADDRESS
          /                      WORD COUNT
          /                      BLOCK NUMBER (0-17)
          /                      DISK ADDRESS
```

```
0600  0000  DISKS,  0
0601  1600          TAD I DISKS
0602  2200          ISZ DISKS
0603  3236          DCA COMD1       /SET COMMAND
0604  7240          CLA CMA
0605  1600          TAD I DISKS
0606  2200          ISZ DISKS
0607  3247          DCA CAD         /SET CURRENT ADDRESS-1
0610  1600          TAD I DISKS
0611  2200          ISZ DISKS
0612  3255          DCA WCD         /SET WORD COUNT
0613  1600          TAD I DISKS
0614  2200          ISZ DISKS
0615  3250          DCA DBLK        /GET BLOXK NO
0616  1600          TAD I DISKS
0617  2200          ISZ DISKS
0620  3256          DCA DAD         /SET DISK ADDRESS
0621  1251          TAD DM3
0622  3252          DCA DREVCT      /SET FOR 3 RETRIES
0623  1255  DRETRY, TAD WCD
0624  3653          DCA I D7750     /SET WORD COUNT
0625  1247          TAD CAD
0626  3654          DCA I D7751     /SET CURRENT ADDRESS
0627  1250          TAD DBLK
0630  7110          CLL RAR
0631  7002          BSW
0632  1257          TAD C10         /MEMORY BANK 1
0633  6615          DEAL            /LOAD MEM EXT REG
0634  7210          CLA RAR
0635  1256          TAD DAD
0636  0000  COMD1,  0               /EXECURE COMMAND
0637  6622          DFSC
0640  5237          JMP .-1         /WAIT TILL DISK DONE
0641  6621          DFSE            /ANY ERRORS?
0642  5244          JMP .+2         /YES
0643  5600          JMP I DISKS     /NO
0644  2252          ISZ DREVCT
0645  5223          JMP DRETRY      /RETRY
0646  7402          HLT             /RETRY FAILURE
0647  0000  CAD,    0
0650  0000  DBLK,   0
0651  7775  DM3,    -3
0652  0000  DREVCT, 0
0653  7750  D7750,  7750
0654  7751  D7751,  7751
0655  0000  WCD,    0
0656  0000  DAD,    0
0657  0010  C10,    10

ADDR    0417
ADJ     1224
AG1     1173
BLKK    1140
BLOCK   0714
CAD     0647
CADDR   0351
CCM1    1277
CCM3    1103
CHARCT  0734
CKDSK   0511
CKONIT  1115
CLEAR   1170
CM12    0062
CM14    1071
CM15    1760
CM16    1276
CM17    0063
CM2     0066
CM2340  1267
```

| | |
|---|---|
| CM3 | 0037 |
| CM314 | 0064 |
| CM3372 | 1114 |
| CM4 | 0036 |
| CM6 | 0061 |
| CM60 | 0065 |
| CM6000 | 1177 |
| CM62 | 1264 |
| CM64 | 1265 |
| CM712 | 0733 |
| COM | 0350 |
| COMD1 | 0636 |
| COMEX | 0353 |
| COMM | 1543 |
| CORAD | 0712 |
| CTR | 1623 |
| CYL | 1542 |
| C10 | 0657 |
| C100 | 1541 |
| C1000 | 1540 |
| C11 | 0510 |
| C12 | 0057 |
| C1400 | 0060 |
| C1700 | 1077 |
| C2000 | 0471 |
| C2041 | 1271 |
| C2074 | 1272 |
| C2260 | 1266 |
| C3 | 0473 |
| C3000 | 1650 |
| C3400 | 1536 |
| C4714 | 0765 |
| C5400 | 1537 |
| C6774 | 1270 |
| C77 | 1075 |
| DAD | 0656 |
| DBLK | 0650 |
| DDAD | 0052 |
| DDBLK | 1233 |
| DISKS | 0600 |
| DIV | 1757 |
| DIVCT | 1761 |
| DIVIDE | 1700 |
| DIVR | 1406 |
| DM3 | 0651 |
| DO | 0735 |
| DONTRG | 1100 |
| DOWK | 0746 |
| DRETRY | 0623 |
| DREVCT | 0652 |
| DRIVE | 0055 |
| DSK | 1400 |
| DSKAD | 0715 |
| DSKOP | 1503 |
| DUMP | 0435 |
| DV2 | 1735 |
| DV3 | 1725 |
| DV4 | 1747 |
| D7750 | 0653 |
| D7751 | 0654 |
| ENDO | 0466 |
| EOFTRG | 0472 |
| FAC | 1074 |
| FACTO | 0115 |
| FF | 1234 |
| FILDSK | 0700 |
| FINI | 0441 |
| GG | 1237 |
| GOON | 0423 |

| | |
|---|---|
| HD | 1410 |
| HDIV | 1755 |
| HEAD | 1573 |
| HEADER | 1545 |
| INBUF | 0042 |
| INCAD | 0727 |
| INIT | 0535 |
| LDIV | 1756 |
| LETLP | 1101 |
| LOOPCT | 0470 |
| LOTRG | 0043 |
| LP12 | 1102 |
| LST | 0053 |
| LSTR | 0474 |
| LSTR2 | 0107 |
| LST2 | 0054 |
| LST3 | 0117 |
| MADCOM | 0346 |
| MAG | 0200 |
| MAGOP | 0330 |
| MCM12 | 0335 |
| MCM40 | 0344 |
| MC10 | 0345 |
| MC100 | 0341 |
| MC3543 | 0340 |
| MC6774 | 0336 |
| MC70 | 0343 |
| MC7000 | 0342 |
| MC7677 | 0337 |
| MEOF | 0273 |
| MOK | 0271 |
| MONCT | 0050 |
| MXCT | 1072 |
| NEXCOM | 0354 |
| NEXM | 0355 |
| NEXTM | 0356 |
| NX | 1612 |
| NXMX | 1017 |
| NXT1 | 0413 |
| NXT2 | 0412 |
| OUTBUF | 0051 |
| PAR | 0250 |
| PRCC | 1273 |
| PROC | 1200 |
| P1 | 1061 |
| P2 | 1053 |
| P3 | 1051 |
| QRT | 1104 |
| RD | 0560 |
| RDCT | 0044 |
| READCT | 1160 |
| READIT | 1203 |
| RECCT | 0041 |
| RESET | 0704 |
| REST | 1134 |
| RETRY | 0221 |
| REVCNT | 0347 |
| REWIND | 0302 |
| ROT | 1000 |
| ROTCT | 1073 |
| RQ | 1312 |
| RRSET | 1300 |
| RST | 1247 |
| SAVE | 1311 |
| SEC | 0056 |
| SETCOM | 0322 |
| SETDSK | 1630 |
| SETIT | 0406 |
| STAD | 0040 |

```
START   1015
STORE   1076
TIMCT   0046
TRANS   1600
TRCCT   0045
TYPCT   0047
WCD     0655
WRDCNT  0352
WRT     0710
WRTDSK  1130
WRTIT   1232
XCLEAR  0067
XDISK   0071
XDIVID  0077
XDO     0076
XDSK    0102
XFILD   0073
XINIT   0100
XLST    0103
XLST2   0104
XLST3   1647
XMAG    0070
XPROC   0105
XRD     0101
XREWD   0075
XROT    0072
XSETD   0106
XTRANS  1544
XWRTD   0074
XXX     1064
```

Operating instructions for the above listed Program No. 4 are as follows:

ABSTRACT: This program takes 12 MX records and makes 1 XM word for each char position. These are written onto the small disk until 120 frames (10 words) are stored for each position. The disk is then dumped onto magtape. After all MXs are processed, the mini-XMs (120 frames each) are then input from tape and written at the proper block on the Div Disk. At the end of the program locations 474–507 contain (1) the # of records dumped onto magtape per unit and (2) the cia of the number of unused words from the last dump of 10 words. Locations 107–115 contain the end locations of each unit within the block.

1. Load NYT MX-XM program into mb0.
2. Put MX tape on unit 1 and scratch tape on Unit 0.
3. Set the following parameters in core:
   55=drive (0 or 20)
   56=sector (0 or 14)
4. Be sure the drive is ready and the proper disk pack is on.
5. 400 load, clear and continue.
6. Halt at 465 indicates processing complete. Note contents of locations 474–507 and 107–115.

SPECIFICATIONS

1. Input:
(a) MX tape, 1600 bpi, scd mode, 2000 wds per rec., 12 MX per record, eofs between units.
(b) Input buffer—2000 mb0.
(c) Input buffer for mini XMs—4000 mb0.
2. Output:
(a) to small disk from 0–536 mb1.

HALT LIST

| Halt Location | Reason for Halt | Recovery Procedure |
|---|---|---|
| 247 | bad record/offline | check drives |
| 252 | retry failure | press continue |
| 465 | end of processing | |
| 646 | DF32 retry failure | |
| 755,1263 | Buffer overflow; over 30,000 frames | abort |
| 1147 | Eof on writing on disk | abort |
| 1152 | record # exceeded on outputing from DF32 | abort |
| 1236 | Block overflow | abort |
| 1304 | unit # exceeded | abort |
| 1534 | DD14 error | abort |

D. Retrieval Processing

D1. In General

This portion of the exemplary embodiment is generally depicted in FIG. 63. In terms of programming, it comprises Program No. 6. It is the portion of the system which searches and retrieves the information stored on disk. The user accomplishes this function by entering his query through the CRT keyboard into Program #6, which searches the retrieval file portion of the Diva disk to find where the query matches the disk retrieval file information. The relevant data records for these matches are then retrieved from the ASCII portion of the disk and subsequently displayed to the user via the CRT screen.

D2. Detailed Description of Program No. 6

There are two types of searches available in the system via this program. The first is a selective search. In this case, the user must specify the first letter of the "finding name", and only that segment *1 of the alpha grouping specified is searched. Otherwise, the user can search all 16 groupings (all portions) by eliminating this one word field. This is called a general search. The "finding name" is defined as the first word (Field 1) of a listing in the alphabetical telephone directory. Note that the first character (and also the second character in certain cases) of the "finding name" is the one which defines the grouping (and segment thereof) to which the listing queried will belong. Note that the listings are processed in an alpha-numeric sequence thereafter excepting that the listings and captions are not totally merged (one file merely follows the other) within a segment.

*1. Segment refers to one alphabetic segment within a grouping. Note that some alphabetic segments stand alone within the grouping (eg. "G") whereas others are combined (eg. "Z", "I", "P").

The program allows the user to enter his query in fielded format. The first field searches the first word of the "finding name" and if omitted causes the program to search the entire data base rather than one segment for any matches to subsequent information entered in the query. The second field, called "subsequent words" searches the rest of the finding name plus titles. The third field, called "address" searches the designation and address information.

The functional sequence of control can be summarized as follows:

I. User enters query through CRT

A. Fields

1. Finding name—7 characters max., one word only
2. Subsequent words and titles—6 characters max., no limit on words
3. Designation and Address—4 characters max., no limit on words B. Control Characters 1. space—field separator
2. comma—word separator
3. carriage return—query terminator for business and professional listings
4. line feed—query terminator for residential and professional listings
5. semi colon—query delector
6. period—screen hits roll
7. asterisk—abort signal II. Program No. 6 enters search and retrieval phases A. The characters entered from CRT are then translated to pointers for specific retrieval file blocks. The first character is a pointer to the alpha group desired. *1 The first retrieval file segment (upon receipt of the next alphameric character from the CRT) is then brought into core from the Diva disk. All other retrieval file segments are ANDED (boolean operation) with the result from the previous operation. This produces a resultant retrieval file.

*1. The first character received from the CRT in a search is a director to the (a) proper disk pack, (b) sector within a pack, and (c) one of 4 segments (groups) within a sector, ie., it is a pointer to one of the 16 alpha groupings.

B. This resultant of the ANDING process is an indicator for each listing of its relation to the user's query. If a bit is "off", no match is indicated. If a bit is "on", a match with the user's query is indicated. Since the bits are sequential (with relation to the listings) in all retrieval file segments, the position of the "on" bits of the resultant retrieval file are directly proportional to the position of the ASCII data records they represent. Thus, the "hits" shown on the screen are those ASCII records represented by the "on" bits in the resultant retrieval file. For ease of reference, each retrieval file segment will hereafter be termed as an "XM".

As an example of the general processing involved, consider the following query:

| Smith | John, H | 4, Park | (Return) |
|---|---|---|---|

Upon receipt of each letter of this query, Program No. 6 will undertake the following actions:

S—indicate split letter segment
M—set disk parameters for alpha grouping #13 (SA-SN). bring XM block 12 into core (this becomes resultant).
I—bring XM block 34 into core; and with resultant and result becomes resultant.
T—same (XM 71)
H—same (XM 85)
J—same (XM 165)
O—same (XM 196)
H—same (XM 215)
N—same (XM 247)
H—same (XM 163)
4—same (XM 420)
P—same (XM 327)
A—same (XM 338)
R—same (XM 381)
K—same (XM 400)
Return—same (XM 457)—business professional filter Program No. 6 is shown in block form at FIGS. 64-68 with some of the subroutines used therein detailed in FIGS. 69-84. An explicit listing of the assembly level source program language for Program No. 6 and all related subroutines follows. It will be noted that the main program is shown as comprising sections I-IX in FIGS. 64-68. These program sections correspond to specific listing statements:

| Section | Instruction Statements | |
|---|---|---|
| I | 0200-0202 | |
| II | 0203-0210 | |
| III | 0211-0222 | |
| IV | 0223-0226 | |
| V | 0400-0473 | |
| VI | 0227-0315 | |
| VII | 0316-0345 | |
| VIII | 1317-1354 | |
| IX | 0600-0657; | 0736-0767 |

These nine program sections are functionally described below as an introduction to the explicit program listing:

I. Program Initialization

A. XPRINT: print the form on the CRT. The form consists of dashes denoting where the query fields should be entered.

II. Start of Query

A. "6030" clears the keyborad flag if set

B. "FPOS" is set to indicate the program is processing the first field (FPOS=0)

C. "CHAR" is set to indicate that no characters of the query have been processed D. A buffer is set to store XM coordinates for each query character if the whole disk is to be searched E. Note that because the field is already set, the new field processing is ignored at this time III. New Field A. Only three fields are allowed, if the fourth is attempted, the program aborts the query processing and reinitializes itself.

B. "CHAR" is queried to see if any query characters have been entered. If not, the program (upon the omission of any characters in the first field) determines that the search will cover the entire file (all 16 segments). If the entire file is to be searched, a resultant XM and parameters which are pertinent there to are stored for each of the 16 segments. "XSTBUF" is an initialization routine which stores one XM (with all bits set) and its initialized parameters for each segment. For a brief explanation of these parameters; "XMBIT" is the bit which is currently being tested for a hit, "XMLOC" is the location which contains the bit currently being tested for a hit, and rather than processing the entire XM for bits during the anding and searching cycles, "XMSTRT" points to the first "on" bit of the resultant, so that processing can start at this location.

C. "FPOS" is set to indicate the new field (FPOS=1 for second field; FPOS=2 for the third)

IV. New Word—At the beginning of a word, certain items must be reinitialized.

A. "CPOS"—used to denote character position within the word of the current character being processed. Initially set to 0 for the first character.

B. "SADD"—set to the starting XM block # for the current character position within a field. See FIG. 26.

C. "STRG"—When the first character of the finding name field is one which is split among more than one XM group (eg. "S"), "STRG" is set so that the next character can determine the XMs group to search.

D. An exit is made to "XASCIF" to get the next character from the CRT.

V. "XASCIF"

A. "KYBD" subroutine gets a character from the CRT keyboard and stores it in MQ register.

B. Program control is routed per MQ contents. For routing, see the flow chart on this section, and its accompanying legend.

VI. Current Character is an Upper Case Alpha

A. If "CPOS" and "FPOS" combined are equal to zero, this indicates that the current character is the first character of the finding name and
   1. "GET1" selects the proper XM group and its disk parameters: drive, sector, and starting cylinder.
   2. "STRG" is set if first characters denotes split group, so that proper disk parameters can be determined upon encountering the next character.
   3. Parameters for the query are initialized (See new field section for description of "XMBIT", "XMLOC" and "XMSTRT").
   4. "CHAR" is set to indicate that the search will include only one segment.

B. "STRG" is queried to see if disk parameters must be set on current character (when previous character could not set parameters because of segment split). And if so,
   1. "STRG" is rezeroed for remainder of query.
   2. "XGET2" sets the proper disk parameters with current character determining the proper XM group to be searched.

C. "LIMST" list tells how many characters are allowed to be processed in each word in field. (Actually it is a list composed of the last valid character position of the field). Field 1—7 characters. Field 2—6 characters Field 3—4 characters. If "CPOS" is greater than that allowed in the "LIMST" list for that field, character processing is ignored for the current character.

D. "FLDST" list is a list of the starting XM block numbers for each field (see FIG. 26 for block numbers). Field 1—Block 0. Field 2—Block 156 (234 octal). Field 3—Block 312 (470 octal).

E. the actual XM block to be processed is determined and put in "STMP". It is determined by adding the starting block of the current field (from "FLDST" listpointed to by "STMP" current contents), the starting block within the field of the current character position (in "SADD") and the stripped character (MQ register contents stripped of its ASCII).

F. "SADD" is then reset for the next character position.

G. "CHAR" is queried to determine whether all segments are to be processed for the current character; and if so, the XM block number to be retrieved is stored in a buffer via auto-index register "R17" (disk processing done at end of query) and immediate processing is bypassed.

H. Finally the block number (stored in "STMP" is divided by 20 (decimal)) and this result is added to the starting cylinder for this segment to determine the proper disk record to process. "XDOIT" is the ANDING subroutine which processes this disk record. Method: the records are read into core and ANDED together, the resultant containing only those bits which refer to matches in the query.

I. "CPOS" is icremented to the next character position. "CHAR" information is transferred to "ECHO" for further reference.

J. Program control goes to part IV to get next character from CRT.

VII. Current Character is a Number

A. "FPOS" is queried to see if the current field is the third (FPOS=2)—if not an error condition exists and a "no hits condition" is rendered to the user on the CRT screen.

B. Again "CPOS" is tested to see whether the character position is greater than the 4th (OPOS 3), and if so, processing is ignored.

C. The block number formulation is similar to that of the alphabetics except that the character position is multiplied by 10 to substitute for the "SADD" element and the starting block number for the field is set to 416 (640 octal)—see "MX-XM formats".

D. Remainder of processing is same as for alphabetics.

VIII. End of query

A. The last key selected in query determines type of search. Actually it allows one more ANDING process to occur (either the business—professional block or the residential—professional block noted in "BPRADD".

B. "ECHO" is tested to see if all segments are being searched. If so,
   1. This last block # is stored in the XM block buffer and the buffer is terminated (0).
   2. "DO16" processes all XM blocks whose numbers are stored in buffer.
   3. "XGET16" brings the first segment's resultant and parameters into core. "UNIT" is set to donote first segment.
   4. Program control is given to "XHIT".

C. If only one sigment is being processed, the last block is ANDED into the resultant via "XDOIT" and program control is given to "XHIT".

IX. Translate "on" bits in query's resultant XM into query answers (original listings) on CRT screen.

A. "XPRINT" at "MOVCUR" moves the cursor to the answer section of the CRT screen.

B. "HITCNT" is set to allow a maximum of 18 hits to be displayed on the CRT screen.

C. The current bit being processed in the resultant is stored in the MQ register.

D. Program control is transferred to "H32" to continue scanning for "on" bits.

E. "H20"—Scan resultant (computer) words for "on" bits.
   1. "XMLOC" (current resultant location being scanned) is tested for "on" bits, and if any are encountered program control is given to "H30".
   2. "XMLOC" is queried to see if the scanning process has been completed (if "XMLOC" is at beginning of resultant—note scanning done backwards) and if so, program control is given to "ENDH".
   3. "XMLOC" is reset back one location to scan next location; program control is then given to "H21".

F. "H30"—The "on" bits are determined and processed.
   1. Going from right to left, each bit is tested and if on program control is given to "H40", which processes the "on" bit.
   2. After all bits are checked, program control is returned to "H22" to continue bit scan.

G. "H40"—Proper listing which matches "on" bit is written onto CRT screen.
   1. "DOHIT"—selects relative ASCII record per the "on" bit in resultant and "XPHIT" prints this record on the CRT screen.
   2. "HITCNT" is queried to see if CRT screen is full (18 listings printed), and if not program control is returned to "H32" to continue processing any "on" bits left in resultant.
   3. If screen is full, the current bit being processed is returned to storage in "XMBIT"; "HITCNT" is queried to see if any hits were detected in resultant and if not—"no hits indication" is presented to user on CRT screen; the cursor is returned to the start of the query on the CRT screen; program control is returned to "XST2" to process a new query or possibly more hits if selected by user.

H. "ENDH"—end of resultant processing.

1. "ECHO" is queried to see whether more than one segment is being processed, and if not—program control is given to "H41" to terminate processing.
2. After four segments' resultants have been processed it is necessary to change the disk sector and drive parameters, otherwise "XGET16" will bring the resultant (and parameters) specified in call by "UNIT" into core. Program control is returned to "HIT14".
3. If when specifying the new drive-sector, it is determined that all segments have already been processed, program control is given to "H41" to terminate processing.

Some of the subroutine not explicitly shown in FIGS. 69–84 are briefly summarized below:

KYBD: gets character from CRT keyboard and stores it in MQ register.

PRT: prints characger currently residing in accumulator onto CRT screen.

PRINT: prints all characters in list specified in the call format.

format:
JMS PRINT
(location of print characters list)
NOTE:
Control resumes here
list is terminated by ϕ.

DIVIDE: general purpose single precision division subroutine.

format:
JMS I XDIVID
(dividend)
(divisor)
remainder returned here
control resumes here with quotient in accumulator ZMX: extraneous subroutine which is not used in program.

DISK: general purpose subroutine which drives the disk hardware to perform an operation (specified in call).

format:
JMS I XDISK
[memory bank (bits 0–5) & drive (bits 6–11)]
[cylinder]
[sector (bits 0–5) and head (bits 6–11)]
[command]
control resumes here The CRT keyboard is utilized as follows:

UCA—upper case alpha; query character key

#—number; query character key

LF—line feed; key to indicate end of query and specify residential-professional type search CR—carriage return; key to indicate end of query and specify business-professional type search SP—space; key to indicate new field

*—asterisk; key to indicate abort situation

,—comma; key to indicate end of word

.—period; key to indicate screen roll (more hits)

;—semi-colon; key to indicate deletion of query other—any other characters entered are not penetrable into the system (thus a question mark-backspace is printed for user).

Program No. 6

```
                BSW=7002
                MQL=7421
                MQA=7501
                SWP=7521
                CDF0=6201
                CDF1=6211
                CDF2=6221
                DMCR=6517
                DCBRH=6501
                DCBRL=6500
                DSSRH=6503
                DSSRL=6502
                DESR0=6511
                DESR1=6515
                DWCR=6516
                DDMAR=6514
                DCSR=6512
                DAIRL=6504
                DAIRH=6505
                DUSRL=6506
                DUSRH=6507
                GTF=6004
                RTF=6005
                RMF=6244
                RIB=6234
                SRQ=6003


                FIXTAB


                /ADDRESS TABLE: XM DEMO 2

                         *7
0007   0000     DRIVER,  0


                /DISSLY PROGRAM LABEL

                         *0
0000   0304              304;
0001   0311     311;
0002   0323     323;
0003   0323     323;
0004   0314     314;
0005   0331     331;
0006   0330     330;
0007   0315     315

                         *10
0010   0000     R10,     0
0011   0000     R11,     0
0012   0000     R12,     0
0013   0000     R13,     0
0014   0000     R14,     0
0015   0000     R15,     0
0016   0000     R16,     0
0017   0000     R17,     0
```

```
0020  3052  WC,     3052      /WORD COUNT
0021  3052  CA,     -4726     /CURRENT ADDRESS (END OF BUFFER)
0022  0000  XMLOC,  0         /CURRENT HIT LOC
0023  0000  XMBIT,  0         /CURRENT HIT BIT
0024  0000  XMSTRT, 0         /START OF XM BUFFER
0025  0000  XCYL,   0         /STARTING CYLINDER OF GROUP

0026  0000  HITCNT, 0
0027  0000  DSEC,   0
0030  0000  UNIT,   0
0031  0000  CHAR,   0
0032  0000  ECHO,   0
0033  0000  BPRADD, 0

0034  0600  XHIT,   HIT
0035  2341  XGET16, GET16
0036  2314  XPUT16, PUT16
0037  0510  XPRINT, PRINT
0040  0474  XKYBD,  KYBD
0041  1200  XDIVID, DIVIDE
0042  1415  XDISK,  DISK
0043  1275  XDOIT,  DOIT
0044  0203  XST2,   QRY
0045  2000  XPHIT,  PHIT
0046  0343  XNONE,  NERR
0047  0710  XC234,  710
0050  3074  XC3074, 3074
0051  1400  XC1400, 1400
0052  7774  XCM4,   -4
0053  0062  XC62,   62
0054  0034  X34,    34
0055  3052  L3052,  3052
0056  3053  L3053,  3053
0057  3054  L3054,  3054
0060  3055  L3055,  3055
0061  3000  STBUF,  CHARBF

            PAGE

            /MAINLINE:      NYT RETRIEVAL

0200  7300  ST1,    CLA CLL /INITIALIZE
0201  4437          JMS I XPRINT
0202  2600          FORM

0203  6030  QRY,    6030      /NEW QUERY
0204  3355          DCA FPOS
0205  3031          DCA CHAR
0206  1061          TAD STBUF
0207  3017          DCA R17
0210  5223          JMP WRD

0211  1355  FLD,    TAD FPOS          /NEW FIELD
0212  1352          TAD SCM2
0213  7650          SNA CLA /FIELD LIM OVERRUN?
0214  5200          JMP ST1           /YES, ABORT SEARCH IF TOO MANY FIELB
0215  1355          TAD FPOS
0216  1031          TAD CHAR
0217  7650          SNA CLA
0220  4760          JMS I XSTBUF      /1ST FLD OMITTED - SEARCH ALL
0221  2355  FLDRTN, ISZ FPOS
0222  7000          NOP

0223  3354  WRD,    DCA CPOS          /NEW WORD
0224  3356          DCA SADD
0225  3357          DCA STRG

0226  5761  SNX1,   JMP I XASCIF      /NEW CHAR - FILTER
```

```
                        /RETURNS FROM ASCIF

0227    1354    UCA,    TAD CPOS        /UPPER CASE CHAR
0230    1355            TAD FPOS
0231    7650            SNA CLA
0232    5303            JMP SFST        /1ST CHR OF FINDING FIELD
0233    1357            TAD STRG
0234    7640            SZA CLA
0235    5300            JMP SSEC        /2ND CHR OF FINDING FLD ON CHR SPLIT
0236    1355    SNXC,   TAD FPOS
0237    1364            TAD LIMST
0240    3264            DCA STMP
0241    1664            TAD I STMP
0242    1354            TAD CPOS
0243    7740            SMA SZA CLA
0244    5271            JMP SNXT2       /FIELD LIMIT OVERFLOW
0245    1355            TAD FPOS
0246    1370            TAD FLDST
0247    3264            DCA STMP
0250    7501            MQA     /BLK=STRIP CHR X POS + FLD START
0251    1353            TAD SCM301
0252    1356            TAD SADD
0253    1664            TAD I STMP
0254    3264    NXU,    DCA STMP
0255    1356            TAD SADD
0256    1350            TAD SC32
0257    3356            DCA SADD
0260    1031            TAD CHAR
0261    7650            SNA CLA
0262    5275            JMP PR16        /1ST FLD OMITTED - PROCESS ALL
0263    4441            JMS I XDIVID
0264    0000    STMP,   0
0265    0024            24
0266    0000            0       /REMAINDER:     HEAD
0267    1025            TAD XCYL        /CYL + CYL STRT
0270    4443            JMS I XDOIT     /ANDING PROCESS
0271    2354    SNXT2,  ISZ CPOS
0272    1031            TAD CHAR
0273    3032            DCA ECHO
0274    5226            JMP SNX1

0275    1264    PR16,   TAD STMP
0276    3417            DCA I R17
0277    5271            JMP SNXT2

0300    3357    SSEC,   DCA STRG
0301    4763            JMS I XGET2     /GET DISK PRMS & CHR XM BUF
0302    5236            JMP SNXC

0303    4762    SFST,   JMS I XGET1     /GET DISK PRMS & CHR XM BUF
0304    2357            ISZ STRG        /RETURN IF B,C,M,S (SPLIT CHRS)
0305    7330            CLA CLL CML RAR
0306    3023            DCA XMBIT
0307    3022            DCA XMLOC
0310    1351            TAD SC3074
0311    3024            DCA XMSTRT
0312    4437            JMS I XPRINT
0313    2717            LET1
0314    2031            ISZ CHAR        /INDICATE 1ST FLD PRESENT
0315    5271            JMP SNXT2

0316    1355    NUM,    TAD FPOS        /NUMBER RETURN
0317    1352            TAD SCM2
0320    7640            SZA CLA /ADDRESS FIELD?
0321    5343            JMP NERR        /NO - ERROR
0322    1354            TAD CPOS
0323    1367            TAD LIMST+3
0324    7740            SMA SZA CLA
0325    5271            JMP SNXT2       /FIELD LIM OVERFLOW
```

```
0326  1354           TAD CPOS
0327  7106           CLL RTL
0330  7004           RAL
0331  3264           DCA STMP
0332  1354           TAD CPOS
0333  7104           CLL RAL
0334  1264           TAD STMP
0335  1347           TAD SC640
0336  3264           DCA STMP
0337  7501           MQA
0340  1346           TAD SCM260
0341  1864           TAD STMP
0342  5254           JMP NXU

0343  4437  NERR,    JMS I XPRINT
0344  2701           NOHITS
0345  5203           JMP QRY

0346  7520  SCM260,  -260
0347  0640  SC640,   640
0350  0032  SC32,    32
0351  3074  SC3074,  3074
0352  7776  SCM2,    -2
0353  7477  SCM301,  -301

0354  0000  CPOS,    0
0355  0000  FPOS,    0
0356  0000  SADD,    0
0357  0000  STRG,    0

0360  2200  XSTBUF,  SETBUF
0361  0400  XASCIF,  ASCIF
0362  1000  XGET1,   GET1
0363  1027  XGET2,   GET2

0364  0365  LIMST,   .+1
0365  7772           -6
0366  7773           -5
0367  7775           -3
0370  0371  FLDST,   .+1
0371  0000           0
0372  0234           234
0373  0470           470

            PAGE

0400  4274  ASCIF,   JMS KYBD        /GET CHAR
0401  7501           MQA
0402  1325           TAD ACM260
0403  7510           SPA
0404  5216           JMP CKR
0405  1326           TAD ACM12
0406  7510           SPA
0407  5266           JMP ANUM        /260<=X<=271:    #
0410  1327           TAD ACM7
0411  7510           SPA
0412  5216           JMP CKR
0413  1330           TAD ACM32
0414  7510           SPA
0415  5271           JMP AUCA        /301<=X<=332:    UCA

0416  7701  CKR,     CLA MQA
0417  1331           TAD ACM212
0420  7450           SNA
0421  5744           JMP I XRP       /212:   LF (RES-PROF SEARCH)
0422  1332           TAD ACM3
0423  7450           SNA
0424  5745           JMP I XBP       /215:   CR (BUS-PROF SEARCH)
0425  1333           TAD ACM23
```

```
0426  7450          SNA
0427  5251          JMP ATAB        /240:   SP (END OF FIELD)
0430  1326          TAD ACM12
0431  7450          SNA
0432  5754          JMP I XDMON     /252:   * (RETURN TO MONITOR)
0433  1334          TAD ACM2
0434  7450          SNA
0435  5254          JMP ACOM        /254:   , (END OF WORD)
0436  1334          TAD ACM2
0437  7450          SNA
0440  5434          JMP I XHIT      /256:   . (ROLL SCREEN)
0441  1335          TAD ACM15
0442  7650          SNA CLA
0443  5257          JMP ADEL        /273:   ; (DELETE QUERY)
0444  1336          TAD AC277
0445  4302          JMS PRT /FOR OTHER CHRS PRINT:  ? BKSP
0446  1337          TAD AC210
0447  4302          JMS PRT
0450  5200          JMP ASCIF

0451  1340  ATAB,   TAD AC211
0452  4302          JMS PRT
0453  5746          JMP I XFLD

0454  7701  ACOM,   CLA MQA
0455  4302          JMS PRT
0456  5750          JMP I XWRD

0457  1341  ADEL,   TAD AC215
0460  4302          JMS PRT
0461  1342          TAD AC243
0462  4302          JMS PRT
0463  1343          TAD AC253
0464  4302          JMS PRT
0465  5751          JMP I XQRY

0466  7701  ANUM,   CLA MQA
0467  4302          JMS PRT
0470  5753          JMP I XNUM

0471  7701  AUCA,   CLA MQA
0472  4302          JMS PRT
0473  5752          JMP I XUCA

0474  0000  KYBD,   0
0475  6331          6331
0476  5275          JMP .-1
0477  6336          6336
0500  7421          MQL
0501  5674          JMP I KYBD

0502  0000  PRT,    0
0503  6346          6346
0504  6341          6341
0505  5304          JMP .-1
0506  7300          CLA CLL
0507  5702          JMP I PRT

0510  0000  PRINT,  0
0511  7240          CLA CMA
0512  1710          TAD I PRINT
0513  2310          ISZ PRINT
0514  3011          DCA R11
0515  1411  NXZPR,  TAD I R11
0516  7450          SNA             /END?
0517  5710          JMP I PRINT     /YES
0520  6346          6346
0521  6341          6341
0522  5321          JMP .-1
```

```
0523  7300              CLA CLL
0524  5315              JMP NXZPR


0525  7520  ACM260,  -260
0526  7766  ACM12,   -12
0527  7771  ACM7,    -7
0530  7746  ACM32,   -32
0531  7566  ACM212,  -212
0532  7775  ACM3,    -3
0533  7755  ACM23,   -23
0534  7776  ACM2,    -2
0535  7763  ACM15,   -15
0536  0277  AC277,   277
0537  0210  AC210,   210
0540  0211  AC211,   211
0541  0215  AC215,   215
0542  0243  AC243,   243
0543  0253  AC253,   253

0544  1320  XRP,     RP
0545  1317  XBP,     BP
0546  0211  XFLD,    FLD
0547  0200  XST1,    ST1
0550  0223  XWRD,    WRD
0551  0203  XQRY,    QRY
0552  0227  XUCA,    UCA
0553  0316  XNUM,    NUM
0554  0200  XDMON,   200

            PAGE


0600  4437  HIT,     JMS I XPRINT
0601  2674           MOVCUR              /MOVE CURSOR TO HITS
0602  1373           TAD HCM22           /SET UP FOR 18 HITS
0603  3026           DCA HITCNT
0604  1023           TAD XMBIT
0605  7421           MQL
0606  5233           JMP H32

0607  6211  H20,     CDF1      /FIND HIT
0610  1422  H21,     TAD I XMLOC
0611  7440           SZA       /HIT?
0612  5224           JMP H30 /YES
0613  1022  H22,     TAD XMLOC
0614  7041           CIA
0615  1024           TAD XMSTRT
0616  7650           SNA CLA /DONE?
0617  5336           JMP ENDH            /YES
0620  7240           CLA CMA
0621  1022           TAD XMLOC
0622  3022           DCA XMLOC
0623  5210           JMP H21
0624  3374  H30,     DCA HHIT            /FIND HIT BIT
0625  7324           CLA CLL CML RAL /SET BIT 11
0626  7421  H31,     MQL
0627  7501           MQA
0630  0374           AND HHIT
0631  7640           SZA CLA /THIS BIT?
0632  5241           JMP H40 /YES
0633  7501  H32,     MQA
0634  7104           CLL RAL
0635  7420           SNL       /ALL BITS DONE?
0636  5226           JMP H31 /NO
0637  6211           CDF1
0640  5213           JMP H22

0641  6201  H40,     CDF0      /PROCESS HIT
```

```
0642 4260        JMS DOHIT        /PER XMLOC & MQ BIT
0643 2026        ISZ HITCNT       /ALL HITS DONE?
0644 5233        JMP H32 /NO
0645 6201 H41,   CDF0
0646 7501        MQA
0647 3023        DCA XMBIT
0650 1026        TAD HITCNT
0651 7041        CIA
0652 1373        TAD HCM22
0653 7650        SNA CLA
0654 5446        JMP I XNONE      /NO HITS
0655 4437        JMS I XPRINT
0656 2715        CURHOM
0657 5444        JMP I XST2

0660 0000 DOHIT, 0
0661 1022        TAD XMLOC
0662 1372        TAD HM3074
0663 3265        DCA HTMP
0664 4441        JMS I XDIVID     / POS/5 = BLK + X
0665 0000 HTMP,  0
0666 0005        5
0667 0000 HX,    0       /REMAINDER
0670 3272        DCA HBLK
0671 4441        JMS I XDIVID     / BLK/20 = CYL + HED
0672 0000 HBLK,  0
0673 0024        24
0674 0000        0       /REMAINDER
0675 1025        TAD XCYL         /CYL + CYL STRT
0676 1371        TAD HCM31
0677 3305        DCA HCYL
0700 1274        TAD HBLK+2
0701 1027        TAD DSEC
0702 3306        DCA HHED
0703 4442        JMS I XDISK      /INPUT DATA INTO MB2
0704 0200        200
0705 0000 HCYL,  0
0706 0000 HHED,  0
0707 3400        3400
0710 3265        DCA HTMP
0711 7501        MQA     /PUT BIT IN DIGITAL FORMAT
0712 7110        CLL RAR
0713 7430        SZL
0714 5317        JMP .+3
0715 2265        ISZ HTMP
0716 5312        JMP .-4
0717 7300        CLA CLL
0720 1265        TAD HTMP
0721 1370        TAD HCM13
0722 7041        CIA
0723 3265        DCA HTMP
0724 1267        TAD HX  / 12X + BIT = REC
0725 7106        CLL RTL
0726 7004        RAL
0727 3272        DCA HBLK
0730 1267        TAD HX
0731 7106        CLL RTL
0732 1272        TAD HBLK
0733 1265        TAD HTMP
0734 4445        JMS I XPHIT      /PRINT HIT (REC # IN AC)
0735 5660        JMP I DOHIT

0736 6201 ENDH,  CDF0
0737 1032        TAD ECHO
0740 7640        SZA CLA          /MORE THAN ONE SEGMENT?
0741 5245        JMP H41          /NO
0742 1030        TAD UNIT
0743 1052        TAD XCM4
0744 7650        SNA CLA          /DONE 4 UNITS?
```

```
0745  5354           JMP ENDH20      /YES - CHANGE DRIVE-SECTOR IF MORE
0746  2030  ENDH10,  ISZ UNIT
0747  1030           TAD UNIT
0750  3352           DCA .+2
0751  4435           JMS I XGET16    /GET NEXT RES; PRMS
0752  0000           0
0753  5204           JMP HIT+4
0754  1027  ENDH20,  TAD DSEC
0755  1007           TAD DRIVER
0756  7450           SNA
0757  5245           JMP H41         /ALL 16 SEGMENTS DONE
0760  7110           CLL RAR         /RESET SECTOR-DRIVE:
0761  7630           SZL CLA         /1400-1 -->     1400-0
0762  5365           JMP ENDH30      /1400-0 -->     0-1
0763  3027           DCA DSEC        /0-1    -->     0-0
0764  7201           CLA IAC
0765  3007  ENDH30,  DCA DRIVER
0766  3030           DCA UNIT
0767  5346           JMP ENDH10

0770  7765  HCM13,   -13
0771  7747  HCM31,   -31
0772  4704  HM3074,  -3074
0773  7756  HCM22,   -22
0774  0000  HHIT,    0

            PAGE

1000  0000  GET1,    0
1001  3327           DCA GCT
1002  7501           MQA
1003  1336           TAD GCM302
1004  7450           SNA
1005  5222           JMP G11 /B
1006  2327           ISZ GCT
1007  1337           TAD GCM1
1010  7450           SNA
1011  5222           JMP G11 /C
1012  2327           ISZ GCT
1013  1340           TAD GCM12
1014  7450           SNA
1015  5222           JMP G11 /M
1016  2327           ISZ GCT
1017  1341           TAD GCM6
1020  7640           SZA CLA
1021  2200           ISZ GET1         /REG CHR

1022  7501  G11,     MQA
1023  1342           TAD GCM301
1024  3251           DCA GCHR
1025  4247           JMS GSET
1026  5600           JMP I GET1

1027  0000  GET2,    0
1030  1327           TAD GCT
1031  1350           TAD GTAB1
1032  3347           DCA GSAVE
1033  7501           MQA
1034  1747           TAD I GSAVE
1035  7700           SMA CLA
1036  5242           JMP GRET2        /2ND CHR AFTER BREAK
1037  5627           JMP I GET2       /2ND CHR BEFORE BREAK
1040  7000           NOP
1041  7000           NOP
1042  1344  GRET2,   TAD GC32
1043  1327           TAD GCT
1044  3251  GRET3,   DCA GCHR
1045  4247           JMS GSET
```

```
1046  5627            JMP I GET2

1047  0000  GSET,     0
1050  4270            JMS ZXM          /SET UP XM BUF
1051  0000  GCHR,     0
1052  1251            TAD GCHR
1053  1346            TAD GAONE
1054  3251            DCA GCHR
1055  1651            TAD I GCHR       /4XXX:  DRIVE
1056  7710            SPA CLA
1057  7201            CLA IAC
1060  3007            DCA DRIVER
1061  1651            TAD I GCHR       /14XX:  SECTOR
1062  0343            AND GC1400
1063  3027            DCA DSEC
1064  1651            TAD I GCHR       /X377:  STARTING CYLINDER
1065  0345            AND GC377
1066  3025            DCA XCYL
1067  5647            JMP I GSET

            /ZXM,     ZEROES ALL IRRELEVANT AREAS OF XM
            /         SETS REST TO 1'S
            /CALL:    JMS I XZM
            /         CHAR (0-35)

1070  0000  ZXM,      0
1071  1670            TAD I ZXM
1072  1330            TAD LBND
1073  3332            DCA ZLLIM
1074  1670            TAD I ZXM
1075  1331            TAD UBND
1076  3333            DCA ZULIM
1077  2270            ISZ ZXM
1100  1732            TAD I ZLLIM
1101  3332            DCA ZLLIM
1102  1733            TAD I ZULIM
1103  3333            DCA ZULIM
1104  1334            TAD ZC3074
1105  3335            DCA ZX
1106  6211  ZNX1,     CDF1
1107  3735            DCA I ZX
1110  6201            CDF0
1111  2335            ISZ ZX
1112  5306            JMP ZNX1
1113  5315            JMP .+2
1114  2332  ZNX2,     ISZ ZLLIM
1115  7240            CLA CMA
1116  6211            CDF1
1117  3732            DCA I ZLLIM
1120  6201            CDF0
1121  1332            TAD ZLLIM
1122  7041            CIA
1123  1333            TAD ZULIM
1124  7640            SZA CLA
1125  5314            JMP ZNX2
1126  5670            JMP I ZXM

1127  0000  GCT,      0
1130  2436  LBND,     LBOUND
1131  2474  UBND,     UBOUND
1132  0000  ZLLIM,    0
1133  0000  ZULIM,    0
1134  3074  ZC3074,   3074
1135  0000  ZX,       0
1136  7476  GCM302,   -302
1137  7777  GCM1,     -1
1140  7766  GCM12,    -12
1141  7772  GCM6,     -6
1142  7477  GCM301,   -301
```

```
1143  1400  GC1400, 1400
1144  0032  GC32,   32
1145  0377  GC377,  377
1146  2400  GAONE,  AONE
1147  0000  GSAVE,  0

1150  1151  GTAB1,  .+1
1151  7456          -322
1152  7456          -322
1153  7467          -311
1154  7461          -317

            PAGE


            /XDIVID SINGLE PRECISION DIVIDE SUBROUTINE
            /       BOUNDS OF DIVIDEND: 0-7777
            /       BOUNDS OF DIVISOR: 1-3777
            /CALL   JMS I XDIVID
            /       (DIVIDEND)
            /       (DIVISOR)
            /       REMAINDER RETURNED HERE
            /       CONTROL RESUMES HERE WITH QUOTIENT IN AC
1200  0000  DIVIDE, 0
1201  7300          CLA CLL
1202  3253          DCA HDIV
1203  1600          TAD I DIVIDE
1204  2200          ISZ DIVIDE
1205  3254          DCA LDIV
1206  1600          TAD I DIVIDE
1207  2200          ISZ DIVIDE
1210  7041          CIA
1211  3255          DCA DIV
1212  1253          TAD HDIV
1213  7640          SZA CLA
1214  5235          JMP DV2
1215  1254          TAD LDIV
1216  1255          TAD DIV
1217  7620          SNL CLA /DIV<DIVISOR?
1220  5247          JMP DV4 /YES
1221  7300          CLA CLL
1222  1256          TAD DCM15
1223  3257          DCA DIVCT
1224  5235          JMP DV2
1225  1253  DV3,    TAD HDIV
1226  7004          RAL
1227  3253          DCA HDIV
1230  1253          TAD HDIV
1231  1255          TAD DIV
1232  7430          SZL
1233  3253          DCA HDIV
1234  7200          CLA
1235  1254  DV2,    TAD LDIV
1236  7004          RAL
1237  3254          DCA LDIV
1240  2257          ISZ DIVCT
1241  5225          JMP DV3
1242  1253          TAD HDIV
1243  3600          DCA I DIVIDE
1244  2200          ISZ DIVIDE
1245  1254          TAD LDIV
1246  5600          JMP I DIVIDE
1247  1254  DV4,    TAD LDIV        /QUOTIENT=0, REMAINDER
1250  3600          DCA I DIVIDE    /=DIVIDEND
1251  2200          ISZ DIVIDE
1252  5600          JMP I DIVIDE
1253  0000  HDIV,   0
1254  0000  LDIV,   0
```

```
1255  0000  DIV,    0
1256  7763  DCM15,  -15
1257  0000  DIVCT,  0

            /ZEROES MX BUF

1260  0000  ZMX,    0
1261  1273          TAD ZCM400
1262  3274          DCA CT400
1263  7240          CLA CMA
1264  3016          DCA R16
1265  6221          CDF2
1266  3416  NX400,  DCA I R16
1267  2274          ISZ CT400       /DONE?
1270  5266          JMP NX400       /NO
1271  6201          CDF0
1272  5660          JMP I ZMX
1273  7400  ZCM400, -400
1274  0000  CT400,  0

1275  0000  DOIT,   0
1276  3307          DCA CYL10
1277  1275          TAD DOIT
1300  1316          TAD CM3
1301  3315          DCA DTMP10
1302  1715          TAD I DTMP10
1303  1027          TAD DSEC
1304  3310          DCA HED10
1305  4442          JMS I XDISK
1306  0200  MEM10,  200
1307  0000  CYL10,  0
1310  0000  HED10,  0
1311  3400          3400
1312  4714          JMS I XDAND
1313  5675          JMP I DOIT

1314  1600  XDAND,  DANDY
1315  0000  DTMP10, 0
1316  7775  CM3,    -3

            /PROCESS BUSINESS-PROFESSIONAL-RESIDENTIAL SEGMENTS

1317  7201  BP,     CLA IAC         /BUS-PROF
1320  3033  RP,     DCA BPRADD      /RES-PROF
1321  1032          TAD ECHO
1322  7640          SZA CLA
1323  5342          JMP HIT0        /1ST FIELD PRESENT
1324  1033          TAD BPRADD
1325  1047          TAD XC234
1326  3417          DCA I R17
1327  3417          DCA I R17       /IF NO FINDING NAME
1330  4754          JMS I XDO16     /SEARCH ALL SEGMENTS AT END
1331  1051          TAD XC1400
1332  3027          DCA DSEC
1333  7201          CLA IAC
1334  3007          DCA DRIVER
1335  4435          JMS I XGET16
1336  0001          1
1337  7201          CLA IAC
1340  3030          DCA UNIT        /SET TO UNIT 1 & GET HITS
1341  5434          JMP I XHIT
1342  1033  HIT0,   TAD BPRADD
1343  1047          TAD XC234
1344  3346          DCA TMP0
1345  4441          JMS I XDIVID
1346  0000  TMP0,   0
1347  0024          24
1350  0000          0      /HED
1351  1025          TAD XCYL/CYL+CYL STRT
```

```
1352  4443            JMS I XDOIT     /AND SPLIT XM
1353  5434            JMP I XHIT
1354  2253  XDO16,    DO16

            PAGE
1400  0000  DCSET,    0
1401  7300            CLA CLL
1402  1600            TAD I DCSET
1403  2200            ISZ DCSET
1404  6501            DCBRH    /SET COMMAND REGISTER
1405  7300            CLA CLL
1406  1600            TAD I DCSET
1407  2200            ISZ DCSET
1410  7106            CLL RTL
1411  7006            RTL
1412  6500            DCBRL    /WITH OP TO EXECUTE
1413  7300            CLA CLL
1414  5600            JMP I DCSET

            /DISK ROUTINES
            /CALL:    JMS I XDISK
            /         MEMORY BANK     (0-5) & DRIVE (6-11)
            /         CYLINDER
            /         SECTOR (0-5) & HEAD     (6-11)
            /         COMMAND

1415  0000  DISK,     0
1416  7300            CLA CLL
1417  1343            TAD DPRM+3
1420  3337            DCA DFAIL
1421  1615            TAD I DISK      /GET MEMORY BANK & DRIVE
1422  0341            AND DPRM+1
1423  3336            DCA DFIELD
1424  1007            TAD DRIVER
1425  3251            DCA DRIVE
1426  2215            ISZ DISK
1427  1615            TAD I DISK
1430  3254            DCA CYL
1431  2215            ISZ DISK
1432  1615            TAD I DISK
1433  0342            AND DPRM+2
1434  3273            DCA HED
1435  1615            TAD I DISK
1436  7002            BSW
1437  0342            AND DPRM+2
1440  3322            DCA SEC
1441  2215            ISZ DISK
1442  1615            TAD I DISK
1443  3321            DCA COM
1444  2215            ISZ DISK

1445  7305  DRTN,     CLA CLL IAC RAL
1446  6517            DMCR    /MODE=LOAD
1447  4200            JMS DCSET       /LOAD DRIVE #
1450  6000            6000
1451  0000  DRIVE,    0
1452  4200            JMS DCSET       /LOAD CYLINDER #
1453  1000            1000
1454  0000  CYL,      0
1455  4200            JMS DCSET       /SEEK & RESET HEAD
1456  1400            1400
1457  0060            60
1460  7325            CLA CLL CML IAC RAL
1461  6517            DMCR    /MODE=READ
1462  7300            CLL CLA
1463  6503            DSSRH
1464  0340            AND DPRM
1465  7640            SZA CLA /DRIVE READY?
1466  5263            JMP .-3 /NO
```

```
1467  7305            CLA CLL IAC RAL
1470  6517            DMCR    /MODE=LOAD
1471  4200            JMS DCSET       /LOAD HEAD
1472  0000            0
1473  0000  HED,      0
1474  1020            TAD WC  /PROCESS HEADER IMAGE
1475  3347            DCA HEAD+2      /WORD COUNT
1476  1021            TAD CA
1477  3351            DCA HEAD+4      /CURRENT ADDRESS
1500  1254            TAD CYL
1501  3346            DCA HEAD+1      /CYLINDER
1502  1273            TAD HED
1503  7002            BSW
1504  7110            CLL RAR
1505  1322            TAD SEC
1506  3345            DCA HEAD        /ALT, PROTECT, HEAD & SECTOR
1507  1345            TAD HEAD
1510  1346            TAD HEAD+1
1511  1347            TAD HEAD+2
1512  7041            CIA
1513  3350            DCA HEAD+3      /CHECKSUM
1514  1344            TAD HEADER
1515  6514            DDMAR   /SET CA TO HEADER
1516  7300            CLA CLL
1517  6516            DWCR    /SET WC=0
1520  4200            JMS DCSET       /LOAD READ/WRITE
1521  0000  COM,      0
1522  0000  SEC,      0
1523  7330            CLA CLL CML RAR
1524  6505            DAIRH   /ENABLE WRITE (4000
1525  1336            TAD DFIELD      /SET BUSY & MEM FIELD
1526  6512            DCSR
1527  6511            DESR0
1530  5327            JMP .-1
1531  7700            SMA CLA /ANY ERRORS ON DONE?
1532  5615            JMP I DISK      /NO
1533  2337            ISZ DFAIL       /ERRORS
1534  5245            JMP DRTN        /TRY AGAIN
1535  7402            HLT             /RETRY FAILURE

1536  0000  DFIELD,   0
1537  0000  DFAIL,    0
1540  0200  DPRM,     200
1541  7700            7700
1542  0077            77
1543  7770            -10

1544  1545  HEADER,   HEAD
1545  0000  HEAD,     0       /HEAD, SECTOR, ETC.
1546  0000            0       /CYLINDER
1547  0000            0       /WORD COUNT
1550  0000            0       /CHECKSUM
1551  0000            0       /CURRENT ADDRESS

            PAGE

            /AND SUBROUTINE
1600  0000  DANDY,    0
1601  1024            TAD XMSTRT
1602  7450            SNA
1603  5600            JMP I DANDY     /NO HITS ALREADY INDICATED
1604  3217            DCA XMBUF
1605  6211            CDF1    /RESULTANT IN MB1
1606  1617  XM1,      TAD I XMBUF
1607  7440            SZA     /ANY BITS ON?
1610  5220            JMP XM3 /YES
1611  2217  XM2,      ISZ XMBUF       /END?
1612  5206            JMP XM1 /NO
1613  3024            DCA XMSTRT      /YES - INDICATE MISS
```

```
1614  6201           CDF0
1615  5600           JMP I DANDY
1616  0343  XST11,   NERR
1617  0000  XMBUF,   0

1620  6221  XM3,     CDF2
1621  0617           AND I XMBUF
1622  6211           CDF1
1623  7450           SNA      /ANY BITS ON AFTER ANDING?
1624  5231           JMP XM4 /NO
1625  3617           DCA I XMBUF     /REPLACE REWULTANT
1626  1217           TAD XMBUF
1627  3024           DCA XMSTRT      /RESET FIRST BIT POSITION
1630  5240           JMP XM20
1631  3617  XM4,     DCA I XMBUF
1632  5211           JMP XM2

1633  1617  XM10,    TAD I XMBUF
1634  6221           CDF2
1635  0617           AND I XMBUF
1636  6211           CDF1
1637  3617           DCA I XMBUF     /RESTORE RESULTANT
1640  2217  XM20,    ISZ XMBUF       /END?
1641  5233           JMP XM10        /NO
1642  6201           CDF0
1643  5600           JMP I DANDY

            PAGE


            /HITS PROCESSOR FOR SEARCH

2000  0000  PHIT,    0        /ENTER WITH REC #
2001  3321           DCA RECORD
2002  1321           TAD RECORD
2003  7002           BSW
2004  7110           CLL RAR
2005  3322           DCA PTMP10
2006  1321           TAD RECORD
2007  7106           CLL RTL
2010  7004           RAL
2011  1322           TAD PTMP10
2012  1323           TAD RCM1
2013  3015           DCA R15 /DATA LOC
2014  1317           TAD STDATA
2015  3014           DCA R14 /PRT BUF LOC
2016  7240           CLA CMA
2017  3325           DCA PTRIG       /FIRST CHR IN WRD
2020  4237  PNX20,   JMS GETCHR
2021  7450           SNA      /0?
2022  5225           JMP PNX30       /YES - SPECIAL
2023  4257  PRTN2,   JMS PTRANS      /TRANSLATE & STORE
2024  5220           JMP PNX20

2025  4237  PNX30,   JMS GETCHR
2026  7450           SNA      /0?
2027  5233           JMP PNX40       /YES - END OF REC
2030  5300           JMP PESC        /TEST ESCAPE CHRS
2031  3414  PRTN1,   DCA I R14
2032  5220           JMP PNX20

2033  3414  PNX40,   DCA I R14
2034  4437           JMS I XPRINT    /PRINT DATA
2035  3200           PDATA
2036  5600  PEND,    JMP I PHIT

2037  0000  GETCHR,  0
2040  2325           ISZ PTRIG       /WHICH HALF?
2041  5252           JMP GETD2       /2ND
```

```
2042  6221            CDF2
2043  1415            TAD I R15
2044  6201            CDF0
2045  3327            DCA PCHAR
2046  1327            TAD PCHAR
2047  7002            BSW
2050  0326            AND PC77
2051  5637            JMP I GETCHR
2052  7240  GETD2,    CLA CMA
2053  3325            DCA PTRIG
2054  1327            TAD PCHAR
2055  0326            AND PC77
2056  5637            JMP I GETCHR

2057  0000  PTRANS,   0
2060  1331            TAD PCM77
2061  7450            SNA
2062  5275            JMP PSEP        /=77:   SPACE
2063  1332            TAD PC12
2064  7500            SMA
2065  5274            JMP PNUM        />OR=65:          #
2066  1333            TAD PC32
2067  7510            SPA
2070  1334            TAD PC72        /<33: LCA
2071  1335            TAD PC301       />OR=33:          UCA
2072  3414            DCA I R14
2073  5657            JMP I PTRANS
2074  1336  PNUM,     TAD PC20
2075  1337  PSEP,     TAD PC240
2076  3414            DCA I R14
2077  5657            JMP I PTRANS

2100  3322  PESC,     DCA PTMP10
2101  1322            TAD PTMP10
2102  1330            TAD PCM43
2103  7650            SNA CLA         /CRT-ESC?
2104  5310            JMP PESC10      /YES
2105  1322            TAD PTMP10
2106  1324            TAD PC200
2107  5231            JMP PRTN1
2110  4237  PESC10,   JMS GETCHR
2111  7440            SZA             /0?
2112  5223            JMP PRTN2       /NO - PROCESS CHAR
2113  1322            TAD PTMP10
2114  1324            TAD PC200
2115  3414            DCA I R14
2116  5225            JMP PNX30

2117  3177  STDATA,   PDATA-1
2120  0000  PLIST,    0
2121  0000  RECORD,   0
2122  0000  PTMP10,   0
2123  3237  RCM1,     3237
2124  0200  PC200,    200
2125  0000  PTRIG,    0
2126  0077  PC77,     77
2127  0000  PCHAR,    0
2130  7735  PCM43,    -43
2131  7701  PCM77,    -77
2132  0012  PC12,     12
2133  0032  PC32,     32
2134  0072  PC72,     72
2135  0301  PC301,    301
2136  0020  PC20,     20
2137  0240  PC240,    240

            PAGE
```

```
                  /MULTI SEGMENT PROCESSING SUBROUTINES

2200  0000  SETBUF, 0
2201  3242          DCA IN4         /SET PRMS
2202  7330          CLA CLL CML RAR
2203  3023          DCA XMBIT
2204  3022          DCA XMLOC
2205  1050          TAD XC3074
2206  3024          DCA XMSTRT
2207  4437          JMS I XPRINT    /MOVE CURSOR TO HITS
2210  2730          LET2
2211  6211          CDF1
2212  7240  STNX,   CLA CMA         /SET MB1 BITS
2213  3642          DCA I IN4
2214  2242          ISZ IN4
2215  5212          JMP STNX
2216  6201          CDF0
2217  1051          TAD XC1400      /STORE PRMS & BUF
2220  3027          DCA DSEC        /ON DRIVE-SECTOR:
2221  7201          CLA IAC
2222  3007          DCA DRIVER
2223  4234          JMS PUT4        /1-1400
2224  3007          DCA DRIVER
2225  4234          JMS PUT4        /0-1400
2226  3027          DCA DSEC
2227  2007          ISZ DRIVER
2230  4234          JMS PUT4        /1-0
2231  3007          DCA DRIVER
2232  4234          JMS PUT4        /0-0
2233  5600          JMP I SETBUF

2234  0000  PUT4,   0
2235  1054          TAD X34
2236  3025          DCA XCYL
2237  3242          DCA IN4
2240  2242  NXPUT4, ISZ IN4         /INDEX UNIT # (1-4)
2241  4436          JMS I XPUT16    /STORE MB1 & PRMS
2242  0000  IN4,    0
2243  1242          TAD IN4
2244  1052          TAD XCM4
2245  7650          SNA CLA
2246  5634          JMP I PUT4
2247  1025          TAD XCYL
2250  1053          TAD XC62
2251  3025          DCA XCYL        /INDEX CYL#
2252  5240          JMP NXPUT4

2253  0000  DO16,   0
2254  1051          TAD XC1400
2255  3027          DCA DSEC
2256  7201          CLA IAC
2257  3007          DCA DRIVER      /PROCESS 4 SEGMENTS AT DRIVE-SECTOR:
2260  4271          JMS DO4         /1-1400
2261  3007          DCA DRIVER
2262  4271          JMS DO4         /0-1400
2263  3027          DCA DSEC
2264  2007          ISZ DRIVER
2265  4271          JMS DO4         /1-0
2266  3007          DCA DRIVER
2267  4271          JMS DO4         /0-0
2270  5653          JMP I DO16

2271  0000  DO4,    0
2272  3277          DCA PR41
2273  3306          DCA PR42
2274  2277  NXPR,   ISZ PR41
2275  2306          ISZ PR42
2276  4435          JMS I XGET16    /GET RES; PRMS
2277  0000  PR41,   0               /UNIT
```

```
2300  1061          TAD STBUF
2301  3017          DCA R17
2302  1417  NXBF,   TAD I R17
2303  7440          SZA              /END OF XMS?
2304  5366          JMP PROCES       /NO
2305  4436          JMS I XPUT16     /RESTORE RES; PRMS
2306  0000  PR42,   0                /UNIT
2307  1277          TAD PR41
2310  1052          TAD XCM4
2311  7640          SZA CLA          /DONE FOUR?
2312  5274          JMP NXPR         /NO
2313  5671          JMP I D04

2314  0000  PUT16,  0
2315  1714          TAD I PUT16
2316  2314          ISZ PUT16
2317  1027          TAD DSEC
2320  3336          DCA PHED
2321  6211          CDF1
2322  1022          TAD XMLOC
2323  3455          DCA I L3052
2324  1023          TAD XMBIT
2325  3456          DCA I L3053
2326  1024          TAD XMSTRT
2327  3457          DCA I L3054
2330  1025          TAD XCYL
2331  3460          DCA I L3055
2332  6201          CDF0
2333  4442          JMS I XDISK
2334  0100          100
2335  0000          0
2336  0000  PHED,   0
2337  5400          5400
2340  5714          JMP I PUT16

2341  0000  GET16,  0
2342  1741          TAD I GET16
2343  2341          ISZ GET16
2344  1027          TAD DSEC
2345  3351          DCA GHED
2346  4442          JMS I XDISK
2347  0100          100
2350  0000          0
2351  0000  GHED,   0
2352  3400          3400
2353  6211          CDF1
2354  1455          TAD I L3052
2355  3022          DCA XMLOC
2356  1456          TAD I L3053
2357  3023          DCA XMBIT
2360  1457          TAD I L3054
2361  3024          DCA XMSTRT
2362  1460          TAD I L3055
2363  3025          DCA XCYL
2364  6201          CDF0
2365  5741          JMP I GET16

2366  3370  PROCES, DCA XTMP0
2367  4441          JMS I XDIVID
2370  0000  XTMP0,  0
2371  0024          24
2372  0000          0       /HED
2373  1025          TAD XCYL/CYL+CYL STRT
2374  4443          JMS I XDOIT
2375  5302          JMP NXBF

            PAGE

            /XM DISK PARAMETERS IN BIT FORMAT
```

```
                /FORMAT:        XYY YZZ ZZZ ZZZ
                /               X:      DRIVE 0;1
                /               Y:      SECTOR 000;011
                /               Z:      CYLINDER 00011100;01001110;10000000

                /A B C D E F G H I J
2400    5516    AONE,   5516;
2401    0262    262;
2402    1516    1516;
2403    4034    4034;
2404    0034    34;
2405    4262    4262;
2406    4116    4116;
2407    4200    4B00;
2410    1434    1434;
2411    1600    1600
                /K L M N O P Q R S T
2412    1600    1600;
2413    0034    34;
2414    5662    5662;
2415    0116    116;
2416    5600    5600;
2417    1434    1434;
2420    0262    262;
2421    1662    1662;
2422    5434    5434;
2423    5516    5516
                /U V W X Y Z BR CR MI SO
2424    1600    1600;
2425    1662    1662;
2426    0200    200;
2427    4034    4034;
2430    4034    4034;
2431    1434    1434;
2432    0200    200;
2433    0262    262;
2434    0116    116;
2435    5600    5600

                /XM LOWER BOUNDS

                /A B C D E F G H I J
2436    5327    LBOUND, -2451;
2437    3132    -4646;
2440    3257    -4521;
2441    3716    -4062;
2442    3132    -4646
2443    4742            -3036;
2444    4165    -3613;
2445    4111    -3667;
2446    3720    -4060;
2447    3434    -4344
                /K L M N O P Q R S T
2450    4705            -3073;
2451    4336    -3442;
2452    3613    -4165;
2453    6440    -1340;
2454    4123    -3655
2455    4350            -3430;
2456    7053    -725;
2457    4276    -3502;
2460    3115    -4663;
2461    3132    -4646
                /U V W X Y Z BR CR MI SO
2462    3175            -4603;
2463    3105    -4673;
2464    5023    -2755;
2465    7757    -21;
2466    7532    -246
```

```
2467  3226              -4552;
2470  3075  -4703;
2471  7213  -565;
2472  4046  -3732;
2473  5251  -2527

            /XM UPPER BOUNDS

            /A B C D E F G H I J
2474  7777  UBOUND, -1;
2475  7052  -726;
2476  7777  -1;
2477  7531  -247;
2500  4335  -3443
2501  7777              -1;
2502  7777  -1;
2503  7777  -1;
2504  4347  -3431;
2505  4704  -3074
            /K L M N O P Q R S T
2506  7777              -1;
2507  7777  -1;
2510  7777  -1;
2511  7777  -1;
2512  5250  -2530
2513  7777              -1;
2514  7212  -566;
2515  7777  -1;
2516  7777  -1;
2517  5326  -2452
            /U V W X Y Z BR CR MI SO
2520  3433              -4345;
2521  4275  -3503;
2522  7777  -1;
2523  7777  -1;
2524  7756  -22
2525  3717              -4061;
2526  5022  -2756;
2527  7777  -1;
2530  6437  -1341;
2531  7777  -1

            PAGE


            /TABLES, LISTS, FORMS, ETC.

            /CRT FORM
2600  0200  FORM,   200;
2601  0200  200;
2602  0200  200;
2603  0200  200
            /INIT, FULL DUPLEX,UPPER CASE,CLEAR TABS
2604  0243  243;
2605  0241  241;
2606  0243  243;
2607  0262  262;
2610  0243  243;
2611  0264  264;
2612  0243  243;
2613  0240  240
            /MOVE CURSOR, SET TAB 0105
2614  0243  243;
2615  0255  255;
2616  0260  260;
2617  0261  261;
2620  0261  261;
2621  0265  265;
2622  0243  243;
```

```
2623  0260  260
2624  0243  243;
2625  0255  255;
2626  0260  260;
2627  0261  261;
2630  0263  263;
2631  0260  260;
2632  0243  243;
2633  0260  260
2634  0243  243;
2635  0255  255;
2636  0260  260;
2637  0261  261;
2640  0264  264;
2641  0265  265;
2642  0243  243;
2643  0260  260
            /SET DASHES AT TABS ON LINE 1 (8,6,4)
2644  0237  237;
2645  0234  234
2646  0255  255;
2647  0255  255;
2650  0255  255;
2651  0255  255;
2652  0255  255;
2653  0255  255;
2654  0255  255;
2655  0255  255
2656  0211  211
2657  0255  255;
2660  0255  255;
2661  0255  255;
2662  0255  255;
2663  0255  255;
2664  0255  255
2665  0211  211
2666  0255  255;
2667  0255  255;
2670  0255  255;
2671  0255  255
2672  0237  237        /HOME
2673  0000  0          /TERM.

            /MOVE CURSOR TO HITS
2674  0237  MOVCUR, 237;
2675  0234  234;
2676  0234  234;
2677  0230  230;
2700  0000  0

            /NO HITS INDICATOR
2701  0237  NOHITS, 237;
2702  0234  234;
2703  0234  234;
2704  0230  230
2705  0207          207;
2706  0207  207;
2707  0207  207;
2710  0207  207
2711  0316          316;
2712  0317  317;
2713  0316  316;
2714  0305  305
2715  0237  CURHOM, 237;
2716  0000  0

            /CLEAR SCREEN AT FIRST LETTER
2717  0243  LET1,   243;
2720  0253  253;
```

```
2721  0237  237;
2722  0234  234
2723  0234         234;
2724  0230  230;
2725  0237  237;
2726  0235  235;
2727  0000  0

            /CLEAR SCREEN AT FIRST LETTER OF 2ND FIELD
            /IF 1ST FIELD MISSING
2730  0237  LET2,   237;
2731  0234  234;
2732  0234  234;
2733  0230  230;
2734  0237  237;
2735  0243  243;
2736  0253  253;
2737  0211  211;
2740  0000  0

            PAGE

3000  0000  CHARBF, 0

            PAGE

            /DATA PRINT BUFFER
3200  0000  PDATA,  0

            PAGE

ACM12   0526
ACM15   0535
ACM2    0534
ACM212  0531
ACM23   0533
ACM260  0525
ACM3    0532
ACM32   0530
ACM7    0527
ACOM    0454
AC210   0537
AC211   0540
AC215   0541
AC243   0542
AC253   0543
AC277   0536
ADEL    0457
ANUM    0466
AONE    2400
ASCIF   0400
ATAB    0451
AUCA    0471
BP      1317
BPRADD  0033
CA      0021
CHAR    0031
CHARBF  3000
CKR     0416
CM3     1316
COM     1521
CPOS    0354
CT400   1274
CURHOM  2715
CYL     1454
CYL10   1307
DANDY   1600
DCM15   1256
DCSET   1400
```

| | |
|---|---|
| DFAIL | 1537 |
| DFIELD | 1536 |
| DISK | 1415 |
| DIV | 1255 |
| DIVCT | 1257 |
| DIVIDE | 1200 |
| DOHIT | 0660 |
| DOIT | 1275 |
| DO16 | 2253 |
| DO4 | 2271 |
| DPRM | 1540 |
| DRIVE | 1451 |
| DRIVER | 0007 |
| DRTN | 1445 |
| DSEC | 0027 |
| DTMP10 | 1315 |
| DV2 | 1235 |
| DV3 | 1225 |
| DV4 | 1247 |
| ECHO | 0032 |
| ENDH | 0736 |
| ENDH10 | 0746 |
| ENDH20 | 0754 |
| ENDH30 | 0765 |
| FLD | 0211 |
| FLDRTN | 0221 |
| FLDST | 0370 |
| FORM | 2600 |
| FPOS | 0355 |
| GAONE | 1146 |
| GCHR | 1051 |
| GCM1 | 1137 |
| GCM12 | 1140 |
| GCM301 | 1142 |
| GCM302 | 1136 |
| GCM6 | 1141 |
| GCT | 1127 |
| GC1400 | 1143 |
| GC32 | 1144 |
| GC377 | 1145 |
| GETCHR | 2037 |
| GETD2 | 2052 |
| GET1 | 1000 |
| GET16 | 2341 |
| GET2 | 1027 |
| GHED | 2351 |
| GRET2 | 1042 |
| GRET3 | 1044 |
| GSAVE | 1147 |
| GSET | 1047 |
| GTAB1 | 1150 |
| G11 | 1022 |
| HBLK | 0672 |
| HCM13 | 0770 |
| HCM22 | 0773 |
| HCM31 | 0771 |
| HCYL | 0705 |
| HDIV | 1253 |
| HEAD | 1545 |
| HEADER | 1544 |
| HED | 1473 |
| HED10 | 1310 |
| HHED | 0706 |
| HHIT | 0774 |
| HIT | 0600 |
| HITCNT | 0026 |
| HIT0 | 1342 |
| HM3074 | 0772 |
| HTMP | 0665 |
| HX | 0667 |
| H20 | 0607 |
| H21 | 0610 |
| H22 | 0613 |
| H30 | 0624 |
| H31 | 0626 |
| H32 | 0633 |
| H40 | 0641 |
| H41 | 0645 |
| IN4 | 2242 |
| KYBD | 0474 |
| LBND | 1130 |
| LBOUND | 2436 |
| LDIV | 1254 |
| LET1 | 2717 |
| LET2 | 2730 |
| LIMST | 0364 |
| L3052 | 0055 |
| L3053 | 0056 |
| L3054 | 0057 |
| L3055 | 0060 |
| MEM10 | 1306 |
| MOVCUR | 2674 |
| NERR | 0343 |
| NOHITS | 2701 |
| NUM | 0316 |
| NXBF | 2302 |
| NXPR | 2274 |
| NXPUT4 | 2240 |
| NXU | 0254 |
| NXZPR | 0515 |
| NX400 | 1266 |
| PCHAR | 2127 |
| PCM43 | 2130 |
| PCM77 | 2131 |
| PC12 | 2132 |
| PC20 | 2136 |
| PC200 | 2124 |
| PC240 | 2137 |
| PC301 | 2135 |
| PC32 | 2133 |
| PC72 | 2134 |
| PC77 | 2126 |
| PDATA | 3200 |
| PEND | 2036 |
| PESC | 2100 |
| PESC10 | 2110 |
| PHED | 2336 |
| PHIT | 2000 |
| PLIST | 2120 |
| PNUM | 2074 |
| PNX20 | 2020 |
| PNX30 | 2025 |
| PNX40 | 2033 |
| PRINT | 0510 |
| PROCES | 2366 |
| PRT | 0502 |
| PRTN1 | 2031 |
| PRTN2 | 2023 |
| PR16 | 0275 |
| PR41 | 2277 |
| PR42 | 2306 |
| PSEP | 2075 |
| PTMP10 | 2122 |
| PTRANS | 2057 |
| PTRIG | 2125 |
| PUT16 | 2314 |
| PUT4 | 2234 |
| QRY | 0203 |

| | |
|---|---|
| RCM1 | 2123 |
| RECORD | 2121 |
| RP | 1320 |
| R10 | 0010 |
| R11 | 0011 |
| R12 | 0012 |
| R13 | 0013 |
| R14 | 0014 |
| R15 | 0015 |
| R16 | 0016 |
| R17 | 0017 |
| SADD | 0356 |
| SCM2 | 0352 |
| SCM260 | 0346 |
| SCM301 | 0353 |
| SC3074 | 0351 |
| SC32 | 0350 |
| SC640 | 0347 |
| SEC | 1522 |
| SETBUF | 2200 |
| SFST | 0303 |
| SNXC | 0236 |
| SNXT2 | 0271 |
| SNX1 | 0226 |
| SSEC | 0300 |
| STBUF | 0061 |
| STDATA | 2117 |
| STMP | 0264 |
| STNX | 2212 |
| STRG | 0357 |
| ST1 | 0200 |
| TMP0 | 1346 |
| UBND | 1131 |
| UBOUND | 2474 |
| UCA | 0227 |
| UNIT | 0030 |
| WC | 0020 |
| WRD | 0223 |
| XASCIF | 0361 |
| XBP | 0545 |
| XCM4 | 0052 |
| XCYL | 0025 |
| XC1400 | 0051 |
| XC234 | 0047 |
| XC3074 | 0050 |
| XC62 | 0053 |
| XDAND | 1314 |
| XDISK | 0042 |
| XDIVID | 0041 |
| XDMON | 0554 |
| XDOIT | 0043 |
| XDO16 | 1354 |
| XFLD | 0546 |
| XGET1 | 0362 |
| XGET16 | 0035 |
| XGET2 | 0363 |
| XHIT | 0034 |
| XKYBD | 0040 |
| XMBIT | 0023 |
| XMBUF | 1617 |
| XMLOC | 0022 |
| XMSTRT | 0024 |
| XM1 | 1606 |
| XM10 | 1633 |
| XM2 | 1611 |
| XM20 | 1640 |
| XM3 | 1620 |
| XM4 | 1631 |
| XNONE | 0046 |
| XNUM | 0553 |
| XPHIT | 0045 |
| XPRINT | 0037 |
| XPUT16 | 0036 |
| XQRY | 0551 |
| XRP | 0544 |
| XSTBUF | 0360 |
| XST1 | 0547 |
| XST11 | 1616 |
| XST2 | 0044 |
| XTMP0 | 2370 |
| XUCA | 0552 |
| XWRD | 0550 |
| X34 | 0054 |
| ZCM400 | 1273 |
| ZC3074 | 1134 |
| ZLLIM | 1132 |
| ZMX | 1260 |
| ZNX1 | 1106 |
| ZNX2 | 1114 |
| ZULIM | 1133 |
| ZX | 1135 |
| ZXM | 1070 |

Operating instructions for Program No. 6 are as follows:

1. Load Program through "DEMO". Else, after loading program through other means, set loc. 7000=7402, and start program at location 200 (mb 0).
2. The screen will print dashes to show where query is to be entered. The user may then type in a query via CRT keyboard.
3. CRT Format.
   A. Fields
      1. Finding name
         7 characters, one word
      2. Subsequent words and titles
         6 characters per word
         no limit on words
      3. Designations and Address
         4 characters per word
         no limit on words
   B. Control Characters
      1. space—field separator
      2. comma—word separator
      3. carriage return—query terminator for business and professional listings
      4. line feed—query terminator for residential and professional listings
      5. semi-colon—query deletor
      6. period—screen roller
      7. asterisk—returns control of proram to "DEMO" which it expects is resident in core.

Halts: 1531: disk failure

Note: If the program detects errors, the screen and program are automatically reinitialized.

SPECIAL PRUPORSE MANUAL/SEMI-AUTOMATED SYSTEM

Another exemplary embodiment of apparatus/-method for practicing this invention is shown in FIG. 85. As will be appreciated from the following description, various degrees of manual and machine processing may be incorporated in this embodiment.

In this example, the base data file comprises typed extracts of the full text copy. Each record in the file is assigned a unique address number from 0001 onward. In the particular example to be described, 8448 records can be maintained and retrieved from such a base data file although, as will be appreciated, much larger files of records could be serviced with the same techniques.

Since this exemplary embodiment has been applied to an actual record file, the text from the first few records of that file are copied below:

Record #0001
Wed Sep 1 1971 CJ Burger asks caution in enforcing bus rule Quotations By PETER MILIUS LA Times Washington Post Service WASHINGTON Chief Justice Warren E Burger federal judges Supreme Court s busing decision school desegregation cities decision school system South U S Winston Salem NC President Nixon Department of Health Educaton and Welfare Fifth U S Circuit Court of Appeals New Orleans black school children Forsyth County Charlotte NC test Record #0002
Wed Sep 1 1971 CJ Holsclaw resigns Acting chief takes county police reins Quotations By STAN MACDONALD Courier Journal Staff Writer Maj Russell S MacDaniel Jefferson County police chief Thomas R Holsclaw County Judge Todd Hollenbach merit board member county policemen county merit system Pixp Staff Photo by Thomas Mitchell MAJ RUSSELL S McDANIEL right was sworn in as acting chief of the Jefferson County Police Department by County Judge Todd Hollenbach after Chief Thomas R Holsclaw resigned Record #0003
Wed Sep 1 1971 CJ Hollenbach s McDaniel Criminal Investigation Divisin CID Reports of friction Holsclaw Controversial transfer Capt Fred Roemele New duties for Holsclaw Was acting chief before Merit Board Chairman J Stanley Watson Record #0004
Wed Sept 1 1971 CJ Nixon blocks disclosure of military ai plans From New York Times and AP Dispatches WASHINGTON President Nixon Senate Foreign Relations Committee the plans foreign military assistance President s military foreign aid program Foreign Relations Committee under Chairman J William Fulbright D Ark Pentagon s Congress Secretary of State William P Roger Defense Secretary Melvic R Laird Mr Nixon Another round in battle Legislation hinted House panel was rebuffed Elmer Staats Asst Gen William H Rehnquist Rep L H Fountain D N C FBI Atty Gen John N Mitchell Record #0005
Wed Sep 1 1971 CJ As death rate worsens U S mine safety chief apparently will be fired By WARD SINCLAIR Courier Journal & Times Staff Writer WASHINGTON coal mine fatalities U S Bureau of Mines chief of health and safety Deputy Director Henry P Wheeler Jr Director Elburt F Osborn industry Fielf of action limited Iowa Republican Edward D Failor fatality statistics Says urgency is pointed up John F O Leary Farmington W Va It s his prerogative Record #0006
Wed Sep 1 1971 CJ Postal unions file suit to break wage freeze By FRANK C PORTER LA Times Washington Post Service WASHINGTON representing postal workers filed suit government President Nixon s wage price freeze legal attack labor pay increases negotiated Boston Police Patrolmen s Association federal court Harry Bridges West Coast dock strike Joint Economic Committee Gardner Ackley economic policy AFL CIO President George Meany s National Association of Letter Carriers the American Postal Workers Union Mail Handlers Division of the Laborers International Union National Rural Letter Carriers Association cost of living Sen Fred R Harris D Okla

.
.
.

For this discussion the 2976 PICs identified above, supra, have been utilized.

The retrieval file construction shown in FIG. 85 is virtually automatic; however, as will be appreciated, such construction could be accomplished entirely by manual and photographic steps.

As shown in FIG. 85, the typed data records are scanned and converted to machine readable magnetic tape format where the typed characters/word groupings are still fully and uniquely represented by standard computer readable binary codes on the magnetic tape. A Scan Data Model 100 scanner may be utilized for this conversion to magnetic tape.

The resulting magnetic tape format of the base data file is then computer processed (a PDP 8/E computer with associated peripheral tape drives may be used) in a manner similar to that previously discussed in the telephone directory embodiment to automatically construct the requried 2976 binary code arrays comprising the retrieval file.

The magnetic tape format of the retrieval file is then converted to 16 mm microfilm format where each microfilm frame comprises one of the 2976 binary coded arrays. The presence of a particular PIC in a record is coded as an opaque spot on a corresponding portion of the array while the absence of that PIC would be represented by a transparent spot thereat. For instance, a Series F electronic beam recorder (EBR) available from the 3-M Company can be used to make this conversion.

The resulting 16 mm microfilm roll(s) is then placed in a standard 3-M microfilm cartridge(s) to form the accessible retrieval file of 2976 binary coded arrays.

As an example, if the word Smith occurs in record #1, then PIC arrays $S_{1,5}$; $M_{2,5}$; $I_{3,5}$; $T_{4,5}$; and $H_{5,5}$ would carry opaque spots in the position assigned for the record address #1.

Since the Series F EBR used in this embodiment has a normal frame format of 132 characters per line and 64 lines, a total of 8448 ($64\times132=8448$) base data file records can be accommodated by this example as should now be appreciated.

Actual photo copies of frames 0001 through 0005 of the microfilm retrieval file for a base data file including records 1–6 previously copied above are shown in FIGS. 86–90. These arrays represent particular PICs as noted below:

| PIC | FIGURE |
|---|---|
| $A_{1,1}$ | 86 |
| $A_{1,2}$ | 87 |
| $A_{2,2}$ | 88 |
| $A_{1,3}$ | 89 |
| $A_{2,3}$ | 90 |

Records 1–6 are assigned the first 6 successive positions from left to right in line 1 of each array just after the "$\phi$" reference position marker. Thus, as can be verified, only records #1 and #6 (out of the first 6 records) contain PIC $A_{1,1}$. Only records #4 and #5 contain PIC $A_{1,2}$, etc.

It should be appreciated that the retrieval file could also be manually coded on coding forms organized in the retrieval file format and then placed in the same end-resulting 16 mm microfilm format using conventional microfilm cameras.

However constructed, the microfilm retrieval file may now be utilized by simple operations on a Model 400 3-M Company microfilm viewer and printer as indicated in FIG. 85.

The microfilm retrieval file cartridge is loaded normally into the viewer-printer. The particular PICs contained in an inquiry word are manually identified and each of the corresponding retrieval file array microfilm frames are registered in the viewer and utilized to multiply expose a common output print. Thus, the multiply exposed print will be exposed wherever there is a transparent portion on any selected array but not exposed wherever all selected arrays have opaque spots. In effect, if a negative image is utilized, the selected arrays are Boolean ANDED to result in an output print having exposed portions only at locations corresponding to the address locations of records in the base data file having all the desired PICs. By overlaying this final print with an address grid (as indicated in FIG. 85), the addresses of the desired records can be readily ascertained and thus the desired records can be quickly and accurately located in the base data file.

As an example of the ANDING operation here contemplated, FIG. 91 is a photograph formed by Boolean ANDING of FIGS. 87 and 88 thus showing coded spots representing all record addresses having both PICs $A_{1,2}$ and $A_{2,2}$. It will be noted both from FIG. 91 and from an inspection of the above copied records 1–6 that only record number 5 (of the first 6 records) meets this critera. $A_{1,2}$ in record #5 arises from "As" while $A_{2,2}$ arises from "Va" (remembering that all letters are treated as upper case if the first letter of the word is upper case). Actually, this is an example of the type of "mis-hit" that is possible with this arrangement thus reducing retrieval precision to less than 100%. That is, presumably the combination of $A_{1,2}$ and $A_{2,2}$ would correspond to an inquiry word of "AA" or "Aa" neither of which appear in any of records 1–6. However, such an inquiry will, in this example, nevertheless produce an erroneous retrieval result (mis-hit). As previously noted, there are ways to minimize such "mis-hits" with this invention. In any event, retrieval accuracy is always 100% in spite of some possible lack of precision.

As an example of an actual inquiry process, consider a search for records containing the word "SMITH". The operator first notes that "SMITH" contains PICs $S_{1,5}$; $M_{2,5}$; $I_{3,5}$; $T_{4,5}$ and $H_{5,5}$. Thus, the microfilm retrieval file is first advanced until the frame corresponding to $S_{1,5}$ is properly registered in the viewing screen. Then, a "hold" switch and an "expose" switch are activated. In this manner, a photosensitive paper would be exposed to the registered $S_{1,5}$ frame and this paper would be held for further exposures rather than being ejected.

Next, the operator would advance the retrieval film microfilm to the frame corresponding to $M_{2,5}$ and repeat the "hold" and "expose" functions thus again exposing the same piece of photosensitive paper to another properly registered array image. The same procedures are repeated for $I_{3,5}$; $T_{4,5}$ and $H_{5,5}$ except that the "hold" function is inactivated for $H_{5,5}$ so that the multiply exposed photosensitive paper will be ejected after exposure to all the desired PIC arrays.

Since the developed ejected photosensitive paper contains a negative image, it will actually contain a light area (unexposed) in each of the possible 8448 locations representing addresses of documents having the word "SMITH" contained therein. By overlaying this single resultant print with a transparent grid of 132×64, the operator can then determine which of the 8448 records contain the word "SMITH".

As previously noted, the retrieval file arrays can be coded and photographed manually. However, it is preferred that this portion of the process be automated by proper programming of the computer shown in FIG. 85. A set of seven programs have been written to perform this task for use with the same mini computer equipment previously described for use in the telephone directory assistance retrieval system. An eighth program has also been developed to assist in the actual retrieval process.

The interrelationship of these programs is briefly illustrated in FIG. 92. In addition the following brief description of all eight of these programs follows before an explicit listing of the actual source program statements:

I. Program 1—DSC-DRC

A. Converts scan tape to drc formatted tape.

B. Produces a listing of frames containing errors such as incorrect numerical frame sequence and punctuation within the data.

II. Program 2—CRTE

A. Online correction and editing program; allows for display of drc record on CRT screen so that errors listed by Program 1 (DSC-DRC) may be corrected.

III. Program 3—DRCC

A. Combines like numbered drc frames so that only one record exists for each frame number.

B. Removes data information from data portion of record and stores it in special form in the record header portion.

C. Categorizes frames as to general type (editorial, cartoon, obituary, etc.) by setting bits in header position of record.

D. Writes a blank record for any missing drc frames so that each frame number has a corresponding magnetic tape record.

IV. Program 4—DRC-MX

A. Converts drc coded tape to MX formatted tape.

B. Program 4A—DRC-MX OVERLAY

1. Converts drc category bits from header portion of record into MX format.

V. Program 5—MX-XM

A. Converts MX formatted tape into XM format and writes XM's onto retrieval disk.

VI. Program 6—DATREC

A. Writes first 150 characters of each drc record onto the disk so that they may be displayed during the retrieval process when a hit is found.

VII. Program 7—MX Sort

A. Original test program to convert MX formatted records into XM formatted records.

B. Program 7A—MX-EBR

1. Converts XM records into EBR format for printing on microfilm.

VIII. Program 8—RETRIEVAL

A. User-oriented system allowing for retrieval of information from news clippings.

PROGRAM 1 - DSC-DRC

```
                CDFI=6211
                CDFO=6201
                BSW=7002
                MQA=7501
                MQL=7421
                CLK=7204
                          FIXTAB

                          *2
0002    7402    HLT
                          *10
0010    0000    DRCBUF,   0
0011    0000    DSCBUF,   0
                          *20
0020    1400    DRT910,   1400       /MAG TAPE REFS
0021    0000    WRDCNT,   0          /
0022    0000              0          /
0023    0000              0          /
0024    1224              1224       /
0025    0000              0          /
0026    0000    BUSYFG,   0          /
0027    0000              0
0030    1200    XDTAPE,   1200       /
0031    0000    ERRTRG,   0          /
0032    0000    DISWC,    0          /
0033    0000    DISCA,    0          /
0034    0000              0
0035    0000              0
0036    0000    EOR,      0
0037    1000    SEP,      1000
0040    0000    CSH,      0
0041    0001    CSL,      1
0042    0000    FSH,      0
0043    0001    FSL,      1
0044    0000    MPF,      0
0045    0000    DRCLIM,   0
0046    0000    FSI,      0
0047    0000    ZOUTI,    0
0050    2020    L2020,    2020       /CONSTANTS
0051    0003    M3,       3
0052    0017    M17,      17
0053    0037    M37,      37
0054    0100    M100,     100
0055    3664    M3664,    3664
0056    4000    C4000,    4000
0057    0020    C20,      20
0060    0044    C44,      44
0061    1000    C1000,    1000
0062    1100    C1100,    1100
0063    1200    C1200,    1200
0064    1300    C1300,    1300
0065    0040    C40,      40
0066    0017    C17,      17
0067    0024    C24,      24
0070    0101    C101,     101
0071    0100    C100,     100
```

```
0072  6200  CM1600,  -1600
0073  7776  CM2,     -2
0074  7774  CM4,     -4
0075  6077  CM1701,  -1701
0076  7777  CM1,     -1
0077  7771  CM7,     -7
0100  7773  CM5,     -5
0101  7400  CM400,   -400
0102  7534  CM244,   -244
0103  7566  CM212,   -212
0104  7775  CM3,     -3
0105  7616  CM162,   -162
0106  7535  CM243,   -243
0107  7743  CM35,    -35
0110  0033  C33,     33
0111  0065  C65,     65
0112  0077  C77,     77
0113  5010  C5010,   5010
0114  0004  C4,      4
0115  0006  M6,      6
0116  4020  C4020,   4020
0117  0000           0
0120  0000           0
0121  0665  XTEST,   665      /SUBROUTINES
0122  0600  XCRTST,  600
0123  0237  XOTPUT,  237
0124  6200  XDECOC,  6200
0125  0472  XSERCH,  472
0126  1636  XZOUT,   1636
0127  1623  XINIT,   1623
0130  0254  XINPUT,  254      /FOR MTAPE--271 FOR PTAPE
0131  1000  XPRFMT,  1000
0132  0710  XDATA,   710
0133  0400  XCART,   400
0134  0421  XFRAM,   421
0135  0000  XINFO,   0
0136  0333  XEND,    333
0137  0200  XINPTD,  200
0140  1723  XPUTCR,  1723
                     *150
0150  6011  XER1,    6011
0151  6010  XER2,    6010
0152  6007  XER3,    6007
0153  6006  XER4,    6006
0154  6005  XER5,    6005
0155  6004  XER6,    6004
0156  6003  XER7,    6003
0157  6002  XER8,    6002
0160  6001  XER9,    6001
0161  6124  XSEQ,    6124
0162  6400  XOCDEC,  6400
                     *200
            /XINPTD:          INPUTS DATA RECORD
            /RETURN:          END OF FILE
            /RETURN:          OTHERWISE
0200  0000  SINPTD,  0
0201  1070           TAD C101
0202  6717           6717     /LOAD MEM CTRL REG - CD MODE:UM
0203  7300           CLA CLL
0204  1067           TAD C24
0205  3021           DCA WRDCNT      /LOAD WORD COUNT(4076BAS10)
0206  4430           JMS I XDTAPE
0207  1020           1020
0210  0000           0000
0211  4215           JMS TESTER
0212  2200           ISZ SINPTD      /RETURN: MT OK
0213  5600           JMP I SINPTD    /RETURN: MT EOF
0214  7402           HLT      /RETURN: NO ERROR
0215  0000  TESTER,  0
```

```
0216  4430            JMS I XDTAPE
0217  0000            0000
0220  5223            JMP .+3 /MT NOT OK
0221  7300            CLA CLL /MT OK
0222  5615            JMP I TESTER    /SO EXIT
0223  2215            ISZ TESTER
0224  7421            MQL      /SAVE ERROR STATUS IN MQ
0225  7501            MQA      /OR STATUS ERROR INTO AC
0226  0054            AND M100
0227  7640            SZA CLA /EOF?
0230  5615            JMP I TESTER    /YES
0231  2215            ISZ TESTER      /NO
0232  7501            MQA
0233  0055            AND M3664
0234  7650            SNA CLA /AC?
0235  5615            JMP I TESTER    /YES, TADE WC EXIT
0236  7402  TERROR,   HLT      /NO
            /XOTPUT:        OUTPUTS DATA RECORD FROM U.4
0237  0000  SOTPUT,   0
0240  7201            CLA IAC
0241  6717            6717    /LOAD MEM CTRL REG - CD MODE: UM
0242  7300            CLA CLL
0243  1056            TAD C4000
0244  3021            DCA WRDCNT
0245  4430            JMS I XDTAPE
0246  0240            240
0247  0000            0000
0250  4215            JMS TESTER
0251  5637            JMP I SOTPUT    /MT OK
0252  7402            HLT      /EOF
0253  7402            HLT      /WC ERROR
0254  0000  SINPUT,   0
0255  7300            CLA CLL
0256  6717            6717
0257  7300            CLA CLL
0260  1101            TAD CM400
0261  3021            DCA WRDCNT
0262  4430            JMS I XDTAPE
0263  5220            5220
0264  2000            2000
0265  4215            JMS TESTER
0266  2254            ISZ SINPUT      /MT OK
0267  5654            JMP I SINPUT    /EOF
0270  5266            JMP .-2 /WC ERROR
0271  0000  SINPT,    0
0272  1050            TAD L2020
0273  3331            DCA RRBUF
0274  6014  RRNXT,    RFC
0275  6011            RSF
0276  5275            JMP .-1
0277  7300            CLA CLL
0300  6012            RRB
0301  3332            DCA RRTEMP      /GET PAPER TAPE CHAR
0302  1332            TAD RRTEMP
0303  7450            SNA      /FEED?
0304  5274            JMP RRNXT       /YES
0305  1103            TAD CM212
0306  7450            SNA      /LF?
0307  5274            JMP RRNXT       /YES
0310  1104            TAD CM3
0311  7450            SNA      /CR?
0312  5322            JMP RREND       /YES
0313  1105            TAD CM162
0314  7650            SNA CLA /RUBOUT?
0315  5274            JMP RRNXT       /YES
0316  1332            TAD RRTEMP      /NO, GOOD CHAR
0317  3731            DCA I RRBUF
0320  2331            ISZ RRBUF
0321  5274            JMP RRNXT
```

```
0322  1332  RRENU,   TAD RRTEMP
0323  3731           DCA I RRBUF
0324  1450           TAD I L2020
0325  1102           TAD CM244
0326  7640           SZA CLA /END OF TAPE($)?
0327  2271           ISZ SINPT        /NO
0330  5671           JMP I SINPT      /YES
0331  0000  RRBUF,   0
0332  0000  RRTEMP,  0
0333  0000  SENDIT,  0
0334  4526           JMS I XZOUT      /LAST REC
0335  7300           CLA CLL
0336  7000           NOP
0337  7000           NOP
0340  4430  GO,      JMS I XDTAPE
0341  0050           0050    /PUT EOF ON OUTPUT TAPE
0342  4354           JMS TEST
0343  4430           JMS I XDTAPE
0344  0010           0010    /REWIND OUTPUT TAPE
0345  1113           TAD C5010       /REWIND INPUT TAPE
0346  6716           6716
0347  6721           6721    /WAIT TILL TRANSPORT READY
0350  5347           JMP .-1
0351  6722           6722
0352  5733           JMP I SENDIT
0353  1010  C1010,   1010
0354  0000  TEST,    0
0355  4430           JMS I XDTAPE
0356  0000           0000
0357  7402           HLT     /ERROR
0360  7300           CLA CLL /OK
0361  5754           JMP I TEST
                     *400
            /XCART:  PROCESSES CARTRIDGE # RECORD
0400  0000  SCART,   0
0401  1046           TAD FST
0402  0051           AND M3
0403  7640           SZA CLA /FORMAT SEQUENCE SET PROPERLY?
0404  5550           JMP I XER1      /NO-SEQUENCE ERROR
0405  4524           JMS I XDECOC    /YES
0406  2021           2021
0407  0000  CH,      0
0410  0000  CL,      0
0411  4246           JMS OUTTST
0412  1210           TAD CL
0413  3041           DCA CSL
0414  1207           TAD CH
0415  3040           DCA CSH
0416  7201           CLA IAC /SET FST = 1
0417  3046           DCA FST /FOR CART REC
0420  5600           JMP I SCART
            /XFRAM:  PROCESSES FRAME # RECORD
0421  0000  SFRAM,   0
0422  1046           TAD FST
0423  7450           SNA
0424  5551           JMP I XER2      /SEQUENCE ERROR
0425  1073           TAD CM2
0426  7650           SNA CLA
0427  5551           JMP I XER2      /SEQUENCE ERROR
0430  4524           JMS I XDECOC
0431  2021           2021
0432  0000  FH,      0
0433  0000  FL,      0
0434  4246           JMS OUTTST
0435  4254           JMS CMX
0436  1233           TAD FL
0437  3043           DCA FSL
0440  1232           TAD FH
0441  3042           DCA FSH
```

```
0442  7000            NOP
0443  7305            CLA CLL IAC RAL /SET FSI = 2
0444  3046            DCA FSI /FOR FRAME REC
0445  5621            JMP I SFRAM
0446  0000  OUTTST,   0
0447  1046            TAD FST
0450  1074            TAD CM4
0451  7650            SNA CLA /OUTPUT?
0452  4526            JMS I XZOUT      /YES
0453  5046            JMP I OUTTST     /NO
0454  0000  CMX,      0
0455  1233            TAD FL
0456  7041            CIA
0457  1043            TAD FSL
0460  7640            SZA CLA
0461  5266            JMP CMXD
0462  1232            TAD FH
0463  7041            CIA
0464  1042            TAD FSH
0465  7640            SZA CLA
0466  3044  CMXD,     DCA MPF /FIRST MX PER FRAME
0467  2044            ISZ MPF /OTHER THAN FIRST
0470  5654            JMP I CMX
0471  5552            JMP I XER3       /POSSIBLE OVERFLOW ERROR
            /XSERCH:         SEARCHES TO LOCATE PROPER MAG TAPE RECORD
            /         TO BE CORRECTED.
0472  0000  SSERCH,   0
0473  1047            TAD ZOUTI
0474  7650            SNA CLA /FRST ROUND?
0475  4523  DDNXT,    JMS I XOTPUT     /NO, OUTPUT PREV REC
0476  3047            DCA ZOUTI        /YES, RESET TRIGGER
0477  4537            JMS I XINPTD     /INPUT DATA RECORD
0500  7402            HLT      /HLT ON EOF AT THIS POINT
0501  1100            TAD CM5
0502  3323            DCA SCHCNT
0503  1065            TAD C40
0504  3321            DCA PL
0505  3322            DCA DL
0506  6211  PDNXT,    CDF1
0507  1722            TAD I DL         /GET DATA UNIT #
0510  6201            CDF0
0511  7041            CIA
0512  1721            TAD I PL         /GET PAPER TAPE SEARCH #
0513  7640            SZA CLA /MATCH?
0514  5275            JMP DDNXT        /NO, CONTINUE MAG SEARCH
0515  2323            ISZ SCHCNT       /YES, ALL UNITS MATCHED?
0516  5306            JMP PDNXT        /NO, CONTINUE UNIT COMPARISONS
0517  7000            NOP      /YES
0520  5672            JMP I SSERCH     /EXIT
0521  0000  PL,       0
0522  0000  DL,       0
0523  0000  SCHCNT,   0
                      *600
            /XCRTST:         IDENTIFIES CHAR TYPE-ENTER W/CHAR IN AC
            /RETURN:         UCA W/CHAR IN AC
            /RETURN:         LCA "
            /RETURN:         #      "
            /RETURN:         OTHERWISE W/SPACE IN AC
0600  0000  SCRTST,   0
0601  4223            JMS LIM
0602  1101            1101
0603  1132            1132
0604  5600            JMP I SCRTST     /LCA EXIT
0605  2200            ISZ SCRTST
0606  4223            JMS LIM
0607  1201            1201
0610  1232            1232
0611  5600            JMP I SCRTST     /UCA EXIT
0612  2200            ISZ SCRTST
```

```
0613  4223           JMS LIM
0614  1300           1300
0615  1311           1311
0616  5600           JMP I SCRTST    /# EXIT
0617  2200           ISZ SCRTST
0620  7300           CLA CLL
0621  1037           TAD SEP
0622  5600           JMP I SCRTST    /ELSE EXIT
0623  0000   LIM,    0
0624  3234           DCA BCODE
0625  1623           TAD I LIM
0626  2223           ISZ LIM
0627  3235           DCA LB
0630  1623           TAD I LIM
0631  2223           ISZ LIM
0632  3236           DCA UB
0633  4242           JMS SDRCLM
0634  0000   BCODE,  0
0635  0000   LB,     0
0636  0000   UB,     0
0637  2223   BNOTIN, ISZ LIM
0640  1234   BIN,    TAD BCODE
0641  5623           JMP I LIM
             /XDRCLM:        TESTS CODE TO SEE WHETHER IN BOUNDS SPECIFIED
             /CODE HERE
             /LOWER BOUND HERE
             /UPPER BOUND HERE
             /RETURN:        ERROR
             /RETURN:        OK
0642  0000   SDRCLM, 0
0643  7300           CLA CLL
0644  1642           TAD I SDRCLM
0645  2242           ISZ SDRCLM
0646  3264           DCA DRCCOD
0647  1642           TAD I SDRCLM
0650  7041           CIA
0651  1264           TAD DRCCOD
0652  2242           ISZ SDRCLM
0653  7710           SPA CLA /CODE > OR = LOW LIM?
0654  5262           JMP ERRRTN      /NO
0655  1642           TAD I SDRCLM    /YES
0656  2242           ISZ SDRCLM
0657  7041           CIA
0660  1264           TAD DRCCOD
0661  7750           SPA SNA CLA     /CODE < OR = UP LIM?
0662  2242   ERRRTN, ISZ SDRCLM
0663  5642           JMP I SDRCLM    /NO
0664  0000   DRCCOD, 0
             /XTEST: TESTS FOR CHAR LOC IN PARTICULAR
             /LOCATION OF IDENTIFYING CHAR HERE
             /RETURN:        %
             /RETURN:        #
             /RETURN:        @
             /RETURN:        OTHERWISE
0665  0000   STEST,  0
0666  7300           CLA CLL
0667  1665           TAD I STEST
0670  2265           ISZ STEST
0671  3366           DCA TSTLOC
0672  1766           TAD I TSTLOC
0673  1075           TAD CM1701
0674  7450           SNA     /#?
0675  5306           JMP DSCF        /YES
0676  1076           TAD CM1
0677  7450           SNA     /@?
0700  5305           JMP DSCI        /YES
0701  1077           TAD CM7
0702  7650           SNA CLA /%?
0703  5307           JMP DSCC        /YES
```

```
0704  2265           ISZ STEST       /NO
0705  2265  DSCI,    ISZ STEST
0706  2265  DSCF,    ISZ STEST
0707  5665  DSCC,    JMP I STEST
            /XDATA:  PROCESSES DATA RECORD
0710  0000  SDATA,   0
0711  7240           CLA CMA
0712  1050           TAD L2020
0713  3011           DCA DSCBUF
0714  1046           TAD FST /GET FORMAT SEQUENCE TRIGGER
0715  0115           AND M6
0716  7650           SNA CLA /DATA PROPERLY SEQUENCED?
0717  5553           JMP I XER4      /NO
0720  1337           TAD RESDSC
0721  3340           DCA DSCLIM
0722  1411  DNXT,    TAD I DSCBUF
0723  3365           DCA DSCTMP
0724  1365           TAD DSCTMP
0725  1036           TAD EOR
0726  7650           SNA CLA /RECORD TERMINATOR?
0727  5341           JMP DEND        /YES
0730  2340           ISZ DSCLIM
0731  5333           JMP .+2
0732  7402           HLT     /DSC RECORD LENGTH ERROR
0733  1365           TAD DSCTMP      /GET DSC CHR
0734  4345           JMS ALGOR       /TRANSFORM INTO DRC CHR
0735  4540           JMS I XPUTCR    /ENTER W/CHAR INTO DRC REC
0736  5322           JMP DNXT
0737  7400  RESDSC,  -400
0740  0000  DSCLIM,  0
0741  7000  DEND,    NOP
0742  7307           CLA CLL IAC RTL /SET FST = 4
0743  3046           DCA FST /FOR DATA REC
0744  5710           JMP I SDATA
0745  0000  ALGOR,   0
0746  4522           JMS I XCRTST
0747  5363           JMP ALC /LCA
0750  5360           JMP AUC /UCA
0751  5355           JMP ANM /#
0752  7300           CLA CLL /OTHER
0753  1112           TAD C77
0754  5745           JMP I ALGOR     /RETURN W/SEP IN ACC
0755  0052  ANM,     AND M17
0756  1111           TAD C65 /NUMBER ADDITIVE
0757  5745           JMP I ALGOR
0760  0053  AUC,     AND M37
0761  1367           TAD C32 /UC ADDITIVE
0762  5745           JMP I ALGOR
0763  0053  ALC,     AND M37
0764  5745           JMP I ALGOR     /LCA HAS NO ADDITIVE
0765  0000  DSCTMP,  0
0766  0000  TSTLOC,  0
0767  0032  C32,     32
            /DRC CODE STRUCTURE:
            /        00-UNUSED
            /        01-32-->LCA
            /        33-64-->UCA
            /        65-76-->#
            /        77-SEP
                     *1000
1000  0000  SPRFMT,  0
1001  5332           JMP M2
1002  1050  MJ4,     TAD L2020
1003  3214           DCA POSQ
1004  1214           TAD POSQ
1005  3302           DCA POSR
1006  3303           DCA SEPTRG
1007  1614  QNXT,    TAD I POSQ
1010  1035           TAD EOR /END OF RECORD?
```

```
1011  7650            SNA CLA /END OF RECORD?
1012  5304            JMP QEND10       /YES
1013  4521            JMS I XTEST      /NO, TEST FOR SPECIAL CHAR
1014  0000  POSQ,     0
1015  7000            NOP       /%
1016  7000            NOP       /#
1017  5240            JMP QSPEC/@
1020  1614            TAD I POSQ/OTHER
1021  4522            JMS I XCRTST     /WHAT TYPE CHAR?
1022  7000            NOP       /LCA
1023  7000            NOP       /UCA
1024  5231            JMP DRCCHR       /#
1025  2303            ISZ SEPTRG       /OTHER-DOUBLE SEPARATOR?
1026  5235            JMP QDEL         /YES, IGNORE
1027  3702            DCA I POSR       /NO
1030  5234            JMP RNXT
1031  3702  DRCCHR,   DCA I POSR
1032  7240            CLA CMA
1033  3303            DCA SEPTRG
1034  2302  RNXT,     ISZ POSR
1035  7300  QDEL,     CLA CLL
1036  2214            ISZ POSQ
1037  5207            JMP QNXT
1040  1614  QSPEC,    TAD I POSQ
1041  3702            DCA I POSR
1042  1302            TAD POSR
1043  7041            CIA
1044  1050            TAD L2020
1045  7640            SZA CLA /SPEC CHAR AT 1ST POS IN REC?
1046  5555            JMP I XER6       /NOT 1ST POS IN REC
1047  1317            TAD CM8
1050  3316            DCA NUMLIM
1051  2302  NNXT,     ISZ POSR
1052  2214  QNXT,     ISZ POSQ
1053  1614            TAD I POSQ
1054  1036            TAD EOR
1055  7650            SNA CLA /RECORD TERMINATOR?
1056  5314            JMP QEND2        /YES
1057  1614            TAD I POSQ       /NO
1060  4522            JMS I XCRTST     /WHAT TYPE CHAR?
1061  5556            JMP I XER7       /LCA
1062  5556            JMP I XER7       /UCA
1063  5274            JMP QNUM         /#
1064  5321            JMP MI  /OTHER
1065  7450  MJ3,      SNA              /FLAG?
1066  5252            JMP ONXT         /YES, IGNORE
1067  1056            TAD C4000
1070  1072            TAD CM1600
1071  7650            SNA CLA /EOL CHAR?
1072  5252            JMP ONXT         /YES, IGNORE
1073  5556            JMP I XER7       /NO, ERR
1074  0052  QNUM,     AND M17
1075  2316            ISZ NUMLIM       /TOO MANY?
1076  5300            JMP .+2 /NO
1077  5556            JMP I XER7       /YES
1100  3702            DCA I POSR
1101  5251            JMP NNXT
1102  0000  POSR,     0
1103  0000  SEPTRG,   0
1104  2303  QEND10,   ISZ SEPTRG
1105  5311            JMP QEND1        /IGNORE DOUBLE SEP AT EOL
1106  1037            TAD SEP /PUT ONE SEP AT EOL
1107  3702            DCA I POSR
1110  2302            ISZ POSR
1111  1320  QEND1,    TAD CDEOR
1112  3702            DCA I POSR
1113  5600            JMP I SPRFMT
1114  1056  QEND2,    TAD C4000
1115  5312            JMP QEND1+1
```

```
1116  0000  NUMLIM, 0
1117  7770  CM8,     -8
1120  0000  CDEOR,   0
1121  7300  M1,      CLA CLL
1122  1614           TAD I POSQ
1123  1331           TAD CM1000
1124  7650           SNA CLA /SPACE?
1125  5252           JMP ONXT        /YES-IGNORE
1126  1614           TAD I POSQ      /NO
1127  1056           TAD C4000
1130  5265           JMP MJ3
1131  7000  CM1000, -1000
1132  7300  M2,      CLA CLL
1133  1450           TAD I L2020
1134  1056           TAD C4000
1135  7650           SNA CLA /FLAG IN 1ST POS OF LINE?
1136  5272           JMP MJ4         /YES - OK
1137  5557           JMP I XER8      /NO - BAD REC (MT ERR)
                     *1200
            /MAGTAPE ROUTINE ADAPTED FROM MT DRIVER
            /PERMITS ON THE FLY OPERATION
            /CALL FROM SAME MEMORY
1200  0000  DRTAPE, 0
1201  7200           CLA
1202  1024           TAD     DRT910+4        /PICK UP PREVIOUS COMMAND
1203  0325           AND     DRT900+2        /WAS INTERRUPT BIT ON
1204  7440           SZA
1205  5213           JMP     DRT10
1206  6701  DRT5,    6701    /MTAF..WAIT TILL FLAG UP
1207  5206           JMP     .-1
1210  6706           6706
1211  3022           DCA     DRT910+2        /SAVE STATUS
1212  5217           JMP     DRT20
1213  7200  DRT10,   CLA
1214  1026           TAD     DRT910+6        /WAIT FOR SIGNAL
1215  7440           SZA     /THAT INTERRUPT OBTAINED
1216  5213           JMP     DRT10
1217  1600  DRT20,   TAD     I DRTAPE
1220  7440           SZA     /TO YIELD STATUS
1221  5230           JMP     DRT200
1222  4420           JMS     I DRT910        /GO TO DRT700 ROUTINE
1223  5226           JMP     DRT30+1 /GO TO ERROR EXIT
1224  5206           JMP     DRT5    /RETRY EXIT
1225  2200  DRT30,   ISZ     DRTAPE  /OK EXIT
1226  2200           ISZ     DRTAPE
1227  5600           JMP     I DRTAPE
1230  7041  DRT200,  CIA
1231  1024           TAD DRT910+4
 232  7650           SNA CLA /NEXT INSTRUCTION SAME AS LAST?
 233  5236           JMP .+3
 234  6711           6711    /NO, WAIT TILL CNTRLLR STOPPED
 235  5234           JMP .-1
 236  1600           TAD I DRTAPE
 237  3024           DCA     DRT910+4        /SAVE COMMAND PARAMETER
 240  3023           DCA     DRT910+3        /PRESET FOR NO RETRIES
 241  1024           TAD     DRT910+4
 242  6716           6716    /LOAD COMMAND REGISTER
 243  0324           AND     DRT900+1        /ISOLATE COMMAND
 244  7112           RTR CLL
 245  7010           RAR
 246  7450           SNA
 247  5226           JMP     DRT30+1 /NO-OP
 250  1254           TAD     DRT210
 251  3253           DCA     .+2
 252  7200           CLA
 253  0000           0
 254  5254  DRT210,  JMP     .
 255  5317           JMP     DRT399
 256  5274           JMP     DRT230  /READ
```

```
1257  5267          JMP     DRT250  /LOAD WORD COUNT
1260  5276          JMP     DRT290  /WRITE
1261  5317          JMP     DRT399  /END OF FILE
1262  7000          NOP     /FORWARD SPACE
1263  2200          ISZ     DRTAPE
1264  1600          TAD     I DRTAPE        /HERE ON BACKSPACE
1265  7041          CIA
1266  5316          JMP     DRT310
1267  2200  DRT250, ISZ     DRTAPE
1270  1600          TAD     I DRTAPE        /PICK UP WORD COUNT
1271  7041          CIA
1272  3021          DCA     DRT910+1
1273  5226          JMP     DRT30+1
1274  1326  DRT280, TAD     DRT900+3        /SET RETRY COUNTER TO 9
1275  5306          JMP     DRT295
1276  1024  DRT290, TAD     DRT910+4        /PICK UP REQUEST PARAMETER
1277  0323          AND     DRT900
1300  7640          SZA CLA
1301  5305          JMP     DRT295-1
1302  1024          TAD     DRT910+4        /PUT IN EXTENDED GAP
1303  1323          TAD     DRT900  /IN CASE OF RETRIES
1304  3024          DCA     DRT910+4
1305  1327          TAD     DRT900+4        /SET RETRY COUNTER TO 2
1306  3023  DRT295, DCA     DRT910+3
1307  2200          ISZ     DRTAPE
1310  7240  DRT300, CLA     CMA     /-1 IN AC
1311  1600          TAD     I DRTAPE
1312  3027          DCA     DRT910+7        /SAVE CURRENT ADDRESS
1313  1027          TAD     DRT910+7
1314  3033          DCA DISCA       /SET CA
1315  1021          TAD DRT910+1
1316  3032  DRT310, DCA DISWC       /SET WC FOR DATA BREAK
1317  1317  DRT399, TAD     DRT399  /PRESET INTERRUPT FLAG
1320  3026          DCA     DRT910+6
1321  6722  DRT400, 6722    /MTGO
1322  5226          JMP     DRT30+1
            /
1323  0100  DRT900, 100     /0-EXTENDED GAP MASK
1324  0070          70      /1-MASK FOR COMMAND
1325  0004          4       /2-CONSTANT 4
1326  7767          -11     /3 - READ ATTEMPTS
1327  7776          -2      /4 - WRITE ATTEMPTS
                    *1400
            /
            /       PART 2 MAG TAPE DRIVER (4.1)
            /SUBROUTINE TO CHECK MAG TAPE STATUS AND DO RETRIES
            /
1400  0000  DRT700, 0       /CHECK STATUS
1401  1025          TAD     DRT910+5        /JUST FINISH BACKSPACE FOR
1402  7440          SZA     /RETRY AT READ/WRITE?
1403  5256          JMP     DRT750  /YES
1404  1022          TAD     DRT910+2        /GET STATUS
1405  0303          AND     DRT799-1
1406  7440          SZA     /ILLEGAL COMMAND ERROR
1407  5274          JMP     DRT790+1        /EXIT DENOTING ERROR
1410  1022          TAD     DRT910+2
1411  7500          SMA
1412  5241          JMP     DRT740  /NO ERROR FLAG
1413  0305          AND     DRT799+1
1414  7450          SNA
1415  5274          JMP     DRT790+1        /NOT PARITY OR TIMING
1416  7200          CLA
1417  1022          TAD     DRT910+2        /ALWAYS GET PARITY
1420  0300          AND     DRT799-4        /ON EOF IF 7 TRK - ODD
1421  7450          SNA
1422  5225          JMP     .+3
1423  3022          DCA     DRT910+2        /SAVE AS EOF ONLY
1424  5274          JMP DRT790+1    /TAKE ERROR EXIT
1425  1023          TAD     DRT910+3
```

```
1426  7500              SMA
1427  5274              JMP     DRT790+1        /EXIT WITH STATUS
1430  2023              ISZ     DRT910+3
1431  7000              NOP
1432  3025              DCA     DRT910+5        /SET FOR SPECIAL BACKSPACE
1433  7240              CLA     CMA     /MINUS 1
1434  3032              DCA DISWC       /TO WC
1435  1024              TAD     DRT910+4        /PREVIOUS COMMAND
1436  0304              AND     DRT799  /ISOLATE UNIT-INTERRUPT
1437  1302              TAD     DRT799-2        /NOW HAVE BACKSPACE
1440  5265              JMP DRT783-2
1441  0300  DRT740,     AND     DRT799-4        /END OF FILE OR BOT
1442  7450              SNA
1443  5272              JMP     DRT790-1        /NO ERRORS
1444  7300              CLA     CLL
1445  1024              TAD     DRT910+4        /END OF FILE BIT IS
1446  0302              AND     DRT799-2        /EXPECTED IF END OF FILE REQUEST
1447  1301              TAD     DRT799-3
1450  7450              SNA
1451  5272              JMP     DRT790-1
1452  1277              TAD     DRT799-5        /BOT EXPECTED IF
1453  7450              SNA     /REWIND
1454  5272              JMP     DRT790-1
1455  5274              JMP     DRT790+1        /ERROR EXIT
1456  7200  DRT750,     CLA
1457  1021              TAD DRT910+1    /PICK UP WORD COUNT
1460  3032              DCA DISWC
1461  3025              DCA DRT910+5    /SIGNAL NOT SPECIAL BACKSPACE
1462  1027              TAD     DRT910+7        /RESET BUFFER ADDRESS
1463  3033              DCA DISCA       /INTO CA
1464  1024              TAD     DRT910+4
1465  6711              6711    /CNTRLLR READY?
1466  5265              JMP .-1
1467  6716  DRT783,     6716    /LOAD COMMAND REGISTER
1470  6722              6722    /MTGO
1471  5273              JMP     DRT790
1472  2200              ISZ     DRT700
1473  2200  DRT790,     ISZ     DRT700
1474  7200              CLA
1475  1022              TAD     DRT910+2        /PICK UP STATUS
1476  5600              JMP     I DRT700
1477  0040              40
1500  1100              1100    /END OF FILE - BOT MASK
1501  7730              -50
1502  0070              70
1503  0400              400     /MASK FOR ILLEGAL COMMAND
1504  7004  DRT799,     7004    /UNIT - INTERRUPT FLAG
1505  0224              224     /TO MSK OUT PRTY,TIMG,ODD/CHR-LGT
            /THE FOLLOWING ROUTINE HANDLES MAGTAPE INTERRUPTS
1506  0000  DRT800,     0
1507  7200              CLA
1510  1024              TAD     DRT910+4
1511  0330              AND     DRT899
1512  7640              SZA CLA
1513  6701              6701    /TAPE INTERRUPT?
1514  5326              JMP DRT890+3    /NO
1515  6706              6706    /PICK UP STATUS
1516  3022              DCA     DRT910+2
1517  6712              6712    /CLEAR FLAGS
1520  4200              JMS     DRT700
1521  5324              JMP DRT890+1    /PUT ERROR STATUS IN ERRTRG; SIGNAL DONE
1522  5326              JMP DRT890+3    /DON'T SIGNAL DONE; DO RETRY
1523  7200  DRT890,     CLA     /SIGNAL INTERRUPT
1524  3031              DCA ERRTRG
1525  3026              DCA     DRT910+6        /OBTAINED
1526  7300              CLA CLL
1527  5706              JMP     I DRT800
1530  0004  DRT899,     4
                        *1600   /MAINLINE
```

```
1600  4527            JMS I XINIT     /INITIALIZE PROGRAM VARIABLE
1601  4530  RTN1,     JMS I XINPUT    /INPUT RECORD
1602  7402            HLT         /RETURN:         EOF
1603  4531            JMS I XPRFMT    /PREPARE DATA
1604  4521            JMS I XTEST     /GET RECORD TYPE BY TESTING
1605  2020            2020      /FIRST CHAR IN REC
1606  5213            JMP RTN2        /RETURN:         CARTRIDGE # REC
1607  5215            JMP RTN3        /RETURN:         FRAME # REC
1610  5217            JMP RTN4        /RETURN:         CONTROL INFO REC
1611  4532            JMS I XDATA     /RETURN:         DATA-PROCESS II
1612  5201            JMP RTN1
1613  4533  RTN2,     JMS I XCART     /PROCESS CART #
1614  5201            JMP RTN1
1615  4534  RTN3,     JMS I XFRAM     /PROCESS FRAME #
1616  5201            JMP RTN1
1617  5557  RTN4,     JMP I XER8      /CONTROL INFO NOT ALLOWED YET
1620  5201            JMP RTN1
1621  4536  RTN6,     JMS I XEND      /COMPLETE PROCESSING
1622  7402            HLT       /TERMINATION OF PROCESSING

                /XINIT: INITIALIZES VARIABLES FROM PROGRAM RESTART
1623  0000  SINIT,    0
1624  3040            DCA CSH
1625  3041            DCA CSL
1626  3042            DCA FSH
1627  3043            DCA FSL
1630  3044            DCA MPF
1631  3046            DCA FST
1632  7201            CLA IAC
1633  3047            DCA ZOUT1
1634  4365            JMS DRESET
1635  5623            JMP I SINIT

                /XZOUT: ENTERS THE NECESSARY INFORMATION INTO THE DRC
                /       HEADER BLOCK - OUTPUTS THE DRC RECORD -
                /       RESETS THE DATA POINTER TO THE BEGINNING OF
                /       THE DATA BLOCK - ZEROS THE DATA BLOCK
1636  0000  SZOUT,    0
1637  4561            JMS I XSEQ      /SEQUENCE CHECK
1640  3275            DCA ZBUF
1641  6211            CDF1
1642  1040            TAD CSH
1643  3675            DCA I ZBUF      /HIGH ORDER CARTRIDGE # INTO POS 0
1644  2275            ISZ ZBUF
1645  1041            TAD CSL
1646  3675            DCA I ZBUF      /LOW ORDER CARTRIDGE # INTO 1
1647  2275            ISZ ZBUF
1650  1042            TAD FSH
1651  3675            DCA I ZBUF      /HIGH ORDER FRAME # INTO 2
1652  2275            ISZ ZBUF
1653  1043            TAD FSL
1654  3675            DCA I ZBUF      /LOW ORDER FRAME # INTO 3
1655  2275            ISZ ZBUF
1656  1044            TAD MPF
1657  3675            DCA I ZBUF      /MX PER FRAME # INTO 4
1660  6201            CDF0
1661  4276            JMS SZERO       /ZERO HEADER PORTION
1662  0006            6         /LOCATIONS 6
1663  0017            17        /THROUGH 17 - UM
1664  4523            JMS I XOTPUT    /OUTPUT DRC RECORD
1665  4276            JMS SZERO       /ZERO DATA PORTION
1666  0020            20        /LOCATIONS 20
1667  3777            3777      /THROUGH 3777
1670  1363            TAD DC4020      /SET DATA POINTER TO
1671  6211            CDF1      /INITIAL LOC IN REC
1672  3761            DCA I DRCPOS    /DATA POINTER ALWAYS =
1673  6201            CDF0      /4TH POS IN DRC RECORD
1674  5636            JMP I SZOUT
```

```
1675  0000  ZBUF,    0
              /XZERO: ZEROS LOCATIONS FROM
              /LOWER BOUND HERE
              /UPPER BOUND HERE
              /NOTE:  CAN WRAP AROUND ZERO AND ASCENDS
1676  0000  SZERO,   0
1677  7300           CLA CLL
1700  1676           TAD I SZERO
1701  2276           ISZ SZERO
1702  3321           DCA ZPOS
1703  1676           TAD I SZERO
1704  2276           ISZ SZERO
1705  3322           DCA ZLIM
1706  6211  ZNXT,    CDF1
1707  3721           DCA I ZPOS
1710  6201           CDF0
1711  1321           TAD ZPOS
1712  7041           CIA
1713  1322           TAD ZLIM
1714  7650           SNA CLA /AT LIMIT?
1715  5676           JMP I SZERO      /YES
1716  2321           ISZ ZPOS         /NO
1717  5306           JMP ZNXT
1720  5306           JMP ZNXT         /TO WRAP AROUND 0
1721  0000  ZPOS,    0
1722  0000  ZLIM,    0
              /XPUTCR:          ENTERS CHAR INTO DRC REC BUF AT APPROPRIATE LOC.
1723  0000  DPUTCR,  0
1724  0360           AND DM77
1725  7421           MQL     /STORE MASKED CHAR
1726  6211           CDF1    /CHANGE DATA FIELDS
1727  1761           TAD I DRCPOS     /LOC 5 = LOC OF NEXT CHAR SLOT
1730  7500           SMA     /CHAR GOING IN 1ST HALF OF LOC?
1731  5345           JMP SCDHLF       /NO
1732  0364           AND DM3777       /YES, MASK OFF NEG TRG
1733  7450           SNA     /BFFER OVRFLW?
1734  5376           JMP ERRD1        /YES
1735  3362           DCA DTMP         /NO, SAVE LOC
1736  7501           MQA     /GET CHAR
1737  7002           7002    /BSW--PUT CHAR INTO BITS 0-5
1740  3762           DCA I DTMP       /PUT CHAR INTO LOC--UM
1741  1362           TAD DTMP
1742  3761  DRCNXT,  DCA I DRCPOS     /RETURN POS FOR NXT CHAR
1743  6201           CDF0    /RETURN TO LM
1744  5723           JMP I DPUTCR     /EXIT
1745  3362  SCDHLF,  DCA DTMP
1746  1762           TAD I DTMP       /GET CONTENTS ALREADY IN LOC--UM
1747  7501           MQA     /OR IN 2ND CHAR
1750  3762           DCA I DTMP       /PUT TWO CHARS BACK--UM
1751  1357           TAD DM4000
1752  7421           MQL     /LOAD NEG TRG INTO MQ
1753  2362           ISZ DTMP         /INCR DATA POINTER TO NXT LOC
1754  1362           TAD DTMP         /GET NXT LOC
1755  7501           MQA     /OR IN MINUS TRIGGER
1756  5342           JMP DRCNXT       /CONTINUE
1757  4000  DM4000,  4000
1760  0077  DM77,    77
1761  0005  DRCPOS,  5
1762  0000  DTMP,    0
1763  4020  DC4020,  4020
1764  3777  DM3777,  3777
1765  0000  DRESET,  0
1766  1116           TAD C4020
1767  6211           CDF1
1770  3761           DCA I DRCPOS
1771  6201           CDF0
1772  4276           JMS SZERO
1773  0020           20
1774  3777           3777
```

```
1775  5765          JMP I DRESET
1776  6201  ERRD1,  CDF0
1777  5560          JMP I XER9
                    *6000
6000  2344  ERR,    ISZ LET
6001  2344          ISZ LET
6002  2344          ISZ LET
6003  2344          ISZ LET
6004  2344          ISZ LET
6005  2344          ISZ LET
6006  2344          ISZ LET
6007  2344          ISZ LET
6010  2344          ISZ,LET
6011  2344          ISZ LET
6012  7300          CLA CLL
6013  1344          TAD LET
6014  1345          TAD ALPHA
6015  3346          DCA LETTER
6016  1344          TAD LET
6017  1357          TAD STRIN
6020  3347          DCA RTNLOC
6021  1747          TAD I RTNLOC
6022  3347          DCA RTNLOC
6023  3344          DCA LET
6024  1350          TAD CR
6025  4310          JMS PRT
6026  1351          TAD LF
6027  4310          JMS PRT
6030  1040          TAD CSH
6031  3254          DCA HI
6032  1041          TAD CSL
6033  3255          DCA LO
6034  4247          JMS PRTNUM
6035  1042          TAD FSH
6036  3254          DCA HI
6037  1043          TAD FSL
6040  3255          DCA LO
6041  4247          JMS PRTNUM
6042  3254          DCA HI
6043  1044          TAD MPF
6044  3255          DCA LO
6045  4247          JMS PRTNUM
6046  5747          JMP I RTNLOC
6047  0000  PRTNUM, 0
6050  3352          DCA TRG
6051  1346          TAD LETTER
6052  4310          JMS PRT
6053  4562          JMS I XOCDEC
6054  0000  HI,     0
6055  0000  LO,     0
6056  0000          0
6057  0000          0
6060  0000          0
6061  0000  D5,     0
6062  0000          0
6063  0000          0
6064  0000          0
6065  0000          0
6066  1100          TAD CM5
6067  3354          DCA CNT
6070  1355          TAD DD5
6071  3356          DCA LST
6072  1756  NXT,    TAD I LST
6073  2356          ISZ LST
6074  7450          SNA             /0?
6075  5300          JMP P1          /YES.
6076  2352          ISZ TRG         /NO
6077  5302          JMP P2
6100  1352  P1,     TAD TRG
```

```
6101   7640            SZA CLA          /0?
6102   1057   P2,      TAD C20          /NO-PRINT 0
6103   1353            TAD SP           /YES - PRINT SPACE
6104   4310            JMS PRT
6105   2354            ISZ CNT          /DONE?
6106   5272            JMP NXT          /NO
6107   5647            JMP I PRTNUM     /YES
6110   0000   PRT,     0
6111   6046            6046
6112   6041            6041
6113   5312            JMP .-1
6114   7300            CLA CLL
6115   5710            JMP I PRT

                       *6124
6124   0000   SEQ,     0
6125   7240            CLA CMA
6126   1043            TAD FSL
6127   1336            TAD SAVFRM
6130   7440            SZA              /GREATER?
6131   5373            JMP SCHG         /NO
6132   4337   SRTN,    JMS SAVE         /YES
6133   5724            JMP I SEQ
6134   4337   ERI,     JMS SAVE
6135   5200            JMP ERR
6136   0000   SAVFRM,  0
6137   0000   SAVE,    0
6140   1043            TAD FSL
6141   7041            CIA
6142   3336            DCA SAVFRM
6143   5737            JMP I SAVE
6144   0000   LET,     0
6145   0300   ALPHA,   300
6146   0000   LETTER,  0
6147   0000   RTNLOC,  0
6150   0215   CR,      215
6151   0212   LF,      212
6152   0000   TRG,     0
6153   0240   SP,      240
6154   0000   CNT,     0
6155   0061   DD5,     D5
6156   0000   LST,     0
6157   6157   STRIN,   STRIN
6160   0405            405
6161   0430            430
6162   0470            470
6163   0720            720
6164   0741            741
6165   1035            1035
6166   1114            1114
6167   1601            1601
6170   1743            1743
6171   1640            1640
6172   0000            0
6173   7001   SCHG,    IAC
6174   7650            SNA CLA          /SAME?
6175   5724            JMP I SEQ        /YES
6176   5334            JMP ERI          /NO

              PAGE
              /XDECOC:        CONVERTS A STRING OF BCD DIGITS TO A
              /         DOUBLE PRECISION BINARY EQUIVALENT
              /CALL:    JMS I XDECOC
              /         LOCATION OF BUFFER
              /         *HIGH ORDER EQUIV RETURNED HERE
              /         *LOW ORDER EQUIV RETURNED HERE
              /         *CONTROL RESUMES HERE
              /METHOD:        2(4X+X) + Y---X=EXISTING SUM; Y=LAST DIGIT
```

```
6200  0000  DECOC,  0
6201  1600          TAD I DECOC
6202  2200          ISZ DECOC
6203  3275          DCA DIGITS      /LOC OF BCD DIGITS BUFFER
6204  3272          DCA HORD
6205  3271          DCA LORD
6206  3274          DCA HTMP
6207  3273          DCA LTMP
6210  1675  NXDIG,  TAD I DIGITS
6211  2275          ISZ DIGITS
6212  7510          SPA         /END OF BUFFER(BIN 5000)?
6213  5261          JMP RETDIG      /YES
6214  7421          MQL      /NO, STORE
6215  1272          TAD HORD
6216  3274          DCA HTMP
6217  1271          TAD LORD
6220  3273          DCA LTMP
6221  4232          JMS MULT2
6222  4232          JMS MULT2
6223  4245          JMS ADDER
6224  4232          JMS MULT2
6225  3274          DCA HTMP
6226  7501          MQA
6227  3273          DCA LTMP
6230  4245          JMS ADDER       /ADD LAST DIGIT (Y)
6231  5210          JMP NXDIG
6232  0000  MULT2,  0
6233  1271          TAD LORD
6234  7104          CLL RAL
6235  3271          DCA LORD
6236  7204          GLK
6237  3276          DCA EXCESS
6240  1272          TAD HORD
6241  7104          CLL RAL
6242  1276          TAD EXCESS
6243  3272          DCA HORD
6244  5632          JMP I MULT2
6245  0000  ADDER,  0
6246  7300          CLA CLL
6247  1271          TAD LORD
6250  1273          TAD LTMP
6251  3271          DCA LORD
6252  7204          GLK
6253  3276          DCA EXCESS
6254  1272          TAD HORD
6255  1274          TAD HTMP
6256  1276          TAD EXCESS
6257  3272          DCA HORD
6260  5645          JMP I ADDER
6261  7300  RETDIG, CLA CLL
6262  1272          TAD HORD
6263  3600          DCA I DECOC
6264  2200          ISZ DECOC
6265  1271          TAD LORD
6266  3600          DCA I DECOC
6267  2200          ISZ DECOC
6270  5600          JMP I DECOC
6271  0000  LORD,   0
6272  0000  HORD,   0
6273  0000  LTMP,   0
6274  0000  HTMP,   0
6275  0000  DIGITS, 0
6276  0000  EXCESS, 0
            PAGE

6400  0000  OCDEC,  0
6401  7300          CLA CLL
6402  1600          TAD I OCDEC
6403  2200          ISZ OCDEC
```

```
6404  3255            DCA UDHIGH
6405  1600            TAD I OCDEC
6406  2200            ISZ OCDEC
6407  3256            DCA UDLOW
6410  1251            TAD UDLOOP
6411  3254            DCA UDCNT
6412  1252            TAD UDADDR
6413  3264            DCA UDPTR
6414  3261            DCA UDBOX
6415  1664  UDARND,   TAD I UDPTR
6416  2264            ISZ UDPTR
6417  3257            DCA UDHSUB
6420  1664            TAD I UDPTR
6421  2264            ISZ UDPTR
6422  3260            DCA UDLSUB
6423  7100  UDDO,     CLL
6424  1260            TAD UDLSUB
6425  1256            TAD UDLOW
6426  3262            DCA UDTEML
6427  7004            RAL
6430  1257            TAD UDHSUB
6431  1255            TAD UDHIGH
6432  7420            SNL
6433  5241            JMP UDOUT
6434  2261            ISZ UDBOX
6435  3255            DCA UDHIGH
6436  1262            TAD UDTEML
6437  3256            DCA UDLOW
6440  5223            JMP UDDO
6441  7200  UDOUT,    CLA
6442  1261            TAD UDBOX
6443  3600            DCA I OCDEC
6444  2200            ISZ OCDEC
6445  3261            DCA UDBOX
6446  2254            ISZ UDCNT
6447  5215            JMP UDARND
6450  5600            JMP I OCDEC
6451  7770  UDLOOP,   -10
6452  6465  UDADDR,   UDCONT
6453  0260  UDTWO,    260
6454  0000  UDCNT,    0
6455  0000  UDHIGH,   0
6456  0000  UDLOW,    0
6457  0000  UDHSUB,   0
6460  0000  UDLSUB,   0
6461  0000  UDBOX,    0
6462  0000  UDTEML,   0
6463  0000  UDGET,    0
6464  0000  UDPTR,    0
6465  3166  UDCONT,   3166  /POWERS OF TEN
6466  4600            4600
6467  7413            7413
6470  6700            6700
6471  7747            7747
6472  4540            4540
6473  7775            7775
6474  4360            4360
6475  7777            7777
6476  6030            6030
6477  7777            7777
6500  7634            7634
6501  7777            7777
6502  7766            7766
6503  7777            7777
6504  7777            7777

            PAGE

ADDER  0245
```

| | |
|---|---|
| ALC | 0763 |
| ALGOR | 0745 |
| ALPHA | 0145 |
| ANM | 0755 |
| AUC | 0760 |
| BCODE | 0634 |
| BIN | 0640 |
| BNOTIN | 0637 |
| BUSYFG | 0026 |
| CDEOR | 1120 |
| CH | 0407 |
| CL | 0410 |
| CMX | 0454 |
| CMXD | 0466 |
| CM1 | 0076 |
| CM1000 | 1131 |
| CM1600 | 0072 |
| CM162 | 0105 |
| CM1701 | 0075 |
| CM2 | 0073 |
| CM212 | 0103 |
| CM243 | 0106 |
| CM244 | 0102 |
| CM3 | 0104 |
| CM35 | 0107 |
| CM4 | 0074 |
| CM400 | 0101 |
| CM5 | 0100 |
| CM7 | 0077 |
| CM8 | 1117 |
| CNT | 6154 |
| CR | 6150 |
| CSH | 0040 |
| CSL | 0041 |
| C100 | 0071 |
| C1000 | 0061 |
| C101 | 0070 |
| C1010 | 0353 |
| C1100 | 0062 |
| C1200 | 0063 |
| C1300 | 0064 |
| C17 | 0066 |
| C20 | 0057 |
| C24 | 0067 |
| C32 | 0767 |
| C33 | 0110 |
| C4 | 0114 |
| C40 | 0065 |
| C4000 | 0056 |
| C4020 | 0116 |
| C44 | 0060 |
| C5010 | 0113 |
| C65 | 0111 |
| C77 | 0112 |
| DC4020 | 1763 |
| DDNXT | 0475 |
| DQ5 | 6155 |
| DECOC | 6200 |
| DEND | 0741 |
| DIGITS | 6275 |
| DISCA | 0033 |
| DISNC | 0032 |
| DL | 0522 |
| DM3777 | 1764 |
| DM4000 | 1757 |
| DM77 | 1760 |
| DNXT | 0722 |
| DPOTCR | 1723 |
| DRCBUF | 0010 |

| | |
|---|---|
| DRCCHR | 1031 |
| DRCCOD | 0664 |
| DRCLIM | 0045 |
| DRCNXT | 1742 |
| DRCPOS | 1761 |
| DRESET | 1765 |
| DRTAPE | 1200 |
| DR110 | 1213 |
| DR120 | 1217 |
| DR1200 | 1230 |
| DR1210 | 1254 |
| DR1250 | 1267 |
| DR1280 | 1274 |
| DR1290 | 1276 |
| DR1295 | 1306 |
| DR130 | 1225 |
| DR1300 | 1310 |
| DR1310 | 1316 |
| DR1399 | 1317 |
| DR1400 | 1321 |
| DR15 | 1206 |
| DR1700 | 1400 |
| DR1740 | 1441 |
| DR1750 | 1456 |
| DR1788 | 1467 |
| DR1790 | 1473 |
| DR1799 | 1504 |
| DR1800 | 1506 |
| DR1890 | 1523 |
| [illegible] | [illegible] |
| DR1900 | 1323 |
| DR1910 | 0020 |
| DSCBUF | 0011 |
| DSCC | 0707 |
| DSCF | 0706 |
| DSCI | 0705 |
| DSCLIM | 0740 |
| DSCTMP | 0765 |
| DTMP | 1762 |
| D5 | 6061 |
| EOR | 0036 |
| ERR | 6000 |
| ERRD1 | 1776 |
| ERRRIN | 0662 |
| ERRTRG | 0031 |
| ER1 | 6134 |
| EXCESS | 6276 |
| FH | 0432 |
| FL | 0433 |
| FSH | 0042 |
| FSL | 0043 |
| FST | 0046 |
| GO | 0340 |
| HI | 6054 |
| HORD | 6272 |
| HTMP | 6274 |
| LB | 0635 |
| LET | 6144 |
| LETTER | 6146 |
| LF | 6151 |
| LIM | 0623 |
| LO | 6055 |
| LORD | 6271 |
| LST | 6150 |
| LTMP | 6273 |
| L2020 | 0050 |
| MJ3 | 1065 |
| MJ4 | 1002 |

```
MPF     0044
MUL12   6232
M1      1121
M100    0054
M17     0052
M2      1132
M3      0051
M3604   0055
M37     0053
M6      0115
NNXT    1051
NUMLIM  1116
NXDIG   6210
NXT     6072
OCDEC   6400
ONXT    1052
OUTIST  0446
PDNXT   0506
PL      0521
POSQ    1014
POSR    1102
PRT     6110
PRINUM  6047
P1      6100
P2      6102
QDEL    1035
QEND1   1111
QEND10  1104
QEND2   1114
QNUM    1074
QNXT    1007
QSPEC   1040
RESDSC  0737
RETDIG  6261
RNXT    1034
RRBUF   0331
RREND   0322
RRNXT   0274
RRTEMP  0332
RTNLOC  6147
RTN1    1601
RTN2    1613
RTN3    1615
RTN4    1617
RTN6    1621
SAVE    6137
SAVFRM  6136
SCART   0400
SCDHLF  1745
SCHCNT  0523
SCHG    6173
SCRIST  0600
SDATA   0710
SDRCLM  0642
SENDIT  0333
SEP     0037
SEPTRG  1103
SEQ     6124
SFRAM   0421
SINIT   1623
SINPT   0271
SINPTD  0205
SINPUT  0254
SOTPUT  0237
SP      6153
SPRFMT  1000
SRTN    6132
SSERCH  0472
STEST   0665
```

```
STRIN   0157
SZERO   1676
SZOUT   1636
TERROR  0236
TEST    0354
TESTER  0215
TRG     0152
TSILOC  0766
UB      0636
UDADDR  0452
UDARND  0415
UDBOX   0461
UDCNT   0454
UDCONT  0465
UDDO    0423
UDGET   0463
UDHIGH  0455
UDHSUB  0457
UDLOOP  0451
UDLOW   0456
UDLSUB  0460
UDOUT   0441
UDPTR   0464
UDTEML  0462
UDTRO   0453
WRLCNT  0021
XCART   0133
XCRTST  0122
XDATA   0132
XDECOD  0124
XDTAPE  0030
XEND    0136
XER1    0150
XER2    0151
XER3    0152
XER4    0153
XER5    0154
XER6    0155
XER7    0156
XER8    0157
XER9    0160
XFRAM   0134
XINFO   0135
XINIT   0127
XINPTD  0137
XINPUT  0130
XOCDEC  0162
XOTPUT  0123
XPRFMT  0131
XPUTCH  0140
XSEQ    0161
XSERCH  0125
XTEST   0121
XZOUT   0126
ZBUF    1675
ZLIM    1722
ZNXT    1706
ZOUT1   0047
ZPOS    1721
```

PROGRAM 2 - CRTE

```
MQA=7501
MQL=7421
BSA=7002
CDF0=6201
```

```
                CDF1=6211
                CDF2=6221
                FIXTAB

                        *10     /CRTE: ADDRESS TABLE
0010    0000    BUFH,   0
                        *20
0020    1400    DRT910, 1400    /DATUM USES THESE
0021    0000    WRDCNT, 0
0022    0000            0
0023    0000            0
0024    1024            1024
0025    0000            0
0026    0000    BUSYFG, 0
0027    0000            0
0030    1200    XDTAPE, 1200
0031    0000    ERRTRG, 0
0032    0000    DISWC,  0
0033    0000    DISCA,  0
0034    0000    XDT800, 0       /*UP TO HERE
                        *40
0040    0000            0
0041    0000    CART,   0
0042    0000    FRH,    0
0043    0000    FRL,    0
0044    0000    MPF,    0
0045    0000    MCNT,   0
0046    0000    LOC2,   0
0047    0000    CONT,   0
0050    0000    KCNT,   0

                        *60
0060    7440    BEGQT,  -340
0061    0223    XOFF,   223
0062    7533    CM245,  -245
0063    7526    CM252,  -252
0064    0001    SEPTRG, 1
0065    7520    CM260,  -260
0066    7766    CM12,   -12
0067    7771    CM7,    -7
0070    7746    CM32,   -32
0071    7772    CM6,    -6
0072    0077    C77,    77
0073    0065    C65,    65
0074    0033    C33,    33
0075    0000    LOCST,  0
0076    0000    SEPLOC, 0
0077    7757    CM21,   -21
0100    0000    LINCNT, 0
0101    7660    CM120,  -120
0102    0000    CRCNT,  0
0103    7540    CM240,  -240
0104    0213    CARRET, 213
0105    0203    ENDTXT, 203
0106    0245    ENDSCR, 245
0107    0252    ASTRSK, 252
0110    0000    LOC3,   0
0111    0260    C260,   260
0112    4002    C4002,  4002
0113    4003    C4003,  4003
0114    0000    KYCHR,  0
0115    0243    C243,   243

                        *116
0116    4020    C4020,  4020
0117    0261    C261,   261
0120    0237    C237,   237
```

```
0121  0000  FRSTCR, 0

                    *122
0122  0200  XMAGIN, 200
0123  0260  XMAGOT, 260
0124  0300  XKEYIN, 300
0125  0320  XKEYOT, 320
0126  2700  XDECOC, 2700
0127  3000  XOCDEC, 3000
0130  0400  XTRPOS, 400
0131  1110  XHEADR, 1110
0132  0534  XNUM,   534
0133  1717  XPUTCR, 1717
0134  1765  XRESET, 1765
0135  2200  XDOOFF, 2200
0136  2220  XRETRN, 2220
0137  0654  XASCIF, 654
0140  1636  XZOUT,  1636
0141  0600  XCRTIN, 600
0142  1000  XCRTOT, 1000
0143  2300  XSTCT,  2300
0144  0000  FLG,    0
0145  0017  C17,    17
0146  4000  C4000,  4000
0147  0335  XSRCH,  335
0150  2400  XREQST, 2400
0151  2311  XACPT,  2311
0152  2356  XDIG1,  2356
0153  2357  XDIG2,  2357
0154  0000  FLG2,   0
0155  7402  CED,    -376
0156  1121  XNXFRM, TAD FRSTCR
0157  1155          TAD CED
0160  7640          SZA CLA /GET NEXT FRAME?
0161  5565          JMP I XOFDO     /NO, CHECK IF INSERT
0162  7201          CLA IAC /YES
0163  3154          DCA FLG2
0164  5566          JMP I XNFRAM
0165  0642  XOFDO,  642
0166  0613  XNFRAM, 613
                    *1600   /MAINLINE:      CRTE
1600  6340          6340    /SET [illegible] FLAG
1601  4534          JMS I XRESET    /RESET OUTPUT PRMS & BUF
1602  4547  ST1,    JMS I XSRCH     /READ UP TO SPECIFIC RECORD
1603  4542  ST2,    JMS I XCRTOT    /OUTPUT MAG CHRS TO SCREEN
1604  4541  ST3,    JMS I XCRTIN    /INPUT FROM CRT:        PUT IN MAG
1605  1047          TAD CONT        /BUF & OUTPUT IF * OCCURS
1606  7640          SZA CLA /ANY MORE MAG CHARS?
1607  5203          JMP ST2 /YES, CONTINUE
1610  1144          TAD FLG /NO,
1611  7650          SNA CLA /INSERTED FRAME?
1612  5216          JMP TSTGET      /NO
1613  3144          DCA FLG /YES
1614  4531          JMS I XHEADR    /OUTPUT HEADER AND ACCEPT INSERT
1615  5204          JMP ST3
1616  1154  TSTGET, TAD FLG2
1617  7650          SNA CLA /GET NEXT RECORD?
1620  5202          JMP ST1 /NO
1621  3154          DCA FLG2        /YES
1622  4522          JMS I XMAGIN
1623  4530          JMS I XTRPOS
1624  4542          JMS I XCRTOT    /OUTPUT MAG CHRS TO SCREEN
1625  1120          TAD C237
1626  4525          JMS I XKEYOT
1627  5204          JMP ST3

                    *200
```

```
0200 0000 MAGIN,  0
0201 7300         CLA CLL /SET MEM EXT TO ZERO
0202 6717         6717
0203 7330         7330
0204 3021         DCA WRDCNT      /6000
0205 4430         JMS I XDTAPE    /INPUT AT 4000 MBI
0206 1220         1220
0207 4000         4000
0210 4430         JMS I XDTAPE    /CHECK STATUS
0211 0000         0
0212 5216         JMP TSTEOF      /MT READ ERROR
0213 7300         CLA CLL /MT OK
0214 7000         NOP
0215 5600         JMP I MAGIN
0216 7421 TSTEOF, MQL     /STORE STATUS IN MQ
0217 7501         MQA
0220 0247         AND C100
0221 7650         SNA CLA /EOF?
0222 7402         HLT     /NO-MAG TAPE INPUT ERROR
0223 4430         JMS I XDTAPE    /YES
0224 0050         50
0225 4430         JMS I XDTAPE
0226 0000         0
0227 7402         HLT     /MT ERROR ON EOF
0230 7300         CLA CLL
0231 1250         TAD C10
0232 6716         6716
0233 6721         6721
0234 5233         JMP .-1
0235 6722         6722
0236 7300         CLA CLL
0237 1251         TAD C1010
0240 6716         6716
0241 6721         6721
0242 5241         JMP .-1
0243 6722         6722
0244 7300         CLA CLL
0245 7402         HLT     /PROCESSG COMPLETE
0246 0001 C101,   1
0247 0100 C100,   100
0250 0010 C10,    10
0251 1010 C1010,  1010

                  *200
0260 0000 MAGOT,  0
0261 4676         JMS I XFLGIT
0262 7300         CLA CLL
0263 6717         6717
0264 7330         7330
0265 3021         DCA WRDCNT      /6000
0266 4430         JMS I XDTAPE
0267 0240         240
0270 4000 BUFMAG, 4000
0271 4430         JMS I XDTAPE    /TEST STATUS
0272 0000         0
0273 7402         HLT     /MT OUTPUT ERROR
0274 7300         CLA CLL
0275 5660         JMP I MAGOT
0276 2600 XFLGIT, 2600

                  *300
0300 0000 KEYIN,  0
0301 7300         CLA CLL
0302 6331         6331
0303 5302         JMP .-1
0304 6336         6336
0305 5700         JMP I KEYIN

                  *320
```

```
0320  0000  KEYOT,  0
0321  6341          6341
0322  5321          JMP .-1
0323  6346          6346
0324  7300          CLA CLL
0325  5720          JMP I KEYOT

                    *400
0400  0000  TRPOS,  0
0401  1116          TAD C4020
0402  3306          DCA LOC1
0403  3046          DCA LOC2
0404  3307          DCA DATA
0405  7330  NXCR,   7330
0406  3310          DCA SWITCH
0407  4214          JMS DOCHR
0410  3310          DCA SWITCH
0411  4214          JMS DOCHR
0412  2306          ISZ LOC1
0413  5205          JMP NXCR
0414  0000  DOCHR,  0
0415  1306          TAD LOC1
0416  0311          AND C3777
0417  1310          TAD SWITCH
0420  7041          CIA
0421  7000          NOP
0422  1712          TAD I C5
0423  7640          SZA CLA /EOF?
0424  5242          JMP NOTEND      /NO
0425  6211          CDF1    /YES
0426  3446          DCA I LOC2
0427  7000          NOP
0430  1046          TAD LOC2
0431  3045          DCA MCNT
0432  3046          DCA LOC2
0433  6201          CDF0
0434  1512          TAD I C4002
0435  3042          DCA FRH
0436  1513          TAD I C4003
0437  3043          DCA FRL
0440  4534          JMS I XRESET
0441  5600          JMP I TRPOS
0442  1310  NOTEND, TAD SWITCH
0443  7106          CLL RTL
0444  7004          RAL
0445  1313          TAD C7000
0446  3250          DCA INST1
0447  1706          TAD I LOC1
0450  0000  INST1,  0       /BSW OR NOP
0451  0072          AND C77
0452  7450          SNA     /0?
0453  7402          HLT     /YES-ERROR
0454  7421          MQL     /STORE
0455  7501          MQA
0456  1314          TAD CM33
0457  7510          SPA
0460  5301          JMP LCAB
0461  1070          TAD CM32
0462  7510          SPA
0463  5276          JMP UCAB
0464  1066          TAD CM12
0465  7650          SNA CLA
0466  5304          JMP SEPB
0467  7701          7701    /CLA MQL
0470  1315  NUMB,   TAD C173
0471  6211  NXLC,   CDF1    /TRANSPOSE IN MEMORY 1
0472  3446          DCA I LOC2
0473  2046          ISZ LOC2
```

```
0474  6201             CDF0
0475  5614             JMP I DOCHR
0476  7701  UCAB,      7701    /CLA MQL
0477  1316             TAD C246
0500  5271             JMP NXLC
0501  7701  LCAB,      7701    /CLA MQL
0502  1317             TAD C340
0503  5271             JMP NXLC
0504  1320  SEPB,      TAD C240
0505  5271             JMP NXLC
0506  0000  LOC1,      0
0507  0000  DATA,      0
0510  0000  SWITCH,    0
0511  3777  C3777,     3777
0512  4005  C5,        4005
0513  7000  C7000,     7000
0514  7745  CM33,      -33
0515  0173  C173,      173
0516  0246  C246,      246
0517  0340  C340,      340
0520  0240  C240,      240

                       *534
0534  0000  NUM,       0
0535  3342             DCA X2
0536  7501             MQA
0537  3341             DCA X1
0540  4527             JMS I XOCDEC
0541  0000  X1,        0
0542  0000  X2,        0
0543  0000             0
0544  0000             0
0545  0000             0
0546  0000             0
0547  0000  D4,        0
0550  0000  D3,        0
0551  0000  D2,        0
0552  0000  D1,        0
0553  7240             CLA CMA
0554  1734             TAD I NUM
0555  2334             ISZ NUM
0556  3010             DCA BUFH
0557  1347             TAD D4
0560  1111             TAD C260
0561  3410             DCA I BUFH
0562  1350             TAD D3
0563  1111             TAD C260
0564  3410             DCA I BUFH
0565  1351             TAD D2
0566  1111             TAD C260
0567  3410             DCA I BUFH
0570  1352             TAD D1
0571  1111             TAD C260
0572  3410             DCA I BUFH
0573  5734             JMP I NUM

                       *600
0600  0000  CRTIN,     0
0601  4524             JMS I XKEYIN
0602  3121             DCA FRSTCR      /SAVE CHAR
0603  1121             TAD FRSTCR
0604  1060             TAD BEGOT
0605  7640             SZA CLA /CURSOR HOME?
0606  5156             JMP XNXFRM      /NO
0607  4524             JMS I XKEYIN    /ACCEPT AND IGNORE CEDILA
0610  1155             TAD CED
0611  7640             SZA CLA /CEDILA?
```

```
0612  7000            NOP
0613  4320  NXFRM,    JMS FRAMDO
0614  4337            JMS CARTDO
0615  4524  NXCC,     JMS I XKEYIN
0616  3114            DCA KYCHR
0617  1114            TAD KYCHR
0620  7421            MQL
0621  4254            JMS ASCIF        /NO, FILTER AND TRANS CHAR
0622  4533            JMS I XPUTCR     /RETN: STORANG
0623  7300            CLA CLL /RETN: NO STORAGE
0624  1114            TAD KYCHR
0625  1062            TAD CM245
0626  7650            SNA CLA /END OF SCREEN?
0627  5600            JMP I CRTIN      /YES
0630  1114            TAD KYCHR
0631  1063            TAD CM252
0632  7650            SNA CLA /MAG BREAK?
0633  5235            JMP CBRK         /YES
0634  5215            JMP NXCC
0635  2044  CBRK,     ISZ MPF
0636  4535            JMS I XDOOFF     /STOP TRANSMISSION
0637  4540            JMS I XZOUT      /OUTPUT REC & RESET PRMS & BUF
0640  4536            JMS I XRETRN     /CONTINUE TRANSMISSION
0641  5215            JMP NXCC
0642  1121  XOFFDO,   TAD FRSTCR
0643  1252            TAD CM276
0644  7650            SNA CLA /INSERT SIGNAL?
0645  5250            JMP .+3 /YES
0646  4535            JMS I XDOOFF     /NO
0647  5201            JMP CRTIN+1
0650  2144            ISZ FLG /SET INSERT FLAG
0651  5213            JMP NXFRM
0652  7502  CM276,    -276

                      *654
0654  0000  ASCIF,    0
0655  7501            MQA
0656  1065            TAD CM260
0657  7510            SPA
0660  5300            JMP SEP
0661  1066            TAD CM12
0662  7510            SPA
0663  5307            JMP NUMZ
0664  1067            TAD CM7
0665  7510            SPA
0666  5300            JMP SEP
0667  1070            TAD CM32
0670  7510            SPA
0671  5311            JMP UCA
0672  1071            TAD CM6
0673  7510            SPA
0674  5300            JMP SEP
0675  1070            TAD CM32
0676  7510            SPA
0677  5313            JMP LCA
0700  7300  SEP,      CLA CLL
0701  1064            TAD SEPTRG
0702  2064            ISZ SEPTRG
0703  7640            SZA CLA /PRECEDED BY SEP?
0704  2254            ISZ ASCIF        /YES-IGNORE STORAGE
0705  1072            TAD C77
0706  5654            JMP I ASCIF
0707  1072  NUMZ,     TAD C77
0710  5314            JMP CRRTN
0711  1073  UCA,      TAD C65
0712  5314            JMP CRRTN
0713  1074  LCA,      TAD C33
0714  7421  CRRTN,    MQL
```

```
0715   3064            DCA SEPTRG
0716   7501            MQA
0717   5654            JMP I ASCIF

0720   0000   FRAMDO,  0
0721   4344            JMS NUM2
0722   1357            TAD Y1
0723   3042            DCA FRH
0724   1360            TAD Y2
0725   3043            DCA FRL
0726   1043            TAD FRL
0727   1370            TAD SAVFRM
0730   7650            SNA CLA /NEW FRAME?
0731   5720            JMP I FRAMDO     /NO
0732   1043            TAD FRL /YES
0733   7041            CIA
0734   3370            DCA SAVFRM
0735   3044            DCA MPF
0736   5720            JMP I FRAMDO
0737   0000   CARTDO,  0
0740   4344            JMS NUM2
0741   1360            TAD Y2
0742   3041            DCA CART
0743   5737            JMP I CARTDO
0744   0000   NUM2,    0
0745   1356            TAD NLIST
0746   3371            DCA LOCN
0747   4362            JMS GETIT
0750   4362            JMS GETIT
0751   4362            JMS GETIT
0752   4362            JMS GETIT
0753   1146            TAD C4000
0754   3771            DCA I LOCN
0755   4526            JMS I XDECOC
0756   0772   NLIST,   LISTN
0757   0000   Y1,      0
0760   0000   Y2,      0
0761   5744            JMP I NUM2
0762   0000   GETIT,   0
0763   4524            JMS I XKEYIN     /GET CHAR
0764   0145            AND C17
0765   3771            DCA I LOCN
0766   2371            ISZ LOCN
0767   5762            JMP I GETIT
0770   0000   SAVFRM,  0
0771   0000   LOCN,    0
0772   0000   LISTN,   0        /WHERE DIGITS WILL BE DEPOSITED
0773   0000            0        /
0774   0000            0        /
0775   0000            0        /
0776   4000            4000     /TERMINATOR

                       *1000
1000   0000   CRTOT,   0
1001   6211            CDF1
1002   1046            TAD LOC2
1003   3075            DCA LOCST
1004   1046            TAD LOC2
1005   3076            DCA SEPLOC
1006   3050            DCA KCNT
1007   1077            TAD CM21
1010   3100            DCA LINCNT
1011   1101   NXLN,    TAD CM120
1012   3102            DCA CRCNT
1013   1446   NXCROT,  TAD I LOC2
1014   7450            SNA      /EOF?
1015   5302            JMP MEND1         /YES
```

```
1016   1103              TAD CM240
1017   7540              SZA CLA /SPACE?
1020   5223              JMP N1  /NO
1021   1046              TAD LOC2        /YES
1022   3076              DCA SEPLOC
1023   2046    N1,       ISZ LOC2
1024   2102              ISZ CRCNT       /LINE OVERFLOW?
1025   5213              JMP NXCROT      /NO
1026   1104              TAD CARRET      /YES
1027   3476              DCA I SEPLOC    /SUB NL FOR SPA
1030   7201              CLA IAC
1031   1076              TAD SEPLOC
1032   3046              DCA LOC2        /RESET NEW LINE
1033   2100              ISZ LINCNT      /DONE 17 LINES?
1034   5211              JMP NXLN        /NO
1035   3476              DCA I SEPLOC    /YES
1036   1446              TAD I LOC2
1037   [illegible]       SNA CLA /NEXT CHR EOR?
1040   5276              JMP MEND2       /YES
1041   7201              CLA IAC
1042   3047    M2,       DCA CONT
1043   6201              CDF0
1044   4543              JMS I XSTCT
1045   4531              JMS I XHEADR    /OUTPUT HEADR
1046   1075              TAD LOCST
1047   3110              DCA LOC3
1050   6211    NXCRT,    CDF1
1051   1510              TAD I LOC3
1052   2110              ISZ LOC3
1053   6201              CDF0
1054   7450              SNA     /END?
1055   5261              JMP M3  /YES
1056   4525              JMS I XKEYOT    /NO-OUTPUT CHAR
1057   7000              NOP
1060   5250              JMP NXCRT
1061   1104    M3,       TAD CARRET
1062   4525              JMS I XKEYOT
1063   1106              TAD ENDSCR
1064   4525              JMS I XKEYOT
1065   1105              TAD ENDTXT
1066   4525              JMS I XKEYOT
1067   1115              TAD C243
1070   4525              JMS I XKEYOT
1071   1117              TAD C261
1072   4525              JMS I XKEYOT
1073   1120              TAD C237
1074   4525              JMS I XKEYOT
1075   5600              JMP I CRTOT
1076   1107    MEND2,    TAD ASTRSK
1077   3476              DCA I SEPLOC
1100   3446    M4,       DCA I LOC2
1101   5242              JMP M2
1102   1107    MEND1,    TAD ASTRSK
1103   3446              DCA I LOC2
1104   2046              ISZ LOC2
1105   5300              JMP M4

                         *1110
1110   0000    HEADR,    0
1111   7300              CLA CLL
1112   7421              MQL
1113   1045              TAD MCNT
1114   4532              JMS I XNUM
1115   2024              2024
1116   1050              TAD KCNT
1117   4532              JMS I XNUM
1120   2051              2051
1121   1041              TAD CART
```

```
1122  4532           JMS I XNUM
1123  2107           2107
1124  1042           TAD FRH
1125  7421           MQL
1126  1043           TAD FRL
1127  4532           JMS I XNUM
1130  2070           2070
1131  1047           TAD CONT
1132  7650           SNA CLA /DATA CONT'D?
1133  1364           TAD FACTR      /NO
1134  1365           TAD LIST1      /YES
1135  3010           DCA BUFH
1136  1410           TAD I BUFH
1137  3756           DCA I L1
1140  1410           TAD I BUFH
1141  3757           DCA I L2
1142  1410           TAD I BUFH
1143  3760           DCA I L3
1144  1410           TAD I BUFH
1145  3761           DCA I L4
1146  1362           TAD STHED
1147  3363           DCA HED
1150  1763  NXL,     TAD I HED
1151  2363           ISZ HED
1152  7450           SNA     /DONE?
1153  5710           JMP I HEADR    /YES
1154  4525           JMS I XKEYOT   /NO-OUTPUT CHAR
1155  5350           JMP NXL
1156  2120  L1,      2120
1157  2121  L2,      2121
1160  2122  L3,      2122
1161  2123  L4,      2123
1162  2000  STHED,   2000
1163  0000  HED,     0
1164  0004  FACTR,   4
1165  1165  LIST1,   LIST1
1166  0303           303
1167  0317           317
1170  0316           316
1171  0324           324
1172  0240           240
1173  0240           240
1174  0240           240
1175  0240           240

                     *2200
2200  0000  DOOFF,   0
2201  7300           CLA CLL
2202  1061           TAD XOFF
2203  4525           JMS I XKEYOT
2204  4524           JMS I XKEYIN
2205  5211           JMP TSTE1
2206  4524  E1,      JMS I XKEYIN
2207  3264           DCA SAV2
2210  5600           JMP I DOOFF
2211  3263  TSTE1,   DCA SAV1
2212  1263           TAD SAV1
2213  1062           TAD CM245
2214  7640           SZA CLA /%?
2215  5206           JMP E1  /NO
2216  5600           JMP I DOOFF    /YES

                     *2220
2220  0000  RETRN,   0
2221  7201           CLA IAC
2222  3064           DCA SEPTRG
```

```
2223  1263           TAD SAV1        /PROCESS STORED CHARS
2224  7421           MQL
2225  4537           JMS I XASCIF
2226  4533           JMS I XPUTCR
2227  7300           CLA CLL
2230  1263           TAD SAV1
2231  4244           JMS TSTSAV
2232  1264           TAD SAV2
2233  7421           MQL
2234  4537           JMS I XASCIF
2235  4533           JMS I XPUTCR
2236  7300           CLA CLL
2237  1264           TAD SAV2
2240  4244           JMS TSTSAV
2241  1267           TAD XMIT
2242  4525           JMS I XKEYOT
2243  5620           JMP I RETRN
2244  0000  TSTSAV,  0
2245  3265           DCA TSTCR
2246  1265           TAD TSTCR
2247  1062           TAD CM245
2250  7650           SNA CLA
2251  5666           JMP I L1605
2252  1265           TAD TSTCR
2253  1063           TAD CM252
2254  7640           SZA CLA
2255  5644           JMP I TSTSAV
2256  2044           ISZ MPF
2257  4540           JMS I XZOUT
2260  7201           CLA IAC
2261  3064           DCA SEPTRG
2262  5644           JMP I TSTSAV
2263  0000  SAV1,    0
2264  0000  SAV2,    0
2265  0000  TSTCR,   0
2266  1605  L1605,   1605
2267  0221  XMIT,    221

                     *2300
2300  0000  STCT,    0
2301  1075           TAD LOCST
2302  7041           CIA
2303  1046           TAD LOC2
2304  1047           TAD CONT
2305  1310           TAD CM1
2306  3050           DCA KCNT
2307  5700           JMP I STCT
2310  7777  CM1,     -1
                     *2311
2311  0000  ACCEPT,  0
2312  7300           CLA CLL
2313  1361           TAD CM5
2314  3362           DCA CTR /ACCEPT MAX 4 DIGITS
2315  1355           TAD XSTORE
2316  3363           DCA PLACE       /SET ST OF STORAGE BUFFER
2317  4524  HERE,    JMS I XKEYIN    /GET CHAR
2320  3364           DCA CHAR
2321  1364           TAD CHAR
2322  4525           JMS I XKEYOT    /OUTPUT CHAR TO SCREEN
2323  1364           TAD CHAR
2324  1365           TAD CM256
2325  7450           SNA       /PERIOD?
2326  5345           JMP TERM        /YES, TERMINATE INPUT
2327  1366           TAD CM2 /NO
2330  7510           SPA       /LESS THAN 260?
2331  5774           JMP I XREQT2    /YES, ILLEGAL ENTRY, RESTART
2332  1066           TAD CM12        /NO
2333  7700           SMA CLA /GREATER THAN 271?
```

```
2334  5774            JMP I XREQT2    /YES, RESTART
2335  2362            ISZ CTR /NO, COUNT #
2336  5340            JMP SAVE
2337  5774            JMP I XREQT2    /5TH DIGIT ENTERED - ERROR
2340  1364  SAVE,     TAD CHAR
2341  0145            AND C17
2342  3763            DCA I PLACE
2343  2363            ISZ PLACE
2344  5317            JMP HERE        /GET NEXT CHAR
2345  1361  TERM,     TAD CM5
2346  7041            CIA
2347  1362            TAD CTR
2350  7650            SNA CLA /DIGITS ENTERED (DOUBLE PERIOD)?
2351  5774            JMP I XREQT2    /NO , RESTART
2352  1140            TAD C4000       /YES, OK
2353  3763            DCA I PLACE     /TERMINATE BUFFER
2354  4526            JMS I XDECOC    /CONVERT DIGS TO OCTAL
2355  2367  XSTORE,   STORE
2356  0000  DIG1,     0
2357  0000  DIG2,     0
2360  5711            JMP I ACCEPT
2361  7773  CM5,      -5
2362  0000  CTR,      0
2363  0000  PLACE,    0
2364  0000  CHAR,     0
2365  7522  CM256,    -256
2366  7776  CM2,      -2
2367  0000  STORE,    0
2370  0000            0
2371  0000            0
2372  0000            0
2373  4000            4000     /TERMINATOR
2374  2410  XREQT2,   2410
                      *335
0335  0000  SRCH,     0
0336  5550            JMP I XREQST    /GET FRAME TO SEARCH FOR
0337  4522  X3,       JMS I XMAGIN    /READ MAG TAPE
0340  5746            JMP I XCOMPR    /FRAME IN QUESTION?
0341  7000            NOP
0342  4523            JMS I XMAGOT    /OUTPUT RECORD
0343  5337            JMP X3
0344  4530            JMS I XTRPOS    /YES, AT PROPER FRAME - TRANSPOSE
0345  5735            JMP I SRCH
0346  2434  XCOMPR,   2434
                      *2400
2400  1115            TAD C243
2401  4525            JMS I XKEYOT
2402  1270            TAD C262
2403  4525            JMS I XKEYOT
2404  1115            TAD C243
2405  4525            JMS I XKEYOT
2406  1117            TAD C261
2407  4525            JMS I XKEYOT
2410  1255  REQST,    TAD STHD
2411  3256            DCA HD  /SET START OF OUTPUT BUFR
2412  1656  X4,       TAD I HD
2413  2256            ISZ HD
2414  7450            SNA      /DONE?
2415  5220            JMP GOON        /YES, ACCEPT FRAME NO
2416  4525            JMS I XKEYOT    /NO, PRINT CHAR
2417  5212            JMP X4
2420  4551  GOON,     JMS I XACPT     /ACCEPT FRAME NO
2421  1552            TAD I XDIG1
2422  7041            CIA
2423  3257            DCA HIFRM       /STORE HI ORD FRAME NO
2424  1553            TAD I XDIG2
2425  7041            CIA
2426  3260            DCA LOFRM
2427  4551            JMS I XACPT     /ACCEPT MPF NO
```

```
2430  1553            TAD I XDIG2
2431  7041            CIA
2432  3261            DCA MPFNO
2433  5662            JMP I XRETN1     /START READING RECORDS
2434  7000  COMPAR,   NOP
2435  1065            TAD I ALOC1
2436  1257            TAD HIFRM
2437  7640            SZA CLA /MATCH?
2440  5253            JMP EXER         /NO
2441  1066            TAD I ALOC2
2442  1260            TAD LOFRM
2443  7640            SZA CLA /MATCH?
2444  5253            JMP EXER         /NO
2445  1067            TAD I ALOC3
2446  1261            TAD MPFNO
2447  7640            SZA CLA /MATCH?
2450  5253            JMP EXER         /NO
2451  7000            NOP
2452  5663            JMP I XRETN2     /TRANSPOSE, ETC.
2453  7000  EXER,     NOP
2454  5664            JMP I XRETN3     /READ ANOTHER RECORD
2455  2500  STHD,     2500
2456  0000  HD,       0
2457  0000  HIFRM,    0
2460  0000  LOFRM,    0
2461  0000  MPFNO,    0
2462  0337  XRETN1,   337
2463  0344  XRETN2,   344
2464  0341  XRETN3,   341
2465  4002  ALOC1,    4002
2466  4003  ALOC2,    4003
2467  4004  ALOC3,    4004
2470  0262  C262,     262
                      *2500    /REQUEST BUFFER
2500  0214  214       /PAGE CLEAR
2501  0237  237       /CURSOR HOME
2502  0216  216       /PROTECTED FIELD
2503  0307  307       /GET
2504  0305  305
2505  0324  324
2506  0240  240
2507  0306  306       /FRAME:
2510  0322  322
2511  0301  301
2512  0315  315
2513  0305  305
2514  0272  272
2515  0217  217       /PROTECTED FIELD
2516  0240  240
2517  0240  240
2520  0240  240
2521  0000  0         /TERMINATOR
                      *2600
2600  0000  FLGIT,    0
2601  7000            NOP
2602  1640            TAD I BMAG
2603  3241            DCA LOCX2
2604  7000            NOP
2605  1040            TAD CH
2606  3641            DCA I LOCX2
2607  2241            ISZ LOCX2
2610  1041            TAD CL
2611  3641            DCA I LOCX2
2612  2241            ISZ LOCX2
2613  1243            TAD SFH
2614  1641            TAD I LOCX2
2615  7640            SZA CLA /NEW FRAME?
2616  3244            DCA MPF2         /YES
2617  1641            TAD I LOCX2      /NO
```

```
2620  2241        ISZ LOCX2
2621  7041        CIA
2622  3243        DCA SFH
2623  1242        TAD SFL
2624  1641        TAD I LOCX2
2625  7640        SZA CLA /NEW FRAME?
2626  3244        DCA MPF2      /
2627  1641        TAD I LOCX2   /NO
2630  2241        ISZ LOCX2
2631  7041        CIA
2632  3242        DCA SFL
2633  2244        ISZ MPF2
2634  1244        TAD MPF2
2635  3641        DCA I LOCX2
2636  7000        NOP
2637  5600        JMP I FLGIT
2640  0270  BMAG,  270
2641  0000  LOCX2, 0
2642  0000  SFL,   0
2643  0000  SFH,   0
2644  0000  MPF2,  0
                  CH=40
                  CL=41
                  *2000    /HEADER BUFFER
2000  0214  214   /PAGE CLEAR
2001  0237  237   /CURSOR HOME
2002  0340  340   /BEG QT
2003  0376  376   /CEDILA
2004  0216  216   /PROTECTED FIELD
2005  0240  240   /CHARS/RECORD:
2006  0240  240
2007  0303  303
2010  0310  310
2011  0301  301
2012  0322  322
2013  0323  323
2014  0257  257
2015  0322  322
2016  0305  305
2017  0303  303
2020  0317  317
2021  0322  322
2022  0304  304
2023  0272  272
2024  0000  0     /CPR DIGITS
2025  0000  0
2026  0000  0
2027  0000  0
2030  0240  240   /CHARS/SCREEN:
2031  0240  240
2032  0240  240
2033  0240  240
2034  0303  303
2035  0310  310
2036  0301  301
2037  0322  322
2040  0323  323
2041  0257  257
2042  0323  323
2043  0303  303
2044  0322  322
2045  0305  305
2046  0305  305
2047  0316  316
2050  0272  272
2051  0000  0     /CPS DIGITS
2052  0000  0
2053  0000  0
2054  0000  0
```

```
2055  0240  240      /FRAME:
2056  0240  240
2057  0240  240
2060  0240  240
2061  0306  306
2062  0322  322
2063  0301  301
2064  0315  315
2065  0305  305
2066  0272  272
2067  0217  217      /UNPROTECTED FIELD
2070  0000  0        /FRAME DIGITS
2071  0000  0
2072  0000  0
2073  0000  0
2074  0216  216      /PROTECTED FIELD
2075  0240  240      /CART
2076  0240  240
2077  0240  240
2100  0240  240
2101  0303  303
2102  0301  301
2103  0322  322
2104  0324  324
2105  0272  272
2106  0217  217
2107  0000  0        /CART DIGITS
2110  0000  0
2111  0000  0
2112  0000  0
2113  0216  216
2114  0240  240
2115  0240  240
2116  0240  240
2117  0240  240
2120  0000  0        /CONT OR 4 SPACES
2121  0000  0
2122  0000  0
2123  0000  0
2124  0240  240
2125  0240  240
2126  0240  240
2127  0217  217
2130  0000  0
            /XZOUT:  ENTERS THE NECESSARY INFORMATION INTO THE DRC
                     /HEADER BLOCK - OUTPUTS THE DRC RECORD -
                     /RESETS THE DATA POINTER TO THE BEGINNING OF
                     /THE DATA BLOCK - ZEROS THE DATA BLOCK
                     *1636
1636  0000  SZOUT,   0
1637  7300           CLA CLL
1640  1357           TAD DM4000
1641  3272           DCA ZBUF
1642  1040           TAD CSH
1643  3672           DCA I ZBUF      /HIGH ORDER CART # INTO POS 0
1644  2272           ISZ ZBUF
1645  1041           TAD CART
1646  3672           DCA I ZBUF      /LOW ORDER CART NO INTO POS 1
1647  2272           ISZ ZBUF
1650  1042           TAD FRH
1651  3672           DCA I ZBUF      /HIGH ORDER FRAME NO INTO POS 2
1652  2272           ISZ ZBUF
1653  1043           TAD FRL
1654  3672           DCA I ZBUF
1655  2272           ISZ ZBUF
1656  1044           TAD MPF
1657  3672           DCA I ZBUF      /MX PER FRAME NO INTO 4
1660  4273           JMS SZERO       /ZERO HEADER PORTION
1661  4006           4006
1662  4017           4017
```

```
1663  4523           JMS I XMAGOT     /OUTPUT DRC RECORD
1664  4273           JMS SZERO        /ZERO DATA PORTION
1665  4020           4020
1666  7754           7754
1667  1363           TAD DC4020
1670  3761           DCA I DRCPOS     /SET DATA POINTER
1671  5636           JMP I SZOUT
1672  0000  ZBUF,    0
                     /XZERO: ZEROS LOCATIONS FROM
                     /LOWER BOUND HERE
                     /UPPER BOUND HERE
                     /NOTE:  CAN WRAP AROUND ZERO
1673  0000  SZERO,   0
1674  7300           CLA CLL
1675  1673           TAD I SZERO
1676  2273           ISZ SZERO
1677  3315           DCA ZPOS
1700  1673           TAD I SZERO
1701  2273           ISZ SZERO
1702  3316           DCA ZLIM
1703  7000  ZNXT,    NOP
1704  3715           DCA I ZPOS
1705  1315           TAD ZPOS
1706  7041           CIA
1707  1316           TAD ZLIM
1710  7650           SNA CLA          /AT LIMIT?
1711  5673           JMP I SZERO      /YES
1712  2315           ISZ ZPOS         /NO
1713  5303           JMP ZNXT
1714  5303           JMP ZNXT         /TO WRAP AROUND 0
1715  0000  ZPOS,    0
1716  0000  ZLIM,    0
                     *1717   /XPUTCR:ENTERS CHAR INTO DRC REC
1717  0000  DPUTCR,  0
1720  0360           AND DM77
1721  7421           MQL              /STORE MASKED CHAR
1722  1761           TAD I DRCPOS     /LOC 5 = LOC OF NEXT CHAR LOT
1723  7500           SMA              /CHAR GOING IN 1ST HALF OF LOC?
1724  5341           JMP SCDHLF       /NO
1725  0364           AND DM3777       /YES
1726  7450           SNA              /BUFFER OVERFLOW?
1727  7402           HLT              /YES
1730  1357           TAD DM4000
1731  3362           DCA DTMP         /NO, SAVE LOC
1732  7501           MQA              /GET CHAR
1733  7002           BSW              /PUT CHAR INTO BITS 0-5
1734  3762           DCA I DTMP       /PUT CHAR INT LOC - UM
1735  1362           TAD DTMP
1736  0364           AND DM3777
1737  3761  DRCNXT,  DCA I DRCPOS     /RETURN POS FOR NXT CHAR
1740  5717           JMP I DPUTCR     /EXIT
1741  1357  SCDHLF,  TAD DM4000
1742  3362           DCA DTMP
1743  1762           TAD I DTMP       /GET CONTENTS ALREADY IN LOC
1744  7501           MQA
1745  3762           DCA I DTMP       /PUT TWO CHARS BACK
1746  1357           TAD DM4000
1747  7421           MQL    /LOAD NEG TRIG INTO MQ
1750  1362           TAD DTMP
1751  1357           TAD DM4000
1752  3362           DCA DTMP
1753  2362           ISZ DTMP         /INC DATA POINTER TO NXT LOC
1754  1362           TAD DTMP         /GET NXT LOC
1755  7501           MQA              /OR IN MINUS TRIG
1756  5337           JMP DRCNXT       /CONTINUE
1757  4000  DM4000,  4000
1760  0077  DM77,    77
1761  4005  DRCPOS,  4005
1762  0000  DTMP,    0
1763  4020  DC4020,  4020
```

```
1764  3777  DM3777, 3777
1765  0000  DRESET, 0
1766  1363          TAD DC4020
1767  3761          DCA I DRCPOS
1770  4774          JMS I XZRO
1771  4020          4020
1772  7754          7754
1773  5765          JMP I DRESET
1774  1673  XZRO,   1673
            CSH=40

ACCEPT  2311
ALOC1   2465
ALOC2   2466
ALOC3   2467
ASCIF   0654
ASTRSK  0107
BEGGT   0060
BMAG    2640
BUFH    0010
BUFMAG  0270
BUSYFG  0026
CARRET  0104
CART    0041
CARTDO  0737
CBRK    0635
CED     0155
CH      0040
CHAR    2364
CL      0041
CM1     2310
CM12    0066
CM120   0101
CM2     2366
CM21    0077
CM240   0103
CM245   0062
CM252   0063
CM256   2365
CM260   0065
CM276   0652
CM32    0070
CM33    0514
CM5     2361
CM6     0071
CM7     0067
COMPAR  2434
CONT    0047
CRCNT   0102
CRRIN   0714
CRTIN   0600
CRTOT   1000
CSH     0040
CTR     2362
C10     0250
C100    0247
C101    0246
C1010   0251
C17     0145
C173    0515
C237    0120
C240    0520
C243    0115
C246    0516
C260    0111
C261    0117
C262    2470
C33     0074
C340    0517
C3777   0511
```

```
C4000   0146
C4002   0112
C4003   0113
C4020   0116
C5      0512
C65     0073
C7000   0513
C77     0072
DATA    0507
DC4020  1763
DIG1    2356
DIG2    2357
DISCA   0033
DISWC   0032
DM3777  1764
DM4000  1757
DM77    1760
DOCHR   0414
DOOFF   2200
DPUTCR  1717
DRCNXT  1737
DRCPOS  1761
DRESET  1765
DRT910  0020
DTMP    1762
D1      0552
D2      0551
D3      0550
D4      0547
ENDSCR  0106
ENDTXT  0105
ERRTRG  0031
EXER    2453
E1      2206
FACTR   1164
FLG     0144
FLGIT   2600
FLG2    0154
FRAMDO  0720
FRH     0042
FRL     0043
FRSTCR  0121
GETIT   0762
GOON    2420
HD      2456
HEADR   1110
HED     1163
HERE    2317
HIFRM   2457
INSTT   0450
KCNT    0050
KEYIN   0300
KEYOT   0320
KYCHR   0114
LCA     0713
LCAB    0501
LINCNT  0100
LISIN   0772
LISTT   1165
LOCN    0771
LOCST   0075
LOCX2   2641
LOC1    0506
LOC2    0046
LOC3    0110
LOFRM   2460
L1      1156
L1605   2266
L2      1157
L3      1160
```

```
L4      1161
MAGIN   0200
MAGOT   0260
MCNT    0045
MEND1   1102
MEND2   1076
MPF     0044
MPFN0   2451
MPF2    2644
M2      1042
M3      1061
M4      1100
NLIST   0756
NOTEND  0442
NUM     0534
NUMB    0470
NUMZ    0707
NUM2    0744
NXCC    0615
NXCH    0405
NXCHOT  1013
NXCHT   1050
NXFRM   0613
NXL     1150
NXLC    0471
NXLN    1011
N1      1023
PLACE   2363
REGST   2410
RETRN   2220
SAVE    2340
SAVFRM  0770
SAV1    2263
SAV2    2264
SCDHLF  1741
SEP     0700
SEPB    0504
SEPLOC  0076
SEPTRG  0064
SFH     2643
SFL     2642
SRCH    0335
STCT    2300
STHD    2455
STHED   1162
STORE   2367
ST1     1602
ST2     1603
ST3     1604
SWITCH  0510
SZERO   1673
SZOUT   1636
TERM    2345
TRPOS   0400
TSTCR   2265
TSTEOF  0216
TSTE1   2211
TSTGET  1616
TSTSAV  2244
UCA     0711
UCAB    0476
WRDCNT  0021
XACPT   0151
XASCIF  0137
XCOMPR  0346
XCRTIN  0141
XCRTOT  0142
XDECOC  0126
XDIG1   0152
XDIG2   0153
```

```
XDOOFF 0135
XDTAPE 0030
XD1600 0034
XFLGIT 0276
XHEADR 0131
XKEYIN 0124
XKEYOT 0125
XMAGIN 0122
XMAGOT 0123
XMI1   2267
XNFRAM 0166
XNUM   0132
XNXFRM 0156
XOCDEC 0127
XOFDO  0165
XOFF   0061
XOFFDO 0642
XPUTCR 0133
XREGST 0150
XREGT2 2374
XRESET 0134
XRETN1 2462
XRETN2 2463
XRETN3 2464
XRETRN 0136
XSRCH  0147
XSTCT  0143
XSTORE 2355
XTRPOS 0130
XZOUT  0140
XZRO   1774
X1     0541
X2     0542
X3     0337
X4     2412
Y1     0757
Y2     0760
ZBUF   1672
ZLIM   1716
ZNXT   1703
ZPOS   1715
```

PROGRAM 3 - DRCC

```
               BSW=7002
               MQL=7421
               MQA=7501
               CDF1=6211
               CDF0=6201
               FIXTAB
                         *32
0032  0000     WC,       0
0033  0000     CA,       0
0034  0000     LSTCHR,   0
0035  7766     CM12,     -12
0036  7767     CM11,     -11
0037  4000     C4000,    4000
0040  0000     STATUS,   0
0041  6774     C6774,    6774
0042  7677     C7677,    7677
0043  3543     C3543,    3543
0044  0400     C400,     400
0045  0100     C100,     100
0046  3777     C3777,    3777
0047  0010     C10,      10
0050  0070     C70,      70
0051  0005     LOC5,     5
```

```
0052  0000  PUT,     0
0053  2500  LIM,     -5300        /MAX RECORD LENGTH
0054  0000  LOORD,   0
0055  0000  HIORD,   0
0056  0002  LOC2,    2
0057  0003  LOC3,    3
0060  4002  L4002,   4002
0061  4003  L4003,   4003
0062  4005  L4005,   4005
0063  0430  XRECCK,  430
0064  0344  XMAGOT,  344
0065  0404  L404,    404
0066  0500  XPRTFM,  500
0067  0000  OVRFRG,  0
0070  0007  C7,      7
0071  2000  C2000,   2000
0072  7746  CM32,    -32
0073  0000  MOTRG,   0
0074  1464  XPASS,   1464
0075  0000  DTMP,    0
0076  0000  CHAR,    0
0077  0000  STWD,    0
0100  0000  SF2,     0
0101  1340  XGETCR,  1340
0102  1600  XMOVE,   1600
0103  0000  YRTRG,   0
0104  0000  DAYTRG,  0
0105  0010  LOCN10,  10
0106  0077  C77,     77
0107  7701  CM77,    -77
0110  0012  C12,     12
0111  7777  CM1,     -1
0112  0000  DELTRG,  0
                     *1400            /QUASI MANINLINE
1400  0000  SELECT,  0
1401  1306           TAD C4020
1402  3075           DCA DTMP         /SET ST OF DRC REC
1403  3104           DCA DAYTRG
1404  3103           DCA YRTRG
1405  3073           DCA MOTRG
1406  4712           JMS I XCLEAR     /CLEAR ALREADY FOUND BIT
1407  1075  TWO,     TAD DTMP
1410  3077           DCA STWD         /SET ST LOC OF WD
1411  4501           JMS I XGETCR     /GET 1ST CHAR IN WD
1412  1076           TAD CHAR
1413  7450           SNA              /ZERO?
1414  5273           JMP END          /YES - END OF RECORD
1415  1107           TAD CM77         /NO
1416  7450           SNA              /SPACE?
1417  7402           HLT              /YES
1420  1110           TAD C12          /NO
1421  7700           SMA CLA          /NUMBER?
1422  5253           JMP TRGCK        /YES
1423  1307           TAD XLST         /NO, SET ST-1 OF 1ST LETTER LIST
1424  3310           DCA LST
1425  2310  STR,     ISZ LST
1426  7201           CLA IAC
1427  1710           TAD I LST
1430  7450           SNA              /END OF LIST?
1431  5264           JMP PASSBY       /YES
1432  1111           TAD CM1          /NO
1433  1076           TAD CHAR
1434  7650           SNA CLA          /MATCH?
1435  5314           JMP SAVE         /YES
1436  2310           ISZ LST
1437  1710           TAD I LST
1440  7640           SZA CLA          /MOVE ON TO NEXT LETTER
1441  5236           JMP .-3
1442  5225           JMP STR
```

```
1443  4501  CKON,    JMS I XGETCR    /GET NEXT CHAR
1444  2310           ISZ LST
1445  1710           TAD I LST
1446  7450           SNA             /DONE W LOC FOR LETTR?
1447  5264           JMP PASSBY      /YES, GO ON TO NEXT WD
1450  4711           JMS I XCKIT     /NO, COMPARE WD
1451  5320           JMP DDO         /NO MATCH
1452  5211           JMP TWO+2       /MATCH
1453  7305  TRGCK,   7305
1454  7041           CIA
1455  1104           TAD DAYTRG
1456  1103           TAD YRTRG
1457  7650           SNA CLA         /DAY AND YR ALREADY DONE?
1460  5264           JMP PASSBY      /YES
1461  4713           JMS I XNUMDO    /NO
1462  5264           JMP PASSBY      /WD NOT ALL #S
1463  5211           JMP TWO+2       /WD PROCESSED
1464  7200  PASSBY,  CLA
1465  1076           TAD CHAR
1466  1107           TAD CM77
1467  7650           SNA CLA
1470  5207           JMP TWO         /YES
1471  4501           JMS I XGETCR    /NO
1472  5264           JMP PASSBY
1473  1075  END,     TAD DTMP        /RESET LOC 5
1474  7500           SMA
1475  5304           JMP SEC
1476  1111           TAD CM1
1477  0046           AND C3777
1500  6211  RESET,   CDF1
1501  3451           DCA I LOC5
1502  6201           CDF0
1503  5600           JMP I SELECT
1504  1037  SEC,     TAD C4000
1505  5300           JMP RESET
1506  4020  C4020,   4020
1507  2177  XLST,    2177
1510  0000  LST,     0
1511  3200  XCKIT,   3200
1512  2746  XCLEAR,  2746
1513  2000  XNUMDO,  2000
1514  1075  SAVE,    TAD DTMP
1515  3317           DCA CHAR2
1516  5243           JMP CKON
1517  0000  CHAR2,   0
1520  1317  DDO,     TAD CHAR2
1521  3075           DCA DTMP
1522  5243           JMP CKON
                     *3200
3200  0000  CKIT,    0
3201  3320           DCA COMP        /STORE ST OF COMPARE WD
3202  1720           TAD I COMP
3203  2320           ISZ COMP
3204  7450           SNA             /DONE W WD?
3205  5213           JMP CKWD        /YES, ALL CHRS MATCH
3206  1076           TAD CHAR        /NO
3207  7440           SZA             /MATCH?
3210  5324           JMP CKUP        /NO
3211  4501  HERE,    JMS I XGETCR    /YES
3212  5202           JMP CKIT+2
3213  1720  CKWD,    TAD I COMP
3214  0331           AND C1000
3215  7650           SNA CLA         /WORD TO BE DELETED?
3216  5332           JMP SETRG       /NO, SET TRIGGER
3217  1076           TAD CHAR
3220  1107           TAD CM77
3221  7640           SZA CLA         /NEXT CHAR A SPACE?
3222  5600           JMP I CKIT      /NO, NO MATCH
3223  1720  SETBIT,  TAD I COMP      /GET BITWD
3224  0330           AND C6000
```

```
3225  7450             SNA              /DELETE ONLY ONCE WORD?
3226  5261             JMP SETON        /NO
3227  7710             SPA CLA          /YES, ALREADY FOUND?
3230  5474             JMP I XPASS
3231  1720             TAD I COMP       /NO
3232  1037             TAD C4000
3233  3720             DCA I COMP       /SET 4000 BIT
3234  1720             TAD I COMP
3235  0317             AND C700
3236  7640             SZA CLA          /WORD 10?
3237  5261             JMP SETON        /NO
3240  1720             TAD I COMP       /YES
3241  0106             AND C77
3242  7640             SZA CLA          /MONTH?
3243  5252             JMP DAYR
3244  1073             TAD MOTRG        /YES
3245  7640             SZA CLA          /ALREADY FOUND?
3246  5474             JMP I XPASS      /YES, GO ON TO NEXT WD
3247  7001             IAC              /NO
3250  3073             DCA MOTRG
3251  5305             JMP CONT+1
3252  6211  DAYR,      CDF1
3253  1505             TAD I LOCN10
3254  6201             CDF0
3255  0316             AND C177
3256  7650             SNA CLA          /ALREADY SET?
3257  5261             JMP SETON        /NO
3260  5474             JMP I XPASS      /YES, GO ON TO NEXT WORD
3261  1720  SETON,     TAD I COMP       /GET BITWD
3262  7002             BSW
3263  0070             AND C7
3264  1105             TAD LOCN10
3265  3321             DCA WORD
3266  6211             CDF1
3267  1721             TAD I WORD
3270  6201             CDF0
3271  7421             MQL
3272  1720             TAD I COMP
3273  0106             AND C77
3274  1322             TAD BASLOC
3275  3323             DCA BITS         /SET LOCN OF PROPER BITS
3276  1723             TAD I BITS
3277  7501             MQA              /OR IN BITS
3300  6211             CDF1
3301  3721             DCA I WORD
3302  6201             CDF0
3303  5305             JMP .+2
3304  4501  CONT,      JMS I XGETCR     /FIND END OF MATCHING WORD
3305  1076             TAD CHAR
3306  1107             TAD CM77
3307  7640             SZA CLA          /ST OF NEXT WD?
3310  5304             JMP CONT         /NO
3311  1075             TAD DTMP         /YES
3312  3100             DCA ST2
3313  4502             JMS I XMOVE
3314  2200             ISZ CKIT
3315  5600             JMP I CKIT
3316  0177  C177,      177
3317  0700  C700,      700
3320  0000  COMP,      0
3321  0000  WORD,      0
3322  2360  BASLOC,    2360
3323  0000  BITS,      0
3324  1072  CKUP,      TAD CM32
3325  7640             SZA CLA          /UPPER CASE?
3326  5600             JMP I CKIT       /NO
3327  5211             JMP HERE         /YES
3330  6000  C6000,     6000
3331  1000  C1000,     1000
3332  2112  SETRG,     ISZ DELTRG
```

```
3333   5217            JMP CKWD+4
                       *1340
               /PUTS DRC CHAR IN CHAR, SETS DTMP FOR NEXT CHAR
1340   0000   GETCR,   0
1341   6211            CDF1
1342   1075            TAD DTMP
1343   7500            SMA                /DATA IN 1ST HALF?
1344   5354            JMP SECN           /NO
1345   0046            AND C3777          /YES
1346   3075            DCA DTMP
1347   1475            TAD I DTMP
1350   7002            BSW
1351   0106            AND C77
1352   3076            DCA CHAR
1353   5366            JMP EXIT
1354   3075   SECN,    DCA DTMP
1355   1475            TAD I DTMP
1356   0106            AND C77
1357   3076            DCA CHAR
1360   1037            TAD C4000
1361   7421            MQL                /SET UP NEG TRIGGER
1362   2075            ISZ DTMP
1363   1075            TAD DTMP
1364   7501            MQA
1365   3075            DCA DTMP
1366   6201   EXIT,    CDF0
1367   5740            JMP I GETCR
              /JMS I XNUMDO
              /RTN1    -         FAILS ALL NUMBER TEST
              /RTN2    -         HANDLED PROPERLY
                       *2000
2000   0000   NUMDO,   0
2001   1262            TAD ALIST
2002   3277            DCA LIST           /SET DIGIT STORAGE LIST
2003   7201            CLA IAC
2004   3305            DCA NUMCT
2005   1076   BB,      TAD CHAR
2006   1306            TAD CM65
2007   3677            DCA I LIST         /STORE BINARY DIGIT
2010   2277            ISZ LIST
2011   4501            JMS I XGETCR
2012   1076            TAD CHAR
2013   7450            SNA                /ZERO
2014   7402            HLT                /YES
2015   1107            TAD CM77           /NO
2016   7450            SNA                /SPACE?
2017   5231            JMP SPACE          /YES, END OF #
2020   1110            TAD C12            /NO
2021   7710            SPA CLA            /NUMBER?
2022   5600            JMP I NUMDO        /NO
2023   2305            ISZ NUMCT          /YES, COUNT DIGIT
2024   1305            TAD NUMCT
2025   1311            TAD CCM5
2026   7640            SZA CLA            /5 DIGITS?
2027   5205            JMP BB             /NO
2030   5600            JMP I NUMDO        /YES, IGNORE
2031   1075   SPACE,   TAD DTMP
2032   3100            DCA ST2            /SET ST OF NEXT WD
2033   1037            TAD C4000
2034   3677            DCA I LIST         /TERM DIGIT LIST W 4000
2035   7300            CLA CLL
2036   1305            TAD NUMCT
2037   1307            TAD CM2
2040   7550            SPA SNA            /1 OR 2 DIGITS?
2041   5254            JMP DAY            /YES
2042   1307            TAD CM2            /NO
2043   7640            SZA CLA            /4 DIGITS?
2044   5252            JMP EX1            /NO, EXIT
2045   1103            TAD YRTRG          /YES
2046   7640            SZA CLA            /YEAR ALREADY FOUND?
2047   5252            JMP EX1            /YES
```

```
2050  2103          ISZ YRTRG       /NO
2051  4502          JMS I XMOVE             /DELETE YEAR
2052  2200  EX1,    ISZ NUMDO
2053  5600  .       JMP I NUMDO
2054  7300  DAY,    CLA CLL
2055  1104          TAD DAYTRG
2056  7640          SZA CLA         /DAY ALREADY FOUND?
2057  5252          JMP EX1         /YES
2060  2104          ISZ DAYTRG      /NO
2061  4710          JMS I XDECOC
2062  2100  ALIST,  LISTN
2063  0000  H,      0
2064  0000  L,      0
2065  6211          CDF1
2066  1505          TAD I LOCN10
2067  7421          MQL
2070  1264          TAD L
2071  7002          BSW
2072  7104          CLL RAL
2073  7501          MQA
2074  3505          DCA I LOCN10
2075  6201          CDF0
2076  5251          JMP EX1-1       /DELETE DAY AND EXIT
2077  0000  LIST,   0
2100  0000  LISTN,  0
2101  0000          0
2102  0000  .       0
2103  0000          0
2104  4000          4000
2105  0000  NUMCT,  0
2106  7713  CM65,   -65
2107  7776  CM2,    -2
2110  3400  XDECOC, 3400
2111  7773  CCM5,   -5
            /STWD:  POS OF 1ST CHAR TO BE DELETER
            /ST2:   POS OF CHAR TO REPLACE IT
            / SETS DTMP BACK TO STWD TO ADJUST FOR DELETION
                    *1600
1600  0000  MOVE,   0
1601  1112          TAD DELTRG
1602  7650          SNA CLA         /WORD TO BE DELETED?
1603  5206          JMP .+3         /YES  .
1604  3112          DCA DELTRG      /NO
1605  5600          JMP I MOVE
1606  1077          TAD STWD
1607  3075          DCA DTMP        /SET FOR NEXT WORD AFTER MOVE
1610  6211          CDF1
1611  1077          TAD STWD
1612  7500          SMA             /1ST HALF?
1613  5253          JMP SECHLF      /NO
1614  0046          AND C3777       /YES
1615  3314          DCA TO
1616  1100          TAD ST2
1617  7500          SMA             /NEXT WD IN 1ST HALF?
1620  5233          JMP MM          /NO
1621  0046          AND C3777       /YES
1622  3315          DCA FROM
1623  1715  QQ,     TAD I FROM
1624  3714          DCA I TO
1625  2314          ISZ TO
1626  2315          ISZ FROM
1627  1315        . TAD FROM
1630  7710          SPA CLA         /DONE W REC?
1631  5302          JMP ENDO        /YES
1632  5223          JMP QQ          /NO
1633  3315  MM,     DCA FROM
1634  1715          TAD I FROM
1635  0106          AND C77
1636  7002          BSW
1637  7421          MQL
```

```
1640  2315           ISZ FROM
1641  1315           TAD FROM
1642  7710           SPA CLA         /DONE?
1643  5302           JMP ENDO        /YES
1644  1715           TAD I FROM      /NO
1645  7002           BSW
1646  0106           AND C77
1647  7501           MQA
1650  3714           DCA I TO
1651  2314           ISZ TO
1652  5234           JMP MM+1
1653  3314  SECHLF,  DCA TO
1654  1100           TAD ST2
1655  7500           SMA             /NEXT WD IN 1ST HALF?
1656  5304           JMP RR          /NO
1657  0046           AND C3777
1660  3315           DCA FROM
1661  1714           TAD I TO
1662  0316           AND C7700
1663  7421           MQL
1664  1715  NN,      TAD I FROM
1665  7002           BSW
1666  0106           AND C77
1667  7501           MQA
1670  3714           DCA I TO
1671  2314           ISZ TO
1672  1715           TAD I FROM
1673  0106           AND C77
1674  7002           BSW
1675  7421           MQL
1676  2315           ISZ FROM
1677  1315           TAD FROM
1700  7700           SMA CLA         /DONE?
1701  5264           JMP NN          /NO
1702  6201  ENDO,    CDFO
1703  5600           JMP I MOVE      /YES
1704  3315  RR,      DCA FROM
1705  1714           TAD I TO
1706  0316           AND C7700
1707  7421           MQL
1710  1715           TAD I FROM
1711  0106           AND C77
1712  7501           MQA
1713  5224           JMP QQ+1
1714  0000  TO,      0
1715  0000  FROM,    0
1716  7700  C7700,   7700
                     /2000 BIT - DELETE WORD ONLY ONCE
                     /4000 BIT - FOUND AND DELETED
                     *2746
2746  0000  CLEAR,   0
2747  1375           TAD XXLST       /2202
2750  3376           DCA STLST
2751  1776  NEXT,    TAD I STLST
2752  7450           SNA             /ZERO?
2753  5363           JMP ZERO        /YES
2754  1111           TAD CM1
2755  3377           DCA SPOT
2756  1777           TAD I SPOT
2757  0046           AND C3777
2760  3777           DCA I SPOT
2761  2376           ISZ STLST
2762  5351           JMP NEXT
2763  2376  ZERO,    ISZ STLST
2764  7201           CLA IAC
2765  1776           TAD I STLST
2766  7640           SZA CLA         /END OF LIST (7777)?
2767  5361           JMP ZERO-2
2770  1373           TAD C2202
```

```
2771  3774           DCA I L4542
2772  5746           JMP I CLEAR
2773  2202  C2202,   2202
2774  4641  L4542,   4641
2775  2202  XXLST,   2202
2776  0000  STLST,   0
2777  0000  SPOT,    0
                     *200    /MAGTAP W. RETRY FRO ERRONEOUS EOF
0200  0000  MAGIN,   0
0201  1035           TAD CM12
0202  3367           DCA REVCNT
0203  1372           TAD C1070
0204  3371           DCA REVERS
0205  1037           TAD C4000
0206  3374           DCA WRDCNT        /READ 4000 CHR RECORD
0207  7240           CLA CMA
0210  3375           DCA CADDR         /INPUT AT 0 MBI
0211  1373           TAD C1220
0212  3376           DCA COM /READ CD MODE
0213  4221           JMS MAGOP
0214  4242           JMS STATCK
0215  5600           JMP I MAGIN       /OK
0216  5300           JMP CKEOF         /EOF
0217  5264           JMP PAR /PARITY
0220  7402           HLT      /MT ERROR
0221  0000  MAGOP,   0
0222  1374           TAD WRDCNT
0223  3032           DCA WC
0224  1375           TAD CADDR
0225  3033           DCA CA
0226  7201           CLA IAC
0227  6717           6717    /SET TO MEMORY BANK 1
0230  7300           CLA CLL
0231  1376           TAD COM
0232  6711           6711    /CONTROL READY?
0233  5232           JMP .-1
0234  6716           6716    /LOAD COM REG
0235  7300           CLA CLL
0236  6722           6722    /MTGO
0237  6701           6701    /MTSF
0240  5237           JMP .-1
0241  5621           JMP I MAGOP
0242  0000  STATCK,  0
0243  7300           CLA CLL
0244  6706           6706    /READ STATUS
0245  3040           DCA STATUS
0246  1040           TAD STATUS
0247  0041           AND C6774
0250  7450           SNA      /ERRORS?
0251  5642           JMP I STATCK      /NO
0252  2242           ISZ STATCK        /YES
0253  0042           AND C7677
0254  7450           SNA      /EOF?
0255  5642           JMP I STATCK      /YES
0256  2242           ISZ STATCK        /NO
0257  0043           AND C3543
0260  7450           SNA      /PARITY?
0261  5642           JMP I STATCK      /YES
0262  2242           ISZ STATCK        /NO
0263  5642           JMP I STATCK
0264  2367  PAR,     ISZ REVCNT
0265  5267           JMP .+2 /RETRY
0266  7402           HLT      /RETRY FAILURE
0267  7240           CLA CMA
0270  3374           DCA WRDCNT
0271  1371           TAD REVERS
0272  3376           DCA COM
0273  4221           JMS MAGOP
0274  1242           TAD STATCK
0275  1035           TAD CM12
```

```
0276  3242            DCA STATCK
0277  5642            JMP I STATCK
0300  2367  CKEOF,    ISZ REVCNT
0301  5303            JMP .+2
0302  7402            HLT      /RETRY FAILURE ON EOF
0303  7240            CLA CMA
0304  3374            DCA WRDCNT
0305  1371            TAD REVERS
0306  3376            DCA COM
0307  4221            JMS MAGOP
0310  7300            CLA CLL
0311  6706            6706
0312  0045            AND C100
0313  7640            SZA CLA /TRUE EOF?
0314  7402            HLT      /YES, CK READ OR WRITE
0315  1242            TAD STATCK      /NO
0316  1036            TAD CM11
0317  3242            DCA STATCK
0320  5642            JMP I STATCK
0321  4344  XEOF,     JMS MAGOT        /DUMP LAST RECORD
0322  7402            HLT
0323  7300  REWIND,   CLA CLL
0324  1366            TAD C50
0325  3376            DCA COM
0326  4221            JMS MAGOP
0327  1370            TAD C1010
0330  6716            6716
0331  6721            6721
0332  5331            JMP .-1
0333  6722            6722
0334  7300            CLA CLL
0335  1047            TAD C10
0336  6716            6716
0337  6721            6721
0340  5337            JMP .-1
0341  6722            6722
0342  7300            CLA CLL
0343  7402            HLT      /PROCESSING COMPLETE
0344  0000  MAGOT,    0
0345  7000            NOP      /JMS I XRECCK TO ANALYZE RECORD LENGTH - 4463
0346  1035            TAD CM12
0347  3367            DCA REVCNT
0350  1050            TAD C70
0351  3371            DCA REVERS
0352  7333            7333     /-2000
0353  3374            DCA WRDCNT
0354  1046            TAD C3777
0355  3375            DCA CADDR       /OUTPUT FROM 4000 MBI
0356  1377            TAD C240
0357  3376            DCA COM
0360  4221            JMS MAGOP
0361  4242            JMS STATCK
0362  5744            JMP I MAGOT
0363  5300            JMP CKEOF       /EOF
0364  5264            JMP PAR /PARITY
0365  7402            HLT      /MT ERROR
0366  0050  C50,      50
0367  0000  REVCNT,   0
0370  1010  C1010,    1010
0371  0000  REVERS,   0
0372  1070  C1070,    1070
0373  1220  C1220,    1220
0374  0000  WRDCNT,   0
0375  0000  CADDR,    0
0376  0000  COM,      0
0377  0240  C240,     240
                      *400     /MAINLINE
0400  4623            JMS I XZERO
0401  4617            JMS I XMAGIN    /READ RECORD
0402  4625            JMS I XSELCT    /SET HEADER CATEGORY BITS
```

```
0403  4620  AA,      JMS I XTRANS    /TRANS TO OUTBUF
0404  4617  BBB,     JMS I XMAGIN    /READ NEXT REC
0405  4625           JMS I XSELCT    /SET HEADER CATEGORY BITS
0406  4621           JMS I XCOMPR    /MATCK?
0407  5212           JMP CC   /NO
0410  4622           JMS I XTRAN2    /YES, TRANSFER REC
0411  5204           JMP BBB
0412  4464  CC,      JMS I XMAGOT    /OUTPUT REC
0413  3067           DCA OVRTRG
0414  4623           JMS I XZERO     /ZERO OUTPUT AREA
0415  4624           JMS I XCKREC    /INSERT BLANK RECORD IF NECCESSARY
0416  5203           JMP AA
0417  0200  XMAGIN,  200
0420  0600  XTRANS;  600
0421  0700  XCOMPR,  700
0422  1000  XTRAN2,  1000
0423  0740  XZERO,   740
0424  1200  XCKREC,  1200
0425  1400  XSELCT,  1400            /SUBS TO CATEGORIZE DRC REC
                     *600
0600  0000  TRANS,   0
0601  7300           CLA CLL
0602  6211           CDF1
0603  1451           TAD I LOC5
0604  6201           CDF0
0605  3034           DCA LSTCHR      /GET LOC OF NEXT CHAR
0606  1244           TAD XSTART
0607  3245           DCA ST   /SET BEG OF INPUT BUF
0610  1037           TAD C4000
0611  3052           DCA PUT /SET BEG OF OUTPUT BUF
0612  1034           TAD LSTCHR
0613  0037           AND C4000
0614  7640           SZA CLA /4000 BIT UP?
0615  1111           TAD CM1 /YES, NXT CHR GOES IN 1ST HALF
0616  1034           TAD LSTCHR
0617  0046           AND C3777
0620  1037           TAD C4000       /NO
0621  3246           DCA LSTPOS      /SET LAST ACTUAL DATA POS
0622  6211  NXCHR,   CDF1
0623  1645           TAD I ST
0624  3452           DCA I PUT
0625  6201           CDF0
0626  1052           TAD PUT
0627  7041           CIA
0630  1246           TAD LSTPOS
0631  7650           SNA CLA /LAST CHAR TRANS?
0632  5600           JMP I TRANS     /YES
0633  2245           ISZ ST   /NO
0634  2052           ISZ PUT
0635  1052           TAD PUT
0636  1053           TAD LIM
0637  7640           SZA CLA /BUFFER FULL?
0640  5222           JMP NXCHR       /NO
0641  2067           ISZ OVRTRG      /YES, SET TRIGGER
0642  4466           JMS I XPRTFM    /PRINT FRAME NO
0643  5465           JMP I L404      /READ NEXT REC
0644  0000  XSTART,  0
0645  0000  ST,      0
0646  0000  LSTPOS,  0
                     *1000
1000  0000  TRANS2,  0
1001  7300           CLA CLL
1002  1067           TAD OVRTRG
1003  7640           SZA CLA /BUFFER OVERFLO?
1004  5600           JMP I TRANS2    /YES
1005  1331           TAD XST2
1006  3332           DCA ST22        /20
1007  6211           CDF1
1010  1451           TAD I LOC5
1011  3333           DCA LCHR2
```

```
1012  1034           TAD LSTCHR      /GET POS IN OUTPUT BUF
1013  0037           AND C4000
1014  7640           SZA CLA /4000 BIT UP?
1015  5272           JMP FIRST       /YES
1016  4335           JMS FIXLOC      /NO, LOC HALF FILLED - SET ST FOR TRANS
1017  1452   AGAIN,  TAD I PUT
1020  7421           MQL     /SAVE PREVIOUS HALF
1021  1732           TAD I ST22
1022  7002           BSW
1023  0106           AND C77
1024  7501           MQA     /OR IN 1ST HALF
1025  3452           DCA I PUT
1026  2052           ISZ PUT
1027  4320           JMS CKLIM
1030  6211           CDF1
1031  1732           TAD I ST22
1032  7002           BSW
1033  0334           AND CC7700
1034  3452           DCA I PUT
1035  2332           ISZ ST22
1036  1333           TAD LCHR2
1037  0046           AND C3777
1040  7041           CIA
1041  1332           TAD ST22
1042  7640           SZA CLA /ON LAST CHAR?
1043  5217           JMP AGAIN       /NO
1044  1333           TAD LCHR2       /YES
1045  0037           AND C4000
1046  7640           SZA CLA /4000 BIT UP?
1047  5264           JMP ENDIT       /YES, NO MORE DATA
1050  1452           TAD I PUT       /NO, 1ST HALF FILLED
1051  7421           MQL
1052  1732           TAD I ST22
1053  7002           BSW
1054  0106           AND C77
1055  7501           MQA
1056  3452           DCA I PUT
1057  2052           ISZ PUT
1060  4320           JMS CKLIM
1061  6211           CDF1
1062  1052           TAD PUT
1063  5266           JMP ENDIT+2
1064  1052   ENDIT,  TAD PUT
1065  0046           AND C3777
1066  3462           DCA I L4005     /PUT IN HEADER INFO
1067  1462           TAD I L4005
1070  3034           DCA LSTCHR      /SET FOR NEXT REC IF ANY
1071  5343           JMP SETHD       /OR HDR BITS OF RECORDS
1072  4335   FIRST,  JMS FIXLOC
1073  1732   AG1,    TAD I ST22
1074  3452           DCA I PUT
1075  2332           ISZ ST22
1076  2052           ISZ PUT
1077  4320           JMS CKLIM
1100  6211           CDF1
1101  1333           TAD LCHR2
1102  0046           AND C3777
1103  7041           CIA
1104  1332           TAD ST22
1105  7640           SZA CLA /ON LAST CHAR?
1106  5273           JMP AG1 /NO
1107  1333           TAD LCHR2       /YES
[illegible] [illegible]  AND C4000
1111  7640           SZA CLA /4000 BIT UP?
1112  5316           JMP ENDD        /YES, NO MORE DATA
1113  1732           TAD I ST22      /NO
1114  3452           DCA I PUT
1115  5264           JMP ENDIT
1116  1052   ENDD,   TAD PUT
1117  5266           JMP ENDIT+2
```

```
1120   0000   CKLIM,   0
1121   6201            CDF0
1122   1052            TAD PUT
1123   1053            TAD LIM
1124   7640            SZA CLA /BUFFER OVERFLOW?
1125   5720            JMP I CKLIM      /NO
1126   2067            ISZ OVRTRG       /YES, SET TRIG
1127   4466            JMS I XPRIFM     /PRINT FRAME NO
1130   5465            JMP I L404       /GO ON TO NEXT REC
1131   0020   XST2,    20
1132   0000   ST22,    0
1133   0000   LCHR2,   0
1134   7700   CC7700,  7700
1135   0000   FIXLOC,  0
1136   1034            TAD LSTCHR
1137   0046            AND C3777
1140   1037            TAD C4000
1141   3052            DCA PUT
1142   5735            JMP I FIXLOC
1143   1364   SETHD,   TAD CM4
1144   3365            DCA ACT
1145   1047            TAD C10
1146   3366            DCA LOC
1147   1370            TAD C4010
1150   3367            DCA LOCN
1151   1766   SET,     TAD I LOC
1152   7421            MQL              /SAVE BITS
1153   1767            TAD I LOCN
1154   7501            MQA              /OR TOGETHER
1155   3767            DCA I LOCN
1156   2366            ISZ LOC
1157   2367            ISZ LOCN
1160   2365            ISZ ACT          /DONE?
1161   5351            JMP SET          /NO
1162   6201            CDF0             /YES
1163   5600            JMP I TRANS2
1164   7774   CM4,     -4
1165   0000   ACT,     0
1166   0000   LOC,     0
1167   0000   LOCN,    0
1170   4010   C4010,   4010
                       *700
0700   0000   COMPAR,  0
0701   7300            CLA CLL
0702   6211            CDF1
0703   1460            TAD I L4002
0704   7041            CIA
0705   3055            DCA HIORD        /HI ORDER FRAME NO
0706   1461            TAD I L4003
0707   3054            DCA LOORD        /LO ORDER FRAME NO
0710   1055            TAD HIORD
0711   1456            TAD I LOC2
0712   7640            SZA CLA /MATCH?
0713   5321            JMP ENDER        /NO
0714   1054            TAD LOORD
0715   7041            CIA
0716   1457            TAD I LOC3
0717   7650            SNA CLA /MATCH?
0720   2300            ISZ COMPAR       /YES
0721   6201   ENDER,   CDF0
0722   5700            JMP I COMPAR
                       *500
0500   0000   PRIFRM,  0
0501   7300            CLA CLL
0502   6211            CDF1
0503   1053            TAD LIM
0504   7041            CIA
0505   3462            DCA I L4005      /SET TO OVERFLOW LIMIT
0506   1456            TAD I LOC2
0507   3314            DCA HI
```

```
0510  1457           TAD I LOC3
0511  3315           DCA LO
0512  6201           CDF0
0513  4755           JMS I XOCDEC
0514  0000  HI,      0
0515  0000  LO,      0
0516  0000           0
0517  0000           0
0520  0000           0
0521  0000           0
0522  0000  N1,      0
0523  0000  N2,      0
0524  0000  N3,      0
0525  0000  N4,      0
0526  1352           TAD CM43        /RESULTS IN CAR RETN
0527  4343           JMS PRT
0530  1353           TAD CM46        /RESULTS IN LINE FEED
0531  4343           JMS PRT
0532  1322           TAD N1
0533  4343           JMS PRT
0534  1323           TAD N2
0535  4343           JMS PRT
0536  1324           TAD N3
0537  4343           JMS PRT
0540  1325           TAD N4
0541  4343           JMS PRT
0542  5700           JMP I PRTFRM
0543  0000  PRT,     0
0544  1356           TAD C260
0545  6046           6046
0546  6041           6041
0547  5346           JMP .-1
0550  7300           CLA CLL
0551  5743           JMP I PRT
0552  7735  CM43,    -43
0553  7732  CM46,    -46
0554  0003  LOCG3,   3
0555  3000  XOCDEC,  3000
0556  0260  C260,    260
                     *740
0740  0000  ZERO0,   0
0741  1037           TAD C4000
0742  3351           DCA STT
0743  6211           CDF1
0744  3751  AAA,     DCA I STT
0745  2351           ISZ STT
0746  5344           JMP AAA /NOT DONE
0747  6201           CDF0    /DONE
0750  5740           JMP I ZERO0
0751  0000  STT,     0
                     *430
0430  0000  RECCK,   0
0431  7300           CLA CLL
0432  6211           CDF1
0433  1462           TAD I L4005
0434  6201           CDF0
0435  0046           AND C3777
0436  1251           TAD CM1300
0437  7710           SPA CLA /<1350 CHAR IN REC?
0440  5245           JMP CNTR        /YES
0441  2255           ISZ CT2 /YES, INC LO ORD CTR
0442  5630           JMP I RECCK
0443  2254           ISZ CT22
0444  5630           JMP I RECCK
0445  2253  CNTR,    ISZ CT1
0446  5630           JMP I RECCK
0447  2252           ISZ CT11
0450  5630           JMP I RECCK
0451  6500  CM1300,  -1300
0452  0000  CT11,    0
```

```
0453 0000 CT1,     0
0454 0000 CT22,    0
0455 0000 CT2,     0
                   *1200
1200 0000 CKREC,   0
1201 7201          CLA IAC
1202 1054          TAD LOORD
1203 7041          CIA
1204 6211          CDF1
1205 1457          TAD I LOC3
1206 7450          SNA      /FRAME NO ONE GREATER?
1207 5234          JMP CKEND        /YES
1210 7710          SPA CLA /NO, FRAME NO LESS? - OUT OF ORDER FRAME
1211 7402          HLT      /ERROR
1212 2054          ISZ LOORD        /NO
1213 5215          JMP .+2
1214 7001          IAC      /SET HI ORDER NO
1215 1456          TAD I LOC2
1216 3460          DCA I L4002     /TRANSFER HI ORDER NO
1217 1054          TAD LOORD
1220 3461          DCA I L4003
1221 1236          TAD CC4020
1222 3462          DCA I L4005
1223 1637          TAD I LOC1
1224 3641          DCA I L4001
1225 1640          TAD I LOC0
1226 3437          DCA I C4000
1227 7001          IAC
1230 3642          DCA I L4004
1231 6201          CDF0
1232 4464          JMS I XMAGOT    /OUTPUT BLANK RECORD
1233 5201          JMP CKREC+1
1234 6201 CKEND,   CDF0
1235 5600          JMP I CKREC
1236 4020 CC4020,  4020
1237 0001 LOC1,    1
1240 0000 LOC0,    0
1241 4001 L4001,   4001
1242 4004 L4004,   4004
                   *3000
3000 0000 OCDEC,   0
3001 7300          CLA CLL
3002 1600          TAD I OCDEC
3003 2200          ISZ OCDEC
3004 3255          DCA UDHIGH
3005 1600          TAD I OCDEC
3006 2200          ISZ OCDEC
3007 3256          DCA UDLOW
3010 1251          TAD UDLOOP
3011 3254          DCA UDCNT
3012 1252          TAD UDADDR
3013 3264          DCA UDPTR
3014 3261          DCA UDBOX
3015 1664 UDARND,  TAD I UDPTR
3016 2264          ISZ UDPTR
3017 3257          DCA UDHSUB
3020 1664          TAD I UDPTR
3021 2264          ISZ UDPTR
3022 3260          DCA UDLSUB
3023 7100 UDDO,    CLL
3024 1260          TAD UDLSUB
3025 1256          TAD UDLOW
3026 3262          DCA UDTEML
3027 7004          RAL
3030 1257          TAD UDHSUB
3031 1255          TAD UDHIGH
3032 7420          SNL
3033 5241          JMP UDOUT
3034 2261          ISZ UDBOX
3035 3255          DCA UDHIGH
```

```
3036  1262            TAD UDTEML
3037  3256            DCA UDLOW
3040  5223            JMP UDDO
3041  7200  UDOUT,    CLA
3042  1261            TAD UDBOX
3043  3600            DCA I OCDEC
3044  2200            ISZ OCDEC
3045  3261            DCA UDBOX
3046  2254            ISZ UDCNT
3047  5215            JMP UDARND
3050  5600            JMP I OCDEC
3051  7770  UDLOOP,   -10
3052  3065  UDADDR,   UDCONI
3053  0260  UDTWO,    260
3054  0000  UDCNT,    0
3055  0000  UDHIGH,   0
3056  0000  UDLOW,    0
3057  0000  UDHSUB,   0
3060  0000  UDLSUB,   0
3061  0000  UDBOX,    0
3062  0000  UDTEML,   0
3063  0000  UDGET,    0
3064  0000  UDPTR,    0
3065  3166  UDCONI,   3166     /POWERS OF TEN
3066  4600            4600
3067  7413            7413
3070  6700            6700
3071  7747            7747
3072  4540            4540
3073  7775            7775
3074  4360            4360
3075  7777            7777
3076  6030            6030
3077  7777            7777
3100  7634            7634
3101  7777            7777
3102  7766            7766
3103  7777            7777
3104  7777            7777

            U         *2200           /POINTERS TO CATEGORY WORDS
2200  7734  -44                 /J
2201  3600  3600
2202  3604  3604
2203  3614  3614
2204  3620  3620
2205  3625  3625
2206  3631  3631
2207  0000  0
2210  7740  -40                 /F
2211  3636  3636
2212  3642  3642
2213  3651  3651
2214  3655  3655
2215  0000  0
2216  7731  -47                 /M
2217  3666  3666
2220  3672  3672
2221  3701  3701
2222  3705  3705
2223  3711  3711
2224  0000  0
2225  7745  -33                 /A
2226  3717  3717
2227  3723  3723
2230  3731  3731
2231  3735  3735
2232  0000  0
2233  7723  -55                 /S
```

| | | | |
|---|---|---|---|
| 2234 | 3744 | 3744 | |
| 2235 | 3750 | 3750 | |
| 2236 | 3757 | 3757 | |
| 2237 | 3763 | 3763 | |
| 2240 | 3774 | 3774 | |
| 2241 | 4000 | 4000 | |
| 2242 | 4005 | 4005 | |
| 2243 | 4017 | 4017 | |
| 2244 | 0000 | 0 | |
| 2245 | 7727 | -51 | /O |
| 2246 | 4025 | 4025 | |
| 2247 | 4031 | 4031 | |
| 2250 | 4041 | 4041 | |
| 2251 | 4052 | 4052 | |
| 2252 | 0000 | 0 | |
| 2253 | 7730 | -50 | /N |
| 2254 | 4065 | 4065 | |
| 2255 | 4071 | 4071 | |
| 2256 | 4605 | 4605 | |
| 2257 | 4627 | 4627 | |
| 2260 | 0000 | 0 | |
| 2261 | 7742 | -36 | /D |
| 2262 | 4102 | 4102 | |
| 2263 | 4106 | 4106 | |
| 2264 | 4117 | 4117 | |
| 2265 | 4143 | 4143 | |
| 2266 | 4163 | 4163 | |
| 2267 | 0000 | 0 | |
| 2270 | 7722 | -56 | /T |
| 2271 | 4172 | 4172 | |
| 2272 | 4177 | 4177 | |
| 2273 | 4207 | 4207 | |
| 2274 | 4215 | 4215 | |
| 2275 | 4226 | 4226 | |
| 2276 | 4232 | 4232 | |
| 2277 | 4236 | 4236 | |
| 2300 | 4241 | 4241 | |
| 2301 | 0000 | 0 | |
| 2302 | 7717 | -61 | /W |
| 2303 | 4244 | 4244 | |
| 2304 | 4250 | 4250 | |
| 2305 | 0000 | 0 | |
| 2306 | 7726 | -52 | /P |
| 2307 | 4262 | 4262 | |
| 2310 | 4267 | 4267 | |
| 2311 | 4274 | 4274 | |
| 2312 | 4301 | 4301 | |
| 2313 | 0000 | 0 | |
| 2314 | 7741 | -37 | /E |
| 2315 | 4306 | 4306 | |
| 2316 | 4320 | 4320 | |
| 2317 | 0000 | 0 | |
| 2320 | 7743 | -35 | /C |
| 2321 | 4333 | 4333 | |
| 2322 | 4343 | 4343 | |
| 2323 | 4352 | 4352 | |
| 2324 | 4357 | 4357 | |
| 2325 | 4364 | 4364 | |
| 2326 | 4371 | 4371 | |
| 2327 | 4375 | 4375 | |
| 2330 | 4401 | 4401 | |
| 2331 | 4405 | 4405 | |
| 2332 | 4411 | 4411 | |
| 2333 | 4415 | 4415 | |
| 2334 | 4421 | 4421 | |
| 2335 | 4543 | 4543 | |
| 2336 | 4570 | 4570 | |
| 2337 | 0000 | 0 | |
| 2340 | 7732 | -46 | /L |
| 2341 | 4424 | 4424 | |

```
2342 4452 4452
2343 4477 4477
2344 4525 4525
2345 0000 0
2346 7775 -3          /LOWER CASE C
2347 4543 4543
2350 4570 4570
2351 0000 0
2352 7762 -16         /LOWER CASE N
2353 4605 4605
2354 4627 4627
2355 0000 0
2356 7777 7777
               *2360          /BIT TURN ON LIST
2360 0000 0
2361 0001 1
2362 0002 2
2363 0004 4
2364 0010 10
2365 0020 20
2366 0040 40
2367 0100 100
2370 0200 200
2371 0400 400
2372 1000 1000
2373 2000 2000
2374 4000 4000
               *3600          /CATEGORY COMPARE WORDS
3600 7777 -1   /JAN
3601 7762 -16
3602 0000 0
3603 3000 3000
3604 7777 -1          /JANUARY
3605 7762 -16
3606 7753 -25
3607 7777 -1
3610 7756 -22
3611 7747 -31
3612 0000 0
3613 3000 3000
3614 7753 -25         /JUN
3615 7762 -16
3616 0000 0
3617 3000 3000
3620 7753 -25         /JUNE
3621 7762 -16
3622 7773 -5
3623 0000 0
3624 3000 3000
3625 7753 -25         /JUL
3626 7764 -14
3627 0000 0
3630 3000 3000
3631 7753 -25         /JULY
3632 7764 -14
3633 7747 -31
3634 0000 0
3635 3000 3000
3636 7756 -22         /FRI
3637 7767 -11
3640 0000 0
3641 3002 3002
3642 7756 -22         /FRIDAY
3643 7767 -11
3644 7774 -4
3645 7777 -1
3646 7747 -31
3647 0000 0
3650 3002 3002
3651 7773 -5          /FEB
```

```
3652  7776  -2
3653  0000  0
3654  3000  3000
3655  7773  -5           /FEBRUARY
3656  7776  -2
3657  7756  -22
3660  7753  -25
3661  7777  -1
3662  7756  -22
3663  7747  -31
3664  0000  0
3665  3000  3000
3666  7761  -17          /MON
3667  7762  -16
3670  0000  0
3671  3006  3006
3672  7761  -17          /MONDAY
3673  7762  -16
3674  7774  -4
3675  7777  -1
3676  7747  -31
3677  0000  0
3700  3006  3006
3701  7777  -1           /MAY
3702  7747  -31
3703  0000  0
3704  3000  3000
3705  7777  -1           /MAR
3706  7756  -22
3707  0000  0
3710  3000  3000
3711  7777  -1           /MARCH
3712  7756  -22
3713  7775  -3
3714  7770  -10
3715  0000  0
3716  3000  3000
3717  7760  -20          /APR
3720  7756  -22
3721  0000  0
3722  3000  3000
3723  7760  -20          /APRIL
3724  7756  -22
3725  7767  -11
3726  7764  -14
3727  0000  0
3730  3000  3000
3731  7753  -25          /AUG
3732  7771  -7
3733  0000  0
3734  3000  3000
3735  7753  -25          /AUGUST
3736  7771  -7
3737  7753  -25
3740  7755  -23
3741  7754  -24
3742  0000  0
3743  3000  3000
3744  7753  -25          /SUN
3745  7762  -16
3746  0000  0
3747  3007  3007
3750  7753  -25          /SUNDAY
3751  7762  -16
3752  7774  -4
3753  7777  -1
3754  7747  -31
3755  0000  0
3756  3007  3007
```

| | | | |
|---|---|---|---|
| 3757 | 7777 | -1 | /SAT |
| 3760 | 7754 | -24 | |
| 3761 | 0000 | 0 | |
| 3762 | 3001 | 3001 | |
| 3763 | 7777 | -1 | /SATURDAY |
| 3764 | 7754 | -24 | |
| 3765 | 7753 | -25 | |
| 3766 | 7756 | -22 | |
| 3767 | 7774 | -4 | |
| 3770 | 7777 | -1 | |
| 3771 | 7747 | -31 | |
| 3772 | 0000 | 0 | |
| 3773 | 3001 | 3001 | |
| 3774 | 7773 | -5 | /SEP |
| 3775 | 7760 | -20 | |
| 3776 | 0000 | 0 | |
| 3777 | 3000 | 3000 | |
| 4000 | 7773 | -5 | /SEPT |
| 4001 | 7760 | -20 | |
| 4002 | 7754 | -24 | |
| 4003 | 0000 | 0 | |
| 4004 | 3000 | 3000 | |
| 4005 | 7773 | -5 | /SEPTEMBER |
| 4006 | 7760 | -20 | |
| 4007 | 7754 | -24 | |
| 4010 | 7773 | -5 | |
| 4011 | 7763 | -15 | |
| 4012 | 7776 | -2 | |
| 4013 | 7773 | -5 | |
| 4014 | 7756 | -22 | |
| 4015 | 0000 | 0 | |
| 4016 | 3000 | 3000 | |
| 4017 | 7775 | -3 | /SCENE |
| 4020 | 7773 | -5 | |
| 4021 | 7762 | -16 | |
| 4022 | 7773 | -5 | |
| 4023 | 0000 | 0 | |
| 4024 | 3213 | 3213 | |
| 4025 | 7775 | -3 | /OCT |
| 4026 | 7754 | -24 | |
| 4027 | 0000 | 0 | |
| 4030 | 3000 | 3000 | |
| 4031 | 7775 | -3 | /OCTOBER |
| 4032 | 7754 | -24 | |
| 4033 | 7761 | -17 | |
| 4034 | 7776 | -2 | |
| 4035 | 7773 | -5 | |
| 4036 | 7756 | -22 | |
| 4037 | 0000 | 0 | |
| 4040 | 3000 | 3000 | |
| 4041 | 7776 | -2 | /OBITUARY |
| 4042 | 7767 | -11 | |
| 4043 | 7754 | -24 | |
| 4044 | 7753 | -25 | |
| 4045 | 7777 | -1 | |
| 4046 | 7756 | -22 | |
| 4047 | 7747 | -31 | |
| 4050 | 0000 | 0 | |
| 4051 | 0204 | 0204 | |
| 4052 | 7776 | -2 | /OBITUARIES |
| 4053 | 7767 | -11 | |
| 4054 | 7754 | -24 | |
| 4055 | 7753 | -25 | |
| 4056 | 7777 | -1 | |
| 4057 | 7756 | -22 | |
| 4060 | 7767 | -11 | |
| 4061 | 7773 | -5 | |
| 4062 | 7755 | -23 | |
| 4063 | 0000 | 0 | |
| 4064 | 0204 | 0204 | |

```
4065  7761  -17     /NOV
4066  7752  -26
4067  0000  0
4070  3000  3000
4071  7761  -17     /NOVEMBER
4072  7752  -26
4073  7773  -5
4074  7763  -15
4075  7776  -2
4076  7773  -5
4077  7756  -22
4100  0000  0
4101  3000  3000
4102  7773  -5      /DEC
4103  7775  -3
4104  0000  0
4105  3000  3000
4106  7773  -5      /DECEMBER
4107  7775  -3
4110  7773  -5
4111  7763  -15
4112  7776  -2
4113  7773  -5
4114  7756  -22
4115  0000  0
4116  3000  3000
4117  7773  -5      /DEATHS AND FUNERALS
4120  7777  -1
4121  7754  -24
4122  7770  -10
4123  7755  -23
4124  7701  -77
4125  7777  -1
4126  7762  -16
4127  7774  -4
4130  7701  -77
4131  7772  -6
4132  7753  -25
4133  7762  -16
4134  7773  -5
4135  7756  -22
4136  7777  -1
4137  7764  -14
4140  7755  -23
4141  0000  0
4142  0204  0204
4143  7773  -5      /DEATHS FUNERALS
4144  7777  -1
4145  7754  -24
4146  7770  -10
4147  7755  -23
4150  7701  -77
4151  7772  -6
4152  7753  -25
4153  7762  -16
4154  7773  -5
4155  7756  -22
4156  7777  -1
4157  7764  -14
4160  7755  -23
4161  0000  0
4162  0204  0204
4163  7773  -5      /DEATHS
4164  7777  -1
4165  7754  -24
4166  7770  -10
4167  7755  -23
4170  0000  0
4171  0204  0204
4172  7753  -25     /TUES
```

```
4173  7773  -5
4174  7755  -23
4175  0000  0
4176  3005  3005
4177  7753  -25          /TUESDAY
4200  7773  -5
4201  7755  -23
4202  7774  -4
4203  7777  -1
4204  7747  -31
4205  0000  0
4206  3005  3005
4207  7770  -10          /THURS
4210  7753  -25
4211  7756  -22
4212  7755  -23
4213  0000  0
4214  3003  3003
4215  7770  -10          /THURSDAY
4216  7753  -25
4217  7756  -22
4220  7755  -23
4221  7774  -4
4222  7777  -1
4223  7747  -31
4224  0000  0
4225  3003  3003
4226  7756  -22          /TRF
4227  7772  -6
4230  0000  0
4231  3103  3103
4232  7770  -10          /THF
4233  7772  -6
4234  0000  0
4235  3102  3102
4236  7767  -11          /TI
4237  0000  0
4240  3101  3101
4241  7773  -5           /TE
4242  0000  0
4243  3214  3214
4244  7773  -5           /WED
4245  7774  -4
4246  0000  0
4247  3004  3004
4250  7773  -5           /WEDNESDAY
4251  7774  -4
4252  7762  -16
4253  7773  -5
4254  7755  -23
4255  7774  -4
4256  7777  -1
4257  7747  -31
4260  0000  0
4261  3004  3004
4262  7767  -11          /PIXP
4263  7750  -30
4264  7760  -20
4265  0000  0
4266  3210  3210
4267  7767  -11          /PIXM
4270  7750  -30
4271  7763  -15
4272  0000  0
4273  3207  3207
4274  7767  -11          /PIXG
4275  7750  -30
4276  7771  -7
4277  0000  0
4300  3206  3206
```

```
4301  7767  -11    /PIXT
4302  7750  -30
4303  7754  -24
4304  0000  0
4305  3205  3205
4306  7774  -4     /EDITORIAL
4307  7767  -11
4310  7754  -24
4311  7761  -17
4312  7756  -22
4313  7767  -11
4314  7777  -1
4315  7764  -14
4316  0000  0
4317  0203  0203
4320  7774  -4     /EDITORIALS
4321  7767  -11
4322  7754  -24
4323  7761  -17
4324  7756  -22
4325  7767  -11
4326  7777  -1
4327  7764  -14
4330  7755  -23
4331  0000  0
4332  0203  0203
4333  7777  -1     /CARTOON
4334  7756  -22
4335  7754  -24
4336  7761  -17
4337  7761  -17
4340  7762  -16
4341  0000  0
4342  0201  0201
4343  7766  -12    /CJTMAG
4344  7754  -24
4345  7763  -15
4346  7777  -1
4347  7771  -7
4350  0000  0
4351  3110  3110
4352  7766  -12    /CJTI
4353  7754  -24
4354  7767  -11
4355  0000  0
4356  3106  3106
4357  7766  -12    /CJTK
4360  7754  -24
4361  7765  -13
4362  0000  0
4363  3105  3105
4364  7766  -12    /CJTE
4365  7754  -24
4366  7773  -5
4367  0000  0
4370  3104  3104
4371  7766  -12    /CJT
4372  7754  -24
4373  0000  0
4374  3107  3107
4375  7766  -12    /CJI
4376  7767  -11
4377  0000  0
4400  3113  3113
4401  7766  -12    /CJK
4402  7765  -13
4403  0000  0
4404  3112  3112
4405  7766  -12    /CJE
4406  7773  -5
```

```
4407  0000  0
4410  3111  3111
4411  7766  -12     /CJW
4412  7751  -27
4413  0000  0
4414  3212  3212
4415  7766  -12     /CIM
4416  7763  -15
4417  0000  0
4420  3211  3211
4421  7766  -12     /CJ
4422  0000  0
4423  3114  3114
4424  7773  -5              /LETTERS TO THE EDITOR
4425  7754  -24
4426  7754  -24
4427  7773  -5
4430  7756  -22
4431  7755  -23
4432  7701  -77
4433  7754  -24
4434  7761  -17
4435  7701  -77
4436  7754  -24
4437  7770  -10
4440  7773  -5
4441  7701  -77
4442  7741  -37
4443  7774  -4
4444  7767  -11
4445  7754  -24
4446  7761  -17
4447  7756  -22
4450  0000  0
4451  0202  0202
4452  7773  -5              /LETTER TO THE EDITOR
4453  7754  -24
4454  7754  -24
4455  7773  -5
4456  7756  -22
4457  7701  -77
4460  7754  -24
4461  7761  -17
4462  7701  -77
4463  7754  -24
4464  7770  -10
4465  7773  -5
4466  7701  -77
4467  7741  -37
4470  7774  -4
4471  7767  -11
4472  7754  -24
4473  7761  -17
4474  7756  -22
4475  0000  0
4476  0202  0202
4477  7773  -5              /LETTER EDITOR LETTERS
4500  7754  -24
4501  7754  -24
4502  7773  -5
4503  7756  -22
4504  7701  -77
4505  7741  -37
4506  7774  -4
4507  7767  -11
4510  7754  -24
4511  7761  -17
4512  7756  -22
4513  7701  -77
4514  7732  -46
```

```
4515  7773  -5
4516  7754  -24
4517  7754  -24
4520  7773  -5
4521  7756  -22
4522  7755  -23
4523  0000  0
4524  0202  0202
4525  7773  -5          /LETTER EDITOR
4526  7754  -24
4527  7754  -24
4530  7773  -5
[illegible]  -22
4532  7701  -77
4533  7741  -37
4534  7774  -4
4535  7767  -11
4536  7754  -24
4537  7761  -17
4540  7756  -22
4541  0000  0
4542  0202  0202
4543  7756  -22         /CRIME AND THE COURTS
4544  7767  -11
4545  7763  -15
4546  7773  -5
4547  7701  -77
4550  7777  -1
4551  7762  -16
4552  7774  -4
4553  7701  -77
4554  7754  -24
4555  7770  -10
4556  7773  -5
4557  7701  -77
4560  7775  -3
4561  7761  -17
4562  7753  -25
4563  7756  -22
4564  7754  -24
4565  7755  -23
4566  0000  0
4567  0314  0314
4570  7756  -22         /CRIME COURTS
4571  7767  -11
4572  7763  -15
4573  7773  -5
4574  7701  -77
4575  7775  -3
4576  7761  -17
4577  7753  -25
4600  7756  -22
4601  7754  -24
4602  7755  -23
4603  0000  0
4604  0314  0314
4605  7777  -1          /NAMES IN THE NEWS
4606  7763  -15
4607  7773  -5
4610  7755  -23
4611  7701  -77
4612  7767  -11
4613  7762  -16
4614  7701  -77
4615  7754  -24
4616  7770  -10
4617  7773  -5
4620  7701  -77
4621  7762  -16
4622  7773  -5
```

```
4623  7751  -27
4624  7755  -23
4625  0000  0
4626  0313  0313
4627  7777  -1              /NAMES NEWS
4630  7763  -15
4631  7773  -5
4632  7755  -23
4633  7701  -77
4634  7762  -16.
4635  7773  -5
4636  7751  -27
4637  7755  -23
4640  0000  0
4641  0313  0313

AA      0403
AAA     0744
ACI     1165
AGAIN   1017
AGI     1073
ALIST   2062
BASLOC  3322
BB      2005
BBB     0404
BITS    3323
CA      0033
CADDR   0375
CC      0412
CCMS    2111
CC4020  1236
CC7700  1134
CHAR    0076
CHAR2   1517
CKEND   1234
CKEOF   0300
CKIT    3200
CKLIM   1120
CKON    1443
CKREC   1200
CKUP    3324
CKWD    3213
CLEAR   2746
CM1     0111
CM11    0036
CM12    0035
CM1300  0451
CM2     2107
CM32    0072
CM4     1164
CM43    0552
CM46    0553
CM65    2106
CM77    0107
CMIR    0445
COM     0376
COMP    3320
COMPAR  0700
CONT    3304
CT1     0453
CT11    0452
CT2     0455
CT22    0454
C10     0047
C100    0045
C1000   3331
C1010   0370
C1070   0372
C12     0110
C1220   0373
```

| | |
|---|---|
| C177 | 3313 |
| C2000 | 0071 |
| C2202 | 2773 |
| C240 | 0377 |
| C260 | 0556 |
| C3543 | 0043 |
| C3777 | 0046 |
| C400 | 0044 |
| C4000 | 0037 |
| C4010 | 1170 |
| C4020 | 1506 |
| C50 | 0366 |
| C6000 | 3330 |
| C6774 | 0041 |
| C7 | 0070 |
| C76 | 0050 |
| C700 | 3317 |
| C7677 | 0042 |
| C77 | 0106 |
| C7700 | 1716 |
| DAY | 2054 |
| DAYR | 3252 |
| DAYIRG | 0104 |
| DDO | 1520 |
| DELIRG | 0112 |
| DIMP | 0075 |
| END | 1473 |
| ENDD | 1116 |
| ENDER | 0721 |
| ENDIT | 1064 |
| ENDO | 1702 |
| EXIT | 1366 |
| EXT | 2052 |
| FIRST | 1072 |
| FIXLOC | 1135 |
| FROM | 1715 |
| GETCR | 1340 |
| H | 2063 |
| HERE | 3211 |
| HI | 0514 |
| HIORD | 0055 |
| L | 2064 |
| LCHR2 | 1133 |
| LIM | 0053 |
| LIST | 2077 |
| LISTN | 2100 |
| LO | 0515 |
| LOC | 1166 |
| LOCC3 | 0554 |
| LOCH | 1167 |
| LOCH10 | 0105 |
| LOC0 | 1240 |
| LOC1 | 1237 |
| LOC2 | 0056 |
| LOC3 | 0057 |
| LOC5 | 0051 |
| LOORD | 0054 |
| LST | 1510 |
| LSTCHR | 0024 |
| LSTPOS | 0646 |
| L4001 | 1241 |
| L4002 | 0060 |
| L4003 | 0061 |
| L4004 | 1242 |
| L4005 | 0062 |
| L404 | 0065 |
| L4542 | 2774 |
| MAGIN | 0200 |
| MAGOP | 0221 |

```
MAGOT   0344
MM      1633
MOTRG   0073
MOVE    1600
NEXT    2751
NN      1664
NUMCT   2105
NUMDO   2000
NXCHR   0622
N1      0522
N2      0523
N3      0524
N4      0525
OCDEC   3000
OVRTRG  0067
PAR     0264
PASSBY  1464
PRT     0543
PRTFRM  0500
PUT     0052
QQ      1623
RECCK   0430
RESET   1500
REVCNT  0367
REVERS  0371
REWIND  0323
RR      1704
SAVE    1514
SEC     1504
SECHLF  1653
SECN    1354
SELECT  1400
SET     1151
SETBIT  3223
SETHD   1143
SETON   3261
SETRG   3332
SPACE   2031
SPOT    2777
ST      0645
STATCK  0242
STATUS  0040
STLST   2776
STR     1425
STT     0751
STWD    0077
ST2     0100
ST22    1132
TO      1714
TRANS   0600
TRANS2  1000
TRGCK   1453
TWO     1407
UDADDR  3052
UDARND  3015
UDBOX   3061
UDCNT   3054
UDCONT  3065
UDDG    3023
UDGET   3063
UDHIGH  3055
UDHSUB  3057
UDLOOP  3051
UDLOW   3056
UDLSUB  3060
UDOUT   3041
UDPTR   3064
UDTEML  3062
UDTRO   3053
WC      0032
```

```
WORD    3321
WRDCNT  0374
XCKIT   1511
XCKREC  0424
XCLEAR  1512
XCOMPR  0421
XDECOC  2110
XEOF    0321
XGETCR  0101
XLST    1507
XMAGIN  0417
XMAGOT  0064
XMOVE   0102
XNUMBO  1513
XOCDEC  0555
XPASS   0074
XPRIFM  0066
XRECCK  0063
XSELCT  0425
XSTART  0644
XST2    1131
XTRANS  0420
XTRAN2  0422
XXLST   2775
XZERO   0423
YTRIG   0103
ZERO    2763
ZEROO   0740
```

PROGRAM 4 - DRC-MV

```
                  /ADDRESS TABLE MX DATA FORMATTER--MXDF
                  MGA=7501
                  MOL=7421
                  BSW=7002
                  CDF0=6201
                  CDF1=6211
                  FIXTAB
                            *2
0002   7402                 HLT
0003   0000       EXCOM,    0
                            *10        /AUTOBUFS
0010   0000       FRPOS,    0
0011   0000       DATA1,    0
0012   0000       DATA2,    0
                            *20        /DATUM MT USES THESE
0020   1400       DRT910,   1400       /
0021   0000       WRDCNT,   0          /
0022   0000                 0          /
0023   0000                 0          /
0024   1024                 1024       /
0025   0000                 0          /
0026   0000       BUSYFG,   0          /
0027   0000                 0          /
0030   1200       XDTAPE,   1200       /
0031   0000       ERRTRG,   0          /
0032   0000       DISWC,    0          /
0033   0000       DISCA,    0          /
0034   0000       XDT800,   0          /
                            *40        /CONSTANTS
0040   0101       C101,     101
0041   0400       C400,     400
0042   0100       C100,     100
0043   0010       C10,      10
0044   1010       C1010,    1010
```

```
0045  4373  C4373,  4373
0046  4020  C4020,  4020
0047  2577  C2577,  2577
0050  7746  CM32,   -32
0051  7774  CM4,    -4
0052  3770  C3770,  3770
0053  3774  C3774,  3774
0054  7713  CM65,   -65
0055  4320  C4320,  4320
                    *100     /VARIABLES
0100  7774  RESCNT, -4
0101  0000  OUTCNT, 0
0102  0000  FACTOR, 0
0103  0000  PUTZRO, 0
0104  0000  ZROCNT, 0
0105  0000  EOFTRG, 0
0106  0000  CPWCNT, 0
0107  0000  UCTRIG, 0
                    *140     /SUBROUTINES
0140  1000  XGTCNT, 1000
0141  0400  XGETCR, 400
0142  0500  XPARAM, 500
0143  0600  XDATMX, 600
0144  1600  XERR1,  1600
0145  1601  XERR2,  1601
0146  1602  XERR3,  1602
0147  1603  XERR4,  1603
                    *200     /MAINLINE
0200  7300  ST1,    CLA CLL
0201  3102          DCA FACTOR
0202  3105          DCA EOFTRG
0203  1100          TAD RESCNT
0204  3101          DCA OUTCNT
0205  5254          JMP ST3
0206  7201  ST2,    CLA IAC
0207  3003          DCA EXCOM
0210  1003          TAD EXCOM
0211  6717          6717
0212  7330          7330              /SET AC=4000
0213  3021          DCA WRDCNT
0214  4430          JMS I XDTAPE
0215  1220          1220
0216  0000          0         /INPUT DATA UM AT 0
0217  4430          JMS I XDTAPE
0220  0000          0000
0221  5312          JMP TSTEOF        /MT ERROR
0222  7300          CLA CLL
0223  4542          JMS I XPARAM      /ENTER HEADER INTO MX
0224  4543          JMS I XDATMX      /ENTER DATA INTO MX
0225  1102          TAD FACTOR        /BLOCKING PORTION
0226  1041          TAD C400
0227  3102          DCA FACTOR        /SET REC POINTER
0230  2101          ISZ OUTCNT        /BLOCK FULL?
0231  5206          JMP ST2 /NO
0232  1100          TAD RESCNT        /YES, RESET BLOCK VARS & OUTPUT
0233  3101          DCA OUTCNT
0234  3102          DCA FACTOR
0235  3105          DCA EOFTRG
0236  7333  ST4,    7333      /SET AC=6000
0237  3021          DCA WRDCNT
0240  1040          TAD C101
0241  3003          DCA EXCOM
0242  1003          TAD EXCOM
0243  6717          6717
0244  7300          CLA CLL
0245  4430          JMS I XDTAPE
0246  0040          40
0247  4000          4000      /OUTPUT MX BLOCK UM AT 4000
0250  4430          JMS I XDTAPE
0251  0000          0000
```

```
0252  5544            JMP I XERR1      /MT ERROR
0253  7300            CLA CLL
0254  7330   ST3,     7330    /SET AC=4000
0255  3103            DCA PUTZRO       /CLEAR MX CORE AREA
0256  7333            7333    /SET AC=6000
0257  3104            DCA ZROCNT
0260  6211   NEXT1,   CDF1
0261  3503            DCA I PUTZRO
0262  6201            CDF0
0263  2103            ISZ PUTZRO       /AT LIM?
0264  5260            JMP NEXT1
0265  2105            ISZ EOFTRG       /YES, AT EOF?
0266  5206            JMP ST2 /NO
0267  4430   ST5,     JMS I XDTAPE
0270  0050            50
0271  4430            JMS I XDTAPE
0272  0000            0000
0273  5544            JMP I XERR1      /MT ERROR
0274  7300            CLA CLL
0275  1043            TAD C10
0276  6716            6716
0277  6721            6721
0300  5277            JMP .-1
0301  6722            6722
0302  7300            CLA CLL
0303  1044            TAD C1010
0304  6716            6716
0305  6721            6721
0306  5305            JMP .-1
0307  6722            6722
0310  7300            CLA CLL
0311  5547            JMP I XERR4
0312  7421   TSTEOF,  MQL      /SAVE STATUS
0313  7501            MQA
0314  0042            AND C100
0315  7650            SNA CLA /EOF?
0316  5544            JMP I XERR1      /NO
0317  7402            HLT      /YES
0320  7300            CLA CLL          /PROGRAM CONTINUATION = 5230
0321  7000            NOP      /RESTART PGM
0322  7307            7307     /SET AC=4
0323  1101            TAD OUTCNT
0324  7650            SNA CLA /MX LEFT IN BLOCK?
0325  5267            JMP ST5 /NO
0326  7240            CLA CMA /YES
0327  3105            DCA EOFTRG
0330  5236            JMP ST4
                      *400
             /XGETCR:         GETS NEXT CHAR FROM DRC REC UM & FILTERS
             /        IT IN RETURN
             /        LCA RETURN       W/CHR IN AC
             /        UCA    "
             /        NUM    "
             /        SEP    "
             /        EOR    "         W/O IN AC
0400  0000   SGETCR,  0
0401  6211            CDF1     /CHANGE DATA FIELD
0402  1267            TAD DTMP         /GET NEXT DATA POS
0403  7041            CIA
0404  1666            TAD I DTMP-1     /GET POS OF LAST DATA
0405  7650            SNA CLA /EOR?
0406  5253            JMP DEOR         /YES
0407  1267            TAD DTMP         /NO
0410  7500            SMA      /DATA IN 1ST HLF?
0411  5221            JMP DSCHLF       /NO
0412  0276            AND DADD1+2      /YES, STRIP NEG TRIG
0413  3267            DCA DTMP
0414  1667            TAD I DTMP       /GET CHR
0415  7002            BSW      /PUT IN BITS 6-11
0416  0271            AND DTMP+2       /WIPE OFF OTHER CHR
```

```
0417  3272            DCA DCHR
0420  5233            JMP DCHRDO      /PROCESS CHR
0421  3267  DSCHLF,   DCA DTMP
0422  1667            TAD I DTMP      /GET CHR
0423  0271            AND DTMP+2      /STRIP OFF OTHER CHAR
0424  3272            DCA DCHR
0425  1270            TAD DTMP+1
0426  7421            MQL     /SET UP NEG TRIG
0427  2267            ISZ DTMP        /MOVE DATA POINTER
0430  1267            TAD DTMP
0431  7501            MQA     /ADD NEG TRIG
0432  3267            DCA DTMP        /TO SET FOR NEXT LOC
0433  6201  DCHRDO,   CDF0
0434  1272            TAD DCHR        /PROCESS CHR
0435  7450            SNA     /0?
0436  5255            JMP DERROR      /YES ERROR
0437  1273            TAD DADD1-1     /NO
0440  7450            SNA     /=77?
0441  5256            JMP DSEP-2      /YES, SEP = 77
0442  7500            SMA     />77?
0443  5255            JMP DERROR      /YES, ERROR
0444  1274            TAD DADD1       /NO
0445  7500            SMA     />OR= 65?
0446  5261            JMP DNUM        /YES
0447  1275            TAD DADD1+1     /NO
0450  7500            SMA     />OR= 33?
0451  5262            JMP DUCA        /YES, UCA=33-->64
0452  5263            JMP DLCA        /NO,    LCA=01-->32
0453  6201  DEOR,     CDF0
0454  2200            ISZ SGETCR
0455  2200  DERROR,   ISZ SGETCR
0456  7300            CLA CLL
0457  3272            DCA DCHR
0460  2200  DSEP,     ISZ SGETCR
0461  2200  DNUM,     ISZ SGETCR
0462  2200  DUCA,     ISZ SGETCR
0463  7300  DLCA,     CLA CLL
0464  1272            TAD DCHR
0465  5600            JMP I SGETCR    /EXIT W/PROPER CHR IN AC
0466  0005            5
0467  4020  DTMP,     4020    /RESET AT BEG OF REC
0470  4000            4000
0471  0077            77
0472  0000  DCHR,     0
0473  7701            -77
0474  0012  DADD1,    12
0475  0032            32
0476  3777            3777
                      *500
0500  0000  SPARAM,   0
0501  1046            TAD C4020
0502  3267            DCA DTMP
0503  1045            TAD C4373
0504  1102            TAD FACTOR
0505  3010            DCA FRPOS
0506  6211            CDF1
0507  1721            TAD I L2
0510  3410            DCA I FRPOS
0511  1722            TAD I L3
0512  3410            DCA I FRPOS
0513  1723            TAD I L0
0514  3410            DCA I FRPOS
0515  1724            TAD I L1
0516  3410            DCA I FRPOS
0517  6201            CDF0
```

```
0521  0002  L2,      2
0522  0003  L3,      3
0523  0000  L0,      0
0524  0001  L1,      1
                /XDATMX ENTERS DRC INPUT DATA INTO MX SECTORS
                /EXPLANATION OF *:
                /        1:        4 NOP'S = NORMAL UPPER AND LOWER CASE DISTRIBUTI
                /        2:        TAD UP; TAD LO; SNA CLA; JMP BOTH = NORMAL
                /                  DISTRIBUTION FOR ALL UPPER OR ALL LOWER CASE
                /                  WORDS BUT MIXED CASE DISTRIBUTED IN BOTH SECTORS
                /        3:        TAD UP; NOP; SNA CLA; JMP BOTH = NORMAL LOWER CA
                /                  DISTRIBUTION BUT ALL UPPER AND MIXED CASED WORDS
                /                  IN BOTH SECTORS
                         *600
0600  0000  SDATMX,  0
0601  7201           CLA IAC
0602  3366           DCA UP
0603  7201           CLA IAC
0604  3367           DCA LO
0605  3106           DCA CPWCNT
0606  3107           DCA UCTRIG
0607  1047           TAD C2577
0610  3011           DCA DATA1        /SET UP WORD BUFFER
0611  1047           TAD C2577
0612  3012           DCA DATA2
0613  4541  NXCR,    JMS I XGETCR     /GET NEXT INPUT CHR
0614  5237           JMP DDLCA        /LCA
0615  5225           JMP DDUCA        /UCA
0616  5247           JMP DDNUM        /#
0617  5223           JMP DDSEP        /SPACE
0620  5546           JMP I XERR3      /ERROR
0621  4257           JMS DOWRD        /END OF RECORD
0622  5600           JMP I SDATMX
0623  4257  DDSEP,   JMS DOWRD        /PROCESS WORD INTO MX
0624  5201           JMP SDATMX+1
0625  3256  DDUCA,   DCA DDHOLD       /WAIT
0626  3366           DCA UP
0627  1051           TAD CM4
0630  3107           DCA UCTRIG       /SET UC TRIGGER
0631  1256           TAD DDHOLD       /RETURN
0632  1050           TAD CM32
0633  7106           CLL RTL
0634  7004           RAL
0635  1052           TAD C3770
0636  5252           JMP CREXIT
0637  7106  DDLCA,   CLL RTL
0640  7004           RAL
0641  1053           TAD C3774
0642  1107           TAD UCTRIG
0643  3373           DCA TMP
0644  3367           DCA LO
0645  1373           TAD TMP
0646  5252           JMP CREXIT
0647  1054  DDNUM,   TAD CM65
0650  7106           CLL RTL
0651  1055           TAD C4320
0652  1102  CREXIT,  TAD FACTOR
0653  3411           DCA I DATA1      /PUT REL CHR/MX POS IN BUF
0654  2106           ISZ CPWCNT       /COUNT CHRS IN WORD
0655  5213           JMP NXCR
0656  0000  DDHOLD,  0
0657  0000  DOWRD,   0
0660  1106           TAD CPWCNT
0661  7650           SNA CLA /ANY CHRS INWORD?
0662  5657           JMP I DOWRD      /NO
0663  4540           JMS I XGTCNT     /ANALYZE CPWCNT
0664  7420           SNL      /RETURN:        L=1(X>OR=8)      L=0(X<8)
0665  5277           JMP LESS7        /<8
0666  3314           DCA WORD         /AC HOLDS # OF WDS OFFSET
```

```
0667  7501            MQA      /MQ HOLDS APPROPRIATE BIT MASK
0670  3316            DCA BITMSK
0671  4317            JMS DOCHR        /PROCESS 1ST CHR OF LARGE WORD
0672  1311            TAD B8   /RESET BIT MASK
0673  7421            MQL
0674  1313            TAD C7
0675  3106            DCA CPWCNT
0676  1312            TAD W8
0677  3314  LESS7,    DCA WORD
0700  7501            MQA
0701  3316            DCA BITMSK
0702  1106            TAD CPWCNT
0703  7041            CIA
0704  3106            DCA CPWCNT
0705  4317  NEXT,     JMS DOCHR        /PROCESS NEXT SEQ CHR
0706  2106            ISZ CPWCNT       /ALL CHRS DONE?
0707  5305            JMP NEXT         /NO
0710  5657            JMP I DOWRD      /YES, EXIT
0711  0200  B8,       200
0712  0002  W8,       2
0713  0007  C7,       7
0714  0000  WORD,     0
0715  0000  CHKPOS,   0
0716  0000  BITMSK,   0
0717  0000  DOCHR,    0
0720  1412            TAD I DATA2      /GET REL CHR/MX POS
0721  1314            TAD WORD         /ADD POSITIONAL FACTOR TO LOC
0722  3315            DCA CHKPOS
0723  1316            TAD BITMSK
0724  7421            MQL      /LOAD BIT POS INTO MQ
0725  6211            CDF1
0726  1715            TAD I CHKPOS
0727  7501            MQA      /OR BIT INTO MX
0730  3715            DCA I CHKPOS
0731  1366            TAD UP           /*
0732  1367            TAD LO           /*
0733  7650            SNA CLA          /*
0734  5346            JMP BOTH         /*
0735  6201  BYLOW,    CDF0
0736  7501            MQA      /GET BIT
0737  7110            CLL RAR /RESET FOR NEXT CHR
0740  7420            SNL      /OVERFLOW?
0741  5344            JMP .+3 /NO, OK
0742  2314            ISZ WORD         /YES, INDICATE TO GET NEXT WORD
0743  7010            RAR      /PUT 4000 AS NEW BIT MSK
0744  3316            DCA BITMSK
0745  5717            JMP I DOCHR
0746  1315  BOTH,     TAD CHKPOS
0747  0372            AND CCX377
0750  1371            TAD CCM320
0751  7700            SMA CLA          /X>OR=320?
0752  5335            JMP BYLOW        /YES - # - EXIT
0753  1315            TAD CHKPOS
0754  0370            AND CCX4
0755  7640            SZA CLA          /LOWER CASE ALREADY SET?
0756  5335            JMP BYLOW        /YES - EXIT (ALREADY IN LC MX
0757  1315            TAD CHKPOS
0760  1370            TAD CCX4
0761  3315            DCA CHKPOS
0762  1715            TAD I CHKPOS
0763  7501            MQA              /OR UC BIT ALSO INTO LC PORTION OF MX
0764  3715            DCA I CHKPOS
0765  5335            JMP BYLOW
0766  0000  UP,       0
0767  0000  LO,       0
0770  0004  CCX4,     4
0771  7460  CCM320,   -320
0772  0377  CCX377,   377
0773  0000  TMP,      0
```

```
                *1000
        /XGTCNT:        INTERROGATES "CPWCNT"
        /       IF>20-->CHANGES IT TO 20
        /       IF>OR=8-->PUTS 1 IN LINK
        /       GETS WORD OFFSET & BIT MASK OF 1ST CHR/WRD
        /       WORD OFFSET IN AC
        /       BIT MASK IN MQ
1000 0000 SGTCNT, 0
1001 1106       TAD CPWCNT
1002 7041       CIA
1003 1234       TAD CC7
1004 7710       SPA CLA /X<OR=7?
1005 5223       JMP CKMORE      /NO
1006 3236 XXX,  DCA TRIGX       /YES
1007 1106       TAD CPWCNT
1010 1237       TAD FACTR1
1011 3241       DCA HOLD
1012 1641       TAD I HOLD
1013 7421       MQL     /PUT BIT MSK IN MQ
1014 1106       TAD CPWCNT
1015 1240       TAD FACTR2
1016 3241       DCA HOLD        /SAVE WORD AKKITION
1017 1236       TAD TRIGX
1020 7110       CLL RAR /SET LNK IF X>OR=8
1021 1641       TAD I HOLD
1022 5600       JMP I SGTCNT
1023 1106 CKMORE, TAD CPWCNT
1024 7041       CIA
1025 1235       TAD C24
1026 7700       SMA CLA /X<OR=20?
1027 5232       JMP .+3
1030 1235       TAD C24
1031 3106       DCA CPWCNT
1032 7201       CLA IAC
1033 5206       JMP XXX
1034 0007 CC7,  7
1035 0024 C24,  24
1036 0000 TRIGX, 0
1037 1042 FACTR1, LIST1
1040 1067 FACTR2, LIST2
1041 0000 HOLD, 0
1042 0000 LIST1, 0
1043 4000 4000
1044 2000 2000
1045 0400 400
1046 0040 40
1047 0002 2
1050 0400 400
1051 0004 4
1052 0001 1
1053 4000 4000
1054 2000 2000
1055 1000 1000
1056 0400 400
1057 0200 200
1060 0100 100
1061 0040 40
1062 0020 20
1063 0010 10
1064 0004 4
1065 0002 2
1066 0001 1
1067 0000 LIST2, 0
1070 0000 0
1071 0000 0
1072 0000 0
1073 0000 0
1074 0000 0
1075 0001 1
```

```
1076  0001   1
1077  0002   2
1100  0003   3
1101  0003   3
1102  0003   3
1103  0003   3
1104  0003   3
1105  0003   3
1106  0003   3
1107  0003   3
1110  0003   3
1111  0003   3
1112  0003   3
1113  0003   3
1114  0003   3
                    *1200
             /MAGTAPE ROUTINE ADAPTED FROM MT DRIVER
             /PERMITS ON THE FLY OPERATION
             /CALL FROM SAME MEMORY
1200  0000   DRTAPE, 0
1201  7200          CLA
1202  1024          TAD     DRT910+4        /PICK UP PREVIOUS COMMAND
1203  0325          AND     DRT900+2        /WAS INTERRUPT BIT ON
1204  7440          SZA
1205  5213          JMP     DRT10
1206  6701   DRT5,  6701    /MTAF..WAIT TILL FLAG UP
1207  5206          JMP     .-1
1210  6706          6706
1211  3022          DCA     DRT910+2        /SAVE STATUS
1212  5217          JMP     DRT20
1213  7200   DRT10, CLA
1214  1026          TAD     DRT910+6        /WAIT FOR SIGNAL
1215  7440          SZA     /THAT INTERRUPT OBTAINED
1216  5213          JMP     DRT10
1217  1600   DRT20, TAD     I DRTAPE
1220  7440          SZA     /TO YIELD STATUS
1221  5230          JMP     DRT200
1222  4420          JMS     I DRT910        /GO TO DRT700 ROUTINE
1223  5226          JMP     DRT30+1 /GO TO ERROR EXIT
1224  5206          JMP     DRT5    /RETRY EXIT
1225  2200   DRT30, ISZ     DRTAPE  /OK EXIT
1226  2200          ISZ     DRTAPE
1227  5600          JMP     I DRTAPE
1230  7041   DRT200, CIA
1231  1024          TAD DRT910+4
1232  7650          SNA CLA /NEXT INSTRUCTION SAME AS LAST?
1233  5236          JMP .+3
1234  6711          6711    /NO, WAIT TILL CNTRLLR STOPPED
1235  5234          JMP .-1
1236  1600          TAD I DRTAPE
1237  3024          DCA     DRT910+4        /SAVE COMMAND PARAMETER
1240  3023          DCA     DRT910+3        /PRESET FOR NO RETRIES
1241  1024          TAD     DRT910+4
1242  6716          6716    /LOAD COMMAND REGISTER
1243  0324          AND     DRT900+1        /ISOLATE COMMAND
1244  7112          RTR CLL
1245  7010          RAR
1246  7450          SNA
1247  5226          JMP     DRT30+1 /NO-OP
1250  1254          TAD     DRT210
1251  3253          DCA     .+2
1252  7200          CLA
1253  0000          0
1254  5254   DRT210, JMP    .
1255  5317          JMP     DRT399
1256  5274          JMP     DRT280  /READ
1257  5267          JMP     DRT250  /LOAD WORD COUNT
1260  5276          JMP     DRT290  /WRITE
1261  5317          JMP     DRT399  /END OF FILR
1262  7000          NOP     /FORWARD SPACE
```

```
1263  2200           ISZ     DRTAPE
1264  1600           TAD     I DRTAPE        /HERE ON BACKSPACE
1265  7041           CIA
1266  5316           JMP     DRT310
1267  2200  DRT250,  ISZ     DRTAPE
1270  1600           TAD     I DRTAPE        /PICK UP WORD COUNT
1271  7041           CIA
1272  3021           DCA     DRT910+1
1273  5226           JMP     DRT30+1
1274  1326  DRT280,  TAD     DRT900+3        /SET RETRY COUNTER TO 9
1275  5306           JMP     DRT295
1276  1024  DRT290,  TAD     DRT910+4        /PICK UP REQUEST PARAMETER
1277  0323           AND     DRT900
1300  7640           SZA CLA
1301  5305           JMP     DRT295-1
1302  1024           TAD     DRT910+4        /PUT IN EXTENDED GAP
1303  1323           TAD     DRT900  /IN CASE OF RETRIES
1304  3024           DCA     DRT910+4
1305  1327           TAD     DRT900+4        /SET RETRY COUNTER TO 2
1306  3023  DRT295,  DCA     DRT910+3
1307  2200           ISZ     DRTAPE
1310  7240  DRT300,  CLA     CMA     /-1 IN AC
1311  1600           TAD     I DRTAPE
1312  3027           DCA     DRT910+7        /SAVE CURRENT ADDRESS
1313  1027           TAD     DRT910+7
1314  3033           DCA DISCA       /SET CA
1315  1021           TAD DRT910+1
1316  3032  DRT310,  DCA DISWC       /SET WC FOR DATA BREAK
1317  1317  DRT399,  TAD     DRT399  /PRESET INTERRUPT FLAG
1320  3026           DCA     DRT910+6
1321  6722  DRT400,  6722    /MTGO
1322  5226           JMP     DRT30+1
            /
1323  0100  DRT900,  100     /0-EXTENDED GAP MASK
1324  0070           70      /1-MASK FOR COMMAND
1325  0004           4       /2-CONSTANT 4
1326  7767           -11     /3 - READ ATTEMPTS
1327  7776           -2      /4 - WRITE ATTEMPTS
                     *1400
            /
            /        PART 2 MAG TAPE DRIVER (4.1)
            /SUBROUTINE TO CHECK MAG TAPE STATUS AND DO RETRIES
            /
1400  0000  DRT700,  0       /CHECK STATUS
1401  1025           TAD     DRT910+5        /JUST FINISH BACKSPACE FOR
1402  7440           SZA     /RETRY AT READ/WRITE?
1403  5256           JMP     DRT750  /YES
1404  1022           TAD     DRT910+2        /GET STATUS
1405  0303           AND     DRT799-1
1406  7440           SZA     /ILLEGAL COMMAND ERROR
1407  5274           JMP     DRT790+1        /EXIT DENOTING ERROR
1410  1022           TAD     DRT910+2
1411  7500           SMA
1412  5241           JMP     DRT740  /NO ERROR FLAG
1413  0305           AND     DRT799+1
1414  7450           SNA
1415  5274           JMP     DRT790+1        /NOT PARITY OR TIMING
1416  7200           CLA
1417  1022           TAD     DRT910+2        /ALWAYS GET PARITY
1420  0300           AND     DRT799-4        /ON EOF IF 7 TRK - ODD
1421  7450           SNA
1422  5225           JMP     .+3
1423  3022           DCA     DRT910+2        /SAVE AS EOF ONLY
1424  5274           JMP DRT790+1    /TAKE ERROR EXIT
1425  1023           TAD     DRT910+3
1426  7500           SMA
1427  5274           JMP     DRT790+1        /EXIT WITH STATUS
1430  2023           ISZ     DRT910+3
1431  7000           NOP
```

```
1432  3025            DCA     DRT910+5        /SET FOR SPECIAL BACKSPACE
1433  7240            CLA     CMA     /MINUS 1
1434  3032            DCA DISWC       /TO WC
1435  1024            TAD     DRT910+4        /PREVIOUS COMMAND
1436  0304            AND     DRT799  /ISOLATE UNIT-INTERRUPT
1437  1302            TAD     DRT799-2        /NOW HAVE BACKSPACE
1440  5265            JMP DRT788-2
1441  0300  DRT740,   AND     DRT799-4        /END OF FILE OR BOT
1442  7450            SNA
1443  5272            JMP     DRT790-1        /NO ERRORS
1444  7300            CLA     CLL
1445  1024            TAD     DRT910+4        /END OF FILE BIT IS
1446  0302            AND     DRT799-2        /EXPECTED IF END OF FILE REQUEST
1447  1301            TAD     DRT799-3
1450  7450            SNA
1451  5272            JMP     DRT790-1
1452  1277            TAD     DRT799-5        /BOT EXPECTED IF
1453  7450            SNA     /REWIND
1454  5272            JMP     DRT790-1
1455  5274            JMP     DRT790+1        /ERROR EXIT
1456  7200  DRT750,   CLA
1457  1021            TAD DRT910+1    /PICK UP WORD COUNT
1460  3032            DCA DISWC
1461  3025            DCA DRT910+5    /SIGNAL NOT SPECIAL BACKSPACE
1462  1027            TAD     DRT910+7        /RESET BUFFER ADDRESS
1463  3033            DCA DISCA       /INTO CA
1464  5340            JMP 1540
1465  6711            6711    /CNTRLLR READY?
1466  5265            JMP .-1
1467  6716  DRT788,   6716    /LOAD COMMAND REGISTER
1470  6722            6722    /MTGO
1471  5273            JMP     DRT790
1472  2200            ISZ     DRT700
1473  2200  DRT790,   ISZ     DRT700
1474  7200            CLA
1475  1022            TAD     DRT910+2        /PICK UP STATUS
1476  5600            JMP     I DRT700
1477  0040            40
1500  1100            1100    /END OF FILE - BOT MASK
1501  7730            -50
1502  0070            70
1503  0400            400     /MASK FOR ILLEGAL COMMAND
1504  7004  DRT799,   7004    /UNIT --INTERRUPT FLAG
1505  0224            224     /TO MSK OUT PRTY,TIMG,ODD/CHR-LGT
            /THE FOLLOWING ROUTINE HANDLES MAGTAPE INTERRUPTS
1506  0000  DRT800,   0
1507  7200            CLA
1510  1024            TAD     DRT910+4
1511  0330            AND     DRT899
1512  7640            SZA CLA
1513  6701            6701    /TAPE INTERRUPT?
1514  5326            JMP DRT890+3    /NO
1515  6706            6706    /PICK UP STATUS
1516  3022            DCA     DRT910+2
1517  6712            6712    /CLEAR FLAGS
1520  4200            JMS     DRT700
1521  5324            JMP DRT890+1    /PUT ERROR STATUS IN ERRTRG; SIGNAL DONE
1522  5326            JMP DRT890+3    /DON'T SIGNAL DONE; DO RETRY
1523  7200  DRT890,   CLA     /SIGNAL INTERRUPT
1524  3031            DCA ERRTRG
1525  3026            DCA     DRT910+6        /OBTAINED
1526  7300            CLA CLL
1527  5706            JMP     I DRT800
1530  0004  DRT899,   4
                      *1540
1540  1003            TAD EXCOM
1541  6717            6717
1542  7300            CLA CLL
1543  1024            TAD DRT910+4
1544  5265            JMP 1465
```

```
                         *1600
1600   7402   SERR1,   HLT
1601   7402   SERR2,   HLT
1602   7402   SERR3,   HLT
1603   7402   SERR4,   HLT

BITMSK 0716
BOTH   0746
BUSYFG 0026
BYLOW  0735
B8     0711
CCM320 0771
CCX377 0772
CCX4   0770
CC7    1034
CHKPOS 0715
CKMORE 1023
CM32   0050
CM4    0051
CM65   0054
CPWCNT 0106
CREXIT 0652
C10    0043
C100   0042
C101   0040
C1010  0044
C24    1035
C2577  0047
C3770  0052
C3774  0053
C400   0041
C4020  0046
C4320  0055
C4373  0045
C7     0713
DADD1  0474
DATA1  0011
DATA2  0012
DCHR   0472
DCHRDO 0433
DDHOLD 0656
DDLCA  0637
DDNUM  0647
DDSEP  0623
DDUCA  0625
DEOR   0453
DERROR 0455
DISCA  0033
DISWC  0032
DLCA   0463
DNUM   0461
DOCHR  0717
DOWRD  0657
DRTAPE 1200
DR110  1213
DR120  1217
DR1200 1230
DR1210 1254
DR1250 1267
DR1280 1274
DR1290 1276
DR1295 1306
DR130  1225
DR1300 1310
DR1310 1316
DR1399 1317
DR1400 1321
DR15   1206
DR1700 1400
DR1740 1441
```

```
R1750  1456
R1783  1467
R1790  1473
R1799  1504
R1800  1506
R1690  1523
R1699  1530
R1900  1323
R1910  0020
SCHLF  0421
SEP    0460
TMP    0467
JCA    0462
OFTRG  0105
RRTRG  0031
(COM   0003
ACTOR  0102
ACTR1  1037
ACTR2  1040
RPOS   0010
OLD    1041
:SS7   0677
[ST1   1042
ST2    1067
)      0767
)      0523
|      0524
2      0521
3      0522
:XT    0705
:XT1   0260
(CR    0613
ICNT   0101
IZRO   0103
:SCNT  0100
DATMX  0600
:RR1   1600
:RR2   1601
:RR3   1602
:RR4   1603
GETCR  0400
ICNT   1000
PARAM  0500
1      0200
2      0206
3      0234
4      0236
5      [illegible]
P      0773
IGX    1036
IEOF   0312
TRIG   0107
       0766
RL     0714
LCNT   0021
       0712
ATMX   0143
TAPE   0030
1600   0034
RR1    0144
RR2    0145
RR3    0146
RR4    0147
ETCR   0141
ICNT   0140
ARAM   0142
X      1006
OCNT   0104
```

PROGRAM 4A - DRC-MX OVERLAY

```
                BSW=7002
                FIXTAB
                        *517
0517  4725              JMS I XCATEG

                        *525
0525  1610    XCATEG,   1610

                        *150
0150  6000    C6000,    6000
0151  0370    C370,     370
0152  0004    C4,       4
0153  0002    C2,       2
0154  0200    C200,     200
0155  0001    C1,       1
0156  0020    C20,      20
0157  0100    C100,     100
0160  5252    C5252,    5252
                        *1610
1610  0000    CATEG,    0
1611  1010              TAD FRPOS
1612  1354              TAD CM10
1613  3010              DCA FRPOS
1614  1756              TAD I L12
1615  0360              AND C10
1616  7106              CLL RTL
1617  7002              BSW
1620  3353              DCA STORE          /OBIT - BIT 4000
1621  1757              TAD I L13
1622  0361              AND C4000
1623  7112              CLL RTR
1624  1353              TAD STORE
1625  3353              DCA STORE          /CRIME - BIT 1000
1626  1757              TAD I L13
1627  0362              AND C2000
1630  7112              CLL RTR
1631  7010              RAR
1632  1353              TAD STORE
1633  3353              DCA STORE          /NAMES - BIT 200
1634  1755              TAD I L11
1635  0363              AND C7400
1636  7640              SZA CLA            /COURIER EDITION#/
1637  5244              JMP SETED          /YES
1640  1756              TAD I L12          /NO
1641  0364              AND C1400
1642  7650              SNA CLA            /COURIER?
1643  5247              JMP TIMES          /NO
1644  1365    SETED,    TAD C40            /YES
1645  1353              TAD STORE
1646  3353              DCA STORE          /COURIER - BIT 40
1647  1755    TIMES,    TAD I L11
1650  0366              AND C7
1651  7640              SZA CLA            /TIMES EDITION?
1652  5257              JMP SETTIM         /YES
1653  1756              TAD I L12          /NO
1654  0150              AND C6000
1655  7650              SNA CLA
1656  5262              JMP SUN            /NO
1657  1360    SETTIM,   TAD C10            /YES
1660  1353              TAD STORE
1661  3353              DCA STORE          /TIMES - BIT 10
1662  1755    SUN,      TAD I L11
1663  0151              AND C370
1664  7650              SNA CLA            /SUNDAY EDITION?
1665  5271              JMP NOTWO          /NO
1666  7305              7305               /YES
1667  1353              TAD STORE
```

```
1670  3353             DCA STORE         /SUNDAY - BIT 2
1671  4343  NOTWD,     JMS NOT           /NOT WD 1 AND PUT IN BUFFER
1672  1756             TAD I L12
1673  0152             AND C4
1674  7112             CLL RTR
1675  7012             RTR
1676  3353             DCA STORE         /EDIT - BIT 4000
1677  1756             TAD I L12
1700  0153             AND C2
1701  7002             BSW
1702  7106             CLL RTL
1703  1353             TAD STORE
1704  3353             DCA     STORE     /LETT - BIT 1000
1705  1756             TAD I L12
1706  0154             AND C200
1707  1353             TAD STORE
1710  3353             DCA STORE         /PIXP - BIT 200
1711  1756             TAD I L12
1712  0155             AND C1
1713  7002             BSW
1714  7110             CLL RAR
1715  1353             TAD STORE
1716  3353             DCA STORE         /CART - IT 40
1717  1756             TAD I L12
1720  0156             AND C20
1721  7110             CLL RAR
1722  1353             TAD STORE
1723  3353             DCA STORE         /TABLE - BIT 10
1724  1756             TAD I L12
1725  0365             AND C40
1726  7112             CLL RTR
1727  7012             RTR
1730  1353             TAD STORE.
1731  3353             DCA STORE         /GRAPH - BIT 2
1732  4343             JMS NOT           /NOT WD 2 AND PUT IN BUFFER
1733  1756             TAD I L12
1734  0157             AND C100
1735  7106             CLL RTL
1736  7006             RTL
1737  7004             RAL
1740  3353             DCA STORE         /MAP - BIT 4000
1741  4343             JMS NOT
1742  5610             JMP I CATEG
1743  0000  NOT,       0
1744  1353             TAD STORE
1745  7040             CMA
1746  0160             AND C5252
1747  7110             CLL RAR
1750  1353             TAD STORE
1751  3410             DCA I FRPOS       /NOT EVERYOTHER BIT
1752  5743             JMP I NOT
1753  0000  STORE,     0
1754  7770  CM10,      -10
1755  0011  L11,       11
1756  0012  L12,       12
1757  0013  L13,       13
1760  0010  C10,       10
1761  4000  C4000,     4000
1762  2000  C2000,     2000
1763  7400  C7400,     7400
1764  1400  C1400,     1400
1765  0040  C40,       40
1766  0007  C7,        7
            FRPOS=10

CATEG  1610
CM10   1754
C10    1760
C100   0157
C1400  1764
```

```
C2      0153
C20     0156
C200    0154
C2000   1762
C370    0151
C4      0152
C40     1765
C4000   1761
C5002   0160
C7      1760
C7400   1763
FRPOS   0010
L11     1755
L12     1756
L13     1757
NOT     1743
NOTWD   1671
SETED   1644
SETTIM  1657
STORE   1753
SUN     1662
TIMES   1647
XCATEG  0525
```

PROGRAM 5 - MX-XM

```
                CSR=6512
                MAR=6514
                WCR=6516
                CBRL=6500
                CBRH=6501
                MCR=6517
                ESR0=6511
                AIRH=6505
                SSRH=6503
                        MQA=7501
                        MQL=7421
                        BSW=7002
                        CDF0=6201
                        CDF1=6211
                        FIXTAB

                        *40
0040    0000    STAD,   0               /STARTING ADDRESS ON SMALL DISK
0041    0000    RECCT,  0               /# RECORDS PER MONTH
0042    0000    INBUF,  0
0043    0000    LOTRG,  0       /1-LOWER CASE ALPHA
0044    7761    RDCT,   -17     /NO READS PER DUMP -15
0045    7464    TRCCT,  -314    /NO CHAR PER READ
0046    7720    TIMCT,  -60     /NO CHAR POS PER ALPHA
0047    0000    TYPCT,  0       /NO CHARS DONE (1-62)
0050    7772    MONCT,  -6      /NO MONTHS TO DO
0051    0000    OUTBUF, 0
0052    0000    DDAD,   0       /DISK ST ADDR
0053    0000    LST,    0
0054    0000    LST2,   0
0055    0000    DRIVE,  0
0056    0000    SEC,    0
0057    0012    C12,    12
0060    1400    C1400,  1400
0061    7772    CM6,    -6
0062    7766    CM12,   -12
0063    7761    CM17,   -17
```

```
0064   7454   CM314,  -314
0065   7720   CM60,   -60

0066   1150   XCLEAR, CLEAR
0067   0200   XMAG,   MAG
0070   0600   XDISK,  DISKS
0071   1000   XROT,   ROT
0072   0700   XFILD,  FILDSK
0073   1100   XWRTD,  WRTDSK
0074   0302   XREWD,  REWIND
0075   0735   XDO,    DO
0076   1700   XDIVID, DIVIDE
0077   0535   XINIT,  INIT
0100   0560   XRD,    RD
0101   1400   XDSK,   DSK
0102   0511   XLST,   LSTR
0103   0106   XLST2,  LSTR2
0104   1200   XPROC,  PROC
0105   1630   XSETD,  SETDSK


0106   0000   LSTR2,  0            /STORAGE OF END LOC OF MONTHS
0107   0000           0
0110   0000           0
0111   0000           0
0112   0000           0
0113   0000           0
0114   0000   FACTO,  0
                      *400         /MAINLINE
0400   7300           CLA CLL
0401   4505           JMS I XSETD  /SET CONSTANT DISK VALUES
0402   1102           TAD XLST
0403   3053           DCA LST      /STORE VARIABLES FOR EACH MONTH
0404   1061           TAD CM6
0405   3050           DCA MONCT          /PROCESS 6 MONTHS
0406   1062   SETIT,  TAD CM12
0407   3304           DCA LOOPCT         /DUMP DISK EVERY 10 LOOPS
0410   1325           TAD C11
0411   3040           DCA STAD     /START FILLING DISK AT 10TH WORD
0412   1305   NXT2,   TAD CM3
0413   3044           DCA RDCT     /READ 3 RECORDS=12 MX
0414   4466           JMS I XCLEAR /CLEAR CORE INPUT AREA
0415   1306   NXT1,   TAD C2000
0416   3221           DCA ADDR     /READ INTO 2000, MBO
0417   4467           JMS I XMAG   /READ A RECORD
0420   1020           1020
0421   0000   ADDR,   0            /CORE ADDR
0422   6000           -2000
0423   0100           100          /EXT REG - SCD MODE
0424   5274           JMP ENDO     /EOF RETURN
0425   2044           ISZ RDCT     /NORMAL RETURN, 3 RECS READ?
0426   5272           JMP SETAD    /NO
0427   4471   GOON,   JMS I XROT   /YES, CHANGE TO XM
0430   4472           JMS I XFILD  /WRITE ONTO SMALL DISK
0431   7240           CLA CMA
0432   1040           TAD STAD
0433   3040           DCA STAD     /MOVE DISK LOC BACK 1
0434   1307           TAD EOFTRG
0435   7640           SZA CLA      /DONE WITH MONTH?
0436   5241           JMP DUMP     /YES
0437   2304           ISZ LOOPCT   /NO, DONE 10 TIMES - SMALL DSK FULL?
0440   5212           JMP NXT2     /NO
0441   4473   DUMP,   JMS I XWRTD  /YES, DUMP ONTO MAGTAP
0442   1307           TAD EOFTRG
0443   7650           SNA CLA      /MONTH DONE?
0444   5206           JMP SETIT    /NO
0445   3307   FINI,   DCA EOFTRG   /YES, CLEAR TRG
0446   1041           TAD RECCT
0447   3453           DCA I LST    /SAVE # RECORDS PER MONTH
0450   3041           DCA RECCT
```

```
0451  2053           ISZ LST
0452  1304           TAD LOOPCT
0453  3453           DCA I LST
0454  2053           ISZ LST          /SAVE # WORDS NEEDED FROM LAST DUMP
0455  4467           JMS I XMAG
0456  0050           50               /WRITE END OF FILE
0457  0000           0
0460  0000           0
0461  0000           0
0462  7300           CLA CLL
0463  7300           CLA CLL
0464  2050           ISZ MONCT        /6 MONTHS DONE?
0465  5206           JMP SETIT        /NO
0466  4474           JMS I XREWD      /YES, REWIND TAPE
0467  4475           JMS I XDO        /PUT ONTO LARGE DISK
0470  4474           JMS I XREWD
0471  7402           HLT              /PROCESSING COMPLETE
0472  1221  SETAD,   TAD ADDR
0473  5215           JMP NXTI         /INC ADDR BY 2000
0474  2307  ENDO,    ISZ EOFTRG       /SET DONE TRIGGER
0475  1310           TAD C3
0476  1044           TAD RDCT
0477  7650           SNA CLA          /ANY RECORDS READ?
0500  5326           JMP CKDSK        /NO
0501  2304           ISZ LOOPCT
0502  5227           JMP GOON
0503  5227           JMP GOON         /YES
0504  0000  LOOPCT,  0
0505  7775  CM3,     -3
0506  2000  C2000,   2000
0507  0000  EOFTRG,  0
0510  0003  C3,      3
0511  0000  LSTR,    0                /# MAG RECORDS FOR MONTH 1
0512  0000           0                /# WORDS FILLED IN LAST RECORD
0513  0000           0
0514  0000           0
0515  0000           0
0516  0000           0
0517  0000           0
0520  0000           0
0521  0000           0
0522  0000           0
0523  0000           0
0524  0000           0
0525  0011  C11,     11
0526  1304  CKDSK,   TAD LOOPCT
0527  1057           TAD C12
0530  7640           SZA CLA          /ANY WORDS WRITTEN ON DISK?
0531  5241           JMP DUMP         /YES
0532  3304           DCA LOOPCT       /NO, DO FINAL DUMP
0533  5245           JMP FINI
                     *700
            /WRITES 1 OUTPUT BUFFER WORD BY WORD ONTO SMALL DISK;
            /204 CHARS PER TRACK

0700  0000  FILDSK,  0
0701  7300           CLA CLL
0702  3314           DCA BLOCK
0703  3312           DCA CORAD
0704  1040  RESET,   TAD STAD
0705  3315           DCA DSKAD        /ST AT LOC 12 OF DISK
0706  1064           TAD CM314
0707  3334           DCA CHARCT       /204 CHARS PER TRACK
0710  4470  WRT,     JMS I XDISK
0711  6605           DMAW             /COMMAND
0712  0000  CORAD,   0                /CORE ADDRESS
0713  7777           7777             /WORD COUNT=1
0714  0000  BLOCK,   0
0715  0000  DSKAD,   0
```

```
0716  2312            ISZ CORAD      /INC TO NEXT WORD IN CORE
0717  1312            TAD CORAD
0720  1333            TAD CM5672
0721  7650            SNA CLA        /DONE?
0722  5700            JMP I FILDSK   /YES
0723  2334            ISZ CHARCT     /NO, TRACK FULL?
0724  5327            JMP INCAD      /NO, INCREMENT DISK ADDR FOR NEXT WD
0725  2314            ISZ BLOCK      /YES, GO TO NEXT TRACK
0726  5304            JMP RESET
0727  1315  INCAD,    TAD DSKAD
0730  1057            TAD C12        /INC DISK AD 10 LOCATIONS
0731  3315            DCA DSKAD
0732  5310            JMP WRT
0733  2106  CM5672,   -5672
0734  0000  CHARCT,   0
                      *1000
            /CONVERTS 12 MX FRAMES INTO XM WORDS

1000  0000  ROT,      0
1001  7300            CLA CLL
1002  3051            DCA OUTBUF
1003  1251            TAD CM14
1004  3254            DCA ROTCT      /DO 12 ROTATIONS PER WORD
1005  3257            DCA STORE
1006  1251            TAD CM14
1007  3253            DCA MXCT       /DO 12 MXS
1010  1060  START,    TAD C1400
1011  3042            DCA INBUF
1012  1042  NXMX,     TAD INBUF
1013  1255            TAD FAC        /400
1014  3042            DCA INBUF      /ORIG LOC=2000
1015  1442            TAD I INBUF
1016  7104            CLL RAL        /ROT LET POS INTO LINK
1017  3442            DCA I INBUF    /SAVE REST OF WORD
1020  1257            TAD STORE
1021  7010            RAR            /ROTATE LET POS INTO WORD
1022  3257            DCA STORE      /SAVE PARTIAL WORD
1023  2253            ISZ MXCT       /12 MXS DONE?
1024  5212            JMP NXMX       /NO, DO NEXT MX
1025  1257            TAD STORE      /YES, PUT FULL WORD IN OUTBUF
1026  6211            CDF1
1027  3451            DCA I OUTBUF
1030  2051            ISZ OUTBUF
1031  6201            CDF0
1032  2254            ISZ ROTCT      /12 INPUT ROTATIONS DONE?
1033  5244            JMP XXX
1034  2042            ISZ INBUF      /YES, INC INBUF POS
1035  1042            TAD INBUF
1036  1252            TAD CM7773
1037  7650            SNA CLA        /INPUT BUFFER DONE?
1040  5600            JMP I ROT      /YES
1041  3257            DCA STORE      /NO, CLEAR STORE
1042  1251            TAD CM14
1043  3254            DCA ROTCT
1044  1251  XXX,      TAD CM14
1045  3253            DCA MXCT
1046  1042            TAD INBUF      /NO
1047  0256            AND C377       /ACTUAL NEXT POS OF MX1
1050  5210            JMP START
1051  7764  CM14,     -14
1052  0005  CM7773,   -7773
1053  0000  MXCT,     0
1054  0000  ROTCT,    0
1055  0400  FAC,      400
1056  0377  C377,     377
1057  0000  STORE,    0              /PARTIAL OUTPUT WORD
                      *1100
            /READS KISK INTO CORE TRACK BY TRACK
            /AND WRITES ONTO TAPE
```

```
1100  0000  WRTDSK, 0
1101  1063          TAD CM17
1102  3330          DCA READCT        /READ AND WRITE 15 TRACKS
1103  3310          DCA BLKK
1104  4470  REST,   JMS I XDISK
1105  0603          DMAR              /COMMAND
1106  0000          0                 /CORE ADDRESS
1107  4000          -4000             /WC
1110  0000  BLKK,   0                 /BLOCK #
1111  0000          0                 /DISK ADDR OFFSET(0 OR 4000)
1112  4467          JMS I XMAG
1113  0040          40                /WRITE SCD MODE
1114  0000          0                 /CORE ADDR
1115  4000          -4000
1116  0101          101               /EXT REG
1117  7402          HLT               /END OF FILE RETURN
1120  2041          ISZ RECCT         /NORMAL RETURN, # REC COUNT
1121  5323          JMP .+2
1122  7402          HLT               /777RECORDS?
1123  2330          ISZ READCT        /DONE 15 TRACKS?
1124  5326          JMP .+2 /NO
1125  5700          JMP I WRTDSK      /YES
1126  2310          ISZ BLKK
1127  5304          JMP REST
1130  0000  READCT, 0
                    *1150
            /CLEARS CORE INPUT AREA

1150  0000  CLEAR,  0
1151  7332          7332              /2000
1152  3042          DCA INBUF
1153  3442  AG1,    DCA I INBUF
1154  2042          ISZ INBUF         /DONE?
1155  5353          JMP AG1           /NO
1156  5750          JMP I CLEAR       /YES
1157  2000  CM6000, -6000
                    *535      /CLEAR TRGS, RESET CTRS
0535  0000  INIT,   0
0536  3043          DCA LOTRG
0537  3047          DCA TYPCT
0540  1063          TAD CM17
0541  3044          DCA RDCT          /15 READS PER DUMP
0542  1064          TAD CM314
0543  3045          DCA FRCCT         /204 CHR PER READ
0544  1065          TAD CM60
0545  3046          DCA TIMCT         /48 CHR POS PER ALPHA
0546  5735          JMP I INIT
                    *560
0560  0000  RD,     0         /READ MAG TAPE
0561  4467          JMS I XMAG
0562  0020          20        /SCD ON DRIVE 0
0563  4000          4000      /CORE ADDRESS
0564  4000          -4000     /WC
0565  0100          100       /EXT REG
0566  5760          JMP I RD          /EOF RETURN
0567  2360          ISZ RD    /NORMAL RETURN
0570  5760          JMP I RD
                    *735
0735  0000  DO,     0         /PUT MONTHS ONTO DISK
0736  1365          TAD C4714         /2508
0737  3052          DCA DDAD          /STARTING ADDR ON DISK
0740  1102          TAD XLST
0741  3053          DCA LST
0742  1103          TAD XLST2
0743  3054          DCA LST2
0744  1061          TAD CM6
0745  3050          DCA MONCT
0746  4477  DOWK,   JMS I XINIT       /INITIALIZE CTRS AND TRGS
0747  4504          JMS I XPROC       /PUT ONE MONTH ON DISK
```

```
0752   7420             SNL      /4000 OR HIGHER ADDR?
0753   5356             JMP .+3 /NO
0754   7510             SPA      /YES
0755   7402             HLT      /OVERFLOW OF BUFR
0756   7010             RAR      /NO
0757   1057             TAD C12
0760   3454             DCA I LST2          /SAVE END LOC FOR MONTH
0761   2054             ISZ LST2
0762   2050             ISZ MONCT           /DONE 6 MONTHS?
0763   5346             JMP DOWK            /NO
0764   5735             JMP I DO            /YES
0765   4714    C4714,   4714
               /PROCESS ONE MONTH ONTO LARGE DISK
                        *1200
1200   0000    PROC,    0
1201   1327             TAD C2074
1202   3233             DCA DDBLK           /ST DISK BLK 1084
1203   4500    READIT,  JMS I XRD
1204   5330             JMP PRCC            /EOF END OF MONTH
1205   2041             ISZ RECCT
1206   1453             TAD I LST
1207   1333             TAD CM16
1210   7041             CIA
1211   1041             TAD RECCT
1212   7640             SZA CLA             /ON LAST DUMPS OF MONTH?
1213   5224             JMP ADG             /NO
1214   2053             ISZ LST             /YES
1215   1453             TAD I LST
1216   2053             ISZ LST
1217   7041             CIA
1220   3114             DCA FACTO           /ADJUST AS TO NO WORDS NEC
1221   1052             TAD DDAD
1222   1114             TAD FACTO
1223   3052             DCA DDAD            /ADJUST AS TO NUMBER WDS NEEDED
1224   7330    ADG,     7330    /4000
1225   3042             DCA INBUF           /ST OF DATA BUFR
1226   2044             ISZ RDCT            /NORMAL RET: 15TH READ?
1227   5232             JMP .+3 /NO
1230   1321             TAD CM222           /YES, DO 146 GRPS FROM LAST TRACK
1231   3045             DCA TRCCT
1232   4501    WRTIT,   JMS I XDSK          /WRITE 10 WORDS
1233   0000    DDBLK,   0
1234   2046             ISZ TIMCT           /DONE 48 TIMES?
1235   5271             JMP FF   /NO
1236   1065             TAD CM60
1237   3046             DCA TIMCT           /YES, RESET COUNT
1240   2047             ISZ TYPCT           /COUNT CHAR
1241   1047             TAD TYPCT
1242   1322             TAD CM64
1243   7700             SMA CLA             /ON ALPHAS?
1244   5260             JMP NUM /NO
1245   1043             TAD LOTRG           /YES
1246   7640             SZA CLA /LOWER CASE NEXT?
1247   5255             JMP UP   /NO
1250   2043             ISZ LOTRG           /YES
1251   1323             TAD C2260
1252   1233             TAD DDBLK           /ADD 1200
1253   3233             DCA DDBLK           /RESET ADDR
1254   5271             JMP FF
1255   3043    UP,      DCA LOTRG
1256   1324             TAD CM2340          /-1243
1257   5252             JMP UP-3
1260   1047    NUM,     TAD TYPCT
1261   1322             TAD CM64
1262   7450             SNA      /1ST NUMBER?
1263   5271             JMP FF              /YES
1264   1062             TAD CM12
1265   7710             SPA CLA             /00N CATEGORIES?
1266   5271             JMP FF              /NO
```

```
1267  1326            TAD C2041         /YES, 1057 (ST-1)
1270  5253            JMP UP-2
1271  2233  FF,       ISZ DDBLK         /INC BLOCK NO.
1272  5274            JMP .+2
1273  7402            HLT      /ERROR, BLOCK OVERFLOW
1274  2045  GG,       ISZ TRCCT         /DONE W RECORD?
1275  5232            JMP WRTIT         /NO
1276  1044            TAD RDCT          /YES
1277  7650            SNA CLA /DONE W. DUMP?
1300  5304            JMP RST           /YES
1301  1064            TAD CM314         /NO
1302  3045            DCA TRCCT         /RESET CTR
1303  5203            JMP READIT
1304  4477  RST,      JMS I XINIT       /RESET ALL CTRS, ETC.
1305  1052            TAD DDAD
1306  1062            TAD CM12
1307  3052            DCA DDAD          /SET ADDR BACK 10 LOC
1310  1052            TAD DDAD
1311  7104            CLL RAL
1312  7430            SZL      /OVERFLOW?
1313  5316            JMP .+3 /YES
1314  7200            CLA      /NO
1315  5203            JMP READIT
1316  7700            SMA CLA /OVERFLOW?
1317  5314            JMP .-3 /NO
1320  7402            HLT      /YES
1321  7556  CM222,    -222
1322  7714  CM64,     -64
1323  2260  C2260,    2260
1324  5440  CM2340,   -2340
1325  6774  C6774,    6774
1326  2041  C2041,    2041
1327  2074  C2074,    2074
1330  3041  PRCC,     DCA RECCT
1331  3114            DCA FACTO
1332  5600            JMP I   PROC
1333  7762  CM16,     -16
                      *1400
1400  0000  DSK,      0
1401  7300            CLA CLL
1402  1600            TAD I DSK
1403  2200            ISZ DSK
1404  3206            DCA DIVR
1405  4476            JMS I XDIVID
1406  0000  DIVR,     0        /BLOCK NO
1407  0024            24       /DIVISOR - 20
1410  0000  HD,       0        /REMAINDER
1411  3342            DCA CYL /CYL IN AC
1412  7326            CLA STL RTL     /2
1413  6517            MCR
1414  7300            CLA CLL /LOAD MODE
1415  1340            TAD C1000
1416  [illegible]     [illegible]  /SELECT CYLINDER
1417  7300            CLA CLL
1420  1342            TAD CYL
1421  7106            CLL RTL
1422  [illegible]     RTL
1423  6500            CBRL     /CYL NO IN BITS 0-7
1424  7300            CLA CLL
1425  1060            TAD C1400
1426  6501            CBRH     /SP FN
1427  7300            CLA CLL
1430  1060            TAD C1400
1431  6500            CBRL     /SEEK AND RESET HEAD
1432  7300            CLA CLL
1433  1210            TAD HD  /SET UP HEADER IMAGE
1434  7002            BSW
1435  7110            CLL RAR          /HD IN BITS 0-6
1436  1056            TAD SEC
```

```
1437  3373             DCA HEAD        /WORD 0
1440  1342             TAD CYL
1441  3374             DCA HEAD+1      /WORD 1
1442  1373             TAD HEAD
1443  1374             TAD HEAD+1
1444  1375             TAD HEAD+2
1445  7041             CIA
1446  3376             DCA HEAD+3      /WORD 3 - CHECKSUM
1447  7325             CLA STL IAC RAL /3
1450  6517             MCR      /READ MODE
1451  7300             CLA CLL
1452  6503             SSRH     /READ SEL STATUS REG
1453  7006             RTL
1454  7006             RTL
1455  7710             SPA CLA /READY?
1456  5252             JMP .-4 /NO
1457  7326             CLA STL RTL      /YES, 2
1460  6517             MCR      /LOAD MODE
1461  7300             CLA CLL
1462  6501             CBRH             /SELECT HEAD
1463  1210             TAD HD
1464  7106             CLL RTL
1465  7006             RTL
1466  6500             CBRL     /HEAD NO BITS 3-7
1467  7300             CLA CLL
1470  1336             TAD C3400
1471  3343             DCA COMM         /CONFIRM READ
1472  4303             JMS DSKOP
1473  4744             JMS I XTRANS     /UPDATE DATA BLOCK
1474  1337             TAD C5400
1475  3343             DCA COMM         /SET TO CONF. WRITE
1476  7326             CLA STL RTL      /2
1477  6517             MCR
1500  7300             CLA CLL /LOAD MODE
1501  4303             JMS DSKOP        /WRITE BACK ONT DISK
1502  5600             JMP I DSK
1503  0000   DSKOP,    0
1504  7332             7332     /-6000
1505  6516             WCR      /SET WC TO MX
1506  7300             CLA CLL
1507  1345             TAD HEADER
1510  6514             MAR      /ST OF HDR IMAGE
1511  7300             CLA CLL
1512  1343             TAD COMM
1513  6501             CBRH     /LOAD COMMAND
1514  7300             CLA CLL
1515  1056             TAD SEC
1516  7106             CLL RTL
1520  6500             CBRL     /SEC NO BITS 3-7
1521  7300             CLA CLL
1522  7330             7330     /4000
1523  6505             AIRH     /SET WRITE REG IF NEC
1524  1341             TAD C100         /DATA IN B/MB1
1525  6512             CSR      /GO
1526  7326             CLA STL IAC RAL /3
1527  6517             MCR      /READ MODE
1530  7300             CLA CLL
1531  6511             ESRO     /READ ERROR STATUS
1532  5331             JMP .-1
1533  7510             SPA      /ERRORS ON DONE?
1534  7402             HLT      /YES
1535  5703             JMP I DSKOP      /NO
1536  3400   C3400,    3400
1537  5400   C5400,    5400
1540  1000   C1000,    1000
1541  0100   C100,     100
1542  0000   CYL,      0
1543  0000   COMM,     0
1544  1600   XTRANS,   TRANS
1545  1573   HEADER,   HEAD
```

```
                        *1573
1573  0000  HEAD,      0          /HEAD AND SECTOR
1574  0000             0          /CYLINDER
1575  3052             -4726      /CONSTANT WC -2518
1576  0000             0          /CHECK SUM
1577  0000             0          /ADDR OF DATA - 0 MB1
                        *1600
1600  0000  TRANS,     0
1601  7300             CLA CLL /UPDATE DISK BLOCK IN CORE
1602  1062             TAD CM12
1603  1114             TAD FACTO
1604  3223             DCA CTR
1605  1042             TAD INBUF
1606  1114             TAD FACTO
1607  3042             DCA INBUF
1610  1052             TAD DDAD
1611  3051             DCA OUTBUF     /ST OF WDS ON DISK BLOCK IN CORE
1612  1442  NX,        TAD I INBUF    /GET WD
1613  2042             ISZ INBUF
1614  6211             CDF1
1615  3451             DCA I OUTBUF
1616  2051             ISZ OUTBUF
1617  6201             CDF0
1620  2223             ISZ CTR /DONE?
1621  5212             JMP NX  /NO
1622  5600             JMP I TRANS    /YES
1623  0000  CTR,       0
                        *1630
1630  0000  SETDSK,    0          /SET CONSTANT DISK REGISTERS
1631  1245             TAD C3000
1632  6517             MCR        /SELECT CONTROLLER 0
1633  7326             CLA STL RTL    /2
1634  6517             MCR        /LOAD MODE
1635  7300             CLA CLL
1636  7333             7333       /6000
1637  6501             CBRH       /LOAD DRIVE
1640  7300             CLA CLL
1641  1055             TAD DRIVE
1642  6500             CBRL
1643  7300             CLA CLL
1644  5630             JMP I SETDSK
1645  3000  C3000,     3000
                        *1700
            /DIVIDE:
            /          BOUNDS OF DIVIDEND: 0-7777
            /          BOUNDS OF DIVISOR: 1-3777
            /CALL      JMS I XDIVID
            /          (DIVIDEND)
            /          (DIVISOR)
            /          REMAINDER RETURNED HERE
            /          CONTROL RESUMES HERE WITH QUOTIENT IN AC

1700  0000  DIVIDE,    0
1701  7100             CLL
1702  3355             DCA HDIV
1703  1700             TAD I DIVIDE
1704  2300             ISZ DIVIDE
1705  3356             DCA LDIV
1706  1700             TAD I DIVIDE
1707  2300             ISZ DIVIDE
1710  7041             CIA
1711  3357             DCA DIV
1712  1355             TAD HDIV
1713  7640             SZA CLA
1714  5335             JMP DV2
1715  1356             TAD LDIV
1716  1357             TAD DIV
1717  7620             SNL CLA        /DIV<DIVISOR?
1720  5347             JMP DV4        /YES
1721  7300             CLA CLL
```

```
1722  1360            TAD CM15
1723  3361            DCA DIVCT
1724  5335            JMP DV2
1725  1355  DV3,      TAD HDIV
1726  7004            RAL
1727  3355            DCA HDIV
1730  1355            TAD HDIV
1731  1357            TAD DIV
1732  7430            SZL
1733  3355            DCA HDIV
1734  7200            CLA
1735  1356  DV2,      TAD LDIV
1736  7004            RAL
1737  3356            DCA LDIV
1740  2361            ISZ DIVCT
1741  5325            JMP DV3
1742  1355            TAD HDIV
1743  3700            DCA I DIVIDE
1744  2300            ISZ DIVIDE
1745  1356            TAD LDIV
1746  5700            JMP I DIVIDE
1747  1356  DV4,      TAD LDIV          /QUOTIENT=0, REMAINDER
1750  3700            DCA I DIVIDE      /=DIVIDEND
1751  2300            ISZ DIVIDE
1752  5700            JMP I DIVIDE
1753  2300            ISZ DIVIDE
1754  5700            JMP I DIVIDE
1755  0000  HDIV,     0
1756  0000  LDIV,     0
1757  0000  DIV,      0
1760  7763  CM15,     -15
1761  0000  DIVCT,    0

                      *200
            /FORMAT:            JMS I XMAG
            /                   COMMAND
            /                   ADDRESS
            /                   WORD COUNT
            /                   EXTENSION REGISTER
            /         RETURN:   EOF
            /         RETURN:   NORMAL

0200  0000  MAG,      0
0201  1335            TAD MCM12
0202  3347            DCA REVCNT        /SET 10 RETRIES
0203  1600            TAD I MAG
0204  2200            ISZ MAG
0205  3350            DCA COM           /GET COMMAND
0206  7240            CLA CMA
0207  1600            TAD I MAG
0210  2200            ISZ MAG
0211  3351            DCA CADDR         /GET CURRENT ADDRESS
0212  1600            TAD I MAG
0213  2200            ISZ MAG
0214  3352            DCA WRDCNT        /GET WORD COUNT
0215  1600            TAD I MAG
0216  2200            ISZ MAG
0217  3353            DCA COMEX         /GET EXT REGISTER
0220  3346            DCA MADCOM
0221  1350  RETRY,    TAD COM
0222  1346            TAD MADCOM
0223  4322            JMS SETCOM        /SET CONTROLLER FOR FUNCTION
0224  1352            TAD WRDCNT
0225  3032            DCA 32
0226  1351            TAD CADDR
0227  3033            DCA 33            /SET WORD COUNT & CURRENT ADDRESS
0230  1353            TAD COMEX
0231  6717            6717
0232  7300            CLA CLL           /SET EXT REG
0233  4330            JMS MAGOP         /PERFORM MAGTAPE FUNTION
```

```
0234  6706          6706
0235  7421          MQL             /STORE STATUS IN MQ
0236  7501          MQA
0237  0336          AND MC6774
0240  7450          SNA
0241  5271          JMP MOK         /NO ERRORS
0242  0337          AND MC7677
0243  7450          SNA
0244  5273          JMP MEOF        /EOF
0245  0340          AND MC3543
0246  7640          SZA CLA
0247  7402          HLT             /BAD REC OR OFFLINE
0250  2347  PAR,    ISZ REVCNT      /PARITY
0251  5253          JMP .+2         /RETRY
0252  7402          HLT             /RETRY FAILURE
0253  1350          TAD COM
0254  0343          AND MC70
0255  1344          TAD MCM40
0256  7650          SNA CLA         /FAILURE ON MT?
0257  1341          TAD MC100       /YES
0260  3346          DCA MADCOM
0261  1350          TAD COM
0262  0342          AND MC7000
0263  1343          TAD MC70
0264  4322          JMS SETCOM      /SET CONTROLLER FOR BACKSPACE
0265  7240          CLA CMA
0266  3032          DCA 32          /WC = RECS BACKSPACED
0267  4330          JMS MAGOP       /PERFORM BACKSPACE
0270  5221          JMP RETRY       /AND TRY AGAIN
0271  2200  MOK,    ISZ MAG
0272  5600          JMP I MAG       /NORMAL EXIT
0273  1350  MEOF,   TAD COM
0274  0343          AND MC70
0275  1344          TAD MCM40
0276  7650          SNA CLA         /EOF ON WRITE?
0277  5250          JMP PAR         /YES - PARITY PROBLEM
0300  7000          NOP
0301  5600          JMP I MAG       /EXIT EOF
0302  0000  REWIND, 0
0303  1350          TAD COM
0304  0342          AND MC7000
0305  1345          TAD MC10
0306  4322          JMS SETCOM      /SET CONTROLLER FOR REWIND
0307  6722          6722            /EXECUTE REWIND
0310  1350          TAD COM
0311  0342          AND MC7000
0312  7106          CLL RTL
0313  7006          RTL             /LOAD CONT W/ NEXT MAG OP
0314  1355          TAD NEXM
0315  3354          DCA NEXCOM
0316  1754          TAD I NEXCOM
0317  7000          NOP
0320  7300          CLA CLL
0321  5702          JMP I REWIND
0322  0000  SETCOM, 0
0323  6711          6711
0324  5323          JMP .-1
0325  6716          6716
0326  7300          CLA CLL
0327  5722          JMP I SETCOM
0330  0000  MAGOP,  0
0331  6722          6722
0332  6701          6701
0333  5332          JMP .-1
0334  5730          JMP I MAGOP
0335  7766  MCM12,  -12
0336  6774  MC6774, 6774
0337  7677  MC7677, 7677
0340  3543  MC3543, 3543
0341  0100  MC100,  100
```

```
0342  7000  MC7000, -7000
0343  0070  MC70,    70
0344  7740  MCM40,   -40
0345  0010  MC10,    10
0346  0000  MADCOM,  0
0347  0000  REVCNT,  0
0350  0000  COM,     0
0351  0000  CADDR,   0
0352  0000  WRDCNT,  0
0353  0000  COMEX,   0
0354  0000  NEXCOM,  0
0355  0356  NEXM,    NEXTM
0356  1020  NEXTM,   1020     /0
0357  0040           40       /1
0360  0040           40       /2
0361  0040           40       /3

                     *600
            /FORMAT:          JMS I XDISK
            /                 COMMAND
            /                 CORE    ADDRESS
            /                 WORD COUNT
            /                 BLOCK NUMBER (0-17)
            /                 DISK ADDRESS
0600  0000  DISKS,   0
0601  1600           TAD I DISKS
0602  2200           ISZ DISKS
0603  3236           DCA COMD1          /SET COMMAND
0604  7240           CLA CMA
0605  1600           TAD I DISKS
0606  2200           ISZ DISKS
0607  3247           DCA CAD            /SET CURRENT ADDRESS-1
0610  1600           TAD I DISKS
0611  2200           ISZ DISKS
0612  3255           DCA WCD            /SET WORD COUNT
0613  1600           TAD I DISKS
0614  2200           ISZ DISKS
0615  3250           DCA DBLK           /GET BLOXK NO
0616  1600           TAD I DISKS
0617  2200           ISZ DISKS
0620  3256           DCA DAD            /SET DISK ADDRESS
0621  1251           TAD DM3
0622  3252           DCA DREVCT         /SET FOR 3 RETRIES
0623  1255  DRETRY,  TAD WCD
0624  3653           DCA I D7750        /SET WORD COUNT
0625  1247           TAD CAD
0626  3654           DCA I D7751        /SET CURRENT ADDRESS
0627  1250           TAD DBLK
0630  7110           CLL RAR
0631  7002           BSW
0632  1257           TAD C10            /MEMORY BANK 1
0633  6615           DEAL               /LOAD MEM EXT REG
0634  7210           CLA RAR
0635  1256           TAD DAD
0636  0000  COMD1,   0                  /EXECURE COMMAND
0637  6622           DFSC
0640  5237           JMP .-1            /WAIT TILL DISK DONE
0641  6621           DFSE               /ANY ERRORS?
0642  5244           JMP .+2            /YES
0643  5600           JMP I DISKS        /NO
0644  2252           ISZ DREVCT
0645  5223           JMP DRETRY         /RETRY
0646  7402           HLT                /RETRY FAILURE
0647  0000  CAD,     0
0650  0000  DBLK,    0
0651  7775  DM3,     -3
0652  0000  DREVCT,  0
0653  7750  D7750,   7750
0654  7751  D7751,   7751
```

```
0655   0000   ACD,     0
0656   0000   DAD,     0
0657   0010   C10,     10

ADDR     0421
ADG      1224
AGI      1153
BLKK     1110
BLOCK    0714
CAD      0647
CADDR    0351
CHARCT   0734
CKDSK    0526
CLEAR    1150
CM12     0062
CM14     1051
CM15     1760
CM16     1333
CM17     0063
CM222    1321
CM2340   1324
CM3      0505
CM314    0064
CM5672   0733
CM6      0061
CM60     0065
CM6000   1157
CM64     1322
CM7773   1052
COM      0350
COMD1    0636
COMEX    0353
COMM     1543
CORAD    0712
CTR      1623
CYL      1542
C10      0657
C100     1541
C1000    1540
C11      0525
C12      0057
C1400    0060
C2000    0506
C2041    1326
C2074    1327
C2260    1323
C3       0510
C3000    1645
C3400    1536
C377     1056
C4714    0765
C5400    1537
C6774    1325
DAD      0656
DBLK     0650
DDAD     0052
DDBLK    1233
DISKS    0600
DIV      1757
DIVCT    1761
DIVIDE   1700
DIVR     1406
DM3      0651
DO       0735
DONK     0746
DRETRY   0623
DREVCT   0652
DRIVE    0055
DSK      1400
DSKAD    0715
```

| | |
|---|---|
| DSKOP | 1503 |
| DUMP | 0441 |
| DV2 | 1735 |
| DV3 | 1725 |
| DV4 | 1747 |
| D7750 | 0653 |
| D7751 | 0654 |
| ENDO | 0474 |
| EOFTRG | 0507 |
| FAC | 1055 |
| FAC10 | 0114 |
| FF | 1271 |
| FILDSK | 0700 |
| FIN1 | 0445 |
| GG | 1274 |
| GOOR | 0427 |
| HD | 1410 |
| HDIV | 1755 |
| HEAD | 1573 |
| HEADER | 1545 |
| INBUF | 0042 |
| INCAD | 0727 |
| INIT | 0535 |
| LDIV | 1756 |
| LOOPCT | 0504 |
| LOTRG | 0043 |
| LST | 0053 |
| LSTR | 0511 |
| LSTR2 | 0106 |
| LST2 | 0054 |
| MADCOM | 0346 |
| MAG | 0200 |
| MAGOP | 0330 |
| MCM12 | 0335 |
| MCM40 | 0344 |
| MC10 | 0345 |
| MC100 | 0341 |
| MC3543 | 0340 |
| MC6774 | 0336 |
| MC70 | 0343 |
| MC7000 | 0342 |
| MC7677 | 0337 |
| MEOF | 0273 |
| MOK | 0271 |
| MONCT | 0050 |
| MXC1 | 1053 |
| NEXCOM | 0354 |
| NEXM | 0355 |
| NEXTM | 0356 |
| NUM | 1260 |
| NX | 1612 |
| NXMX | 1012 |
| NXT1 | 0415 |
| NXT2 | 0412 |
| OUTBUF | 0051 |
| PAR | 0250 |
| PROC | 1330 |
| PROC | 1200 |
| RD | 0560 |
| RDCT | 0044 |
| READCT | 1130 |
| READIT | 1203 |
| RECCT | 0041 |
| RESET | 0704 |
| REST | 1104 |
| RETRY | 0221 |
| REVCNT | 0347 |
| REWIND | 0302 |
| ROT | 1000 |

```
ROTCT   1054
RST     1304
SEC     0056
SETAD   0472
SETCOM  0322
SETDSK  1630
SETIT   0406
STAD    0040
START   1010
STORE   1057
TIMCT   0046
TRANS   1600
TRCCT   0045
TYPCT   0047
UP      1255
WCD     0655
WRDCNT  0352
WRT     0710
WRTDSK  1100
WRTIT   1232
XCLEAR  0066
XDISK   0070
XDIVID  0076
XDO     0075
XDSK    0101
XFILD   0072
XINIT   0077
XLST    0102
XLST2   0103
XMAG    0067
XPROC   0104
XRD     0100
XREAD   0074
XROT    0071
XSETD   0105
XTRANS  1544
XWRTD   0073
XXX     1044
```

PROGRAM 6 - DATREC

```
CDF2=6221
CDF1=6211
CDF0=6201
BSW=7002
MQL=7421
MQA=7501
MCR=6517
CBRH=6501
CBRL=6500
SSRH=6503
SSRL=6502
ESRO=6511
WCR=6516
MAR=6514
CSR=6512
AIRH=6505
AIRL=6504
FIXTAB
```

```
                        *40         /ADDRESS TABLE
0040   7655   CM123,    -123
0041   4020   C4020,    4020
0042   0077   C77,      77
0043   0002   L2,       2
0044   0003   L3,       3

0045   1550   XOTPUT,   OTPUT       /TO DISK
0046   0200   XMAG,     MAG
0047   1400   XZRO,     ZRO
0050   1430   XINIT,    INIT
0051   1500   XTERM,    TERM
0052   5000   XDIVID,   DIVIDE
0053   2400   XFIRST,   FIRST       /DO INITAIL DATA IN LINE
0054   2600   XGETCR,   GETCR
0055   1600   XPUTWD,   PUTWD       /PUT STORED WD IN OUTBUF
0056   2200   XBLANK,   BLANK
0057   0302   XREWD,    REWIND
0060   1610   XPUTCR,   PUTCR


0061   0077   XSTORE,   WORD
0062   0000   STORE,    0
0063   0124   END,      WORD+25
0064   0000   OUTBUF,   0
0065   0000   STOUT,    0           /ST LOC FOR 1 DATA REC
0066   0000   LINE,     0           /1 IF LINE 2 OF DATA
0067   0000   HALF,     0           /PART OF OUTBUF WD
0070   0000   DTMP,     0
0071   0000   RECCT,    0
0072   0000   CHAR,     0
0073   0000   DBLK,     0
0074   0000   SEC,      0
0075   0000   DRIVE,    0
0076   0000   LINCT,    0

0077   0000   WORD,     0           /ST OF WORD IN STORAGE- 20 CHAR LIMIT
                        *400
0400   7300             CLA CLL
0401   1343             TAD C2017          /1039
0402   3073             DCA DBLK           /DATA BLOCK ON DISK
0403   4745             JMS I XSTDSK       /SET DISK CONSTANTS
0404   4447             JMS I XZRO         /ZERO OUTPUT AREA IN COR
0405   4450             JMS I XINIT        /SET ST OF BUFRS, CTRS
0406   3336   NXONE,    DCA STORCT         /SET OTHER TRGS
0407   3066             DCA LINE
0410   3067             DCA HALF
0411   3076             DCA LINCT
0412   1337             TAD CM116
0413   3340             DCA LIM /-78
0414   1041             TAD C4020
0415   3070             DCA DTMP           /ST OF INPUT
0416   4446             JMS I XMAG
0417   1220             1220     /RD CDM
0420   0000             0
0421   4000             -4000
0422   0001             1        /MEM
0423   5330             JMP DOEOF          /EOF RETURN
0424   1065             TAD STOUT          /NORMAL RETURN
0425   1040             TAD CM123
0426   3065             DCA STOUT          /SET BACK 83 POS
0427   1065             TAD STOUT
0430   3064             DCA OUTBUF
0431   6211             CDF1
0432   1741             TAD I L5
0433   6201             CDF0
0434   7041             CIA
0435   1041             TAD C4020
```

```
0436  7640              SZA CLA /ANY DATA IN RECORD?
0437  5244              JMP DATA        /YES
0440  2071   N,         ISZ RECCT       /NO, OUTPUT BUF FULL?
0441  5206              JMP NXONE       /NO
0442  4445              JMS I XOTPUT    /YES, WRITE ON DISK
0443  5204              JMP NXONE-2
0444  4453   DATA,      JMS I XFIRST    /PUT IN BEG INFO=DATE ETC
0445  1070              TAD DTMP
0446  7041              CIA
0447  6211              CDF1
0450  1741              TAD I L5
0451  6201              CDF0
0452  7650              SNA CLA /END OF RECORD?
0453  5325              JMP ENDREC      /YES
0454  4454              JMS I XGETCR    /NO
0455  1072              TAD CHAR
0456  1342              TAD CM77
0457  7650              SNA CLA /SPACE?
0460  5273              JMP ENDIT       /YES, TERM STORAGE BUFR
0461  1072              TAD CHAR        /NO, STORE CHAR
0462  3462              DCA I STORE
0463  2062              ISZ STORE
0464  2336              ISZ STORCT      /COUNT CHAR
0465  1062              TAD STORE
0466  7041              CIA
0467  1063              TAD END
0470  7650              SNA CLA /BUF AT LIM? - 18 CHAR
0471  7402              HLT     /YES
0472  5245              JMP DATA+1      /NO, GET NEXT CHAR
0473  1042   ENDIT,     TAD C77
0474  3462              DCA I STORE
0475  2062              ISZ STORE
0476  3462              DCA I STORE     /END W ZERO
0477  2336              ISZ STORCT
0500  1076              TAD LINCT
0501  1336              TAD STORCT
0502  3076              DCA LINCT       /# CHARS IN LINE
0503  1061   TRAN,      TAD XSTORE
0504  3062              DCA STORE
0505  1076              TAD LINCT
0506  1340              TAD LIM
0507  7740              SMA SZA CLA     /LINE OVERFLOW
0510  5314              JMP NXLN        /YES
0511  4455              JMS I XPUTWD    /NO, PUT WD FROM STOR TO OUTBUF
0512  3336              DCA STORCT
0513  5245              JMP DATA+1
0514  4451   NXLN,      JMS I XTERM     /TERM LINE APPROP.
0515  1066              TAD LINE
0516  7640              SZA CLA /DONE W LINE 1?
0517  5240              JMP N   /NO , DONE LINE 2
0520  3076              DCA LINCT       /YES
0521  1344              TAD CM107       /-17
0522  3340              DCA LIM
0523  2066              ISZ LINE        /SET TRG TO LINE2
0524  5300              JMP TRAN-3      /TRANS WD IN STORAGE
0525  2066   ENDREC,    ISZ LINE        /USE LINE 2 ENDING
                        J.. I XTE..
0527  5240              JMP N
0530  4456   DOEOF,     JMS I XBLANK    /PUT BLANKS IN IF NEC
0531  4457              JMS I XREWD
0532  7402              HLT     /PUT NEW TAPE ON IF NEC
0533  5206              JMP NXONE       /PROGRAM CONTINUATION
0534  4445              JMS I XOTPUT    /CONTINUE HERE TO DUMP LAST BLOCK
0535  7402              HLT             /PROCESSING COMPLETE
0536  0000   STORCT,    0
0537  7062   CM116,     -116
0540  0000   LIM,       0
0541  0005   L5,        5
0542  7701   CM77,      -77
```

```
0543  2017  C2017,  2017
0544  7671  CM107,  -107
0545  1700  XSTDSK, SETDSK
                    *1000
1000  0000  MONLST, 0        /MAY AND JUN 71 NOT NEEDED
1001  0000          0
1002  1100          JUL1
1003  1107          AUG1
1004  1116          SEP1
1005  1125          OCT1
1006  1134          NOV1
1007  1143          DEC1
1010  1152          JAN2
1011  1161          FEB2
1012  1170          MAR2
1013  1177          APR2
1014  1206          MAY2
1015  1215          JUN2
1016  1224          JUL2
1017  1233          AUG2
1020  1242          SEP2
1021  1251          OCT2
1022  1260          NOV2
1023  1267          DEC2
1024  1276          JAN3

1025  1305  DAYLST, SAT
1026  1311          FRI
1027  1315          THUR
1030  1322          WED
1031  1326          TUES
1032  1333          MON
1033  1337          SUN
                    *1100    /PRINT BUFFER
1100  0044  JUL1,   44
1101  0057          57
1102  0046          46
1103  0077          77
1104  0074          74
1105  0066          66
1106  0000          0
1107  0033  AUG1,   33
1110  0057          57
1111  0041          41
1112  0077          77
1113  0074          74
1114  0066          66
1115  0000          0
1116  0055  SEP1,   55
1117  0037          37
1120  0052          52
1121  0077          77
1122  0074          74
1123  0066          66
1124  0000          0
1125  0051  OCT1,   51
1126  0035          35
1127  0056          56
1130  0077          77
1131  0074          74
1132  0066          66
1133  0000          0
1134  0050  NOV1,   50
1135  0051          51
1136  0060          60
1137  0077          77
1140  0074          74
1141  0066          66
1142  0000          0
```

```
1143 0036 DEC1,  36
1144 0037        37
1145 0035        35
1146 0077        77
1147 0074        74
1150 0066        66
1151 0000        0
1152 0044 JAN2,  44
1153 0033        33
1154 0050        50
1155 0077        77
1156 0074        74
1157 0067        67
1160 0000        0
1161 0040 FEB2,  40
1162 0037        37
1163 0034        34
1164 0077        77
1165 0074        74
1166 0067        67
1167 0000        0
1170 0047 MAR2,  47
1171 0033        33
1172 0054        54
1173 0077        77
1174 0074        74
1175 0067        67
1176 0000        0
1177 0033 APR2,  33
1200 0052        52
1201 0054        54
1202 0077        77
1203 0074        74
1204 0067        67
1205 0000        0
1206 0047 MAY2,  47
1207 0033        33
1210 0063        63
1211 0077        77
1212 0074        74
1213 0067        67
1214 0000        0
1215 0044 JUN2,  44
1216 0057        57
1217 0050        50
1220 0077        77
1221 0074        74
1222 0067        67
1223 0000        0
1224 0044 JUL2,  44
1225 0057        57
1226 0046        46
1227 0077        77
1230 0074        74
1231 0067        67
1232 0000        0
1233 0033 AUG2,  33
1234 0057        57
1235 0041        41
1236 0077        77
1237 0074        74
1240 0067        67
1241 0000        0
1242 0055 SEP2,  55
1243 0037        37
1244 0052        52
1245 0077        77
1246 0074        74
1247 0067        67
1250 0000        0
```

```
1251 0051 OCT2,  51
1252 0035        35
1253 0056        56
1254 0077        77
1255 0074        74
1256 0067        67
1257 0000        0
1260 0050 NOV2,  50
1261 0051        51
1262 0060        60
1263 0077        77
1264 0074        74
1265 0067        67
1266 0000        0
1267 0036 DEC2,  36
1270 0037        37
1271 0035        35
1272 0077        77
1273 0074        74
1274 0067        67
1275 0000        0
1276 0044 JAN3,  44
1277 0033        33
1300 0050        50
1301 0077        77
1302 0074        74
1303 0070        70
1304 0000        0
1305 0055 SAT,   55
1306 0001        1
1307 0024        24
1310 0000        0
1311 0040 FRI,   40
1312 0022        22
1313 0011        11
1314 0000        0
1315 0056 THUR,  56
1316 0010        10
1317 0025        25
1320 0022        22
1321 0000        0
1322 0061 WED,   61
1323 0005        5
1324 0004        4
1325 0000        0
1326 0056 TUES,  56
1327 0025        25
1330 0005        5
1331 0023        23
1332 0000        0
1333 0047 MON,   47
1334 0017        17
1335 0016        16
1336 0000        0
1337 0055 SUN,   55
1340 0025        25
1341 0016        16
1342 0000        0
                 *1400
1400 0000 ZRO,   0          /ZERO OUTBUF; 0-4725 MB2
1401 7300        CLA CLL
1402 1214        TAD CM4726        /-2518
1403 3215        DCA CTR
1404 3064        DCA OUTBUF
1405 6221        CDF2
1406 3464 AG1,   DCA I OUTBUF
1407 2064        ISZ OUTBUF
1410 2215        ISZ CTR
1411 5206        JMP AG1
```

```
1412  6201            CDFO
1413  5600            JMP I ZRO       /YES
1414  3052  CM4726,   -4726
1415  0000  CTR,      0
                      *1430
1430  0000  INIT,     0
1431  1240            TAD C4726       /-2518
1432  3065            DCA STOUT       /END OF OUTBUF+1
1433  1061            TAD XSTORE
1434  3062            DCA STORE       /ST OF WORD STORAGE
1435  1241            TAD CM36
1436  3071            DCA RECCT       /-30    REC PER BLOCK
1437  5630            JMP I INIT
1440  4726  C4726,    4726
1441  7742  CM36,     -36
                      *1500
1500  0000  TERM,     0       /TERMINATE DATA LINE 1 OR 2
1501  7300            CLA CLL
1502  1066            TAD LINE
1503  7640            SZA CLA /LINE 1?
1504  1320            TAD C7  /NO
1505  1317            TAD XLST        /YES, SET ST OF TERM CHARS
1506  3321            DCA LST
1507  7001  NX,       IAC
1510  1721            TAD I LST
1511  2321            ISZ LST
1512  7450            SNA     /END OF LIST?
1513  5700            JMP I TERM      /YES
1514  1322            TAD CM1 /NO
1515  4460            JMS I XPUTCR    /PUT CHAR IN BUFR
1516  5307            JMP NX
1517  1523  XLST,     LISTR
1520  0007  C7,       7
1521  0000  LST,      0
1522  7777  CM1,      -1
1523  0000  LISTR,    0
1524  0015            15      /LINE 1 TERMINATORS
1525  0000            0
1526  0012            12
1527  0000            0
1530  0011            11
1531  7777            7777
1532  0000            0       /LINE 2
1533  0015            15
1534  7777            7777
                      *1550
1550  0000  OTPUT,    0
1551  7300            CLA CLL /OUTPUT TO DISK FROM MB2
1552  1073            TAD DBLK
1553  3355            DCA DDBLK
1554  4767            JMS I XDSK
1555  0000  DDBLK,    0       /DISK BLOCK NO 40-1039
1556  7240            CLA CMA
1557  1073            TAD DBLK
1560  3073            DCA DBLK        /SET BACK ONE BLOCK
1561  1073            TAD DBLK
1562  1366            TAD CM50        /-40
1563  7710            SPA CLA /OVERFLOW?
1564  7402            HLT     /YES
1565  5750            JMP I OTPUT     /NO
1566  7730  CM50,     -50
1567  2000  XDSK,     DSK
                      *1600
1600  0000  PUTWD,    0       /PUT WORD IN OUTBUF
1601  7300            CLA CLL
1602  1462  AG2,      TAD I STORE     /GET CHAR
1603  7450            SNA     /DONE?
1604  5234            JMP OO          /YES
1605  4210            JMS PUTCR       /NO, PUT CHAR INTO BUFR
1606  2062            ISZ STORE
1607  5202            JMP AG2
```

```
1610 0000 PUTCR,  0
1611 3233         DCA CHR /SAVE 6 BIT CHAR
1612 6221         CDF2
1613 1067         TAD HALF
1614 7640         SZA CLA /CHAR IN 1ST HALF OF WD?
1615 5224         JMP SECHLF      /NO
1616 2067         ISZ HALF        /YES, SET TRG
1617 1233         TAD CHR
1620 7002         BSW
1621 3464         DCA I OUTBUF    /PUT IN BUFR
1622 6201         CDF0
1623 5610         JMP I PUTCR
1624 1233 SECHLF, TAD CHR
1625 1464         TAD I OUTBUF
1626 3464         DCA I OUTBUF    /PUT CHAR INTO SECOND HALF
1627 3067         DCA HALF        /CLEAR TRG
1630 2064         ISZ OUTBUF
1631 5222         JMP SECHLF-2
1632 7402         HLT
1633 0000 CHR,    0
1634 1061 QQ,     TAD XSTORE
1635 3062         DCA STORE
1636 5600         JMP I PUTWD
                  *2000
2000 0000 DSK,    0
2001 7300         CLA CLL
2002 1600         TAD I DSK
2003 2200         ISZ DSK
2004 3206         DCA DIVR
2005 4452         JMS I XDIVID
2006 0000 DIVR,   0       /BLOCK NO
2007 0024         24      /DIVISOR = 20
2010 0000 HD,     0       /REMAINDER
2011 3333         DCA CYL /CYL IN AC
2012 7326         CLA STL RTL     /2
2013 6517         MCR
2014 7300         CLA CLL /LOAD MODE
2015 1330         TAD C1000
2016 6501         CBRH    /SELECT CYLINDER
2017 7300         CLA CLL
2020 1333         TAD CYL
2021 7106         CLL RTL
2022 7006         RTL
2023 6500         CBRL    /CYL NO IN BITS 0-7
2024 7300         CLA CLL
2025 1331         TAD C1400
2026 6501         CBRH    /SP FN
2027 7300         CLA CLL
2030 1331         TAD C1400
2031 6500         CBRL    /SEEK AND RESET HEAD
2032 7300         CLA CLL
2033 1210         TAD HD  /SET UP HEADER IMAGE
2034 7002         BSW
2035 7110         CLL RAR /HD IN BITS 0-6
2036 1074         TAD SEC
2037 3336         DCA HEAD        /WORD 0
2040 1333         TAD CYL
2041 3337         DCA HEAD+1      /WORD 1
2042 1336         TAD HEAD
2043 1337         TAD HEAD+1
2044 1340         TAD HEAD+2
2045 7041         CIA
2046 3341         DCA HEAD+3      /WORD 3 - CHECKSUM
2047 7325         CLA STL IAC RAL /3
2050 6517         MCR     /READ MODE
2051 7300         CLA CLL
2052 6503         SSRH    /READ SEL STATUS REG
2053 7006         RTL
2054 7006         RTL
```

```
2055  7710           SPA CLA /READY?
2056  5252           JMP .-4 /NO
2057  7326           CLA STL RTL     /YES, 2
2060  6517           MCR     /LOAD MODE
2061  7300           CLA CLL
2062  6501           CBRH    /SELECT HEAD
2063  1210           TAD HD
2064  7106           CLL RTL
2065  7006           RTL
2066  6500           CBRL    /HEAD NO BITS 3-7
2067  7300           CLA CLL
2070  1327           TAD C5400
2071  3334           DCA COMM        /SET TO CONF. WRITE
2072  4274           JMS DSKOP       /WRITE ON DISK
2073  5600           JMP I DSK
2074  0000  DSKOP,   0
2075  7332           7332    /-6000
2076  6516           WCR     /SET WC TO MAX
2077  7300           CLA CLL
2100  1335           TAD HEADER
2101  6514           MAR     /ST OF HDR IMAGE
2102  7300           CLA CLL
2103  1334           TAD COMM
2104  6501           CBRH    /LOAD COMMAND
2105  7300           CLA CLL
2106  1074           TAD SEC
2107  7106           CLL RTL
2110  7006           RTL
2111  6500           CBRL    /SEC NO BITS3-7
2112  7300           CLA CLL
2113  7330           7330    /4000
2114  6505           AIRH    /SET WRITE REG
2115  1332           TAD C200        /DATA IN MB2
2116  6512           CSR     /GO
2117  7325           CLA STL IAC RAL /3
2120  6517           MCR     /READ MODE
2121  7300           CLA CLL
2122  6511           ESRO    /READ ERROR STATUS
2123  5322           JMP .-1
2124  7510           SPA     /ERRORS ON DONE?
2125  7402           HLT     /YES
2126  5674           JMP I DSKOP     /NO
2127  5400  C5400,   5400
2130  1000  C1000,   1000
2131  1400  C1400,   1400
2132  0200  C200,    200
2133  0000  CYL,     0
2134  0000  COMM,    0
2135  2136  HEADER,  HEAD
2136  0000  HEAD,    0       /HEAD AND SECTOR
2137  0000  .        0       /CYLINDER
2140  3052           -4726   /CONSTANT WC -2518
2141  0000           0       /CHECKSUM
2142  0000           0       /ADDR OF DATA - 0 MB2
                     *2400   /FRAME,MO,YR,DAY,DATE
2400  0000  FIRST,   0
2401  7300           CLA CLL /DO 5 INITIAL CHARS
2402  4460           JMS I XPUTCR
2403  1351           TAD C16
2404  4460           JMS I XPUTCR
2405  1042           TAD C77
2406  4460           JMS I XPUTCR
2407  4460           JMS I XPUTCR
2410  1352           TAD C17
2411  4460           JMS I XPUTCR
2412  6211           CDF1
2413  1443           TAD I L2        /DO FRAME #
2414  3221           DCA HI
2415  1444           TAD I L3
2416  3222           DCA LO
```

```
2417  6201          CDF0
2420  4753          JMS I XOCDEC
2421  0000  HI,     0
2422  0000  LO,     0
2423  0000          0
2424  0000          0
2425  0000          0
2426  0000          0
2427  0000  DIG1,   0
2430  0000  DIG2,   0
2431  0000  DIG3,   0
2432  0000  DIG4,   0
2433  1227          TAD DIG1
2434  4334          JMS PUTIN
2435  1230          TAD DIG2
2436  4334          JMS PUTIN
2437  1231          TAD DIG3
2440  4334          JMS PUTIN
2441  1232          TAD DIG4
2442  4334          JMS PUTIN
2443  1042          TAD C77
2444  4460          JMS I XPUTCR
2445  6211          CDF1
2446  1754          TAD I L1         /CART=MONTH AND YEAR
2447  6201          CDF0
2450  1356          TAD STL1
2451  3360          DCA MONLOC       /LOC FOR PRINT BUFR
2452  1760          TAD I MONLOC
2453  4340          JMS DOWD         /PUT THE WORDS IN BUFR
2454  1042          TAD C77
[illegible]         J[illegible] I XPU[illegible]
2456  3363          DCA ROCT
2457  6211          CDF1
2460  1755          TAD I L10
2461  6201          CDF0
2462  0364          AND C177         /DAY BITS
2463  7110  ROT,    CLL RAR
2464  7430          SZL     /DAY?
2465  5270          JMP DAY /YES
2466  2363          ISZ ROCT         /NO
2467  5263          JMP ROT
2470  7200  DAY,    CLA
2471  1363          TAD ROCT         /GET COUNT
2472  1357          TAD STL2
2473  3361          DCA DAYLOC
2474  1761          TAD I DAYLOC
2475  4340          JMS DOWD
2476  1042          TAD C77
2477  4460          JMS I XPUTCR
2500  6211          CDF1
2501  1755          TAD I L10
2502  6201          CDF0
2503  0365          AND C7600
2504  7002          BSW
2505  7110          CLL RAR
2506  3311          DCA LLO
2507  4753          JMS I XOCDEC
2510  0000          0
2511  0000  LLO,    0
2512  0000          0
2513  0000          0
2514  0000          0
2515  0000          0
2516  0000          0
2517  0000          0
2520  0000  D1,     0
2521  0000  D2,     0
2522  1320          TAD D1
2523  4334          JMS PUTIN
```

```
2524  1321           TAD D2
2525  4334           JMS PUTIN
2526  1042           TAD C77
2527  4460           JMS I XPUTCR
2530  1076           TAD LINCT
2531  1352           TAD C17
2532  3076           DCA LINCT       /ADJUST TO ACCOUNT FOR DATE, ETC
2533  5600           JMP I FIRST
2534  0000  PUTIN,   0
2535  1366           TAD C65
2536  4460           JMS I XPUTCR
2537  5734           JMP I PUTIN
2540  0000  DOWD,    0
2541  3362           DCA LOC
2542  1762  NXLET,   TAD I LOC
2543  2362           ISZ LOC
2544  7450           SNA      /ONE?
2545  5740           JMP I DOWD      /YES
[illegible]
2547  2076           ISZ LINCT       /COUNT CHARS
2550  5342           JMP NXLET
2551  0016  C16,     16
2552  0017  C17,     17
2553  2700  XOCDEC,  OCDEC
2554  0001  L1,      1
2555  0010  L10,     10
2556  0777  STL1,    MONLST-1
2557  1025  STL2,    DAYLST
2560  0000  MONLOC,  0
2561  0000  DAYLOC,  0
2562  0000  LOC,     0
2563  0000  ROCT,    0
2564  0177  C177,    177
2565  7600  C7600,   7600
2566  0065  C65,     65
                     *2200
2200  0000  BLANK,   0
2201  7300           CLA CLL
2202  6211           CDF1
2203  1443           TAD I L2
2204  7640           SZA CLA /HI ORDER FRAME NO?
2205  1237           TAD C4  /YES, ADD 4 TO LO ORD
2206  1444           TAD I L3        /NO
2207  6201           CDF0
2210  3212           DCA DIVV
2211  4452           JMS I XDIVID
2212  0000  DIVV,    0
2213  0014           14      /DIV FRAME BY 12
2214  0000  REM,     0
2215  7300           CLA CLL
2216  1214           TAD REM
2217  7450           SNA     /BLANKS TO INSERT?
2220  5600           JMP I BLANK     /NO
2221  1240           TAD CM14        /YES
2222  3241           DCA BLKCT       /= # BLANKS NEEDED
2223  1065  AG3,     TAD STOUT
2224  1040           TAD CM123
2225  3065           DCA STOUT       /LEAVE ONE BLANK
2226  2071           ISZ RECCT       /DONE W DATA BLOCK?
2227  5231           JMP INC /NO
2230  5234           JMP DONIT       /YES
2231  2241  INC,     ISZ BLKCT       /DONE W BLANKS?
2232  5223           JMP AG3 /NO
2233  5600           JMP I BLANK     /YES
2234  4445  DONIT,   JMS I XOTPUT    /WRITE ONTO DISK
2235  4450           JMS I XINIT     /RESET BUFS
2236  5231           JMP INC
2237  0004  C4,      4
2240  7764  CM14,    -14
2241  0000  BLKCT,   0
```

```
                        *5000
               /DIVID   SINGLE PRECISION DIVIDE SUBROUTINE
               /        BOUNDS OF DIVIDEND: 0-7777
               /        BOUNDS OF DIVISOR: 1-3777
               /CALL    JMS I XDIVID
               /        (DIVIDEND)
               /        (DIVISOR)
               /        REMAINDER RETURNED HERE
               /        CONTROL RESUMES HERE WITH QUOTIENT IN AC
5000   0000    DIVIDE,  0
5001   7100             CLL
5002   3253             DCA HDIV
5003   1600             TAD I DIVIDE
5004   2200             ISZ DIVIDE
5005   3254             DCA LDIV
5006   1600             TAD I DIVIDE
5007   2200             ISZ DIVIDE
5010   7041             CIA
5011   3255             DCA DIV
5012   1253             TAD HDIV
5013   7640             SZA CLA
5014   5235             JMP DV2
5015   1254             TAD LDIV
5016   1255             TAD DIV
5017   7620             SNL CLA /DIV<DIVISOR?
5020   5247             JMP DV4 /YES
5021   7300             CLA CLL
5022   1256             TAD CM15
5023   3257             DCA DIVCT
5024   5235             JMP DV2
5025   1253    DV3,     TAD HDIV
5026   7004             RAL
5027   3253             DCA HDIV
5030   1253             TAD HDIV
5031   1255             TAD DIV
5032   7430             SZL
5033   3253             DCA HDIV
5034   7200             CLA
5035   1254    DV2,     TAD LDIV
5036   7004             RAL
5037   3254             DCA LDIV
5040   2257             ISZ DIVCT
5041   5225             JMP DV3
5042   1253             TAD HDIV
5043   3600             DCA I DIVIDE
5044   2200             ISZ DIVIDE
5045   1254             TAD LDIV
5046   5600             JMP I DIVIDE
5047   1254    DV4,     TAD LDIV        /QUOTIENT=0, REMAINDER
5050   3600             DCA I DIVIDE    /=DIVIDEND
5051   2200             ISZ DIVIDE
5052   5600             JMP I DIVIDE
5053   0000    HDIV,    0
5054   0000    LDIV,    0
5055   0000    DIV,     0
5056   7763    CM15,    -15
5057   0000    DIVCT,   0
```

```
                        *200
               /FORMAT:          JMS I XMAG
               /                 COMMAND
               /                 ADDRESS
               /                 WORD COUNT
               /                 EXTENSION REGISTER
               /        RETURN:  EOF
               /        RETURN:  NORMAL

0200   0000    MAG,     0
0201   1335             TAD MCM12
```

```
0202 3347          DCA REVCNT   /SET TO RETRIES
0203 1600          TAD I MAG
0204 2200          ISZ MAG
0205 3350          DCA COM      /GET COMMAND
0206 7240          CLA CMA
0207 1600          TAD I MAG
0210 2200          ISZ MAG
0211 3351          DCA CADDR    /GET CURRENT ADDRESS
0212 1600          TAD I MAG
0213 2200          ISZ MAG
0214 3352          DCA WRDCNT   /GET WORD COUNT
0215 1600          TAD I MAG
0216 2200          ISZ MAG
0217 3353          DCA COMEX    /GET EXT REGISTER
0220 3346          DCA MADCOM
0221 1350  RETRY,  TAD COM
0222 1346          TAD MADCOM
0223 4322          JMS SETCOM   /SET CONTROLLER FOR FUNCTION
0224 1352          TAD WRDCNT
0225 3032          DCA 32
0226 1351          TAD CADDR
0227 3033          DCA 33       /SET WORD COUNT & CURRENT ADDRESS
0230 1353          TAD COMEX
0231 6717          6717
0232 7300          CLA CLL      /SET EXT REG
0233 4330          JMS MAGOP    /PERFORM MAGTAPE FUNTION
0234 6706          6706
0235 7421          MQL          /STORE STATUS IN MQ
0236 7501          MQA
0237 0336          AND MC6774
0240 7450          SNA
0241 5271          JMP MOK      /NO ERRORS
0242 0337          AND MC7677
0243 7450          SNA
0244 5273          JMP MEOF     /EOF
0245 0340          AND MC3543
0246 7640          SZA CLA
0247 7402          HLT          /BAD REC OR OFFLINE
0250 2347  PAR,    ISZ REVCNT   /PARITY
0251 5253          JMP .+2      /RETRY
0252 7402          HLT          /RETRY FAILURE
0253 1350          TAD COM
0254 0343          AND MC70
0255 1344          TAD MCM40
0256 7650          SNA CLA      /FAILURE ON WT?
0260 3346          DCA MADCOM
0261 1350          TAD COM
0262 0342          AND MC7000
0263 1343          TAD MC70
0264 4322          JMS SETCOM   /SET CONTROLLER FOR BACKSPACE
0265 7240          CLA CMA
0266 3032          DCA 32       /WC = RECS BACKSPACED
0267 4330          JMS MAGOP    /PERFORM BACKSPACE
0270 5221          JMP RETRY    /AND TRY AGAIN
0271 2200  MOK,    ISZ MAG
0272 5600          JMP I MAG    /NORMAL EXIT
0273 1350  MEOF,   TAD COM
0274 0343          AND MC70
0275 1344          TAD MCM40
0276 7650          SNA CLA      /EOF ON WRITE?
0277 5250          JMP PAR      /YES - PARITY PROBLEM
0300 7000          NOP
0301 5600          JMP I MAG    /EXIT EOF
0302 0000  REWIND, 0
0303 1350          TAD COM
0304 0342          AND MC7000
0305 1345          TAD MC10
0306 4322          JMS SETCOM   /SET CONTROLLER FOR REWIND
0307 6722          6722         /EXECUTE REWIND
```

```
0310  1350            TAD COM
0311  0342            AND MC7000
0312  7106            CLL RTL
0313  7006            RTL                 /LOAD CONT W/ NEXT MAG OP
0314  1355            TAD NEXM
0315  3354            DCA NEXCOM
0316  1754            TAD I NEXCOM
0317  6716            6716
0320  7300            CLA CLL
0321  5702            JMP I REWIND
0322  0000  SETCOM,   0
0323  6711            6711
0324  5323            JMP .-1
0325  6716            6716
0326  7300            CLA CLL
0327  5722            JMP I SETCOM
0330  0000  MAGOP,    0
0331  6722            6722
0332  6701            6701
0333  5332            JMP .-1
0334  5730            JMP I MAGOP
0335  7766  MCM12,    -12
0336  6774  MC6774,   6774
0337  7677  MC7677,   7677
0340  3543  MC3543,   3543
0341  0100  MC100,    100
0342  7000  MC7000,   7000
0343  0070  MC70,     70
0344  7740  MCM40,    -40
0345  0010  MC10,     10
0346  0000  MADCOM,   0
0347  0000  REVCNT,   0
0350  0000  COM,      0
0351  0000  CADDR,    0
0352  0000  WRDCNT,   0
0353  0000  COMEX,    0
0354  0000  NEXCOM,   0
0355  0356  NEXM,     NEXTM
0356  1020  NEXTM,    1020    /0
0357  0040            40      /1
0360  0040            40      /2
0361  0040            40      /3

                      *2700
2700  0000  OCDEC,    0
2701  7300            CLA CLL
2702  1700            TAD I OCDEC
2703  2300            ISZ OCDEC
2704  3355            DCA UDHIGH
2705  1700            TAD I OCDEC
2706  2300            ISZ OCDEC
2707  3356            DCA UDLOW
2710  1351            TAD UDLOOP
2711  3354            DCA UDCNT
2712  1352            TAD UDADDR
2713  3364            DCA UDPTR
2714  3361            DCA UDBOX
2715  1764  UDARND,   TAD I UDPTR
2716  2364            ISZ UDPTR
2717  3357            DCA UDHSUB
2720  1764            TAD I UDPTR
2721  2364            ISZ UDPTR
2722  3360            DCA UDLSUB
2723  7100  UDDO,     CLL
2724  1360            TAD UDLSUB
2725  1356            TAD UDLOW
2726  3362            DCA UDTEML
2727  7004            RAL
```

```
2730  1357            TAD UDHSUB
2731  1355            TAD UDHIGH
2732  7420            SNL
2733  5341            JMP UDOUT
2734  2361            ISZ UDBOX
2735  3355            DCA UDHIGH
2736  1362            TAD UDTEML
2737  3356            DCA UDLOW
2740  5323            JMP UDDO
2741  7200  UDOUT,    CLA
2742  1361            TAD UDBOX
2743  3700            DCA I OCDEC
2744  2300            ISZ OCDEC
2745  3361            DCA UDBOX
2746  2354            ISZ UDCNT
2747  5315            JMP UDARND
2750  5700            JMP I OCDEC

2751  7770  UDLOOP,   -10
27[illegible]  27[illegible]  UDA[illegible],  U[illegible]ONT
2753  0260  UDTWO,    260
2754  0000  UDCNT,    0
2755  0000  UDHIGH,   0
2756  0000  UDLOW,    0
2757  0000  UDHSUB,   0
2760  0000  UDLSUB,   0
2761  0000  UDBOX,    0
2762  0000  UDTEML,   0
2763  0000  UDGET,    0
2764  0000  UDPTR,    0
2765  3166  UDCONT,   3166     /POWERS OF TEN
2766  4600            4600
2767  7413            7413
2770  6700            6700
2771  7747            7747
2772  4540            4540
2773  7775            7775
2774  4360            4360
2775  7777            7777
2776  6030            6030
2777  7777            7777
3000  7634            7634
3001  7777            7777
3002  7766            7766
3003  7777            7777
3004  7777            7777

                      *1700
1700  0000  SETDSK,   0        /SET CONSTANT DISK REGISTERS
1701  1315            TAD C3000
1702  6517            MCR      /SELECT CONTROLLER 0
1703  7326            CLA SIL RIL      /2
1704  6517            MCR      /LOAD MODE
1705  7300            CLA CLL
1706  7333            7333     /6000
1707  6501            CBRH     /LOAD DRIVE
1710  7300            CLA CLL
1711  1075            TAD DRIVE
1712  6500            CBRL
1713  7300            CLA CLL
1714  5700            JMP I SETDSK
1715  3000  C3000,    3000
                      *2600
2600  0000  GETCR,    0
2601  6211            CDF1
2602  1070            TAD DTMP
2603  7500            SMA              /DATA IN 1ST HALF?
2604  5214            JMP SECN         /NO
2605  0230            AND C3777        /YES
2606  3070            DCA DTMP
```

```
2607  1470           TAD I DTMP
2610  7002           BSW
2611  0042           AND C77
2612  3072           DCA CHAR
2613  5226           JMP EXIT
2614  3070  SECN,    DCA DTMP
2615  1470           TAD I DTMP
2616  [illegible]
2617  3072           DCA CHAR
2620  1231           TAD C4000
2621  7421           MQL                 /SET UP NEG TRIGGER
2622  2070           ISZ DTMP
2623  1070           TAD DTMP
2624  7501           MQA
2625  3070           DCA DTMP
2626  6201  EXIT,    CDF0
2627  5600           JMP I GETCR
2630  3777  C3777,   3777
2631  4000  C4000,   4000

AG1     1406
AG2     1602
AG3     2223
APR2    1177
AUG1    1107
AUG2    1233
BLANK   2200
BLKCT   2241
CADDR   0351
CHAR    0072
CHR     1633
CM1     1522
CM107   0544
CM116   0537
CM123   0040
CM14    2240
CM15    5056
CM36    1441
CM4726  1414
CM50    1566
CM77    0542
COM     0350
COMEX   0353
COMM    2134
CTR     1415
CYL     2133
C1000   2130
C1400   2131
C16     2551
C17     2552
C177    2564
C200    2132
C2017   0543
C3000   1715
C3777   2630
C4      2237
C4000   2631
C4020   0041
C4726   1440
C5400   2127
C65     2566
C7      1520
C7600   2565
C77     0042
DATA    0444
DAY     2470
DAYLOC  2561
DAYLST  1025
DBLK    0073
DDBLK   1555
```

| | |
|---|---|
| DEC1 | 1143 |
| DEC2 | 1267 |
| DIG1 | 2427 |
| DIG2 | 2430 |
| DIG3 | 2431 |
| DIG4 | 2432 |
| DIV | 5055 |
| DIVCT | 5057 |
| DIVIDE | 5000 |
| DIVR | 2006 |
| DIVV | 2212 |
| DOEOF | 0530 |
| DONIT | 2234 |
| DOWD | 2540 |
| DRIVE | 0075 |
| DSK | 2000 |
| DSKOP | 2074 |
| DTMP | 0070 |
| DV2 | 5035 |
| DV3 | 5025 |
| DV4 | 5047 |
| D1 | 2520 |
| D2 | 2521 |
| END | 0063 |
| ENDIT | 0473 |
| ENDREC | 0525 |
| EXIT | 2626 |
| FEB2 | 1161 |
| FIRST | 2400 |
| FRI | 1311 |
| GETCR | 2600 |
| HALF | 0067 |
| HD | 2010 |
| HDIV | 5053 |
| HEAD | 2136 |
| HEADER | 2135 |
| HI | 2421 |
| INC | 2231 |
| INIT | 1430 |
| JAN2 | 1152 |
| JAN3 | 1276 |
| JUL1 | 1100 |
| JUL2 | 1224 |
| JUN2 | 1215 |
| LDIV | 5054 |
| LIM | 0540 |
| LINCT | 0076 |
| LINE | 0066 |
| LISTR | 1523 |
| [illegible] | [illegible] |
| LO | 2422 |
| LOC | 2562 |
| [illegible] | [illegible] |
| L1 | 2554 |
| L10 | 2555 |
| L2 | 0043 |
| L3 | 0044 |
| L5 | 0541 |
| MADCOM | 0346 |
| MAG | 0200 |
| MAGOP | 0330 |
| MAR2 | 1170 |
| MAY2 | 1206 |
| MCM12 | 0335 |
| MCM40 | 0344 |
| MC10 | 0345 |
| MC100 | 0341 |
| MC3543 | 0340 |
| MC6774 | 0336 |

| | |
|---|---|
| MC70 | 0343 |
| MC7000 | 0342 |
| MC7077 | 0337 |
| MEOF | 0273 |
| MOK | 0271 |
| MON | 1333 |
| MONLOC | 2560 |
| MONLST | 1000 |
| N | 0440 |
| NEXCOM | 0354 |
| NEXM | 0355 |
| NEXIM | 0356 |
| NOV1 | 1134 |
| NOV2 | 1260 |
| NX | 1507 |
| NXLET | 2542 |
| NXLN | 0514 |
| NXONE | 0406 |
| OCDEC | 2700 |
| OCT1 | 1125 |
| OCT2 | 1251 |
| OTPUT | 1550 |
| OUTBUF | 0064 |
| PAR | 0250 |
| PUTCR | 1610 |
| PUTIN | 2534 |
| PUTWD | 1600 |
| [illegible] | 1634 |
| RECCT | 0071 |
| REM | 2214 |
| RETRY | 0221 |
| REVCNT | 0347 |
| REWIND | 0302 |
| ROCT | 2563 |
| ROT | 2463 |
| SAT | 1305 |
| SEC | 0074 |
| SECHLF | 1624 |
| SEP1 | 1116 |
| SEP2 | 1242 |
| SETCOM | 0322 |
| SETDSK | 1700 |
| STL1 | 2556 |
| STL2 | 2557 |
| STORCT | 0536 |
| STORE | 0062 |
| STOUT | 0065 |
| SUN | 1337 |
| TERM | 1500 |
| THUR | 1315 |
| TRAN | 0503 |
| TUES | 1326 |
| UDADDR | 2752 |
| UDARND | 2715 |
| UDBOX | 2761 |
| UDCNT | 2754 |
| UDCONT | 2765 |
| UDDO | 2723 |
| UDGET | 2763 |
| UDHIGH | 2755 |
| UDHSUB | 2757 |
| UDLOOP | 2751 |
| UDLOW | 2756 |
| UDLSUB | 2760 |
| UDOUT | 2741 |
| UDPTR | 2764 |
| UDTEML | 2762 |
| UDTWO | 2753 |
| WED | 1322 |

```
WORD    0077
WRDCNT  0352
XBLANK  0056
XDIVID  0052
XDSK    1567
XFIRST  0053
XGETCR  0054
XINIT   0050
XLST    1517
XMAG    0046
XOCDEC  2553
XOTPUT  0045
XPUTCR  0060
XPUTWD  0055
XREAD   0057
XSTDSK  0545
XSTORE  0061
XTERM   0051
XZRO    0047
ZRO     1400

                MQA=7501
                MQL=7421
                FIXTAB
                        *20
                /ADDRESS TABLE: MX04 SORT
0020    7777    CM1,    -1
0021    0000    MCT,    0
0022    1377    C1377,  1377
0023    2777    C2777,  2777
0024    4377    C4377,  4377
0025    0000    BWD1,   0
0026    0000    BWD2,   0
0027    0000    BWD3,   0
0030    7766    CM12,   -12
0031    0000    FCT,    0
0032    0000    WC,     0
0033    0000    CA,     0
0034    5000    CM3000, -3000
0035    0000    AB1,    0
0036    0000    AB2,    0
0037    0000    AB3,    0
0040    4000    C4000,  4000
0041    0000    BR,     0
0042    7774    CM4,    -4
0043    0000    MWD,    0
0044    0000    AWD,    0
0045    0000    STLOC,  0
0046    6400    COUNT,  -1400
0047    6000    C6000,  6000
0050    5777    C5777,  5777
0051    0000    PCT,    0
0052    0400    C400,   400
0053    7410    CM370,  -370
0054    0000    TCT,    0
                        *100
0100    0400    XINPUT, 400
0101    0600    XOTPUT, 600
0102    0475    XEOF,   475

                        *170
0170    0000    ZRO,    0
0171    1400    C1400,  1400
0172    7300    STPGM,  CLA CLL         /STARTING LOCATION OF PROGRAM
0173    1171            TAD C1400
0174    3170            DCA ZRO
0175    3570    NXZ,    DCA I ZRO
0176    2170            ISZ ZRO
0177    5175            JMP NXZ
```

```
                    *200
0200  7300  ST,     CLA CLL
0201  1050          TAD C5777
0202  3043          DCA MWD
0203  1053          TAD CM370
0204  3054          DCA TCT
0205  7201  NXUNIT, CLA IAC          /SET MAG PRMS
0206  3037          DCA AB3
0207  2043          ISZ MWD
0210  1042          TAD CM4
0211  3051          DCA PCT
0212  1020  NXPASS, TAD CM1          /SET MAG FOR INITL READ
0213  3021          DCA MCT
0214  1022          TAD C1377        /SET FRM PRMS
0215  3025          DCA BWD1
0216  1023          TAD C2777
0217  3026          DCA BWD2
0220  1024          TAD C4377
0221  3027          DCA BWD3
0222  1037          TAD AB3
0223  7110          CLL RAR
0224  7430          SZL              /AT BEG
0225  7010          RAR              /YES
0226  3035          DCA AB1
0227  1035          TAD AB1
0230  7110          CLL RAR
0231  3036          DCA AB2
0232  1036          TAD AB2
0233  7110          CLL RAR
0234  3037          DCA AB3
0312  0000  READ,   0
0313  1044          TAD AWD          /RES REC COMPR POS FOR NXT REC
0314  1052          TAD C400
0315  3044          DCA AWD
0316  2021          ISZ MCT          /DONE W/BLK?
0317  5712          JMP I READ       /NO
0320  1043          TAD MWD          /YES-RESET PRMS & READ BLK
0321  3044          DCA AWD
0322  1042          TAD CM4
0323  3021          DCA MCT
0324  4500          JMS I XINPUT     /INPUT BLK
0325  5712          JMP I READ
0326  4501  PCHK,   JMS I XOTPUT     /EOF
0327  2051          ISZ PCT          /DONE 4 PASSES?
0330  5212          JMP NXPASS       /NO
0331  2054          ISZ TCT          /YES, DONE PGM?
0332  5205          JMP NXUNIT       /NO
0333  4502          JMS I XEOF       /YES
0334  7402          HLT
0335  1742  CKNWFR, TAD I CARTLC
0336  1343          TAD CM2
0337  7640          SZA CLA          /NEW CART?
0340  5712          JMP I READ       /NO
0341  5326          JMP PCHK         /YES
0342  6377  CARTLC, 6377
0343  7776  CM2,    -2
0344  7764  CM14,   -14
0402  3351          DCA REVCNT
0403  1337          TAD C1070
0404  3352          DCA REVERS
0405  1047  R2,     TAD C6000
0406  3353          DCA WRDCNT
0407  1050          TAD C5777
0410  3354          DCA CADDR
0411  1340          TAD C1200
0412  3355          DCA COM
0413  4021          JMS MAGOP
0414  4240          JMS STATCK
0415  5600          JMP I INPUT      /OK
```

```
0416  5357           JMP DEOF          /EOF
0417  5261           JMP PAR           /PARITY
0420  7402           HLT               /MT ERROR
0421  0000  MAGOP,   0
0422  1355           TAD COM
0423  6711           6711
0424  5223           JMP .-1
0425  6716           6716
0426  7300           CLA CLL
0427  1353           TAD WRDCNT
0430  3032           DCA WC
0431  1354           TAD CADDR
0432  3033           DCA CA
0433  6717           6717
0434  6722           6722
0435  6701           6701              /DONE?
0436  5235           JMP .-1           /NO
0437  5621           JMP I MAGOP
0440  0000  STATCK,  0
0441  7300           CLA CLL
0442  6706           6706
0443  3356           DCA STATUS
0444  1356           TAD STATUS
0445  0341           AND C6774
0446  7450           SNA
0447  5640           JMP I STATCK      /NO ERRORS
0450  2240           ISZ STATCK
0451  0342           AND C7677
0452  7450           SNA
0453  5640           JMP I STATCK      /EOF
0454  2240           ISZ STATCK
0455  0343           AND C3543
0456  7640           SZA CLA
0457  2240           ISZ STATCK        /BAD OR OFFLINE
0460  5640           JMP I STATCK
0461  2351  PAR,     ISZ REVCNT
0462  5264           JMP .+2           /RETRY
0463  7402           HLT               /RETRY FAILURE
0464  7240           CLA CMA
0465  3353           DCA WRDCNT
0466  1352           TAD REVERS
0467  3355           DCA COM
0470  4221           JMS MAGOP
0471  1240           TAD STATCK
0472  1030           TAD CM12
0473  3240           DCA STATCK
0474  5640           JMP I STATCK
0476  1344           [illegible]
0477  3355           DCA COM
0500  4221           JMS MAGOP
0501  1345           TAD C1010
0502  6716           6716
0503  6721           6721
0504  5303           JMP .-1
0505  6722           6722
0506  7300           CLA CLL
0507  1346           TAD C10
0510  6716           6716
0511  6721           6721
0512  5311           JMP .-1
0513  6722           6722
0514  7300           CLA CLL
0515  5675           JMP I EOF
0516  0000  WRITE,   0
0517  1030           TAD CM12
0520  3351           DCA REVCNT
0521  1347           TAD C70
0522  3352           DCA REVERS
0523  1045           TAD STLOC
```

```
0524  3354              DCA CADDR
0525  1046              TAD COUNT
0526  3353              DCA WRDCNT
0527  1350              TAD C40
0530  3355              DCA COM
0531  4221              JMS MAGOP
0532  4840              JMS STATCK
0533  5716              JMP I WRITE      /OD
0534  7402              HLT              /EOF
0535  5261              JMP PAR          /PARITY
0536  7402              HLT              /MT ERROR
0537  1070  C1070,      1070
0540  1220  C1220,      1220
0541  6774  C6774,      6774
0542  7677  C7677,      7677
0543  3543  C3543,      3543
0544  0050  C50,        50
0545  1010  C1010,      1010
0546  0010  C10,        10
0547  0070  C70,        70
0550  0240  C40,        240
0551  0000  REVCNT,     0
0552  0000  REVERS,     0
0553  0000  WRDCNT,     0
0554  0000  CADDR,      0
0555  0000  COM,        0
0556  0000  STATUS,     0
0557  1345  DEOF,       TAD C1010
0560  6716              6716
0561  6721              6721
0562  5361              JMP .-1
0563  6722              6722
0564  7300              CLA CLL
0565  6721              6721
0566  5365              JMP .-1
0567  2200              ISZ INPUT
0570  5600              JMP I INPUT
                        *600
0600  0000  OTPUT,      0
0601  1022              TAD C1377
0602  3045              DCA STLOC
0603  4613              JMS I XWRITE
0604  1023              TAD C2777
0605  3045              DCA STLOC
0606  4613              JMS I XWRITE
0607  1024              TAD C4377
0610  3045              DCA STLOC
0611  4613              JMS I XWRITE
0612  5600              JMP I OTPUT
0613  0516  XWRITE,     516


AB1     0035
AB2     0036
AB3     0037
AWD     0044
BB      0041
BWD1    0025
BWD2    0026
BWD3    0027
CA      0033
CADDR   0554
CARTLC  0342
CKNWFR  0335
CM1     0020
CM12    0030
CM14    0344
CM2     0343
```

```
CM3000 0034
CM370  0053
CM4    0042
COM    0555
COUNT  0046
C10    0546
C1010  0545
C1070  0537
C1220  0540
C1377  0022
C1400  0171
C2777  0023
C3543  0543
C40    0550
C400   0052
C4000  0040
C4377  0024
C50    0544
C5777  0050
C6000  0047
C6774  0541
C70    0547
C7677  0542
DEOF   0557
EOF    0475
FCT    0031
INPUT  0400
MAGOP  0421
MCT    0021
MWD    0043
NXFRWD 0235
NXPASS 0212
NXREAD 0253
NXUNIT 0205
NXZ    0175
OTPUT  0600
PAR    0461
PCHK   0326
PCT    0051
READ   0312
REVCNT 0551
REVERS 0552
R2     0405
ST     0200
STATCK 0440
STATUS 0556
STLOC  0045
STPGM  0172
TCT    0054
WC     0032
WRDCNT 0553
WRITE  0516
XEOF   0102
XINPUT 0100
XOTPUT 0101
XWRITE 0613
ZRO    0170
```

PROGRAM 7A - XM-EBR

```
                MQA=7501
                MQL=7421
                BSW=7002
                FIXTAB
                        *11
0011   0000     FRMBUF, 0
                        *32       /ADDRESS TABLE: EBR MX04 (EBR2)
```

```
0032  0000  WC,      0
0033  0000  CA,      0
0034  1000  C1000,   1000
0035  0000  INLOC,   0
0036  0000  BIT,     0
0037  4000  C4000,   4000
0040  2400  C2400,   2400
0041  0000  OUTLOC,  0
0042  7773  CM5,     -5
0043  0000  CT5,     0
0044  7764  CM14,    -14
0045  0000  CT12,    0
0046  2340  C2340,   2340
0047  2404  C2404,   2404
0050  7774  CM4,     -4
0051  0000  CT4,     0
0052  0000  FRAME,   0
0053  0007  C7,      7
0054  0360  C360,    360
0055  0722  A,       722
0056  0727  B,       727
0057  0734  C,       734
0060  0741  D,       741
0061  7731  CM50,    -47
0062  0000  ECT,     0
0063  0700  EST,     700
0064  0000  EGET,    0
0065  0221  C221,    221
0066  0100  C100,    100
0067  0340  C340,    340
0070  7634  CM144,   -144
0071  0173  C173,    173
0072  0000  BCT,     0
0073  0000  CTS,     0
0074  0120  C120,    120
0075  0201  C201,    201
                     *100
0100  0400  XREAD,   400
0101  0515  XWRITE,  515
0102  0600  XFRADV,  600

                     *200
0200  7300  ST1,     CLA CLL
0201  4500           JMS I XREAD      /INPUT MX4 RECORD & SET PRMS
0202  1034           TAD C1000
0203  3035           DCA INLOC
0204  1037           TAD C4000
0205  3036           DCA BIT
0206  1040           TAD C2400
0207  3041           DCA OUTLOC
0210  4252           JMS EXTHED       /OUTPUT INDEX MARKS
0211  4334           JMS DO100        /OUTPUT 100 BRAME BITS
0212  4327           JMS RM           /OUTPUT RECORD MARK
0213  1047           TAD C2404
0214  3230           DCA WCT          /SET 1ST REC CNT = 1264 CHRS
0215  1042           TAD CM5
0216  3043           DCA CT5
0217  7201           CLA IAC
0220  1044  ST2,     TAD CM14
0221  3045           DCA CT12
0222  4314  ST3,     JMS HED          /OUTPUT NORMAL HEADER
0223  4334           JMS DO100
0224  4327           JMS RM
0225  2045           ISZ CT12         /DONE 1200 FRAMES?
0226  5222           JMP ST3          /NO
0227  4501           JMS I XWRITE     /YES - WRITE OUTPUT BLK
0230  0000  WCT,     0                /WORD COUNT FOR BLK
0231  1046           TAD C2340
0232  3230           DCA WCT          /RESET WRD CNT FOR REST
0233  1040           TAD C2400
```

```
0234  3041           DCA OUTLOC      /RESET OUTPUT START
0235  2043           ISZ CT5         /OUTPUT 5 BLKS? (6000 FRAMES)
0236  5220           JMP ST2         /NO
0237  1050           TAD CM4         /YES, LAST BLK = 400 FRAMES
0240  3051           DCA CT4
0241  4314  ST4,     JMS HED
0242  4334           JMS DO100
0243  4327           JMS RM
0244  2051           ISZ CT4         /DONE 400 FRAMES?
0245  5241           JMP ST4         /NO
0246  4501           JMS I XWRITE    /YES
0247  0640           640             /WRD CNT FOR LAST BLK
0250  4502           JMS I XFRADV    /ADVANCE FILM
0251  5200           JMP ST1         /REPEAT FOR ALL RECORDS
0252  0000  EXTHED,  0
0253  2052           ISZ FRAME
0254  1052           TAD FRAME
0255  7106           CLL RTL
0256  7006           RTL
0257  4310           JMS DIGIT
0260  3455           DCA I A
0261  1052           TAD FRAME
0262  7002           BSW
0263  4310           JMS DIGIT
0264  3456           DCA I B
0265  1052           TAD FRAME
0266  7112           CLL RTR
0267  7010           RAR
0270  4310           JMS DIGIT
0271  3457           DCA I C
0272  1052           TAD FRAME
0273  4310           JMS DIGIT
0274  3460           DCA I D         /PROCESS FILM NUMBER
0275  1061           TAD CM50
0276  3062           DCA ECT
0277  1063           TAD EST
0300  3064           DCA EGET
0301  1464  NXE,     TAD I EGET
0302  2064           ISZ EGET
0303  3441           DCA I OUTLOC
0304  2041           ISZ OUTLOC
0305  2062           ISZ ECT         /DONE W/EXT HEADER?
0306  5301           JMP NXE         /NO
0307  5652           JMP I EXTHED    /YES
0310  0000  DIGIT,   0
0311  0053           AND C7
0312  1054           TAD C360
0313  5710           JMP I DIGIT
0314  0000  HED,     0
0315  1065           TAD C221
0316  3441           DCA I OUTLOC
0317  2041           ISZ OUTLOC
0320  1066           TAD C100
0321  3441           DCA I OUTLOC
0322  2041           ISZ OUTLOC
0323  1360           TAD C363
0324  3441           DCA I OUTLOC
0325  2041           ISZ OUTLOC
0326  5714           JMP I HED
0327  0000  RM,      0
0330  1067           TAD C340
0331  3441           DCA I OUTLOC
0332  2041           ISZ OUTLOC
0333  5727           JMP I RM
0334  0000  DO100,   0
0335  1070           TAD CM144
0336  3072           DCA BCT         /SET COUNT FOR 100 BITS
0337  1435  DO1,     TAD I INLOC
0340  0036           AND BIT
```

```
0341  7640            SZA CLA         /FRAME BIT PRESENT?
0342  1071            TAD C173        /YES- REP BY ARROW HEAD
0343  1066            TAD C100        /NO - REP BY SPACE
0344  3441            DCA I OUTLOC
0345  2041            ISZ OUTLOC
0346  1036            TAD BIT
0347  7110            CLL RAR
0350  7420            SNL             /OVERFLOW?
0351  5354            JMP.+3
0352  2035            ISZ INLOC       /YES
0353  7330            7330            /SET AC=4000
0354  3036            DCA BIT
0355  2072            ISZ BCT         /DONE 100 FRM BITS?
0356  5337            JMP DO1         /NO
0357  5734            JMP I DO100     /YES
0360  0363  C363,     363
                      *400
0400  0000  INPUT,    0
0401  1362            TAD CM12
0402  3354            DCA REVCNT
0403  1342            TAD C1070
0404  3355            DCA REVERS
0405  1364  R2,       TAD CM1400
0406  3356            DCA WRDCNT
0407  1363            TAD C777
0410  3357            DCA CADDR
0411  1343            TAD C1220
0412  3360            DCA COM
0413  4221            JMS MAGOP
0414  4240            JMS STATCK
0415  5600            JMP I INPUT     /OK
0416  5275            JMP DEOF        /EOF
0417  5261            JMP PAR         /PARITY
0420  7402            HLT             /MT ERROR
0421  0000  MAGOP,    0
0422  1360            TAD COM
0423  6711            6711
0424  5223            JMP .-1
0425  6716            6716
0426  7300            CLA CLL
0427  1356            TAD WRDCNT
0430  3032            DCA WC
0431  1357            TAD CADDR
0432  3033            DCA CA
0433  6717            6717
0434  6722            6722
0435  6701            6701            /DONE?
0436  5235            JMP .-1         /NO
0437  5621            JMP I MAGOP
0440  0000  STATCK,   0
0441  7300            CLA CLL
0442  6706            6706
0443  3361            DCA STATUS
0444  1361            TAD STATUS
0445  0344            AND C6774
0446  7450            SNA
0447  5640            JMP I STATCK    /NO ERRORS
0450  2240            ISZ STATCK
0451  0345            AND C7677
0452  7450            SNA
0453  5640            JMP I STATCK    /EOF
0454  2240            ISZ STATCK
0455  0346            AND C3543
0456  7640            SZA CLA
0457  2240            ISZ STATCK      /BAD OR OFFLINE
0460  5640            JMP I STATCK
0461  2354  PAR,      ISZ REVCNT
0462  5264            JMP .+2         /RETRY
0463  7402            HLT             /RETRY FAILURE
```

```
0464  7240           CLA CMA
0465  3356           DCA WRDCNT
0466  1355           TAD REVERS
0467  3360           DCA COM
0470  4221           JMS MAGOP
0471  1240           TAD STATCK
0472  1362           TAD CM12
0473  3240           DCA STATCK
0474  5640           JMP I STATCK
0475  1347  DEOF,    TAD C50
0476  3360           DCA COM
0477  4221           JMS MAGOP
0500  1350           TAD C1010
0501  6716           6716
0502  6721           6721
0503  5302           JMP .-1
0504  6722           6722
0505  7300           CLA CLL
0506  1351           TAD C10
0507  6716           6716
0510  6721           6721
0511  5310           JMP .-1
0512  6722           6722
0513  7300           CLA CLL
0514  7402           HLT
0515  0000  WRITE,   0
0516  1715           TAD I WRITE
0517  2315           ISZ WRITE
0520  7041           CIA
0521  3366           DCA COUNT
0522  1362           TAD CM12
0523  3354           DCA REVCNT
0524  1352           TAD C70
0525  3355           DCA REVERS
0526  1365           TAD STLOC
0527  3357           DCA CADDR
0530  1366           TAD COUNT
0531  3356           DCA WRDCNT
0532  1353           TAD C40
0533  3360           DCA COM
0534  4221           JMS MAGOP
0535  4240           JMS STATCK
0536  5715           JMP I WRITE      /OD
0537  7402           HLT              /EOF
0540  5261           JMP PAR          /PARITY
0541  7402           HLT              /MT ERROR
0542  1070  C1070,   1070
0543  1220  C1220,   1220
0544  6774  C6774,   6774
0545  7677  C7677,   7677
0546  3543  C3543,   3543
0547  4050  C50,     4050
0550  1010  C1010,   1010
0551  4010  C10,     4010
0552  4070  C70,     4070
0553  4040  C40,     4040
0554  0000  REVCNT,  0
0555  0000  REVERS,  0
0556  0000  WRDCNT,  0
0557  0000  CADDR,   0
0560  0000  COM,     0
0561  0000  STATUS,  0
0562  7766  CM12,    -12
0563  0777  C777,    777
0564  6400  CM1400,  -1400
0565  2377  STLOC,   2377
0566  0000  COUNT,   0
```

```
                        *700    /EXTENDED HEADER BUFFER
0700  0221  221
0701  0362  362         /101H-63V
0702  0362  362
0703  0326  326         /INDEX MARK
0704  0340  340
0705  0221  221
0706  0361  361         /000H-63V
0707  0362  362
0710  0326  326         /INDEX MARK
0711  0340  340
0712  0221  221
0713  0362  362         /101H-00V
0714  0361  361
0715  0326  326         /INDEX MARK
0716  0340  340
0717  0221  221
0720  0362  362         /101H-01V
0721  0100  100
0722  0000  0           /1ST FRM DIGIT
0723  0340  340
0724  0221  221
0725  0362  362         /101H-02V
0726  0100  100
0727  0000  0           /2ND FRM DIGIT
0730  0340  340
0731  0221  221
0732  0362  362         /101H-03V
0733  0100  100
0734  0000  0           /3RD FRM DIGIT
0735  0340  340
0736  0221  221
0737  0362  362         /101H-04V
0740  0100  100
0741  0000  0           /4TH FRM DIGIT
0742  0340  340
0743  0221  221
0744  0361  361         /000H-00V
0745  0361  361
0746  0326  326         /INDEX MARK
            /DATA CONTINUES HERE

                        *600
0600  0000  FRADV,      0
0601  1224              TAD STFRM
0602  3011              DCA FRMBUF
0603  1061              TAD CM50
0604  3073              DCA CTS
0605  1075              TAD C201
0606  3411              DCA I FRMBUF
0607  1066              TAD C100
0610  3411              DCA I FRMBUF
0611  1074              TAD C120
0612  3411              DCA I FRMBUF
0613  1066  SP1,        TAD C100
0614  3411              DCA I FRMBUF
0615  2073              ISZ CTS         /DONE W/SPACES?
0616  5213              JMP SP1         /NO
0617  1067              TAD C340
0620  3411              DCA I FRMBUF
0621  4501              JMS I XWRITE
0622  0053              53
0623  5600              JMP I FRADV
0624  2377  STFRM,      2377

A     0055
B     0056
BCT   0072
BIT   0036
C     0057
```

| | |
|---|---|
| CA | 0033 |
| CADDR | 0557 |
| CM12 | 0562 |
| CM14 | 0044 |
| CM1400 | 0564 |
| CM144 | 0070 |
| CM4 | 0050 |
| CM5 | 0042 |
| CM50 | 0061 |
| COM | 0560 |
| COUNT | 0566 |
| CTS | 0073 |
| CT12 | 0045 |
| CT4 | 0051 |
| CT5 | 0043 |
| C10 | 0551 |
| C100 | 0066 |
| C1000 | 0034 |
| C1010 | 0550 |
| C1070 | 0542 |
| C120 | 0074 |
| C1220 | 0543 |
| C173 | 0071 |
| C201 | 0075 |
| C221 | 0065 |
| C2340 | 0046 |
| C2400 | 0040 |
| C2404 | 0047 |
| C340 | 0067 |
| C3543 | 0546 |
| C360 | 0054 |
| C363 | 0360 |
| C40 | 0553 |
| C4000 | 0037 |
| C50 | 0547 |
| C6774 | 0544 |
| C7 | 0053 |
| C70 | 0552 |
| C7677 | 0545 |
| C777 | 0563 |
| D | 0060 |
| DEOF | 0475 |
| DIGIT | 0310 |
| DO1 | 0337 |
| DO100 | 0334 |
| ECT | 0062 |
| EGET | 0064 |
| EST | 0063 |
| EXTHED | 0252 |
| FRADV | 0600 |
| FRAME | 0052 |
| FRMBUF | 0011 |
| HED | 0314 |
| INLOC | 0035 |
| INPUT | 0400 |
| MAGOP | 0421 |
| NXE | 0301 |
| OUTLOC | 0041 |
| PAR | 0461 |
| REVCNT | 0554 |
| REVERS | 0555 |
| RM | 0327 |
| R2 | 0405 |
| SP1 | 0613 |
| STATCK | 0440 |
| STATUS | 0561 |
| STFRM | 0624 |
| STLOC | 0565 |
| ST1 | 0200 |
| ST2 | 0220 |

```
ST3     0222
ST4     0241
WC      0032
WCT     0230
WRDCNT  0556
WRITE   0515
XFRADV  0102
XREAD   0100
XWRITE  0101
```

PROGRAM 8 - RETRIEVAL

```
                BSW=7002
                MQL=7421
                MQA=7501
                SWP=7521
                CDF0=6201
                CDF1=6211
                CDF2=6221
                DMCR=6517
                DCBRH=6501
                DCBRL=6500
                DSSRH=6503
                DSSRL=6502
                DESR0=6511
                DESR1=6515
                DWCR=6516
                DDMAR=6514
                DCSR=6512
                DAIRL=6504
                DAIRH=6505
                DUSRL=6506
                DUSRH=6507
                GTF=6004
                RTF=6005
                RMF=6244
                RIB=6234
                SRQ=6003

                FIXTAB

                /ADDRESS TABLE: XM DEMO 2

                          *7
0007  0000      DRIVER,   0

                /DISSLY PROGRAM LABEL
                          *0
0000  0304                304;
0001  0311      311;
0002  0323      323;
0003  0323      323;
0004  0314      314;
0005  0331      331;
0006  0330      330;
0007  0315      315

                          *10
0010  0000      R10,      0
0011  0000      R11,      0
0012  0000      R12,      0
0013  0000      R13,      0
0014  0000      R14,      0
0015  0000      R15,      0
0016  0000      R16,      0
0017  0000      R17,      0
```

```
0020   0000   XMMON,    0            /CURRENT MONTH
0021   0000   XMHIT,    0            /CURRENT HIT
0022   0000   XMLOC,    0            /CURRENT HIT LOC
0023   0000   XMBIT,    0            /CURRENT HIT BIT
0024   0000   XMSTRT,   0            /START OF XM BUFFER
0025   0000   DIG1,     0            /READ CURSOR DIGITS
0026   0000   DIG2,     0
0027   0000   DIG3,     0
0030   0000   DIG4,     0

0031   0000   HITCNT,   0
0032   0000   CPNCNT,   0
0033   0000   WRDBUF,   0
0034   0000   SCHCNT,   0
0035   7525   QRYNUM,   -253
0036   3052   WC,       3052
0037   3052   CA,       -4726
0040   0000   DSEC,     0

0041   5070   QB,       CHR38        /LOC OF WORD STORAGE
0042   5000   MTOTS,    TOTSM        /LOC OF MONTHLY TOTALS
0043   5014   MBEGS,    BEGSM        /LOC OF MONTH START LOCS
0044   5030   MLOCS,    LOCSM        /LOC OF # LOCS IN MONTHS

0045   0205   XPRINT,   PRINT
0046   0222   XKYBD,    KYBD
0047   1400   XDIVID,   DIVIDE
0050   2215   XDISK,    DISK
0051   0333   XERR,     ST4
0052   0203   XNXCOM,   ST3

0053   7526   CM252,    -252
0054   7563   CM215,    -215
0055   7776   CM2,      -2
0056   0377   C377,     377
0057   6000   C6000,    6000

              PAGE

              /MAINLIINE:     XM DEMO 2

0200   7300   ST1,      CLA CLL
0201   4205   ST2,      JMS PRINT           /OUTPUT FORM
0202   5112             FORM
0203   4245   ST3,      JMS COMD            /WAIT FOR REQUEST
0204   5723             JMP I L7000         /ABORT (*)

0205   0000   PRINT,    0
0206   7240             CLA CMA
0207   1605             TAD I PRINT
0210   2205             ISZ PRINT
0211   3011             DCA R11
0212   1411   NXPR,     TAD I R11
0213   7450             SNA                 /END?
0214   5605             JMP I PRINT         /YES
0215   6346             6346                /PRINT CHAR
0216   6341             6341                /WAIT TILL DONE
0217   5216             JMP .-1
0220   7300             CLA CLL
0221   5212             JMP NXPR
0222   0000   KYBD,     0
0223   6331             6331
0224   5223             JMP .-1             /WAIT FOR DEYBOARD FLG
0225   6336             6336
0226   7421             MQL                 /GET CHAR & STORE IN MQ
0227   5622             JMP I KYBD

0230   0000   GETDIG,   0
0231   4222             JMS KYBD
0232   7501             MQA
```

```
0233  1053            TAD CM252
0234  7650            SNA CLA         /ABORT?
0235  5645            JMP I COMD      /YES
0236  7501            MQA
0237  1054            TAD CM215
0240  7650            SNA CLA         /CARRIAGE RETURN?
0241  5246            JMP COMD+1      /YEES - ERROR
0242  7501            MQA
0243  0324            AND C17
0244  5630            JMP I GETDIG    /EXIIT WITH MASKKD DIGIT

0245  0000  COMD,     0
0246  6030            6030            /CLEAR KYBD FLAG
0247  4230            JMS GETDIG
0250  3025            DCA DIG1
0251  4230            JMS GETDIG
0252  3026            DCA DIG2
0253  4230            JMS GETDIG
0254  3027            DCA DIG3
0255  4230            JMS GETDIG
0256  3030            DCA DIG4
0257  4222            JMS KYBD
0260  7501            MQA
0261  1054            TAD CM215
0262  7640            SZA CLA         /CARRIAGE RETURN?
0263  5246            JMP COMD+1      /NO - ERROE
0264  1025            TAD DIG1
0265  7640            SZA CLA         /CURSOR AT 0XXX?
0266  5246            JMP COMD+1      /NO - ERROR
0267  1026            TAD DIG2
0270  7640            SZA CLA         /CURSOR AT 00XX?
0271  5277            JMP CNX1        /NO
0272  1027            TAD DIG3
0273  1030            TAD DIG4
0274  7640            SZA CLA         /CURSOR AT 0000?
0275  5246            JMP COMD+1      /NO - ERROR
0276  5730            JMP I XSERCH

0277  1026  CNX1,     TAD DIG2
0300  1325            TAD CM10
0301  7640            SZA CLA         /CURSOR AT 08XX?
0302  5246            JMP COMD+1      /NO - ERROR
0303  1030            TAD DIG4
0304  1326            TAD CM11
0305  7650            SNA CLA         /CURSOR AT 08X9?
0306  5316            JMP CNX2        /YES
0307  1030            TAD DIG4
0310  1327            TAD CM4
0311  7640            SZA CLA         /CURSOR AT 08X4?
0312  5246            JMP COMD+1      /NO - ERROR
0313  1027            TAD DIG3
0314  7650            SNA CLA         /CURSOR AT 0804?
0315  5731            JMP I XMORE     /YES
0316  1027  CNX2,     TAD DIG3
0317  [illegible]     [illegible]
0320  7710            SPA CLA         /082X <= Z <= 087X ?
0321  5246            JMP COMD+1      /NO - ERROR
0322  5732            JMP I XNEW

0323  7000  L7000,    7000
0324  0017  C17,      17
0325  7770  CM10,     -10
0326  7767  CM11,     -11
0327  7774  CM4,      -4
0330  1000  XSERCH,   SERCH
0331  0544  XMORE,    MORE
0332  0400  XNEW,     NEW

0333  4205  ST4,      JMS PRINT       /ERROR PRINT RETURN
0334  6227            PERR
```

```
0335  5203              JMP ST3

                PAGE

0400  1030   NEW,      TAD DIG4
0401  0335             AND C1
0402  3333             DCA NTMP
0403  1027             TAD DIG3
0404  1055             TAD CM2
0405  7104             CLL RAL
0406  1333             TAD NTMP
0407  3334             DCA NMON          /NEWLY SELECTED MONTH
0410  1337             TAD CM3
0411  3031             DCA HITCNT
0412  3732             DCA I HITEND
0413  1334             TAD NMON
0414  3020   NEW2,     DCA XMMON
0415  1043             TAD MBEGS
0416  1020             TAD XMMON
0417  3333             DCA NTMP
0420  7240             CLA CMA
0421  1733             TAD I NTMP
0422  3022             DCA XMLOC         /SET XMLOC TO BEG OF MONTH'S HITS
0423  7324             CLA CLL CML RAL
0424  3023             DCA XMBIT         /SET TO BIT 11
0425  1330   NEW33,    TAD CCM3074
0426  1022             TAD XMLOC
0427  3333             DCA NTMP
0430  1331             TAD CM4704
0431  1333             TAD NTMP
0432  3333   NEW3,     DCA NTMP
0433  1020             TAD XMMON
0434  1340             TAD CM6
0435  7710             SPA CLA           /SECOND SECTOR?
0436  1341             TAD C1400         /YES
0437  3040             DCA DSEC
0440  7201             CLA IAC
0441  1040             TAD DSEC
0442  3250             DCA SECHED
0443  4445             JMS I XPRINT      /INDICATE SEARCHING
0444  6174             PRINTA
0445  4450             JMS I XDISK       /GET RESULTANT
0446  0100             100               /DRIVE 0 [illegible]
0447  0000             0                 /CYL 0
0450  0000   SECHED,   0                 /HEAD
0451  3400             3400              /READ
0452  7240             CLA CMA
0453  1022             TAD XMLOC
0454  3016             DCA R16
0455  1023             TAD XMBIT
0456  7421             MQL
0457  6211             CDF1
0460  1416             TAD I R16
0461  6201             CDF0
0462  3336             DCA GHIT
0463  5307             JMP GNX5          /PROCESS NEXT BIT

0464  6211   FLDY,     CDF1              /RESULTANT IN MB1
0465  1416             TAD I R16
0466  7440             SZA               /HIT?
0467  5300             JMP GNX1          /YES
0470  2333   FLDY2,    ISZ NTMP          /DONE?
0471  5265             JMP FLDY+1        /NO
0472  6201             CDF0
0473  1040             TAD DSEC
0474  7640             SZA CLA           /SEC HLF?
0475  5325             JMP ENDHLF        /YES
0476  1327             TAD CCC5
0477  5214             JMP NEW2
```

```
0500  3336  GNX1,   DCA GHIT
0501  7330          CLL CLA CML RAR /SET TO BIT 0
0502  7421  GNX3,   MQL
0503  7501          MQA
0504  0336          AND GHIT
0505  7640          SZA CLA           /THIS BIT?
0506  5315          JMP GNX4          /YES
0507  7501  GNX5,   MQA
0510  7110          CLL RAR
0511  7420          SNL               /ALL BITS DONE?
0512  5302          JMP GNX3          /NO
0513  6211          CDF1
0514  5270          JMP FLDY2

0515  6201  GNX4,   CDF0
0516  1031          TAD HITCNT
0517  7001          IAC
0520  3031          DCA HITCNT
0521  4743          JMS I XDOHIT      / R16(HIT)        MQ(BIT) HITCNT (=HIT NO.
0522  1031          TAD HITCNT
0523  7640          SZA CLA           /ALL HITS DONE?
0524  5307          JMP GNX5          /NO
0525  4742  ENDHLF, JMS I XHITS
0526  5452          JMP I XNXCOM

0527  0005  CCC5,   5
0530  4704  CCM3074,        -3074
0531  3074  CM4704, -4704
0532  5100  HITEND, DSKHIT
0533  0000  NTMP,   0
0534  0000  NMON,   0
0535  0001  C1,     1
0536  0000  GHIT,   0
0537  7775  CM3,    -3
      777   CM6,    -6
0541  1400  C1400,  1400
0542  5200  XHITS,  HITS
0543  0600  XDOHIT, DOHIT

0544  1337  MORE,   TAD CM3
0545  3031          DCA HITCNT
0546  3732          DCA I HITEND
0547  5225          JMP NEW33

            PAGE

            /XDOHIT:        PROCESSES THE LOC(R16) AND BIT(MQ)
            /       INTO THE PROPER CYLINDER-HEAD
            /       NUMBERS AND STORES THEM IN
            /       THE HIT BUFFER
            /CALL:  JMS I XDOHIT
            /       (CIA OF HIT #) + 1
            /METHOD:        POS(0-2518) = R16 - 1578:        MQ(0-11)
            /       POS/5=A+B
            /       (12B+MQ)/30=C+REC
            /       2A+C=BLOCK
            /       BLOCK/20=CYL#+HED#

0600  0000  DOHIT,  0
0601  7305          CLA CLL IAC RAL
0602  1031          TAD HITCNT        /HIT NO. (0,1,2)
0603  1300          TAD LDBUF2
0604  3303          DCA DBUF2         /LOC OF REC#
0605  7305          CLA CLL IAC RAL
0606  1031          TAD HITCNT
0607  7104          CLL RAL /2(HIT#)
0610  1301          TAD LDBUF1
0611  3302          DCA DBUF1         /LOC OF CYL #
0612  1016          TAD R16
0613  3022          DCA XMLOC
```

```
0614  7501            MQA
0615  3023            DCA XMBIT          /STORE CURRENT HIT LOC & BIT
0616  3250            DCA HTMP2
0617  7501            MQA
0620  7104            CLL RAL
0621  7430            SZL
0622  5225            JMP .+3
0623  2250            ISZ HTMP2          /TRANSLATE BIT TO DIGITAL FORM
[illegible]  5220     JMP .-4
[illegible]  1016     TAD R16
0626  1305            TAD CM3074
0627  3231            DCA HTMP1          /POSITION(0-2518)
0630  4447            JMS I XDIVIDE      /POS/5
0631  0000  HTMP1,    0
0632  0005            5
0633  0000  HTMP3,    0         /REMAINDER(B)
0634  7004            RAL
0635  3261            DCA HTMP4          / 2 X QUOTIENT
[illegible]  [illegible]  TAD HTMP3
0637  7106            CLL RTL
0640  7004            RAL
0641  3231            DCA HTMP1
0642  1233            TAD HTMP3
0643  7106            CLL RTL
0644  1231            TAD HTMP1          /12B
0645  1250            TAD HTMP2          /+MQ
0646  3250            DCA HTMP2
0647  4447            JMS I XDIVID       /(12B+MQ)/30
0650  0000  HTMP2,    0
0651  0036            36
0652  0000  DREC,     0         /REMAINDER (REC#)
0653  1261            TAD HTMP4          /QUOTIENT(C)
0654  1304            TAD C50
0655  3257            DCA BLOCK          /C+A=BLOCK
0656  4447            JMS I XDIVID       /BLOCK/20
0657  0000  BLOCK,    0
0660  0024            24
0661  0000  HTMP4,    0         /REMAINDER(HED#)
0662  3702            DCA I DBUF1        /STORE CYL# IN HIT BUF
0663  2302            ISZ DBUF1
0664  1261            TAD HTMP4
0665  1040            TAD DSEC
0666  3702            DCA I DBUF1
0667  2302            ISZ DBUF1
0670  3702            DCA I DBUF1        /ENTER TRAILING ZERO
0671  1252            TAD DREC
0672  3703            DCA I DBUF2        /ENTER RECORD#
0673  1023            TAD XMBIT
0674  7421            MQL                /RESTORE BIT TO MQ
0675  2021            ISZ XMHIT          /INDICATE CURRENT HIT
0676  7000            NOP                /SAFETY FEATURE ON 4096 HITS
0677  5600            JMP I DOHIT

0700  5107  LDBUF2,   DSKHIT+7
0701  5100  LDBUF1,   DSKHIT
0702  0000  DBUF1,    0
0703  0000  DBUF2,    0
0704  0050  C50,      50
0705  4704  CM3074,   -3074

            PAGE

            /QYXM   ASCII-MX-XM TRANSLATION

1000  1056  SERCH,    TAD C377
1001  3016            DCA R16
1002  1035            TAD QRYNUM
1003  3347            DCA QRYCNT
1004  4445            JMS I XPRINT       /STRT XMIT
```

```
1005  6174            PRINTA
1006  4445            JMS I XPRINT
1007  6223            PRINTB
1010  4446  NXCR,     JMS I XKYBD      /GET CHAR
1011  7501            MQA
1012  1053            TAD CM252
1013  7650            SNA CLA          /ABORT?
1014  5451            JMP I XERR       /YES
1015  7501            MQA
1016  6221            CDF2
1017  3416            DCA I R16
1020  6201            CDF0
1021  2347            ISZ QRYCNT
1022  5210            JMP NXCR
1023  4445            JMS I XPRINT
1024  6225            XOFF     /STOP TRANSMISSION
1025  4446            JMS I XKYBD
1026  4446            JMS I XKYBD
1027  1350            TAD C635
1030  3016            DCA R16
1031  4733            JMS I XQSPCI     /DO SPECIALS FIRST
1032  4756            JMS I XZRO       /ZERO MX BUF
1033  1332            TAD C404
1034  3016            DCA R16
1035  6221            CDF2
1036  3751            DCA I C636       /TERMINATE BUFFER
1037  3032  QNXWD,    DCA CPWCNT       /CHAR/WD COUNT
1040  3334            DCA UCTRIG       /UPPER CASE TRIGGER
1041  1041            TAD QB
1042  3033            DCA WRDBUF
1043  6221  QNXCR,    CDF2
1044  1416            TAD I R16        /ASCII CHAR
1045  6201            CDF0
1046  7450            SNA     /END OF BUFFER?
1047  5326            JMP QEND         /YES
1050  1335            TAD QCM260       /FILTER CHAR
1051  7510            SPA
1052  5272            JMP QSEP         /CHAR<260
1053  1336            TAD QCM12
1054  7510            SPA
1055  5275            JMP QNUM         /260 <=X<= 272
1056  1337            TAD QCM7
1057  7510            SPA
1060  5272            JMP QSEP
1061  1340            TAD QCM32
1062  7510            SPA
1063  5320            JMP QUCA         /301 <= X <= 332
1064  1341            TAD QCM6
1065  7510            SPA
1066  5272            JMP QSEP
1067  1340            TAD QCM32
1070  7510            SPA
1071  5312            JMP QLCA         /341 <= X <= 372
1072  7300  QSEP,     CLA CLL
1073  4745            JMS I XDOWRD
1074  5237            JMP QNXWD
1075  1342  QNUM,     TAD QC12
1076  7106            CLL RTL
1077  1343            TAD QC320
1100  7421            MQL
1101  1032  [illegible] TAD CPWCNT
1102  1344            TAD QCM10
1103  7700            SMA CLA /GREATER THAN 8TH CHAR?
1104  5310            JMP QCRCNT       /YES-DO NOT STORE
1105  7501            MQA
1106  3433            DCA I WRDBUF     /STORE
1107  2033            ISZ WRDBUF
1110  2032  QCRCNT,   ISZ CPWCNT       /COUNT # OF CHARS IN WORD
1111  5243            JMP QNXCR
```

```
1112  1352  QLCA,    TAD QC32
1113  7106           CLL RTL
1114  1353           TAD QC150
1115  1334           TAD UCTRIG      /ADD UC TO CHAR IF NEEDED
1116  7421           MQL
1117  5301           JMP QRTN
1120  1352  QUCA,    TAD QC32
1121  7106           CLL RTL
1122  7421           MQL
1123  1354           TAD QCM150
1124  3334           DCA UCTRIG      /SET WORD TO UC
1125  5301           JMP QRTN

1126  4745  QEND,    JMS I XDOWRD
1127  4755           JMS I XORDER     /PUTS MX-XM ORDERLY
1130  4746           JMS I XHITX
1131  5452           JMP I XNXCOM

1132  0404  C404,    404
1133  1256  XQSPC1,  QSPC1
1134  0000  UCTRIG,  0
1135  7520  QCM260,  -260
1136  7766  QCM12,   -12
1137  7771  QCM7,    -7
1140  7746  QCM32,   -32
1141  7772  QCM6,    -6
1142  0012  QC12,    12
1143  0320  QC320,   320
1144  7770  QCM10,   -10
1145  1200  XDOWRD,  QDOWRD
1146  3200  XHITX,   HITS
1147  0000  QRYCNT,  0
1150  0635  C635,    635
1151  0636  C636,    636
1152  0032  QC32,    32
1153  0150  QC150,   150
1154  7630  QCM150,  -150
1155  2000  XORDER,  QORDER
1156  1460  XZRO,    ZMX

            PAGE

            /XDOWRD:          PUTS WORD INTO MX

1200  0000  QDOWRD,  0         /PUTS WORD INTO MX
1201  1032           TAD CPWCNT
1202  7650           SNA CLA /ANY CHARS IN WORD?
1203  5600           JMP I QDOWRD     /NO
1204  1041           TAD QB
1205  3033           DCA WRDBUF
1206  4651           JMS I XGTCNT     /PROCESSES BIT(MQ) & OFFSET(AC)
1207  7420           SNL      /& COUNT(L): < 8?
1210  5217           JMP Q7   /YES
1211  [illegible]    [illegible] QPUT   /[illegible]
1212  1252           TAD QC7 /SET UP PIMS FOR REST
1213  3032           DCA CPWCNT
1214  1253           TAD QC200
1215  7421           MQL
1216  7305           7305
1217  3254  Q7,      DCA WORD
1220  1032           TAD CPWCNT
1221  7041           CIA
1222  3032           DCA CPWCNT       /USE AS COUNTER
1223  1254  QNX,     TAD WORD
1224  4237           JMS QPUT         /ENTTER CHAR IINTO MX
1225  7501           MQA      /GET BIT MASK
1226  7110           CLL RAR
1227  7420           SNL      /OVERFLOW?
1230  5233           JMP .+3 /NO
```

```
1231 2254             ISZ WORD        /INCREASE OFFSET; SET BIT
1232 7010             RAR
1233 7421             MQL
1234 2032             ISZ CPWCNT      /DONE?
1235 5223             JMP QNX /NO
1236 5600             JMP I QDOWRD
1237 0000  QPUT,      0        /PUTS CHAR INTO MX
1240 1433             TAD I WRDBUF
1241 2033             ISZ WRDBUF
1242 3255             DCA QTMP
1243 6221             CDF2
1244 1655             TAD I QTMP      /GET POS
1245 7501             MQA      /ENTER BIT
1246 3655             DCA I QTMP      /RETURN POS
1247 6201             CDF0
1250 5637             JMP I QPUT

1251 1600  XGTCNT,    QGTCNT
1252 0007  QC7,       7
1253 0200  QC200,     200
1254 0000  WORD,      0
1255 0000  QTMP,      0

           /YEAR CATAGORY PROCESSING

1256 0000  QSPC1,     0
1257 1320             TAD CM15
1260 3315             DCA STMP1
1261 3317             DCA STMP2
1262 1321             TAD BUFZ
1263 3017             DCA R17         /SET UP STORAGE BUFFER

1264 6221  NXS3,      CDF2
1265 1416             TAD I R16
1266 6201             CDF0
1267 1322             TAD CM317
1270 7450             SNA             /ONLY?
1271 5303             JMP NXS4        /YES
1272 7001             IAC
1273 7650             SNA CLA         /NOT?
1274 5302             JMP NXS4-1      /YES
1275 2317  NXS5,      ISZ STMP2
1276 2315             ISZ STMP1       /ALL DONE CATAGORIES#/
1277 5264             JMP NXS3        /NO
1300 3417             DCA I R17
1301 5656             JMP I QSPC1

1302 7001             IAC
1303 3316  NXS4,      DCA YBUF        /ONLY (+0);     NOT (+1)
1304 1317             TAD STMP2
1305 7104             CLL RAL
1306 1323             TAD C2042
1307 1316             TAD YBUF
1310 3417             DCA I R17       /BLOCK NO. = 2 X POS + 1058 + (0,1) .
1311 5275             JMP NXS5

1312 2130  XDOIT,     DOIT
1313 0200  C200,      200
1314 7475  CM303,     -303
1315 0000  STMP1,     0
1316 0000  YBUF,      0
1317 0000  STMP2,     0
1320 7763  CM15,      -15
1321 5044  BUFZ,      SPBUF
1322 7461  CM317,     -317
1323 2042  C2042,     2042

           /PUT SPECIALS INTO XM STACK
```

```
1324  0000  QSPC2,  0
1325  1321          TAD BUFZ
1326  3016          DCA R16
1327  1416  NXS55,  TAD I R16      /GET SPECIAL BLOCK NO.
1330  7450          SNA
1331  5724          JMP I QSPC2    /END OF SPECIALS
1332  3334          DCA QDIV
1333  4447          JMS I XDIVID
1334  0000  QDIV,   0              /SPECIAL BLOCK NO.
1335  0024          24
1336  0000  QSHED,  0
1337  4712          JMS I XDOIT    /READ & PROCESS XM
1340  5327          JMP NXS55

            PAGE

            /XDIVID SINGLE PRECISION DIVIDE SUBROUTINE
            /       BOUNDS OF DIVIDEND: 0-7777
            /       BOUNDS OF DIVISOR: 1-3777
            /CALL   JMS I XDIVID
            /       (DIVIDEND)
            /       (DIVISOR)
            /       REMAINDER RETURNED HERE
            /       CONTROL RESUMES HERE WITH QUOTIENT IN AC
1400  0000  DIVIDE, 0
1401  7300          CLA CLL
1402  3253          DCA HDIV
1403  1600          TAD I DIVIDE
1404  2200          ISZ DIVIDE
1405  3254          DCA LDIV
1406  1600          TAD I DIVIDE
1407  2200          ISZ DIVIDE
1410  7041          CIA
1411  3255          DCA DIV
1412  1253          TAD HDIV
1413  7640          SZA CLA
1414  5235          JMP DV2
1415  1254          TAD LDIV
1416  1255          TAD DIV
1417  7620          SNL CLA /DIV<DIVISOR?
1420  5247          JMP DV4 /YES
1421  7300          CLA CLL
1422  1256          TAD DCM15
1423  3257          DCA DIVCT
1424  5235          JMP DV2
1425  1253  DV3,    TAD HDIV
1426  7004          RAL
1427  3253          DCA HDIV
1430  1253          TAD HDIV
1431  1255          TAD DIV
1432  7430          SZL
1433  3253          DCA HDIV
1434  7200          CLA
1435  1254  DV2,    TAD LDIV
1436  7004          RAL
1437  3254          DCA LDIV
1440  2257          ISZ DIVCT
1441  5225          JMP DV3
1442  1253          TAD HDIV
1443  3600          DCA I DIVIDE
1444  2200          ISZ DIVIDE
1445  1254          TAD LDIV
1446  5600          JMP I DIVIDE
1447  1254  DV4,    TAD LDIV       /QUOTIENT=0, REMAINDER
1450  3600          DCA I DIVIDE   /=DIVIDEND
1451  2200          ISZ DIVIDE
1452  5600          JMP I DIVIDE
1453  0000  HDIV,   0
```

```
1454  0000  LDIV,   0
1455  0000  DIV,    0
1456  7763  DCM15,  -15
1457  0000  DIVCT,  0

            /ZEROES MX BUF

1460  0000  ZMX,    0
1461  1273          TAD ZCM400
1462  3274          DCA CT400
1463  7240          CLA CMA
1464  3016          DCA R16
1465  6221          CDF2
1466  3416  NX400,  DCA I R16
1467  2274          ISZ CT400       /DONE?
1470  5266          JMP NX400       /NO
1471  6201          CDF0
1472  5660          JMP I ZMX
1473  7400  ZCM400, -400
1474  0000  CT400,  0

            PAGE

            /XGTCNT:        INTERROGATES "CPWCNT"
            /       IF > 20:        CHANGES IT TO 20
            /       IF >OR=8:       PUTS 1 IN LINK
            /       GETS WORD OFFSET & BIT MASK OF 1ST CHAR OF WORD
            /       WORD OFFSET IN AC
            /       BIT MASK IN MQ

1600  0000  QGTCNT, 0
1601  1032          TAD CPWCNT
1602  7041          CIA
1603  1234          TAD QQC7
1604  7710          SPA CLA         /X <= 7 ?
1605  5223          JMP CKMORE
1606  3241  XXX,    DCA TRIGX
1607  1032          TAD CPWCNT
1610  1236          TAD FACTR1
1611  3240          DCA HOLD
1612  1640          TAD I HOLD
1613  7421          MQL
1614  1032          TAD CPWCNT
1615  1237          TAD FACTR2
1616  3240          DCA HOLD
1617  1241          TAD TRIGX
1620  7110          CLL RAR         /SET LINK IF X >= 8
1621  1640          TAD I HOLD
1622  5600          JMP I QGTCNT

1623  1032  CKMORE, TAD CPWCNT
1624  7041          CIA
1625  1235          TAD QC24
1626  7700          SMA CLA         /X <= 20 ?
1627  5232          JMP .+3         /NO
1630  1235          TAD QC24
1631  3032          DCA CPWCNT
1632  7201          CLA IAC
1633  5206          JMP XXX

1634  0007  QQC7,   7
1635  0024  QC24,   24
1636  1642  FACTR1, QLIST1
1637  1657  FACTR2, QLIST2
1640  0000  HOLD,   0
1641  0000  TRIGX,  0

1642  0000  QLIST1, 0
1643  4000          4000
```

```
1644  2000          2000
1645  0400          400
1646  0040          40
1647  0002          2
1650  0400          400
1651  0004          4
1652  0001          1
1653  4000          4000
1654  2000          2000
1655  1000          1000
1656  0400          400
1657  0200          200
1660  0100          100
1661  0040          40
1662  0020          20
1663  0010          10
1664  0004          4
1665  0002          2
1666  0001          1

1667  0000  QLIST2, 0
1670  0000          0
1671  0000          0
1672  0000          0
1673  0000          0
1674  0000          0
1675  0001          1
1676  0001          1
1677  0002          2
1700  0003          3
1701  0003          3
1702  0003          3
1703  0003          3
1704  0003          3
1705  0003          3
1706  0003          3
1707  0003          3
1710  0003          3
1711  0003          3
1712  0003          3
1713  0003          3
1714  0003          3

            PAGE
            /XORDER:         TRANSLATES MX-XM & ANDS

2000  0000  QORDER, 0
2001  1055          TAD CM2
2002  3311          DCA QCT10
2003  3040          DCA DSEC
2004  1326          TAD CMCM3
2005  3031          DCA HITCNT
2006  3021          DCA XMHIT
2007  7203  QRX10,  CLA IAC BSW
2010  3341          DCA MEM10
2011  1312          TAD CM370
2012  3313          DCA QCT
2013  1325          TAD CC3074
2014  3024          DCA XMSTRT
2015  4720          JMS I XQSPC2
2016  7240          CLA CMA
2017  3016          DCA R16
2020  6221          CDF2
2021  1416  QNXT,   TAD I R16
2022  7440          SZA             /BIT ON?
2023  5251          JMP QON         /YES
```

```
2024  2313  QRTI,    ISZ QCT          /DONE?
2025  [illegible]              [illegible]      /[illegible]
2026  6201           CDFO
2027  1341           TAD MEMIO
2030  0321           AND QC100
2031  7640           SZA CLA          /ANY XM'S?
2032  5451           JMP I XERR       /NO - ERROR
2033  4724           JMS I XTOT       /PROCESS TOTALS
2034  7201           CLA IAC
2035  1040           TAD DSEC
2036  3242           DCA SECTHD
2037  4450           JMS I XDISK
2040  0100           100
2041  0000           0
2042  0000  SECTHD,  0
2043  5400           5400             /WRITE RESULTANT
2044  1322           TAD QC1400
2045  3040           DCA DSEC
2046  2311           ISZ QCT10
2047  5207           JMP QNX10        /DO NEXT SECTOR
2050  5600           JMP I QORDER

2051  7421  QON,     MQL              /STORE WORD
2052  1314           TAD CM14
2053  3315           DCA QBCNT
2054  3316           DCA QBIT
2055  7501           MQA
2056  7104  QNXB,    CLL RAL
2057  7430           SZL              /BIT ON?
2060  5265           JMP QONB         /YES
2061  2316  QNXC,    ISZ QBIT
2062  2315           ISZ QBCNT        /DONE?
2063  5256           JMP QNXB         /NO
2064  5224           JMP QRTI

            /        (12WORD + BIT + 1084)/20 = CYL + HEAD

2065  6201  QONB,    CDFO
2066  7421           MQL      /AGAIN STORE WORD REMAINDER
2067  1016           TAD R16
2070  7106           CLL RTL
2071  7004           RAL
2072  3302           DCA QTMP1
2073  1016           TAD R16
2074  7106           CLL RTL
2075  1302           TAD QTMP1
2076  1316           TAD QBIT
2077  1317           TAD QOFSET       /DISK XM AT 1084
2100  3302           DCA QTMP1
2101  4447           JMS I XDIVID
2102  0000  QTMP1,   0                /DIVIDEND
2103  0024           24
2104  0000  QHED,    0                /REMAINDER
2105  4330           JMS DOIT
2106  6221           CDF2
2107  7501           MQA
2110  5261           JMP QNXC
2111  [illegible]    [illegible]   [illegible]
2112  7410  CM370,   -370
2113  0000  QCT,     0
2114  7764  CM14,    -14
2115  0000  QBCNT,   0
2116  0000  QBIT,    0
2117  2074  QOFSET,  2074
2120  1324  XQSPC2,  QSPC2
2121  0100  QC100,   100
2122  1400  QC1400,  1400
2123  2400  XDAND,   DANDY
2124  2600  XTOT,    TOT
```

```
2125  3074  CC3074, 3074
2126  7775  CMCM3,  -3
2127  0000  DTMP10, 0

2130  0000  DOIT,   0
2131  3342          DCA CYL10
2132  1330          TAD DOIT
2133  1055          TAD CM2
2134  3327          DCA DTMP10
2135  1727          TAD I DTMP10
2136  1040          TAD DSEC
2137  3343          DCA HED10
2140  4450          JMS I XDISK
2141  0000  MEM10,  0
2142  0000  CYL10,  0
2143  0000  HED10,  0
2144  3400          3400
2145  1341          TAD MEM10
2146  0321          AND QC100
2147  7650          SNA CLA         /1ST XFER?
2150  4723          JMS I XDAND     /NO
2151  1321          TAD QC100
2152  1321          TAD QC100
2153  3341          DCA MEM10
2154  5730          JMP I DOIT

                PAGE
2200  0000  DCSET,  0
2201  7300          CLA CLL
2202  1600          TAD I DCSET
2203  2200          ISZ DCSET
2204  6501          DCBRH           /SET COMMAND REGISTER
2205  7300          CLA CLL
2206  1600          TAD I DCSET
2207  2200          ISZ DCSET
2210  7106          CLL RTL
2211  7006          RTL
2212  6500          DCBRL           /WITH OP TO EXECUTE
2213  7300          CLA CLL
2214  5600          JMP I DCSET

            /DISK ROUTINES
            /CALL.  JMS I XDISK
            /       MEMORY BANK     (0-5) & DRIVE (6-11)
            /       CYLINDER
            /       SECTOR (0-5) & HEAD     (6-11)
            /       COMMAND

2215  0000  DISK,   0
2216  7300          CLA CLL
2217  1615          TAD I DISK      /GET MEMORY BANK & DRIVE
2220  0333          AND C7700
2221  3335          DCA DFIELD
2222  1007          TAD DRIVER
2223  3247          DCA DRIVE
2224  2215          ISZ DISK
2225  1615          TAD I DISK
2226  3252          DCA CYL
2227  2215          ISZ DISK
2230  1615          TAD I DISK
2231  0334          AND C77
2232  3271          DCA HED
2233  1615          TAD I DISK
2234  7002          BSW
2235  0334          AND C77
2236  3320          DCA SEC
2237  2215          ISZ DISK
2240  1615          TAD I DISK
2241  3317          DCA COM
2242  2215          ISZ DISK
```

```
2243  7305  DRTN,    CLA CLL IAC RAL
2244  6517           DMCR              /MODE=LOAD
2245  4200           JMS DCSET         /LOAD DRIVE #
2246  6000           6000
2247  0000  DRIVE,   0
2250  4200           JMS DCSET         /LOAD CYLINDER #
2251  1000           1000
2252  0000  CYL,     0
2253  4200           JMS DCSET         /SEEK & RESET HEAD
2254  1400           1400
2255  0060           60
2256  7325           CLA CLL CML IAC RAL
2257  6517           DMCR              /MODE=READ
2260  7300           CLL CLA
2261  6503           DSSRH
2262  0332           AND DC200
2263  7640           SZA CLA           /DRIVE READY?
2264  5261           JMP .-3           /NO
2265  7305           CLA CLL IAC RAL
2266  6517           DMCR              /MODE=LOAD
2267  4200           JMS DCSET         /LOAD HEAD
2270  0000           0
2271  0000  HED,     0
2272  1036           TAD WC            /PROCESS HEADER IMAGE
2273  3342           DCA HEAD+2        /WORD COUNT
2274  1037           TAD CA
2275  3344           DCA HEAD+4        /CURRENT ADDRESS
2276  1252           TAD CYL
2277  3341           DCA HEAD+1        /CYLINDER
2300  1271           TAD HED
2301  7002           BSW
2302  7110           CLL RAR
2303  1320           TAD SEC
2304  3340           DCA HEAD          /ALT, PROTECT, HEAD & SECTOR
2305  1340           TAD HEAD
2306  1341           TAD HEAD+1
2307  1342           TAD HEAD+2
2310  7041           CIA
2311  3343           DCA HEAD+3        /CHECKSUM
2312  1337           TAD HEADER
2313  6514           DDMAR             /SET CA TO HEADER
2314  7300           CLA CLL
2315  6516           DWCR              /SET WC=0
2316  4200           JMS DCSET         /LOAD READ/WRITE
2317  0000  COM,     0
2320  0000  SEC,     0
2321  7330           CLA CLL CML RAR
2322  6505           DAIRH             /ENABLE WRITE (4000
2323  1335           TAD DFIELD        /SET BUSY & MEM FIELD
2324  6512           DCSR
2325  6511           DESRO
2326  5325           JMP .-1
2327  7700           SMA CLA           /ANY ERRORS ON DONE?
2330  5615           JMP I DISK        /NO
2331  7402           HLT               /ERRORS

2332  0200  DC200,   200
2333  7700  C7700,   7700
2334  0077  C77,     77
2335  0000  DFIELD,  0
2336  2000  C2000,   2000

2337  2340  HEADER,  HEAD
2340  0000  HEAD,    0       /HEAD, SECTOR, ETC.
2341  0000           0       /CYLINDER
2342  0000           0       /WORD COUNT
2343  0000           0       /CHECKSUM
2344  0000           0       /CURRENT ADDRESS
```

```
                 PAGE
                 /AND SUBROUTINE

2400  0000  DANDY,  0
2401  1024          TAD XMSTRT
2402  3215          DCA XMBUF
2403  6211          CDF1            /RESULTANT IN MB1
2404  1615  XM1,    TAD I XMBUF
2405  7440          SZA             /ANY BITS ON?
2406  5216          JMP XM3         /YES
2407  2215  XM2,    ISZ XMBUF       /END?
2410  5204          JMP XM1         /NO
2411  3024          DCA XMSTRT      /YES - INDICATE MISS
2412  6201          CDF0
2413  5614          JMP I XMISS
2414  2026  XMISS,  QRT1+2
2415  0000  XMBUF,  0

2416  6221  XM3,    CDF2
2417  0615          AND I XMBUF
2420  6211          CDF1
2421  7450          SNA             /ANY BITS ON AFTER ANDING?
2422  5227          JMP XM4         /NO
2423  3615          DCA I XMBUF     /REPLACE REWULTANT
2424  1215          TAD XMBUF
2425  3024          DCA XMSTRT      /RESET FIRST BIT POSITION
2426  5236          JMP XM20
2427  3615  XM4,    DCA I XMBUF
2430  5207          JMP XM2

2431  1615  XM10,   TAD I XMBUF
2432  6221          CDF2
2433  0615          AND I XMBUF
2434  6211          CDF1
2435  3615          DCA I XMBUF     /RESTORE RESULTANT
2436  2215  XM20,   ISZ XMBUF       /END?
2437  5231          JMP XM10        /NO
2440  6201          CDF0
2441  5600,         JMP I DANDY

                 /PROCESS HIT BITS FOR SEARCH

2442  0000  HIT10,  0
2443  3277          DCA GHIT10
2444  1642          TAD I HIT10
2445  2242          ISZ HIT10
2446  3276          DCA TOT10       /LOC OF TOTALS
2447  7330          CLA CLL CML RAR /SET TO BIT 0

2450  7421  GH11,   MQL
2451  7501          MQA
2452  0277          AND GHIT10
2453  7640          SZA CLA         /THIS BIT?
2454  5262          JMP GH13        /YES
2455  7501  GH12,   MQA
2456  7110          CLL RAR
2457  7420          SNL             /DONE ALL BITS?
2460  5250          JMP GH11        /NO
2461  5642          JMP I HIT10     /YES

2462  2676  GH13,   ISZ I TOT10     /COUNT HITS TO 4095
2463  5266          JMP .+3
2464  7240          CLA CMA
2465  3676          DCA I TOT10
2466  1031          TAD HITCNT
2467  7450          SNA             /STORAGE DONE?
2470  5255          JMP GH12        /YES
2471  7001          IAC
2472  3031          DCA HITCNT
```

```
2473  4675          JMS I XDHITX     /PROCESS HIT
2474  5255          JMP GH12

2475  0600  XDHITX, DOHIT
2476  0000  TOTIO,  0
2477  0000  GHITIO, 0
2500  0000  CHKK,   0
2501  1317          TAD C3074
2502  3215          DCA XMBUF
2503  6211          CDF1
2504  1615  MM1,    TAD I XMBUF
2505  7640          SZA CLA          /ANY BITS ON?
2506  5315          JMP FILL         /YES
2507  2215          ISZ XMBUF        /NO, DONE?
2510  5304          JMP MM1          /NO
2511  3024          DCA XMSTRT       /YES, INDICATE MISS
2512  1024          TAD XMSTRT
2513  6201          CDF0
2514  5700          JMP I CHKK
2515  1215  FILL,   TAD XMBUF
2516  5311          JMP .-5
2517  3074  C3074,  3074

            PAGE

            /TOTALS & HIT PROCESSING FOR SEARCH

2600  0000  TOT,    0
2601  1040          TAD DSEC
2602  7450          SNA              /1ST HALF?
2603  3756          DCA I HITST      /YES
2604  7650          SNA CLA
2605  1372          TAD TC6
2606  3354          DCA TMON         /STORE 1ST MONTH #
2607  4774          JMS I XCHKK
2610  7640          SZA CLA          /ANY HITS?
2611  5243          JMP TNX2         /YES
2612  7240          CLA CMA
2613  1042          TAD MTOTS
2614  1354          TAD TMON
2615  3016          DCA R16
2616  3416          DCA I R16        /ZERO MONTHLY TOTALS
2617  3416          DCA I R16
2620  3416          DCA I R16
2621  3416          DCA I R16
2622  3416          DCA I R16
2623  3416          DCA I R16

2624  1354  PTOT,   TAD TMON
2625  7640          SZA CLA          /2ND HLF YEAR?
2626  5600          JMP I TOT        /NO
2627  7240          CLA CMA
2630  1042          TAD MTOTS
2631  3016          DCA R16
2632  1355          TAD TCM14
2633  3357          DCA TXCT1
2634  4445          JMS I XPRINT     /MOVE CURSOR TO TOTALS
2635  6105          MC0920
2636  1416  TNX1,   TAD I R16        /PRINT MONTHLY TOTAL
2637  4761          JMS I XPRTOT
2640  2357          ISZ TXCT1        /DONE?
2641  5236          JMP TNX1         /NO
2642  5600          JMP I TOT
2643  1365  TNX2,   TAD M1
2644  1354          TAD TMON
2645  3361          DCA TX1          /LOC OF TOTALS - LAST MONTH FIRST
2646  1366          TAD M2
2647  1354          TAD TMON
2650  3363          DCA TX2
```

```
2651  1367           TAD M3
2652  1354           TAD TMON
2653  3364           DCA TX3         /ALSO MONTH STRT & # LOCS
2654  1370           TAD TCM6
2655  3357           DCA TXCT1       /SET FOR 6 MOS.

2656  3751  NXMON1, DCA I TX1       /ZERO MONTH TOTAL
2657  1764           TAD I TX3
2660  7040           CMA
2661  1763           TAD I TX2       /END OF MONTH LOC
2662  3371           DCA ENDMON
2663  1371           TAD ENDMON
2664  7141           CLL CIA
2665  1024           TAD XMSTRT
2666  7450           SNA             /ANY HITS IN MONTH?
2667  5305           JMP NXMON2      /YES
2670  7520           SNL CLA
2671  5305           JMP NXMON2      /YES
2672  7240           CLA CMA         /NO - SET UP FOR NEXT MONTH
2673  1351           TAD TX1
2674  3351           DCA TX1
2675  7240           CLA CMA
2676  1363           TAD TX2
2677  3363           DCA TX2
2700  7240           CLA CMA
2701  1364           TAD TX3
2702  3364           DCA TX3
2703  2357           ISZ TXCT1       /COUNT MONTHS
2704  5256           JMP NXMON1

2705  1024  NXMON2, TAD XMSTRT
2706  7041           CIA
2707  1371           TAD ENDMON
2710  7040           CMA
2711  3360           DCA TXCT2
2712  7240           CLA CMA
2713  1024           TAD XMSTRT
2714  3016           DCA R16         /SET UP FOR SEARCH
2715  1031           TAD HITCNT
2716  7650           SNA CLA         /ANY HITS SO FAR?
2717  5323           JMP FLDT1       /YES
2720  1351           TAD TX1
2721  1373           TAD MINTX
2722  3020           DCA XMMON       /SET CURRENT MONTH

2723  6211  FLDT1,   CDF1            /RESULTANT IN MB1
2724  1416           TAD I R16
2725  7440           SZA             /HIT?
2726  5347           JMP THIT        /YES
2727  2360  FLDT2,   ISZ TXCT2       /MONTH DOEN?
2730  5324           JMP FLDT1+1     /NO
2731  6201           CDF0
2732  2357           ISZ TXCT1       /ALL MONTHS DONE?
2733  5335           JMP .+2         /NO
2734  5224           JMP PTOT
2735  7240           CLA CMA
2736  1351           TAD TX1
2737  3351           DCA TX1
2740  3751           DCA I TX1       /ZERO NEXT MONTHLY TOTAL
2741  7240           CLA CMA
2742  1364           TAD TX3
2743  3364           DCA TX3
2744  1764           TAD I TX3
2745  3360           DCA TXCT2       /# LOCS IN MONTH
2746  5323           JMP FLDT1

2747  6201  THIT,    CDF0
2750  4762           JMS I XHIT10    /PROCESS HIT BITS & TOTALS
2751  0000  TX1,     0       /LOC OF TOTALS
```

```
2752  6211            CDF1
2753  5327            JMP FLDT2

2754  0000  TMON,     0
2755  7764  TCM14,    -14
2756  5100  HITST,    DSKHIT
2757  0000  TXCT1,    0
2760  0000  TXCT2,    0
2761  3000  XPRTOT,   PRTOT
2762  2442  XHIT10,   HIT10
2763  0000  TX2,      0
2764  0000  TX3,      0
2765  5005  M1,       TOTSM+5
2766  5021  M2,       BEGSM+5
2767  5035  M3,       LOCSM+5
2770  7772  TCM6,     -6
2771  0000  ENDMON,   0
2772  0006  TC6,      6
2773  3000  MINTX,    -TOTSM
2774  2500  XCHKK,    CHKK

            PAGE

            /PRINTS TOTALS

3000  0000  PRTOT,    0
3001  3205            DCA LOORD
3002  3204            DCA HIORD
3003  4265            JMS OCDEC
3004  0000  HIORD,    0
3005  0000  LOORD,    0
3006  0000            0
3007  0000            0
3010  0000            0
3011  0000            0
3012  0000  PDIG4,    0
3013  0000  PDIG3,    0
3014  0000  PDIG2,    0
3015  0000  PDIG1,    0
3016  1252            TAD CM20
3017  3253            DCA ZDIG
3020  1254            TAD BUFP
3021  3255            DCA PBUF
30[illegible]  1212            TAD PDIG4
3023  4236            JMS PCHR
3024  1213            TAD PDIG3
3025  4236            JMS PCHR
3026  1214            TAD PDIG2
3027  4236            JMS PCHR
3030  1215            TAD PDIG1
3031  1256            TAD C260
3032  3655            DCA I PBUF
3033  4445            JMS I XPRINT
3034  3057            DIGITS
3035  5600            JMP I PRTOT

3036  0000  PCHR,     0
3037  7440            SZA              /0?
3040  5246            JMP PCHR1        /NO
3041  1253            TAD ZDIG
3042  1256  PCHR2,    TAD C260
3043  3655            DCA I PBUF
3044  2255            ISZ PBUF
3045  5636            JMP I PCHR
3046  7421  PCHR1,    MQL
3047  3253            DCA ZDIG
3050  7501            MQA
3051  5242            JMP PCHR2
```

```
3052   7760   CM20,    -20
3053   0000   ZDIG,    0
3054   3060   BUFP,    DIGITS+1
3055   0000   PBUF,    0
3056   0260   C260,    260

3057   0240   DIGITS,  240
3060   0000            0
3061   0000            0
3062   0000            0
3063   0000            0
3064   0000            0

              /XOCDEC:       CONVERTS DOUBLE PRECISION OCTAL TO BCD DIGITS

3065   0000   OCDEC,   0
3066   7300            CLA CLL
3067   1665            TAD I OCDEC
3070   2265            ISZ OCDEC
3071   3342            DCA UDHIGH
3072   1665            TAD I OCDEC
3073   2265            ISZ OCDEC
3074   3343            DCA UDLOW
3075   1336            TAD UDLOOP
3076   3341            DCA UDCNT
3077   1337            TAD UDADDR
3100   3351            DCA UDPTR
3101   3346            DCA UDBOX
3102   1751   UDARND,  TAD I UDPTR
3103   2351            ISZ UDPTR

3105   1751            TAD I UDPTR
3106   2351            ISZ UDPTR
3107   3345            DCA UDLSUB
3110   7100   UDDO,    CLL
3111   1345            TAD UDLSUB
3112   1343            TAD UDLOW
3113   3347            DCA UDTEML
3114   7004            RAL
3115   1344            TAD UDHSUB
3116   1342            TAD UDHIGH
3117   7420            SNL
3120   5326            JMP UDOUT
3121   2346            ISZ UDBOX
3122   3342            DCA UDHIGH
3123   1347            TAD UDTEML
3124   3343            DCA UDLOW
3125   5310            JMP UDDO
3126   7200   UDOUT,   CLA
3127   1346            TAD UDBOX
3130   3665            DCA I OCDEC
3131   2265            ISZ OCDEC
3132   3346            DCA UDBOX
3133   2341            ISZ UDCNT
3134   5302            JMP UDARND
3135   5665            JMP I OCDEC
3136   7770   UDLOOP,  -10
3137   3152   UDADDR,  UDCONT
3140   0260   UDTWO,   260
3141   0000   UDCNT,   0
3142   0000   UDHIGH,  0
3143   0000   UDLOW,   0
3144   0000   UDHSUB,  0
3145   0000   UDLSUB,  0
3146   0000   UDBOX,   0
3147   0000   UDTEML,  0
3150   0000   UDGET,   0
3151   0000   UDPTR,   0
3152   3166   UDCONT,  3166     /POWERS OF TEN
```

```
3153  4600          4600
3154  7413          7413
3155  6700          6700
3156  7747          7747
3157  4540          4540
3160  7775          7775
3161  4360          4360
3162  7777          7777
3163  6030          6030
3164  7777          7777
3165  7634          7634
3166  7777          7777
3167  7766          7766
3170  7777          7777
3171  7777          7777

            PAGE

            /HITS PROCESSOR FOR SEARCH

3200  0000  HITS,   0
3201  1337          TAD STH1
3202  3016          DCA R16         /HITS BUFFER
3203  1340          TAD STH2
3204  3017          DCA R17         /RECORD BUFFER
3205  1360          TAD PLIST1
3206  3341          DCA PLIST       /MOVE CURSOR LIST

3207  1416  PNX10,  TAD I R16
3210  7450          SNA             /END?
3211  5272          JMP PEND        /YES
3212  3217          DCA PCYL
3213  1416          TAD I R16
3214  3220          DCA PHED
3215  4450          JMS I XDISK
3216  0200          200
3217  0000  PCYL,   0
3220  0000  PHED,   0
3221  3400          3400            /READ DATA RECORD BLOCK
3222  1417          TAD I R17
3223  3342          DCA RECORD      /RECORD # WITHIN BLOCK
3224  1342          TAD RECORD
3225  7002          BSW
3226  3343          DCA PTMP10      /REC # X 123 = ST OF YR
3227  1342          TAD RECORD
3230  7106          CLL RTL
3231  7006          RTL
3232  1343          TAD PTMP10
3233  3343          DCA PTMP10
3234  1342          TAD RECORD
3235  7104          CLL RAL
3236  1342          TAD RECORD
3237  1343          TAD PTMP10
3240  1344          TAD RCM1
3241  3015          DCA R15         /DATA LOC
3242  1336          TAD STDATA
3243  3014          DCA R14         /PRT BUF LOC
3244  7240          CLA CMA
3245  3345          DCA PTRIG       /FIRST CHR IN WRD

3246  4275  PNX20,  JMS GETCHR
3247  7450          SNA             /0?
3250  5253          JMP PNX30       /YES - SPECIAL
3251  4315          JMS PTRANS      /TRANSLATE & STORE
3252  5246          JMP PNX20

3253  4275  PNX30,  JMS GETCHR
3254  7450          SNA             /0?
3255  5261          JMP PNX40       /YES - END OF REC
```

```
3256  1345           TAD PC200
3257  3414           DCA I R14
3260  5240           JMP PNX20
3261  3414  PNX40,   DCA I R14
3262  1741           TAD I PLIST
3263  2341           ISZ PLIST
3264  3266           DCA PT100
3265  4445           JMS I XPRINT     /MOVE CURSOR
3266  0000  PT100,   0
3267  4445           JMS I XPRINT     /PRINT DATA
3270  0256           PDATA
3271  5207           JMP PNX10

3272  4445  PEND,    JMS I XPRINT
3273  6144           DASHES           /INDICATE SEARCH DONE
3274  5600           JMP I HITS

3275  0000  GETCHR,  0
3276  2346           ISZ PTRIG        /WHICH HALF?
3277  5310           JMP GET2         /2ND
3300  6221           CDF2
3301  1415           TAD I R15
3302  6201           CDF0
3303  3350           DCA PCHAR
3304  1350           TAD PCHAR
3305  7002           BSW
3306  0347           AND PC77
3307  5675           JMP I GETCHR
3310  7240  GET2,    CLA CMA
3311  3346           DCA PTRIG
3312  1350           TAD PCHAR
3313  0347           AND PC77
3314  5675           JMP I GETCHR

3315  0000  PTRANS,  0
3316  1351           TAD PCM77
3317  7450           SNA
3320  5333           JMP PSEP         /=77:     SPACE
3321  1352           TAD PC12
3322  7500           SMA
3323  5332           JMP PNUM         />OR=65:          #
3324  1353           TAD PC32
3325  7510           SPA
3326  1354           TAD PC72         /<33: LCA
3327  1355           TAD PC301        />OR=33:          UCA
3330  3414           DCA I R14
3331  5715           JMP I PTRANS
3332  1356  PNUM,    TAD PC20
3333  1357  PSEP,    TAD PC240
3334  3414           DCA I R14
3335  5715           JMP I PTRANS

3336  0255  STDATA,  PDATA-1
3337  5077  STH1,    DSKHIT-1
3340  5106  STH2,    DSKHIT+6
3341  0000  PLIST,   0
3342  0000  RECORD,  0
3343  0000  PTMP10,  0
3344  3105  RCM1,    3105
3345  0200  PC200,   200
3346  0000  PTRIG,   0
3347  0077  PC77,    77
3350  0000  PCHAR,   0
3351  7701  PCM77,   -77
3352  0012  PC12,    12
3353  0032  PC32,    32
3354  0072  PC72,    72
3355  0301  PC301,   301
3356  0020  PC20,    20
3357  0240  PC240,   240
```

```
3360   3361   PLIST1,  .+1
3361   6115            MC1101
3362   6126            MC1401
3363   6135            MC1701

              PAGE
              ?        *5000    /BUFFER

              /MONTHLY TOTALS
5000   0000   TOTSM,   0
5001   0000            0
5002   0000            0
5003   0000            0
5004   0000            0
5005   0000            0
5006   0000            0
5007   0000            0
5010   0000            0
5011   0000            0
5012   0000            0
5013   0000            0

              /MONTH START LOCATIONS
5014   7127   BEGSM,   7127
5015   6307            6307
5016   5422            5422
5017   4612            4612
5020   4010            4010
5021   3240            3240
5022   7204            7204
5023   6361            6361
5024   5601            5601
5025   4750            4750
5026   4120            4120
5027   3273            3273

              / - (NO. OF LOCS PER MONTH)
5030   7127   LOCSM,   -651
5031   7160            -620
5032   7113            -665
5033   7170            -610
5034   7176            -602
5035   7230            -550
5036   7204            7204
5037   7155            7155
5040   7220            7220
5041   7147            7147
5042   7150            7150
5043   7153            7153
              /CATAGORY BUFFER
[illegible]
5045   0000            0
5046   0000            0
5047   0000            0
5050   0000            0
5051   0000            0
5052   0000            0
5053   0000            0
5054   0000            0
5055   0000            0
5056   0000            0
5057   0000            0
5060   0000            0
5061   0000            0
5062   0000            0
5063   0000            0
5064   0000            0
5065   0000            0
5066   0000            0
5067   0000            0
```

```
                /WORD STORAGE BUFFER FOR ASCII TRANSLATION
5070    0000    CHRS8,  0
5071    0000            0
5072    0000            0
5073    0000            0
5074    0000            0
5075    0000            0
5076    0000            0
5077    0000            0

                /DISK HIT STACK
5100    0000    DSKHIT, 0       /HIT # 1:       CYL #
5101    0000            0       /               SEC # - HEAD #
5102    0000            0       /HIT # 2
5103    0000            0
5104    0000            0       /HIT # 3
5105    0000            0
5106    0000            0       /TERMINATOR
5107    0000            0       /HIT # 1:       RECORD #
5110    0000            0       /HIT # 2
5111    0000            0       /HIT # 3


                /CRT FORM
5112    0200    FORM,   200     /INITIALIZE, BLOCK MODE, HALF DUPLEX
5113    0200            200
5114    0200            200
5115    0200            200
5116    0243            243
5117    0241            241
5120    0243            243
5121    0261            261
5122    0303    FDATE,  303     /C 1973
[illegible]
5124    0240            240
5125    0217            217
5126    0261            261
5127    0271            271
5130    0267            267
5131    0262            262
5132    0216            216
5133    0240            240
5134    0243            243     /CATAGORIES
5135    0255            255
5136    0260            260
5137    0262            262
5140    0260            260
5141    0260            260
5142    0317    FOBIT,  317     /OBITUARY
5143    0302            302
5144    0311            311
5145    0324            324
5146    0325            325
5147    0301            301
5150    0322            322
5151    0331            331
5152    0272            272
5153    0217            217
5154    0316            316     /N
5155    0216            216
5156    0240            240
5157    0240            240
5160    0240            240
5161    0303    FCRIM,  303     /CRIME-COURTS
5162    0322            322
5163    0311            311
5164    0315            315
5165    0305            305
5166    0257            257
```

```
5167  0303              303
5170  0317              317
5171  0325              325
5172  0322              322
5173  0324              324
5174  0323              323
5175  0272              272
5176  0217              217
5177  0316              316    /N
5200  0216              216
5201  0240              240
5202  0240              240
5203  0316   FNAME,     316    /NAMES IN NEWS
5204  0301              301
5205  0315              315
5206  0305              305
5207  0323              323
5210  0257              257
5211  0316              316
5212  0305              305
5213  0327              327
5214  0323              323
5215  0272              272
5216  0217              217
5217  0316              316    /N
5220  0216              216
5221  0240              240
5222  0240              240
5223  0303   FCOUR,     303    /COURIER
5224  0317              317
5225  0325              325
5226  0322              322
5227  0311              311
5230  0305              305
5231  0322              322
5232  0272              272
5233  0217              217
5234  0240              240    /SPACE
5235  0216              216
5236  0240              240
5237  0240              240
5240  0324   FTIMES,    324    /TIMES
5241  0311              311
5242  0315              315
5243  0305              305
5244  0323              323
5245  0272              272
5246  0217              217
5247  0240              240    /SPACE
5250  0216              216
5251  0240              240
5252  0240              240
5253  0323   FSUND,     323    /CJT SUNDAY
5254  0325              325
5255  0316              316
5256  0304              304
5257  0301              301
5260  0331              331
5261  0272              272
5262  0217              217
5263  0240              240    /SPACE
5264  0216              216
5265  0240              240
5266  0240              240
5267  0240              240
5270  0240              240
5271  0240              240
5272  0240              240
5273  0240              240
```

```
5274 0240          240
5275 0240          240
5276 0305 FEDIT,   305    /EDITORIAL
5277 0304          304
5300 0311          311
                   324
5302 0317          317
5303 0322          322
5304 0311          311
5305 0301          301
5306 0314          314
5307 0272          272
5310 0217          217
5311 0240          240    /SPACE
5312 0216          216
5313 0240          240
5314 0240          240
5315 0314 FLETT,   314    /LETTER TO EDITOR
5316 0305          305
5317 0324          324
5320 0324          324
5321 0305          305
5322 0322          322
5323 0257          257
5324 0305          305
5325 0304          304
5326 0272          272
5327 0217          217
5330 0240          240    /SPACE
5331 0216          216
5332 0240          240
5333 0240          240
5334 0240          240
5335 0240          240
5336 0240          240
5337 0320 FPICT,   320    /PICTURE
5340 0311          311
5341 0303          303
5342 0324          324
5343 0325          325
5344 0322          322
5345 0305          305
5346 0272          272
5347 0217          217
5350 0240          240
5351 0216          216
5352 0240          240
5353 0240          240
5354 0240          240
5355 0240          240
5356 0240          240
5357 0303 FCART,   303    /CARTOON
5360 0301          301
5361 0322          322
5362 0324          324
5363 0317          317
5364 0317          317
5365 0316          316
5366 0272          272
5367 0217          217
[illegible]
5371 0216          216
5372 0240          240
5373 0240          240
5374 0324 FTABL,   324    /TABLE
5375 0301          301
5376 0302          302
5377 0314          314
5400 0305          305
```

```
5401  0272            272
5402  0217            217
5403  0240            240   /SPACE
5404  0216            216
5405  0240            240
5406  0240            240
5407  0307   FGRAP,   307   /GRAPH
5410  0322            322
5411  0301            301
5412  0320            320
5413  0310            310
5414  0272            272
5415  0217            217
5416  0240            240   /SPACE
5417  0216            216
5420  0240            240
5421  0240            240
5422  0240            240
5423  0315   FMAPS,   315   /MAP
5424  0301            301
5425  0320            320
5426  0272            272
5427  0217            217
5430  0240            240   /SPACE
5431  0216            216
5432  0240            240
5433  0240            240
5434  0217            217
5435  0243   FLABL,   243
5436  0255            255
5437  0260            260
5440  0265            265
5441  0260            260
5442  0260            260
5443  0240            240
5444  0024            24
5445  0240            240
5446  0240            240
5447  0303            303   /CLIPPINGS
5450  0314            314
5451  0311            311
5452  0320            320
5453  0320            320
5454  0311            311
5455  0316            316
5456  0307            307
5457  0323            323
5460  0272            272
                      24
5462  0240            240
5463  0261            261   /1972
5464  0271            271
5465  0267            267
5466  0262            262
5467  0240            240
5470  0240            240
5471  0240            240
5472  0240            240
5473  0240            240
5474  0240            240
5475  0240            240
5476  0240            240
5477  0240            240
5500  0240            240
5501  0240            240
5502  0240            240
5503  0240            240
5504  0240            240
5505  0240            240
```

```
5506   0240              240
5507   0240              240
5510   0240              240
5511   0240              240
5512   0240              240
5513   0240              240
5514   0240              240
5515   0240              240
5516   0240              240
5517   0240              240
5520   0240              240;
5521   0240    240;
5522   0240    240;
5523   0240    240;
5524   0240    240;
5525   0240    240;
5526   0240    240;
5527   0240    240
5530   0240              240;
5531   0240    240;
5532   0240    240;
5533   0240    240;
5534   0240    240;
5535   0240    240;
5536   0240    240;
5537   0240    240
5540   0240              240;
5541   0240    240;
5542   0240    240;
5543   0240    240;
5544   0240    240;
5545   0240    240;
5546   0240    240;
5547   0240    240
5550   0240              240;
5551   0240    240;
[illegible]
5553   0240    240
5554   0240              240
5555   0240              240
5556   0240              240
5557   0240              240
5560   0240              240
5561   0240              240
5562   0240              240
5563   0240              240
5564   0234              234
5565   0255    FDASH,    255;
5566   0255    255;
5567   0255    255;
5570   0255    255;
5571   0255    255;
5572   0255    255;
5573   0255    255;
5574   0255    255;
5575   0255    255;
5576   0255    255
5577   0255              255;
5600   0255    255;
5601   0255    255;
5602   0255    255;
5603   0255    255;
5604   0255    255;
5605   0255    255;
5606   0255    255;
5607   0255    255;
5610   0255    255
5611   0255              255;
5612   0255    255;
```

```
5613 0255 255;
5614 0255 255;
5615 0255 255;
5616 0255 255;
5617 0255 255;
5620 0255 255;
5621 0255 255;
5622 0255 255
5623 0255      255;
5624 0255 255;
5625 0255 255;
5626 0255 255;
5627 0255 255;
5630 0255 255;
5631 0255 255;
5632 0255 255;
5633 0255 255;
5634 0255 255
5635 0255      255;
5636 0255 255;
5637 0255 255;
5640 0255 255;
5641 0255 255;
5642 0255 255;
[illegible]
5644 0255 255;
5645 0255 255;
5646 0255 255
5647 0255      255;
5650 0255 255;
5651 0255 255;
5652 0255 255;
5653 0255 255;
5654 0255 255;
5655 0255 255;
5656 0255 255;
5657 0255 255;
5660 0255 255
5661 0255      255;
5662 0255 255;
5663 0255 255;
5664 0255 255;
5665 0255 255;
5666 0255 255;
5667 0255 255;
5670 0255 255;
5671 0255 255;
5672 0255 255
5673 0255      255;
5674 0255 255;
5675 0255 255;
5676 0255 255;
5677 0255 255;
5700 0255 255;
5701 0255 255;
5702 0255 255;
5703 0255 255;
5704 0255 255
5705 0216 FMORE, 216     /MORE
5706 0315       315;
5707 0317 317;
5710 0322 322;
5711 0305 305;
5712 0217 217;
5713 0252 252;
5714 0216 216
5715 0240      240;
5716 0240 240;
5717 0240 240;
```

```
5720  0240  240;
5721  0240  240;
5722  0240  240;
5723  0240  240;
5724  0240  240
5725  0240        240;
5726  0240  240;
5727  0240  240;
5730  0240  240;
5731  0240  240;
5732  0240  240;
5733  0240  240;
5734  0240  240
5735  0312        312    /JAN*
5736  0301        301;
[illegible]7[illegible]  [illegible]14  31[illegible];
5740  0217  217;
5741  0252  252;
5742  0216  216;
5743  0240  240
5744  0306        306    /FEB*
5745  0305        305;
5746  0302  302;
5747  0217  217;
5750  0252  252;
5751  0216  216;
5752  0240  240
5753  0315        315    /MAR*
5754  0301        301;
5755  0322  322;
5756  0217  217;
5757  0252  252;
5760  0216  216;
5761  0240  240
5762  0301        301    /APR*
5763  0320        320;
5764  0322  322;
5765  0217  217;
5766  0252  252;
5767  0216  216;
5770  0240  240
5771  0315        315    /MAY*
5772  0301        301;
5773  0331  331;
5774  0217  217;
5775  0252  252;
5776  0216  216;
5777  0240  240
6000  0312        312    /JUN*
6001  0325        325;
6002  0316  316;
6003  0217  217;
6004  0252  252;
6005  0216  216;
6006  0240  240
6007  0312        312    /JUL*
6010  0325        325;
6011  0314  314;
6012  0217  217;
6013  0252  252;
6014  0216  216;
6015  0240  240
6016  0301        301    /AUG*
6017  0325        325;
6020  0307  307;
6021  0217  217;
6022  0252  252;
6023  0216  216;
6024  0240  240
6025  0323        323    /SEP*
6026  0305        305;
```

```
6027  [illegible]  32[illegible]
6030  0217  217;
6031  0252  252;
6032  0216  216;
6033  0240  240
6034  0317          317     /OCT*
6035  0303          303;
6036  0324  324;
6037  0217  217;
6040  0252  252;
6041  0216  216;
6042  0240  240
6043  0316          316     /NOV*
6044  0317          317;
6045  0326  326;
6046  0217  217;
6047  0252  252;
6050  0216  216;
6051  0240  240;

6052  0304          304     /DEC*
6053  0305          305;
6054  0303  303;
6055  0217  217;
6056  0252  252
6057  0216  FHIT,   216     /HIT SPACES,HOME
6060  0234          234;
6061  0234  234;
6062  0240  240;
6063  0234  234;
6064  0234  234;
6065  0234  234;
6066  0210  210;
6067  0240  240;
6070  0234  234
6071  0234          234;
6072  0234  234;
6073  0210  210;
6074  0240  240;
6075  0217  217;
6076  0243  243;
6077  0255  255;
6100  0260  260;
6101  0260  260
6102  0260          260;
6103  0267  267
6104  0000          0       /TERMINATOR

            /PRINT CHARACTERS FOR HITS & TOTALS
6105  0243  MC0920, 243
6106  0255          255
6107  0260          260
6110  0271          271
6111  0262          262
6112  0260          260
6113  0230          230
6114  0000          0
6115  0243  MC1101, 243
6116  0255          255
6117  [illegible]   [illegible]
6120  0260          260
6121  0260          260
6122  0260          260
6123  0230          230
6124  0234          234
6125  0000          0
6126  0243  MC1401, 243
6127  0255          255
6130  0261          261
6131  0264          264
```

```
6132  0260             260
6133  0260             260
6134  0000             0
6135  0243  MCT701,    243
6136  0255             255
6137  0261             261
6140  0267             267
6141  0260             260
6142  0260             260
6143  0000             0
6144  0243  DASHES,    243
6145  0255             255
6146  0260             260
6147  0266             266
6150  0263             263
6151  0264             264
6152  0240             240
6153  0240             240
6154  0240             240
6155  0240             240
6156  0240             240
6157  0240             240
6160  0240             240
6161  0240             240
6162  0240             240
6163  0240             240
6164  0240             240
6165  0243             243
6166  0255             255
6167  0260             260
6170  0270             270
6171  0260             260
6172  0264             264
6173  0000             0
            /CRT SEARCH INITIATION INDICATOR
6174  0243  PRINTA,    243
6175  0255             255
6176  0260             260
6177  0266             266
6200  0263             263
6201  0264             264
6202  0243             243      /BLINK
6203  0271             271
6204  0277             277
6205  0323             323      /SEARCHING
6206  0305             305
6207  0301             301
6210  0322             322
6211  0303             303
6212  0310             310
6213  0311             311
6214  0316             316
6215  0307             307
6216  0243             243      /STOP BLINK
6217  0271             271
6220  0277             277
6221  0237             237      /CURSOR CHOME
6222  0000             0

            /XMIT
6223  0221  PRINT3,    221
6224  0000             0

            /XOFF
6225  0223  XOFF,      223
6226  0000             0        /TERM.
```

```
                /ERROR PRINTOUT
6227   0243    PERR,   243
6230   0255            255
6231   0260            260
6232   0266            266
6233   0263            263
6234   0264            264
6235   0243            243      /BLINK
6236   0271            271
6237   0277            277
6240   0240            240
6241   0240            240
6242   0305            305      /ERROR
6243   0322            322
6244   0322            322
6245   0317            317
6246   0322            322
6247   0240            240
6250   0240            240
6251   0243            243      /STOP BLINK
6252   0271            271
6253   0277            277
6254   0237            237      /CURSOR HOME
6255   0000            0        /TERM.

                /START OF DATA PRINT BUFFER
6256   0000    PDATA,  0


BEGSM    5014
BLOCK    0657
BUFP     3054
BUFZ     1321
CA       0037
CCC5     0527
CCM507   0530
CCM574   2125

CHR55    5070
CKMORE   1623
CMCM3    2120
CM10     0325
CM11     0326
CM14     2114
CM15     1320
CM2      0055
CM20     3052
CM215    0054
CM252    0053
CM3      0537
CM303    1314
CM3074   0705
CM317    1322
CM370    2112
CM4      0327
CM4704   0531
CM6      0540
CNX1     0277
CNX2     0316
COM      2317
COMD     0245
CPNCNT   0032
CT400    1474
CYL      2252
CYL10    2142
C1       0535
C1400    0541
C17      0324
C200     1313
```

| | |
|---|---|
| C2000 | 2336 |
| C2042 | 1323 |
| C200 | 3056 |
| C3074 | 2517 |
| C377 | 0056 |
| C404 | 1132 |
| C50 | 0704 |
| C6000 | 0057 |
| C655 | 1150 |
| C636 | 1151 |
| C77 | 2334 |
| C7700 | 2333 |
| DARDY | 2400 |
| DASHES | 6144 |
| DBUF1 | 0702 |
| DBUF2 | 0703 |
| DCM15 | 1456 |
| DCSET | 2200 |
| DC2CO | 2332 |
| DFIELD | 2335 |
| DIGITS | 3057 |
| DIG1 | 0025 |
| DIG2 | 0026 |
| DIG3 | 0027 |
| DIG4 | 0030 |
| [illegible] | [illegible] |
| DIV | 1455 |
| DIVCT | 1457 |
| DIVIDE | 1400 |
| DOHIT | 0600 |
| DOIT | 2130 |
| DREC | 0652 |
| DRIVE | 2247 |
| DRIVER | 0007 |
| DRIN | 2243 |
| DSEC | 0040 |
| DSKHIT | 5100 |
| DTMP10 | 2127 |
| DV2 | 1435 |
| DV3 | 1425 |
| DV4 | 1447 |
| ENDHLF | 0525 |
| ENDMON | 2771 |
| FACTR1 | 1636 |
| FACTR2 | 1637 |
| FCART | 5357 |
| FCOUR | 5223 |
| FCRIM | 5161 |
| FDASH | 5565 |
| FDATE | 5122 |
| FEDIT | 5276 |
| FGRAP | 5407 |
| FHIT | 6057 |
| FILL | 2515 |
| FLABL | 5435 |
| FLDT1 | 2723 |
| FLDT2 | 2727 |
| FLDY | 0464 |
| FLDY2 | 0470 |
| FLETT | 5315 |
| FMAPS | 5423 |
| FMORE | 5705 |
| FNAME | 5203 |
| FOBIT | 5142 |
| FORM | 5112 |
| FPICT | 5337 |
| FSUND | 5253 |
| FTABL | 5374 |
| FTIMES | 5240 |

| | |
|---|---|
| GETCHR | 3275 |
| GETDIG | 0230 |
| GET2 | 3310 |
| GHI1 | 0536 |
| GHI110 | 2477 |
| GHI1 | 2450 |
| GHI2 | 2455 |
| GHI3 | 2462 |
| GNX1 | 0500 |
| GNX3 | 0502 |
| GNX4 | 0515 |
| GNX5 | 0507 |
| HDIV | 1453 |
| HEAD | 2340 |
| HEADER | 2337 |
| HED | 2271 |
| [illegible] | [illegible] |
| HIORD | 3004 |
| HITCNT | 0031 |
| HITEND | 0532 |
| HITS | 3200 |
| HITST | 2756 |
| HIT10 | 2442 |
| HOLD | 1640 |
| HTMP1 | 0631 |
| HTMP2 | 0650 |
| HTMP3 | 0633 |
| HTMP4 | 0661 |
| KYBD | 0222 |
| LDBUF1 | 0701 |
| LDBUF2 | 0700 |
| LDIV | 1454 |
| LOCSM | 5030 |
| LOORD | 3005 |
| L7000 | 0323 |
| MBEGS | 0043 |
| MC0920 | 6105 |
| MC1101 | 6115 |
| MC1401 | 6125 |
| MC1701 | 6135 |
| MEM10 | 2141 |
| MINIX | 2773 |
| MLOCS | 0044 |
| MM1 | 2504 |
| MORE | 0544 |
| MTOTS | 0042 |
| M1 | 2765 |
| M2 | 2766 |
| M3 | 2767 |
| NEW | 0400 |
| NEW2 | 0414 |
| NEW3 | 0432 |
| NEW33 | 0425 |
| NMON | 0534 |
| NTMP | 0533 |
| NXCH | 1010 |
| NXMON1 | 2656 |
| NXMON2 | 2705 |
| NXPR | 0212 |
| NXS3 | 1264 |
| NXS4 | 1303 |
| NXS5 | 1275 |
| NXS55 | 1327 |
| NX400 | 1466 |
| OCDEC | 3065 |
| PBUF | 3055 |
| PCHAR | 3350 |
| PCHR | 3036 |
| PCHR1 | 3046 |

| | |
|---|---|
| PCHR2 | 3042 |
| PCM77 | 3351 |
| PCYL | 3217 |
| PC12 | 3352 |
| PC20 | 3356 |
| PC200 | 3345 |
| PC240 | 3?7 |
| PC301 | 3355 |
| PC32 | 3353 |
| PC72 | 3354 |
| PC77 | 3347 |
| PDATA | 0256 |
| PDIG1 | 3015 |
| PDIG2 | 3014 |
| PDIG3 | 3013 |
| PDIG4 | 3012 |
| PEND | 3272 |
| PERR | 0227 |
| PHED | 3220 |
| PLIST | 3341 |
| PLIST1 | 3360 |
| PNUM | 3332 |
| PNX10 | 3207 |
| PNX20 | 3246 |
| PNX30 | 3253 |
| PNX40 | 3261 |
| PRINT | 0205 |
| PRINTA | 0174 |
| PRINTB | 0223 |
| PRIOT | 3000 |
| PSEP | 3333 |
| PTMP10 | 3343 |
| PTOT | 2624 |
| PTRANS | 3315 |
| PTRIG | 3346 |
| PT100 | 3260 |
| QB | 0041 |
| QBCNT | 2115 |
| QBIT | 2116 |
| QCM10 | 1144 |
| QCM12 | 1135 |
| QCM150 | 1154 |
| QCM260 | 1135 |
| QCM32 | 1140 |
| QCM6 | 1141 |
| QCM7 | 1137 |
| QCRCNT | 1110 |
| QCT | 2113 |
| QCT10 | 2111 |
| QC100 | 2121 |
| QC12 | 1142 |
| QC1400 | 2122 |
| QC150 | 1153 |
| QC200 | 1253 |
| QC24 | 1635 |
| QC32 | 1152 |
| QC320 | 1143 |
| QC7 | 1252 |
| QDIV | 1334 |
| QDGNRD | 1200 |
| QEND | 1126 |
| QGTCNT | 1600 |
| QHED | 2104 |
| QLCA | 1112 |
| QLIST1 | 1642 |
| QLIST2 | 1657 |
| QNUM | 1075 |
| QNX | 1223 |
| QNXB | 2056 |

| | |
|---|---|
| QNXC | 2061 |
| QNXCR | 1043 |
| QNXT | 2021 |
| QNXRD | 1037 |
| QNXIO | 2007 |
| QOFSET | 2117 |
| QON | 2051 |
| QONB | 2065 |
| QORDER | 2000 |
| QPUT | 1237 |
| QQC7 | 1634 |
| QRIN | 1101 |
| QRTI | 2024 |
| QRYCNT | 1147 |
| QRYNUM | 0035 |
| QSEP | 1072 |
| QSHED | 1336 |
| QSPC1 | 1256 |
| QSPC2 | 1324 |
| QTMP | 1255 |
| QTMP1 | 2102 |
| QUCA | 1120 |
| Q7 | 1217 |
| RCM1 | 3344 |
| RECORD | 3342 |
| R10 | 0010 |
| R11 | 0011 |
| R12 | 0012 |
| R13 | 0013 |
| R14 | 0014 |
| R15 | 0015 |
| R16 | 0016 |
| R17 | 0017 |
| SCHCNT | 0034 |
| SEC | 2320 |
| SECHED | 0450 |
| SECTHD | 2042 |
| SERCH | 1000 |
| SPBUF | 3044 |
| STDATA | 3336 |
| STH1 | 3337 |
| STH2 | 3340 |
| STMP1 | 1315 |
| STMP2 | 1317 |
| ST1 | 0200 |
| ST2 | 0201 |
| ST3 | 0203 |
| ST4 | 0333 |
| TCM14 | 2755 |
| TCM6 | 2770 |
| TC6 | 2772 |
| THIT | 2747 |
| TMON | 2754 |
| TNX1 | 2636 |
| TNX2 | 2643 |
| TOT | 2600 |
| TOTSM | 5000 |
| TOTTO | 2476 |
| TRIGX | 1641 |
| TXCT1 | 2757 |
| TXCT2 | 2760 |
| TX1 | 2751 |
| TX2 | 2763 |
| TX3 | 2764 |
| UCTRIG | 1134 |
| UDADDR | 3137 |
| UDARND | 3102 |
| UDBOX | 3146 |
| UDCNT | 3141 |

```
UDCONT  3152
UDDO    3110
UDGET   3150
UDHIGH  3142
UDHSUB  3144
UDLOOP  3136
UDLOW   3143
UDLSUB  3145
UDOUT   3126
UDPTR   3151
UDTEML  3147
UDTHO   3140
WC      0036
WORD    1254
WRDBUF  0033
XCHKK   2774
XDAND   2123
XDHITX  2475
XDISK   0050
XDIVID  0047
XDOHIT  0543
XDOIT   1312
XDOWRD  1145
XERR    0051
XGTCNT  1251
XHITS   0542
XHTIX   1146
XHITIO  2762
XKYBD   0046
XMBIT   0023
XMBUF   2415
XMHIT   0021
XMISS   2414
XMLOC   0022
XMMON   0020
XMORE   0331
XMSTRT  0024
XM1     2404
XM10    2431
XM2     2407
XM20    2436
XM3     2416
XM4     2427
XNEW    0332
[illegible]
[illegible]  [illegible]
[illegible]  1155
XPRINT  [illegible]
[illegible]
[illegible]  1133
[illegible]  2120
XSERCH  0330
XTOT    2124
XXX     1606
XZRO    1156
YBUF    1316
ZC400   1473
ZD10    3053
Z[illegible]  1456
```

Although only a few embodiments of this invention have been described in detail, those in the art will recognize that the exemplary embodiments may be adapted to many different situations without departing from the substance, spirit or advantages of this invention. Accordingly, all such embodiments are intended to be included within the scope of this invention which scope is defined solely by the appended claims.

What is claimed is:

1. An information storage and retrieval system comprising:

a set of stored information bearing records having information stored in a language format which, at least in part, has intelligent meaning because of particular groupings of characters or symbols therein, each of said records being disposed at a predetermined address or location, a stored retrieval file for facilitating the retrieval of particular desired records from said set of information bearing records, said retrieval file comprising a plurality of arrays of binary coded elements, each of said arrays including predetermined elements individually and respectively corresponding to the addresses of each of said information bearing records, each of said arrays being formed to indicate the presence or absence of a predetermined identifiable characteristic of the language structure associated with the information content of each of said information bearing records, wherein said plurality of arrays constituting a comprehensive set of arrays correspond to a comprehensive set of said predetermined identifiable characteristics of language structure comprising substantially all such predetermined identifiable characteristics which are to be later utilized in searching for desired information bearing records, and each element in a given array being binary coded in a first manner to represent the presence in the respectively corresponding record of the predetermined identifiable characteristic of language structure corresponding to the given array and being binary coded in a second distinguishable manner to represent the absence in the respectively corresponding record of the predetermined identifiable characteristic of language structure corresponding to the given array whereby particular desired records bearing certain desired information may be located and thus retrieved by first determining the subset of said predetermined identifiable characteristics present in said desired information and then examining the respectively corresponding subset of said arrays to determine the storage address or location of each stored record containing all of said subset of predetermined identifiable characteristics.

2. An information storage and retrieval system as in claim 1 wherein at least some of said predetermined identifiable characteristics of language structure correspond to the identity of characters in said records and to the relative sequential location of such characters in associated groups of characters contained in said records.

3. An information storage and retrieval system as in claim 2 wherein said at least some of said predetermined identifiable characteristics of language structure correspond to the identity of characters and their relative sequential location in groups of characters having a predetermined number of total characters therein.

4. An information storage and retrieval system as in claim 2 wherein said at least some of said predetermined identifiable characteristics of language structure correspond to upper and lower type-case representations of said characters.

5. An information storage and retrieval system as in claim 2 wherein at least some of said predetermined identifiable characteristics of language structure corrrespond to the identity of characters and their relative sequential location in groups of characters having any arbitrary number of total characters therein.

6. An information storage and retrieval system as in claim 1 further comprising:

means for extracting from said retrieval file particular ones of said arrays corresponding to desired particular ones of said predetermined identifiable characteristics of language structure.

7. An information storage and retrieval system as in claim 6 further comprising:

means for comparing corresponding binary coded elements of said extracted particular arrays thereby identifying the addresses of any records having all the desired particular ones of said predetermined identifiable characteristics of language structure.

8. An information storage and retrieval system as in claim 7 further comprising:

means for extracting the stored information from the ones of said information bearing records corresponding to particular records for which corresponding addresses have been identified.

9. An information storage and retrieval system as in claim 8 further comprising:

means for displaying said extracted information from said set of information bearing records.

10. An information storage and retrieval system as in claim 6 further comprising:

input means for accepting input search data and for identifying the subset of said particular ones of said arrays corresponding to desired particular ones of said predetermined identifiable characteristics of language structure in response to said search data.

11. An information storage and retrieval system as in claim 10 wherein said input means is adapted to accept search data comprising at least a portion of one group of characters contained in a record for which information retrieval is desired.

12. An information storage and retrieval system as in claim 1 including means for automatically constructing said retrieval file from input data corresponding to the stored information in said set of information bearing records.

13. An information storage and retrieval system as in claim 1 wherein said information bearing records are in machine readable and machine locatable form.

14. An information storage and retrieval system as in claim 1 wherein said retrieval file is in machine readable form.

15. An information storage and retrieval system as in claim 1 wherein said information bearing records and said retrieval file are both in machine readable form.

16. An information storage and retrieval system as in claim 1 including means for automatically locating and displaying at least part of the information content of any desired information bearing record from the addresses of records identifiable by comparative values of corresponding elements of a subset of said arrays having predetermined binary coded values.

17. An information storage and retrieval system as in claim 1 further comprising means for accepting input search data and for automatically identifying particular ones of said arrays corresponding to desired particular ones of said predetermined identifiable characteristics of language structure in response to said search data.

18. An information storage and retrieval system as in claim 17 wherein said means for accepting is adapted to accept search data comprising at least a portion of one group of characters potentially contained in a record for which information retrieval is desired.

19. An information storage and retrieval system as in claim 1 comprising:

a plurality of said retrieval files, each retrieval file corresponding to only a particular predetermined portion of the potential information content of any given information bearing record.

20. A method for information storage and retrieval comprising:

maintaining a set of information bearing records having information stored in a language format which, at least in part, has intelligent meaning because of particular groupings of characters or symbols therein, each of said records being maintained at a predetermined address or location, generating and maintaining a retrieval file for facilitating the retrieval of particular desired records from said set of information bearing records, said retrieval file being formed as a function of the language structure of information in said records, the retrieval file comprising a plurality of arrays of binary coded elements, said generating and maintaining step including the generation and maintenance of a comprehensive set of arrays corresponding to a comprehensive set of predetermined identifiable characteristics of language structure comprising substantially all such predetermined identifiable characteristics which are to be later utilized in searching for desired information bearing records, providing predetermined elements in said arrays which individually and respectively correspond to the address of each of said information bearing records, forming each of said arrays to indicate the presence or absence of a predetermined identifiable characteristic of language structure associated with the information content of each of said information bearing records, said forming step including binary coding each element in a given array in a first manner to represent the presence in the respectively corresponding record of the predetermined identifiable characteristic of language structure corresponding to the given array and in a second distinguishable manner to represent the absence in the respectively corresponding record of the predetermined identifiable characteristic of language structure corresponding to the given array and, locating and retrieving particular desired records bearing certain desired information by first determining the subset of said predetermined identifiable characteristics present in said desired information and then examining the respectively corresponding subset of said arrays to determine the storage address or location of each stored record containing all of said subset of predetermined identifiable characteristics.

21. A method for information storage and retrieval as in claim 20 wherein at least some of said predetermined identifiable characteristics of language structure are caused to correspond to the identity of characters in said records and to the relative sequential location of such characters in associated groups of characters contained in said records.

22. A method for information storage and retrieval as in claim 21 wherein said at least some of said predetermined identifiable characteristics of language structure are caused to correspond to the identity of characters and their relative sequential location in groups of characters having a predetermined number of total characters therein.

23. A method for information storage and retrieval as in claim 21 wherein said at least some of said predetermined identifiable characteristics of language structure are caused to correspond to upper and lower type-case representations of said characters.

24. A method for information storage and retrieval as in claim 21 wherein at least some of said predetermined identifiable characteristics of language structure are caused to correspond to the identity of characters and their relative sequential location in groups of characters having any arbitrary number of total characters therein.

25. A method for information storage and retrieval as in claim 20 further comprising:

extracting information from said retrieval file representing particular ones of said arrays corresponding to desired particular ones of said predetermined identifiable characteristics.

26. A method for information storage and retrieval as in claim 25 further comprising:

comparing said extracted information representing corresponding binary coded elements of said particular arrays thereby identifying the addresses of any records having all the desired particular ones of said predetermined identifiable characteristics.

27. A method for information storage and retrieval as in claim 26 further comprising:

extracting the stored information from the ones of said information bearing records corresponding to the particular records for which corresponding addresses have been identified.

28. A method for information storage and retrieval as in claim 27 further comprising:

displaying said extracted information from said set of information bearing records.

29. A method for information storage and retrieval as in claim 25 further comprising:

accepting input search data and for identifying the subset of said particular ones of said arrays corresponding to desired particular ones of said predetermined identifiable characteristics of language structure in response to said search data.

30. A method for information storage and retrieval as in claim 29 wherein said accepting step includes the acceptance as in claim 29 wherein said accepting step includes the acceptance of search data comprising at least a portion of one group of characters potentially contained in a record for which information retrieval is desired.

31. A method for information storage and retrieval as in claim 20 including automatically constructing said retrieval file from input data corresponding to the informational content of said set of information bearing records.

32. A method for information storage and retrieval as in claim 20 wherein said information bearing records are maintained in machine readable and machine locatable form.

33. A method for information storage and retrieval as in claim 20 wherein said retrieval file is maintained in machine readable form.

34. A method for information storage and retrieval as in claim 20 wherein said information bearing records and said retrieval file are both maintained in machine readable form.

35. A method for information storage and retrieval as in claim 20 including automatically locating and displaying at least part of the information content of any desired information bearing record from the addresses of records identified by comparing values of corresponding elements of a subset of said arrays having predetermined binary coded values.

36. A method for information storage and retrieval as in claim 20 further comprising accepting input search data and automatically identifying particular ones of said arrays corresponding to desired particular ones of said predetermined identifiable characteristics of language structure in response to said search data.

37. A method for information storage and retrieval as in claim 36 wherein said accepting step includes the acceptance of search data comprising at least a portion of one group of characters potentially contained in a record for which information retrieval is desired.

38. A method for information storage and retrieval as in claim 20 further comprising:

maintaining a plurality of said retrieval files, each retrieval file corresponding to only a particular predetermined portion of the potential information content of any given information bearing record.

39. A method for identifying particular desired information bearing records having desired predetermined identifiable characteristics of language structure from a base data file containing a plurality of information bearing records having information stored in a language format which, at least in part, has intelligent meaning because of particular groupings of characters or symbols therein, said method comprising the steps of:

maintaining a retrieval file separately disposed with respect to said base data file, said retrieval file comprising a plurality of arrays of binary coded elements wherein said plurality of arrays constituting a comprehensive set of arrays correspond to a comprehensive set of said predetermined identifiable characteristics of language structure comprising substantially all such predetermined identifiable characteristics which are to be later utilized in searching for desired information bearing records, and including the steps of organizing each array to include a binary coded element respectively corresponding to each record in said base data file, and forming each array to correspond to indicate the presence or absence of a predetermined identifiable characteristic of language structure associated with each of said records, said forming step including assigning each binary coded element in any given array a predetermined binary value to represent the presence or absence of said predetermined identifiable characteristic of language structure represented by said given array in the particular record represented by each element, generating search data representing desired predetermined identifiable characteristics of language structure for sought after records, selecting the subset of arrays representing said desired predetermined identifiable characteristics of language structure, and comparing the binary values of respectively corresponding elements in said selected subset of arrays representing said desired predetermined identifiable characteristics of language structure to identify the addresses or locations of all records in the base data file which have all the desired predetermined identifiable characteristics of language structure.

40. A method as in claim 39 wherein at least some of said predetermined identifiable characteristics of language structure are chosen to represent the identity of characters in said records and the relative sequential location of such characters in associated groups of characters contained in said records.

41. A method as in claim 40 wherein at least some of said predetermined identifiable characteristics of language structure are chosen to correspond to the identity of characters and their relative sequential location in groups of characters having a predetermined number of total characters therein.

42. A method as in claim 40 wherein at least some of said predetermined identifiable characteristics of language structure are chosen to correspond to upper and lower type-case representations of said characters.

43. A method as in claim 40 wherein at least some of said predetermined identifiable characteristics of language structure are chosen to correspond to the identity of characters and their relative sequential location in groups of characters having any arbitrary number of total characters therein.

44. A method as in claim 39 further comprising the steps of:

extracting information from the base data file corresponding to the particular identified information bearing records.

45. A method as in claim 44 further comprising the step of:

displaying said extracted information from the base data file.

46. A method as in claim 39 wherein said generating step comprises processing input search data comprising at least a portion of one group of characters potentially contained in a record for which information retrieval is desired and identifying said desired predetermined identifiable charateristics of language structure from said input search data.

47. A method as in claim 39 wherein said maintaining step is repeated for each of a plurality of retrieval files, each retrieval file corresponding to only a particular predetermined portion of the potential information content of any given information bearing record.

48. Apparatus for identifying particular desired information bearing records having desired predetermined identifiable characteristics of language structure from a base data file containing a plurality of information bearing records having information stored in a language format which, at least in part, has intelligent meaning because of particular groupings of characters or symbols therein, said apparatus comprising:

means for maintaining a retrieval file separately disposed with respect to said base data file, said retrieval file comprising a plurality of arrays of binary coded elements wherein said plurality of arrays constituting a comprehensive set of arrays correspond to a comprehensive set of said predetermined identifiable characteristics of language structure comprising substantially all such predetermined identifiable characteristics which are to be later utilized in searching for desired information bearing records, and including means for organizing each array to include a binary coded element respectively corresponding to each record in said base data file, and means for forming each array to indicate the presence or absence of a predetermined identifiable characteristic of language structure associated with each of said records, said means for forming including means for assigning each binary coded element in any given array a predetermined binary value to represent the presence or absence of said predetermined identifiable characteristic of language structure represented by said given array in the particular record represented by each element, means for generating search data representing desired predetermined identifiable characteristics of language structure for sought after records, means for selecting the subset of arrays representing said desired predetermined identifiable characteristics of language structure, and means for comparing the binary values of respectively corresponding elements in said selected subset of arrays representing said desired predetermined identifiable characteristics of language structure to identify the addresses or locations of all records in the base data file which have all the desired predetermined identifiable characteristics of language structure.

49. Apparatus as in claim 48 wherein said means for assigning includes means for causing at least some of said predetermined identifiable characteristics of language structure to represent the identity of characters in said records and the relative sequential location of such characters in associated groups of characters contained in said records.

50. Apparatus as in claim 49 wherein said means for assigning also includes means for causing at least some of said predetermined identifiable characteristics of language structure to correspond to the identity of characters and their relative sequential location in groups of characters having a predetermined number of total characters therein.

51. Apparatus as in claim 49 wherein said means for assigning also includes means for causing at least some of said predetermined identifiable characteristics of language structure to correspond to upper and lower type-case representations of said characters.

52. Apparatus as in claim 49 wherein said means for assigning also includes means for causing at least some of said predetermined identifiable characteristics of language structure to correspond to the identity of characters and their relative sequential location in groups of characters having any arbitrary number of toal characters therein.

53. Apparatus as in claim 48 further comprising:

means for extracting information from the base data file corresponding to the particular identified information bearing records.

54. Apparatus as in claim 53 further comprising:

means for displaying said extracted information from the base data file.

55. Apparatus as in claim 48 wherein said means for generating comprises means for processing input search data comprising at least a portion of one group of characters potentially contained in a record for which information retrieval is desired and means for identifying said desired predetermined identifiable characteristics of language structure from said input search data.

56. Apparatus as in claim 48 wherein said means for maintaining includes means for maintaining a plurality of retrieval files, each retrieval file corresponding to only a particular predetermined portion of the potential information content of any given information bearing record.

57. A computerized information storage and retrieval system for storing and retrieving information stored in a language format which, at least in part, has intelligent meaning because of particular groupings of characters or symbols therein and including a programmed data processor, said system comprising:

first machine accessible information storage means adapted for storing a set of information bearing records at predetermined addresses and for delivering the stored information content of any given record when provided with the address of the given record, second machine accessible information storage means adapted for storing a retrieval file comprising a plurality of arrays of binary coded elements, each of said arrays including predetermined elements individually and respectively corresponding to the address of each of said information bearing records in said first machine accessible information storage means, each of said arrays being representative of a predetermined identifiable characteristic associated with each of said information bearing records, said plurality of arrays constituting a comprehensive set of arrays corresponding to a comprehensive set of said predetermined identifiable characteristics of language structure comprising substantially all such predetermined identifiable characteristics which are to be later utilized in searching for desired information bearing records, each element in a given array being binary coded in a first manner to represent the presence in the respectively corresponding record of the predetermined identifiable characteristic corresponding to the given array and being binary coded in a second manner to represent the absence in the respectively corresponding record of the predetermined identifiable characteristic corresponding to the given array, a programmed data processor computer means operatively connected with said first and second machine accessible information storage means, said data processor being adapted for accepting input retrieval search data, for automatically identifying the subset of predetermined identifiable characteristics present in said retrieval search data and for thereafter selecting a corresponding subset of particular ones of said arrays in response to said search data, for automatically comparing the binary values of respectively corresponding elements of said identified particular arrays thus identifying the addresses of particular records for which retrieval is desired and for automatically providing said identified addresses to said first machine accessible information storage means.

58. A computerized information storage and retrieval system as in claim 57 wherein said programmed data processor means is further adapted for automatically generating said retrieval file in the second machine accessible information storage means from the set of information bearing records in the first machine accessible information storage means.

59. A computerized information storage and retrieval system as in claim 57 wherein said programmed data processor means is further adapted to accept search data comprising at least a portion of one group of characters contained in a record for which information retrieval is desired.

60. A computerized information storage and retrieval system as in claim 57 wherein:

said second machine accessible information storage means is adapted for storing a plurality of said retrieval files, each retrieval file corresponding to only a particular predetermined portion of the information content of any given information bearing record, and said programmed data processor means is further adapted to accept a plurality of types of input search data, each type respectively corresponding to a predetermined one of said retrieval files.

61. A computerized information storage and retrieval system as in claim 57 wherein said information bearing records comprise photographically recorded images.

62. A computerized information storage and retrieval system as in claim 57 wherein said information bearing records comprise recorded machine readable records.

63. A computerized information storage and retrieval system as in claim 57 wherein said retrieval file comprises photographically recorded images.

64. A computerized information storage and retrieval system as in claim 57 wherein said retrieval file comprises magnetically recorded machine readable data.

65. A computerized information storage and retrieval system as in claim 57 wherein at least some of said predetermined identifiable characteristics correspond to the identity of characters in said records and the relative sequential location of such characters in associated groups of characters contained in said records.

66. A computerized information storage and retrieval system as in claim 65 wherein said at least some of said predetermined identifiable characteristics correspond to the identity of characters and their relative sequential location in groups of characters having a predetermined number of total characters therein.

67. A computerized information storage and retrieval system as in claim 65 wherein said at least some of said predetermined identifiable characteristics correspond to upper and lower type-case representations of said characters.

68. A computerized information storage and retrieval system as in claim 65 wherein said at least some of said predetermined identifiable characteristics correspond to the identity of characters and their relative sequential location in groups of characters having any arbitrary number of total characters therein.

69. A computerized information storage and retrieval method for storing and retrieving information stored in a language format which, at least in part, has intelligent meaning because of particular groupings of characters or symbols therein and which method utilizes a programmed data processor, said method comprising:

storing a set of information bearing records at predetermined addresses in a first machine accessible information storage means and delivering the information content of any given record when provided with the address of the given record, storing a retrieval file comprising a plurality of arrays of binary coded elements in a second machine accessible information storage means, arranging each of said arrays to include predetermined elements individually and respectively corresponding to the address of each of said information bearing records in said first machine accessible information storage means, arranging each of said arrays to be representative of a predetermined identifiable characteristic associated with each of said information bearing records wherein said plurality of arrays constituting a comprehensive set of arrays correspond to a comprehensive set of said predetermined identifiable characteristics of language structure comprising substantially all such predetermined identifiable characteristics which are to be later utilized in searching for desired information bearing records, binary coding each element in a given array in a first manner to represent the presence in the respectively corresponding record of the predetermined identifiable characteristic corresponding to the given array and in a second distinguishable manner to represent the absence in the respectively corresponding record of the predetermined identifiable characteristic corresponding to the given array, providing a programmed data processor means operatively connected with said first and second machine accessible information storage means, and adapting said data processor for accepting input retrieval search data, for automatically identifying particular ones of said arrays in response to said search data, for automatically comparing the binary values of corresponding elements of said identified particular arrays thus identifying the addresses of particular records for which retrieval is desired and for automatically providing said identified addresses to said first machine accessible information storage means.

70. A computerized information storage and retrieval method as in claim 69 wherein said programmed data processor means is further adapted for automatically generating said retrieval file in the second machine accessible information storage means from the set of information bearing records in the first machine accessible information storage means.

71. A computerized information storage and retrieval method as in claim 69 wherein said programmed data processor means is further adapted to accept search data comprising at least a portion of one group of characters contained in a record for which information retrieval is desired.

72. A computerized storage and retrieval method as in claim 69 further comprising:

adapting said second machine accessible information storage means for storing a plurality of said retrieval files, each retrieval file corresponding to only a particular predetermined portion of the information content of any given information bearing record, and further adapting said programmed data processor means to accept a plurality of types of input search data, each type respectively corresponding to a predetermined one of said retrieval files.

73. A computerized information storage and retrieval method as in claim 69 wherein said first storing step comprises storing said information bearing records as photographically recorded images.

74. A computerized information storage and retrieval method as in claim 69 wherein said first storing step comprises storing said information bearing records as recorded machine readable records.

75. A computerized information storage and retrieval method as in claim 69 wherein said second storing step comprises storing said retrieval file as photographically recorded images.

76. A computerized information storage and retrieval method as in claim 69 wherein said second storing step comprises storing said retrieval file as magnetically recorded machine readable data.

77. A computerized information storage and retrieval method as in claim 69 wherein said second arranging step includes causing at least some of said predetermined identifiable characteristics to correspond to the identity of characters in said records and to the relative sequential location of such characters in associated groups of characters contained in said records.

78. A computerized information storage and retrieval method as in claim 77 wherein said second arranging step also includes causing at least some of said predetermined identifiable characteristics to correspond to the identity of characters and their relative sequential location within groups of characters having a predetermined number of total characters therein.

79. A computerized information storage and retrieval method as in claim 77 wherein said second arranging step also includes causing at least some of said predetermined identifiable characteristics to correspond to upper and lower type-case representations of said characters.

80. A computerized information storage and retrieval method as in claim 77 wherein said second arranging step also includes causing at least some of said predetermined identifiable characteristics to correspond to the identity of characters and their relative sequential location within groups of characters having any arbitrary number of total characters therein.

* * * * *